(12) United States Patent
Naito

(10) Patent No.: US 12,176,754 B2
(45) Date of Patent: Dec. 24, 2024

(54) ELECTRIC MACHINE AND MAGNETIC FIELD PORTION

(71) Applicant: Yamaha Hatsudoki Kabushiki Kaisha, Shizuoka (JP)

(72) Inventor: Shinya Naito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 260 days.

(21) Appl. No.: 17/624,826

(22) PCT Filed: Jul. 3, 2020

(86) PCT No.: PCT/JP2020/026303
§ 371 (c)(1),
(2) Date: Jan. 4, 2022

(87) PCT Pub. No.: WO2021/002472
PCT Pub. Date: Jan. 7, 2021

(65) Prior Publication Data
US 2022/0329114 A1 Oct. 13, 2022

(30) Foreign Application Priority Data

Jul. 4, 2019 (JP) .................................. 2019-125254

(51) Int. Cl.
*H02K 1/14* (2006.01)
*H02K 3/18* (2006.01)

(52) U.S. Cl.
CPC .................. *H02K 1/14* (2013.01); *H02K 3/18* (2013.01)

(58) Field of Classification Search
None
See application file for complete search history.

(56) References Cited

U.S. PATENT DOCUMENTS 4,700,096 A 10/1987 Epars
5,682,073 A 10/1997 Mizuno
(Continued)

FOREIGN PATENT DOCUMENTS

CN 2207656 Y 9/1995
CN 201336619 Y 10/2009
(Continued)

OTHER PUBLICATIONS

Machine translation of Kura [JP 2015039251A]. (Year: 2015).*
(Continued)

*Primary Examiner* — Bernard Rojas
(74) *Attorney, Agent, or Firm* — HEA Law PLLC

(57) ABSTRACT

An electric machine that increases structural freedom to increase output of the electric machine while satisfying requirements of an outer shape. An armature portion includes armature cores (H1, H2) and a plurality of coils (CL) attached to the armature core (H1). A magnetic field portion (Fs) is relatively rotatable to the armature portion and includes a plurality of magnets (Mg) and a plurality of magnetic field cores (22N, 22S). In the magnetic field portion (Fs), the magnets (Mg) are disposed between two magnetic field cores (22N, 22S) adjacent in a rotation direction. Each of the armature cores (H1, H2) includes magnetic pole groups (G1, G2). The magnetic pole group (G1) included in the armature core (H1) and the magnetic pole group (G2) included in the armature core (H2) constitute a magnetic pole group pair (P) that forms a magnetic path through the magnetic field portion (Fs).

24 Claims, 188 Drawing Sheets

(56) References Cited

U.S. PATENT DOCUMENTS

| | | |
|---|---|---|
| 6,888,272 B2 | 5/2005 | Kastinger |
| 7,626,308 B2 | 12/2009 | Kang et al. |
| 7,902,712 B2 | 3/2011 | Nakamasu et al. |
| 8,624,458 B2 | 1/2014 | Jack et al. |
| 2017/0141626 A1 | 5/2017 | Marosz |
| 2020/0303973 A1 | 9/2020 | Kang et al. |

FOREIGN PATENT DOCUMENTS

| | | | |
|---|---|---|---|
| CN | 103633806 A | | 3/2014 |
| CN | 108023438 A | | 5/2018 |
| EP | 2187508 A1 | | 5/2010 |
| EP | 2317633 A2 | | 5/2011 |
| JP | S61293142 A | | 12/1986 |
| JP | H06351206 A | | 12/1994 |
| JP | 2000041367 A | | 2/2000 |
| JP | 2003513599 A | | 4/2003 |
| JP | 2007185087 A | | 7/2007 |
| JP | 2007306745 A | | 11/2007 |
| JP | 4085059 B2 | | 4/2008 |
| JP | 2009506738 A | | 2/2009 |
| JP | 2014007957 A | | 1/2014 |
| JP | 2015039251 A | | 2/2015 |
| TW | 498590 B | | 8/2002 |
| WO | 2006092924 A1 | | 9/2006 |
| WO | 2019066487 A1 | | 4/2019 |

OTHER PUBLICATIONS

Search Report of Feb. 24, 2023, for corresponding EP Patent Application No. 20835084.3, pp. 1-11.

International Search Report for PCT/JP2020/026303 dated on Sep. 8, 2020, and English translation thereof pp. 1-5.

International Search Report for PCT/JP2020/049286 dated on Mar. 16, 2021, and partial English translation thereof pp. 1-4.

International Preliminary Report on Patentability dated on Jan. 13, 2022, for corresponding PCT/JP2020/026303, PCT/ISA/237 with PCT/IB/338 and PCT/IB/373 (Serving as a supplemental concise explanation of relevance for Document 1: JP2015-39251A, Document 2: JP61-293142A and Document 3: JP6-351206, which were previously submitted).

Office Action of Dec. 26, 2022, for relating TW Patent Application No. 110148881, pp. 1-5.

English translation of the Written Opinion of the International Searching Authority (PCT/ISA/237) mailed Jul. 4, 2023, for related PCT Application No. PCT/JP2020/049286, pp. 1-5.

Office Action of Aug. 14, 2024, for corresponding CN Patent Application No. 202080048848.5 with English translation, pp. 1-11.

* cited by examiner

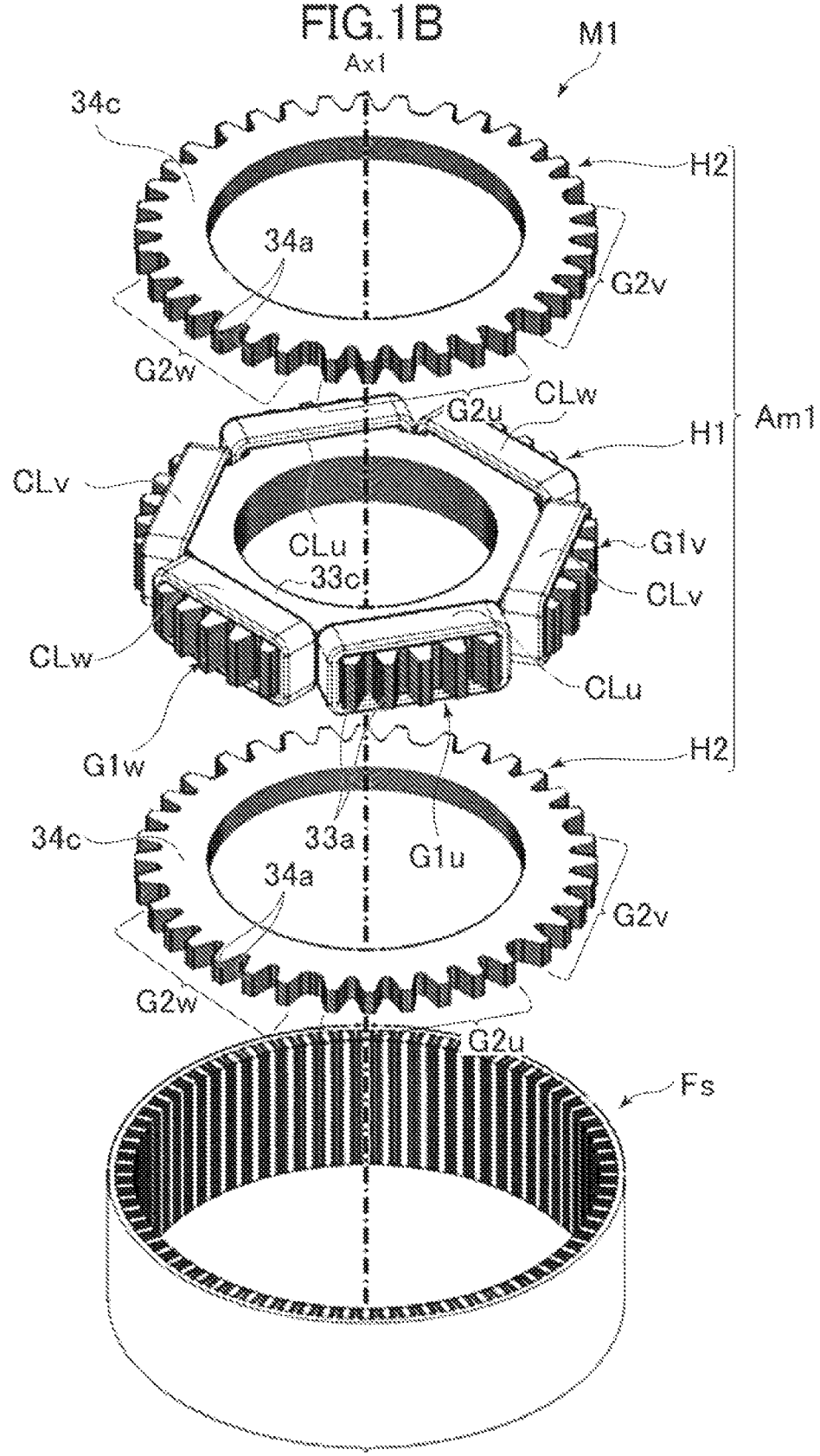

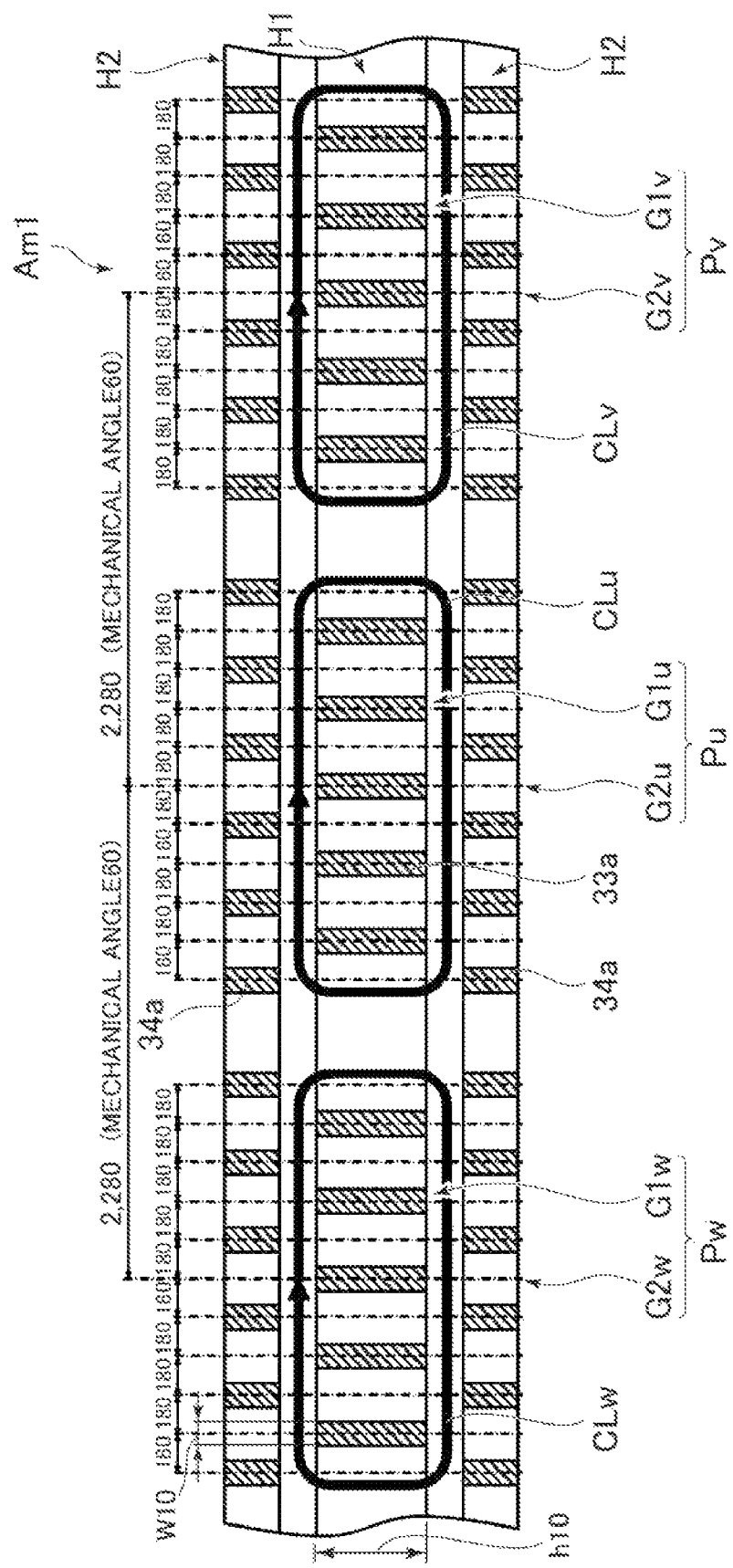

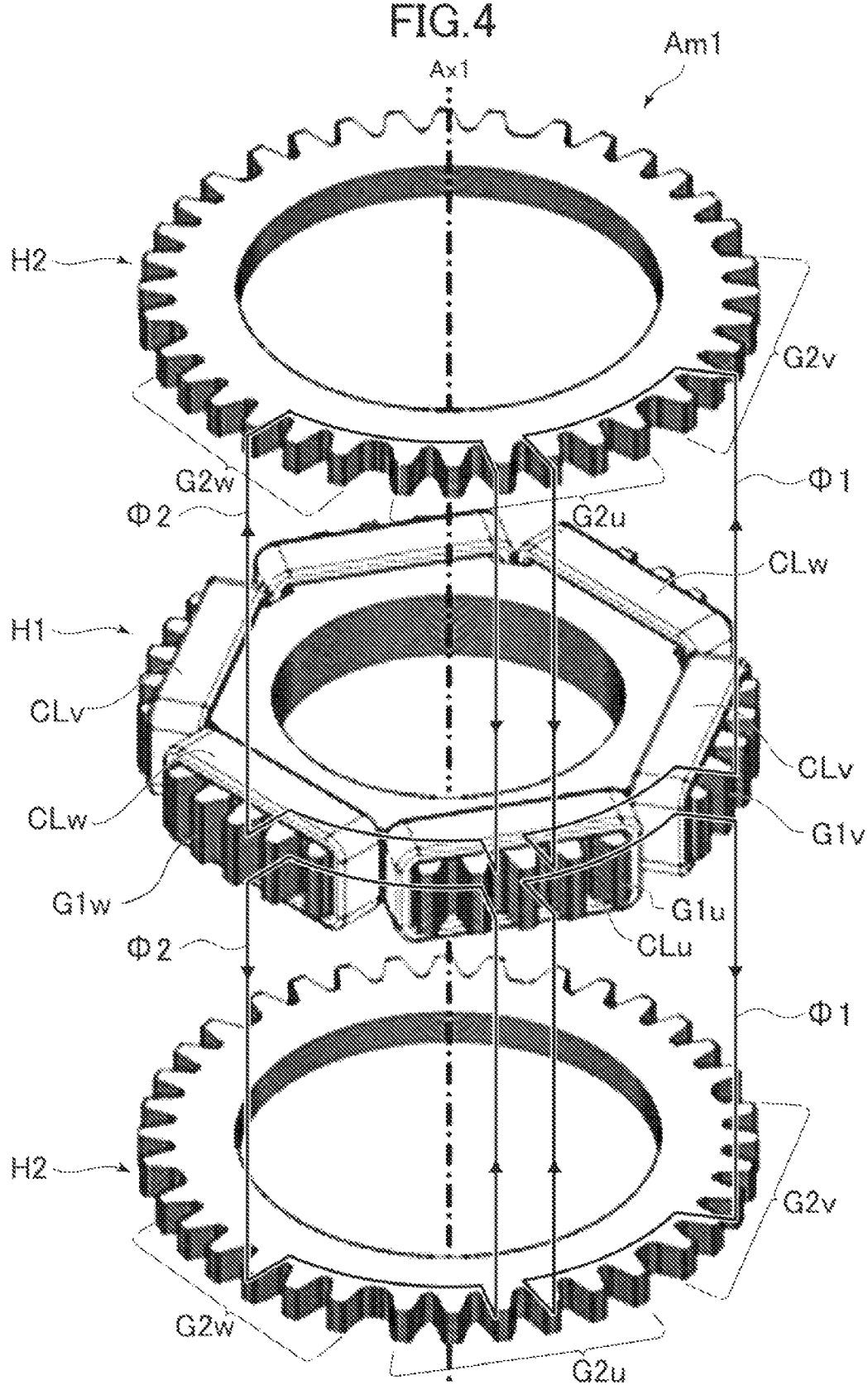

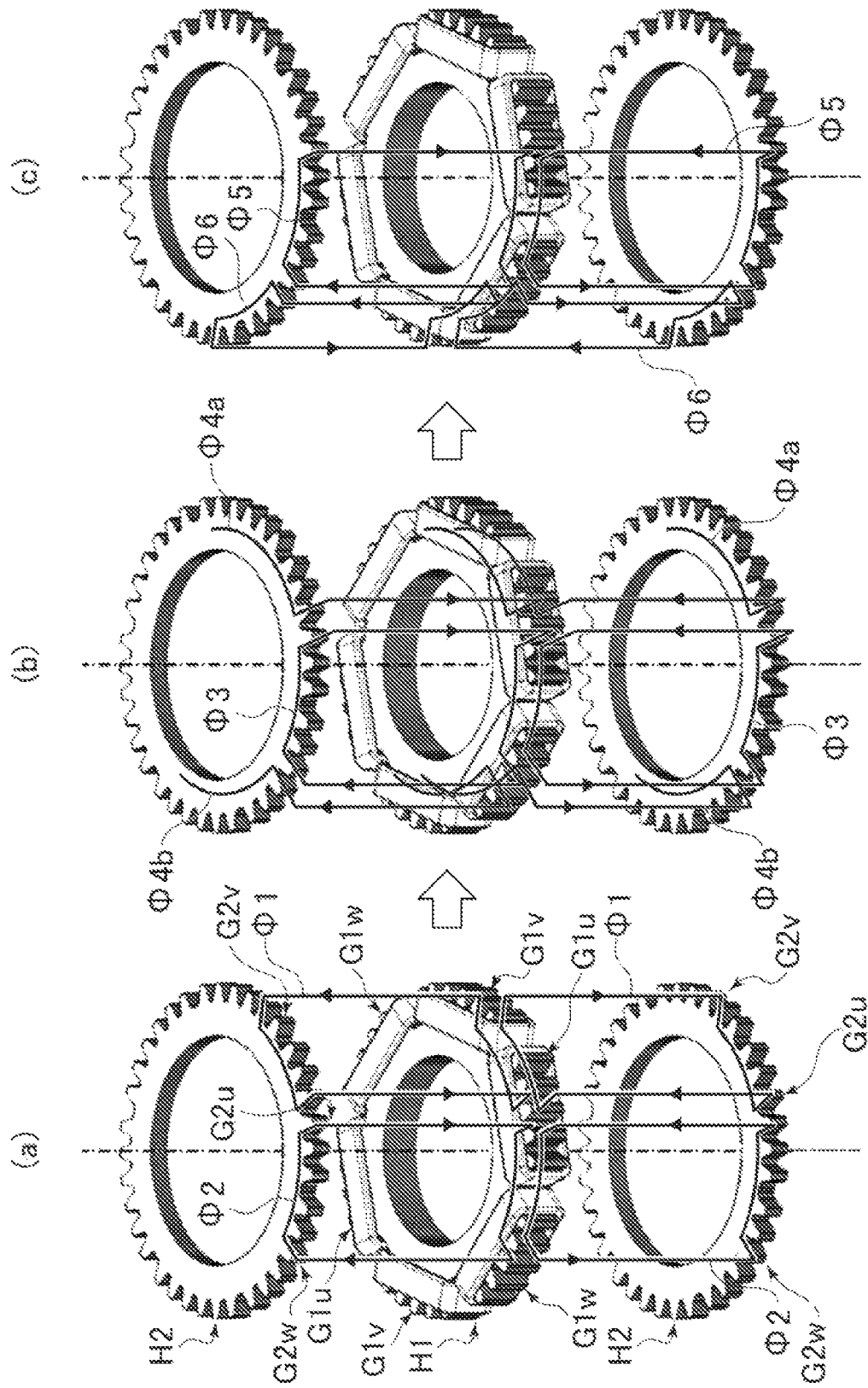

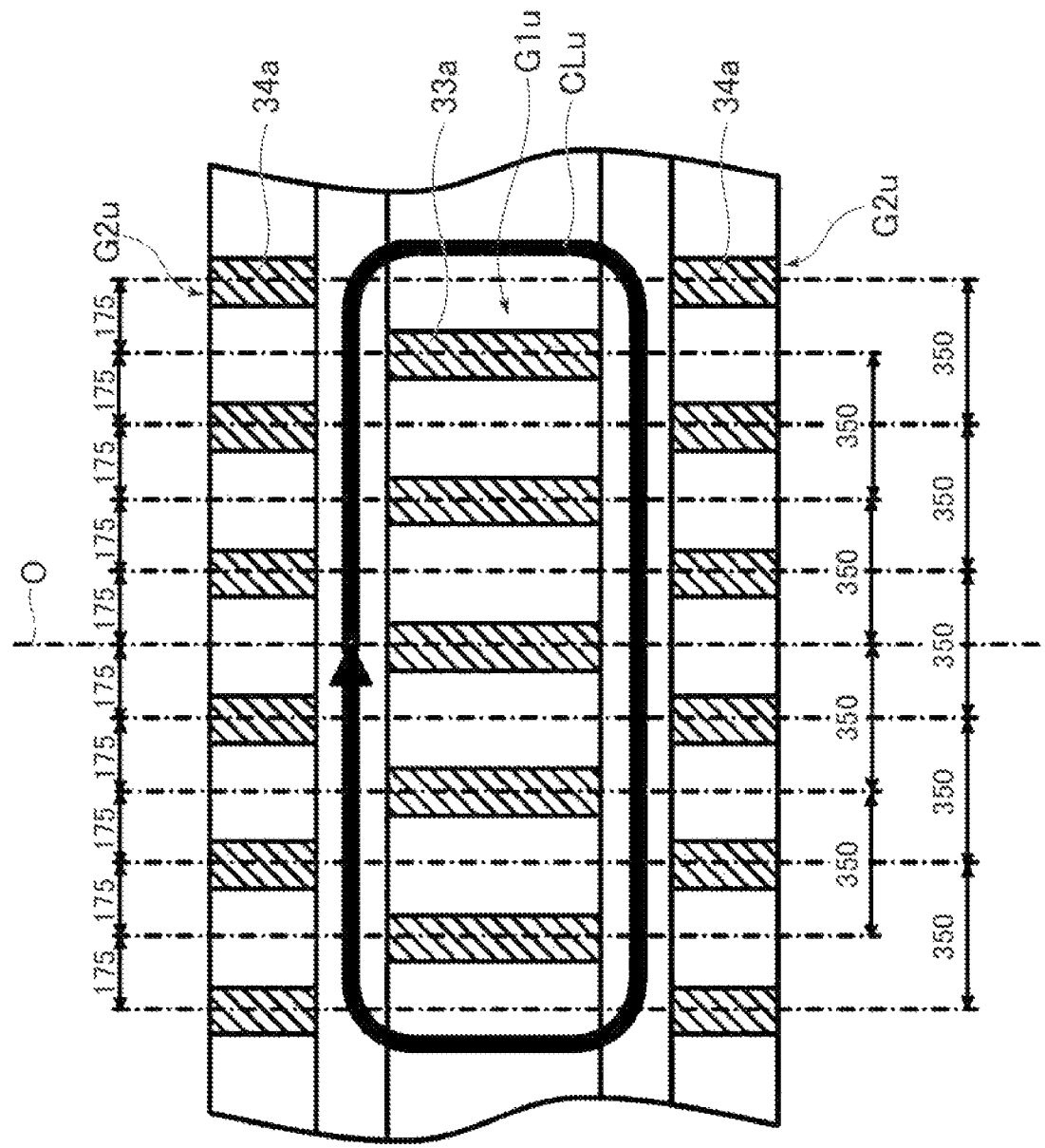

FIG.6B
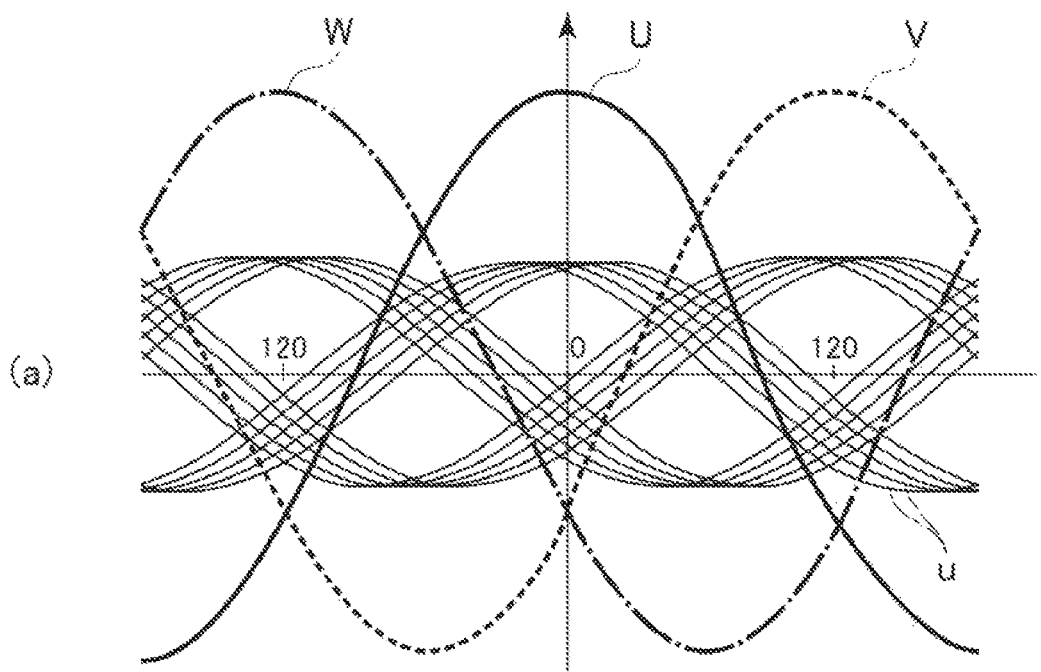
(a)
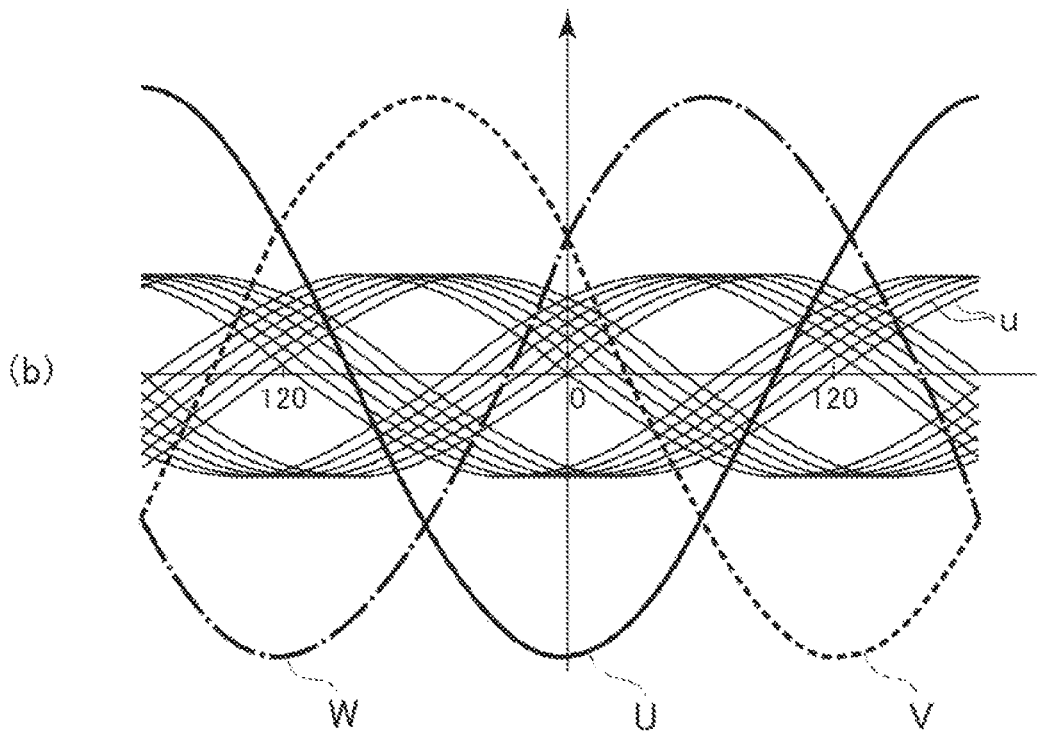
(b)

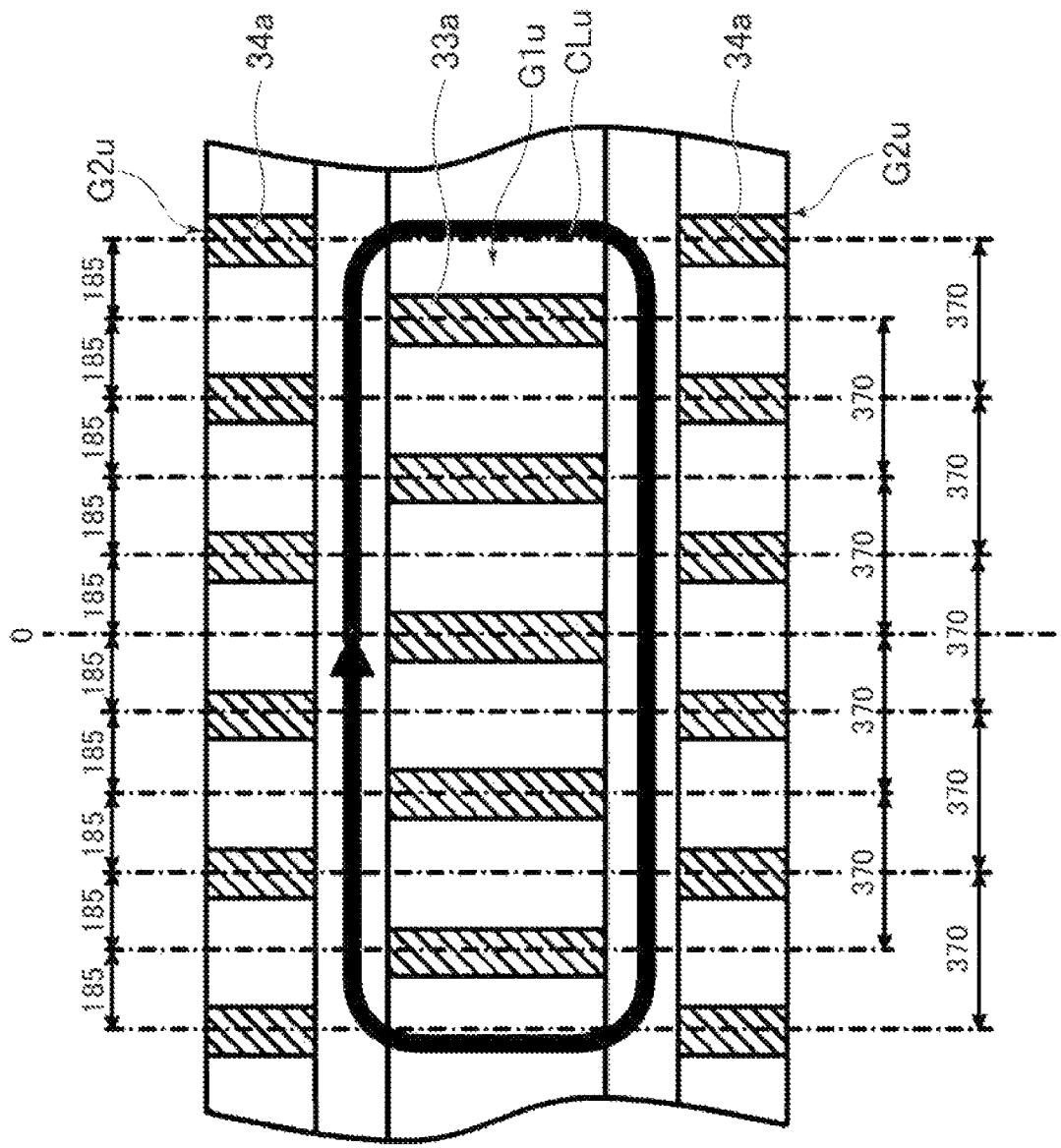

FIG.7B
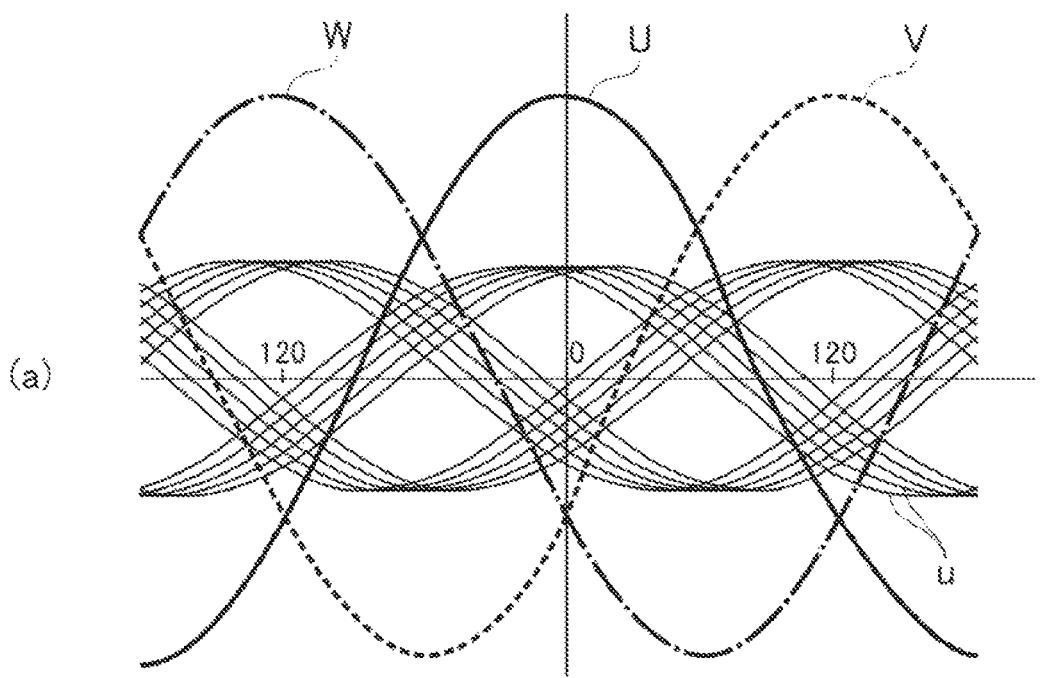
(a)
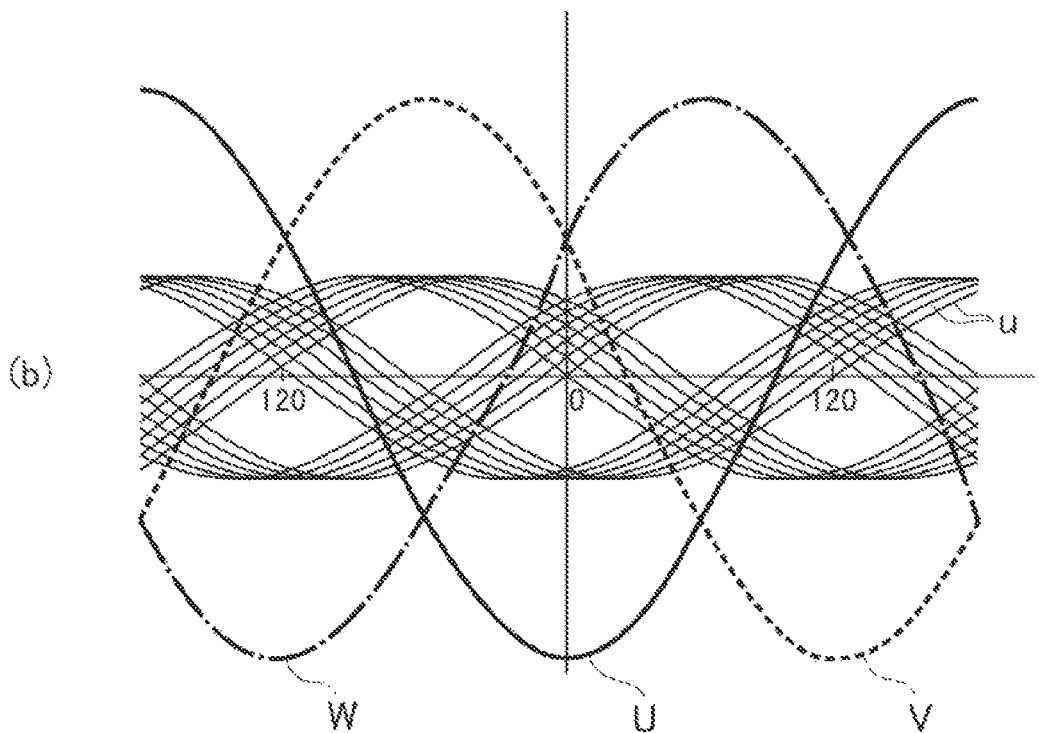
(b)

FIG.9B
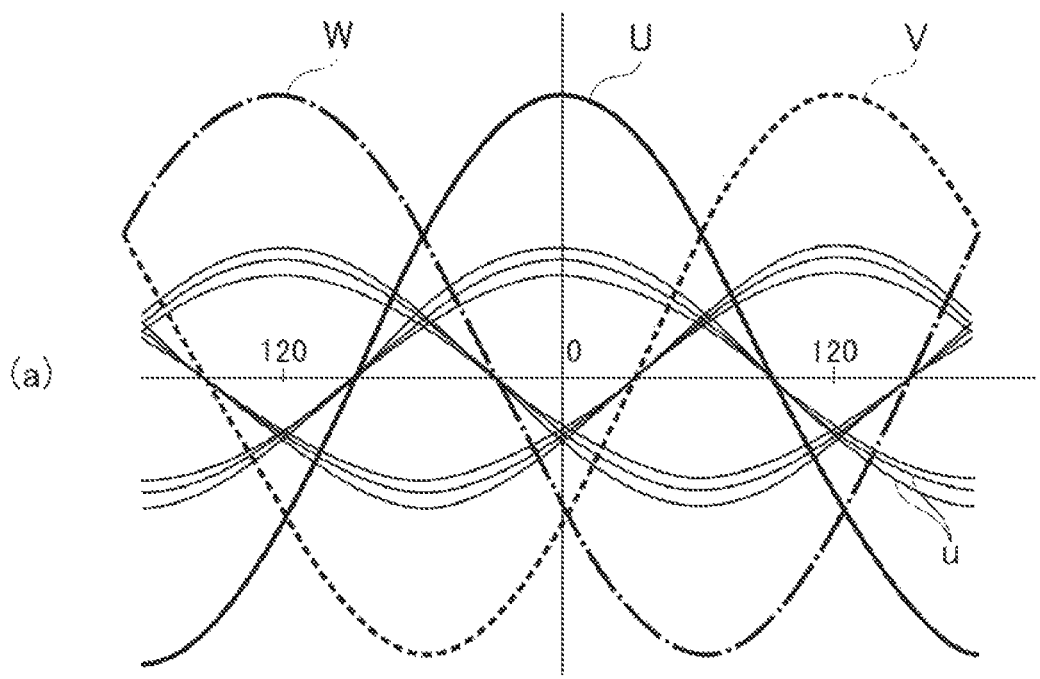
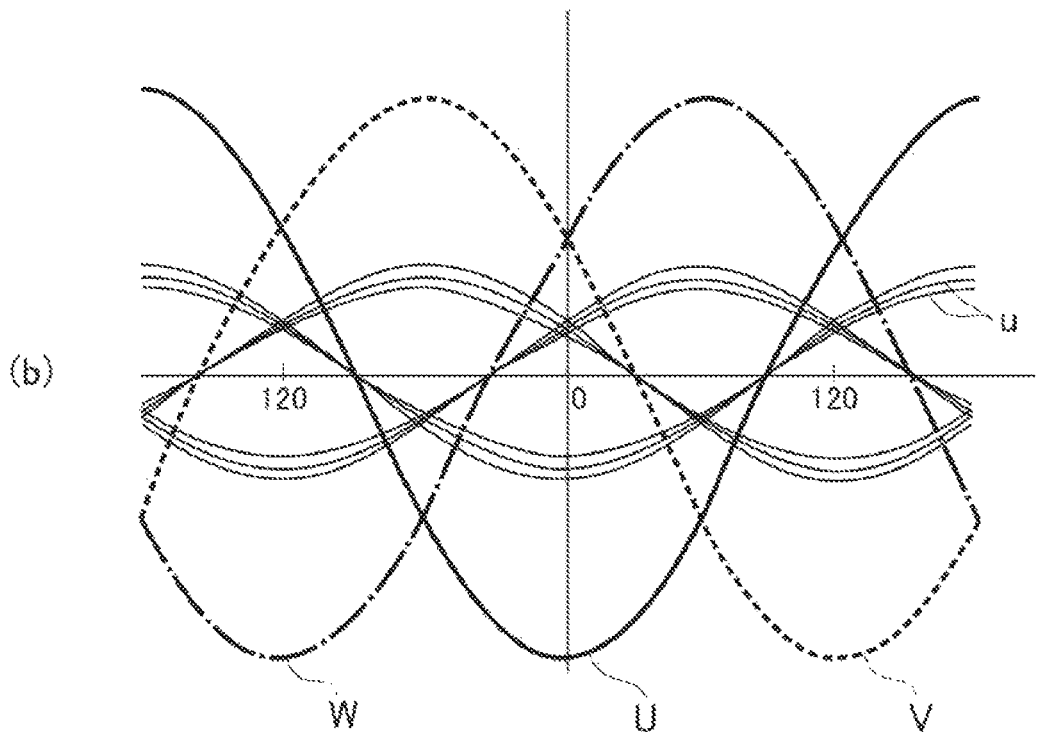

FIG.10
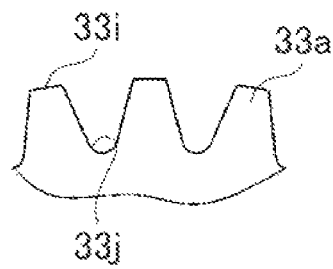
(a)
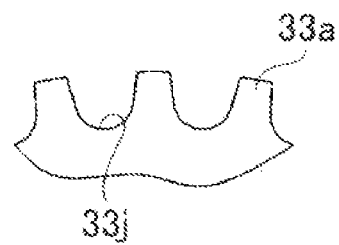
(b)
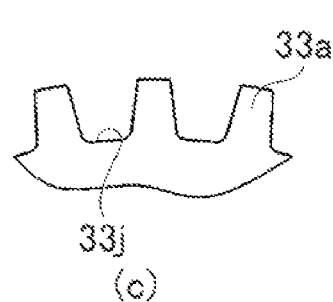
(c)
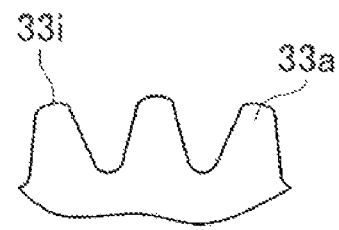
(d)
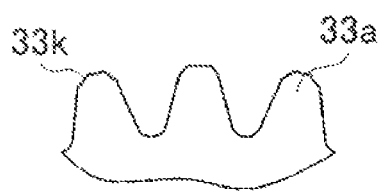
(e)
(f)

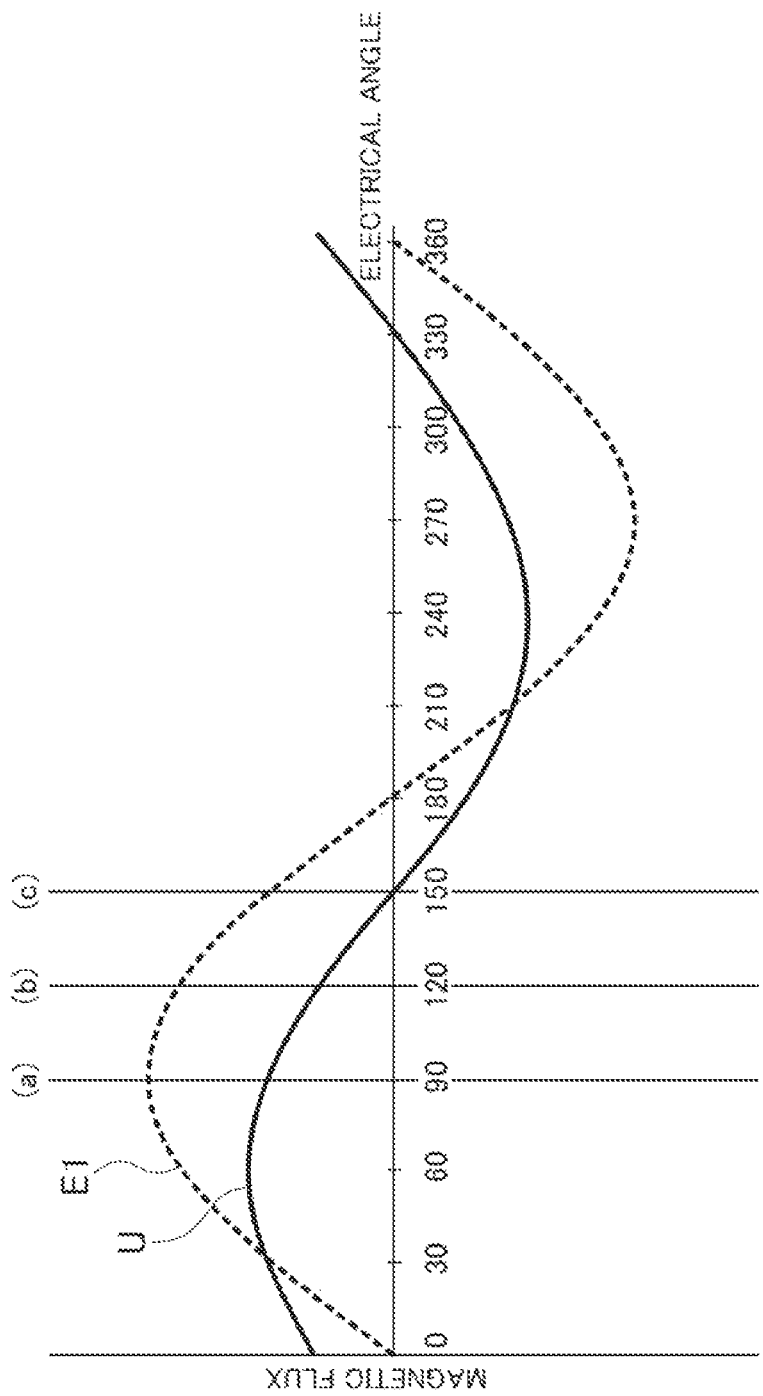

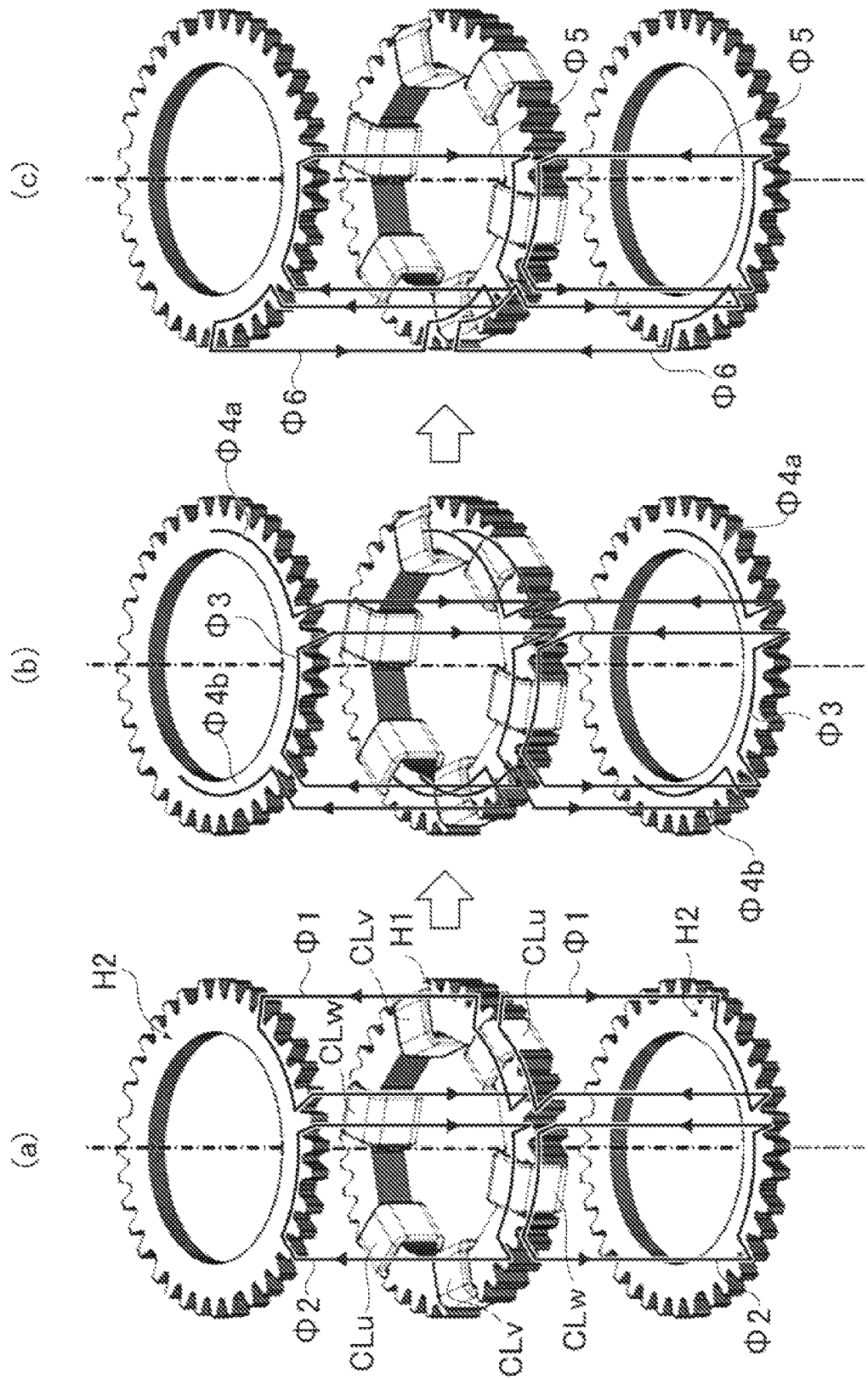

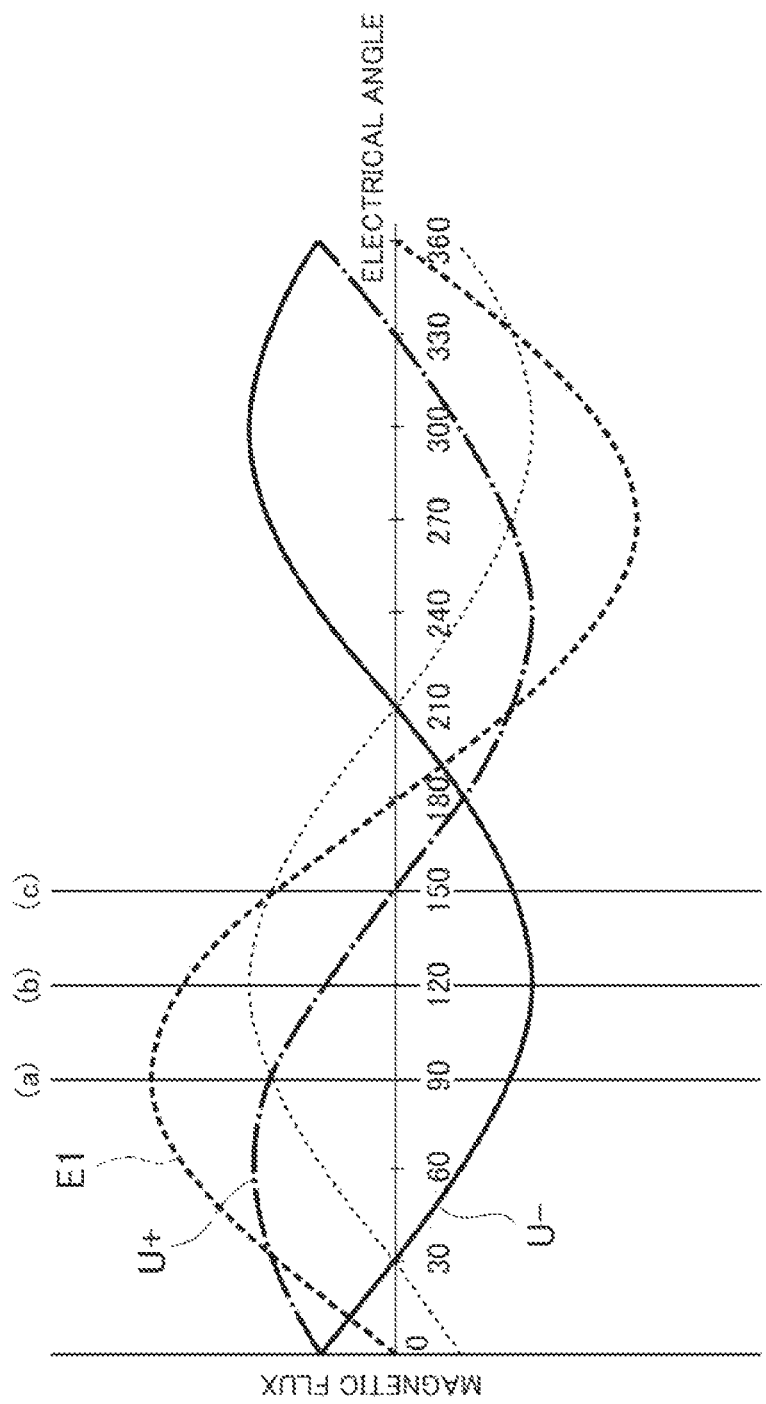

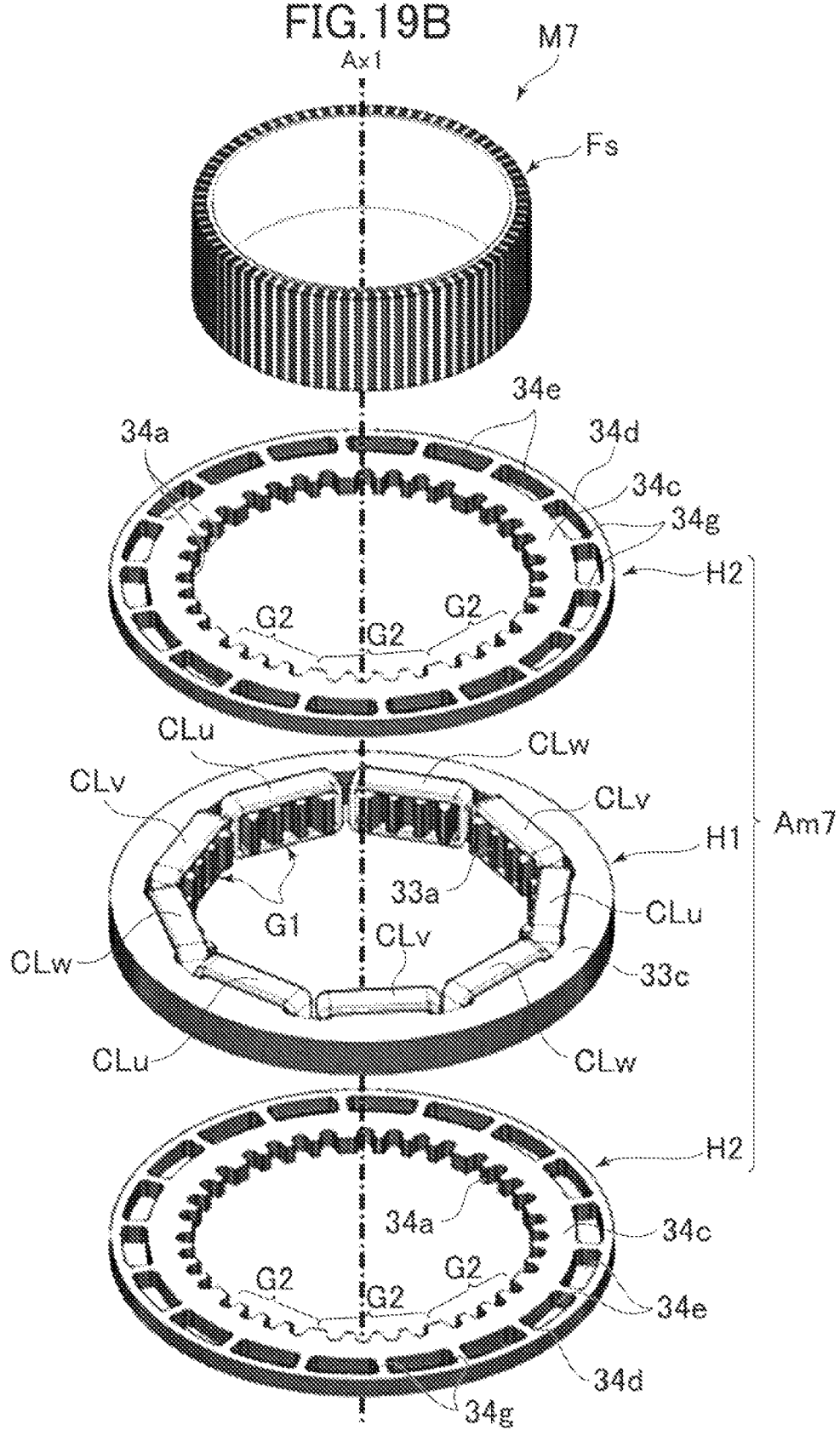

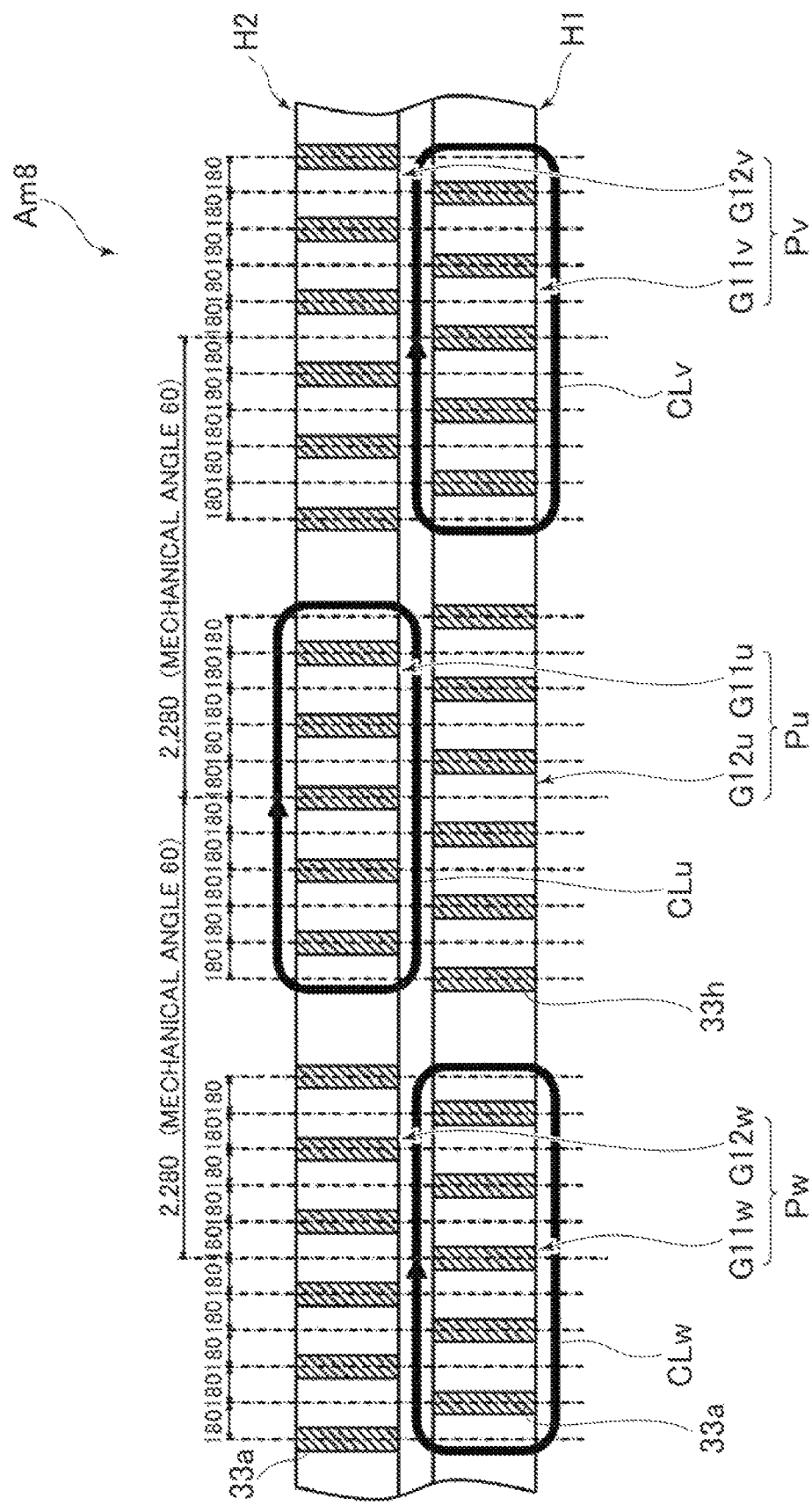

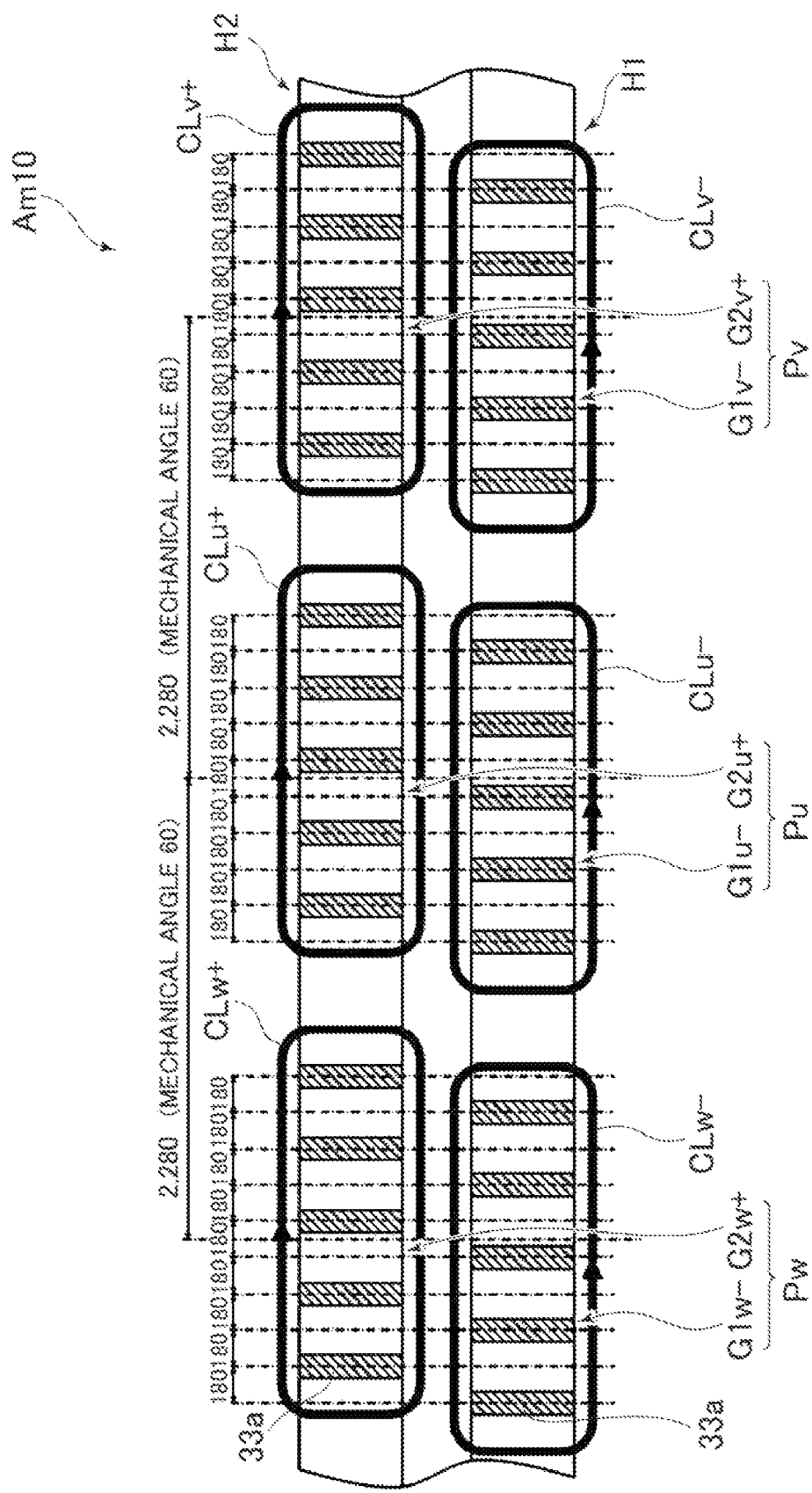

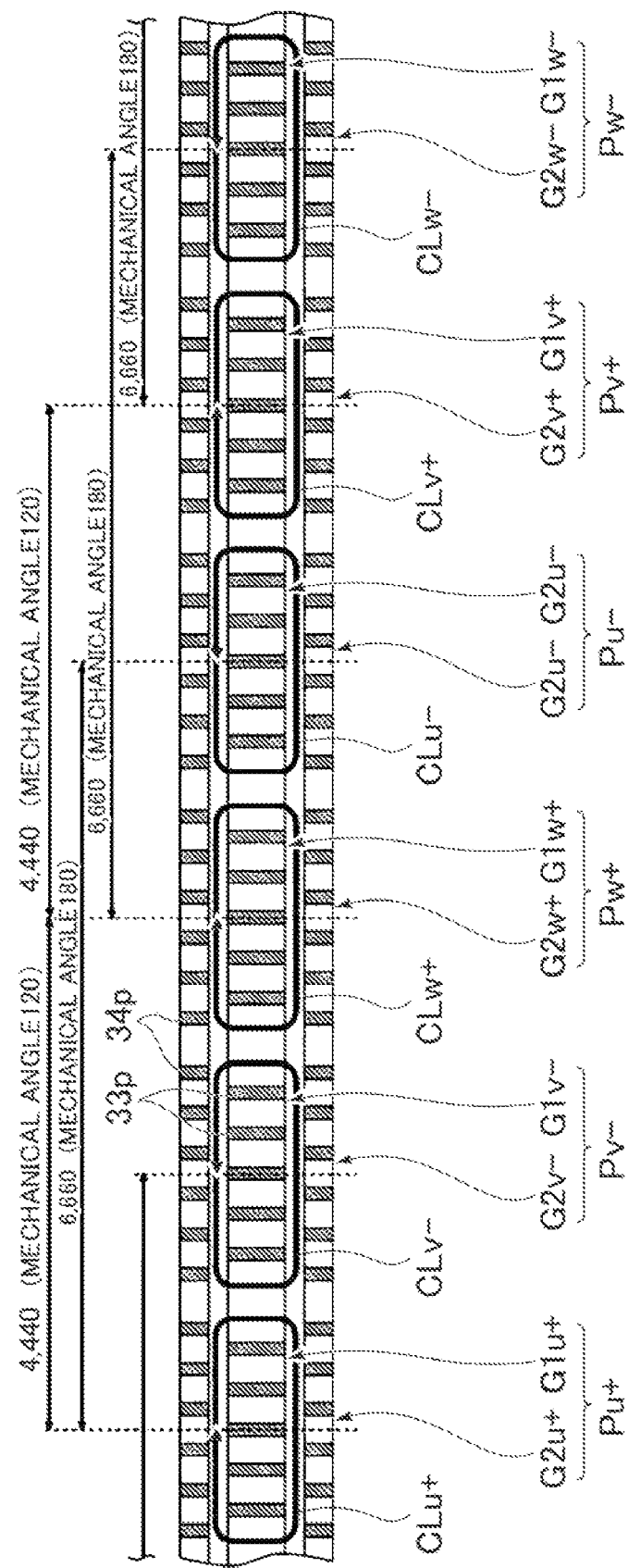

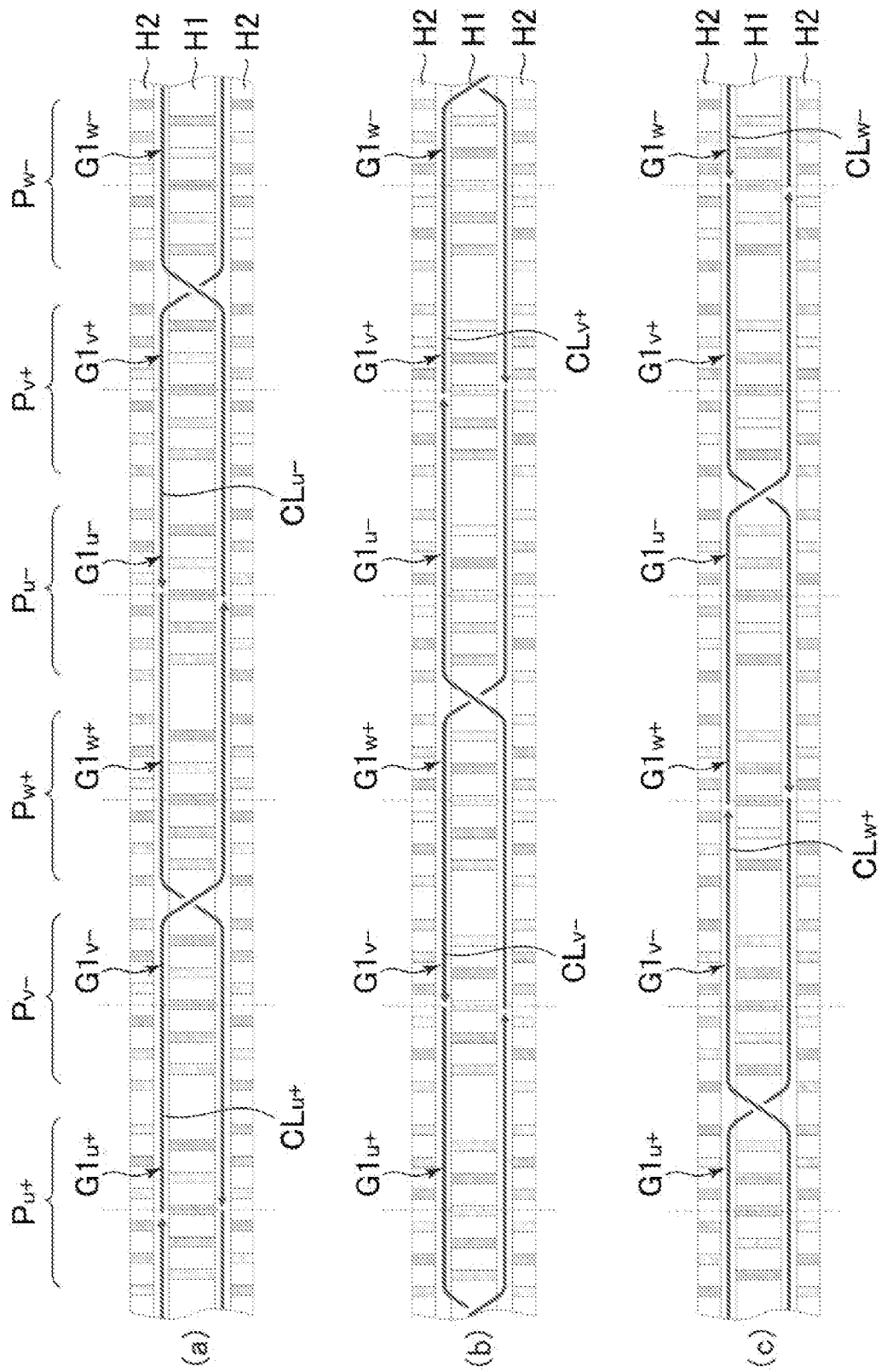

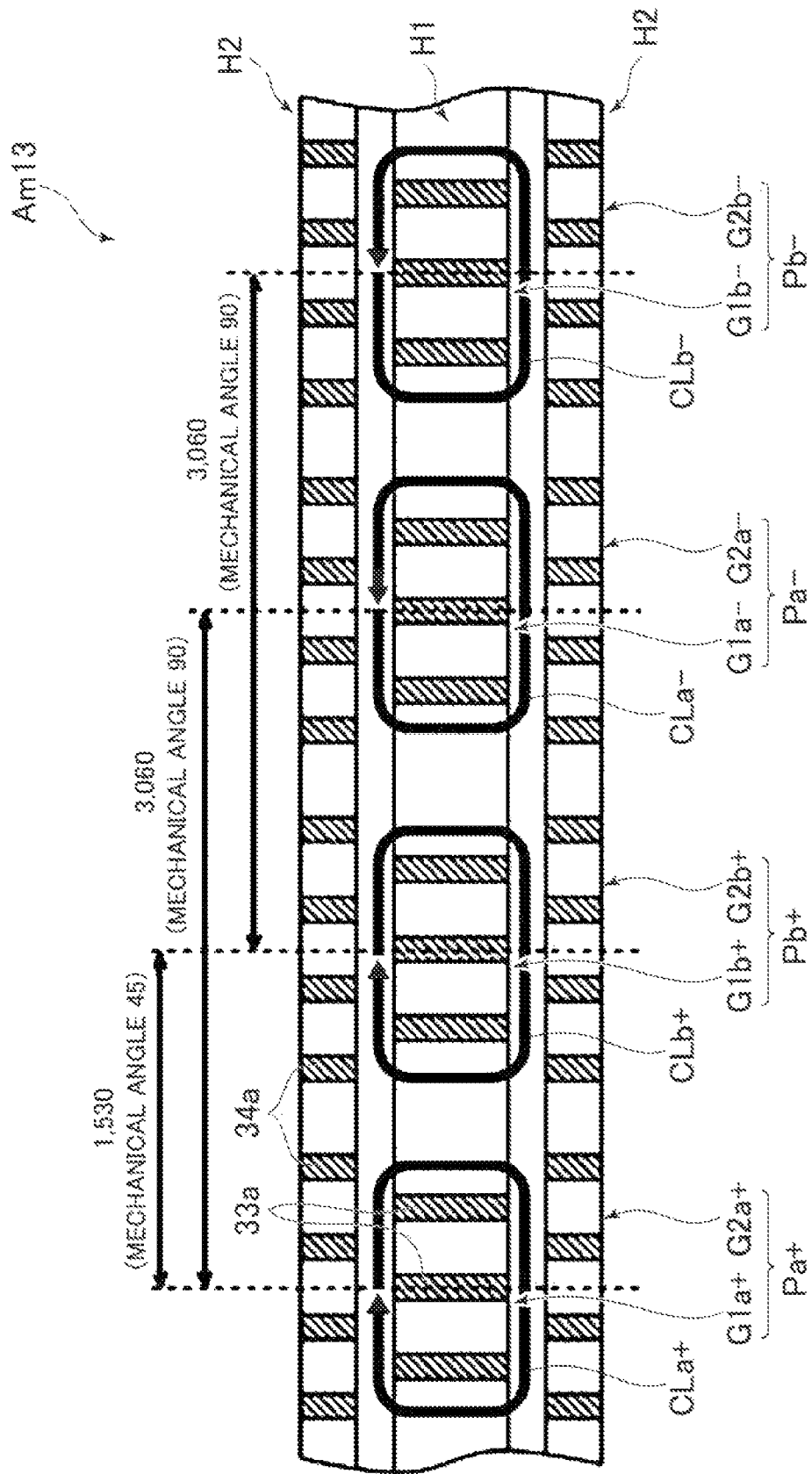

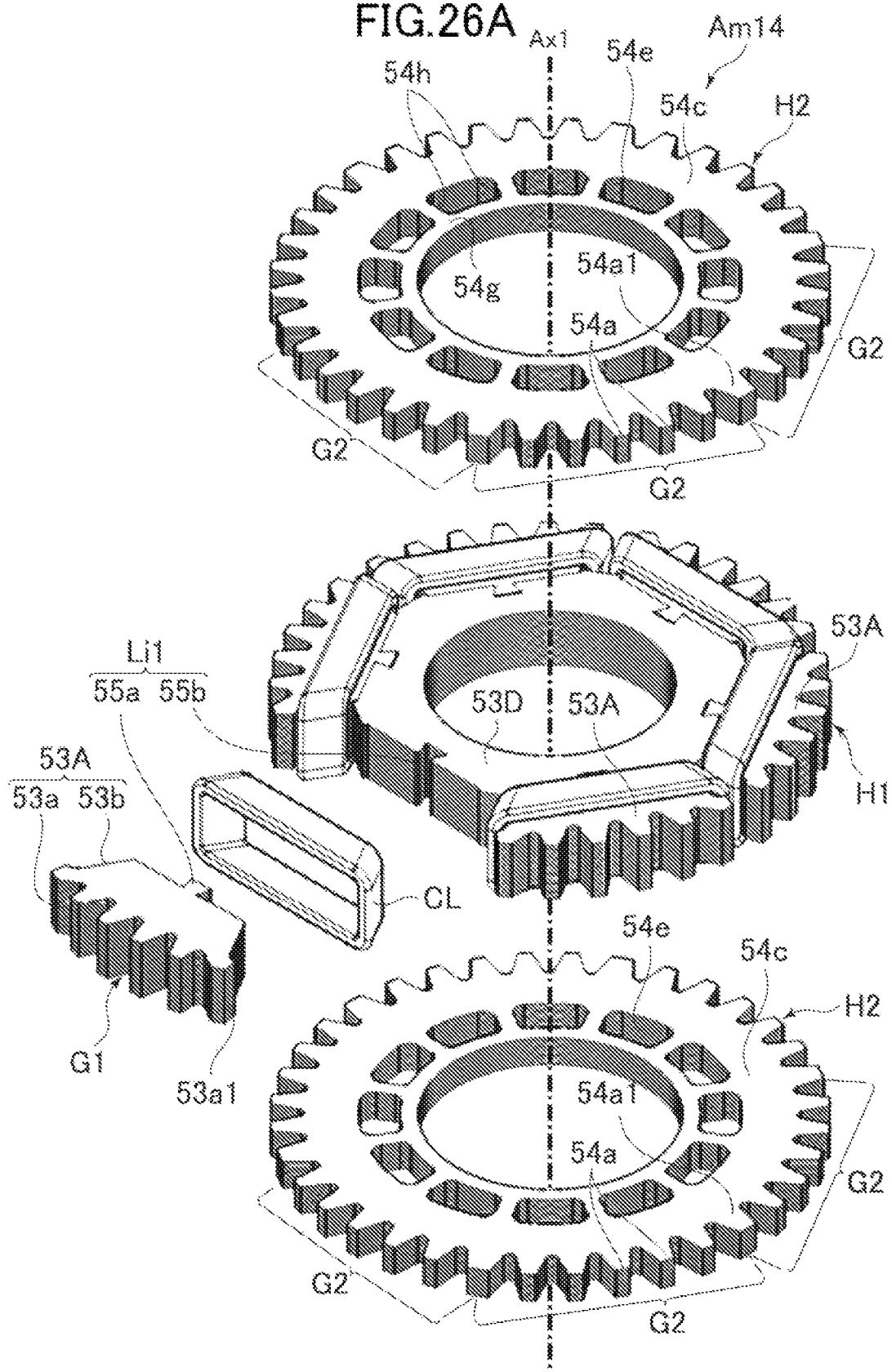

FIG.30
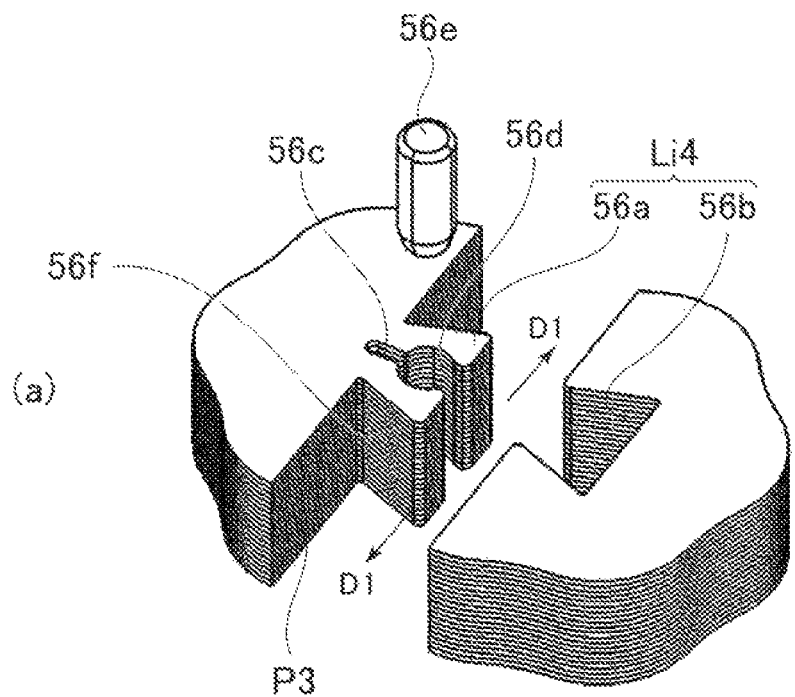
(a)
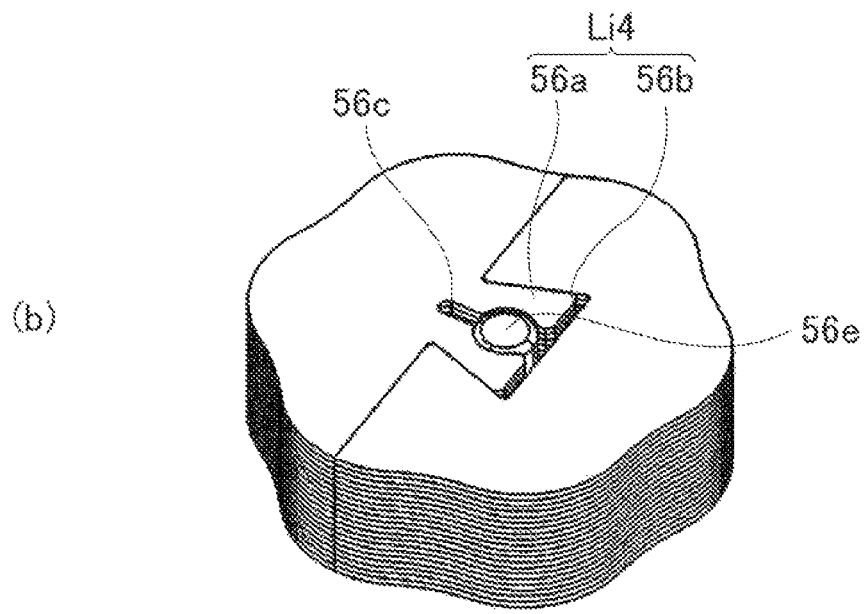
(b)

FIG.32
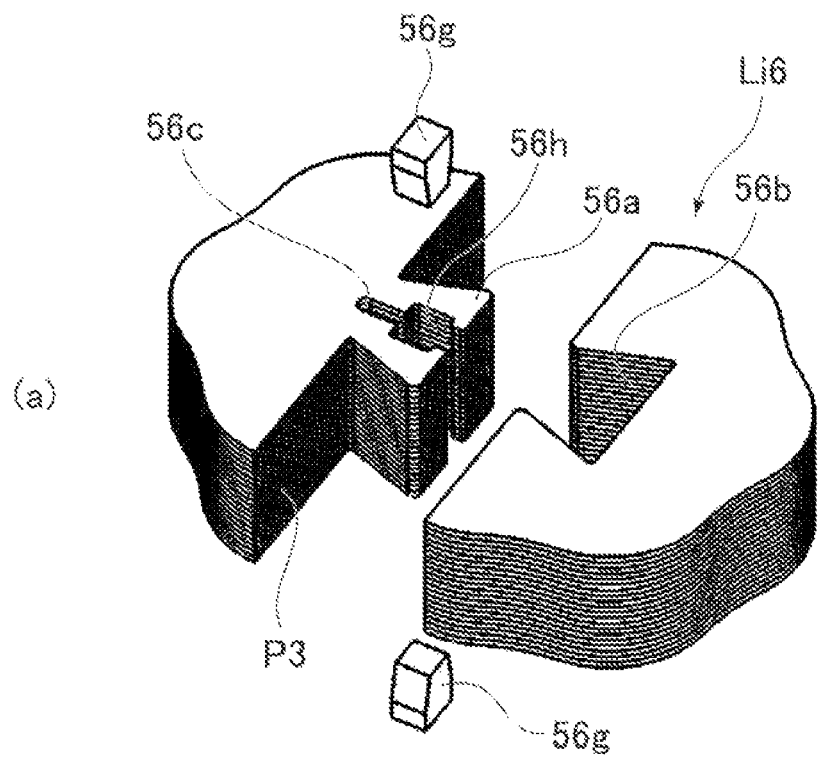
(a)
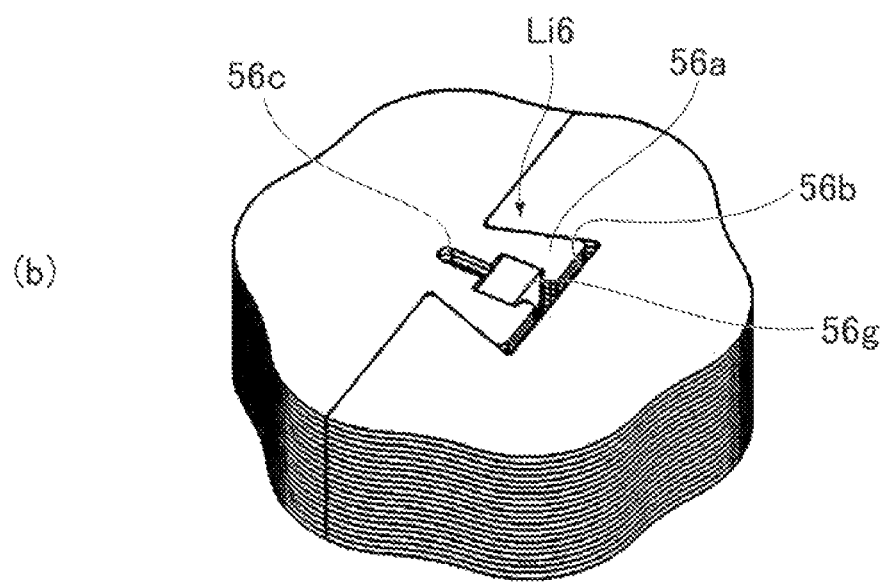
(b)

ARMATURE PORTION SIDE (INNER SIDE)

ARMATURE PORTION SIDE (OUTER SIDE)

ARMATURE PORTION SIDE (OUTER SIDE)

ARMATURE PORTION SIDE (OUTER SIDE)

ARMATURE PORTION SIDE (INNER SIDE)

ARMATURE PORTION SIDE (OUTER SIDE)

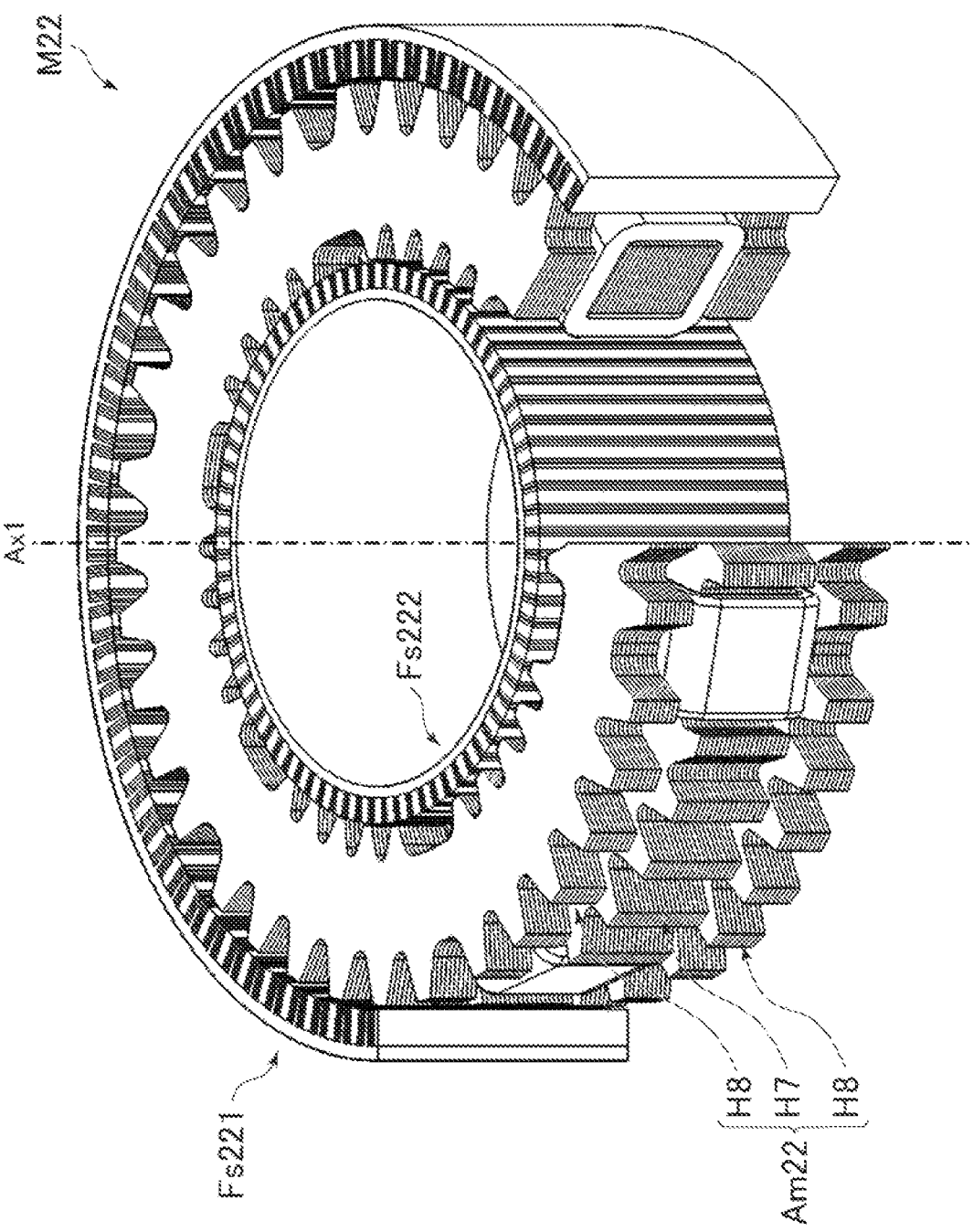

FIG.59B
(a)
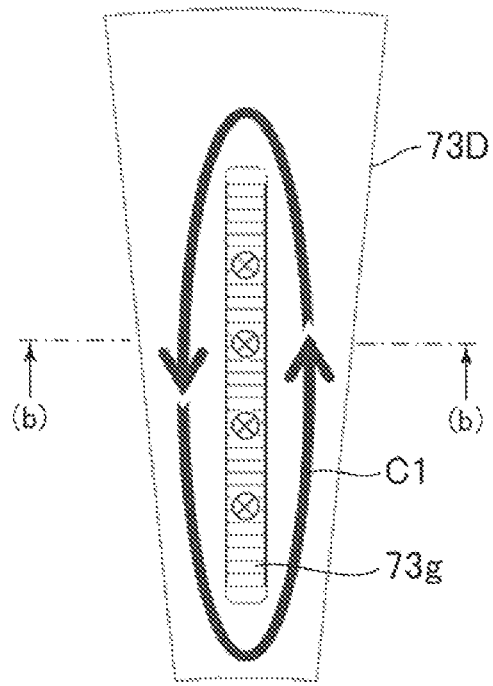
(b)
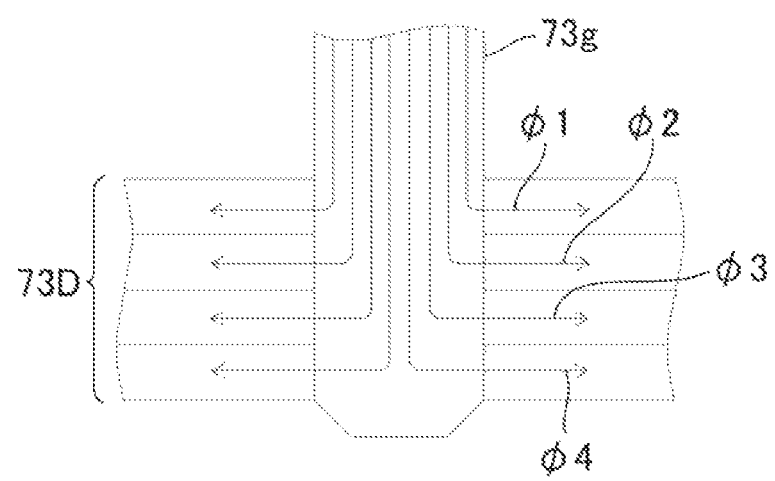

FIG.59G
(a) 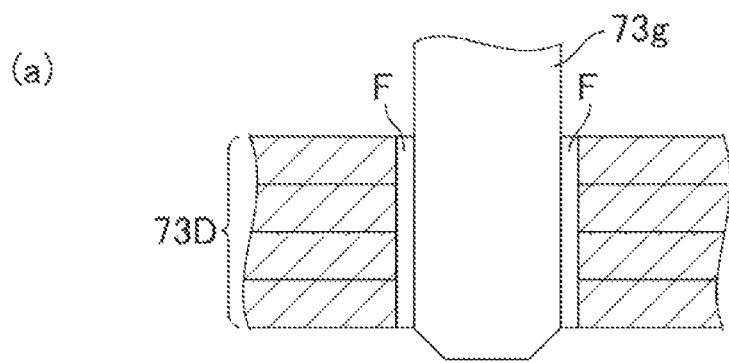
(b) 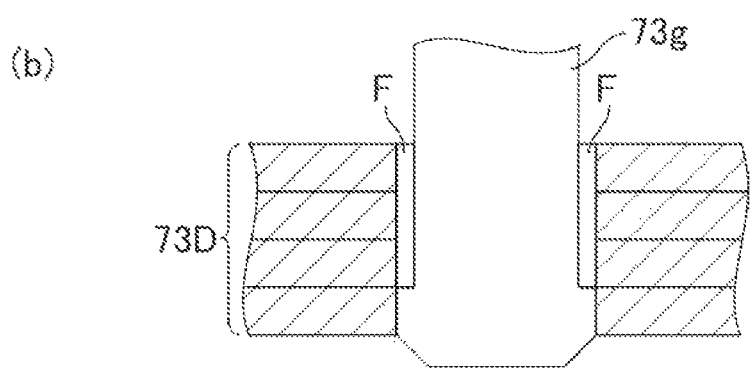
(c) 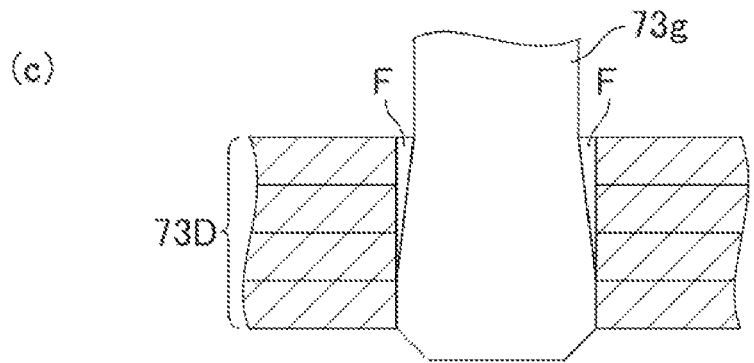

FIG.59J
(a)
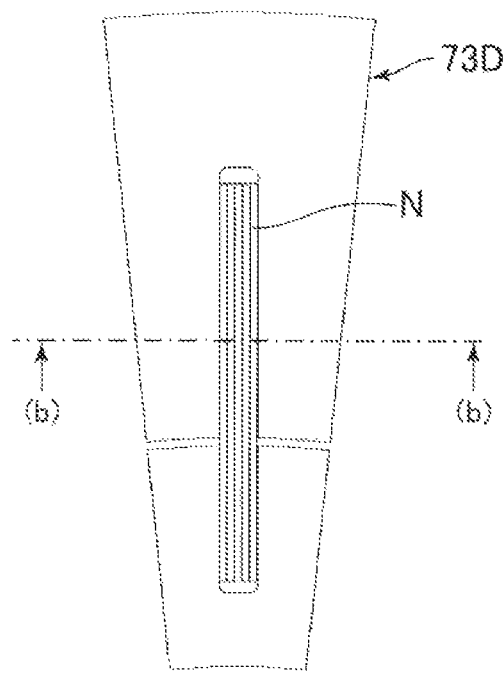
(b)
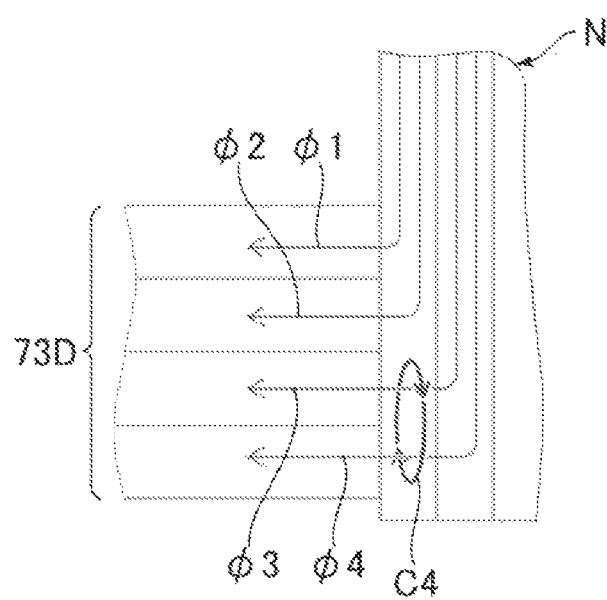

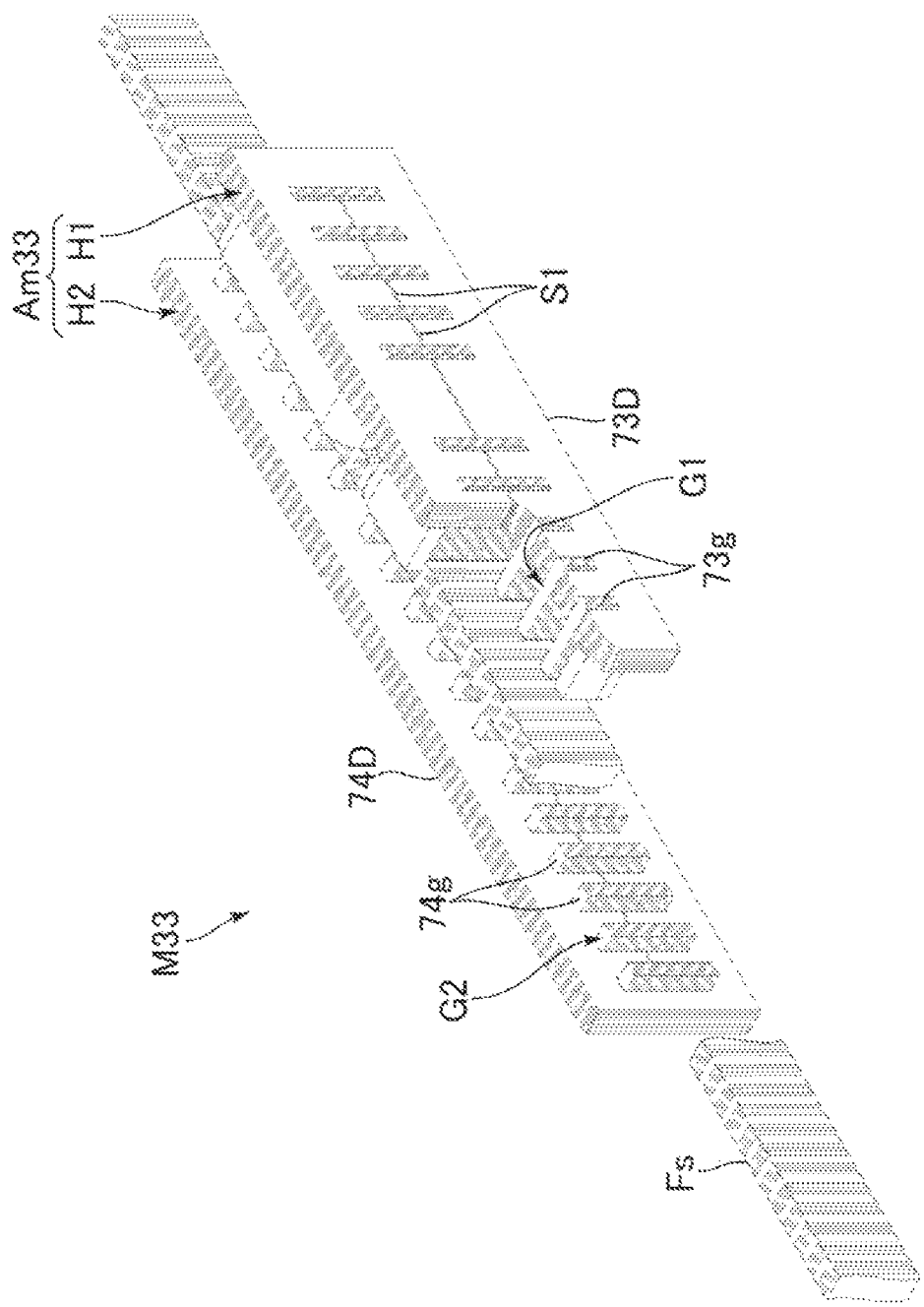

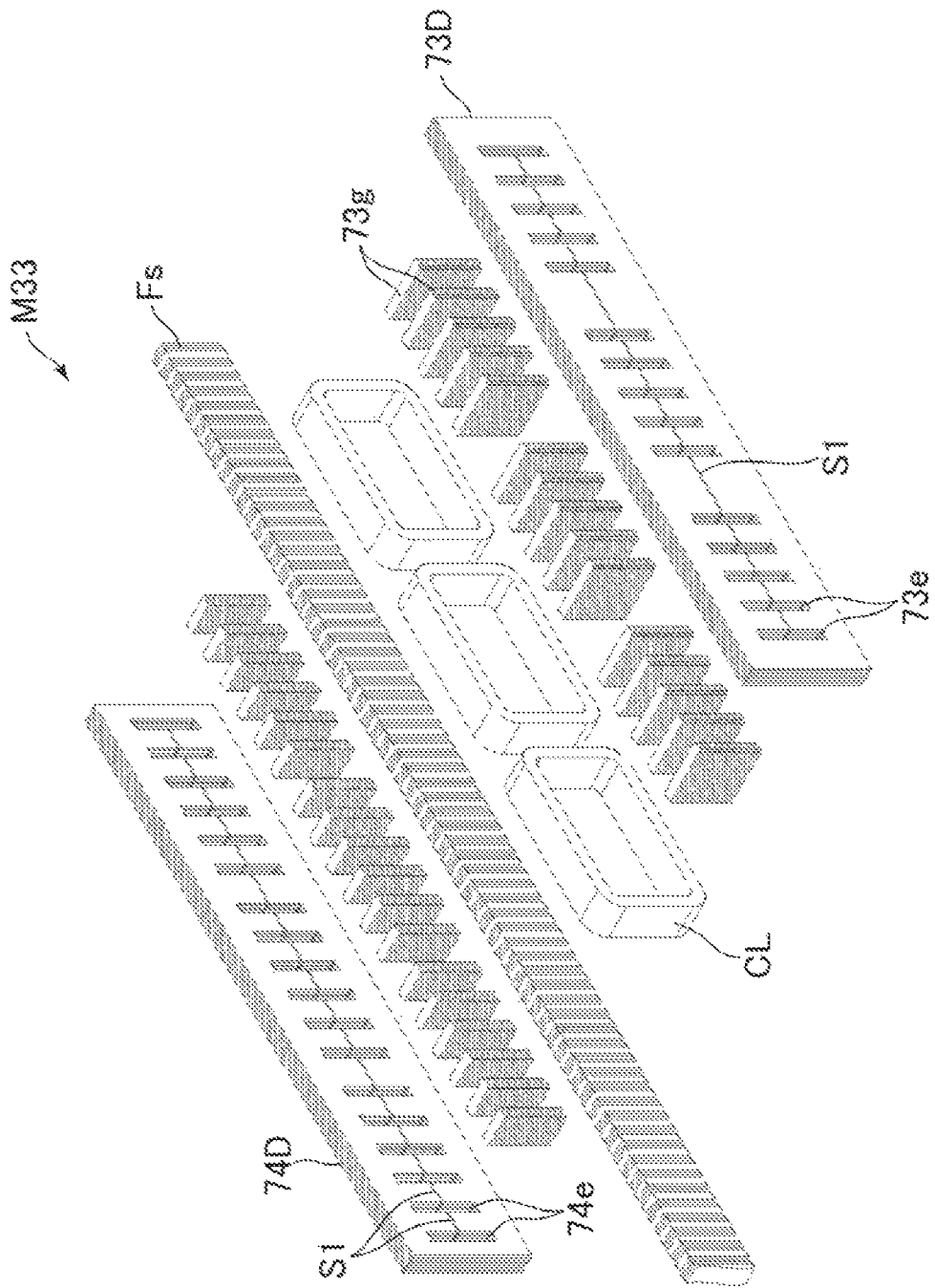

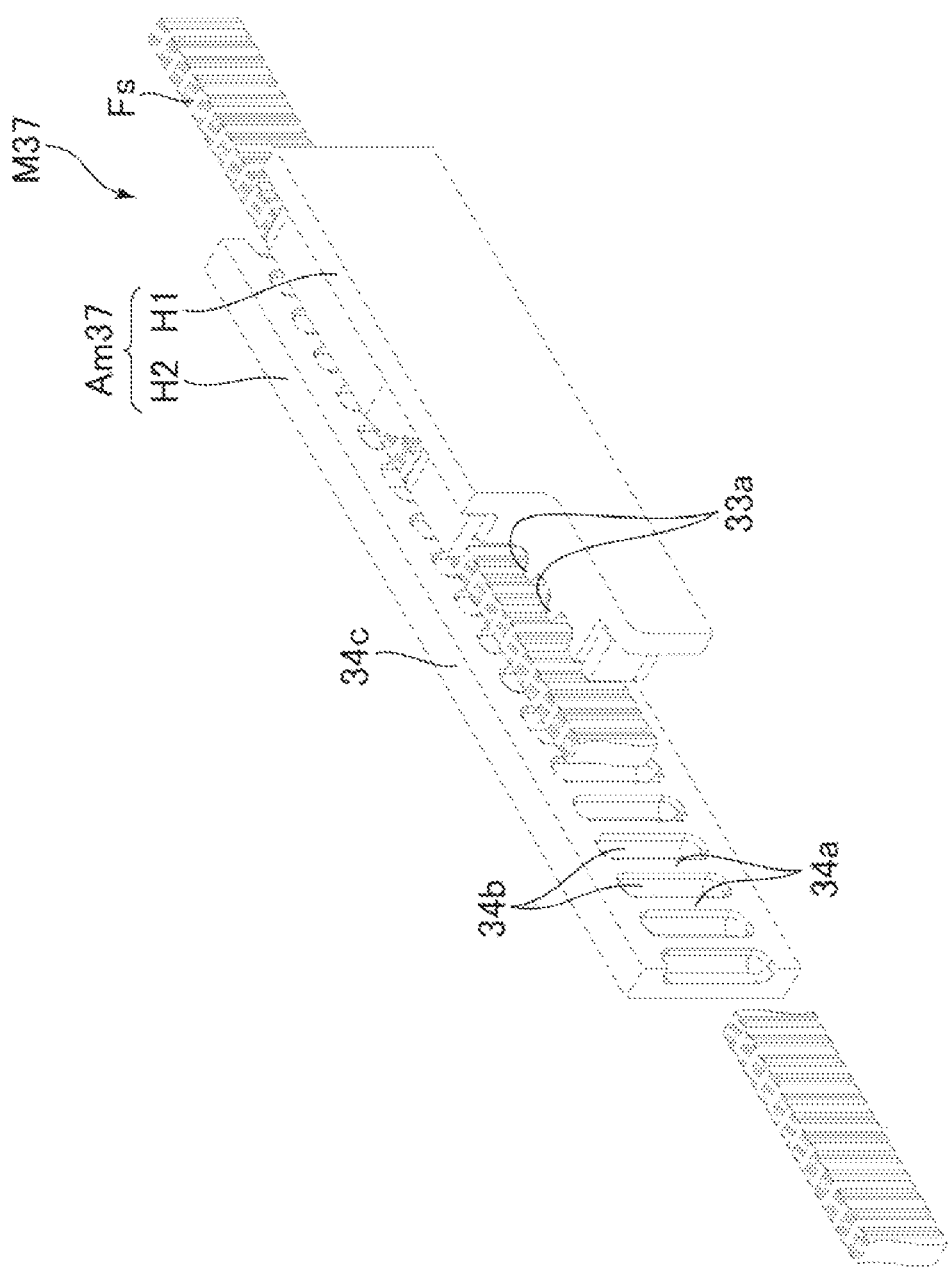

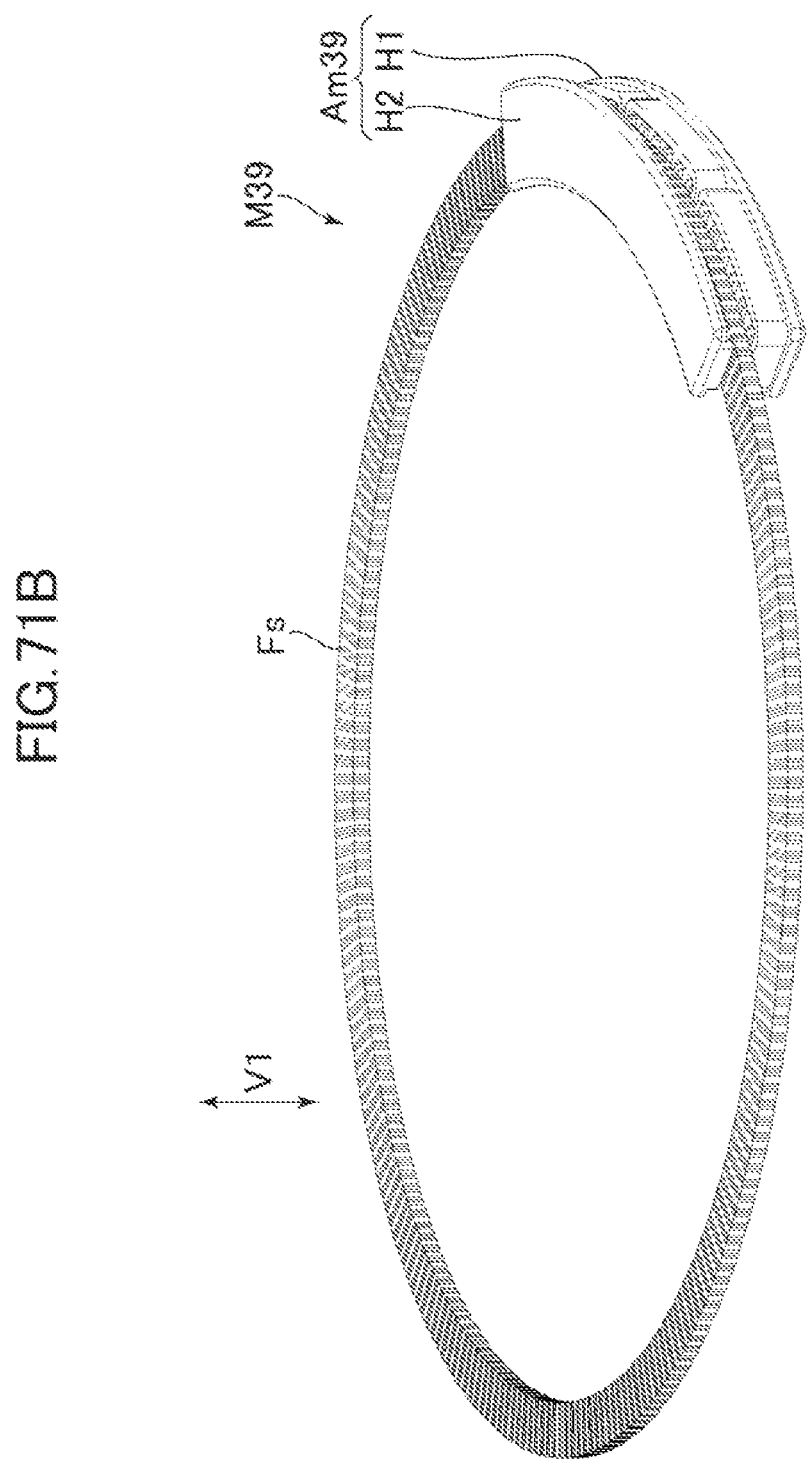

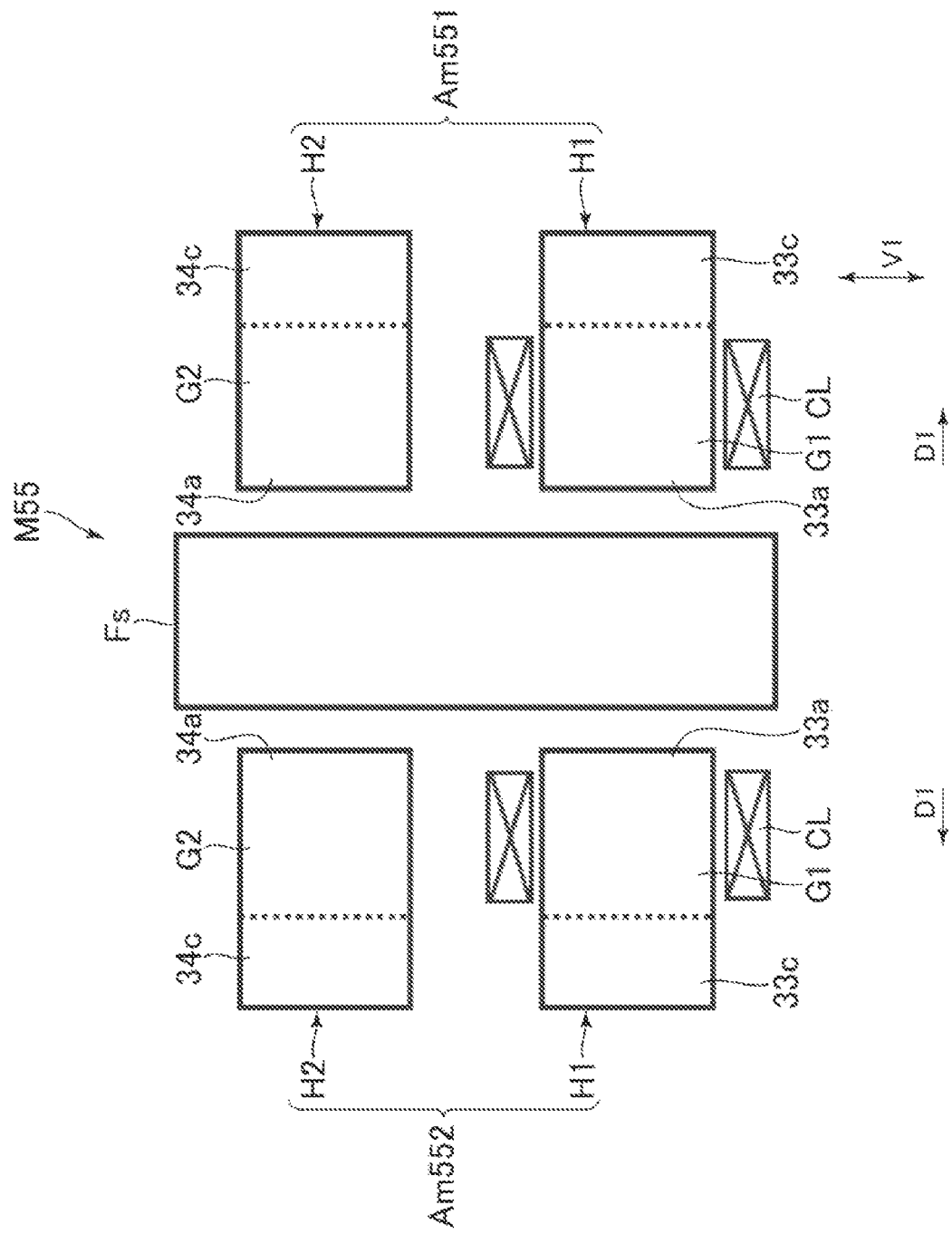

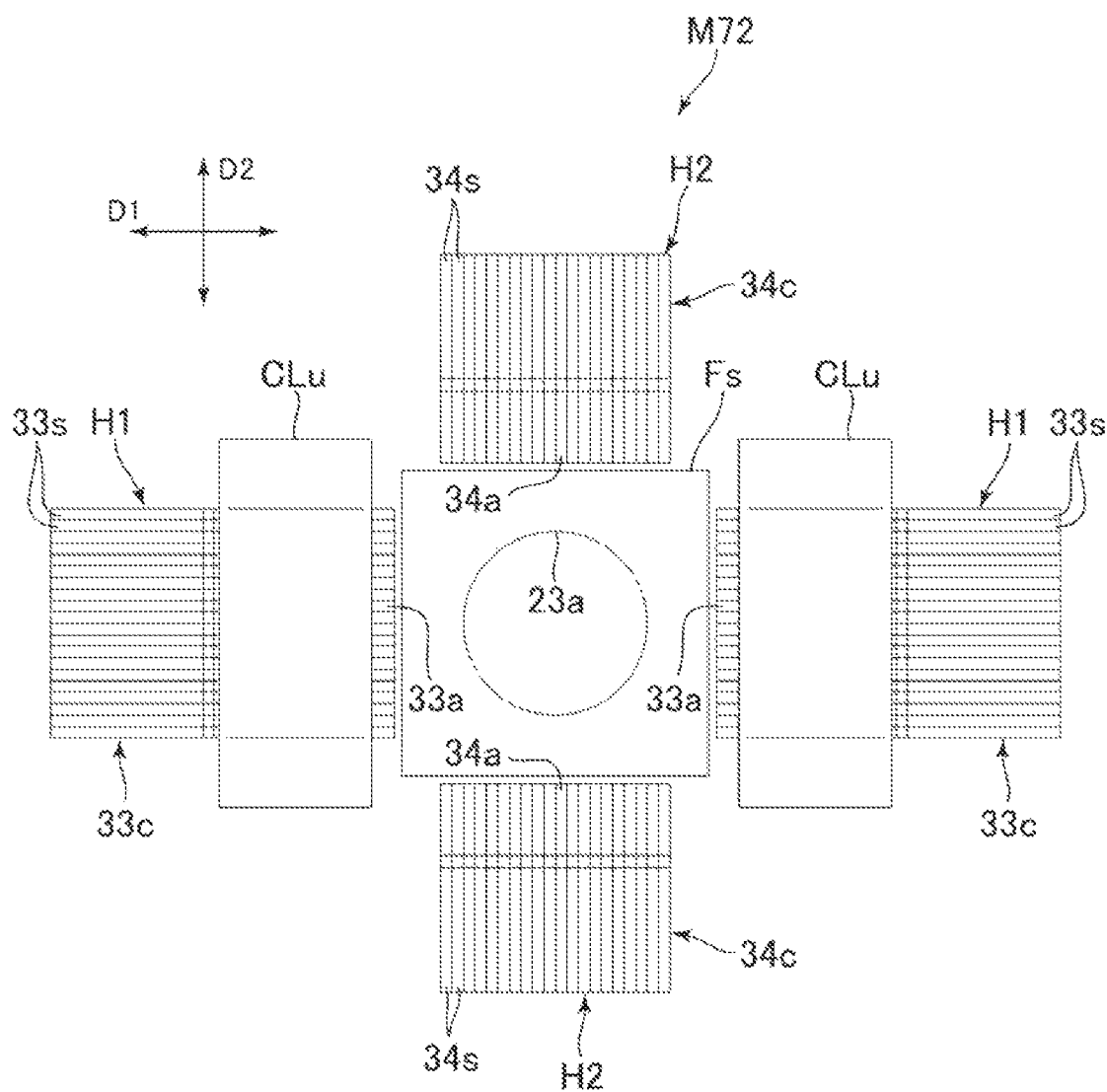

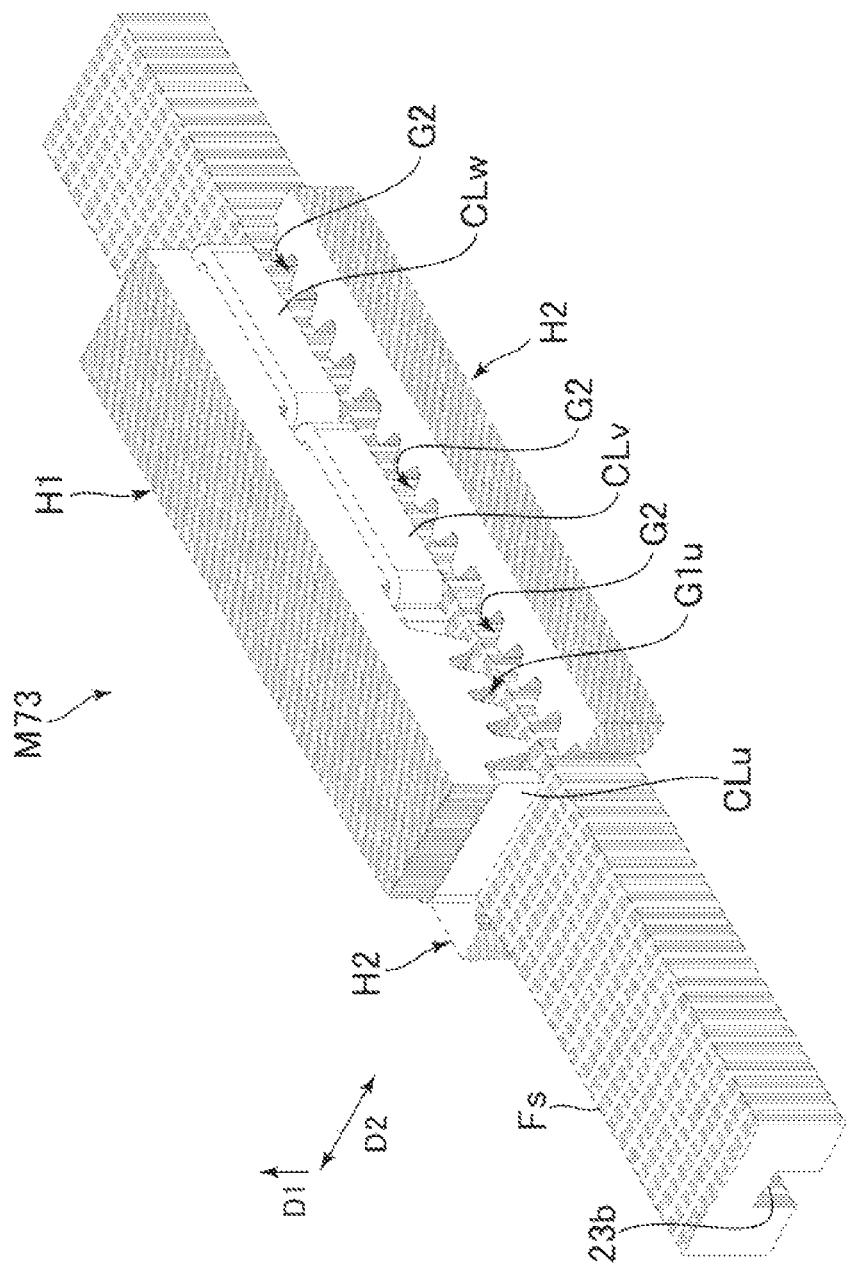

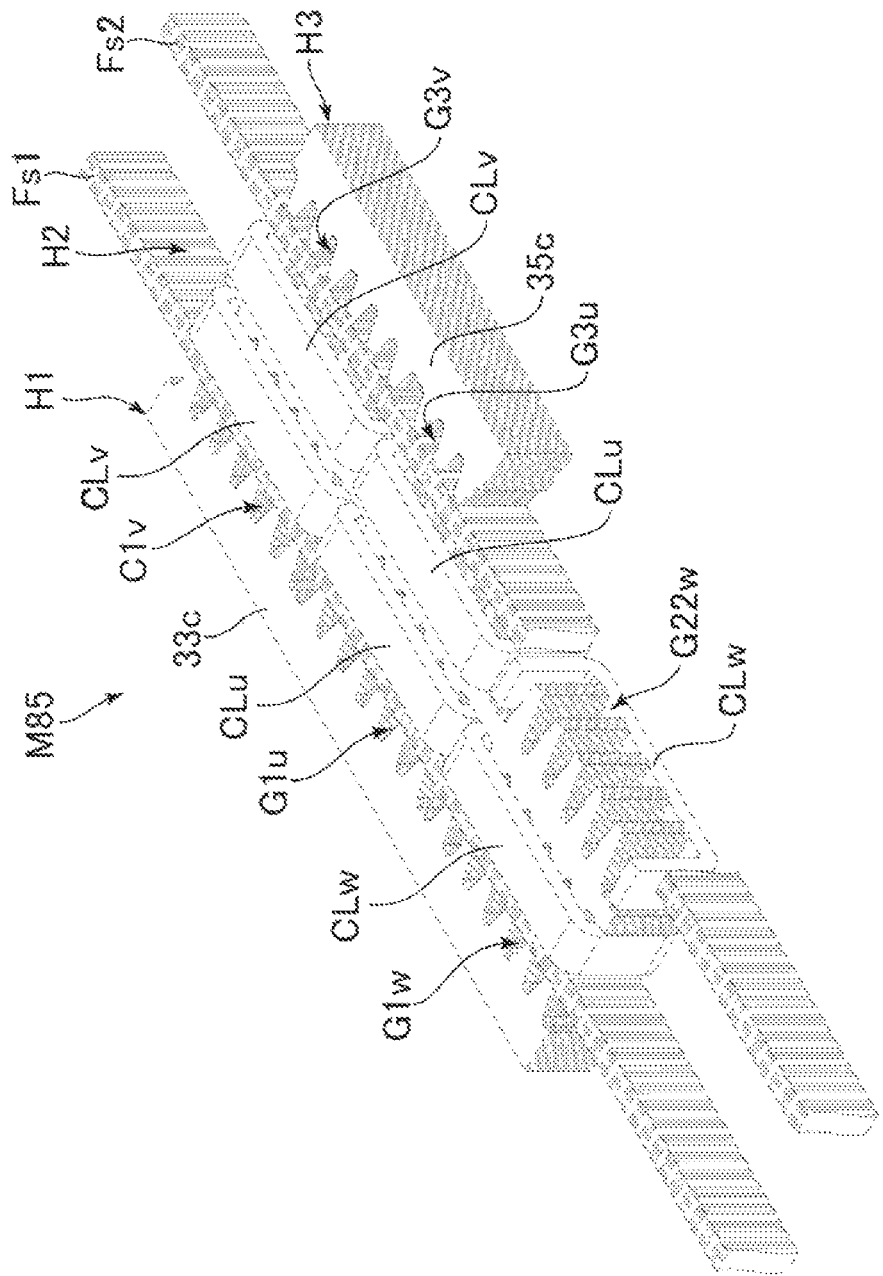

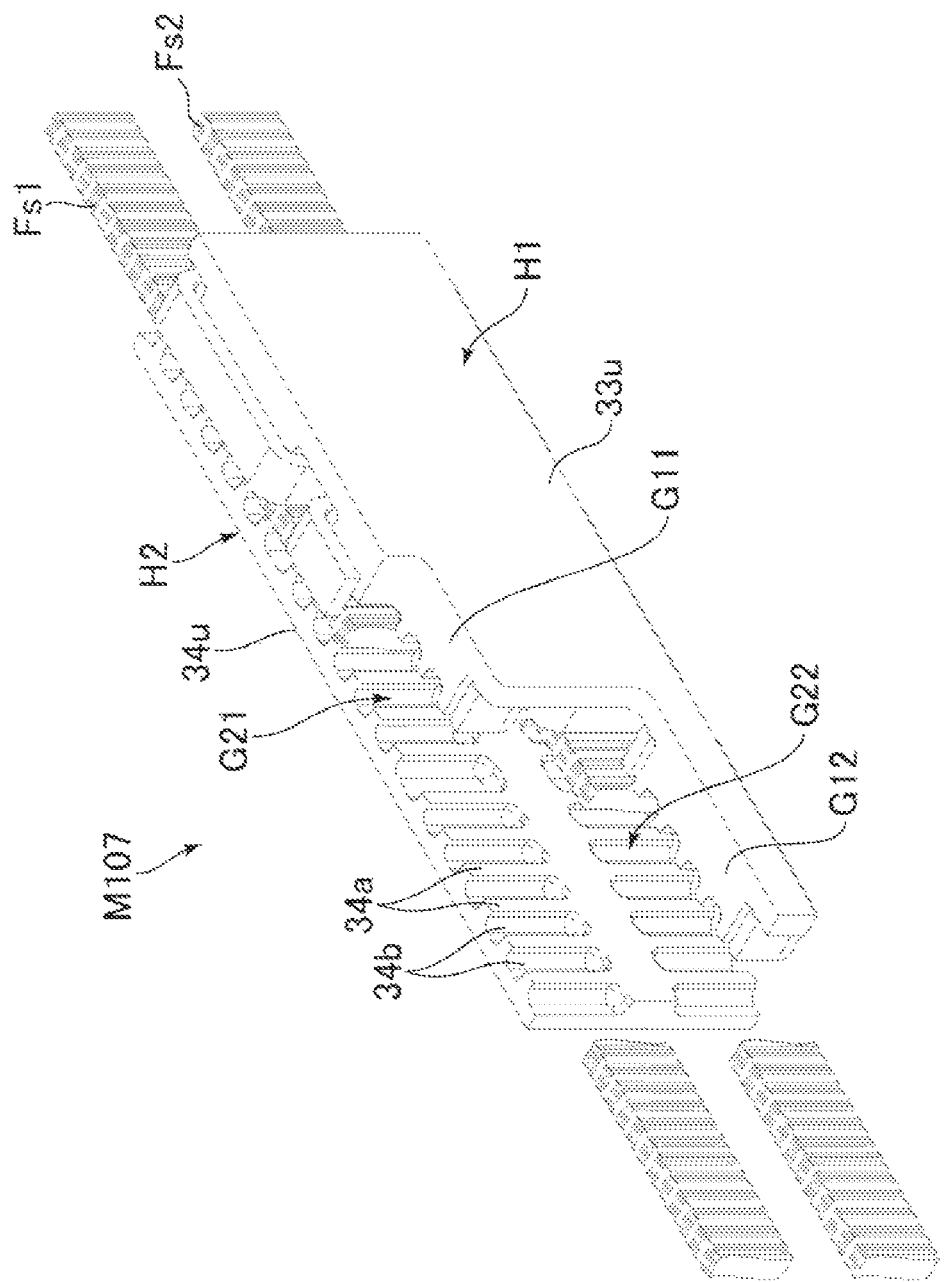

ELECTRIC MACHINE AND MAGNETIC FIELD PORTION

CROSS REFERENCE TO RELATED APPLICATIONS

This application is a National Stage of International Application No. PCT/JP2020/026303 filed on Jul. 3, 2020, which claims priority from Japanese Patent Application 2019-125254, filed on Jul. 4, 2019. The contents of the above document is incorporated herein by reference in its entirety.

TECHNICAL FIELD

The present disclosure relates to an electric machine and a magnetic field portion.

BACKGROUND ART

In Patent Literature documents 1 to 3, the stator core has a plurality of core portions arranged in the rotation direction. A plurality of coils are respectively provided in the core portions. Each core portion includes two plate-like portions facing each other in the axis direction, and a plurality of magnetic poles protruding radially from each of the two plate-like portions. The two plate-like portions facing each other in the axis direction are magnetically coupled, and the magnetic circuit is formed by the two plate-like portions and the magnet provided in the rotor.

For example, in Patent Literature 1, two stator plates 15 facing each other in the axis direction and magnetically coupled by the bridging cores 10. The magnetic poles (claw poles 12, 13) projecting radially are formed on the respective stator plates 15. Also in Patent Literature 2, the pole teeth 23 and 27 facing the rotor are respectively formed on the magnetic pole plates 21 and 25 that axially faces each other. The magnetic pole plates 21 and 25 are magnetically coupled by the magnetic pole core 22d extending in the axis direction. Also in Patent Literature 3, the upper layer portion 2a and the lower layer portion 2b of the stator laminated iron core 2 faces each other in the axis direction, and the projecting portions 2c and 2d (magnetic poles) are respectively formed in the upper layer portion 2a and the lower layer portion 2b. The upper layer portion 2a and the lower layer portion 2b are magnetically coupled by the stator powdered iron core 1 extending in the axis direction.

CITATION LIST

Patent Literature

Patent Literature 1: JP2003-513599A
Patent Literature 2: JP2007-306745A
Patent Literature 3: JP2007-185087A

SUMMARY OF INVENTION

Technical Problem

In the structures disclosed in Patent Literatures 1, 2, and 3, the two axially facing plate-like portions are magnetically coupled at axially extending portions thereof, thereby forming the closed magnetic circuit. In such a magnetic circuit, the arrangement of the two plate-like portions is largely limited, and freedom in the structure is small. This has made it difficult, for example, to increase the torque while satisfying the requirements with respect to the outer shape of the rotary electric machine.

Solution to Problem (1) An electric machine proposed in this disclosure includes an armature portion including a plurality of armature cores and a plurality of coils attached to at least one of the plurality of armature cores and at least one magnetic field portion that is relatively movable to the armature portion and includes a plurality of magnets and a plurality of magnetic field cores, where each magnet is disposed between two magnetic field cores adjacent in a machine moving direction, the machine moving direction being a direction of the relative movement between the armature portion and the at least one magnetic field portion. The plurality of armature cores are spaced apart from one another in a direction intersecting with the machine moving direction, and each of the plurality of armature cores includes a plurality of magnetic pole groups, and each of the plurality of magnetic pole groups includes at least one magnetic pole. The plurality of armature cores include two armature cores. The magnetic pole group included in one armature core of the two armature cores and the magnetic pole group included in the other armature core two armature cores constitute a magnetic pole group pair that forms a magnetic path, the magnetic path including the at least one magnetic field portion between the two magnetic pole groups of the two armature cores. The two armature cores are magnetically separated. A closed magnetic circuit includes at least two magnetic pole group pairs. A magnetic flux formed by the magnets included in the magnetic path passes through at least one coil to flow in the at least two magnetic pole group pairs.

In the electric machine of (1), the two armature cores that constitute the magnetic circuit are magnetically separated, and thus, restrictions on the positions of the armature cores are reduced. This increases freedom in the structure of the electric machine. When the freedom of the structure increases, freedom in the external shape of the electric machine increases. As such, for example, a flat shape of the electric machine can be achieved. Further, while satisfying the requirements with respect to the external shape of the electric machine, it is possible to increase output power of the electric machine. Moreover, when the freedom of the structure is increased, the flow of the magnetic flux can be easily controlled in the armature core. This can increase freedom in selecting materials. For example, a lamination steel can be easily used instead of the powder core. The structure of the electric machine proposed in this disclosure may be applied to a rotary electric machine or a linear electric machine. The rotary electric machine may be a radial gap type, in which the armature portion and the magnetic field portion face each other in the radial direction, or an axial gap type, in which the armature portion and the magnetic field portion face each other in the axis direction. Further, the armature portion may be fixed and the magnetic field portion may be movable, or the magnetic field portion may be fixed and the armature portion may be movable.

(2) In the electric machine of (1), the plurality of armature cores include a first armature core and a second armature core. The plurality of magnetic pole groups of the first armature core includes a first magnetic pole group and a second magnetic pole group, where the first magnetic pole group and the second magnetic pole group are spaced apart in the machine moving direction and magnetically coupled. The plurality of magnetic pole groups of the second armature core includes a third magnetic pole group and a fourth magnetic pole group as the plurality of magnetic pole groups, where the third magnetic pole group and the fourth magnetic pole group are spaced apart in the machine moving direction and magnetically coupled. The first magnetic pole group and the third magnetic pole group may form the magnetic pole group pair as a first magnetic pole group pair. The second magnetic pole group and the fourth magnetic pole group may form the magnetic pole group pair as a second magnetic pole group pair. The closed magnetic circuit may include the first magnetic pole group pair and the second magnetic pole group pair. This structure eliminates the need of magnetically separating the first magnetic pole group and the second magnetic pole group of the armature core. As such, the strength of the armature cores can be increased, and the accuracy of assembly and positioning of the magnetic poles can be increased. This structure of the electric machine proposed in this disclosure may be also applied to a rotary electric machine or a linear electric machine. The rotary electric machine may be a radial gap type or an axial gap type. Further, the armature portion may be fixed and the magnetic field portion may be movable, or the magnetic field portion may be fixed and the armature portion may be movable.

(3) In the electric machine of (1), the plurality of armature cores may include a first armature core, a second armature core, and a third armature core. The plurality of magnetic pole groups of the first armature core may include a first magnetic pole group and a second magnetic pole group, where the first magnetic pole group and the second magnetic pole group are spaced apart in the machine moving direction and magnetically coupled. The plurality of magnetic pole groups of the second armature core may include a third magnetic pole group, a fourth magnetic pole group, a fifth magnetic pole group, and a sixth magnetic pole group, where the third magnetic pole group and the fourth magnetic pole group are spaced apart in the machine moving direction, and the fifth magnetic pole group and the sixth magnetic pole group are spaced apart in the machine moving direction. The third magnetic pole group and the fifth magnetic pole group may be arranged in a direction intersecting with the machine moving direction and magnetically coupled, and the fourth magnetic pole group and the sixth magnetic pole group may be arranged in a direction intersecting with the machine moving direction and magnetically coupled. The plurality of magnetic pole groups of the third armature core may include a seventh magnetic pole group and an eighth magnetic pole group that are spaced apart in the machine moving direction. The at least one magnetic field portion may include a first magnetic field portion and a second magnetic field portion that are spaced apart in a direction intersecting with the machine moving direction. The first magnetic pole group and the third magnetic pole group may constitute, as a first magnetic pole group pair, the magnetic pole group pair that forms the magnetic path together with the magnetic field core and the magnet of the first magnetic field portion. The second magnetic pole group and the fourth magnetic pole group may constitute, as a second magnetic pole group pair, the magnetic pole group pair that forms the magnetic path together with the magnetic field core and the magnet of the first magnetic field portion. The fifth magnetic pole group and the seventh magnetic pole group may constitute, as a third magnetic pole group pair, the magnetic pole group pair that forms the magnetic path together with the magnetic field core and the magnet of the second magnetic field portion. The sixth magnetic pole group and the eighth magnetic pole group may constitute, as a fourth magnetic pole group pair, the magnetic pole group pair that forms the magnetic path together with the magnetic field core and the magnet of the second magnetic field portion. The closed magnetic circuit may include at least the first to fourth magnetic pole group pairs. This structure eliminates the need of magnetically the first magnetic pole group and the second magnetic pole group of the armature core. As such, the strength of the armature cores including the first magnetic pole group and the second magnetic pole group can be increased, and the accuracy of assembly and positioning of the magnetic poles can be increased. This structure of the electric machine proposed in this disclosure may be also applied to a rotary electric machine or a linear electric machine. The rotary electric machine may be a radial gap type or an axial gap type. Further, the armature portion may be fixed and the magnetic field portion may be movable, or the magnetic field portion may be fixed and the armature portion may be movable.

(4) In the electric machine of (1), the plurality of armature cores may include a first armature core and a second armature core that are spaced apart in a direction intersecting with the machine moving direction. The plurality of magnetic pole groups of the first armature core may include a first magnetic pole group and a second magnetic pole group, where the first magnetic pole group and the second magnetic pole group are arranged in a direction intersecting with the machine moving direction and magnetically coupled. The plurality of magnetic pole groups of the second armature core may include a third magnetic pole group and a fourth magnetic pole group, where the third magnetic pole group and the fourth magnetic pole group are arranged in a direction intersecting with the machine moving direction and magnetically coupled. The at least one magnetic field portion may include a first magnetic field portion and a second magnetic field portion that are spaced apart in a direction intersecting with the machine moving direction. The first magnetic pole group and the third magnetic pole group may constitute, as a first magnetic pole group pair, the magnetic pole group pair that forms the magnetic path together with the magnetic field core and the magnet of the first magnetic field portion. The second magnetic pole group may constitute a second magnetic pole group pair with the fourth magnetic pole group or another magnetic pole group that is different from the fourth magnetic pole group, where the second magnetic pole group pair is the magnetic pole group pair that forms the magnetic path together with the magnetic field core and the magnet of the second magnetic field portion. The closed magnetic circuit may include the first magnetic pole group pair and the second magnetic pole group pair. This structure of the electric machine proposed in this disclosure may be also applied to a rotary electric machine or a linear electric machine. The rotary electric machine may be a radial gap type or an axial gap type. Further, the armature portion may be fixed and the magnetic field portion may be movable, or the magnetic field portion may be fixed and the armature portion may be movable.

(5) In the electric machine according to (1) to (4), in each of the plurality of magnetic pole groups, the at least one magnetic pole may include a plurality of magnetic poles arranged in the machine moving direction. This structure serves to increase the driving force output by the electric machine (the driving force output is, for example, torque output by the rotary electric machine, and force output by the linear electric machine).

In the electric machine according to (1) to (5), the magnetic field portion and the armature portion may be relatively rotatable, and the machine moving direction may be a rotation direction. This serves to simplify the structure of the armature core, increase the strength of the armature core, and increase accuracy of assembly in the radial gap type rotary electric machine. Further, the freedom in selecting materials can be increased, for example, the armature core can be composed only of electrical steel sheets or a powder material in the radial gap type rotary electric machine.

(6) In the electric machine according to any one of (1) to (5), at least one of the plurality of armature cores may be formed of steel sheets laminated in a direction intersecting with the machine moving direction. This serves to prevent generation of induced current, and increase the driving force output by the electric machine (torque output by the rotary electric machine and force output by the linear electric machine). In this electric machine, the entire armature cores may be formed of lamination steel, or a part of the armature cores may be formed of lamination steel and the other part may be composed of powder materials.

(7) In the electric machine according to any one of (1) to (6), the at least one magnetic pole of each of the plurality of magnetic pole groups may have a shape projecting toward the magnetic field portion.

(8) In the electric machine according to any one of (1) to (7), at least one of the plurality of armature cores may include, in the at least one magnetic pole, a body having a shape projecting toward the magnetic field portion and a projecting portion extending from the body in a direction intersecting with the machine moving direction. This structure serves to reduce the magnetoresistance between the armature portion and the magnetic field portion. Further, this structure serves to alleviate the magnetic saturation of the magnetic field core because the projecting portion can function as a part of the flow path of the magnetic flux flowing in the magnetic field core in a direction intersecting with the machine moving direction.

(9) In the electric machine according to any one of (1) to (8), at least one of the plurality of armature cores may include a plurality of partial armature cores that are formed separately and coupled together. According to this structure, as compared with the case where the entire armature core is formed integrally, the yield of the core material at the time of manufacturing the armature core can be improved.

(10) In the electric machine according to any one of (1) to (9), at least one of the plurality of armature cores may include a yoke partial core that includes steel sheets laminated in a direction toward the magnetic field portion, and the magnetic pole may include steel sheets laminated in a direction perpendicular to a lamination direction of the steel sheets included in the yoke partial core. This serves to expand the application of lamination steel while preventing generation of induced current, and increase the driving force output by the electric machine (torque output by the rotary electric machine and force output by the linear electric machine). In this electric machine, the entire armature cores may be formed of lamination steel, or a part of the armature cores may be formed of lamination steel and the other part may be composed of powder materials.

(11) In the electric machine according to any one of (1) to (10), a number of phases of the electric machine may be an odd number of three or more. The armature portion may include one coil or two or more coils having a same winding direction for each phase. The plurality of armature cores may include a No.11 armature core and a No.12 armature core. The plurality of magnetic pole groups of the No.11 armature core may include a No.11 magnetic pole group and a No.12 magnetic pole group that are spaced apart in the machine moving direction. The plurality of magnetic pole groups of the No.12 armature core may include a No.13 magnetic pole group and a No.14 magnetic pole group that are spaced apart in the machine moving direction. The No.11 magnetic pole group and the No.13 magnetic pole group may constitute a No.11 magnetic pole group pair. The No.12 magnetic pole group and the No.14 magnetic pole group may constitute a No.12 magnetic pole group pair. The coil may be provided to each of the No.11 magnetic pole group pair and the No.12 magnetic pole group pair. When an angle between two magnetic field cores that are adjacent and have a same polarity is 360 degrees in electrical angle, the No.11 magnetic pole group pair and the No.12 magnetic pole group pair may be located away from each other substantially by $360\times(n+m/s)$ degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

(12) In the electric machine of (11), the magnetic field portion and the armature portion may be relatively rotatable, and when (a number of phases of magnetic field portion)/2 is defined as "p", and a number of coils of each phase is defined as "c", "$(360/p)\times(n+m/s)$" may be substantially equal to "$360/s/c$". This allows the magnetic flux of the magnets to be efficiently directed to the armature core, thereby increasing the magnetic flux passing through the coils and obtaining high torque. The magnetic pole pairs can be arranged evenly in the rotation direction and the unbalance of magnetic force can be reduced, thus reducing cogging torque, torque ripple, vibration, and noise.

(13) In the electric machine according to any one of (1) to (10), a number of phases of the electric machine is an odd number of three or more. The armature portion includes a coil pair for each phase, where the coil pair is constituted by two coils having different winding directions. The plurality of armature cores include a No.11 armature core and a No.12 armature core. The plurality of magnetic pole groups of the No.11 armature core includes a No.11 magnetic pole group, a No.12 magnetic pole group, and a No.15 magnetic pole group that are spaced apart from one another in the machine moving direction. The plurality of magnetic pole groups of the No.12 armature core further includes a No.13 magnetic pole group, a No.14 magnetic pole group, and a No.16 magnetic pole group that are spaced apart from one another in the machine moving direction. The No.11 magnetic pole group and the No.13 magnetic pole group constitute an No.11 magnetic pole group pair. The No.12 magnetic pole group and the No.14 magnetic pole group constitute a No.12 magnetic pole group pair. The No.15 magnetic pole group and the No.16 magnetic pole group constitute a No.13 magnetic pole group pair. A winding direction of a coil of the No.11 magnetic pole group pair is the same as a winding direction of a coil of the No.12 magnetic pole group pair, and the coil of the No.11 magnetic pole group pair and a coil of the No.13 magnetic pole group pair constitute the coil pair. When an angle between two magnetic field cores that are adjacent and have a same polarity is defined as 360 degrees in electrical angle, (i) the No.11 magnetic pole group pair and the No.12 magnetic pole group pair are located away from each other substantially by 360×(n+m/s) degrees in electrical angle, and (ii) the No.11 magnetic pole group pair and the No.13 magnetic pole group pair are located away from each other substantially by 360×(q+½) degrees in electrical angle, where "s" is the number of phases, "m" is an integer equal to or greater than 1 and equal to or less than s−1, where the integer is not a divisor of s (except 1) or multiples of the divisor (except 1), "n" is an integer equal to or greater than 1, and "q" is an integer equal to or greater than 1.

(14) In the electric machine of (13), the magnetic field portion and the armature portion may be relatively rotatable, and when (a number of phases of magnetic field portion)/2 is defined as "p", and a number of coil pairs of each phase is defined as "c", "(360/p)×(n+m/s)" may be substantially equal to "360/s/c". This allows the magnetic flux of the magnets to be efficiently directed to the armature core, thereby increasing the magnetic flux passing through the coils and obtaining high torque. As such, the magnetic pole pairs can be arranged evenly in the rotation direction and the unbalance of magnetic force can be reduced, thus reducing cogging torque, torque ripple, vibration, and noise.

(15) In the electric machine according to any one of (1) to (10), a number of phases of the electric machine may be an even number of two or more. The armature portion may include a coil pair constituted by two coils having different winding directions for each phase. The plurality of armature cores may include an No.11 armature core and a No.12 armature core. The plurality of magnetic pole groups of the No.11 armature core may include an No.11 magnetic pole group, a No.12 magnetic pole group, and a No.15 magnetic pole group that are spaced apart from one another in the machine moving direction. The plurality of magnetic pole groups of the No.12 armature core may include a No.13 magnetic pole group, a No.14 magnetic pole group, and a No.16 magnetic pole group that are spaced apart from one another in the machine moving direction. The No.11 magnetic pole group and the No.13 magnetic pole group may constitute an No.11 magnetic pole group pair. The No.12 magnetic pole group and the No.14 magnetic pole group may constitute a No.12 magnetic pole group pair. The No.15 magnetic pole group and the No.16 magnetic pole group may constitute a No.13 magnetic pole group pair. A winding direction of a coil of the No.11 magnetic pole group pair may be the same as a winding direction of a coil of the No.12 magnetic pole group pair, and the coil of the No.11 magnetic pole group pair and a coil of the No.13 magnetic pole group pair may constitute the coil pair. When an angle between two magnetic field cores that are adjacent and have a same polarity is defined as 360 degrees in electrical angle, (i) the No.11 magnetic pole group pair and the No.12 magnetic pole group pair may be located away from each other substantially by 360×(n+m/s/2) degrees in electrical angle, and (ii) the No.11 magnetic pole group pair and the No.13 magnetic pole group pair may be relatively and located away from each other substantially by 360×(q+½) degrees in electrical angle, where "s" is the number of phases, "n" is an integer equal to or greater than 1, "m" is an integer equal to or greater than 1 and equal to or less than s−1, where the integer is other than a divisor of s (except 1) and other than multiples of the divisor (except 1), and "q" is an integer equal to or greater than 1.

(16) In the electric machine of (15), the magnetic field portion and the armature portion may be relatively rotatable, and when (a number of poles of magnetic field portion)/2 is defined as "p" and a number of coil pairs for each phase is defined as "c", "(360/p)×(n+m/s/2)" may be substantially equal to "180/s/c". This allows the magnetic flux of the magnets to be efficiently directed to the armature core, thereby increasing the magnetic flux passing through the coils and obtaining high torque. The magnetic pole pairs can be arranged evenly in the rotation direction and the unbalance of magnetic force can be reduced, thus reducing cogging torque, torque ripple, vibration, and noise.

(17) In the electric machine according to any one of (1) to (16), the at least one coil may be wound around at least one of two magnetic pole groups constituting each of the at least two magnetic pole group pairs forming the closed magnetic circuit. This structure enables the magnetic flux flowing through the magnetic pole groups to efficiently pass though the coils.

(18) In the electric machine according to any one of (1) to (17), the magnetic pole group may include a plurality of magnetic poles as the at least one magnetic pole, and the at least one coil may include a first coil surrounding the plurality of magnetic poles and a second coil disposed inside of the first coil, where second coil surrounding one or some of the plurality of magnetic poles that is surrounded by the first coil. This allows for effective use of spaces between the magnetic poles. Further, the width of a coil (number of turns) can be reduced.

(19) In the electric machine according to any one of (1) to (3) and (5) to (17), at least one of the plurality of armature cores may include two magnetic pole groups arranged in the machine moving direction and a yoke portion between the two magnetic pole groups, and the at least one coil may be wound around the yoke portion. This structure enables the magnetic flux flowing through the magnetic pole groups to efficiently pass though the coils.

In the electric machine according to any one of (1) to (19), the plurality of armature cores and the plurality of coils may be solidified by a material having non-magnetic and insulating property. This structure serves to prevent disconnection of the coils. Further, this can increase the heat capacity of the armature portion, and alleviate the temperature rise at the time of driving the rotary electric machine. Further, the workability of assembling the electric machine can be improved.

(20) In the electric machine according to any one of (1) to (19), each of the plurality of magnets may be magnetized in the machine moving direction. Each of the plurality of magnetic field cores may include two partial magnetic field cores disposed between two adjacent magnets, and the two partial magnetic field cores may be spaced apart in the machine moving direction. This reduces accumulation of errors in positions of the magnets and the magnetic field cores, thereby improving the positional accuracy of the magnets and the magnetic field cores.

(21) In the electric machine of (20), each of the two partial magnetic field cores may include a plurality of steel sheets laminated in the machine moving direction. This serves to prevent generation of induced current, and increase the driving force output by the electric machine (torque output by the rotary electric machine and force output by the linear electric machine).

In the electric machine according to any one of (1) to (21), the plurality of magnets and the plurality of magnetic field cores may be solidified by a material having non-magnetic and insulating property. Further, the workability of assembling the rotary electric machine can be improved.

(22) A magnetic field portion of an electric machine proposed in this disclosure may be relatively movable to an armature portion in a machine moving direction, and include a plurality of magnets each magnetized in the machine moving direction and arranged in the machine moving direction and a plurality of magnetic field cores arranged in the machine moving direction. Each of the plurality of magnetic field cores may include two partial magnetic field cores disposed between two adjacent magnets, and the two partial magnetic field cores may be spaced apart in the machine moving direction. This structure of the magnetic field portion serves to reduce accumulation of errors in positions of the magnets and the magnetic field cores, thereby improving the positional accuracy of the magnets and the magnetic field cores. The magnetic field portion of the electric machine proposed in this disclosure may be applied to a rotary electric machine or a linear electric machine. The rotary electric machine may be a radial gap type, in which the armature portion and the magnetic field portion face each other in the radial direction, or an axial gap type, in which the armature portion and the magnetic field portion face each other in the axis direction. Further, the armature portion may be fixed and the magnetic field portion may be movable, or the magnetic field portion may be fixed and the armature portion may be movable.

(23) An electric machine proposed in this disclosure includes
an armature portion including a plurality of armature cores and a plurality of coils attached to at least one of the plurality of armature cores and
at least one magnetic field portion that is relatively movable to the armature portion in a machine moving direction and includes a plurality of magnets and a plurality of magnetic field cores, where the magnet is disposed between two magnetic field cores adjacent in the machine moving direction.

The plurality of armature cores of the armature portion includes are spaced apart from one another in a second direction intersecting with the machine moving direction, each of the plurality of armature cores including a plurality of magnetic poles. A first armature core of the plurality of armature cores includes a first magnetic pole and a second magnetic pole. A second armature core of the plurality of armature cores includes a third magnetic pole and a fourth magnetic pole. The first magnetic pole, the second magnetic pole, the third magnetic pole, the fourth magnetic pole, the plurality of magnetic field cores, and the plurality of magnets form a closed magnetic circuit.

A magnetic flux formed by the plurality of magnets flows between the first magnetic pole and the second magnetic pole,
flows between the third magnetic pole and the fourth magnetic pole,
flows between the first magnetic pole and the third magnetic pole through a part of the plurality of magnetic field cores in a direction intersecting with the machine moving direction, and flows between the second magnetic pole and the fourth magnetic pole through another part of the plurality of magnetic field cores in a direction intersecting with the machine moving direction.

This structure eliminates the need of magnetically separating the first magnetic pole and the second magnetic pole. As such, this can simplify the structure of the armature core, increase the strength of the armature cores, and improve the accuracy of assembly. The structure of the armature core can be simplified, and thus the freedom in selecting materials can be increased, for example, the armature core can be composed only of electrical steel sheets or a powder material. The structure of the electric machine proposed in this disclosure may be applied to a rotary electric machine or a linear electric machine. The rotary electric machine may be a radial gap type, in which the armature portion and the magnetic field portion face each other in the radial direction, or an axial gap type, in which the armature portion and the magnetic field portion face each other in the axis direction. Further, the armature portion may be fixed and the magnetic field portion may be movable, or the magnetic field portion may be fixed and the armature portion may be movable.

(24) An electric machine proposed in this disclosure includes
an armature portion including a plurality of armature cores and a plurality of coils attached to at least one of the plurality of armature cores and
at least one magnetic field portion that is relatively movable to the armature portion and includes a plurality of magnets and a plurality of magnetic field cores, where the magnet is disposed between two magnetic field cores adjacent in a machine moving direction, the machine moving direction being a direction of the relative movement between the armature portion and the at least one magnetic field portion. The plurality of armature cores are spaced apart in a direction intersecting with the machine moving direction. Each of the plurality of armature cores includes a plurality of magnetic pole groups, and each of the plurality of magnetic pole groups includes at least one magnetic pole. One of two armature cores included in the plurality of armature cores is positioned from the magnetic field portion in a first direction intersecting with the machine moving direction, and the other armature core of two armature cores included in the plurality of armature cores is positioned from the magnetic field portion in a second direction that is different from the first direction and intersecting with the machine moving direction. This structure serves to increase the freedom in the arrangement of the two armature cores, thereby increasing the freedom in the shape of the electric machine, such as a flat shape. The structure of the electric machine proposed in this disclosure may be applied to a rotary electric machine or a linear electric machine. The rotary electric machine may be a radial gap type, in which the armature portion and the magnetic field portion face each other in the radial direction, or an axial gap type, in which the armature portion and the magnetic field portion face each other in the axis direction. Further, the armature portion may be fixed and the magnetic field portion may be movable, or the magnetic field portion may be fixed and the armature portion may be movable.

(25) In the electric machine of (24), the one of the two armature cores and the other armature core are positioned opposite to each other across the magnetic field portion.

BRIEF DESCRIPTION OF THE DRAWINGS

FIG. 1B is an exploded perspective view of the rotary electric machine according to the first example;

FIG. 2 is a development view of an armature portion of the rotary electric machine according to the first example in which positions of magnetic poles of the armature portion are indicated;

FIG. 4 is a diagram illustrating a magnetic flux flowing through the armature portion of the rotary electric machine according to the first example. In FIG. 4, the armature cores are spaced apart in the axis direction, and the magnetic field portion is omitted;

FIG. 5B shows the variation of the magnetic flux formed in the rotary electric machine according to the first example;

FIG. 6A is a diagram illustrating a modification of an arrangement of the magnetic poles;

FIG. 6B shows the magnetic flux passing through the coils and the magnetic poles when the armature core includes the magnetic pole shown in FIG. 6A, where a horizontal axis is the position (electric angle) of the magnetic field portion, and a vertical axis is the magnetic flux;

FIG. 7A is a diagram illustrating a modification of an arrangement of the magnetic poles;

FIG. 7B shows the magnetic flux passing through the coils and the magnetic poles when the armature core includes the magnetic pole shown in FIG. 7A, where a horizontal axis is the position (electric angle) of the magnetic field portion, and a vertical axis is the magnetic flux;

FIG. 9B shows the magnetic flux passing through the coils and the magnetic poles when the armature core includes the magnetic pole shown in FIG. 9A, where a horizontal axis is the position (electric angle) of the magnetic field portion, and a vertical axis is the magnetic flux;

FIG. 10 is a diagram showing examples of shapes of the magnetic pole;

FIG. 15A is a diagram for explaining a relationship between a position of the magnetic field portion and the magnetic flux passing through a U phase coil in the rotary electric machine shown in FIG. 13;

FIG. 15B shows a modification of the magnetic flux formed in the rotary electric machine shown in FIG. 13;

FIG. 17A is a diagram for explaining a relationship between a position of the magnetic field portion and the magnetic flux passing through a U phase coil in the rotary electric machine shown in FIG. 16A;

FIG. 19B is an exploded perspective view of the rotary electric machine shown in FIG. 19A;

FIG. 20C is a part of a development view of the armature portion of the rotary electric machine shown in FIG. 20A for showing positions of magnetic poles of the armature portion;

FIG. 22C is a part of a development view of the armature portion of the rotary electric machine shown in FIG. 22A for showing positions of magnetic poles of the armature portion;

FIG. 23C is a part of a development view of the armature portion of the rotary electric machine shown in FIG. 23A for showing positions of magnetic poles of the armature portion;

FIG. 23E is a diagram showing a modification of the method for winding coils, indicating an example of wave winding;

FIG. 25C is a part of a development view of the armature portion of the rotary electric machine shown in FIG. 25B for showing positions of magnetic poles of the armature portion;

FIG. 26A is an exploded perspective view of an armature portion of a rotary electric machine in which an armature core is formed of a plurality of partial cores;

FIG. 30 is a diagram illustrating still another example of a coupling mechanism between partial cores (partial armature cores);

FIG. 32 is a diagram illustrating still another example of a coupling mechanism between partial cores;

FIG. 51A is a perspective view of still another example of a rotary electric machine;

FIG. 59C is a diagram for explaining a structure for preventing generation of induced current in the armature core, which is a modification of FIG. 59A;

FIG. 59D is a diagram for explaining a structure for preventing generation of induced current in the armature core, which is a modification of FIG. 59A;

FIG. 59E is a diagram for explaining a structure for preventing generation of induced current in the armature core, which is a modification of FIG. 59A;

FIG. 59F is a diagram for explaining a structure for preventing generation of induced current in the armature core;

FIG. 59G is a cross sectional view of an armature core for explaining a structure for preventing generation of induced current in the armature core;

FIG. 59H is a diagram for explaining a structure for preventing generation of induced current in the armature core;

FIG. 59I is a diagram for explaining a structure for preventing generation of induced current in the armature core;

FIG. 59J is a diagram for explaining a structure for preventing generation of induced current in the armature core;

FIG. 60 is a diagram showing still another example of the rotary electric machine that has armature cores disposed as shown in FIGS. 58A and 58B and is different from the rotary electric machine shown in FIG. 58A in the arrangement of the coils;

FIG. 61A is a diagram showing a modification of the magnetic pole of the axial gap type rotary electric machine;

FIG. 61B is a diagram showing a modification of the magnetic pole of the axial gap type rotary electric machine;

FIG. 62 is a perspective view of an example of an armature portion molded with resin used in the axial gap type rotary electric machine;

Figure 53:
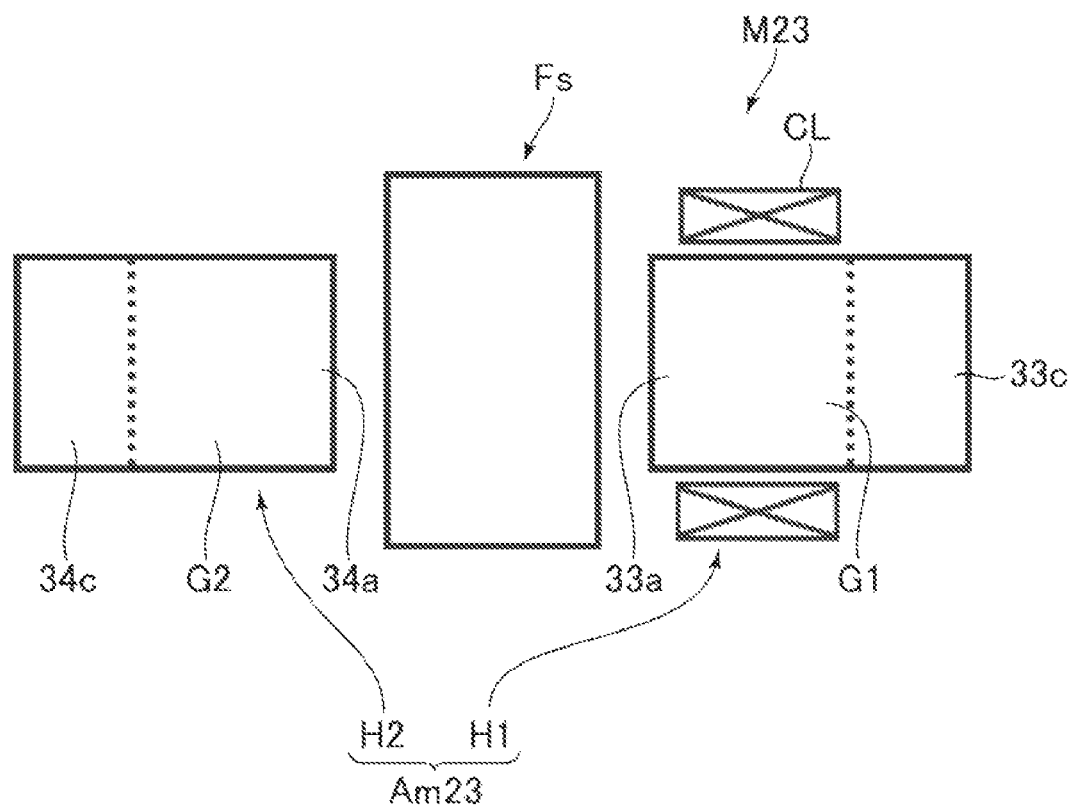
FIG. 53 is a diagram for explaining an example of an electric machine including armature cores disposed on opposite sides across a magnetic field portion, where the electric machine is directed in the machine moving direction.
Figure 63A:
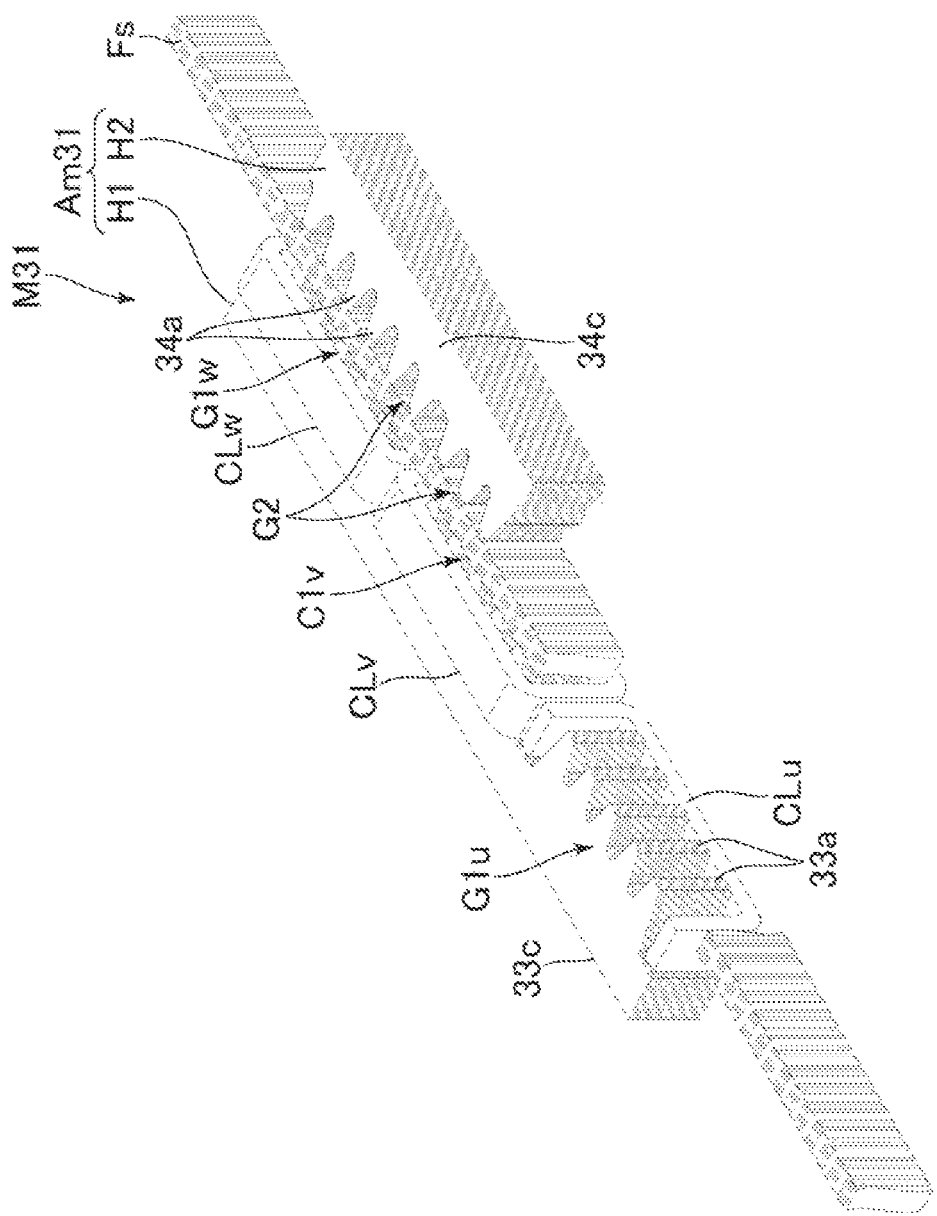
Figure 63B:
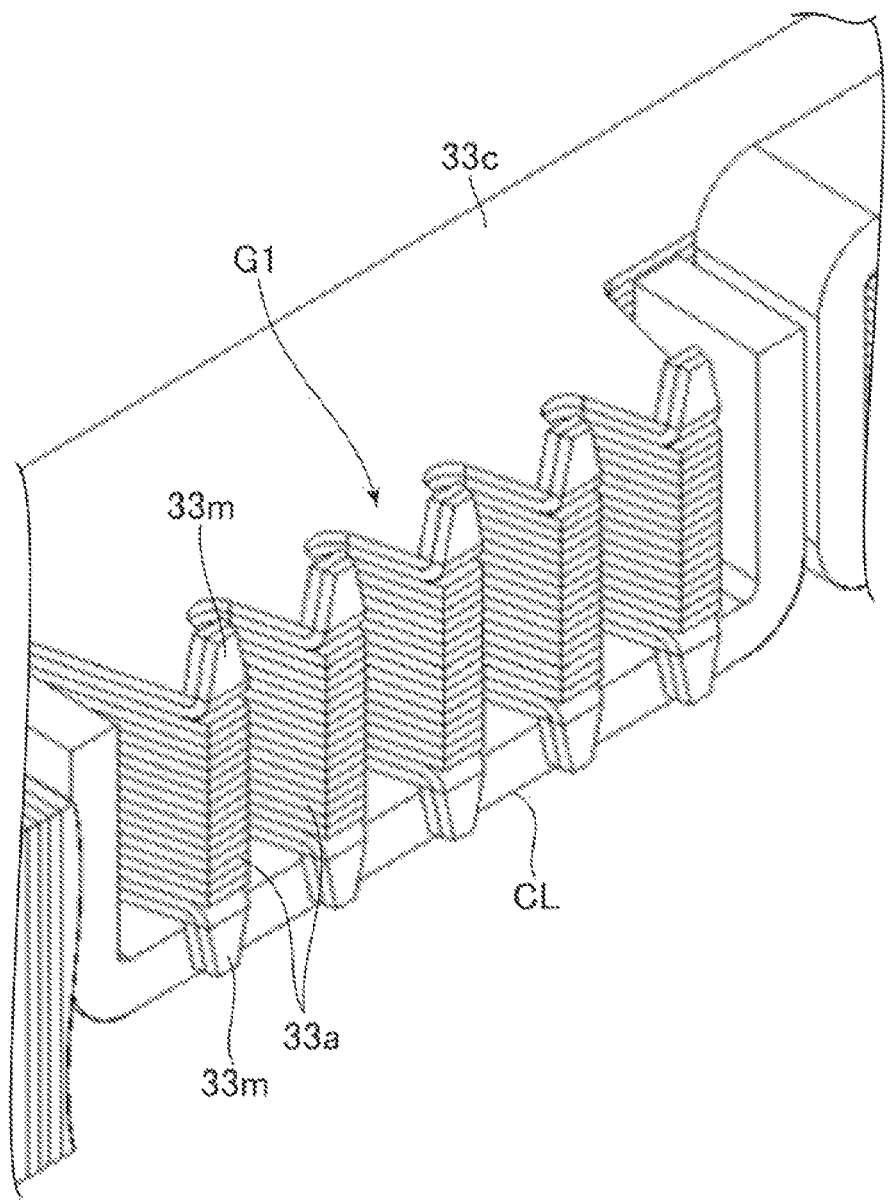
Figure 64:
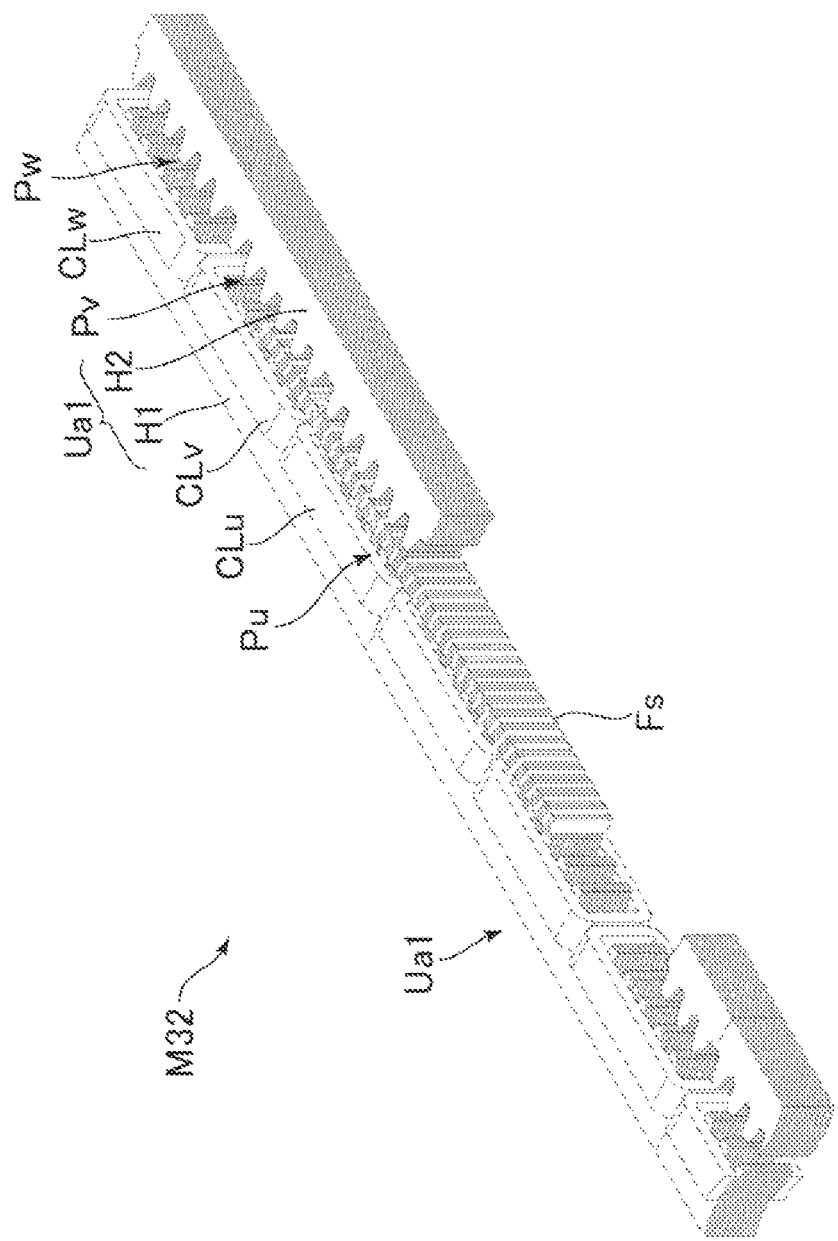
Figure 66:
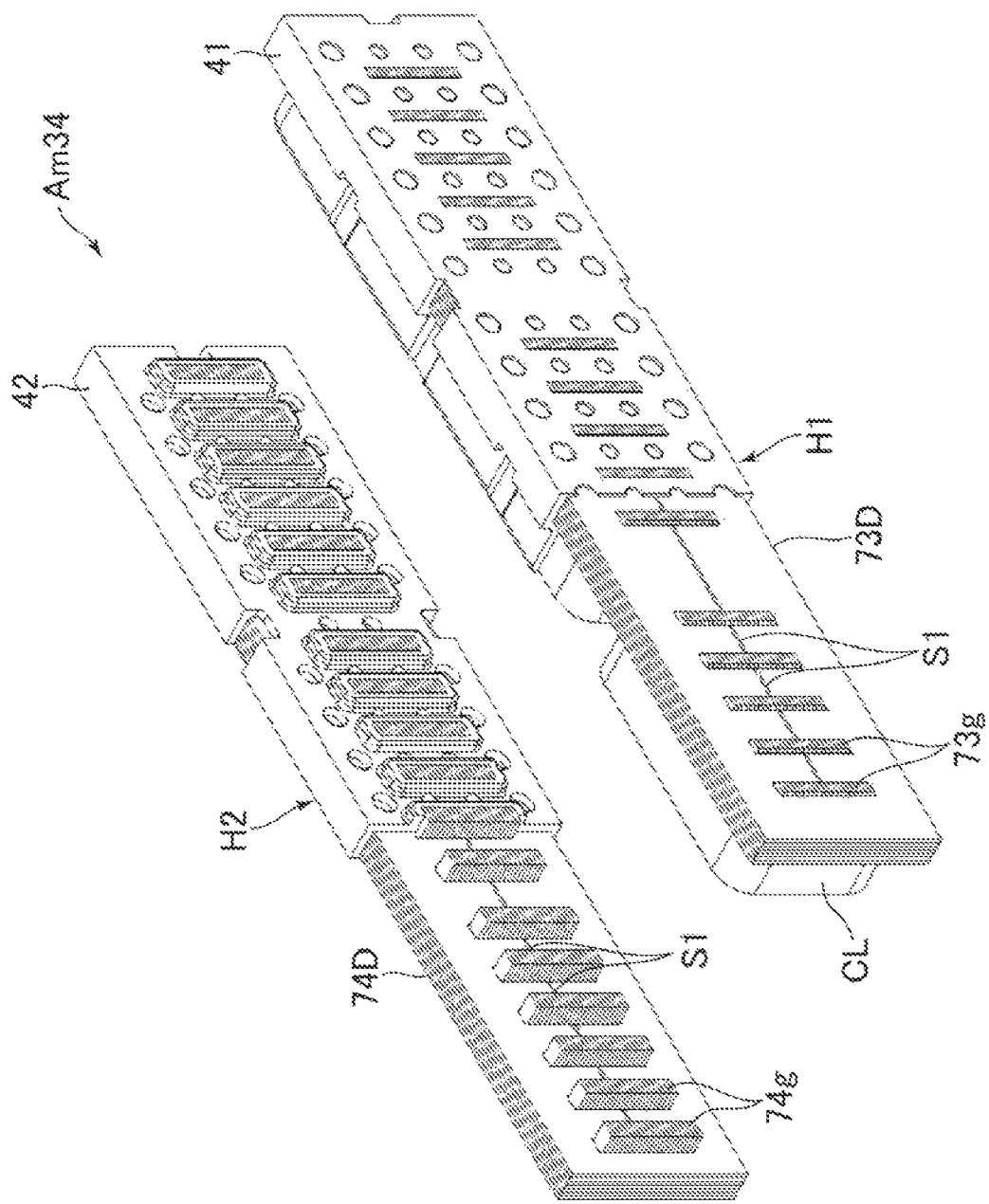
Figure 67:
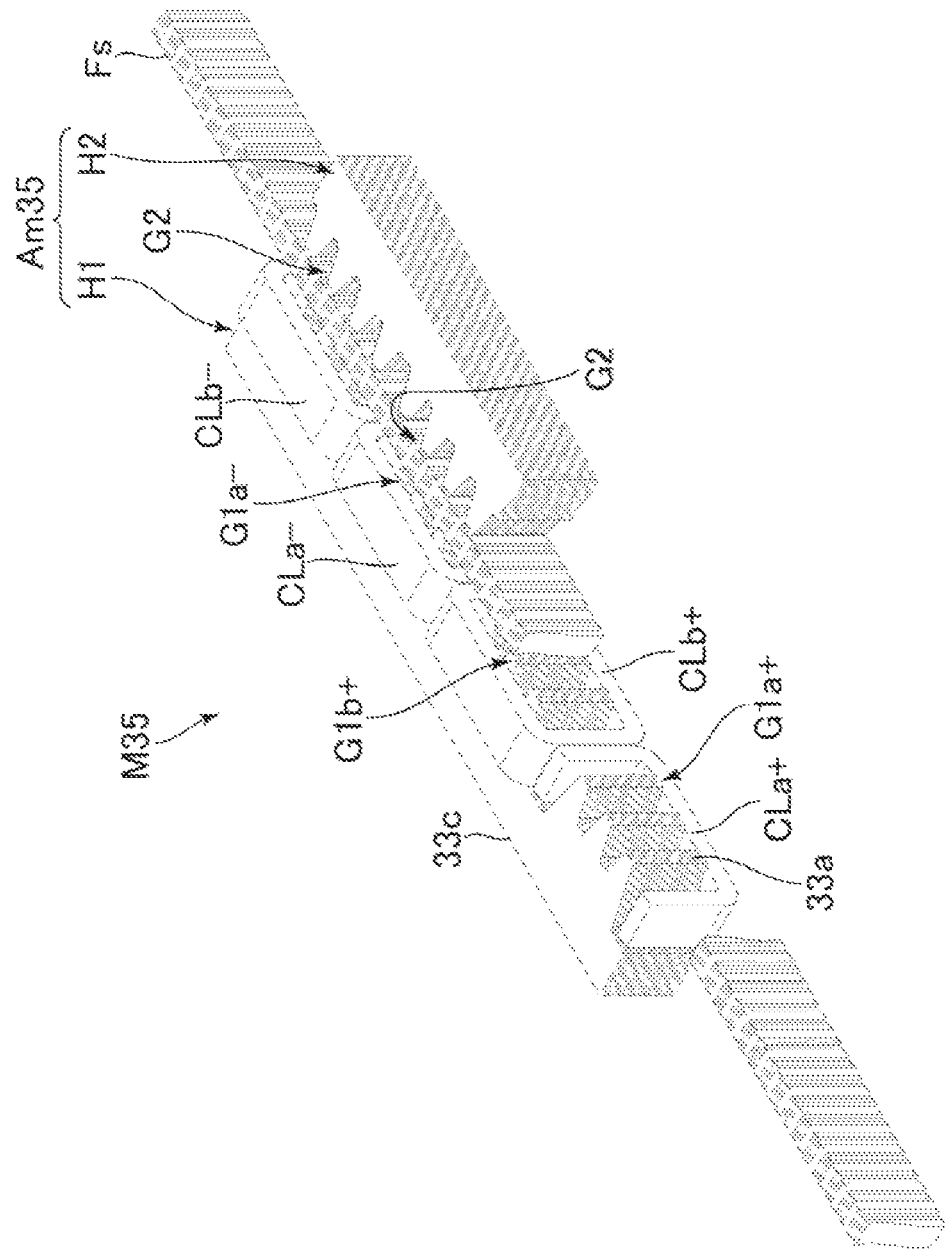
Figure 68:
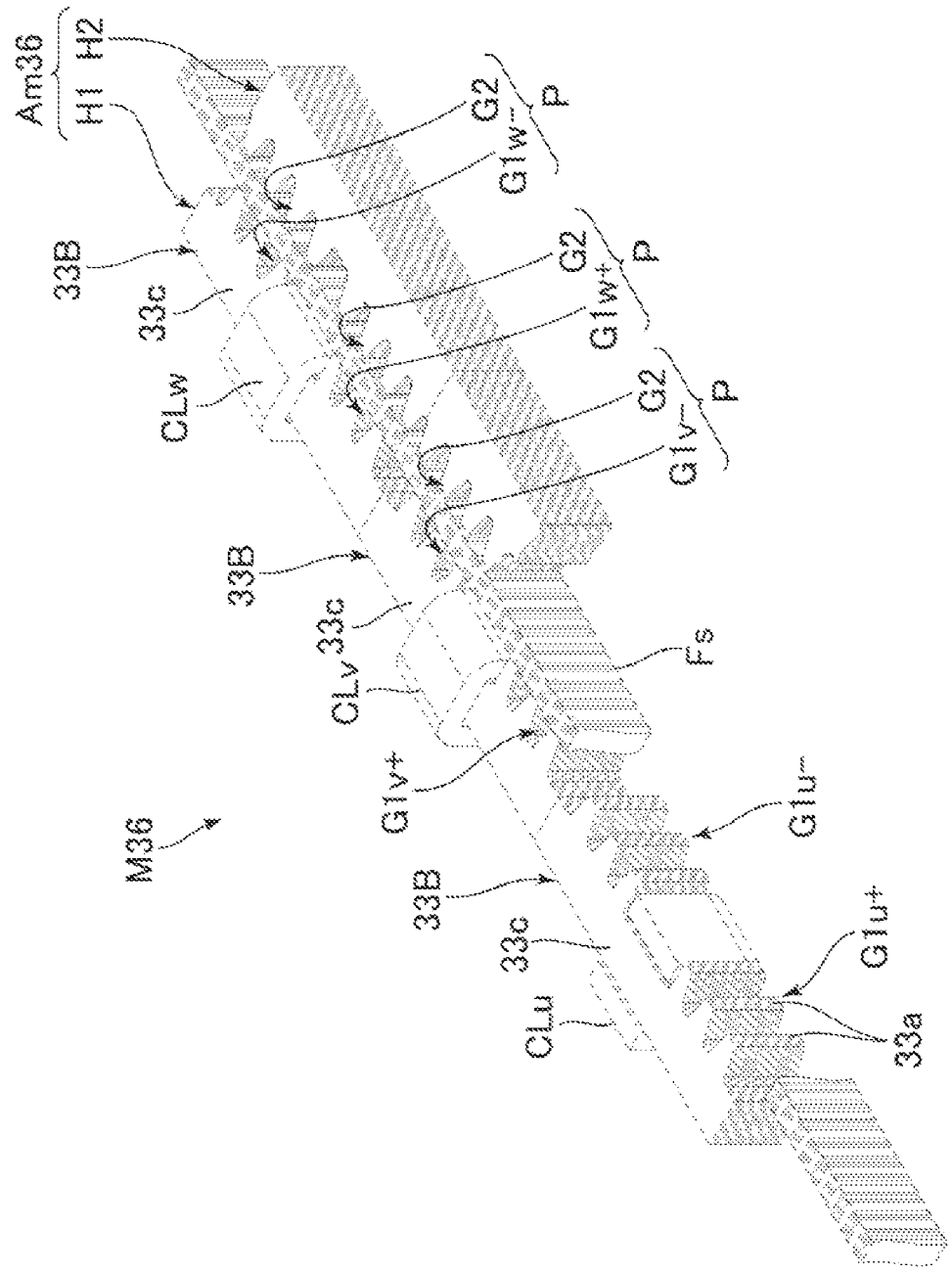
Figure 69B:
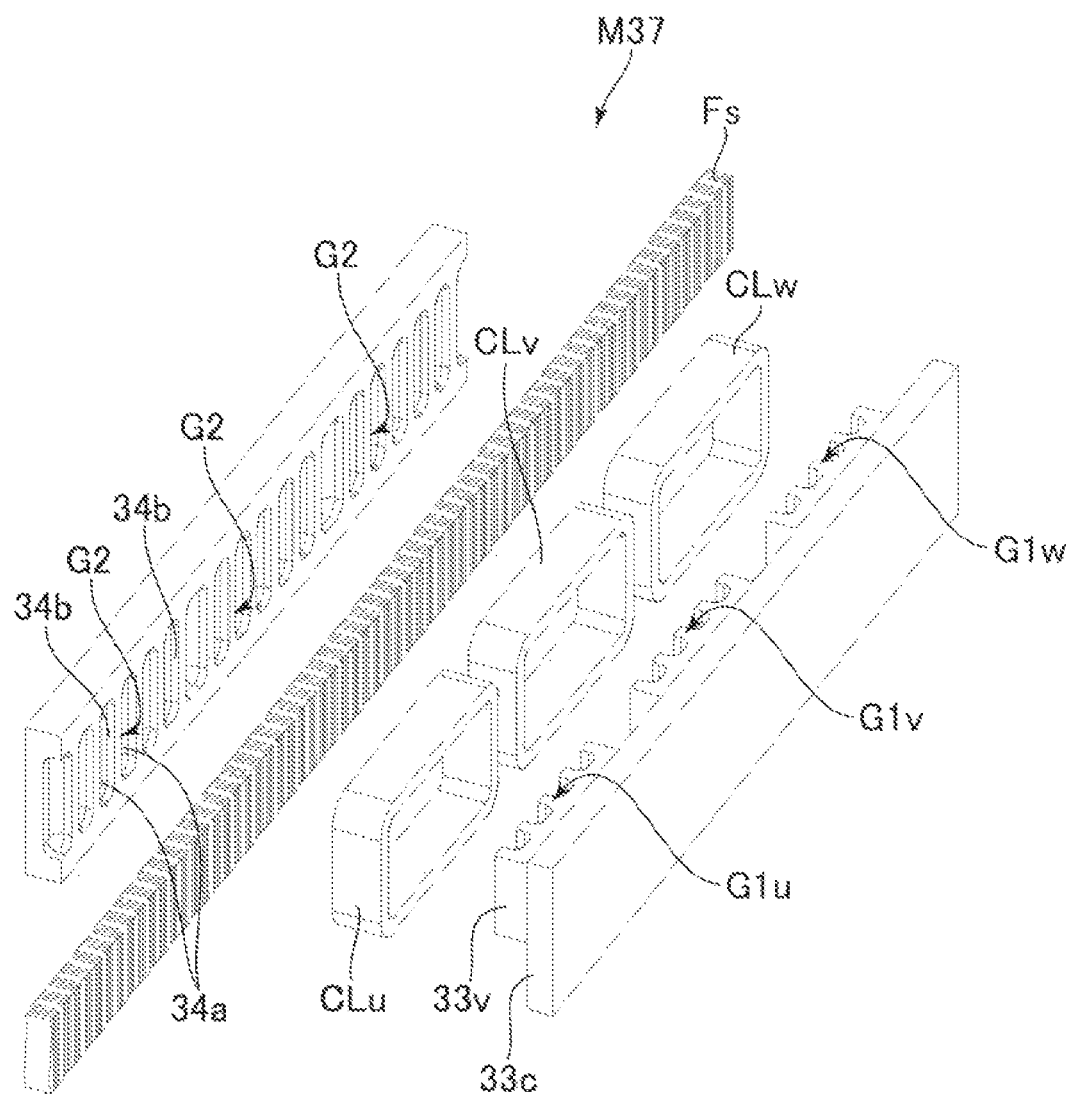
Figure 70:
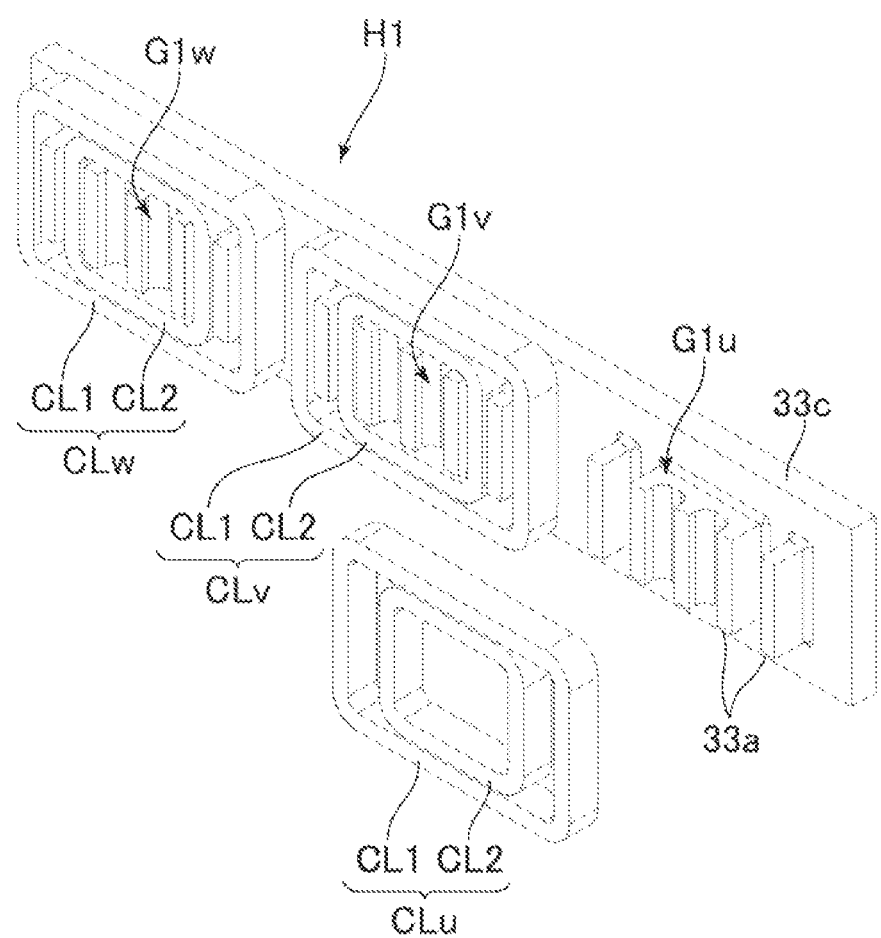
Figure 71A:
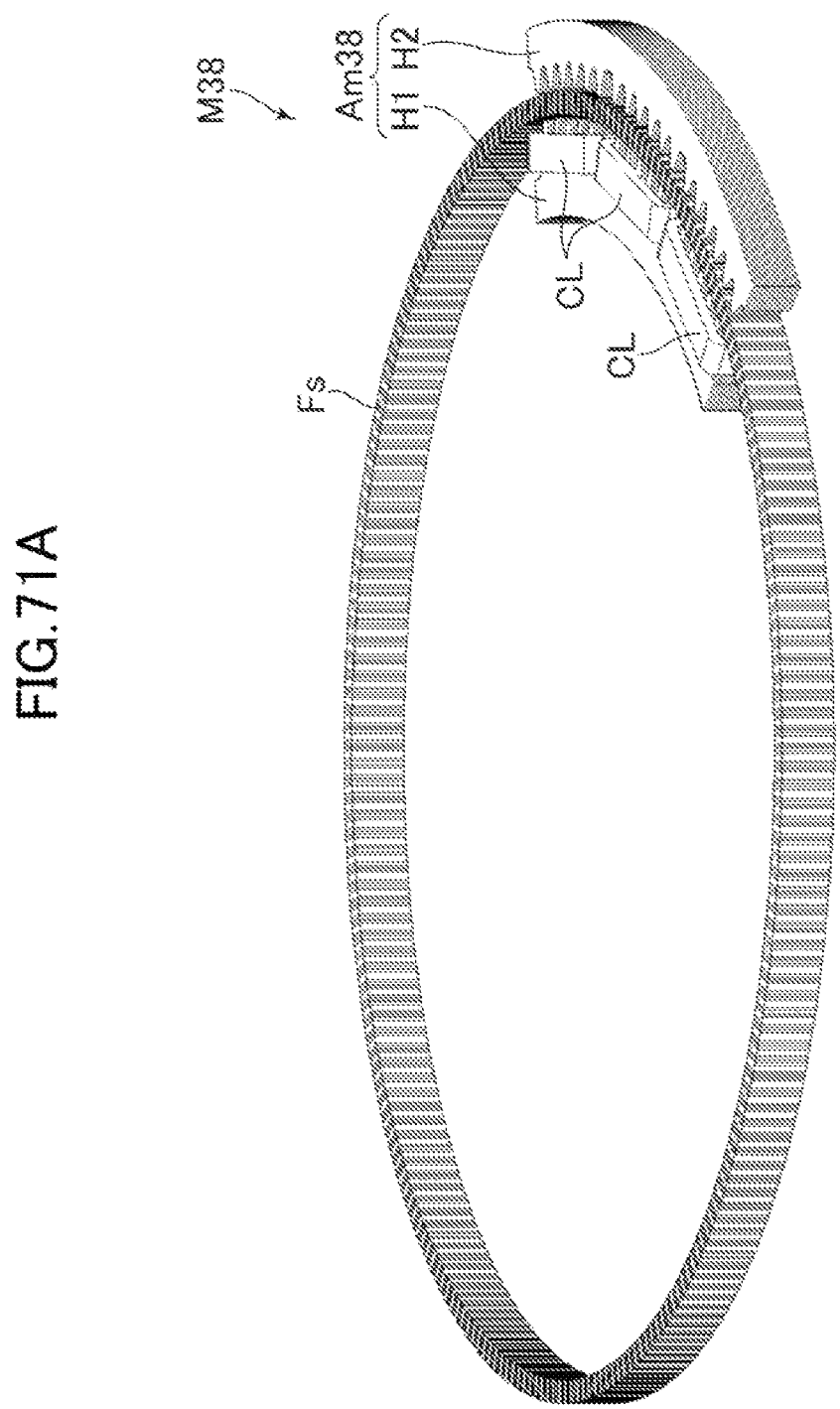
Figure 72:
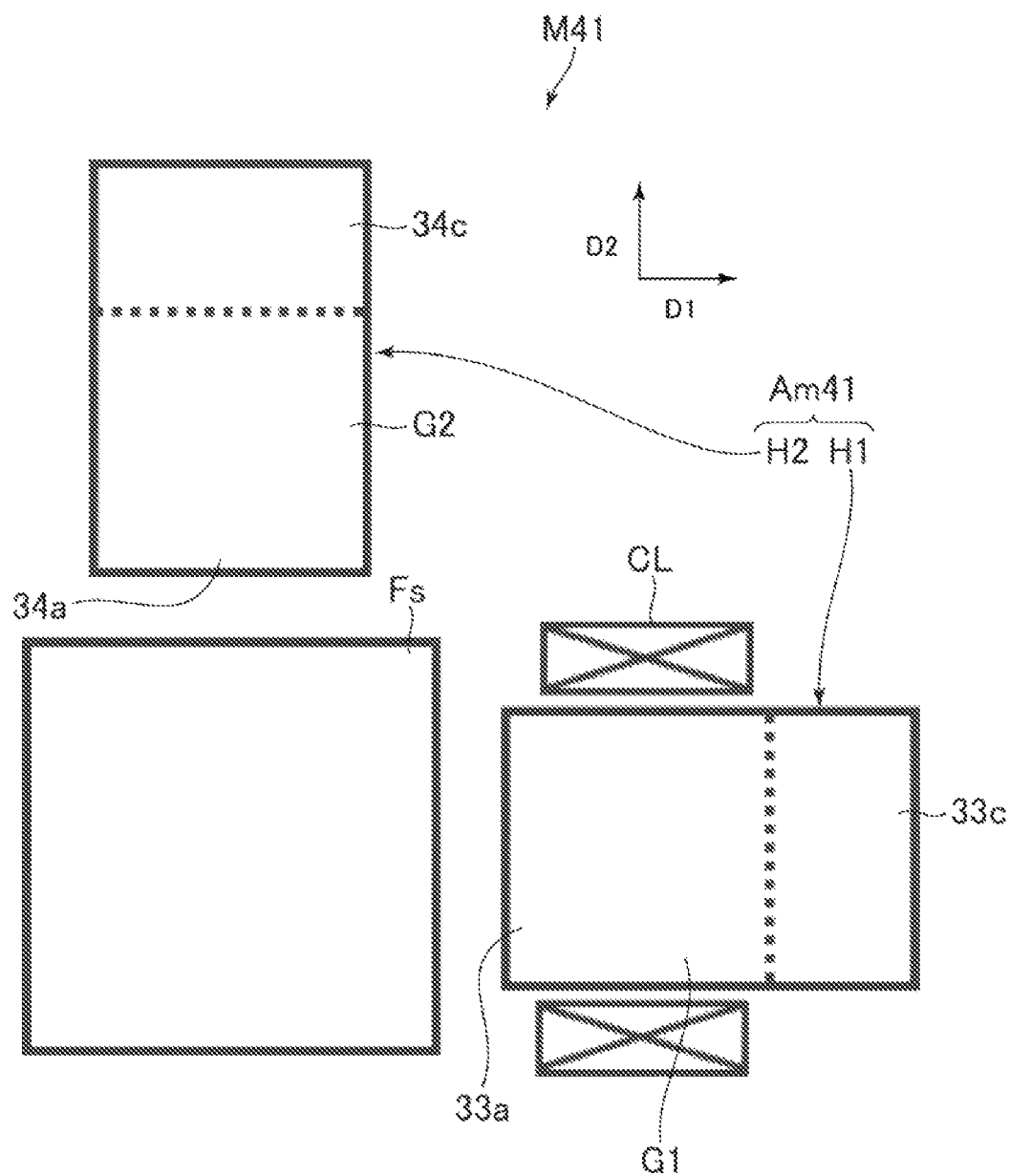
Figure 73:
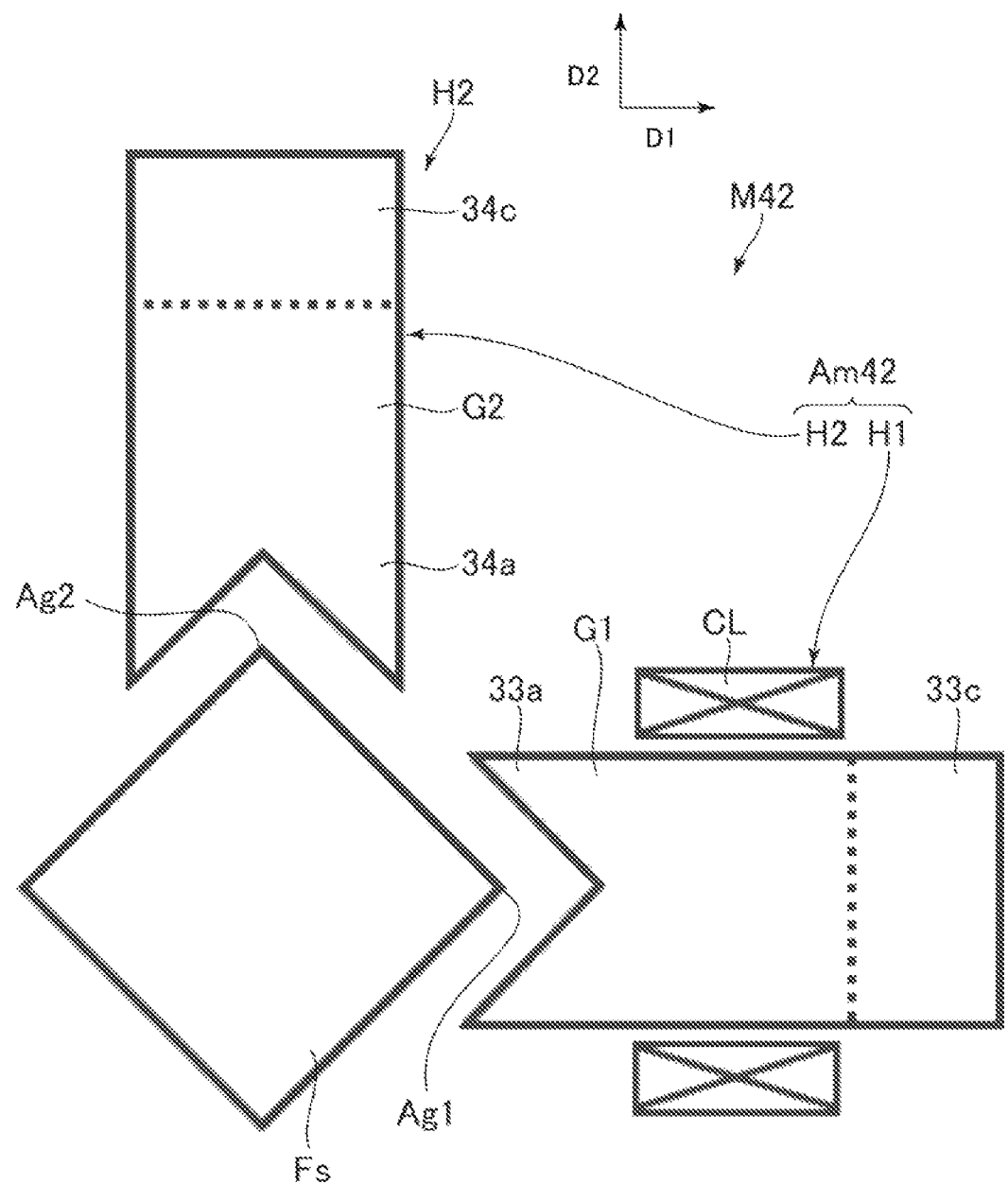
Figure 74:
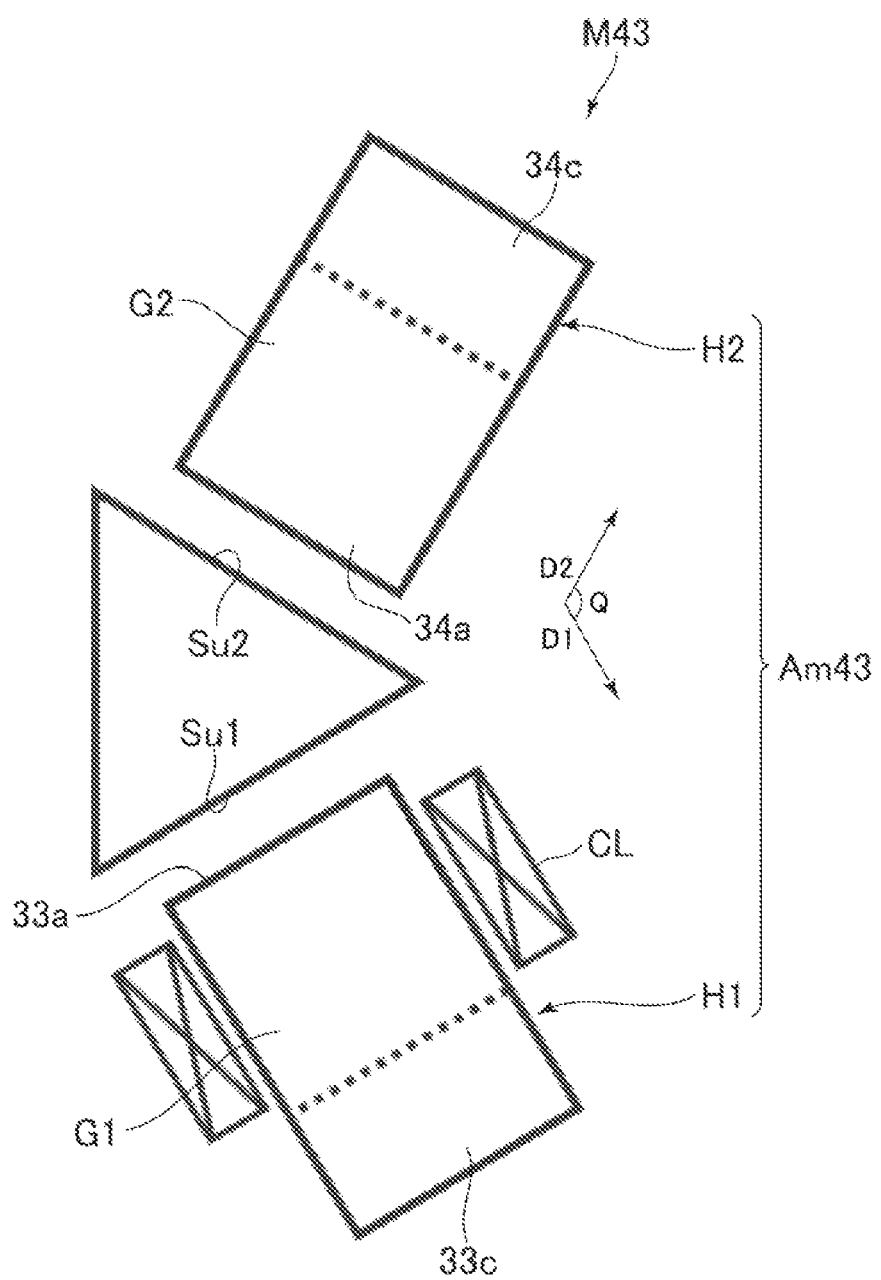
Figure 75:
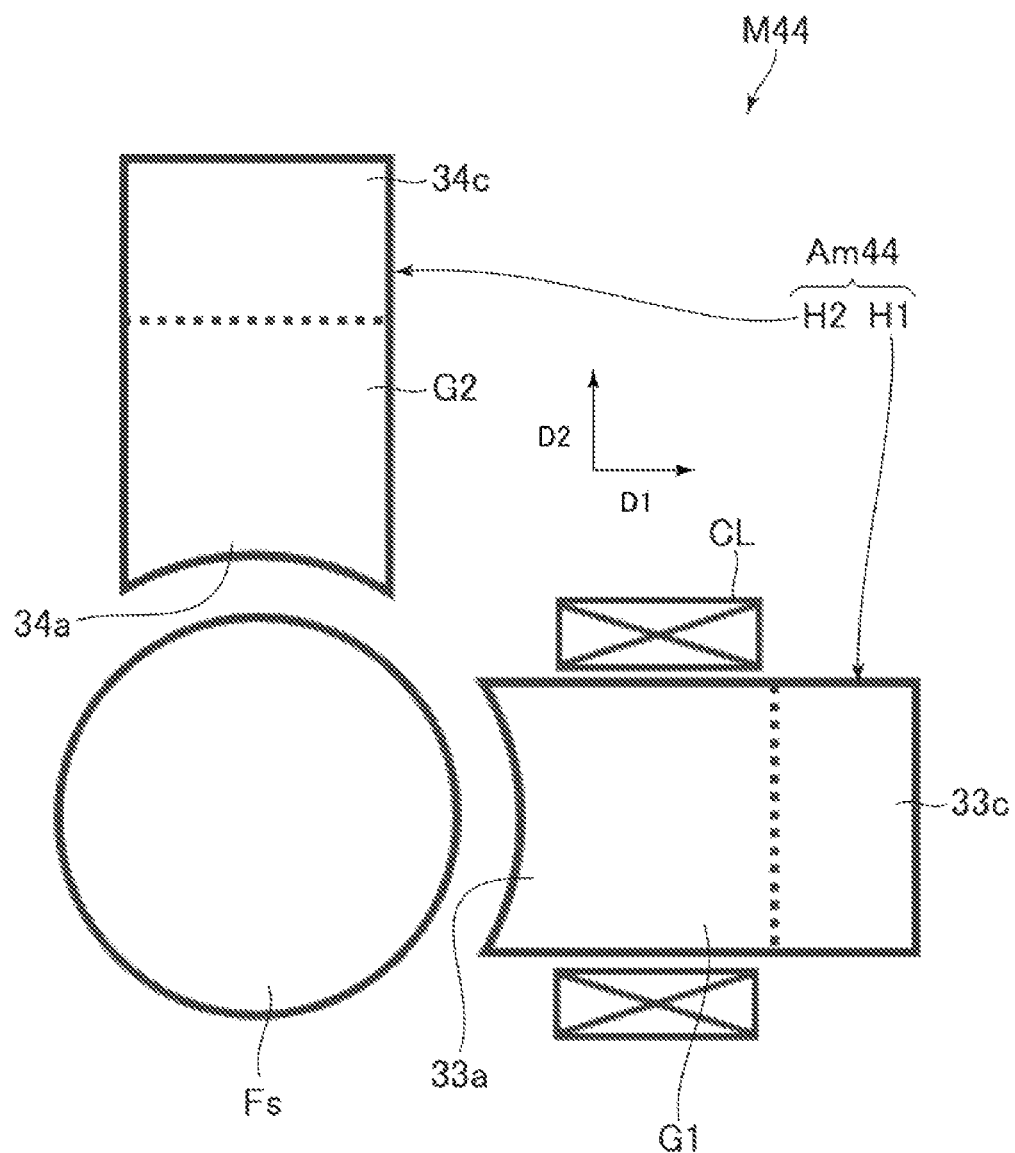
Figure 76A:
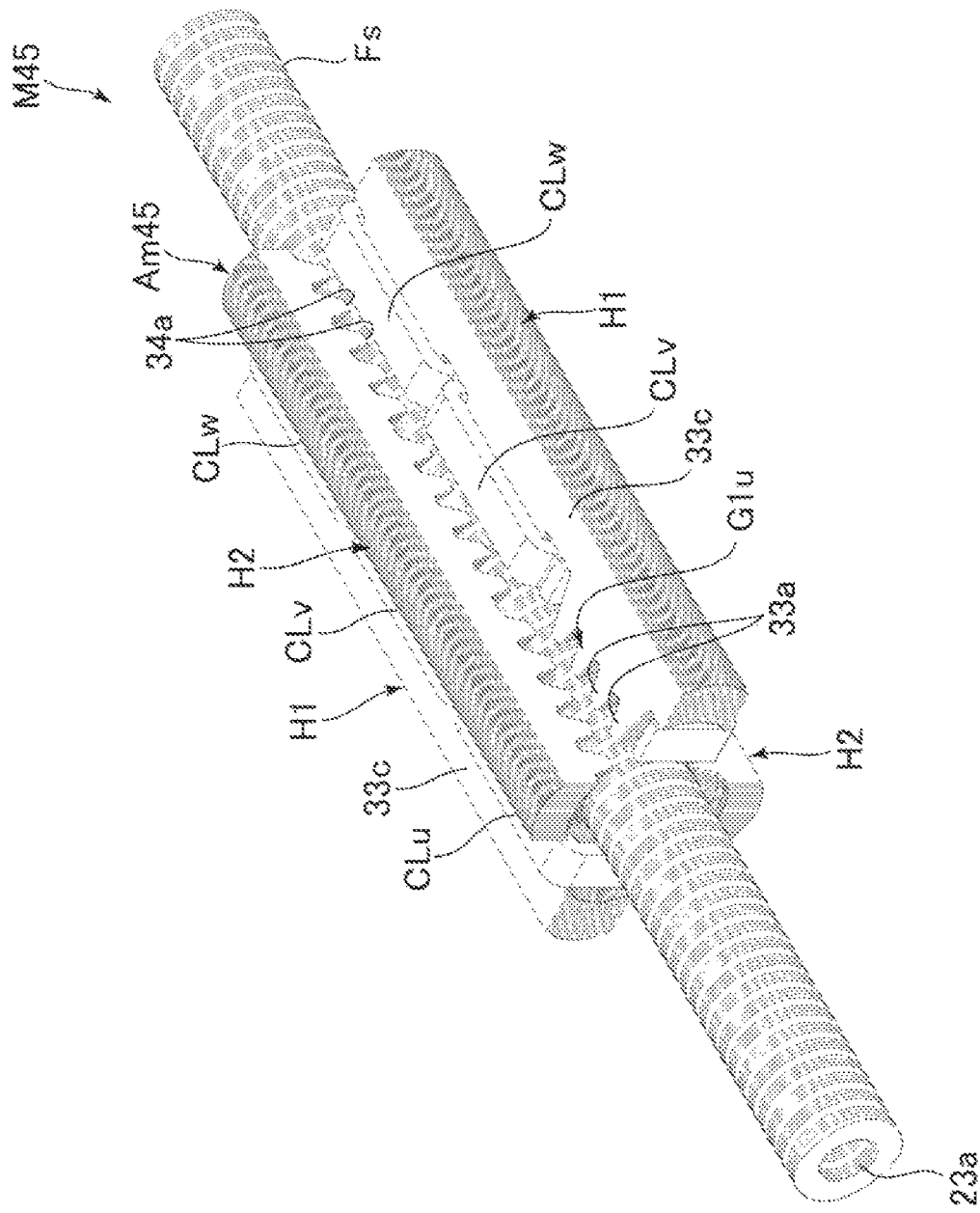
Figure 76B:
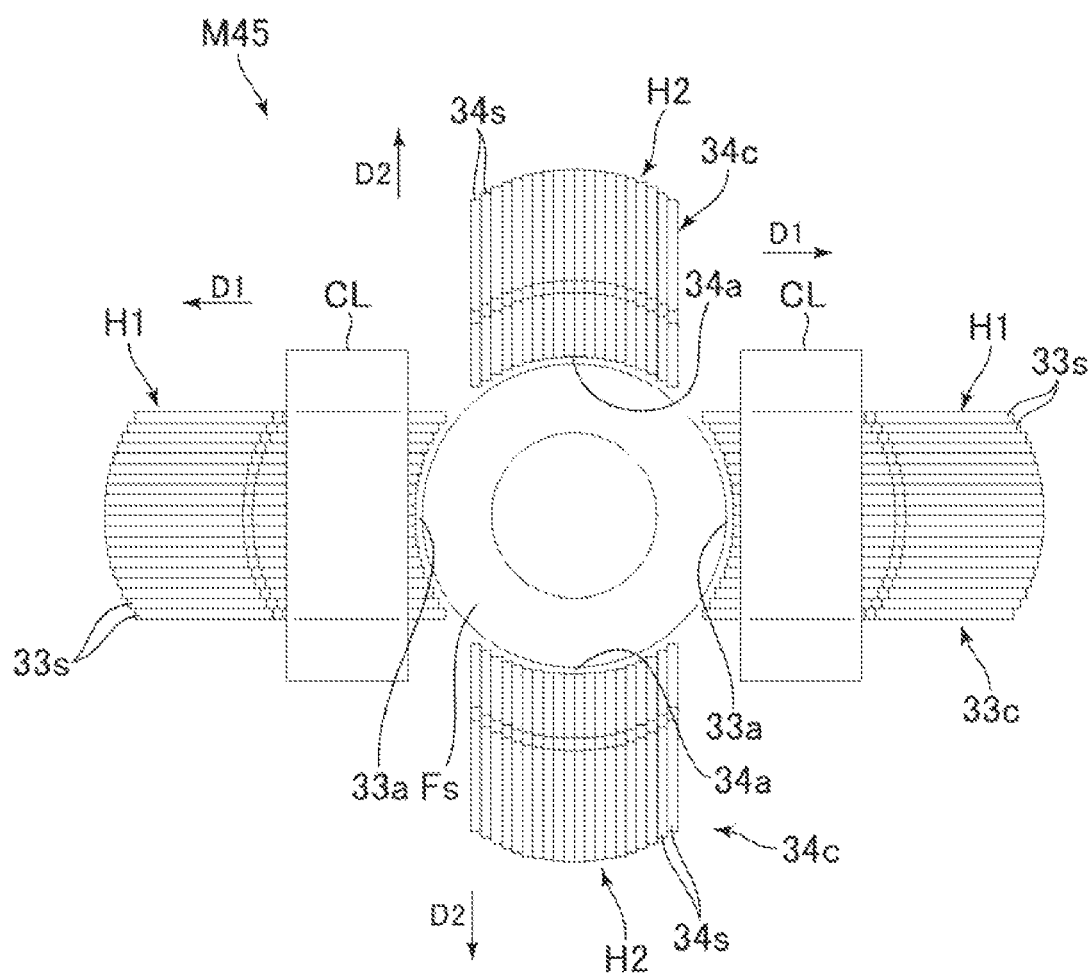
Figure 77A:
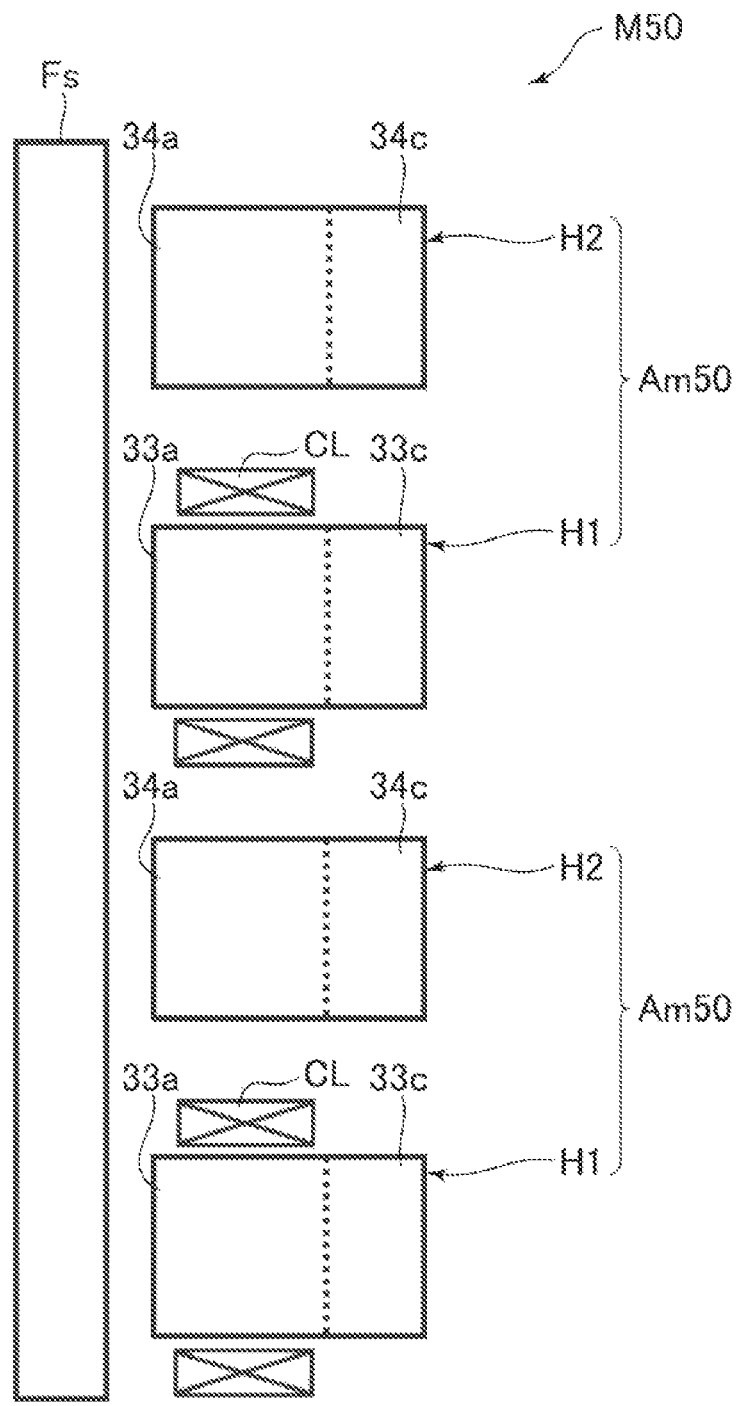
Figure 77B:
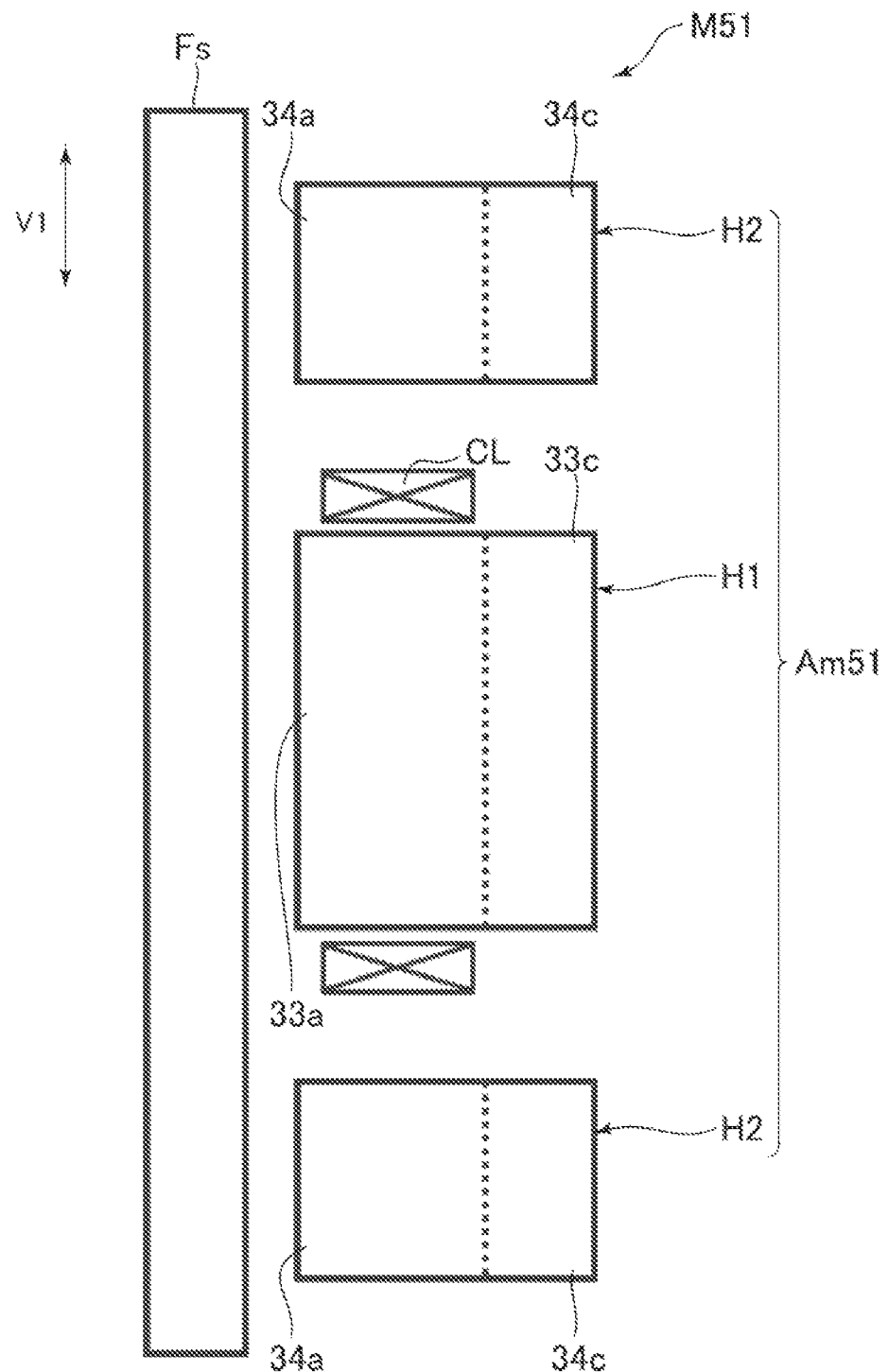
Figure 78A:
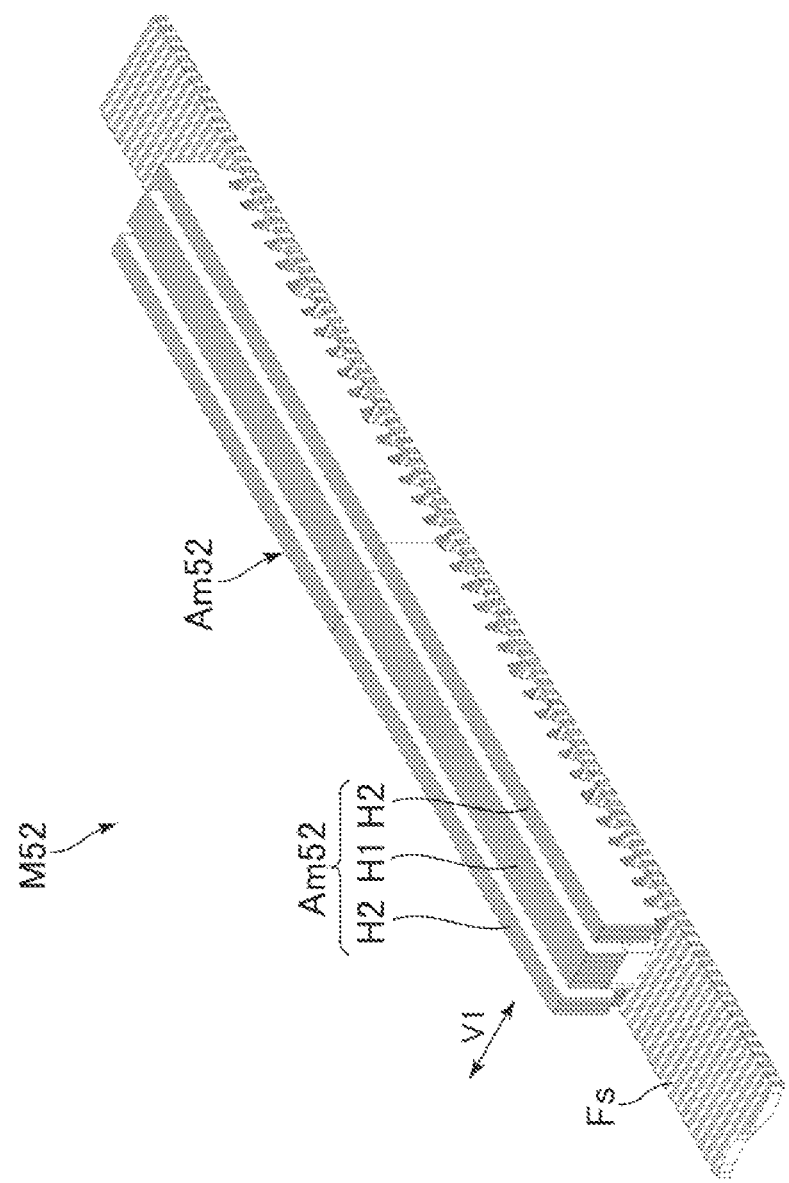
Figure 78B:
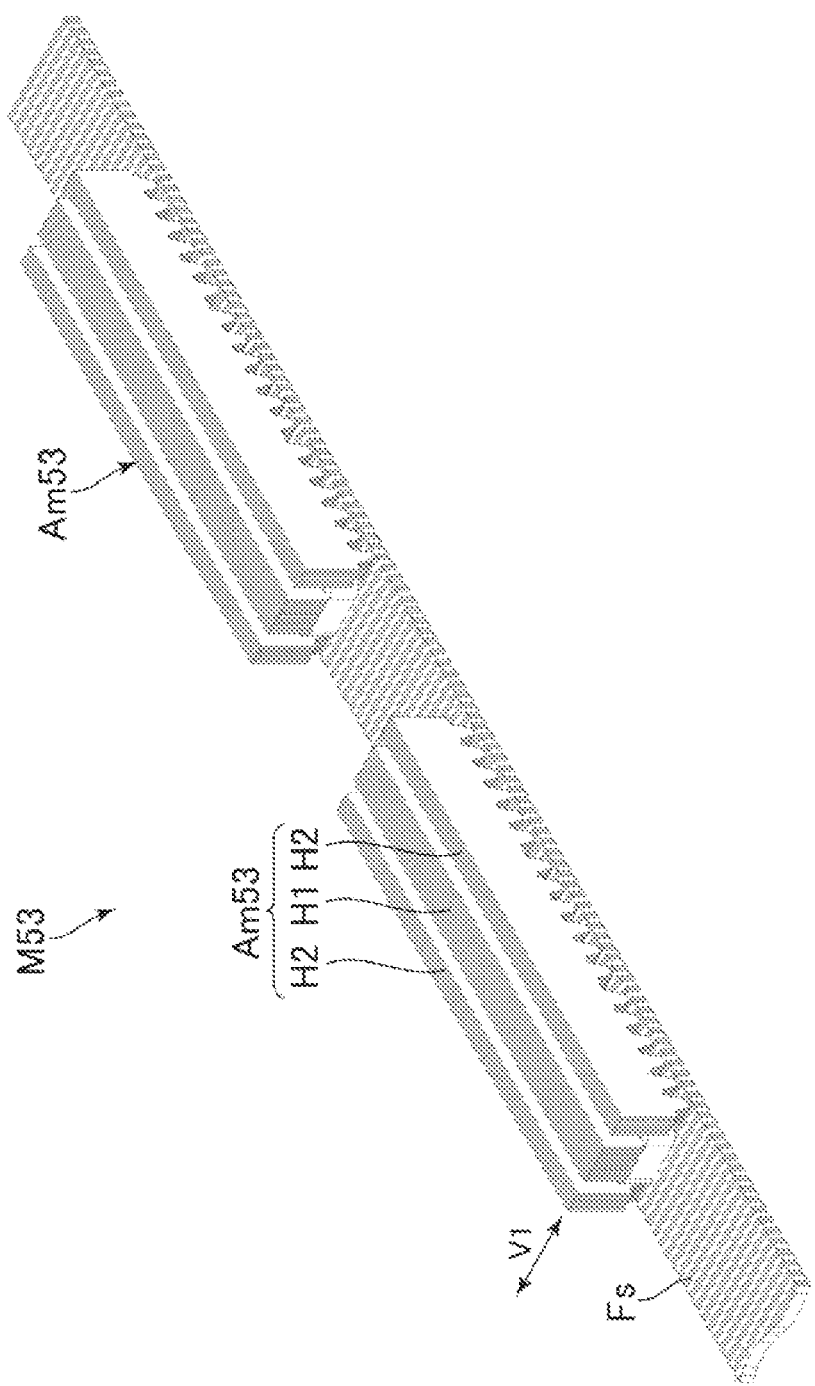
Figure 79:
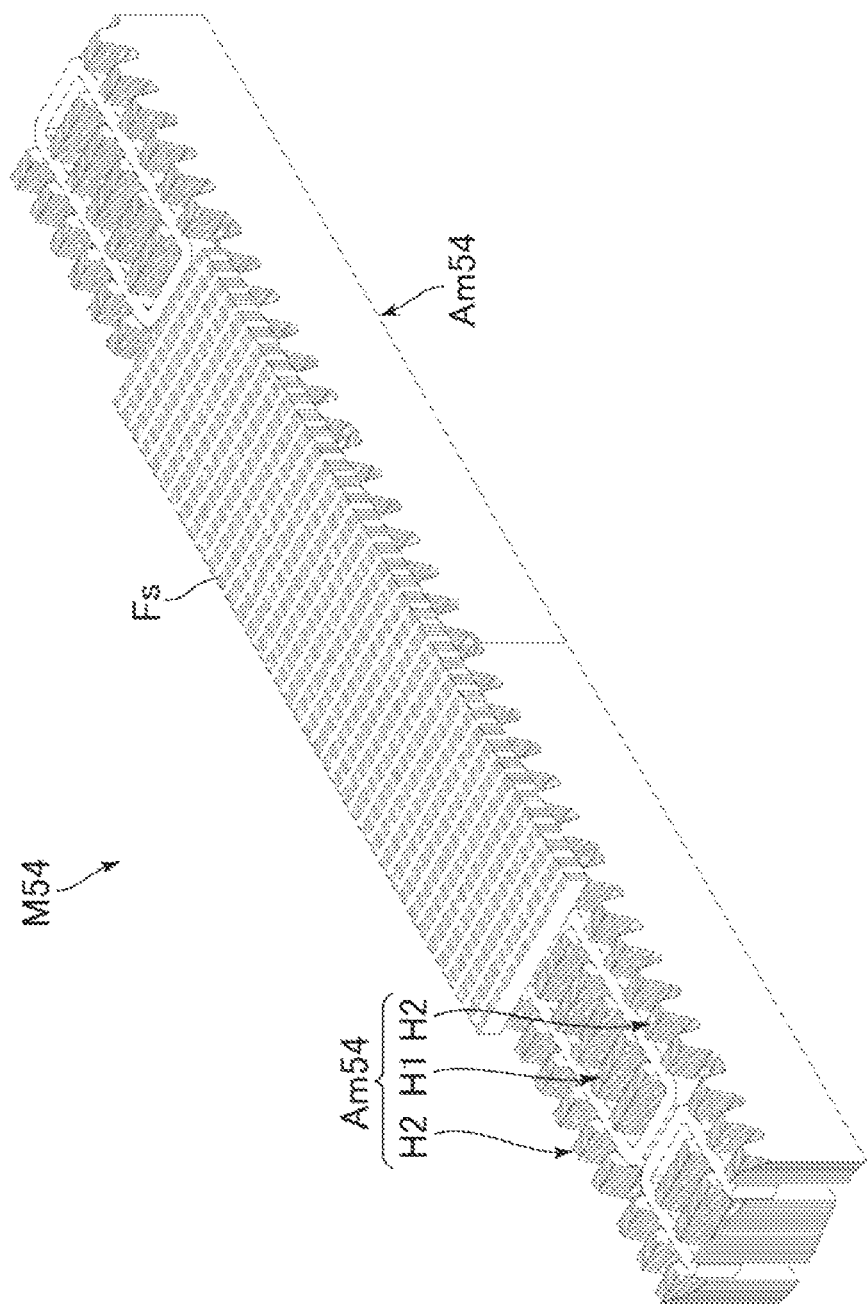
Figure 80B:
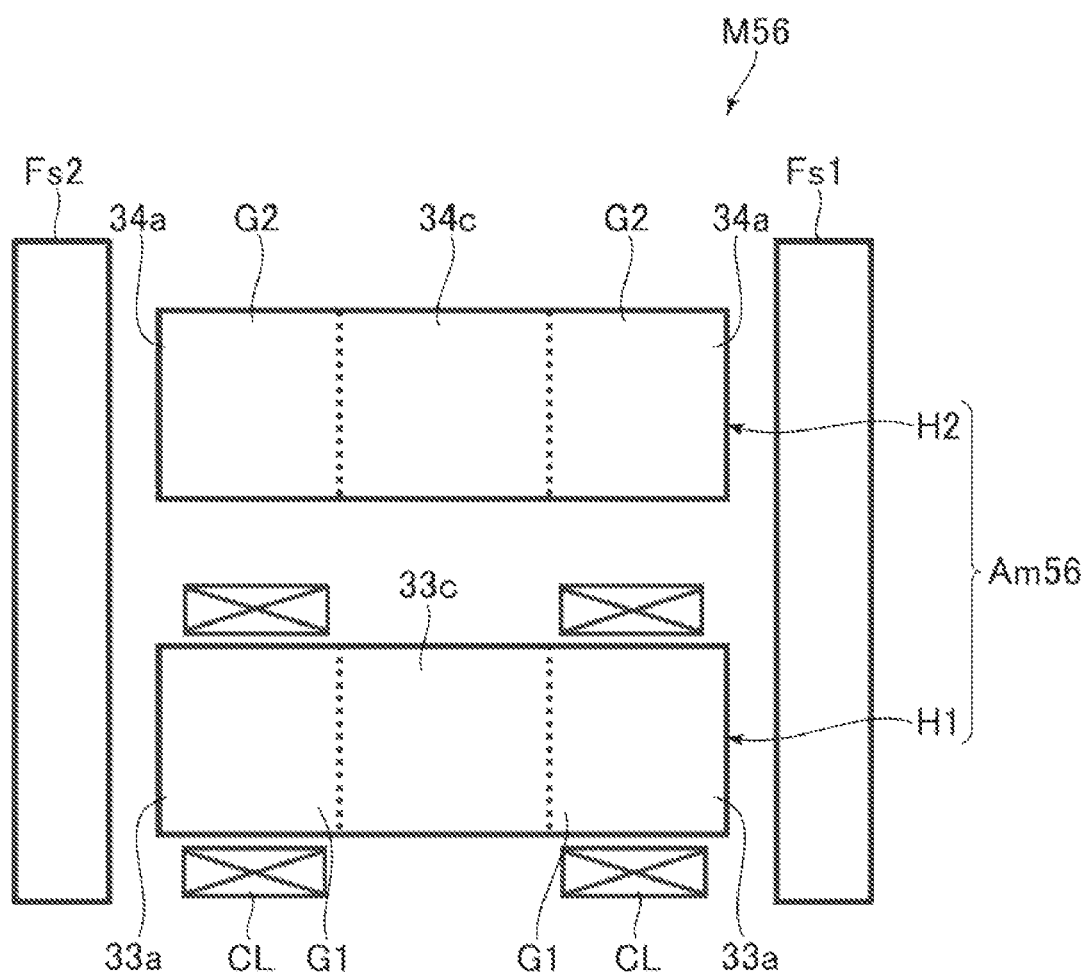
Figure 81A:
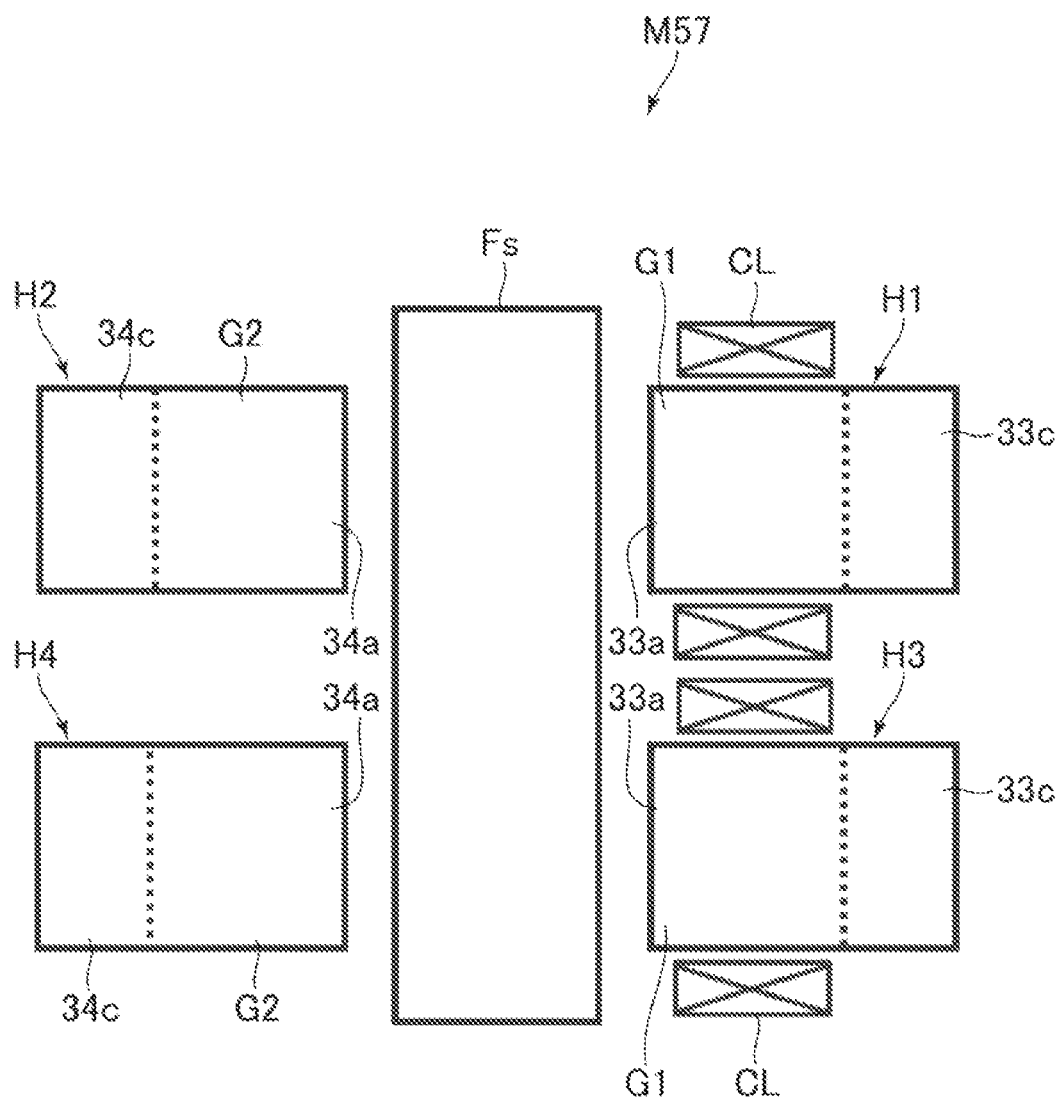
Figure 81B:
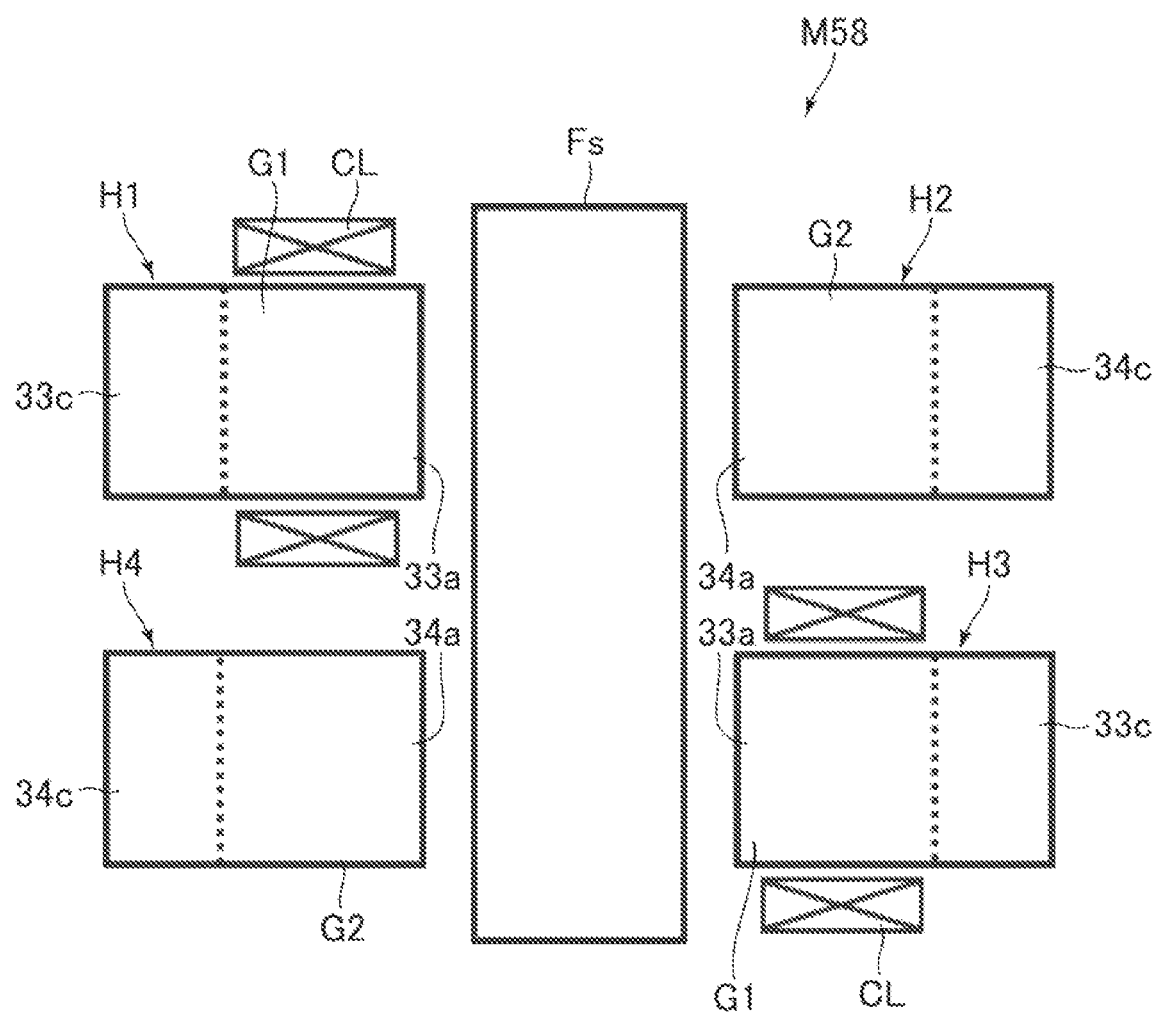
Figure 82A:
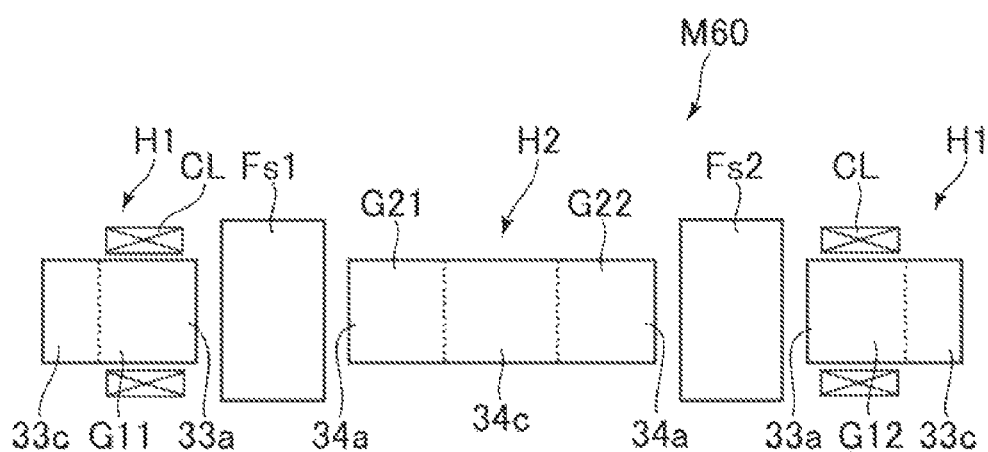
Figure 82B:
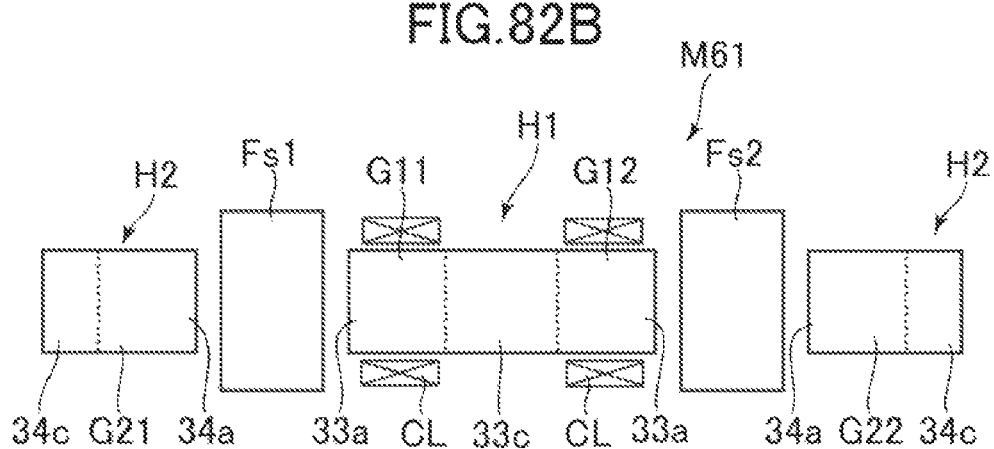
Figure 82C:
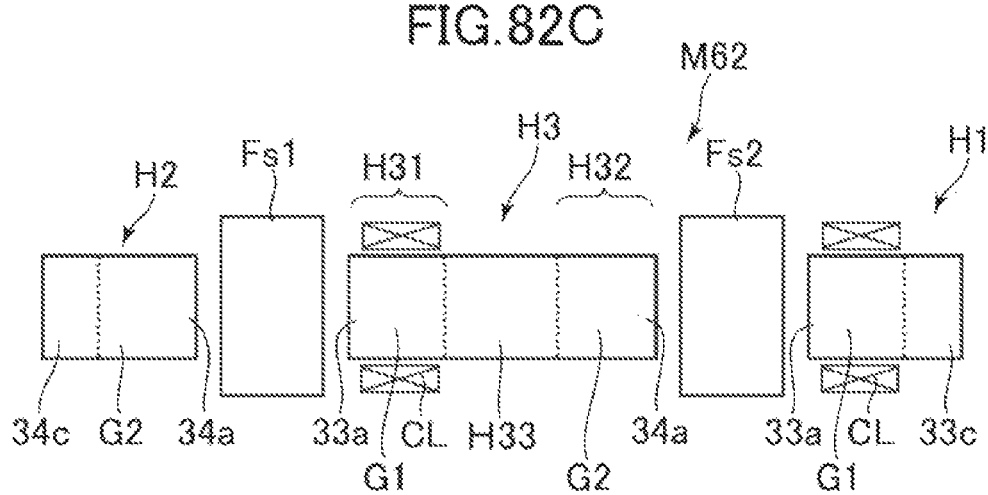
Figure 83A:
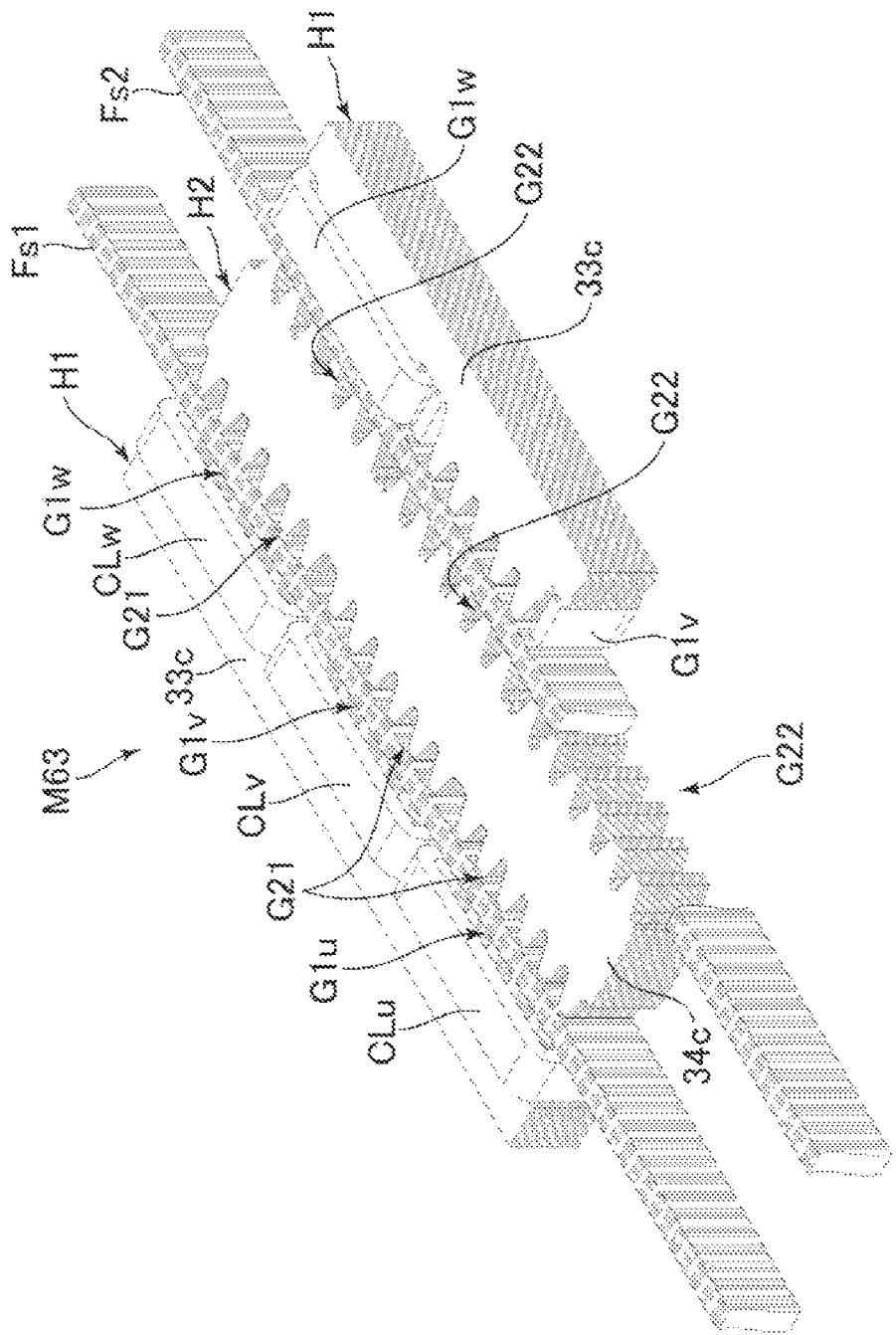
Figure 83B:
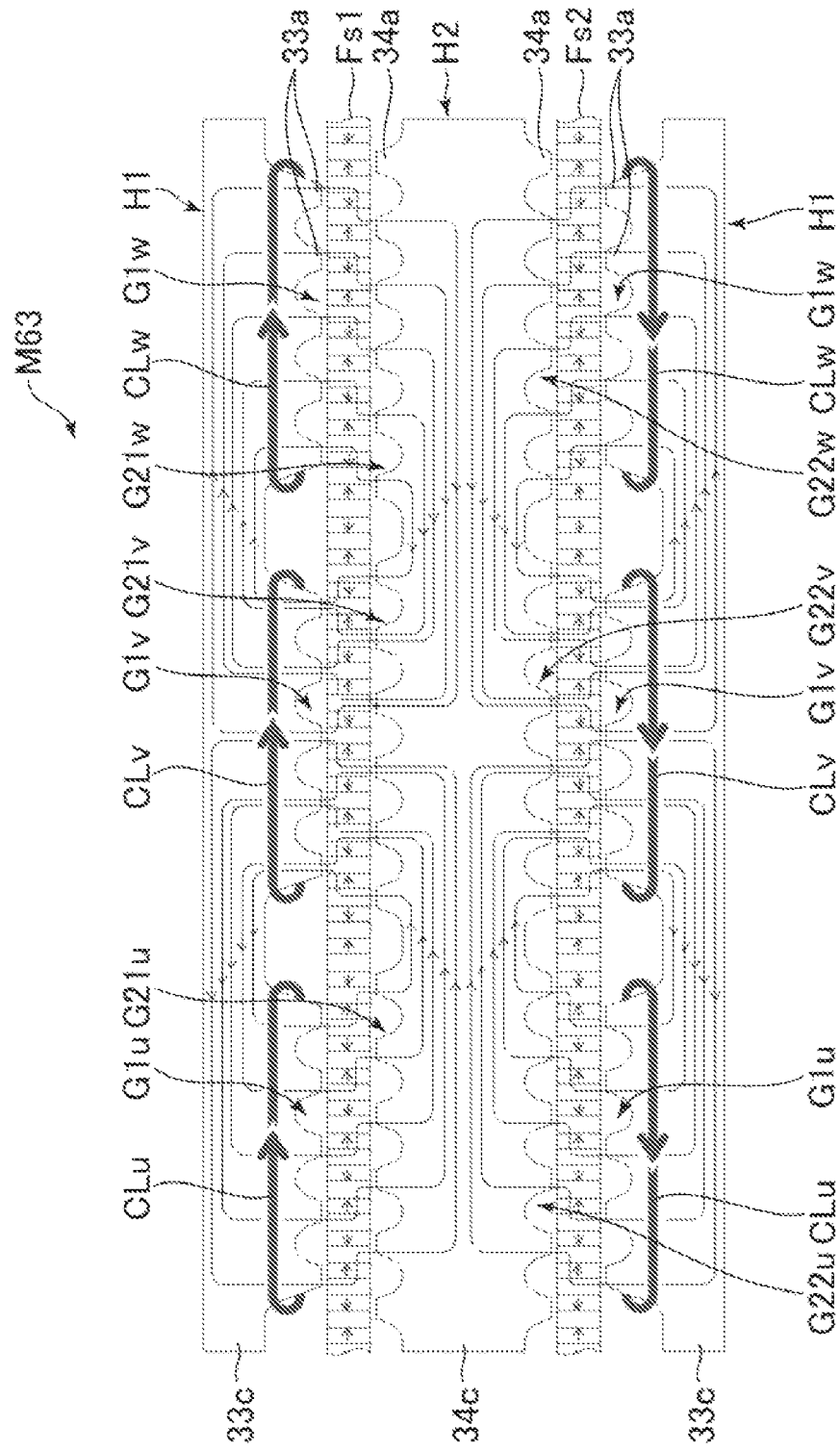
Figure 84A:
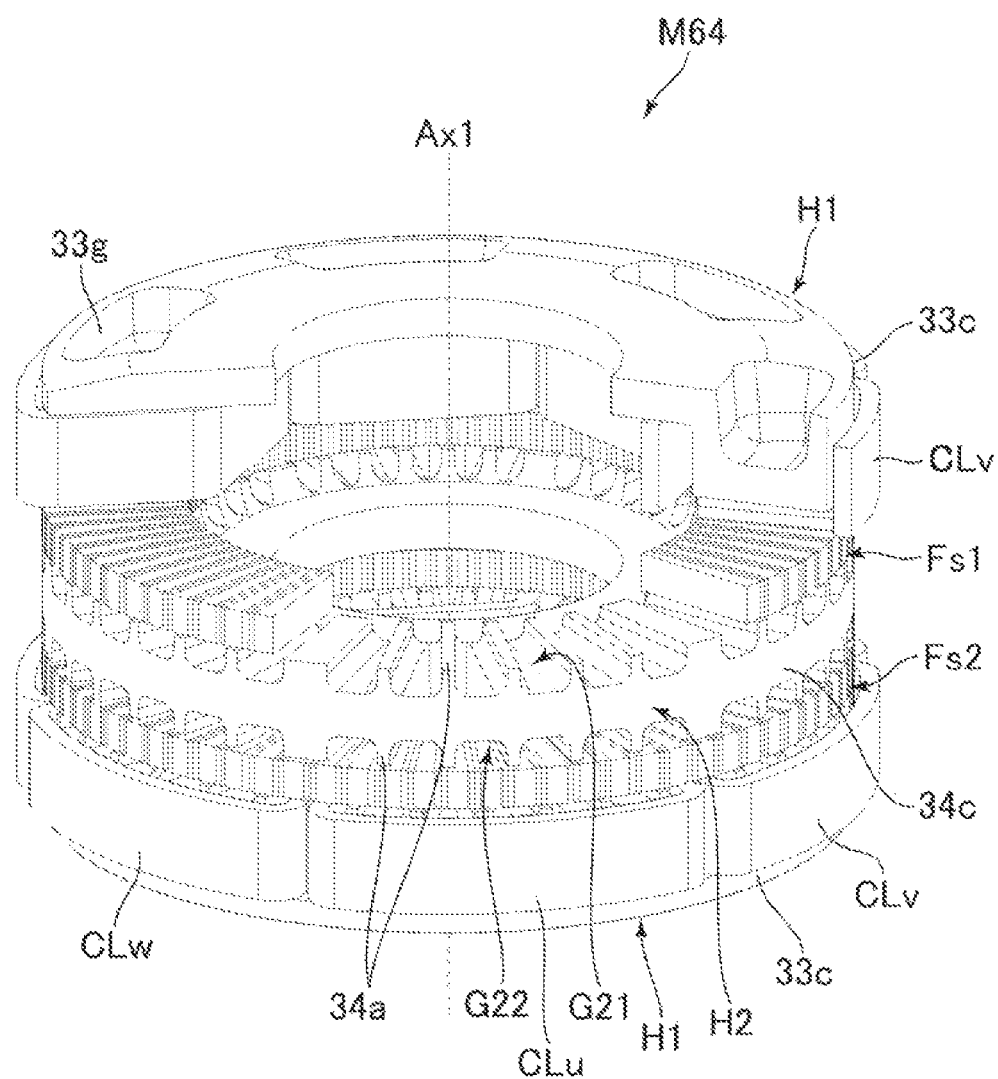
Figure 84B:
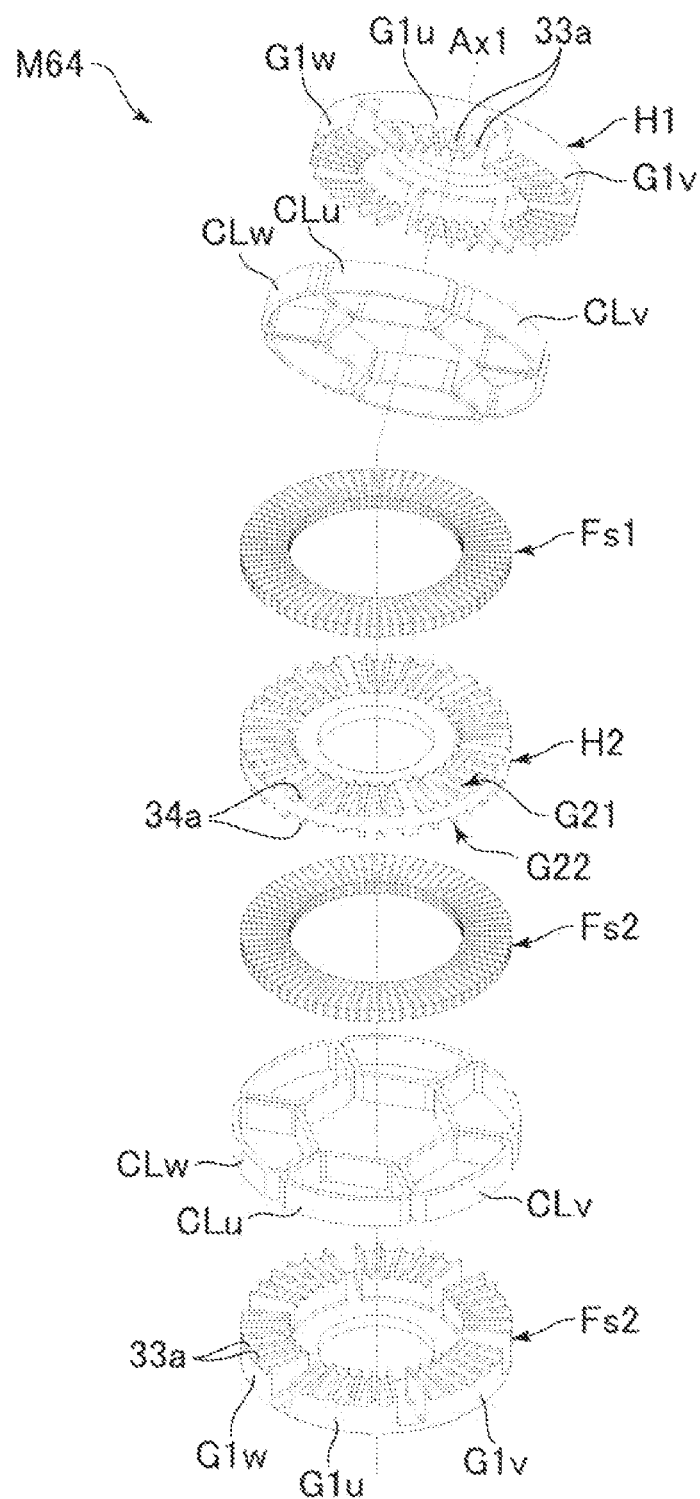
Figure 85A:
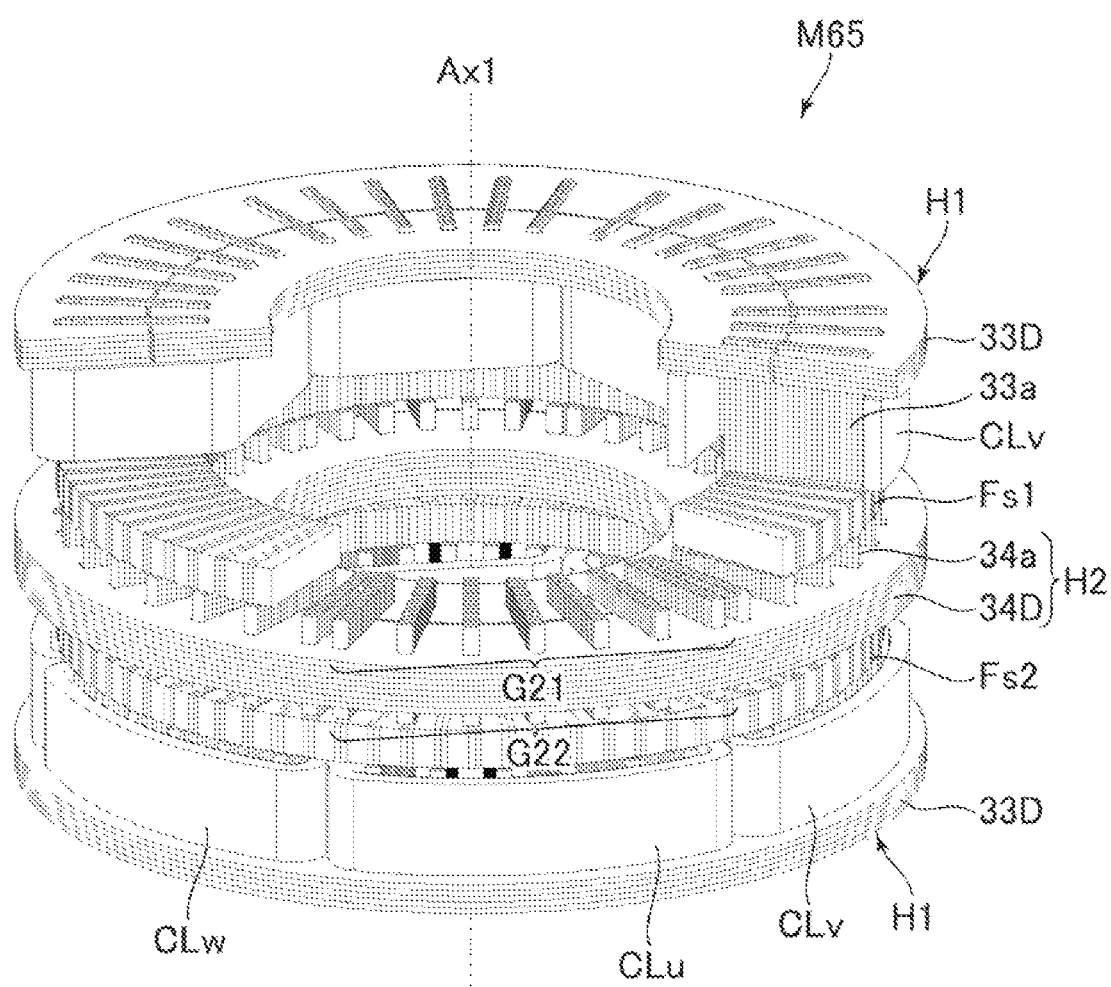
Figure 85B:
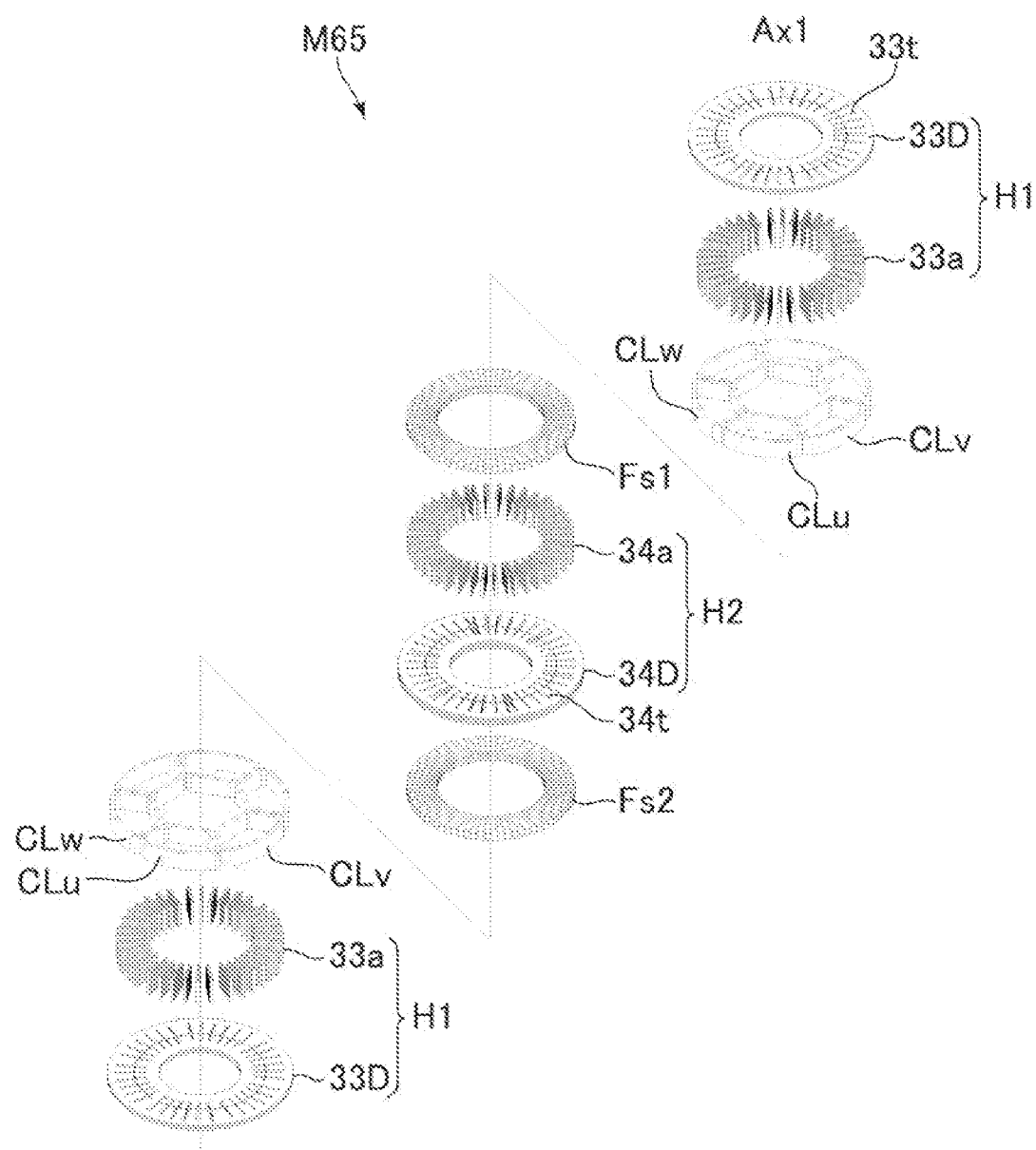
Figure 86A:
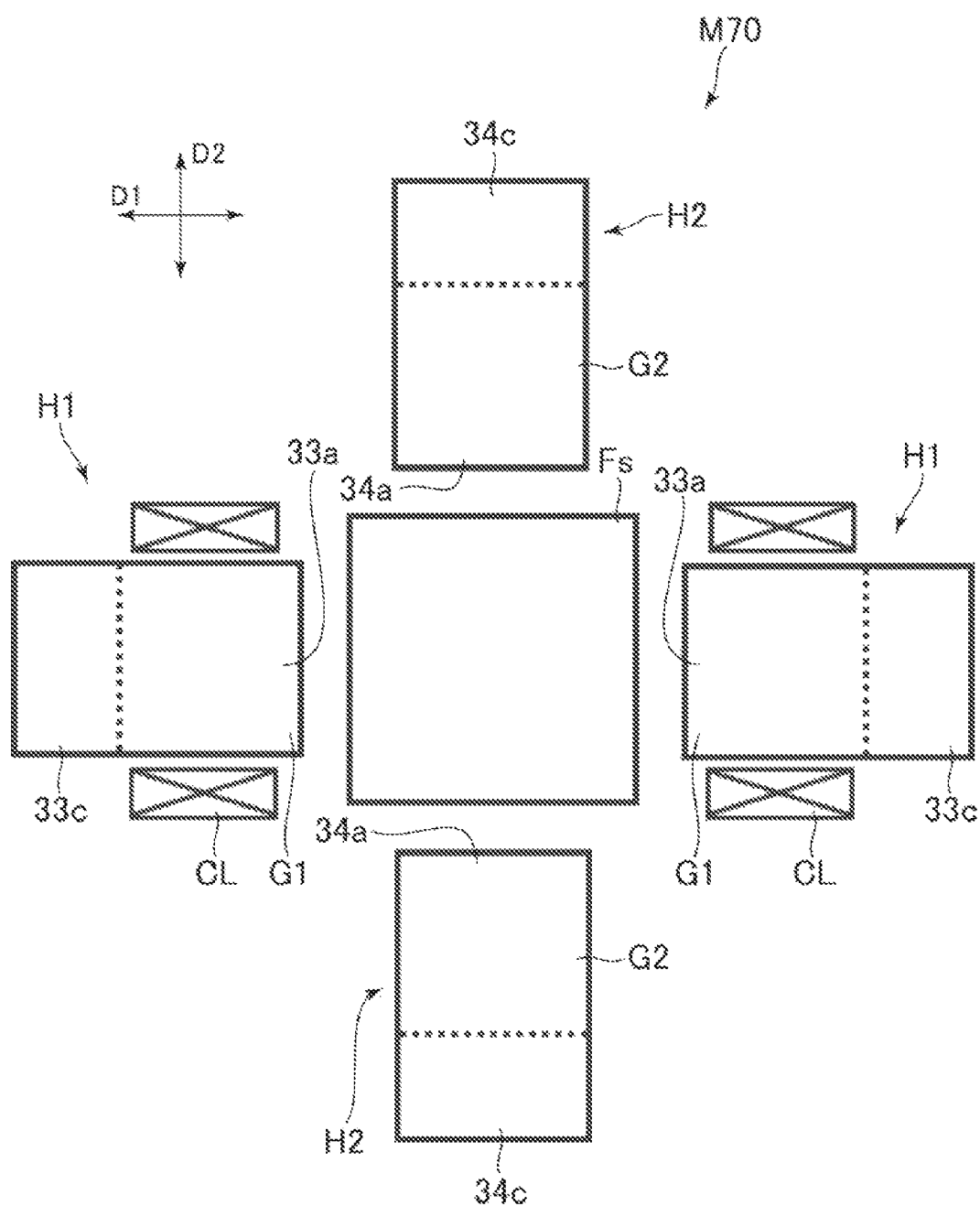
Figure 86B:
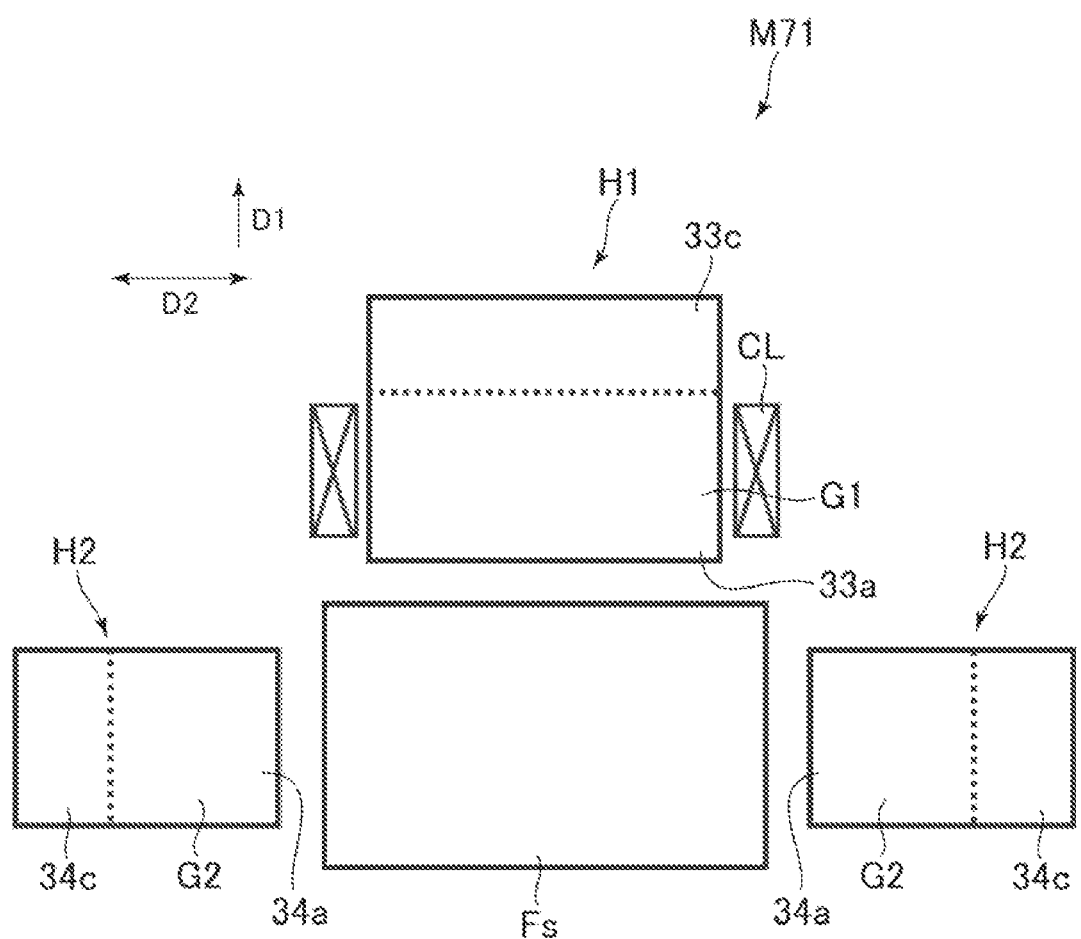
Figure 87A:
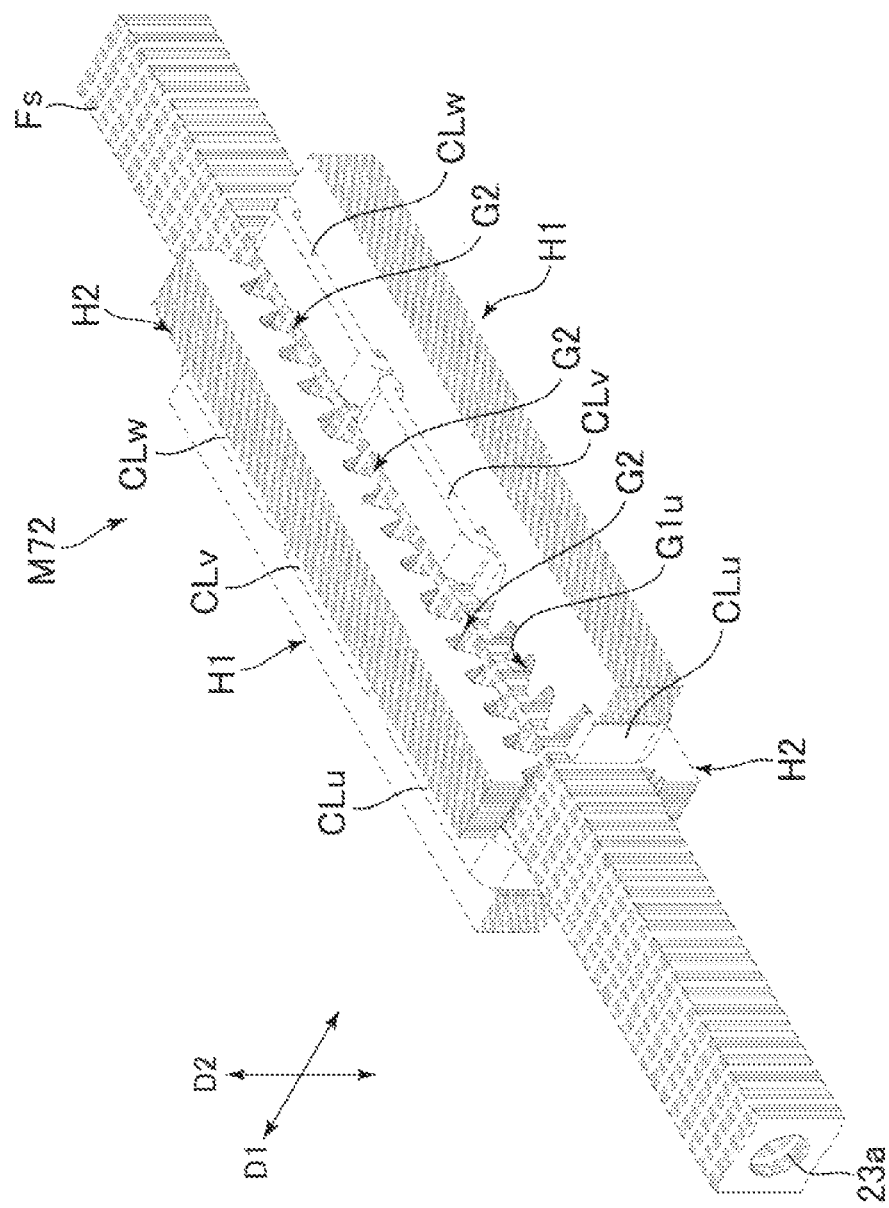
Figure 88B:
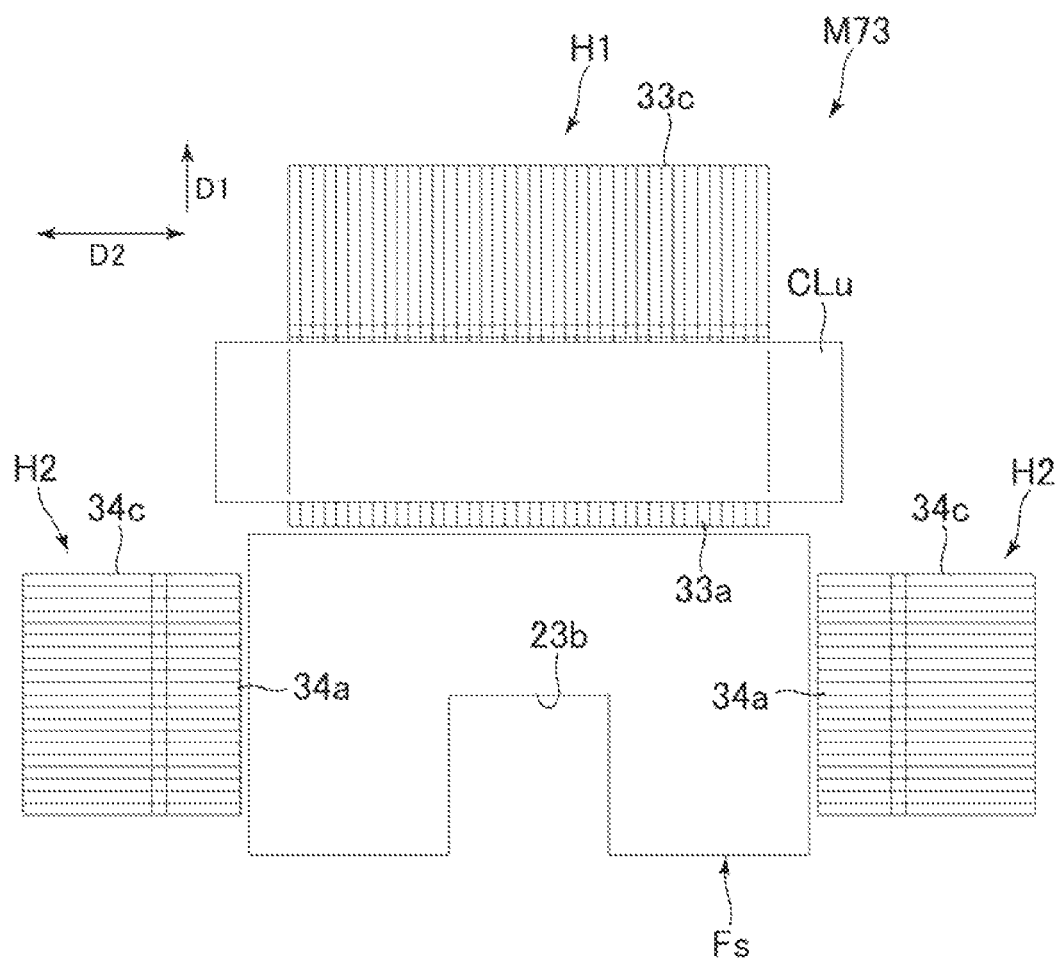
Figure 89A:
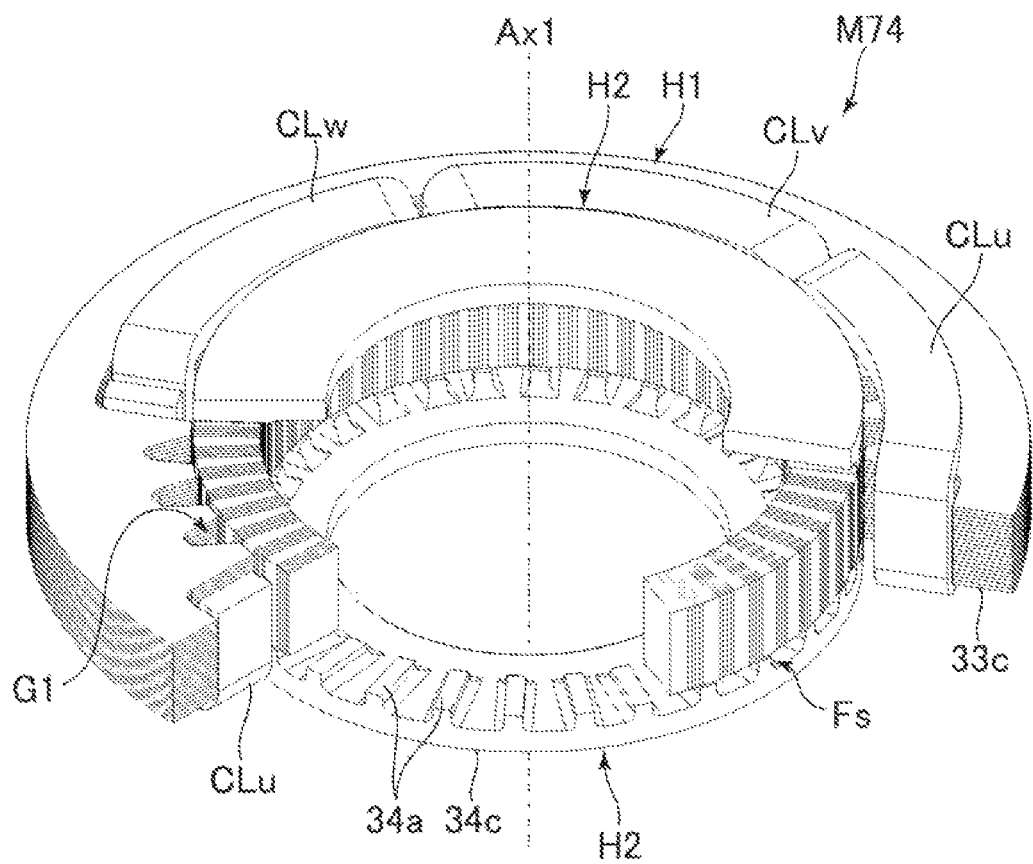
Figure 89B:
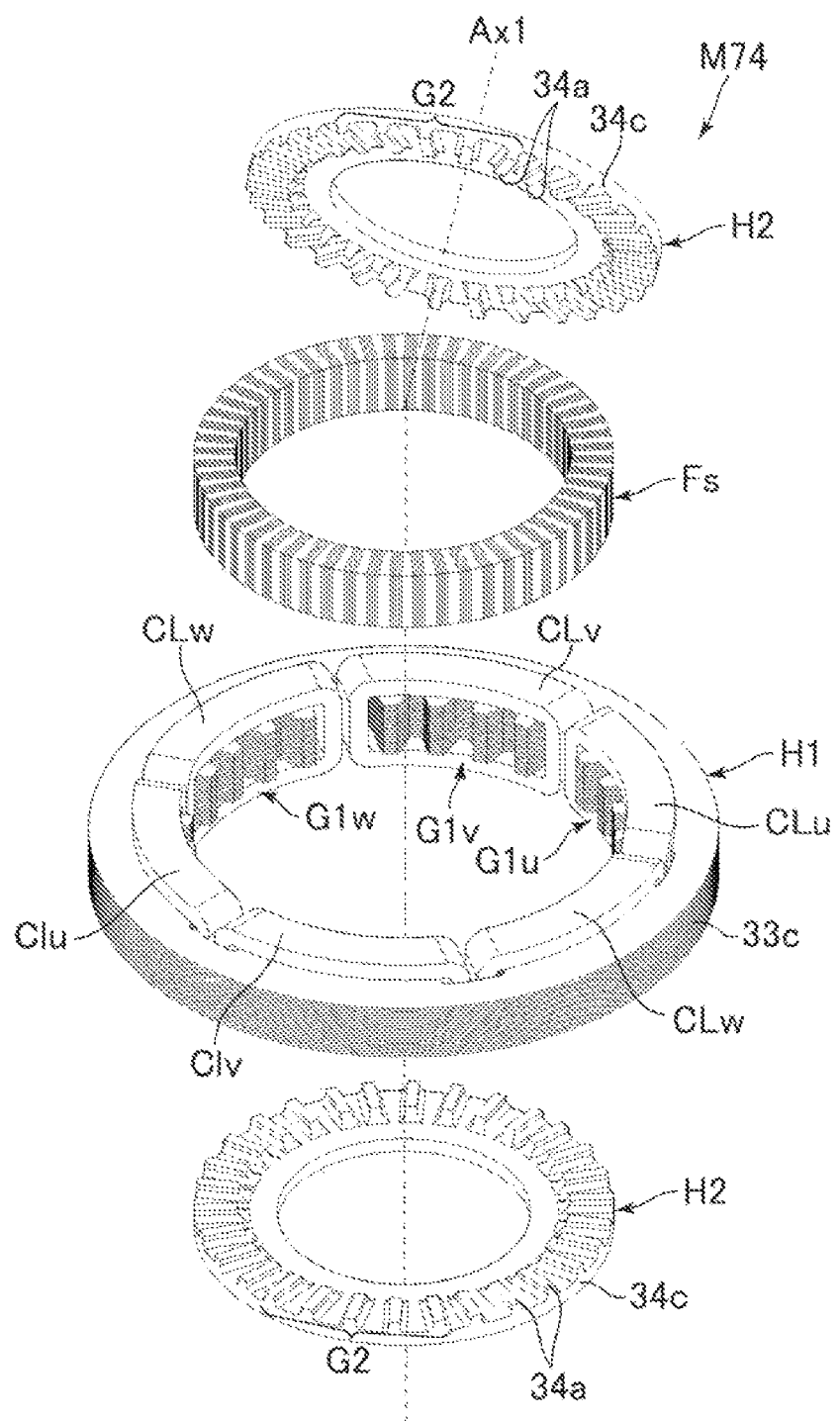
Figure 90A:
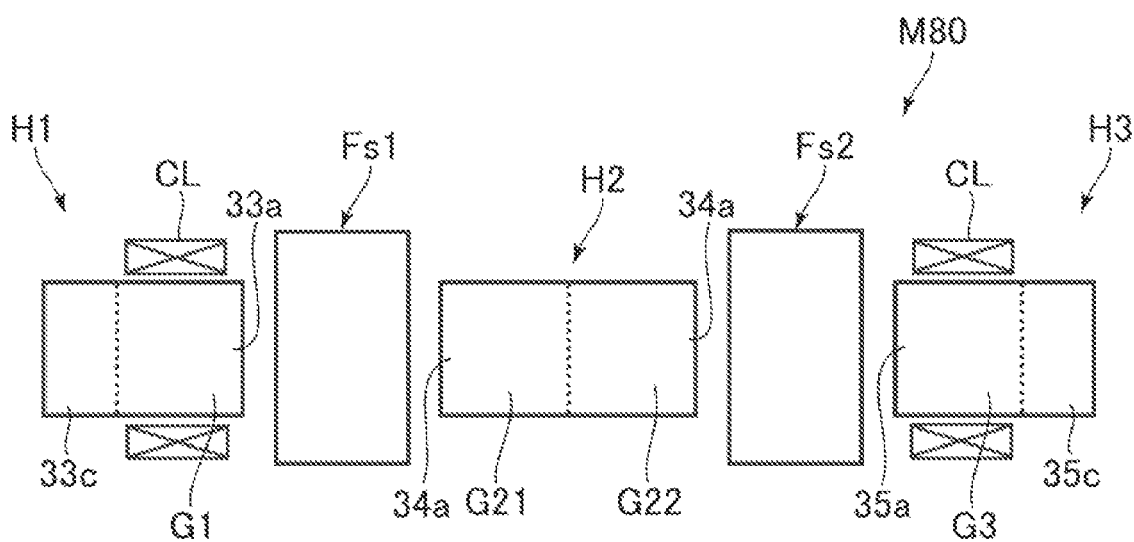
Figure 90B:
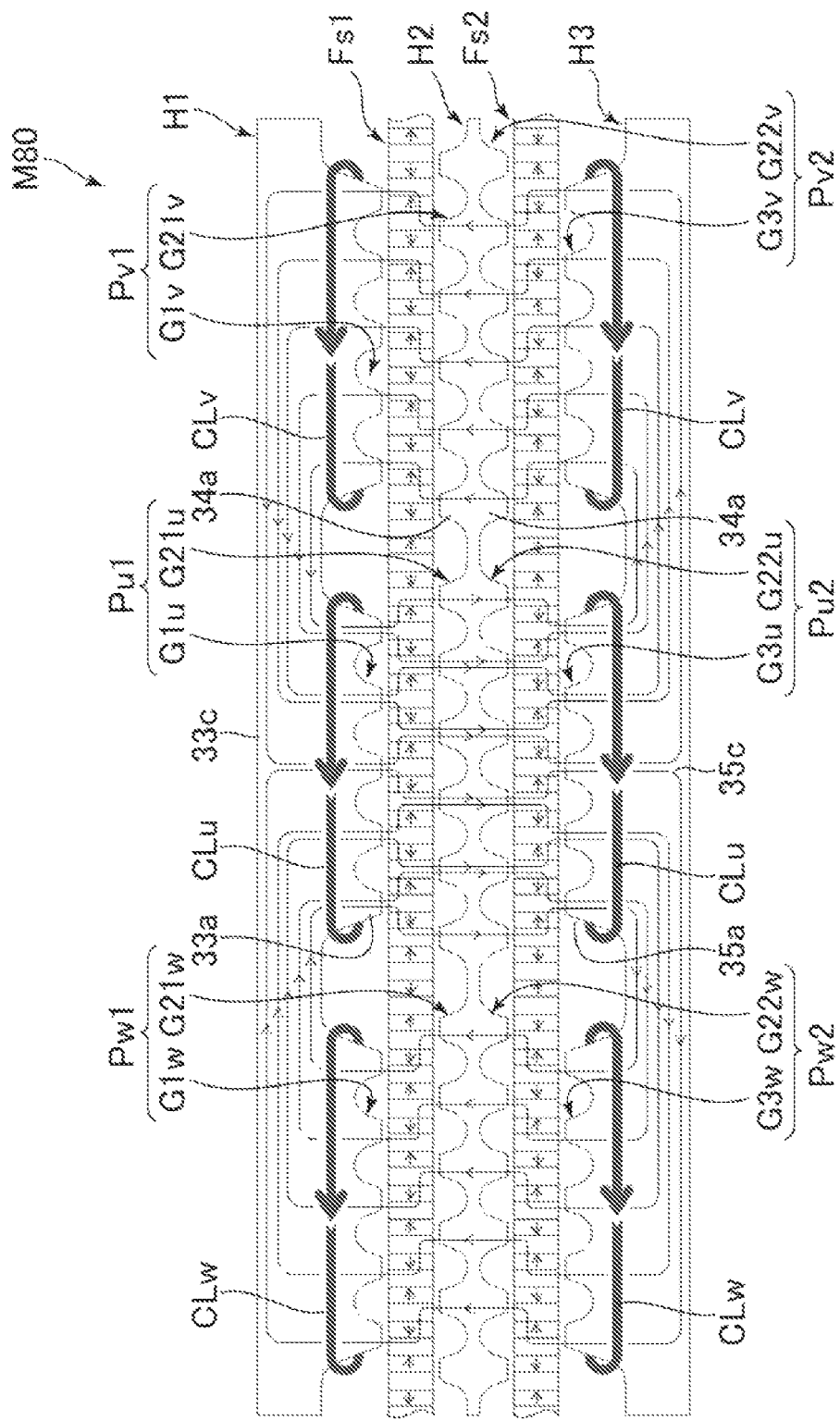
Figure 91A:
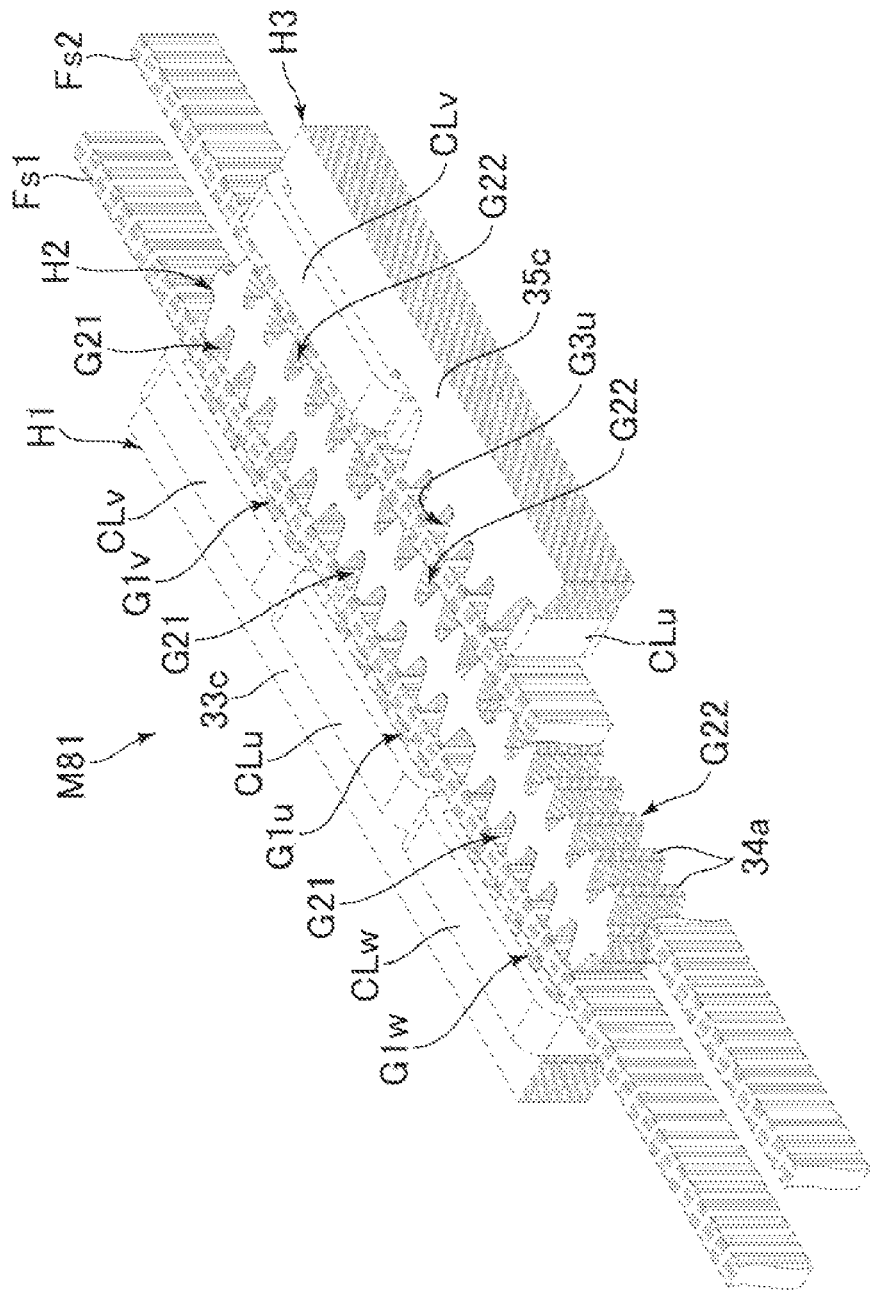
Figure 91B:
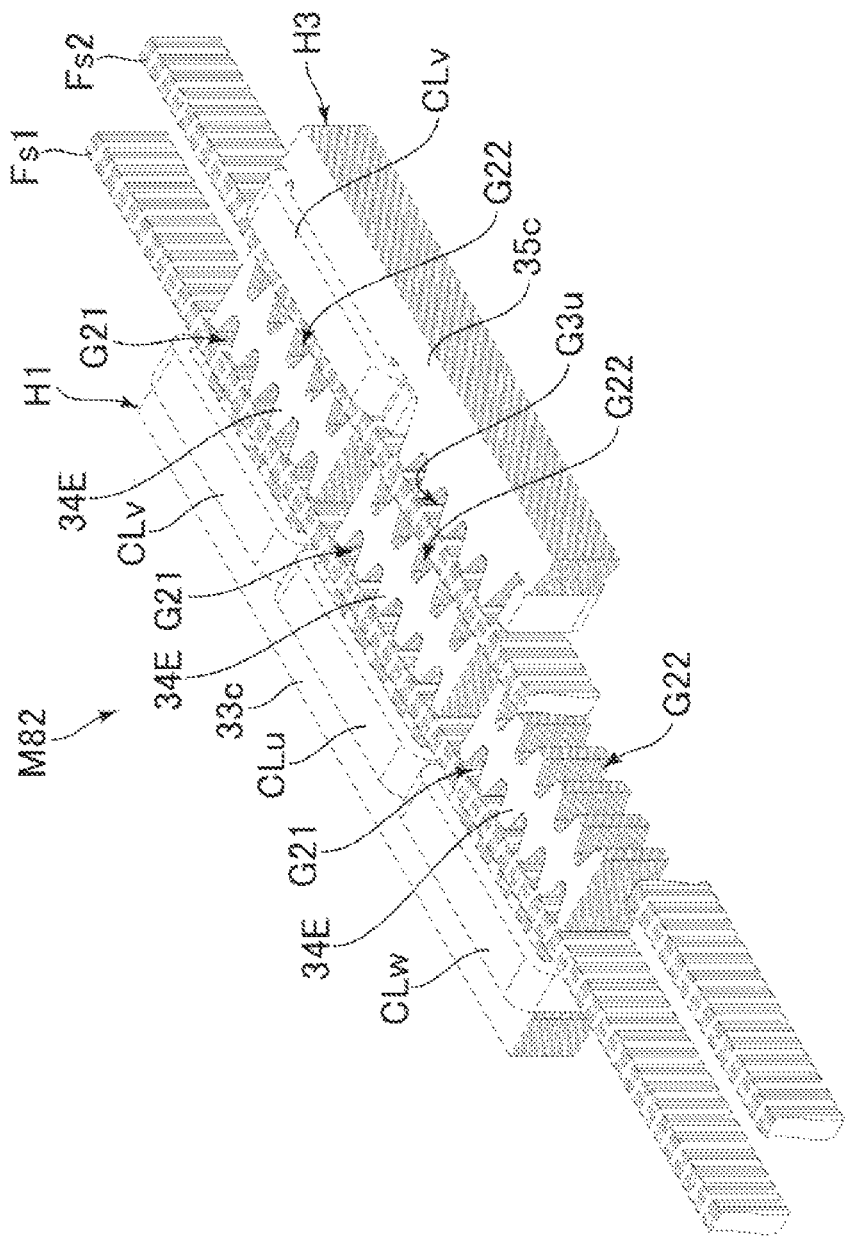
Figure 92:
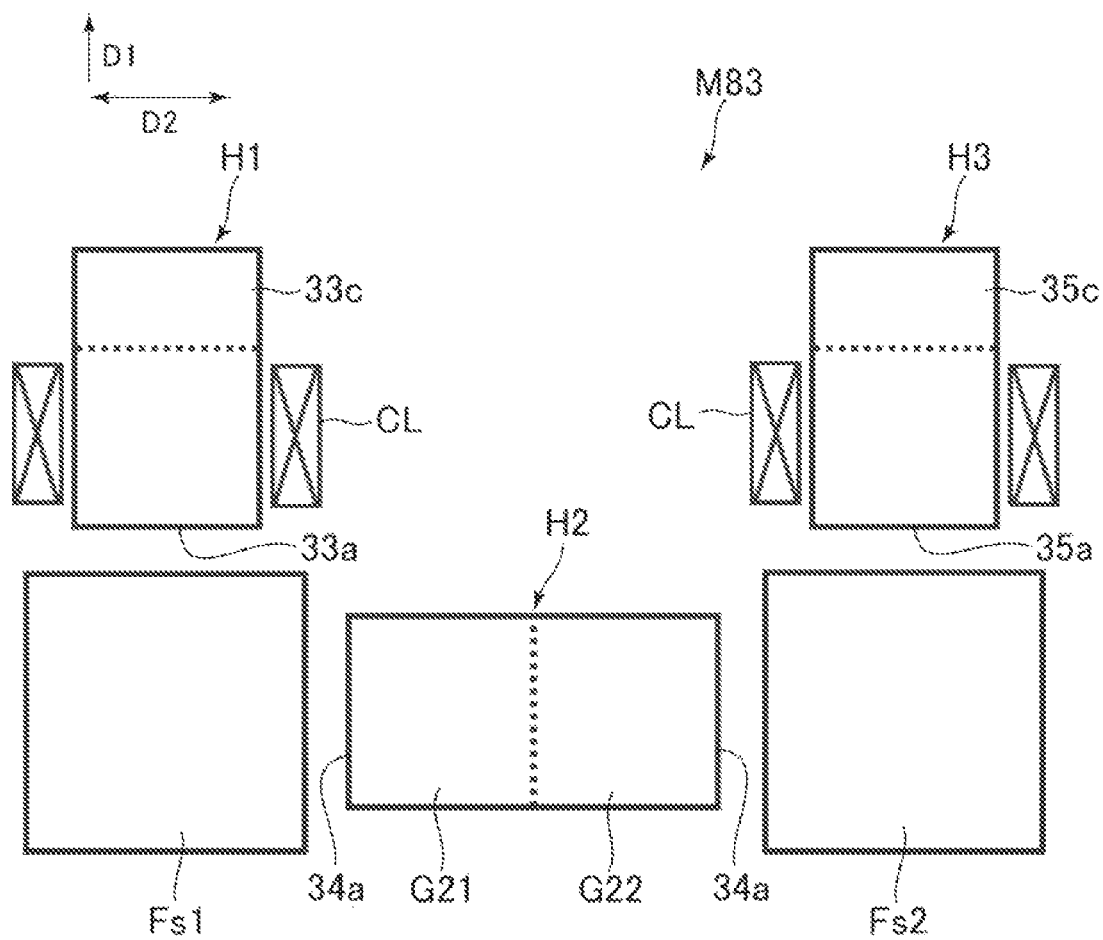
Figure 93A:
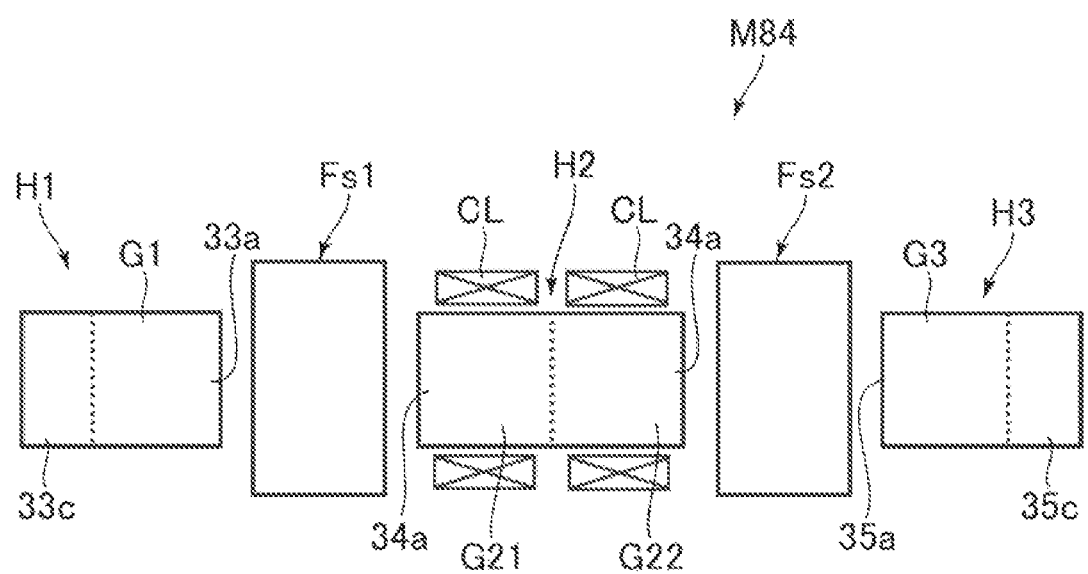
Figure 93B:
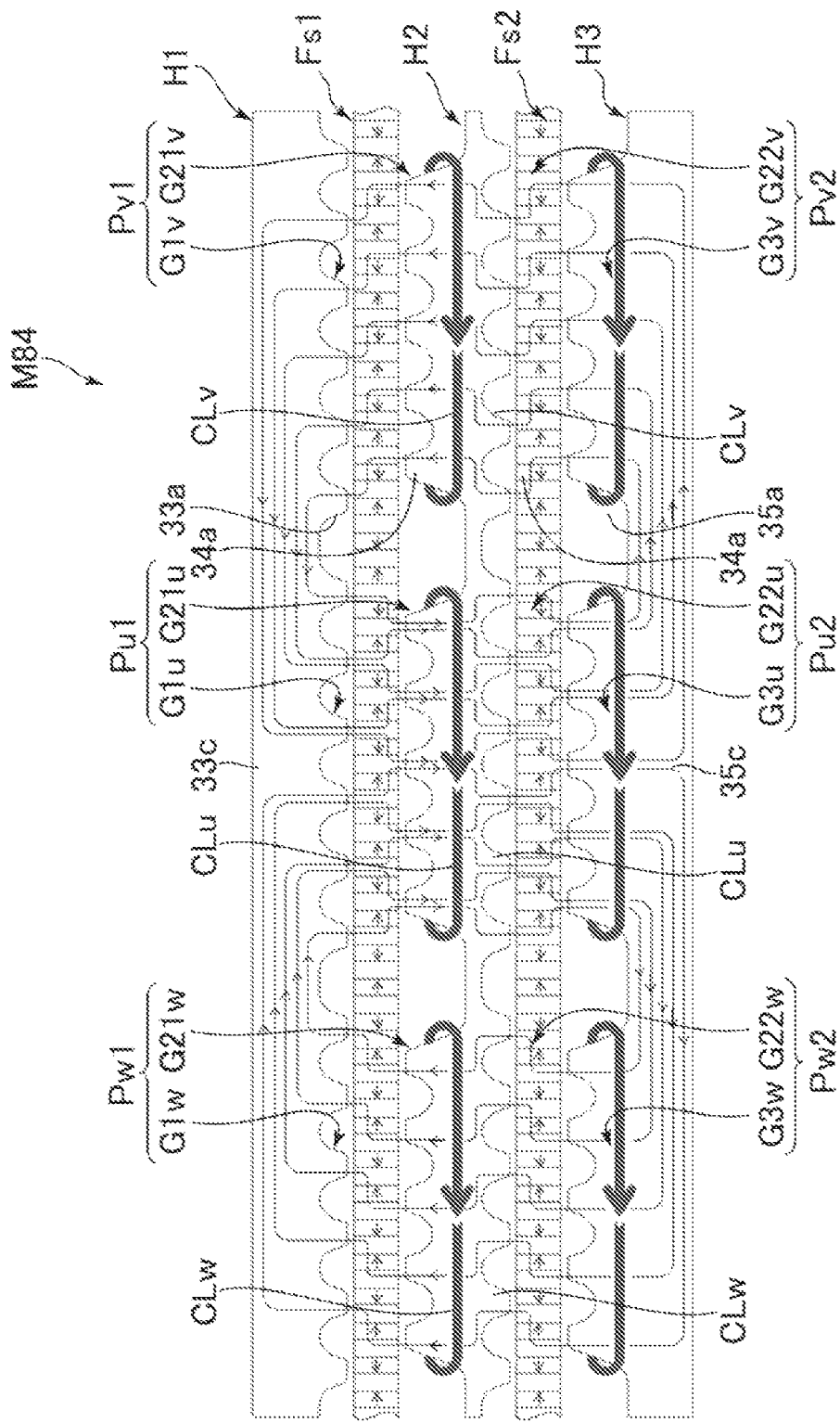
Figure 95A:
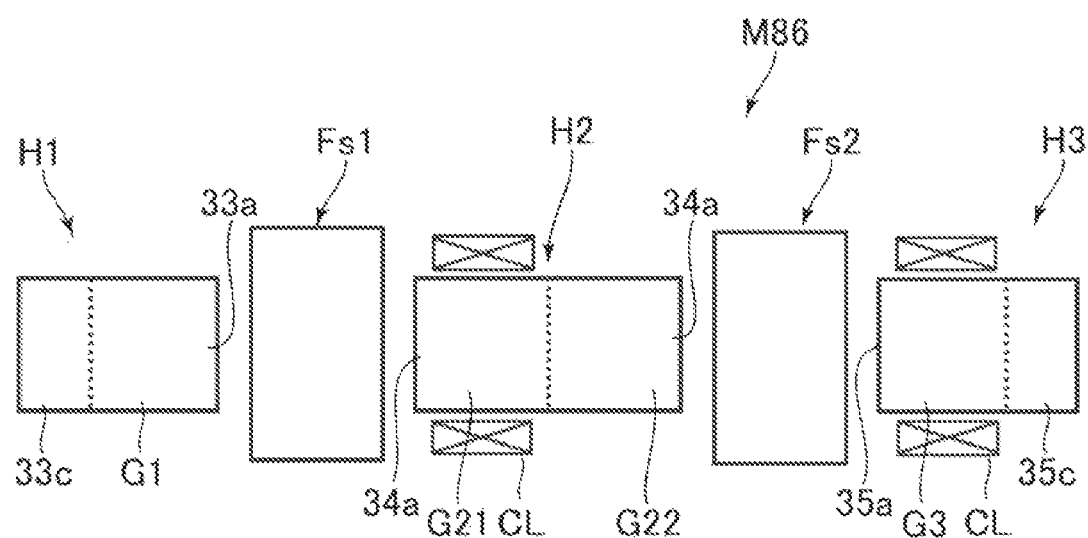
Figure 95B:
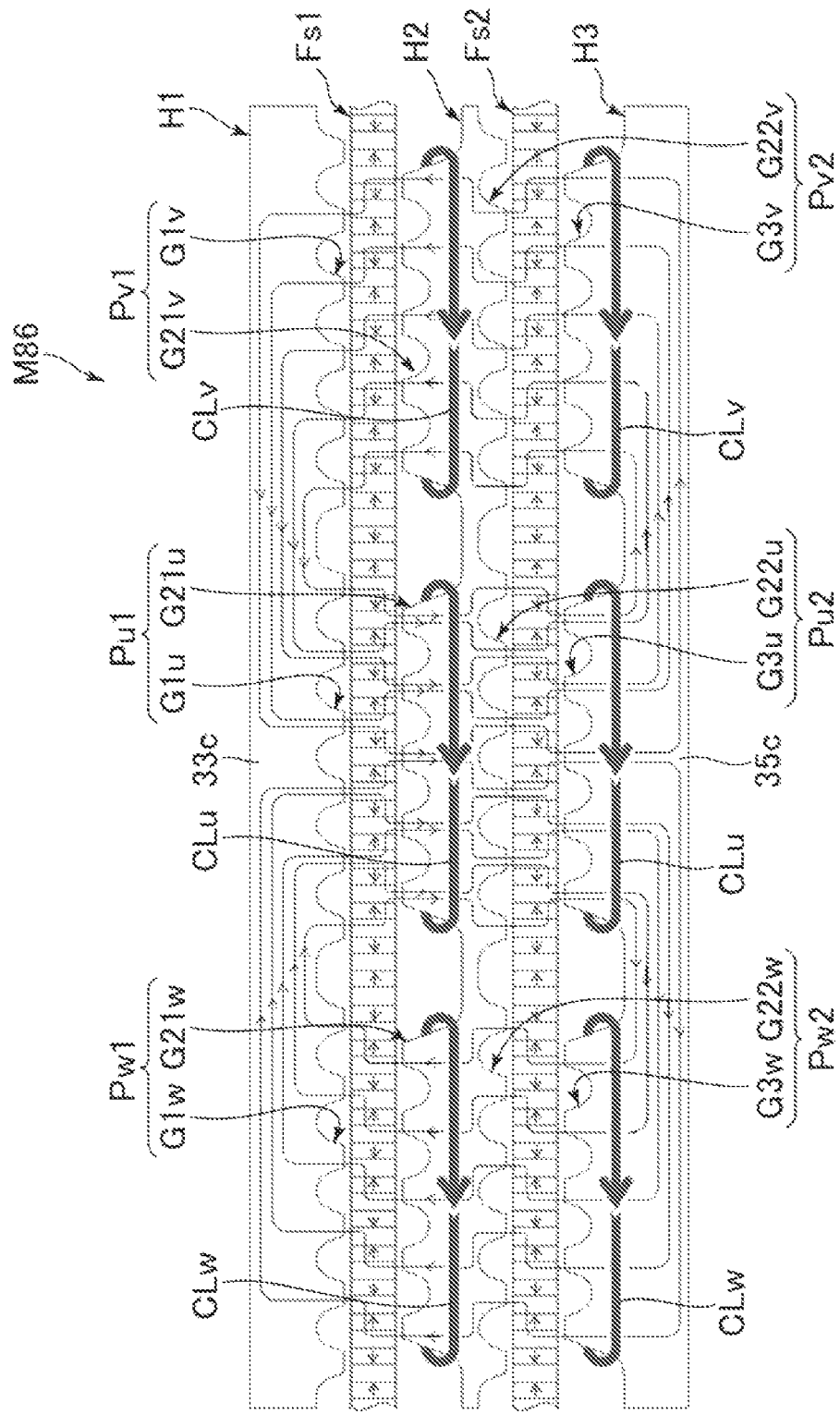
Figure 96:
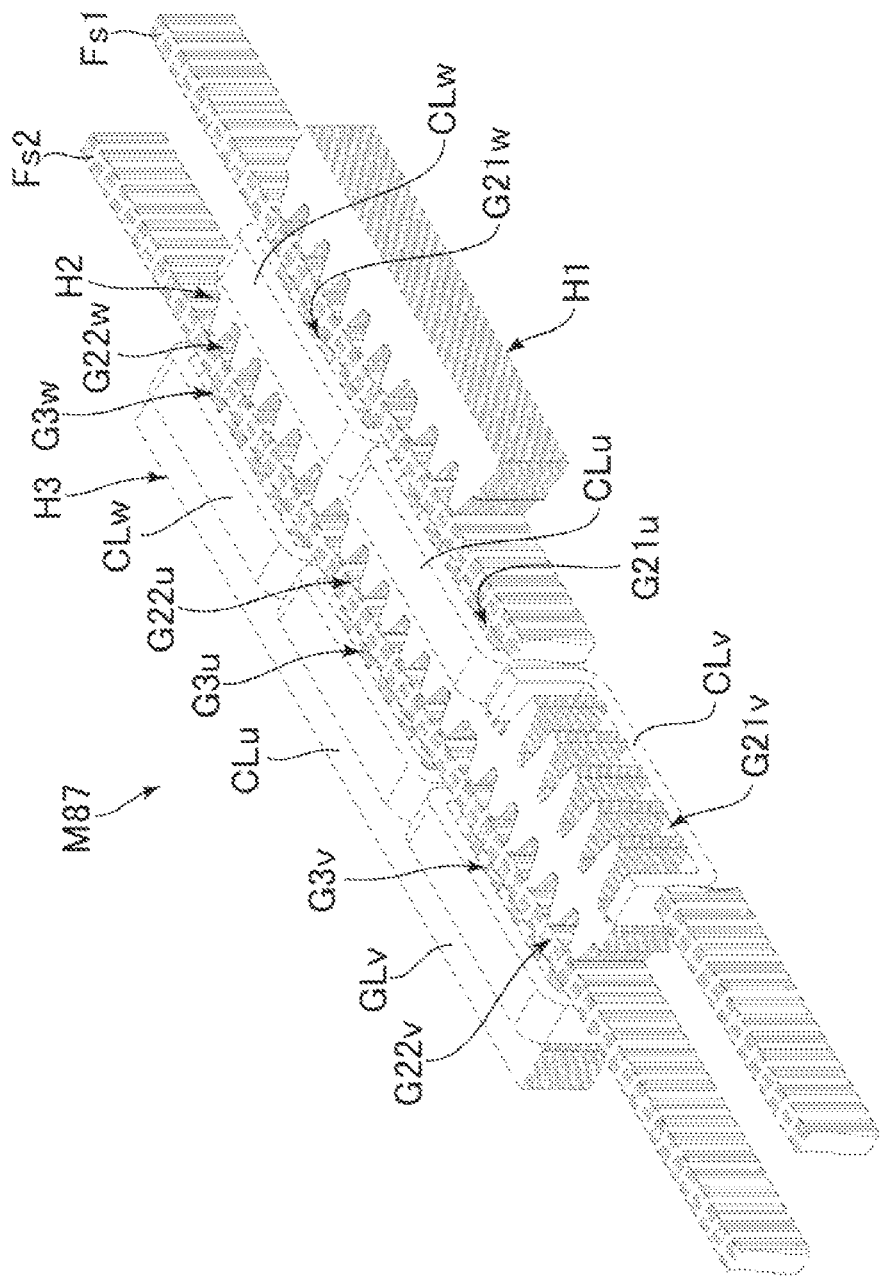
Figure 97:
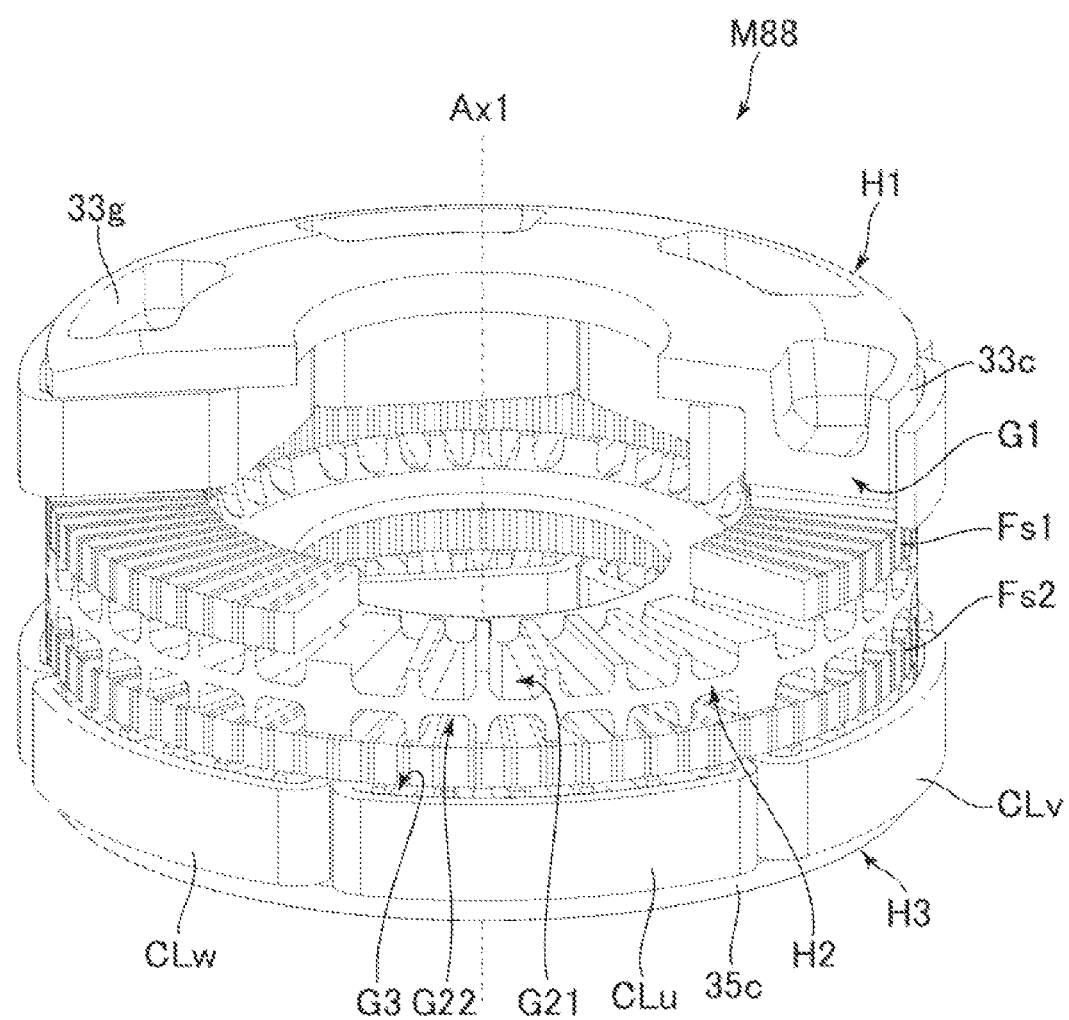
Figure 98:
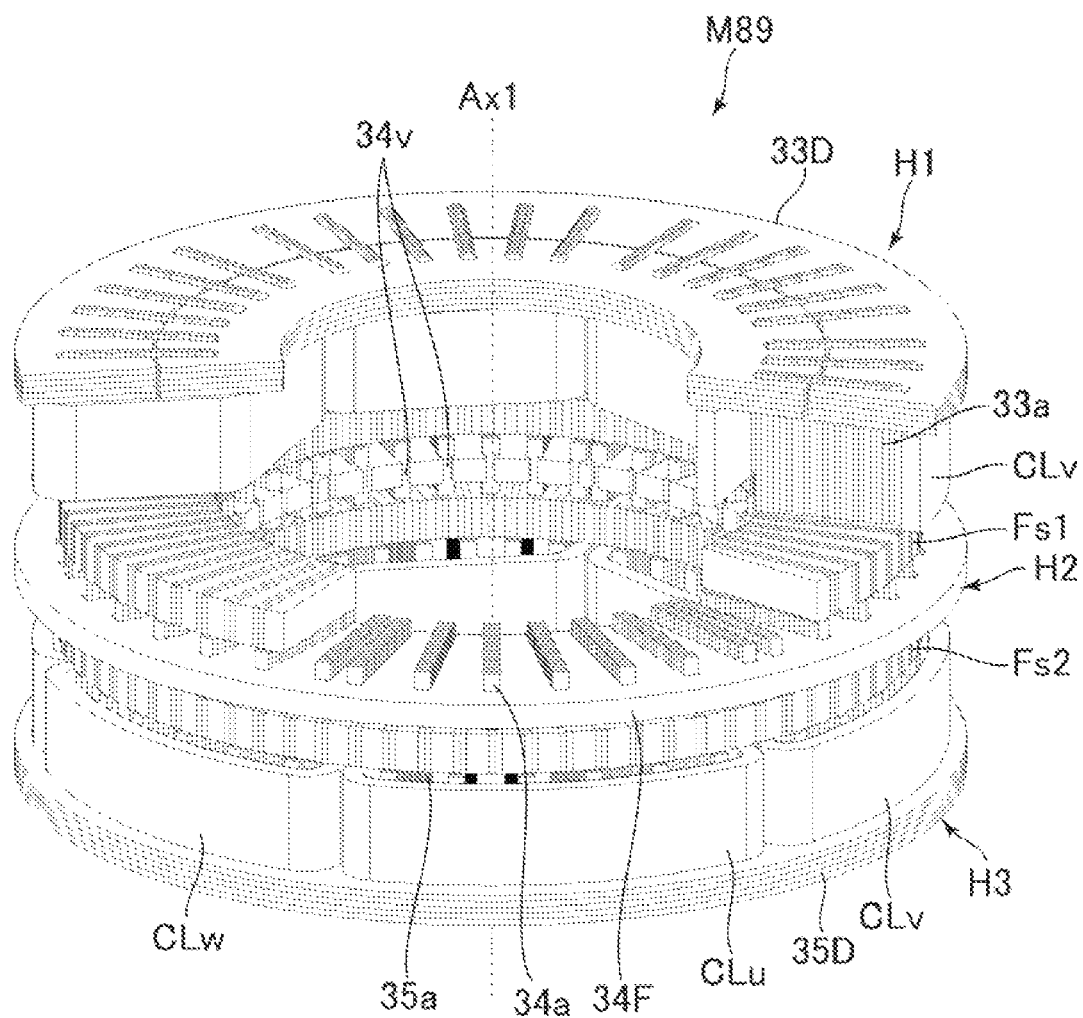
Figure 99:
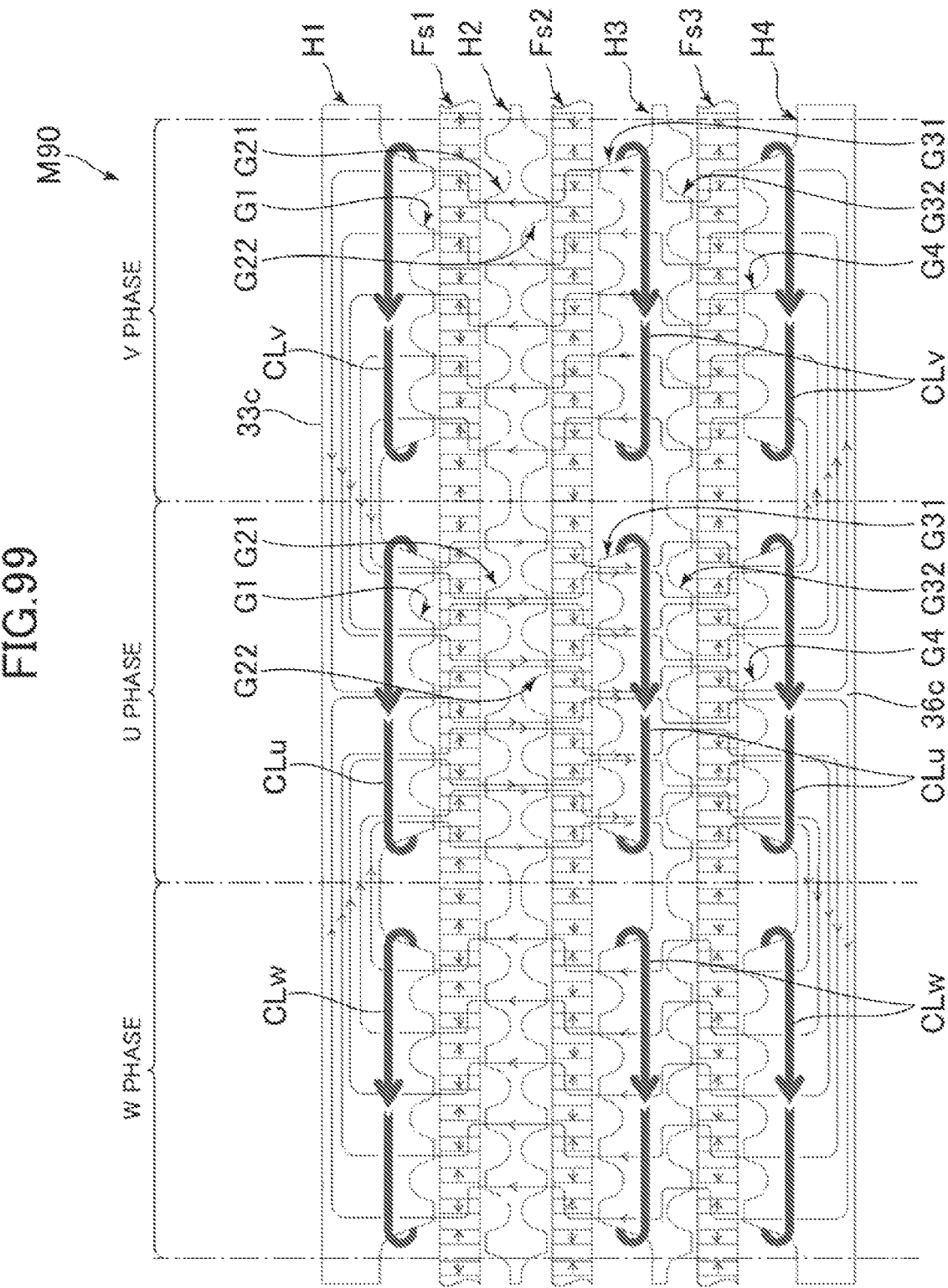
Figure 100A:
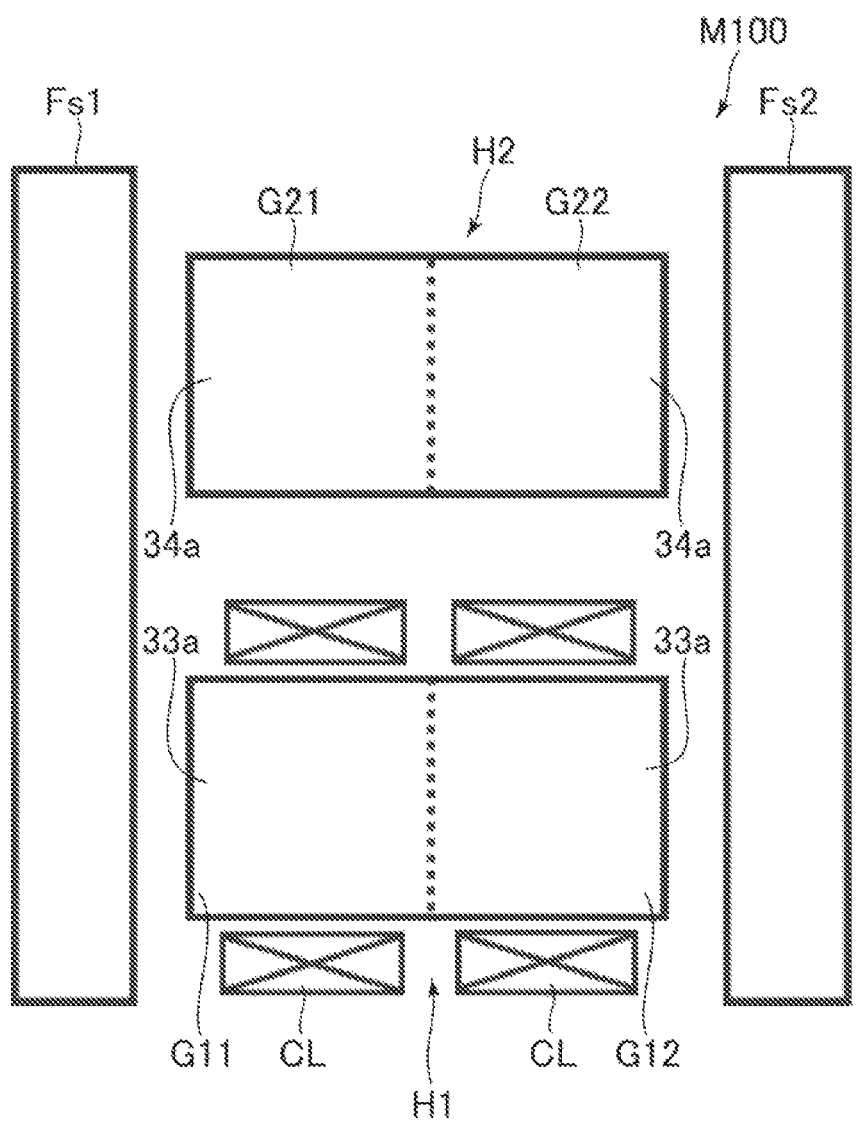
Figure 100B:
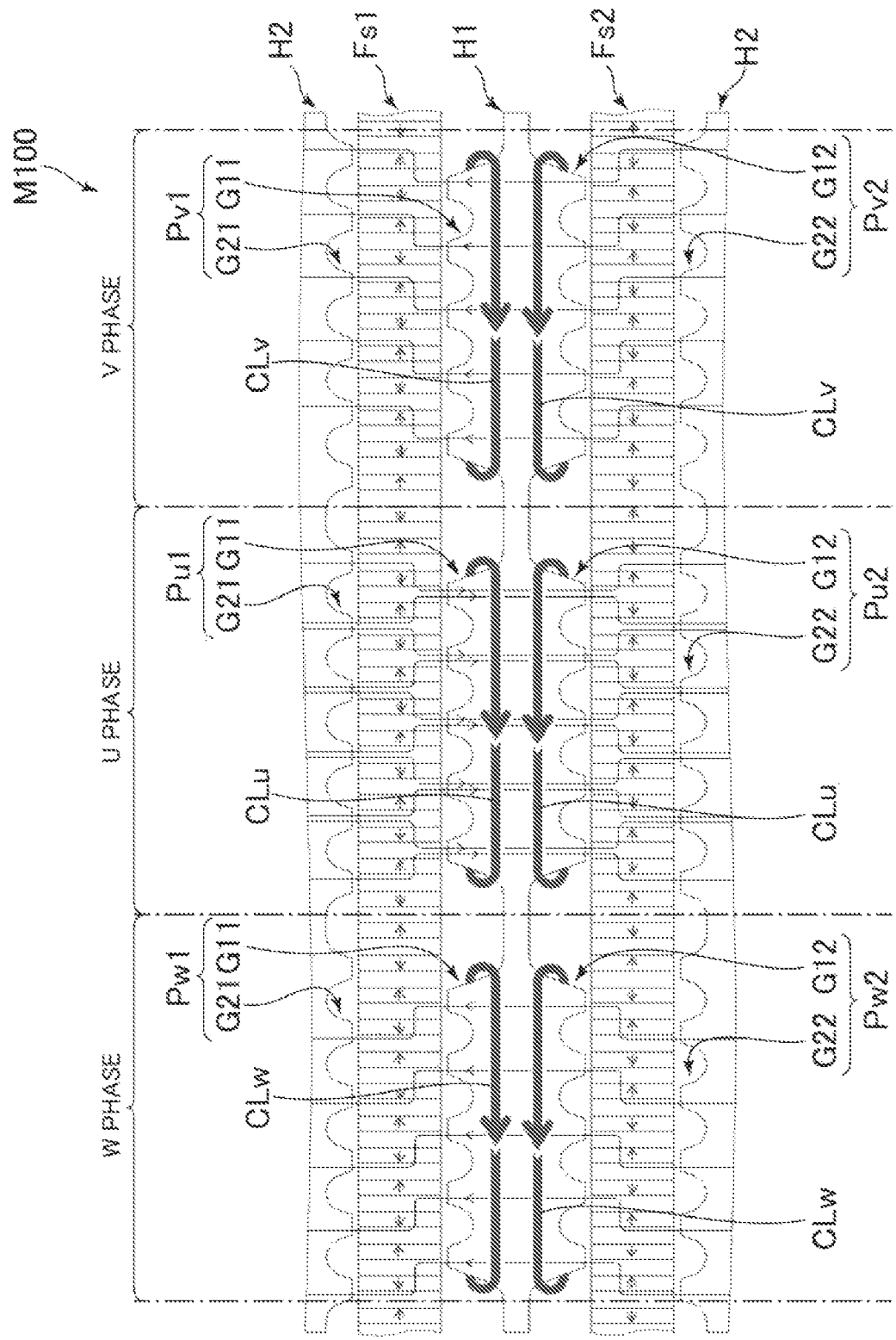
Figure 101:
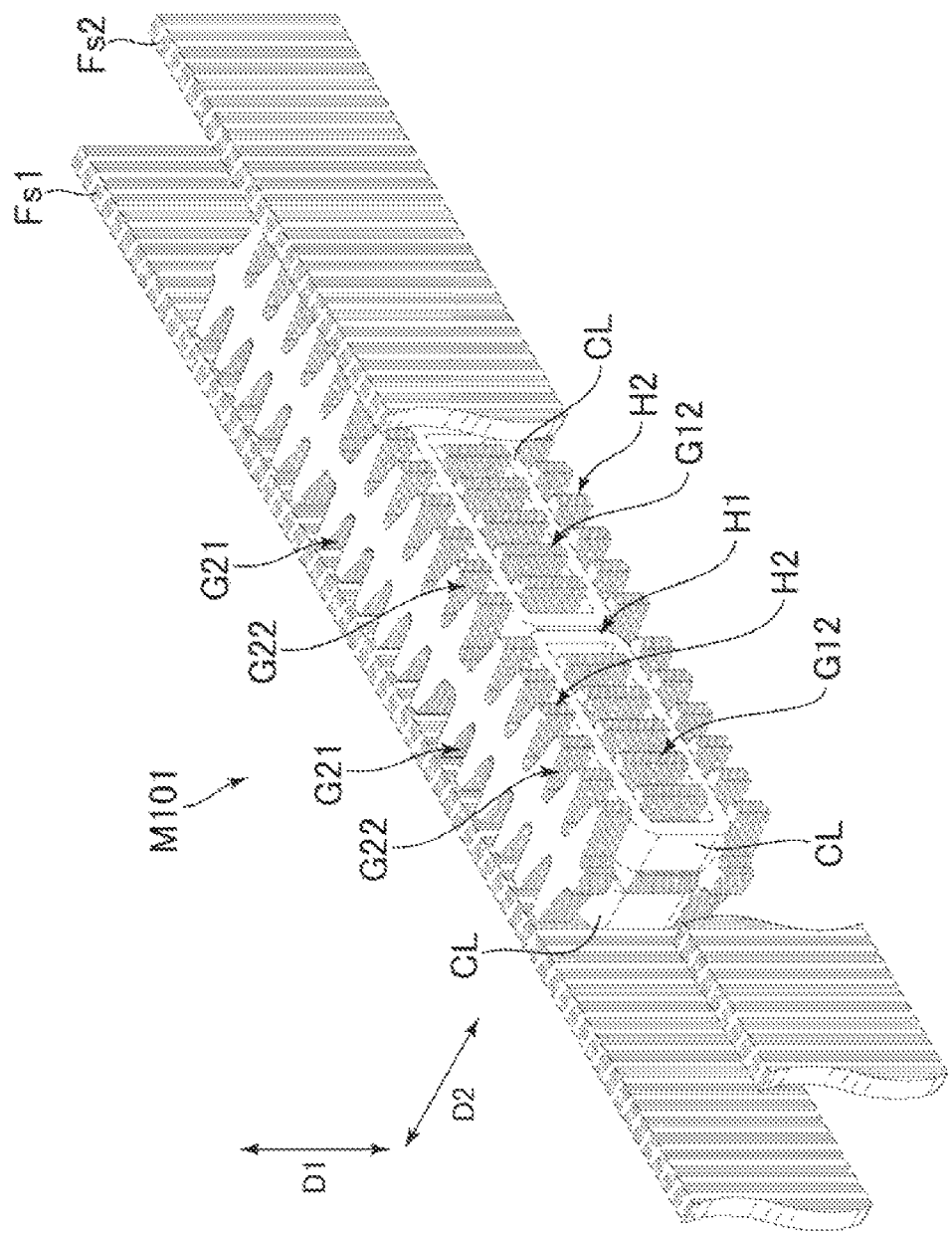
Figure 102A:
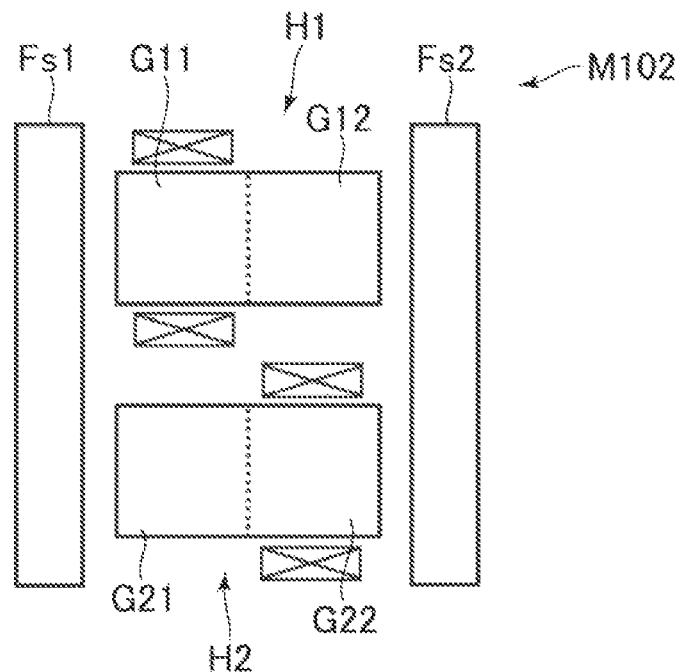
Figure 102B:
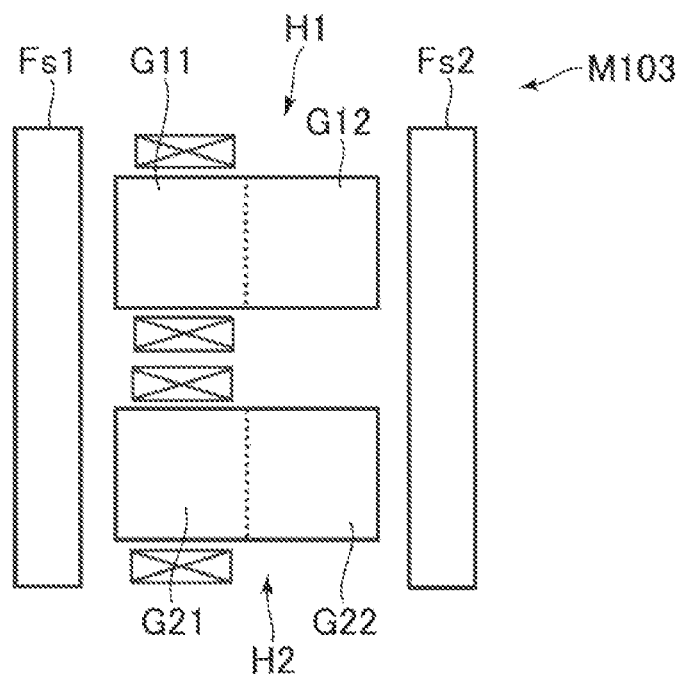
Figure 103A:
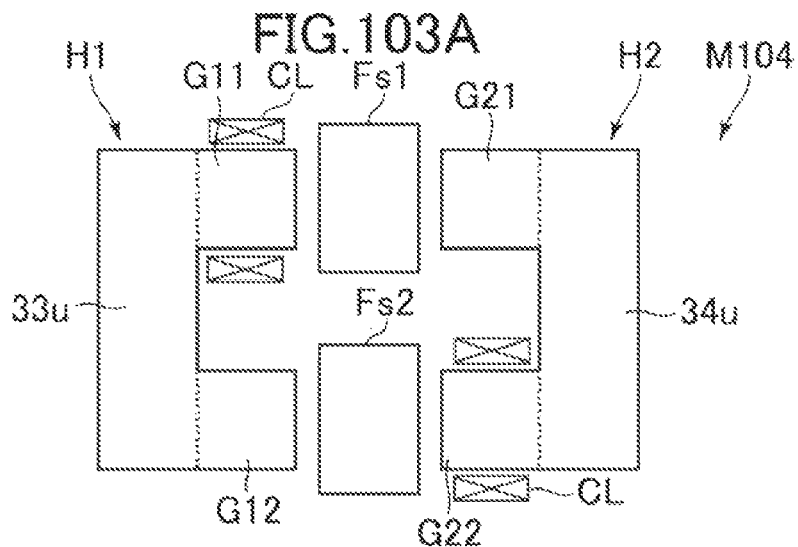
Figure 103B:
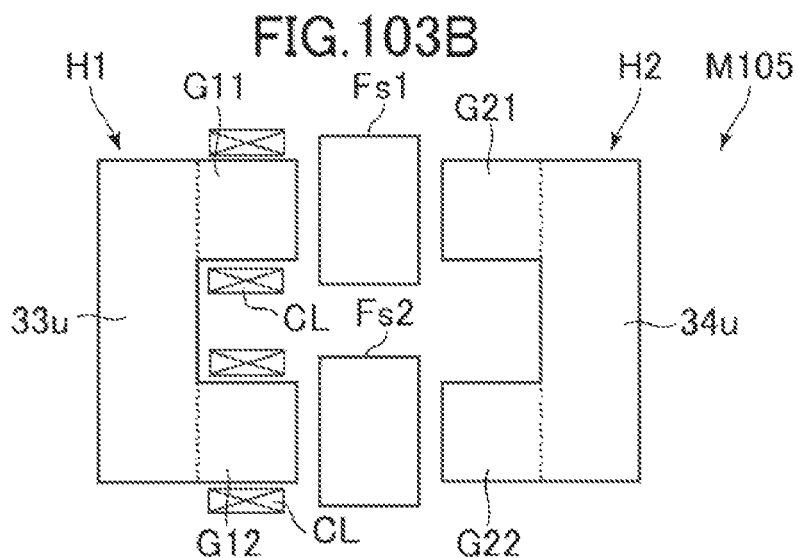
Figure 103C:
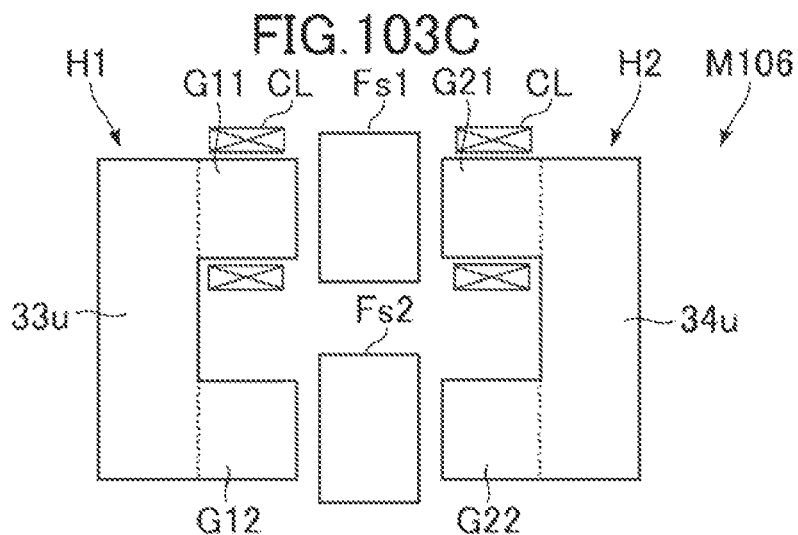
Figure 104B:
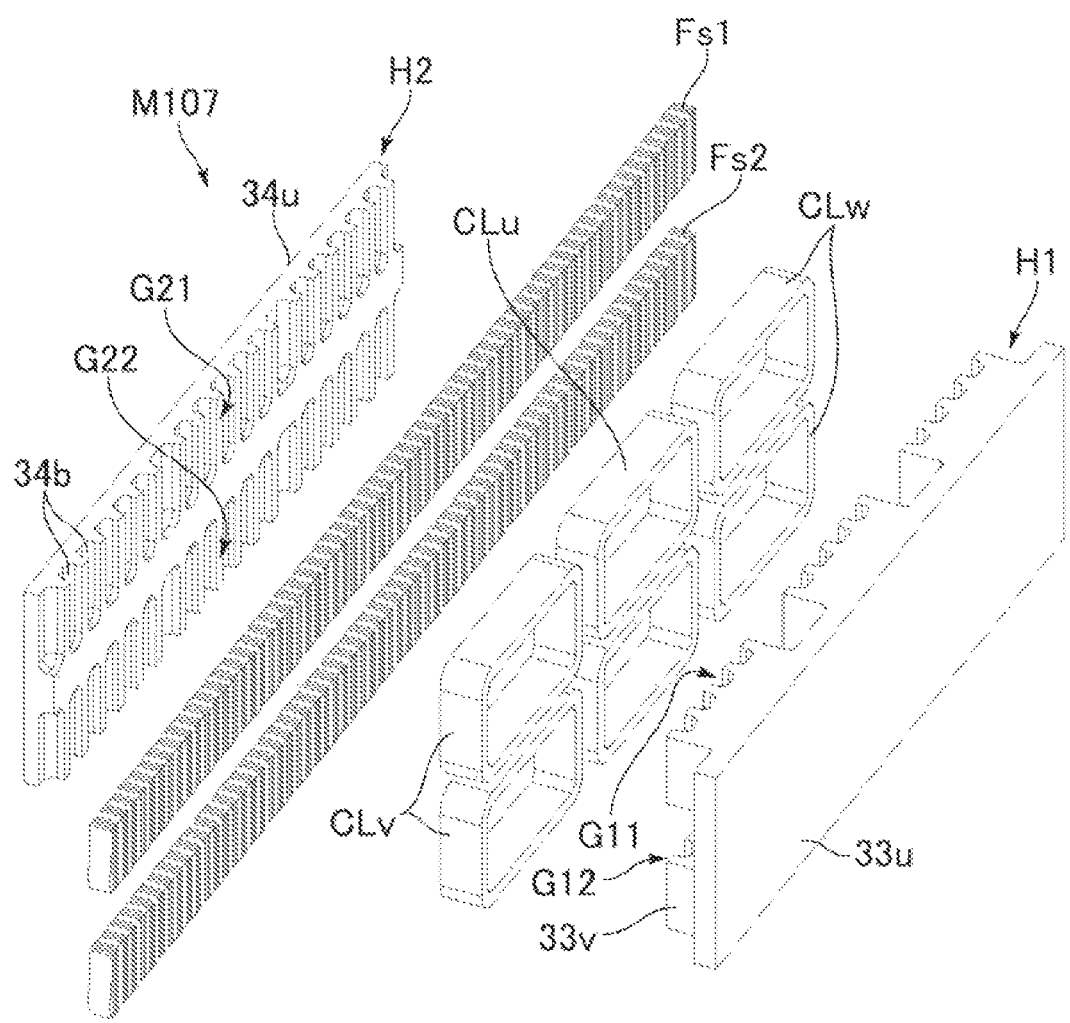
Figure 105:
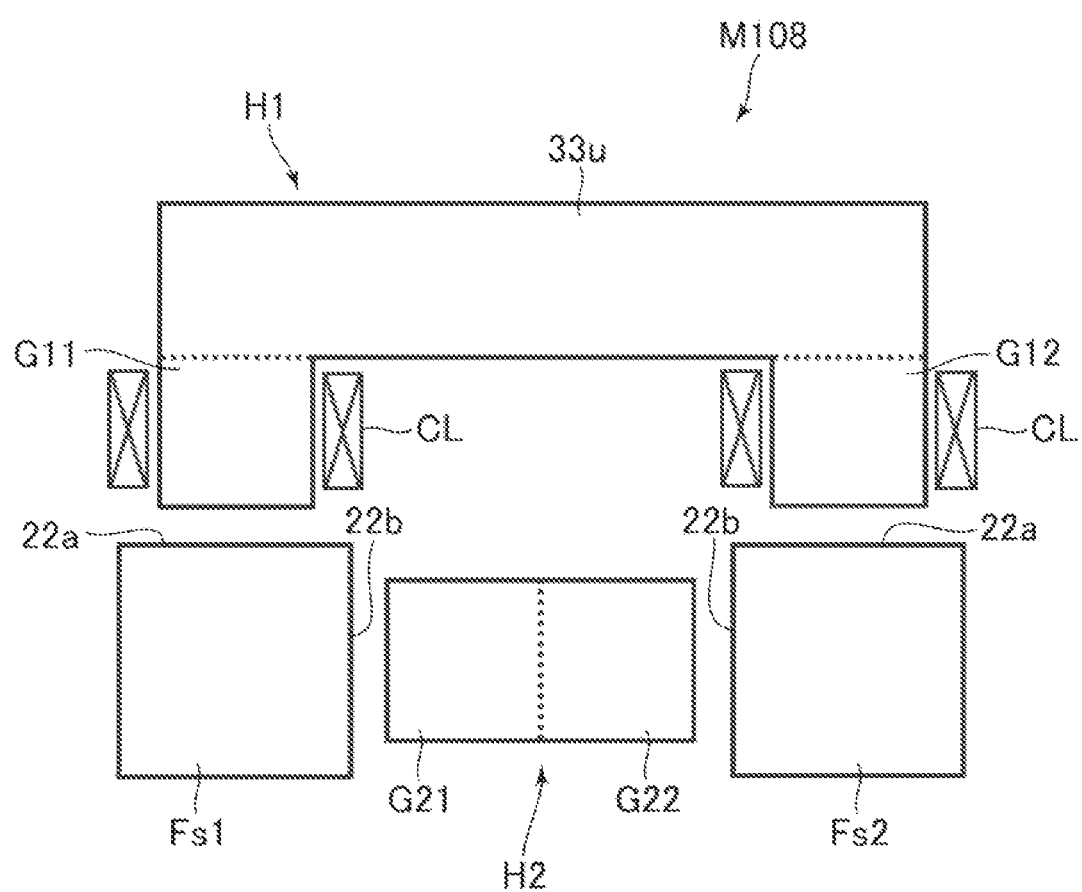
Figure 106:
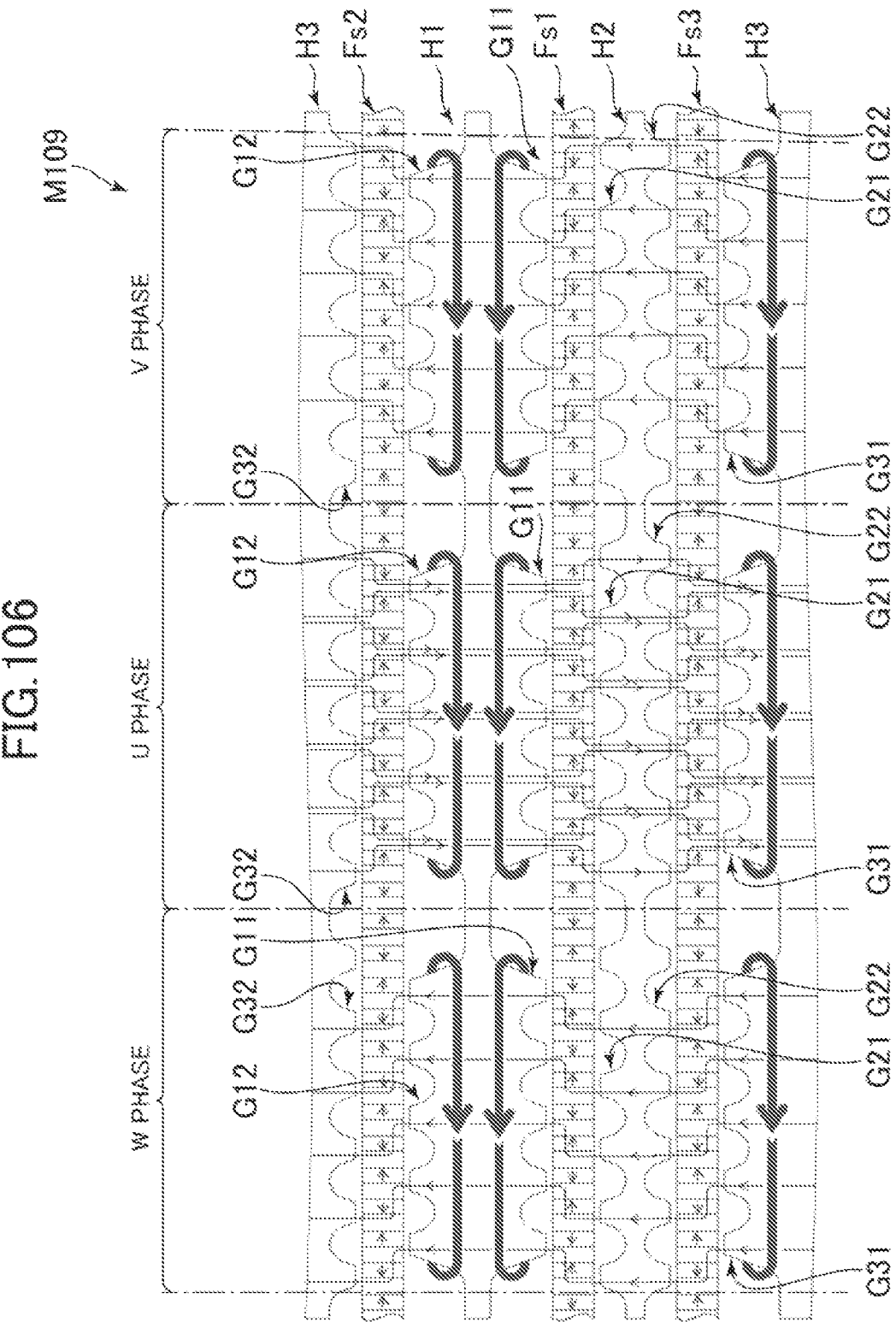
Figure 107A:
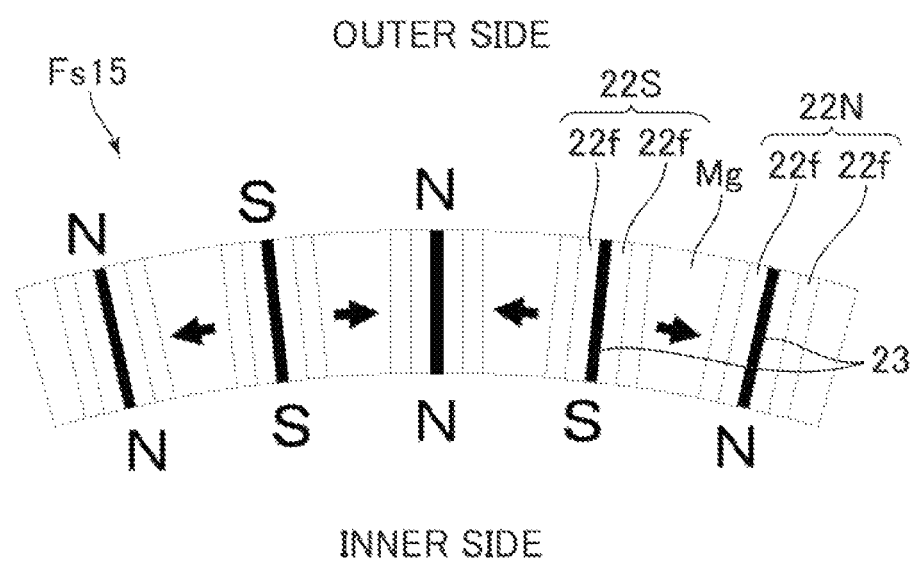
Figure 107B:
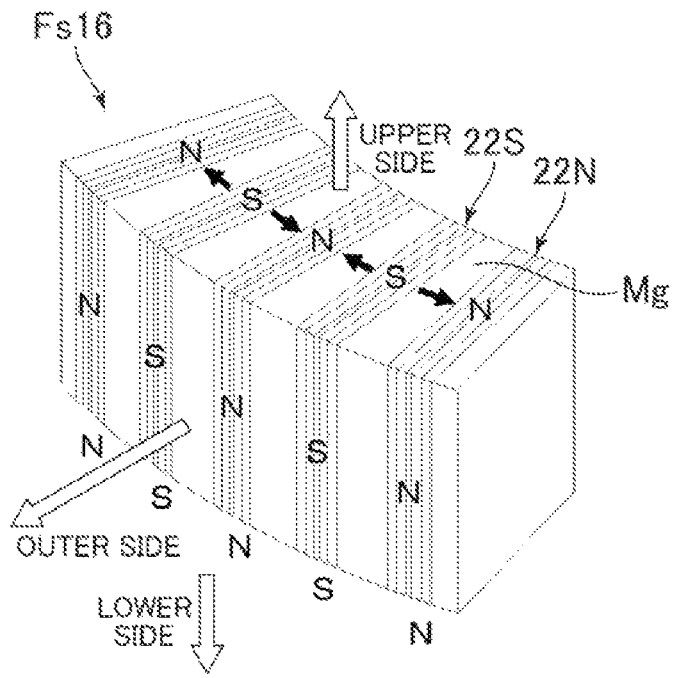
Figure 107C:
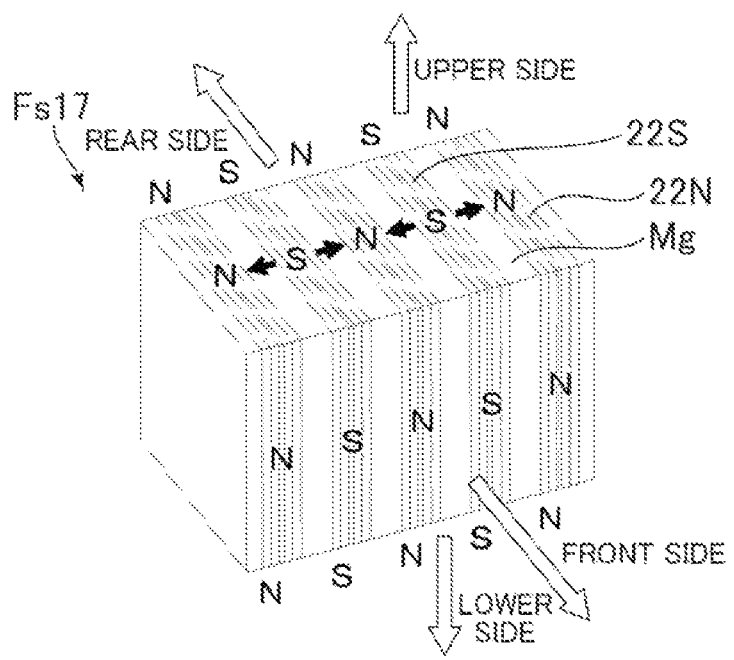
Figure 108A:
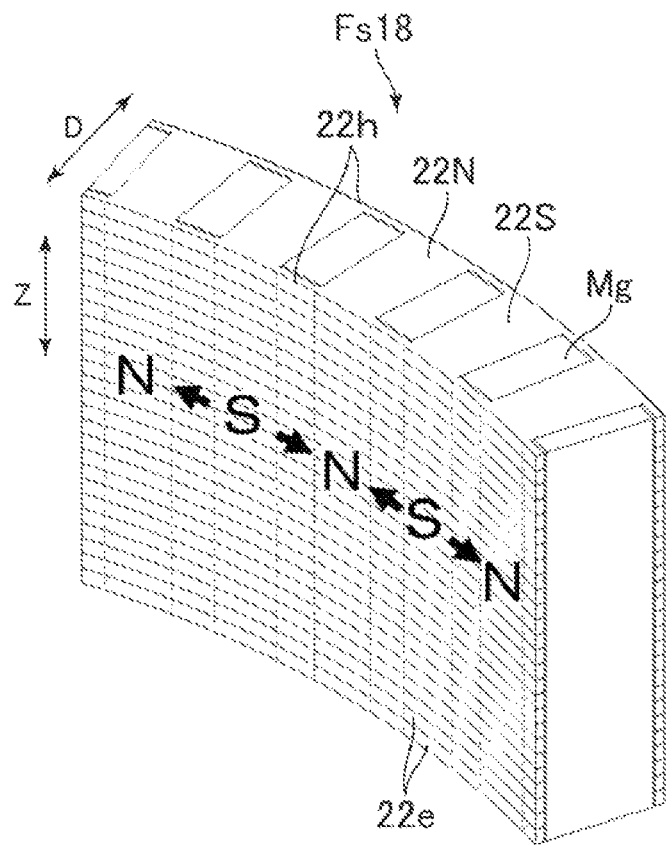
Figure 108B:
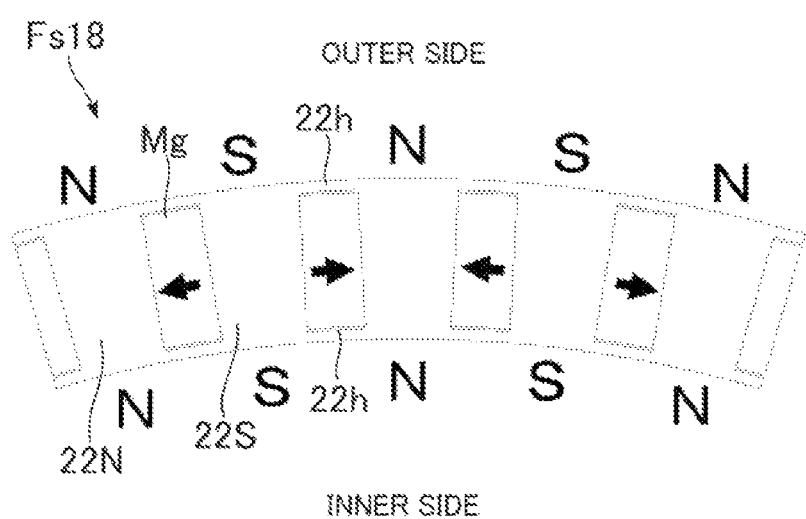
Figure 108C:
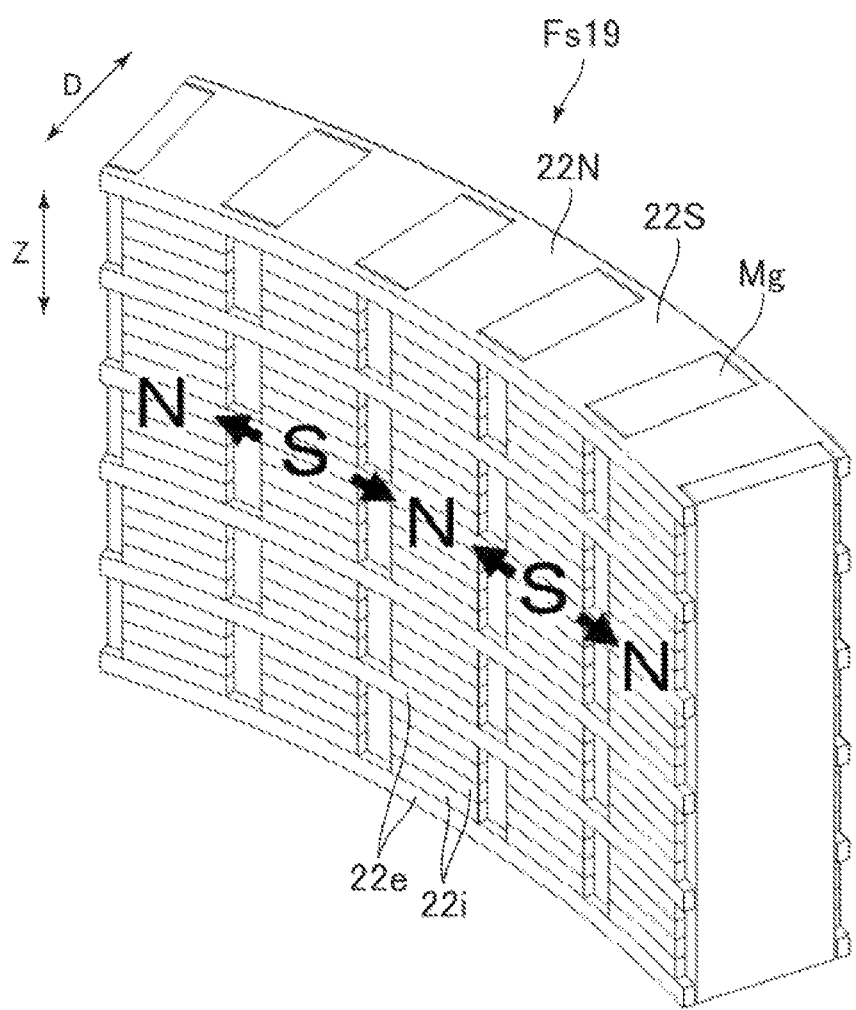

FIG. 63A is a perspective view of an example of a linear electric machine having armature cores disposed as shown in FIG. 53;

FIG. 63B is a diagram showing a modification of the magnetic pole shown in FIG. 63A;

FIG. 64 is a perspective view of another example of a linear electric machine having armature cores disposed as shown in FIG. 53;

FIG. 65A is a perspective view of still another example of the linear electric machine having armature cores that are disposed as shown in FIG. 53 and formed of lamination steel;

FIG. 65B is an exploded perspective view of the rotary electric machine shown in FIG. 65A;

FIG. 66 is a perspective view of an example of an armature portion molded with resin used in the linear electric machine;

FIG. 67 is a perspective view of still another example of a linear electric machine having armature cores disposed as shown in FIG. 53;

FIG. 68 is a perspective view of still another example of a linear electric machine having armature cores disposed as shown in FIG. 53;

FIG. 69A is a perspective view of still another example of a linear electric machine having armature cores disposed as shown in FIG. 53;

FIG. 69B is an exploded perspective view of the linear electric machine shown in FIG. 69A;

FIG. 70 is a perspective view of a modification of an armature core used in the linear electric machine;

FIG. 71A is a diagram showing an example of an electric machine allowing a movable portion to move along a curve;

FIG. 71B is a diagram showing a modification of the electric machine shown in FIG. 71A;

FIG. 72 is a schematic diagram showing the electric machine, which has a modification of the arrangement of the armature cores, viewed in the machine moving direction;

FIG. 73 is a schematic diagram showing the electric machine, which has a modification of the arrangement of the armature cores, viewed in the machine moving direction;

FIG. 74 is a schematic diagram showing the electric machine, which has a modification of the arrangement of the armature cores, viewed in the machine moving direction;

FIG. 75 is a schematic diagram showing the electric machine, which has a modification of the arrangement of the armature cores, viewed in the machine moving direction;

FIG. 76A is a diagram showing a linear electric machine, which is a specific example of the electric machine illustrated in FIG. 75;

FIG. 76B is a diagram illustrating the linear electric machine shown in FIG. 76A viewed in the machine moving direction;

FIG. 77A is a schematic diagram of a modification of the electric machine shown in FIG. 53 viewed in the machine moving direction;

FIG. 77B is a schematic diagram of a modification of the electric machine shown in FIG. 80A viewed in the machine moving direction;

FIG. 78A is a diagram showing a linear electric machine, which is a specific example of the electric machine illustrated in FIG. 77B;

FIG. 78B is a diagram showing a linear electric machine, which is a specific example of the electric machine illustrated in FIG. 77B;

FIG. 79 is a diagram showing a linear electric machine, which is a specific example of the electric machine illustrated in FIG. 77B;

FIG. 80A is a schematic diagram of a modification of the electric machine shown in FIG. 53 viewed in the machine moving direction;

FIG. 80B is a schematic diagram of a modification of the electric machine shown in FIG. 80A viewed in the machine moving direction;

FIG. 81A is a schematic diagram of another modification of the electric machine shown in FIG. 53 viewed in the machine moving direction;

FIG. 81B is a schematic diagram of a modification of the electric machine shown in FIG. 81A viewed in the machine moving direction;

FIG. 82A is a schematic diagram for explaining a modification of the electric machine shown in FIG. 53, where a combination of the armature core and the magnetic field portion is extended in a core facing direction;

FIG. 82B is a schematic diagram for explaining a modification of the electric machine shown in FIG. 82A;

FIG. 82C is a schematic diagram for explaining a modification of the electric machine shown in FIG. 82A;

FIG. 83A is a diagram showing a linear electric machine, which is a specific example of the electric machine shown in FIG. 82A;

FIG. 83B is a diagram showing the flow of magnetic flux in the electric machine shown in FIG. 83A;

FIG. 84A is a diagram showing an axial gap type rotary electric machine, which is a specific example of the electric machine shown in FIG. 82A;

FIG. 84B is an exploded perspective view of the rotary electric machine shown in FIG. 84A;

FIG. 85A is a diagram showing another example of an axial gap type rotary electric machine, which is a specific example of the electric machine shown in FIG. 82A;

FIG. 85B is an exploded perspective view of the rotary electric machine shown in FIG. 85A;

FIG. 86A is a schematic diagram of another modification of the electric machine shown in FIG. 53 viewed in the machine moving direction;

FIG. 86B is a schematic diagram for explaining a modification of the electric machine shown in FIG. 86A;

FIG. 87A is a diagram showing a linear electric machine, which is a specific example of the electric machine shown in FIG. 86A;

FIG. 87B is a diagram illustrating the linear electric machine shown in FIG. 87A viewed in the machine moving direction;

FIG. 88A is a diagram showing a linear electric machine, which is a specific example of the electric machine shown in FIG. 86B;

FIG. 88B is a diagram illustrating the linear electric machine shown in FIG. 88A viewed in the machine moving direction;

FIG. 89A is a diagram showing a rotary electric machine, which is a specific example of the electric machine shown in FIG. 88B;

FIG. 89B is an exploded perspective view of the rotary electric machine shown in FIG. 88A;

FIG. 90A is a schematic diagram showing an example of an electric machine in which two magnetic field portions and three armatures form a magnetic circuit viewed in the machine moving direction;

FIG. 90B is a diagram showing the flow of magnetic flux in the electric machine shown in FIG. 90A;

FIG. 91A is a diagram showing a linear electric machine, which is a specific example of the electric machine shown in FIG. 90A;

FIG. 91B is a diagram showing a modification of the linear electric machine shown in FIG. 91A;

FIG. 92 is a schematic diagram showing a modification of the arrangement of the armature cores in the electric machine shown in FIG. 90A;

FIG. 93A is a schematic diagram showing another example of an electric machine in which two magnetic field portions and three armatures form a magnetic circuit viewed in the machine moving direction;

FIG. 93B is a diagram showing the flow of magnetic flux in the electric machine shown in FIG. 93A;

FIG. 94 is a diagram showing a linear electric machine, which is a specific example of the electric machine shown in FIG. 93A;

FIG. 95A is a schematic diagram showing another example of an electric machine in which two magnetic field portions and three armatures form a magnetic circuit viewed in the machine moving direction;

FIG. 95B is a diagram showing the flow of the magnetic flux in the electric machine shown in FIG. 95A;

FIG. 96 is a diagram showing a linear electric machine, which is a specific example of the electric machine shown in FIG. 95A;

FIG. 97 is a diagram showing an axial gap type rotary electric machine, which is a specific example of the electric machine shown in FIG. 90A;

FIG. 98 is a diagram showing another example of an axial gap type rotary electric machine, which is a specific example of the electric machine shown in FIG. 90A;

FIG. 99 is a diagram for explaining an example of an electric machine in which three magnetic field portions and four armature cores form a magnetic circuit and showing the flow of the magnetic flux in the electric machine;

FIG. 100A is a schematic diagram of an example of an electric machine in which a magnetic path is formed only in a direction intersecting with the machine moving direction;

FIG. 100B is a diagram showing the flow of the magnetic flux in the electric machine shown in FIG. 100A;

FIG. 101 is a diagram showing a linear electric machine, which is a specific example of the electric machine shown in FIG. 100A;

FIG. 102A is a schematic diagram showing a modification of the electric machine shown in FIG. 100A;

FIG. 102B is a schematic diagram showing another modification of the electric machine shown in FIG. 100A;

FIG. 103A is a schematic diagram showing another modification of the electric machine shown in FIG. 100A;

FIG. 103B is a schematic diagram showing another modification of the electric machine shown in FIG. 103A;

FIG. 103C is a schematic diagram showing still another modification of the electric machine shown in FIG. 103A;

FIG. 104A is a diagram showing a linear electric machine, which is a specific example of the electric machine shown in FIG. 103B;

FIG. 104B is an exploded perspective view of the linear electric machine shown in FIG. 104A;

FIG. 105 is a schematic diagram showing a modification of the electric machine shown in FIG. 100A;

FIG. 106 is a diagram for explaining an example of an electric machine in which three magnetic field portions and three armature cores form a magnetic circuit and showing the flow of the magnetic flux in the electric machine;

FIG. 107A is a diagram showing an example of a magnetic field portion having a plurality of exposed surfaces;

FIG. 107B is a diagram showing another example of a magnetic field portion having a plurality of exposed surfaces;

FIG. 107C is a diagram showing still another example of a magnetic field portion having a plurality of exposed surfaces;

FIG. 108A is a perspective view of an example of a magnetic field portion formed of electrical steel sheets;

FIG. 108B is a diagram showing the magnetic field portion viewed in the lamination direction of the electrical steel sheets shown in FIG. 108A; and FIG. 108C is a perspective view of another example of a magnetic field portion formed of electrical steel sheets.

DESCRIPTION OF EMBODIMENTS

In the following, embodiments of an electric machine proposed in the present disclosure will be described. In this specification, the electric machine includes a rotary electric machine functioning as an electric motor or a generator, and a linear electric machine, for example. The rotary electric machine includes a radial gap type, in which an armature portion and a magnetic field portion face each other in the radial direction of the rotary electric machine, and an axial gap type, in which an armature portion and a magnetic field portion face each other in the axis direction of the rotary electric machine.

Figure 1A:
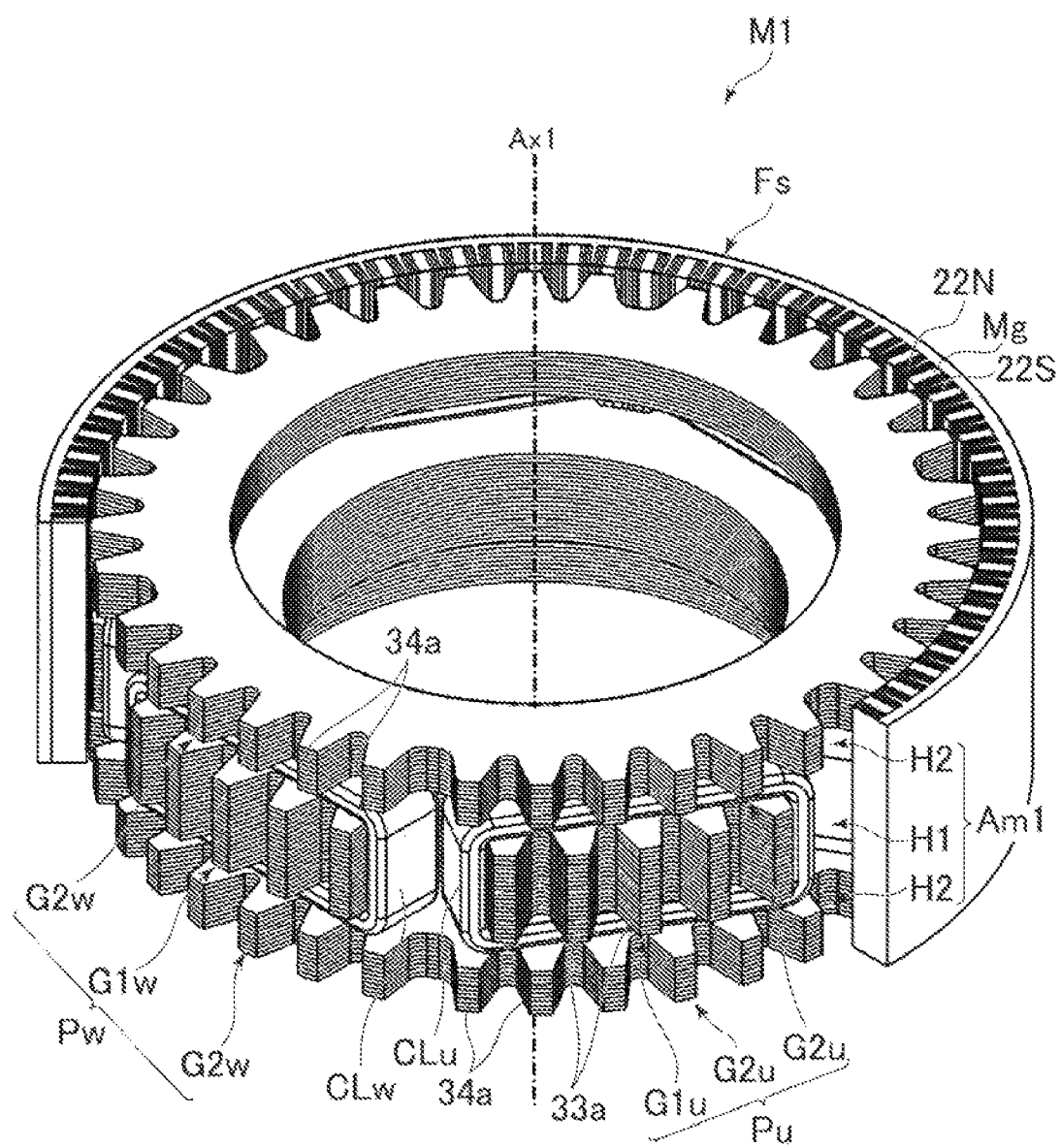
FIG. 1A is a perspective view of a first example of a rotary electric machine, which is one of electric machines proposed in this disclosure.

In this specification, a direction along an axis Ax1 (straight line passing through the rotation center) of the rotary electric machine as shown in FIG. 1A is referred to as "axis direction", and a rotation direction of the rotary electric machine M1 about the axis Ax1 is simply referred to as "rotation direction." In this specification, "rotation direction" and "axis direction" respectively mean "substantial rotation direction" and "substantial axis direction." As such, for example, the description that a magnetization direction of a magnet is a rotation direction, and the description that a lamination direction of a steel sheet constituting a magnetic field core is a rotation direction, which will be described later, mean that the magnetization direction and the lamination direction include a direction of a tangent of the circle around the axis Ax1. Further, in this specification, a machine moving direction means a rotation direction of a movable portion (armature portion or magnetic field portion) in a rotary electric machine, and means a moving direction of a movable part (armature portion or magnetic field portion) in a linear electric machine. In the rotary electric machine, one of the directions crossing the machine moving direction is an axis direction, and the other is a radial direction of the rotary electric machine. In the linear electric machine, when the machine moving direction is a left-right direction, one of the directions crossing the machine moving direction is a front-rear direction, and the other is a vertical direction. Further, in the linear electric machine, the direction crossing the machine moving direction also includes a direction perpendicular to the machine moving direction and oblique to both the front-rear direction and the vertical direction.

In the present specification, a "mechanical angle" is an angle expressed with reference to one turn around the axis Ax1 when one turn around the axis Ax1 is 360 degrees in the rotary electric machine. On the other hand, in the rotary electric machine or the linear electric machine, when an angle (in other words, distance) between two magnetic field cores (e.g., magnetic field cores 22N described later) having the same polarities and adjacent to each other in the machine moving direction of the electric machine (i.e., the direction of the relative movement of the magnetic field portion and the armature portion) is 360 degrees, an "electrical angle" is an angle (distance) expressed with reference to such two magnetic field cores.

BASIC STRUCTURE

A radial gap type rotary electric machine M1 shown in FIG. 1A will be described. As shown in FIG. 1A, the rotary electric machine M1 includes relatively rotatable magnetic field portion Fs and armature portion Am1 (a part of the rotation direction of the magnetic field portion Fs is not shown in FIG. 1A). For example, the magnetic field portion Fs is a rotor and the armature portion Am1 is a stator. The magnetic field portion Fs is supported so as to be rotatable in a device on which the rotary electric machine M1 is mounted, and the armature portion Am1 is fixed to the structure of the device on which the rotary electric machine M1 is mounted. For example, in a case where the rotary electric machine M1 is mounted on an electric vehicle (e.g., two-wheeled vehicle, four-wheeled vehicle), the magnetic field portion Fs is rotatably supported and coupled to the wheels. The armature portion Am1 is fixed to a vehicle body frame, for example. the armature portion Am1 may be a rotor and the magnetic field portion Fs may be a stator. If the armature portion Am1 is a rotor, a current may be supplied to a coil CL of the armature portion Am1, which will be described later, through brushes and slip rings, and brushes and commutator, for example.

[Outline of Magnetic Field Portion]

Figure 3A:
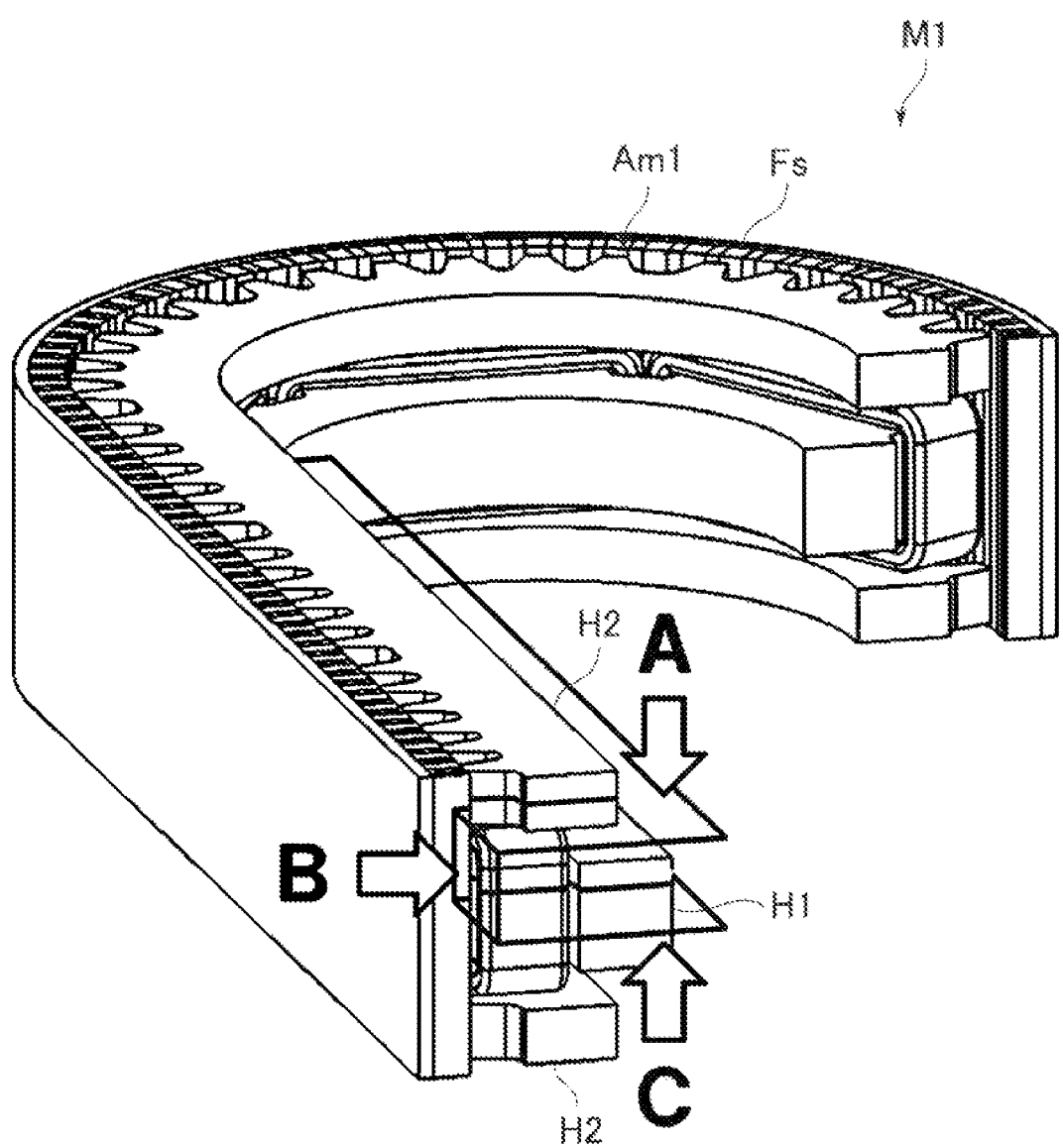
FIG. 3A is a diagram for explaining a positional relationship between a magnetic field core of a magnetic field portion and a magnetic pole of the armature portion.
Figure 3B:
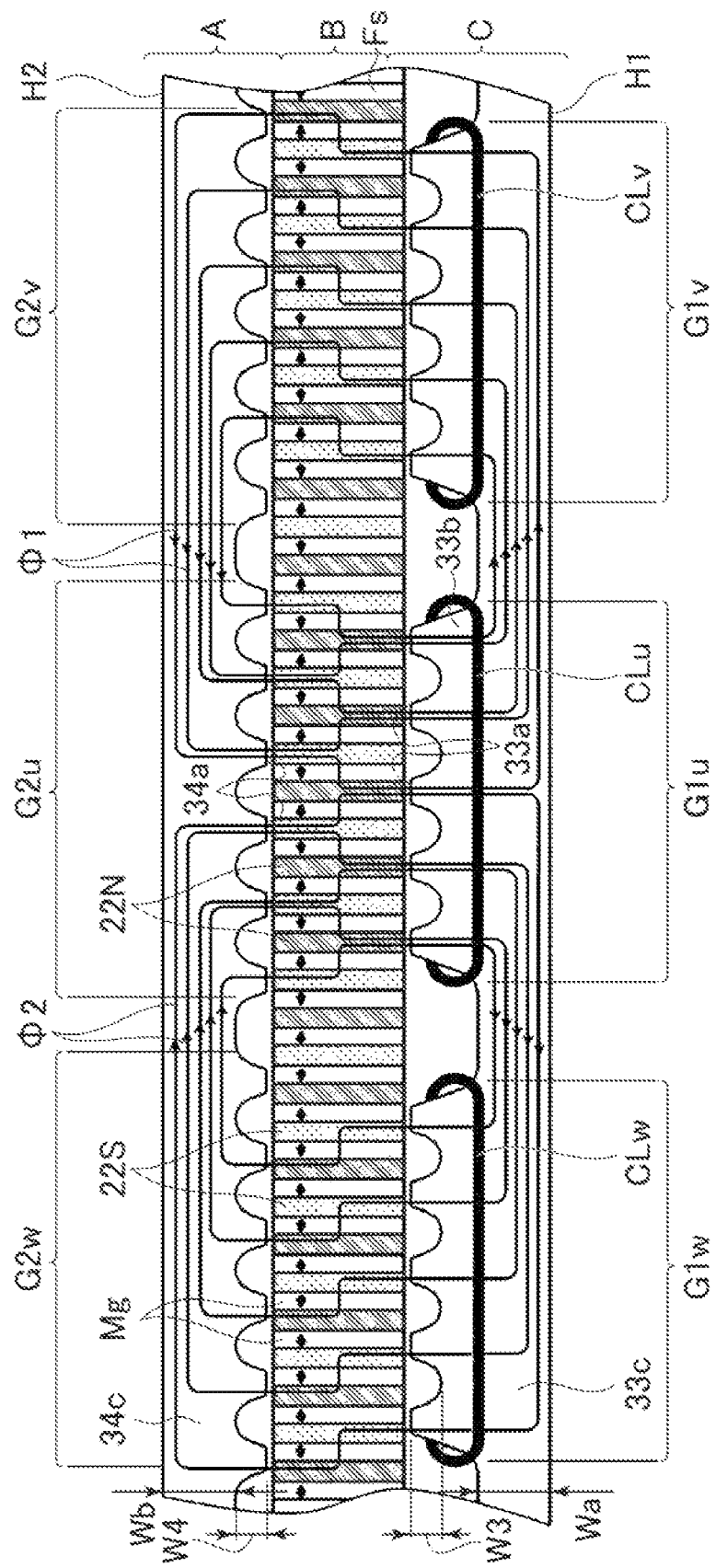
FIG. 3B is a diagram for explaining a positional relationship between a magnetic field core of a magnetic field portion and a magnetic pole of the armature portion, and a schematic diagram of a flow of a magnetic flux of magnets when looking at A, B, and C cross sections shown in FIG. 3A in the direction of the arrows.

In the rotary electric machine M1, the magnetic field portion Fs is disposed so as to surround the outer side of the armature portion Am1. As shown in FIG. 1A, the magnetic field portion Fs includes a plurality of permanent magnets Mg disposed in the rotation direction, and a plurality of magnetic field cores 22N and 22S also disposed in the rotation direction. In FIG. 3B, the magnetization direction of the magnets Mg is represented by an arrow. The magnet surface in the direction indicated by the arrow is N pole, and the magnet surface opposite to the surface of the N pole is S pole. As shown in FIG. 3B, the magnets Mg are magnetized in the rotation direction of the rotary electric machine M1 (machine moving direction). In this specification, "the magnet Mg is magnetized in the rotation direction of the rotary electric machine M1" means that the direction of magnetization includes the direction of the tangent of the circle (a circle centered on the axis Ax1 of the rotary electric machine) at the position of the magnet Mg. The magnetization directions of the two adjacent magnets Mg are opposite to each other, and the two adjacent magnets Mg are disposed such that the same polarities face. The magnetic field cores 22N and 22S are disposed between the two adjacent magnets Mg. the magnetic field core 22N is a magnetic field core between the N pole surfaces of the two adjacent magnets Mg, and the magnetic field core 22S is a magnetic field core between the S pole surfaces of the two adjacent magnets Mg. The magnetic field cores 22N and 22S may be formed of, for example, lamination steel, a powder material, and a combination thereof. The magnetic field cores 22N and 22S have a magnetic focusing effect, and collect the magnetic flux of the entire surfaces of the magnets Mg to the armature portion Am1. This enables effective use of the magnetic flux by the magnets Mg. For example, structures of magnetic field portions Fs1 to Fs8 disclosed in FIGS. 40A to 47 may be used as the structure of the magnetic field portion Fs. The structure of the magnetic field portions Fs1 to Fs8 will be described later by referring to FIGS. 40A to 47.

[Armature Portion]

As shown in FIG. 1A, the armature portion Am1 has a plurality of armature cores H1 and H2 disposed in the axis direction. In the rotary electric machine M1, the armature portion Am1 has one first armature core H1 and two second armature cores H2. The first armature core H1 is disposed between the two second armature cores H2. The shapes and sizes of the armature cores H1 and H2 may be different. In the rotary electric machine M1, coils CLu, CLv, and CLw are provided in the first armature core H1, and coils are not provided in the second armature cores H2. The thickness of the first armature core H1 (width in the axis direction) is greater than the thickness of the second armature core H2 (width in the axis direction). This prevents the density of the magnetic flux flowing through the first armature core H1 from being excessive.

The number and arrangement of the armature cores are not limited to the example of the rotary electric machine M1. The armature cores H1 and H2 may have the same shape. This can reduce the number of parts and molds of the armature cores H1 and H2. As will be described later, the rotary electric machine may be formed of, for example, only one first armature core H1 and one second armature core H2.

[First Armature Core]

As shown in FIG. 1B, the first armature core H1 includes a plurality of coils CLu, CLv, and CLw (in the following description, when the types of coils are not distinguished, "CL" is used for coils). Further, the first armature core H1 includes a plurality of magnetic pole group G1$u$, G1$v$, G1$w$ arranged in the rotation direction (in the following, when the three magnetic pole groups G1$u$, G1$v$, G1$w$ are not distinguished, G1 is used for magnetic pole group).

Each magnetic pole group G1 has a plurality of magnetic poles 33$a$ disposed in the rotation directions. The number of magnetic poles 33$a$ of each magnetic pole group G1 is preferably two or more. In the rotary electric machine M1, each magnetic pole group G1 includes five magnetic poles 33$a$. The magnetic pole 33$a$ is a projecting portion formed on a surface of the first armature core H1 facing the magnetic field portion Fs. That is, the magnetic pole 33$a$ has a radially protruding shape. The two adjacent magnetic poles 33$a$ are separated from each other in the rotation direction. The magnetic flux flowing between the magnetic field portion Fs and the first armature core H1 passes through the magnetic poles 33$a$ intensively.

The first armature core H1 has a yoke portion 33$c$ (see FIG. 1B), which is a ring-shaped core centered on the axis Ax1 of the first armature core H1. As shown in FIG. 3B, each magnetic pole group G1 has a common base 33$b$, to which a plurality of magnetic poles 33$a$ constituting each magnetic pole group G1, are connected. The common base 33$b$ protrudes from the yoke portion 33$c$ toward the magnetic field portion Fs, and the magnetic poles 33$a$ protrude from the common base 33$b$ toward the magnetic field portion Fs. The magnetic pole group G1 may not have the common base 33$b$. In this case, the magnetic poles 33$a$ may be directly connected to the yoke portion 33$c$.

In the armature core H1 of the armature portion Am1, the magnetic flux flows between the magnetic pole groups G1 arranged in the rotation direction. In the armature core H2, the magnetic flux flows between the magnetic pole groups G2 arranged in the rotation direction (see FIG. 4). The coils CL are disposed such that the magnetic flux flowing through the magnetic pole groups G1 arranged in the rotation direction passes through the inside of the coils CL. More specifically, as shown in FIG. 1B, the coil CL is provided in the magnetic pole group G1 and is wound around the magnetic poles 33$a$ constituting the magnetic pole group G1. This arrangement of the coil CL enables the magnetic flux formed by the magnets Mg to efficiently intersect the coil CL.

The rotary electric machine M1 is driven by an alternating current. For example, a three-phase alternating current is supplied to the rotary electric machine M1. As such, as shown in FIG. 1B, the first armature core H1 includes a U phase coil CLu, a V phase coil CLv, and a W phase coil CLw. The U phase coil CLu, the V phase coil CLv, and the W phase coil CLw are respectively provided in the magnetic pole groups G1$u$, G1$v$, and G1$w$. In the rotary electric machine M1, two coils CL with the same winding direction (two coils CL generating the same polarity magnetic field) are provided for one phase. When the rotary electric machine M1 is viewed in the axis direction, the coils CLu, CLv, and CLw are arranged in the rotation direction. This enables to balance the magnetic forces acting on the armature portion Am1 and the magnetic field portion Fs. The number of coils CL provided in one phase may be one or more than two.

As shown in FIG. 2, the winding directions of the coils C L are the same in the rotary electric machine M1 (in FIG. 2, arrows of the coils CL indicate the winding direction of the coils). The winding direction corresponds to the direction of the current supplied from an inverter (not shown) to the coil CL. When the direction of the current is positive, the current flows in the direction of the arrows. When the direction of the current is negative, the current flows in the direction opposite to the arrows. The position, number, and winding direction of the coils CL are not limited to the example of the rotary electric machine M1. For example, the number of coils provided for each phase may be one, or three or more. Further, the number of phases may be an odd number of three or more, such as five and seven, or an even number of two or more. The modifications of the position, number, and winding direction of the coils are described in detail later.

[Second Armature Core]

As shown in FIGS. 1B and 2, the second armature cores H2 have a plurality of magnetic pole groups G2u, G2v, and G2w arranged in the rotation direction (hereinafter, when the three magnetic pole groups G2u, G2v, and G2w are not distinguished, the reference symbol G2 is used for a magnetic pole group). Each magnetic pole group G2 includes a plurality of magnetic poles 34a arranged in the rotation direction. The number of magnetic poles 34a of each magnetic pole group G2 is preferably two or more. In the rotary electric machine M1, each magnetic pole group G2 includes six magnetic poles 34a. As shown in FIG. 1B, the magnetic pole 34a is a projecting portion formed on a surface of the second armature core H2 facing the magnetic field portion Fs. In the rotary electric machine M1, the magnetic pole 34a is a radially projecting portion. The second armature core H2 has an annular yoke portion 34c centered on the axis Ax1, and the magnetic pole 34a protrudes from the yoke portion 34c toward the magnetic field portion Fs. The two adjacent magnetic poles 34a are separated from each other in the rotation direction. The magnetic flux flowing between the magnetic field portion Fs and the second armature core H2 passes through the magnetic poles 34a intensively.

As shown in FIGS. 1A and 1B, in the rotary electric machine M1, the three magnetic pole groups G2u, G2v, and G2w of the second armature core H2 may be respectively positioned with respect to the three magnetic pole groups G1u, G1v, and G1w of the first armature core H1 in the axis direction (the direction intersecting with the machine moving direction). As described above, the rotary electric machine M1 has two second armature cores H2, and each magnetic pole group G1 is located between two magnetic pole groups G2 separated in the axis direction. As will be described in detail later, the magnetic flux by the magnet Mg does not flow directly between the first armature core H1 and the second armature core H2 but flows through the magnetic field cores 22N and 22S (see FIG. 4).

[Positional Relationship of Magnetic Poles]

The position of magnetic pole 33a of the first armature core H1 and the position of magnetic pole 34a of the second armature core H2 are shifted in the rotation direction. As shown in FIG. 2, the position of magnetic pole 33a in the rotation direction is between two magnetic poles 34a adjacent in the rotation direction. Further, the position of magnetic pole 34a in the rotation direction is between the two magnetic poles 33a adjacent in the rotation direction.

As shown in FIG. 2, the position of magnetic pole 33a is, for example, in the middle of two adjacent magnetic poles 34a, and the position of magnetic pole 34a is, for example, in the middle of two adjacent magnetic poles 33a. Here, the numerical values shown in FIG. 2 indicate angles (distances) in the rotation direction expressed in electrical angles. In the rotary electric machine M1, the two magnetic pole 33a adjacent in the rotation direction are located away from each other by 360 degrees in the electrical angle, and the position of magnetic pole 33a in the rotation direction and the position of magnetic pole 34a in the rotation direction are located away from each other by 180 degrees in the electrical angle. As illustrated in FIGS. 6A to 9B, which will be described later, the angles (distances) of magnetic poles 33a and 34a in the rotation direction may be slightly less than 180 degrees or slightly greater than 180 degrees. The number of magnetic poles 33a and 34a included in the two magnetic pole groups G1 and G2 may be the same, or the number of magnetic poles of one group may be one more than the number of magnetic poles of the other group. In the rotary electric machine M1, each magnetic pole group G1 has five magnetic poles 33a and each magnetic pole group G2 has six magnetic poles 34a.

[Positional Relationship Between Magnetic Field Core and Magnetic Pole]

When the magnetic field portion Fs is fixed at a certain position, the magnets Mg, the magnetic field cores 22N and 22S, and the magnetic poles 33a and 34a have the positional relationships described below.

As shown in FIG. 3B, the positions of magnetic poles 33a and 34a of the armature cores H1 and H2 in the rotation direction respectively correspond to the positions of magnetic field cores 22N and 22S in the rotation direction. That is, the magnetic poles 33a are opposed to the magnetic field core 22N (or 22S) and form a magnetic path between the magnetic poles 33a and the magnetic field core 22N (or 22S). Similarly, the magnetic poles 34a are opposed to the magnetic field core 22S (or 22N) and form a magnetic path between the magnetic poles 34a and the magnetic field core 22S (or 22N). In FIG. 3B, the magnetic fluxes flowing through the magnetic circuit are shown by lines Φ1 and Φ2. If the magnetic poles 33a and 34a and the magnetic field cores 22N and 22S can form a magnetic path, the positions of magnetic poles 33a and 34a and the positions of magnetic field cores 22N and 22S may not be completely coincident. The deviation between the positions of magnetic poles 33a and 34a and the positions of magnetic field cores 22N and 22S may be 90 degrees or less by the electrical angle.

In the case shown in FIG. 3B, the position of magnetic field core 22N coincides with the position of magnetic pole 33a of the magnetic pole group G1u and the position of magnetic field core 22S coincides with the position of magnetic pole 34a of the magnetic pole group G2u. The magnetic poles 33a of the magnetic pole group G1v and G1w are opposed to the magnetic field core 22S, and the magnetic poles 34a of the magnetic pole groups G2v and G2w are opposed to the magnetic field core 22N. Specifically, while the position of magnetic field core 22S in the rotation direction is shifted by 60 degrees by the electrical angle from the positions of magnetic poles 33a of the magnetic pole groups G1v and G1w, the flow of magnetic flux is allowed between the magnetic field core 22S and the magnetic poles 33a of the magnetic pole groups G1v and G1w. Similarly, while the position of magnetic field core 22N in the rotation direction is shifted by 60 degrees by the electrical angle from the positions of magnetic poles 34a of the magnetic pole groups G2v and G2w, the flow of magnetic flux is allowed between the magnetic field core 22N and the magnetic poles 34a of the magnetic pole groups G2v and G2w. The closed magnetic circuit to be described later is configured by such a positional relationship.

[Details of Arrangement of Magnetic Pole and Magnetic Field Core]

The positions of magnetic pole groups G1 and G2 and the positions of magnetic field cores 22N and 22S in the rotation direction will be described in detail. In this description, a pair of the magnetic pole group G1$u$ and the magnetic pole group G2$u$ arranged in the axis direction is referred to as a magnetic pole group pair Pu (see FIG. 2), a pair of the magnetic pole group G1$v$ and the magnetic pole group G2$v$ arranged in the axis direction is referred to as a magnetic pole group pair Pv (see FIG. 2), and a pair of the magnetic pole group G1$w$ and the magnetic pole group G2$w$ arranged in the axis direction is referred to as a magnetic pole group pair Pw (see FIG. 2). Hereinafter, in the case where these three magnetic pole group pairs Pu, Pv, and Pw are not distinguished from each other, the symbol P is used for the magnetic pole group pair.

Figure 8A:
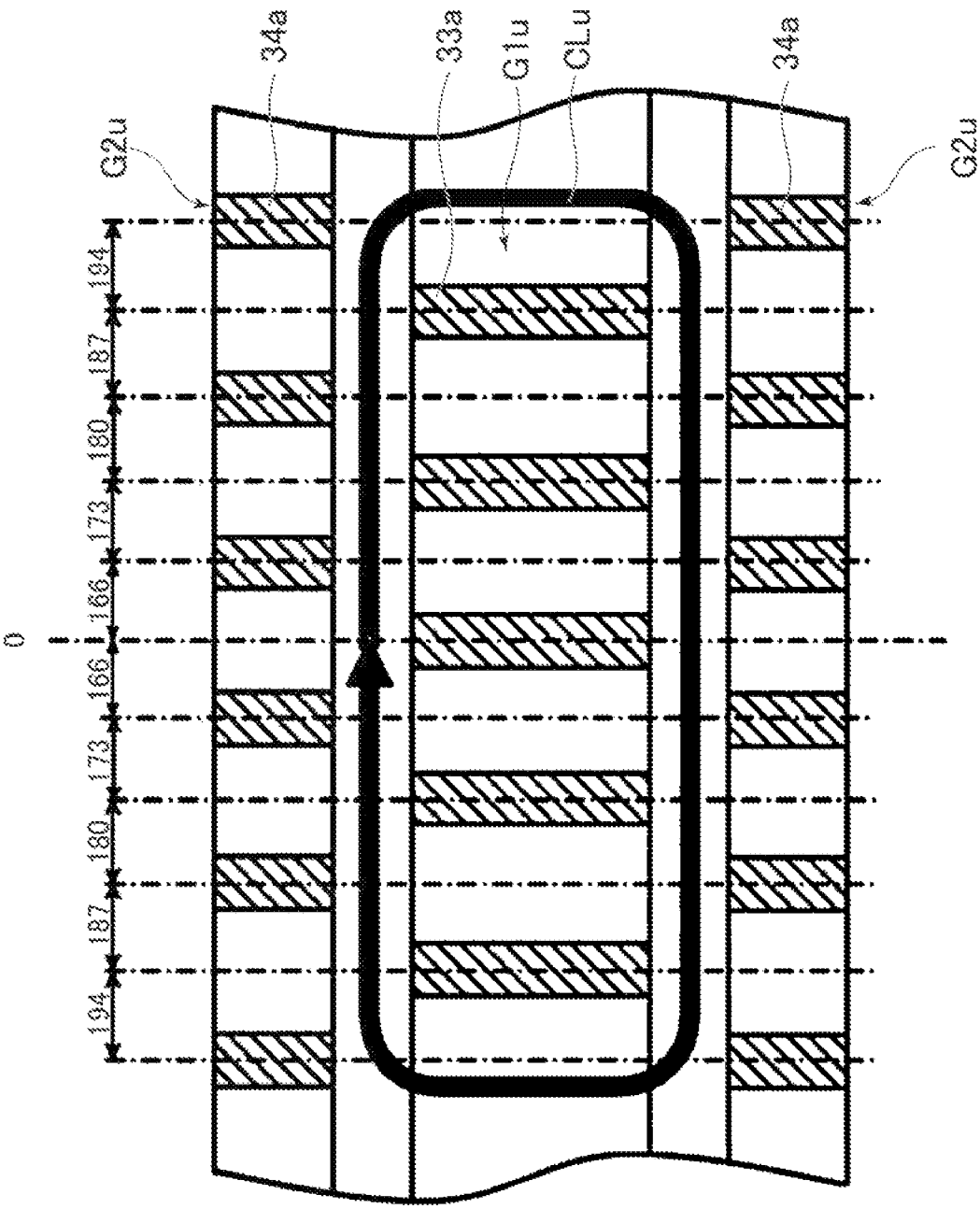
FIG. 8A is a diagram illustrating a modification of an arrangement of the magnetic poles.

The number of magnetic poles 33$a$ and 34$a$ is the same for the magnetic pole group pairs Pu, Pv, and Pw. That is, the number of magnetic poles 33$a$ in each of the magnetic pole groups G1$u$, G1$v$, and G1$w$ of the first armature cores H1 is the same, for example, five. The number of magnetic poles 34$a$ in each of the magnetic pole groups G2$u$, G2$v$, and G2$w$ of the second armature cores H2 is the same, for example, six. Desirably, the space between the magnetic poles 33$a$ and 34$a$ is also substantially the same in the magnetic pole group pairs Pu, Pv, and Pw. That is, it is desirable that the space between the magnetic poles 33$a$ (distance between two adjacent magnetic poles 33$a$) is substantially the same in the three magnetic pole groups G1$u$, G1$v$, and G1$w$ of the first armature core H1, and the space between the magnetic poles 34$a$ (distance between two adjacent magnetic poles 34$a$) is substantially the same in the three magnetic pole groups G2$u$, G2$v$, and G2$w$ of the second armature core H2. The distance between two adjacent magnetic poles 33$a$ may not be the same in each of the magnetic pole groups G1, and may not be uniformed as shown in FIG. 8A to be described later, for example. In this case, each of the magnetic pole groups G1 may have a plurality of magnetic poles 33$a$ arranged with non-uniform spacing, and one magnetic pole group G1 and the other magnetic pole group G1 may be the same as to the spacing of magnetic poles 33$a$. Similarly, the distance between two adjacent magnetic poles 34$a$ may not be the same in each of the magnetic pole groups G2, and may not be uniformed as shown in FIG. 8A to be described later, for example. In this case, each of the magnetic pole groups G2 may have a plurality of magnetic poles 34$a$ arranged with non-uniform spacing, and one magnetic pole group G2 and the other magnetic pole group G2 may be the same as to the spacing of magnetic poles 34$a$.

Figure 9A:
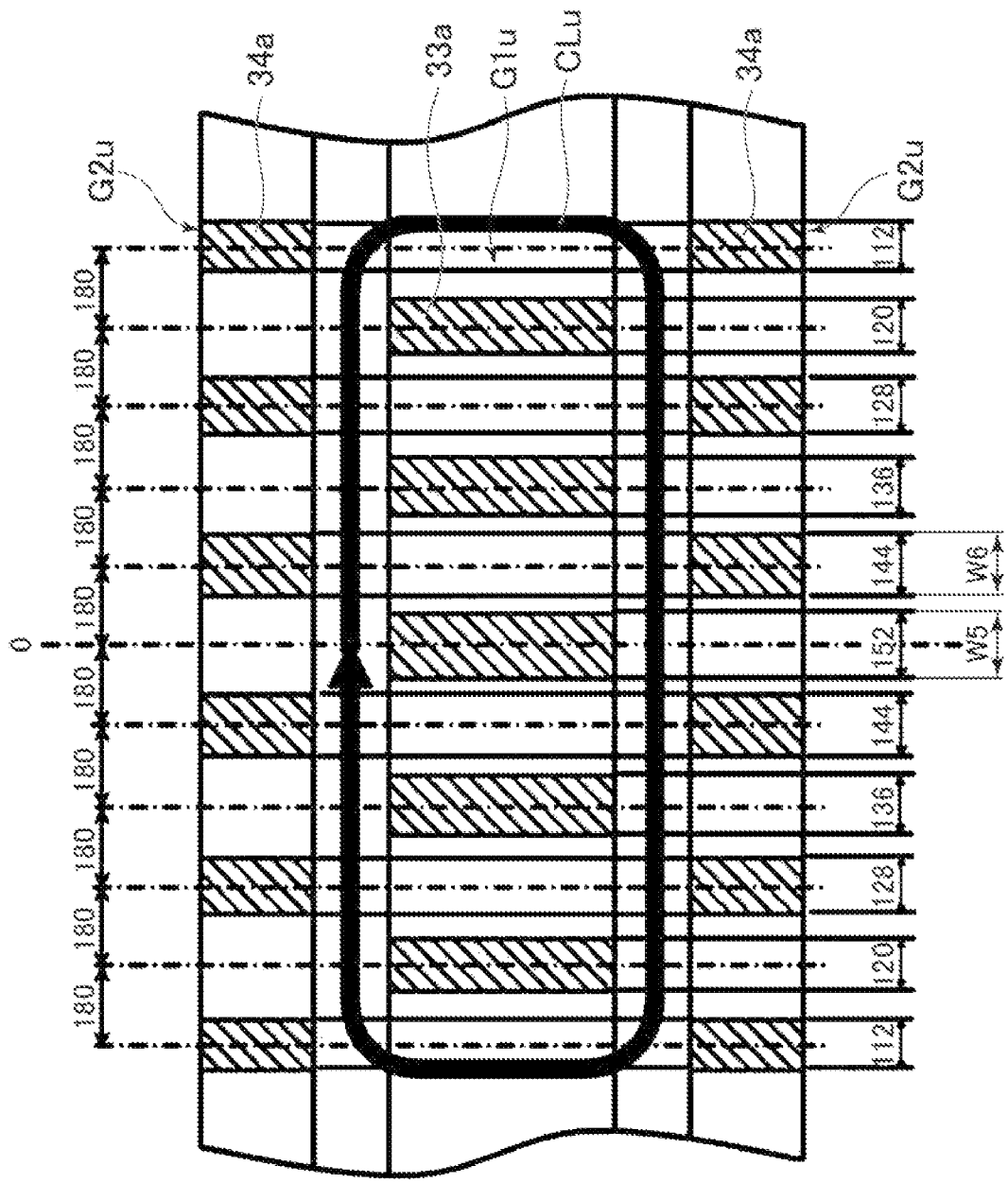
FIG. 9A is a diagram illustrating a modification of a width of the magnetic pole in a rotation direction.

More desirably, the widths and/or heights of magnetic poles 33$a$ and 34$a$ may also be substantially the same in the magnetic pole group pairs Pu, Pv, and Pw. That is, the width (width W10 in FIG. 2) and/or the height (height h10 in FIG. 2) of the magnetic pole 33$a$ are substantially the same in the three magnetic pole groups G1$u$, G1$v$, and G1$w$ of the first armature core H1. The widths and/or heights of magnetic pole 34$a$ are substantially the same in the three magnetic pole group pair G2$u$ G2$v$ and G2$w$ of the second armature H2. That is, it is desirable that the three magnetic pole group pairs Pu, Pv, and Pw have the same structures. In other words, it is desirable that one magnetic pole group pair (e.g., Pu) is rotated about the axis Ax1 and becomes another magnetic pole group pair P (e.g., Pv, Pw). The widths or the heights of all magnetic poles 33$a$ constituting each magnetic pole group G1 need not be the same. For example, as illustrated in FIG. 9A to be described later, the widths and/or the heights of the plurality of magnetic poles 33$a$ constituting the respective magnetic pole groups G1 may be uneven. In this case, each of the magnetic pole groups G1 may be formed of the magnetic poles 33$a$ having non-uniform widths and/or non-uniform heights, and one magnetic pole group G1 and the other magnetic pole group G1 may be the same as to the width and height of the magnetic poles 33$a$. Similarly, the widths or the heights of all magnetic poles 34$a$ constituting each magnetic pole group G2 need not be the same. For example, as illustrated in FIG. 9A to be described later, the widths and/or the heights of the plurality of magnetic poles 34$a$ constituting the respective magnetic pole groups G2 may be uneven. In this case, each of the magnetic pole groups G2 may be formed of the magnetic poles 34$a$ having non-uniform widths and/or non-uniform heights, and one magnetic pole group G2 and the other magnetic pole group G2 may be the same as to the width and height of the magnetic poles 34$a$.

As shown in FIG. 2, the angle between two adjacent magnetic pole group pairs P is substantially "360×(n+m/s)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

As such, there is a (360×m/s) degree difference in electrical angle between the angle (distance) between the magnetic poles 33$a$ (or 34$a$) and the magnetic field core 22N (or 22S) of the magnetic pole group pair Pu and the angle (distance) between the magnetic poles 33$a$ (or 34$a$) and the magnetic field core 22N (or 22S) of the other magnetic pole group pairs Pv and Pw. In the rotary electric machine M1, s=3, n=6, and m=1. As such, the angle between two adjacent magnetic pole group pairs P is 2,280 degrees in electrical angle. Accordingly, for example, when the magnetic poles 33$a$ of the magnetic pole group pair Pu directly face the magnetic field core 22N, the positions of magnetic poles 33$a$ of the magnetic pole group pairs Pv and Pw are shifted by 120 degrees in electrical angle relative to the magnetic field core 22N. In this description, specifically, the angle (distance) between the two magnetic pole group pairs P is the angle (distance) between the centers of magnetic pole groups G1 in the rotation direction and the angle (distance) between the centers of magnetic pole groups G2 in the rotation direction. The angle (distance) between the centers of magnetic pole groups G1 is, for example, the distance between the center of magnetic pole group G1$u$ in the rotation direction and the center of magnetic pole group G1$v$ in the rotation direction. Similarly, the angle (distance) between the centers of magnetic pole groups G2 is, for example, the distance between the center of magnetic pole group G2$u$ in the rotation direction and the center of magnetic pole group G2$v$ in the rotation direction. The relative position of the magnetic pole group pair P and the magnetic field portion Fs may be applied to a linear electric machine or an axial gap type rotary electric machine.

Further, a degree of "(360/p)×(n+m/s)" is ensured in mechanical angle between two adjacent magnetic pole group pairs P. The angle between two adjacent magnetic pole group pairs P can also be expressed as "360/s/c" degrees in mechanical angle. Here, "p" is (number of poles of magnetic field portion)/2, "c" is the number of coils for each phase.

Accordingly, "(360/p)×(n+m/s)" is substantially equal to "360/s/c".

The "number of poles of magnetic field portion" corresponds to the number of magnetic field cores 22N and 22S of the magnetic field portion Fs, and, for example, 76 in the rotary electric machine M1 (p=38). Further, s=3 and c=2. As such, the angle between two adjacent magnetic pole group pairs P is about 60 degrees in mechanical angle. In other words, the number of poles (p×2) of magnetic field portion Fs, the number of coils (s×c) of armature portion, and the number of magnetic poles 33a and 34a are set such that "(360/p)×(n+m/s)" is substantially equal to "360/s/c".

[Magnetic Coupling in Rotation Direction]

In the first armature core H1, two magnetic pole groups G1 adjacent in the rotation direction are magnetically coupled to each other. In the rotary electric machine M1, the magnetic pole groups G1 are magnetically coupled via an annular yoke portion 33c formed inside thereof. As such, the magnetic flux formed by the magnets Mg flows between the two magnetic pole groups G1 (see FIG. 4). Similarly, in the second armature core H2, two magnetic pole groups G2 adjacent in the rotation direction are magnetically coupled to each other. Specifically, the magnetic pole groups G2 are magnetically coupled via an annular yoke portion 34c formed inside thereof. As such, the magnetic flux formed by the magnets Mg flows between the two magnetic pole groups G2 (see FIG. 4).

The yoke portion 33c of the first armature core H1 does not have a structure between two adjacent magnetic pole groups G1 to magnetically separate them. The structure for magnetically separating the two magnetic pole groups G1 is, specifically, a slit formed in the yoke portion 33c, or a portion formed of a material having a large magnetoresistance in comparison with the other portions of the armature core H1. Similarly to the first armature core H1, the yoke portion 34c of the second armature core H2 do not have a structure between two adjacent magnetic pole groups G2 to magnetically separate them. This contributes to the formation of the flow of magnetic flux in the rotation direction to be described later.

In the rotary electric machine M1, as shown in FIG. 3B, a width Wa of the yoke portion 33c in the radial direction is substantially constant in the rotation direction. Further, a width Wb of the yoke portion 34c in the radial direction is also substantially constant in the rotation direction. This structure also contributes to the formation of the flow of magnetic flux in the rotation direction to be described later.

In the rotary electric machine M1, as shown in FIG. 3B, the width Wa of the yoke portion 33c in the radial direction is larger than the projecting width W3 of magnetic pole 33a. The width Wa of the yoke portion 33c may be larger than the projecting width of magnetic pole group G1 (the sum of the width of magnetic pole 33a and the width of the common base 33b). The width Wb of the yoke portion 34c in the radial directions is larger than the protrusion width W4 of magnetic pole 34a. This structure also contributes to the formation of the flow of magnetic flux in the rotation direction to be described later.

[Magnetic Separation in Axis Direction]

Figure 1C:
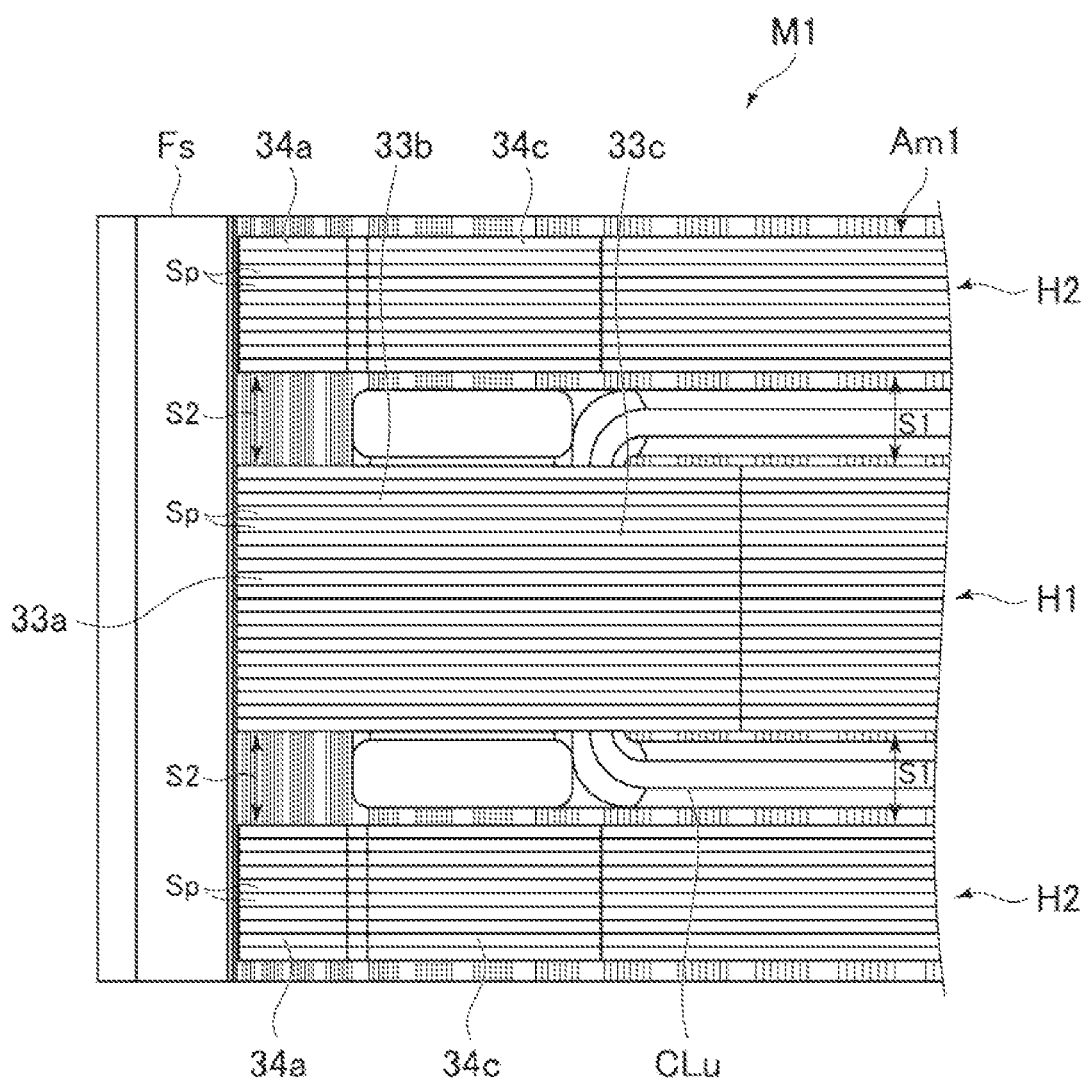
FIG. 1C is a cross sectional view of the rotary electric machine according to the first example.

The first armature core H1 and the second armature core H2 are magnetically separated from each other. Specifically, as shown in FIG. 1C, spaces S1 and S2 are provided between the first armature core H1 and the second armature core H2. (In FIG. 1C, the space S1 is a space between the yoke portion 33c and the yoke portion 34c (distance in the axis direction). The space S2 is a space between the magnetic pole 33a and the magnetic pole 34a (distance in the axis direction).

As shown in FIG. 1C, the spaces S1 and S2 are larger than the thickness of the winding of the coil CL. Further, the armature cores H1 and H2 do not have convex portions projecting in the axis direction on the yoke portions 33c and 34c. That is, the armature cores H1 and H2 do not have structures in the yoke portions 33c and 34c to make the space S1 smaller than the space S2. In the rotary electric machine M1, the space S1 is substantially the same as the space S2.

The first armature core H1, the second armature core H2, and the coil CL, i.e., the entire armature portion Am1 may be solidified by a material having non-magnetic and insulating property. A resin may be used as such a material, and the armature portion Am1 may be molded with resin. In this case, the spaces S1 and S2 may be filled with the resin. Alternatively, an air layer may be formed in the spaces S1 and S2, for example.

As described above, in the armature portion Am1, the two magnetic pole groups G1 and G2 adjacent in the rotation directions are magnetically coupled via the yoke portions 33c and 34c. On the other hand, the first armature core H1 and the second armature core H2 adjacent in the axis direction are magnetically separated. As such, the magnetic flux flowing between the two magnetic pole groups G1 is larger than the magnetic flux flowing directly from the first armature core H1 to the second armature core H2. For example, the magnetic flux flowing from the magnetic pole group G1u to the magnetic pole groups G1v and G1w in the rotation direction is greater than the magnetic flux flowing from the magnetic pole group G1u to the second armature core H2 without passing through the magnetic field portion Fs. In the rotary electric machine M1, the majority of the magnetic flux passing through the magnetic pole group G1 flows towards the magnetic pole group G1. Similarly, the magnetic flux flowing between the two magnetic pole groups G2 is greater than the magnetic flux flowing directly from the second armature core H2 to the first armature core H1. In the specification, "the armature cores H1 and H2 are magnetically separated" means that there is an air layer or a non-magnetic and insulating material between the armature cores H1 and H2, and thus the magnetic flux flowing directly between the first armature core H1 and the second armature core H2 (the magnetic flux flowing without passing through the magnetic field portion Fs) is less than the magnetic flux flowing between the two magnetic pole groups G1 in the machine moving direction (e.g., the rotation direction in the rotary electric machine M1) and less than the magnetic flux flowing between the two magnetic pole groups G2 in the machine moving direction. Typically, the two armature cores H1 and H2 are not in direct contact with each other, and there is no magnetic material in direct contact with both of the armature cores H1 and H2.

[Flow of Magnetic Flux]

When the magnetic field portion Fs is fixed at a certain position, as shown in FIGS. 3B and 4, the magnetic fluxes $\Phi 1$ and $\Phi 2$ are formed by the magnets Mg in the armature portion Am1 and the magnetic field portion Fs. In FIGS. 3B and 4, the magnetic fluxes $\Phi 1$ and $\Phi 2$ formed by the magnets Mg pass through the gap between the armature portion Am1 and the magnetic field portion Fs and enter the magnetic pole group G1u of the first armature core H1 from the magnetic field core 22N.

As shown in FIGS. 3B and 4, the magnetic flux $\Phi 1$ flows in the rotation direction between the magnetic pole group G1u and the magnetic pole group G1v in the first armature core H1, and also passes through the inside of the U phase coil CLu and the V phase coil CLv. Further, the magnetic flux $\Phi 1$ flows between the magnetic pole group G1v of the first armature core H1 and the magnetic pole group G2v of the second armature core H2 in the axis direction through the magnetic field cores 22N and 22S and the magnets Mg of the magnetic field portion Fs. Further, the magnetic flux $\Phi 1$ flows between the magnetic pole group G2v and the magnetic pole group G2u in the rotation direction in the second armature core H2, and flows between the magnetic pole group G1u of the first armature core H1 and the magnetic pole group G2u of the second armature core H2 in the axis direction through the magnetic field cores 22N and 22S and the magnets Mg.

Similarly to the magnetic flux Φ1, the magnetic flux Φ2 flows in the rotation direction between the magnetic pole group G1u and the magnetic pole group G1w through the inside of the U phase coil CLu and the W phase coil CLw in the first armature core H1, and flows in the rotation direction between the magnetic pole group G2w and the magnetic pole group G2u in the second armature core H2. Further, the magnetic flux Φ2 flows in the axis direction between the magnetic pole group G1u of the first armature core H1 and the magnetic pole group G2u of the second armature core H2 through the magnetic field cores 22N and 22S and the magnets Mg, and flows in the axis direction between the magnetic pole group G1w of the first armature core H1 and the magnetic pole group G2w of the second armature core H2 through the other magnetic field cores 22N and 22S and the magnets Mg.

Figure 5A:
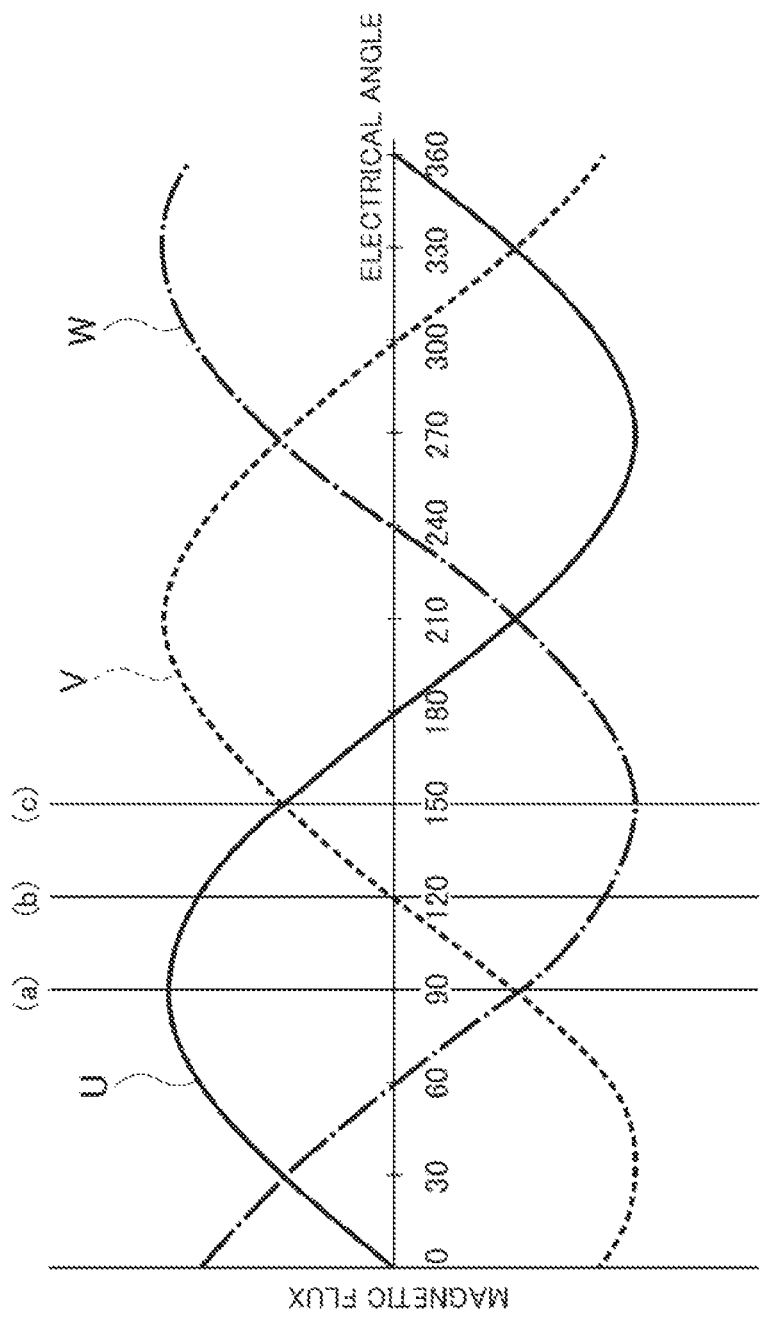
FIG. 5A is a diagram for explaining a relationship between the position of the magnetic field portion and the magnetic flux passing through coils of each phase of the rotary electric machine according to the first example, where a horizontal axis is the position of the magnetic field portion expressed in electric angle, and a vertical axis shows the magnetic flux passing through the coil.

FIG. 5A is a diagram for explaining the relationship between the angle position of the magnetic field portion Fs and the magnetic flux (magnetic flux formed by the magnets Mg) passing through the coils CLu, CLv, and CLw. The horizontal axis is an angle position expressed by an electrical angle, and the vertical axis is a magnetic flux. FIG. 5B is a diagram for explaining the flow of magnetic flux. In FIGS. 5B and 4, the magnetic flux of the magnets Mg formed on the rotary electric machine M1 is divided into two in the rotation direction and only half of the magnetic flux is shown. The flow of the magnetic flux omitted in FIGS. 5B and 4 is the same as the flow of the magnetic flux as illustrated. In other words, when rotating the illustrated magnetic flux 180 degrees at the mechanical angle, the magnetic flux matched with the magnetic flux omitted in FIGS. 5B and 4. In FIG. 5B, (a) represents the flow of the magnetic flux when the magnetic field portion Fs is at the position indicated by the line (a) in FIG. 5A, which is the same as that shown in FIG. 4. In FIG. 5B, (b) and (c) represent the flow of the magnetic flux when the magnetic field portion Fs is at the positions indicated by the lines (b) and (c) in FIG. 5A, respectively.

When the magnetic field portion Fs rotates by 30 degrees in electrical angle from the position of the line (a) and reaches the position of the line (b), as shown in (b) of FIG. 5B, the magnetic flux Φ3, which passes through the magnetic circuit including the magnetic pole groups G1u and G1w of the first armature core H1, the magnetic field cores 22S and 22N and the magnets Mg of the magnetic field portion Fs, and the magnetic pole groups G2u and G2w of the second armature core H2, is formed. Further, a portion of the magnetic flux (magnetic flux Φ4) passing through the magnetic pole group G1u is not directed to the adjacent magnetic pole group G1w but to the magnetic pole group G1w in the opposite side. That is, the magnetic pole group pair Pu and the magnetic pole group pair Pw, which is 120 degrees in mechanical angle away from the magnetic pole group pair Pu, constitute the magnetic circuit. Similarly, the magnetic pole group pair Pw and the magnetic pole group pair Pu, which is 120 degrees away from the magnetic pole group pair Pw, constitute the magnetic circuit.

When the magnetic field portion Fs further rotates by 30 degrees in electrical angle from the position of the line (b) and reaches the position of the line (c), as shown in (c) of FIG. 5B, the magnetic flux Φ5, which passes through the magnetic circuit including the magnetic pole groups G1w and G1u of the first armature core H1, the magnetic field cores 22S and 22N and the magnets Mg of the magnetic field portion Fs, and the magnetic pole groups G2w and G2u of the second armature core H2, is formed. Further, the magnetic flux Φ6, which passes through the magnetic circuit including the magnetic pole groups G1w and G1v of the first armature core H1, the magnetic field cores 22S and 22N and the magnets Mg of the magnetic field portion Fs, and the magnetic pole groups G2v and G2w of the second armature core H2, is formed.

The rotary electric machine M1 as described above can form a closed magnetic circuit without magnetically coupling the two armature cores H1 and H2, and thereby increasing freedom of the shape and arrangement of the armature cores H1 and H2 as seen in an electric machine described later. As a result, while satisfying the requirements for an external form of rotary electric machine, it is possible to facilitate increasing output of the electric machine. The freedom of the structure is increased, which facilitates control of the flow of the magnetic flux in the armature core. This can increase the freedom of the material, for example, a lamination steel can be easily used in addition to the powder core. In the rotary electric machine M1, unlike the conventional rotary electric machine, the armature cores H1 and H2 do not need to be magnetically divided in the rotation direction. As such, the strength of the armature cores H1 and H2 can be increased. Further, the structures of the armature cores H1 and H2 can be simplified, which serves to increase accuracy of assembling the rotary electric machine. The simplified structure can increase the freedom in selecting materials, for example, composing only of electrical steel sheets or a powder material.

[Material of Armature Core]

In the rotary electric machine M1, the armature cores H1 and H2 are formed of lamination steel. That is, the entire first armature core H1 is composed of a plurality of steel sheets Sp (more specifically electrical steel sheets) laminated in the axis direction, and the entire second armature core H2 is also composed of a plurality of steel sheets Sp (more specifically electrical steel sheets) laminated in the axis direction. As described above, in the rotary electric machine M1, the magnetic flux flowing between the two armature cores H1 and H2 in the axis direction is not required. As such, even if the armature cores H1 and H2 are formed of lamination steel, the magnetic flux does not pass through the steel sheet in the thickness direction. This prevents generation of eddy currents (induced currents).

As will be described in detail later, regarding the material of rotary electric machine M1, the entire armature cores H1 and H2 may be formed of soft magnetic composite material, or most of the armature cores H1 and H2 may composed of lamination steel and a part may be composed of powder materials.

In the rotary electric machine M1, the first armature core H1 is disposed between the two second armature cores H2, and as shown in FIG. 4, two magnetic circuits arranged in the axis direction are formed. This arrangement serves to lower the density of the magnetic flux flowing the magnetic field cores 22N and 22S in the axis direction, or reduce the cross-sectional area of magnetic field cores 22N and 22S (cross-sectional area in a plane perpendicular to the axis direction). The coil CL is provided in the first armature core H1 and the coil is not provided in the second armature core H2. As such, an optimum shape for each of the first armature core H1 and the second armature core H2 can be selected, and the freedom about the shape is increased.

[Modification of Position of Magnetic Pole]

In the rotary electric machine M1, the angle (distance) between the magnetic poles 33a of the first armature core H1 and the angle (distance) between the magnetic poles 34a of the second armature core H2 are 360 degrees in electrical angle. However, if the angle between the magnetic poles 33a and the angle between the magnetic field cores 22N (or 22S) are close, the angle between the magnetic poles 33a may deviate from 360 degrees. Similarly, if the angle between the magnetic poles 34a and the angle between the magnetic field cores 22N (or 22S) are close, the angle between the magnetic poles 34a may deviate from 360 degrees. This can shift the angle between the magnetic poles 33a and the magnetic poles 34a from 180 degrees, thereby reducing the cogging torque. The widths of magnetic poles 33a and 34a may not be uniform in the rotation direction, and may be different depending on the positions of magnetic poles 33a and 34a in the rotation direction.

FIGS. 6A, 6B, 7A, 7B, 8A, 8B, 9A, and 9B are diagrams for explaining such modifications of the positions of magnetic poles 33a and 34a. In FIGS. 6A, 7A, 8A, and 9A, the magnetic pole groups G1u and G2u are shown as examples. The other magnetic pole groups G1v, G2v, G1w, and G2w have the same structures as those of FIGS. 6A, 7A, 8A, and 9A. The numerical values in these drawings represent the angles (distances) in the rotation direction in terms of electrical angles. In FIGS. 6B, 7B, 8B, and 9B, the horizontal axis shows the angle position (electrical angle) of the magnetic field portion Fs. In FIGS. 6B to 9B, the angle position of magnetic field core 22N when the magnetic flux passing through the coil CLu (the magnetic flux formed by the magnets Mg) is maximized is 0 degrees. In the examples illustrated in these drawings, the angle position of magnetic field core 22N is 0 degrees when the center magnetic pole 33a among the plurality of magnetic poles 33a (five magnetic poles 33a) constituting the magnetic pole group G1u and the magnetic field core 22N face each other. The vertical axis is a magnetic flux (magnetic flux formed by the magnets Mg), where the magnetic flux entering the armature cores H1 and H2 is represented as positive, and the magnetic flux leaving the armature cores H1 and H2 is represented as negative. In (a) of FIG. 6B, (a) of FIG. 7B, (a) of FIG. 8B, and (a) of FIG. 9B, the magnetic fluxes passing through the magnetic pole groups G1u, G1v, and G1w are respectively indicated by lines U, V, and W, and the magnetic flux passing through the magnetic poles 33a constituting the magnetic pole group G1u is indicated by a line u. Further, (b) of FIG. 6B, (b) of FIG. 7B, in (b) of FIG. 8B, and (b) of FIG. 9B, the magnetic flux passing through the magnetic pole groups G2u, G2v, and G2w are respectively line U, line V, and line W, the magnetic flux passing through magnetic pole 34a constituting magnetic pole group G2u is represented by a line u. The magnetic flux passing through the magnetic pole group G1 and G2 is originally the sum of the magnetic fluxes passing through the plurality of magnetic poles 33a and 34a, but is represented in a reduced scale in these drawings.

The angle between the magnetic poles 33a constituting the magnetic pole group G1 and the angle between the magnetic poles 34a constituting the magnetic pole group G2 may be less than 360 degrees in electrical angle. For example, as shown in FIG. 6A, the angle between the magnetic poles 33a constituting the magnetic pole group G1 and the angle between the magnetic poles 34a constituting the magnetic pole group G2 may be 350 degrees in electrical angle. Further, the angle between the magnetic poles 33a and the magnetic poles 34a may be 175 degrees in electrical angle. In this case, as shown in FIG. 6B, the phase of the magnetic flux passing through the two adjacent magnetic poles 33a is shifted by 10 degrees in electrical angle, and the phase of the magnetic flux passing through the two adjacent magnetic poles 34a is also shifted by 10 degrees in electrical angle.

The angle between the magnetic poles 33a constituting the magnetic pole group G1 and the angle between the magnetic poles 34a constituting the magnetic pole group G2 may be greater than 360 degrees in electrical angle. For example, as shown in FIG. 7A, the angle between the magnetic poles 33a constituting the magnetic pole group G1 and the angle between the magnetic poles 34a constituting the magnetic pole group G2 may be 370 degrees in electrical angle. Further, the angle between the magnetic poles 33a and the magnetic poles 34a may be 185 degrees in electrical angle. In this case, as shown in FIG. 7B, the phase of the magnetic flux passing through the two adjacent magnetic poles 33a is shifted by 10 degrees in electrical angle, and the phase of the magnetic flux passing through the two adjacent magnetic poles 34a is also shifted by 10 degrees in electrical angle.

Figure 8B:
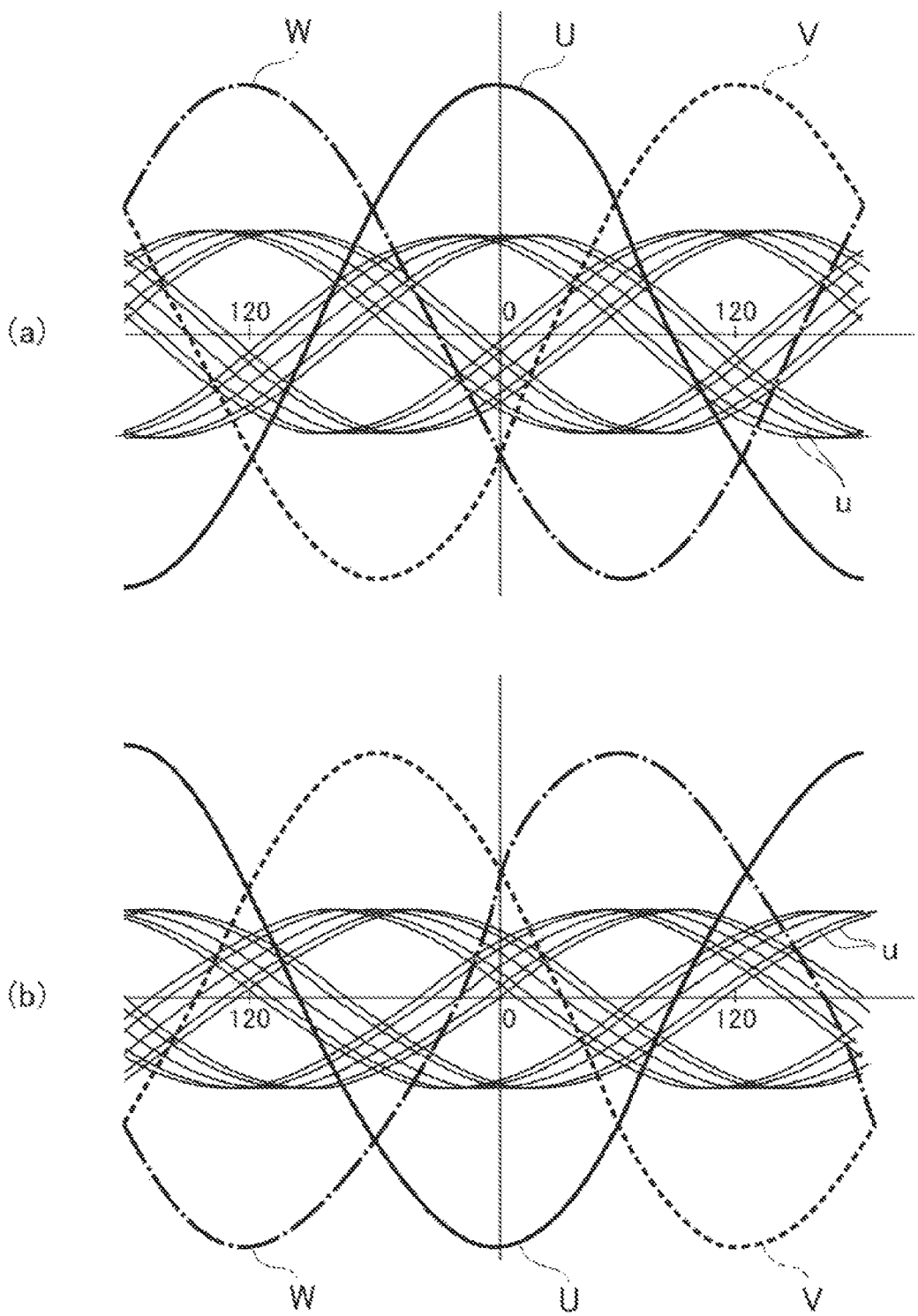
FIG. 8B shows the magnetic flux passing through the coils and the magnetic poles when the armature core includes the magnetic pole shown in FIG. 8A, where a horizontal axis is the position (electric angle) of the magnetic field portion, and a vertical axis is the magnetic flux.

The angle between two adjacent magnetic poles 33a may differ depending on the positions of magnetic poles 33a. Similarly, the angle between two adjacent magnetic poles 34a may differ depending on the positions of magnetic poles 34a. For example, as shown in FIG. 8A, the angle between two adjacent magnetic poles 33a may gradually increase outwardly from the center of magnetic pole group G1 in the rotation direction. The angle between two adjacent magnetic poles 34a may also gradually increase outwardly from the center of magnetic pole group G2 in the rotation direction. In this case, as shown in FIG. 8B, the phase of the magnetic flux passing through the magnetic poles 33a and 34a changes discontinuously.

When the angle between the magnetic poles 33a and the angle between the magnetic poles 34a deviate from 360 degrees as described, in the state where the magnetic field portion Fs is disposed at a position where the magnetic flux passing through the coil CL (magnetic flux formed by the magnets Mg) is maximum, the angle between each magnetic poles 33a of the magnetic pole group G1 of the magnetic pole group pair P in which such coil CL is provided and the magnetic field core 22N (or 22S) is required to fall within 90 degrees in electrical angle. Preferably, the angle between the magnetic pole 33a and the magnetic field core 22N (or 22S) falls within 45 degrees in electrical angle. Similarly, in the state where the magnetic field portion Fs is disposed at a position where the magnetic flux passing through the coil CL (magnetic flux formed by the magnets Mg) is maximum, the angle between each magnetic poles 34a of the magnetic pole group G2 of the magnetic pole group pair P in which such coil CL is provided and the magnetic field core 22S (or 22N) is also required to fall within 90 degrees in electrical angle. Preferably, the angle between the magnetic pole 34a and the magnetic field core 22S (or 22N) falls within 45 degrees in electrical angle.

As shown in FIG. 9A, the width W5 of the end of magnetic pole 33a may gradually reduce from the center of magnetic pole group G1 to the outer side in the rotation direction. Similarly, the width W6 of the end of magnetic pole 34a may gradually reduce from the center of magnetic pole group G2 to the outer side in the rotation direction. In this case, as shown in FIG. 9B, although the phase of the magnetic flux passing through the magnetic poles 33a and 34a is uniform, the amplitude of the magnetic flux is changed. Specifically, the magnetic flux passing through the magnetic poles 33a and 34a at the center of the magnetic pole groups G1 and G2 increases, and the magnetic flux passing through the magnetic poles 33a and 34a at the outer side decreases.

[Modification of Projecting Shape of Magnetic Pole]

In FIG. 10, (a) to (f) show example of shapes of magnetic pole 33a. As described above, the magnetic poles 33a and 34a protrudes toward the magnetic field portion Fs. The distance between the magnetic field portion Fs and the armature cores H1 and H2 is small, and thus, many of the magnetic fluxes move between the armature cores H1 and H2 and the magnetic field portion Fs through the magnetic poles 33a and 34a. The shape of magnetic poles 33a and 34a may be appropriately changed if the shape satisfies such a function. The distal end surface 33i of the magnetic pole 33a shown in FIG. 10(a) has the same curvature as the inner peripheral surface of the magnetic field portion Fs, and a groove 33j between the magnetic poles 33a has a V-shape. In the example of (b), the groove 33j is U-shaped, and in the example of (c), the groove 33j is substantially rectangular. As shown in (d), the distal end surface 33i of the magnetic pole 33a may have a curvature larger than that of the inner peripheral surface of the magnetic field portion Fs. This serves to reduce the cogging torque. As yet another example, as shown in (e), a corner portion 33k of the distal end surface of the magnetic pole 33a may be chamfered, or as shown in (f), the corner portion 33k at the distal end of the magnetic pole 33a may be curved in an arc shape. The magnetic pole 34a of the second armature cores H2 may also have the shapes illustrated in FIG. 10.

[Other Examples of Rotary Electric Machine]

In the following, other examples of the rotary electric machine proposed in the present disclosure will be described. Hereinafter, other examples of the rotary electric machine will be described focusing on the points different from the above-described rotary electric machine M1. The examples of the rotary electric machine M1 may be applied to the matters (e.g., structures, flow of magnetic flux) that are not described in other examples. Further, the characteristic structures of each rotary electric machine described below may be combined with the structures of other examples described herein.

[Modification of the Number of Armature Cores]

Figure 11:
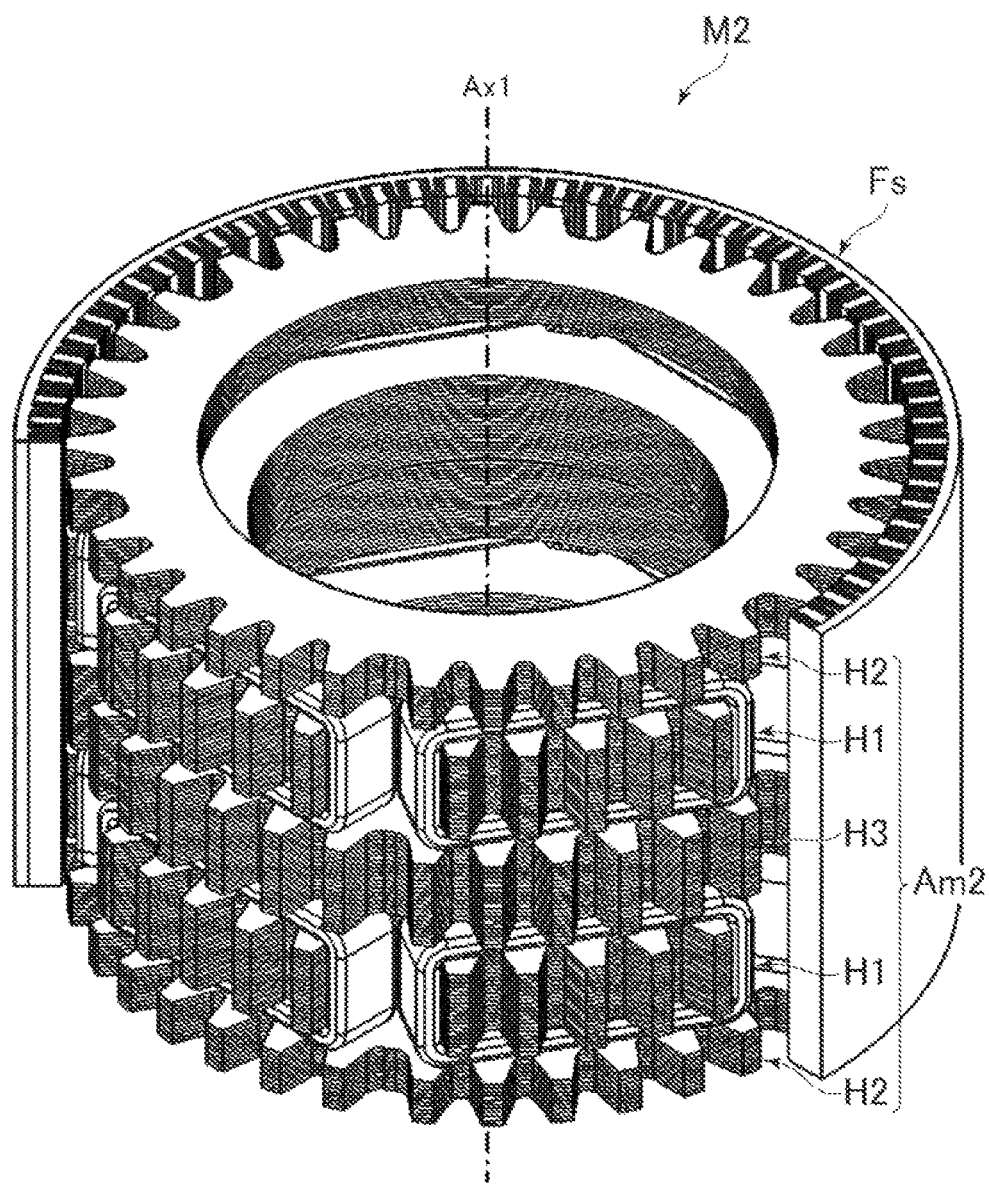
FIG. 11 is a perspective view of an example of the rotary electric machine in which the number of armature cores are changed.

The number of armature cores may be more than three. FIG. 11 is a perspective view of a rotary electric machine M2, which is another example of the rotary electric machine proposed in the present disclosure. In FIG. 11, a part of the magnetic field portion Fs in the rotation direction is not shown. As shown in FIG. 11, the armature portion Am2 of the rotary electric machine M2 has two first armature cores H1 separated in the axis direction, a third armature core H3 disposed between the two first armature cores H1, and two second armature cores H2. The first armature core H1 is disposed between the third armature core H3 and the second armature core H2. The third armature core H3 may have a structure in which the two second armature cores H2 are combined in the axis direction. The width of magnetic field portion Fs of the rotary electric machine M2 in the axis direction corresponds to the total width of armature cores H1, H3, and H2 in the axis direction. The armature portion may have a structure in which more armature cores (e.g., seven armature cores, nine armature cores) are stacked in the axis direction.

Figure 12A:
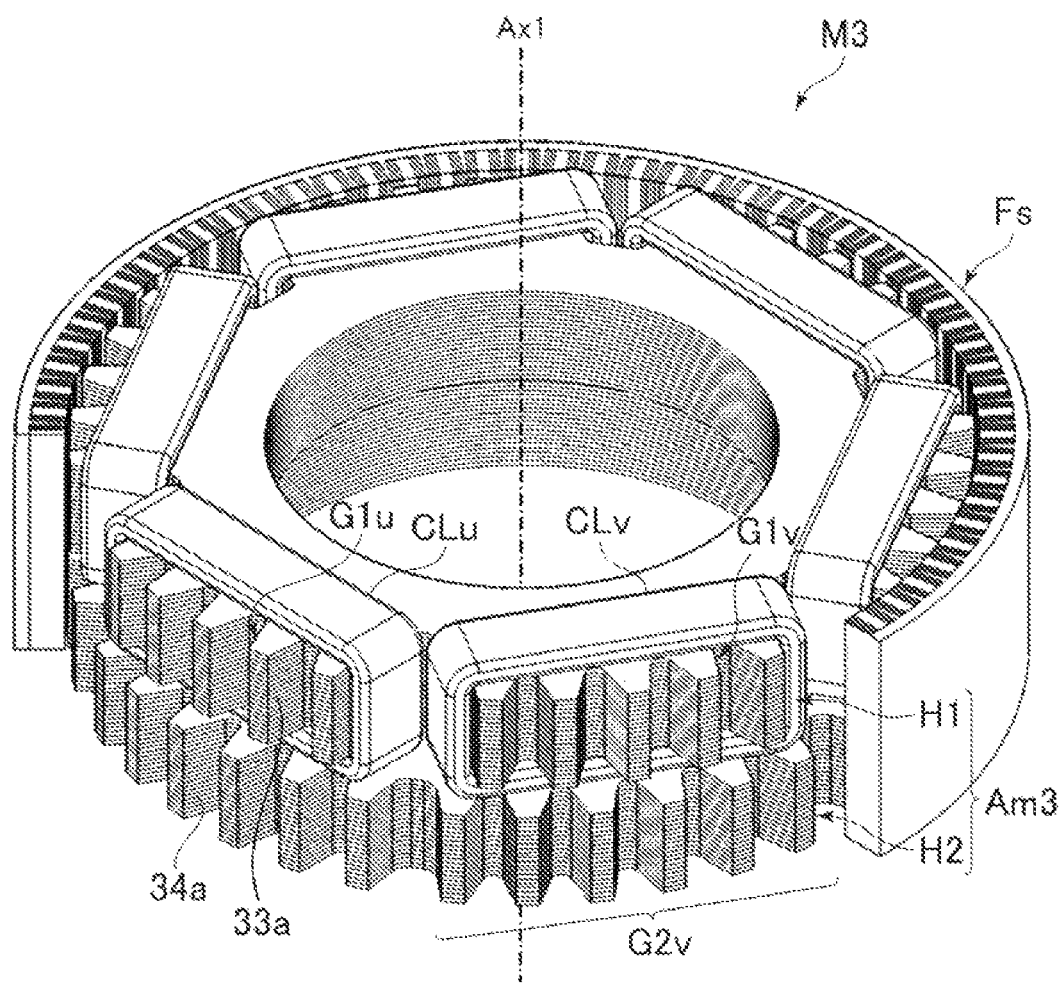
FIG. 12A is a perspective view of still another example of the rotary electric machine in which the number of armature cores are changed.
Figure 12B:
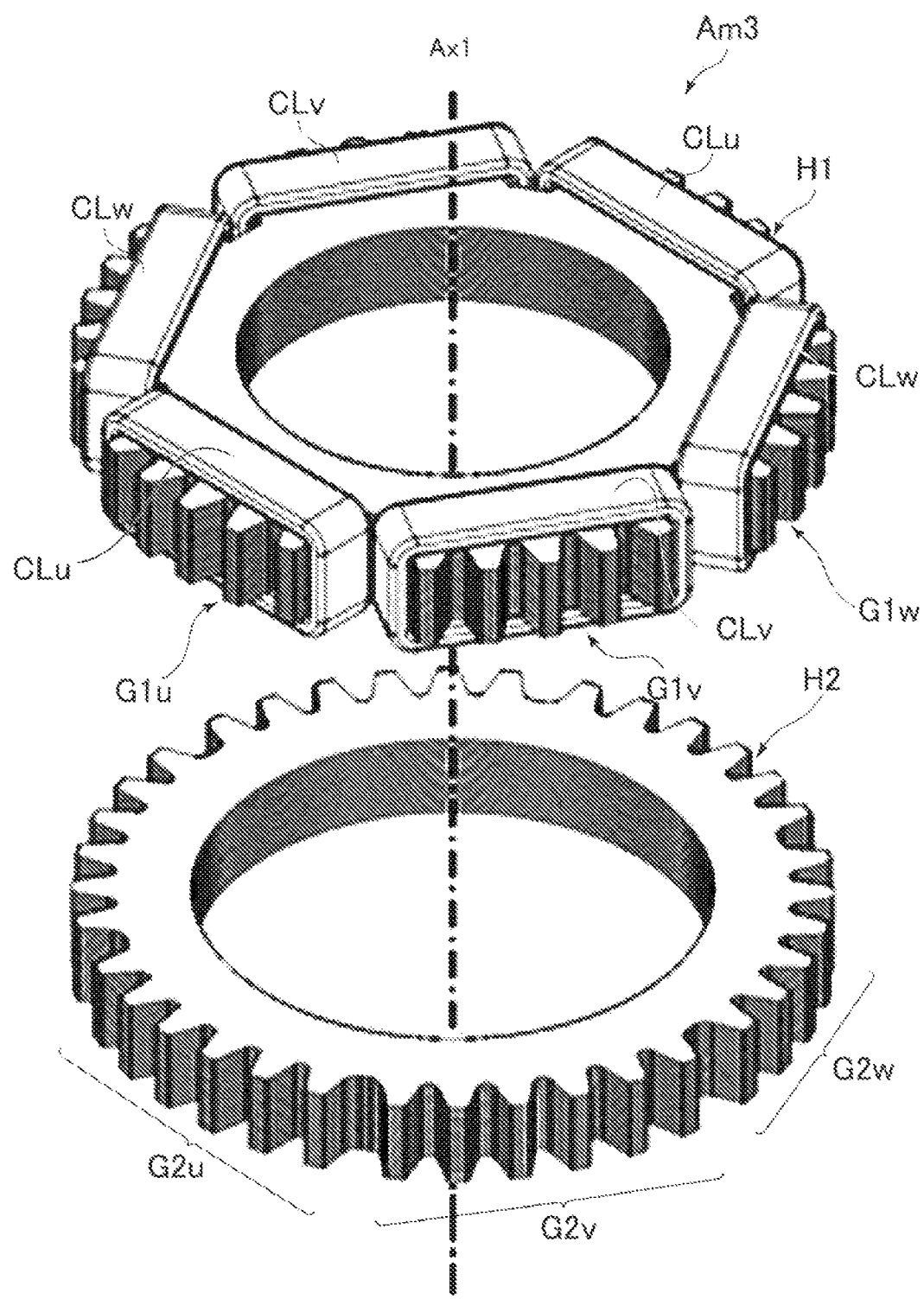
FIG. 12B is an exploded perspective view of the armature portion of the rotary electric machine shown in FIG. 12A.

The number of armature cores may be less than three. FIGS. 12A and 12B are diagrams illustrating a rotary electric machine M3, which is another example of the rotary electric machine proposed in the present disclosure. FIG. 12A is a perspective view of the magnetic field portion Fs, in which a part of the magnetic field portion Fs in the rotation direction is not shown. FIG. 12B is an exploded perspective view of the armature portion Am3 of the rotary electric machine M3. As shown in FIGS. 12A and 12B, the armature portion Am3 includes one first armature core H1 and one second armature core H2. The second armature core H2 of the armature portion Am3 may have a structure in which the two second armature cores H2, which are described referring to FIG. 1A, are combined in the axis direction. The second armature core H2 is disposed on one side (lower side in FIGS. 12A and 12B) of the first armature core H1, and the upper side of the first armature core H1 is exposed. Such structure of the rotary electric machine M3 serves to reduce the number of components, and facilitate the work to connect the members for supplying a current to the coil CL (e.g., bus bar) with the coil CL since the coil CL is exposed.

[Example of Coil Wound Around Yoke Portion]

Figure 13:
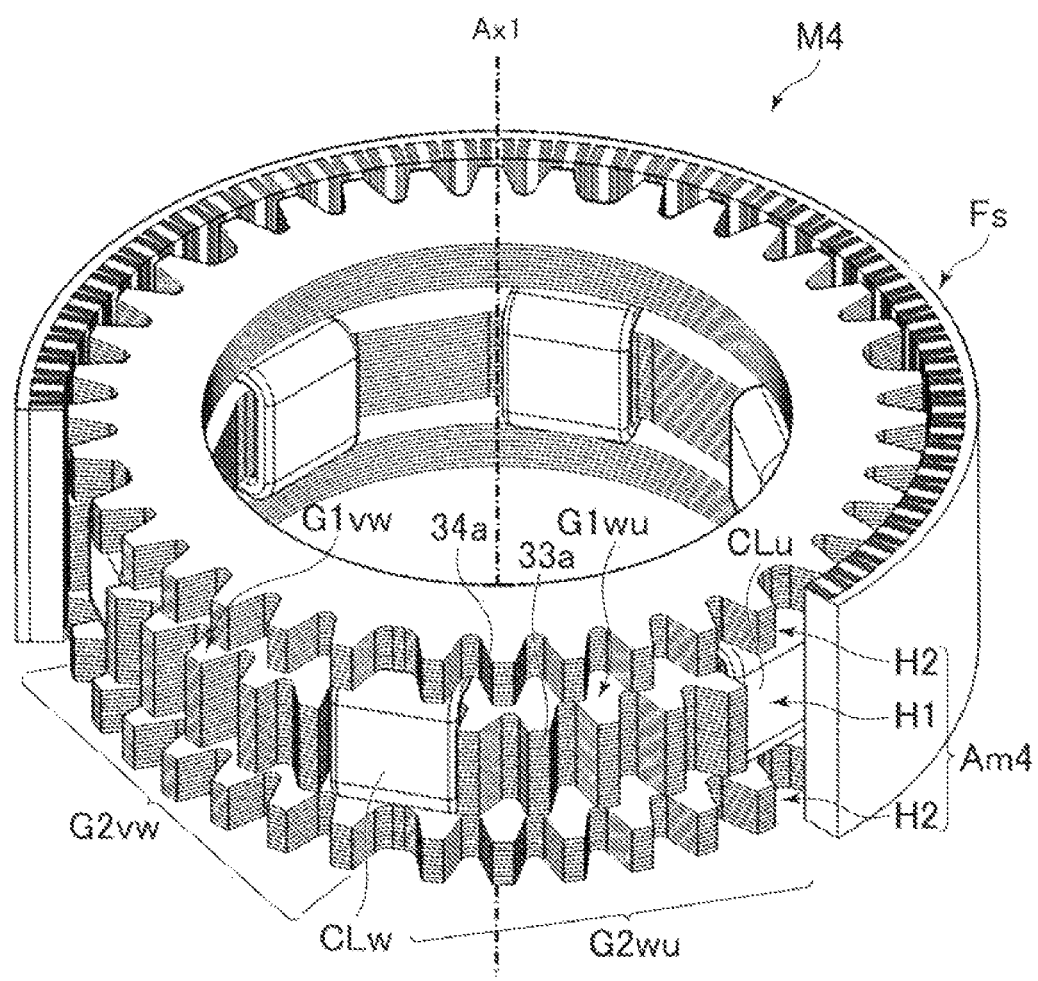
FIG. 13 is a perspective view of an example of the rotary electric machine having a coil wound around a yoke portion.
Figure 14:
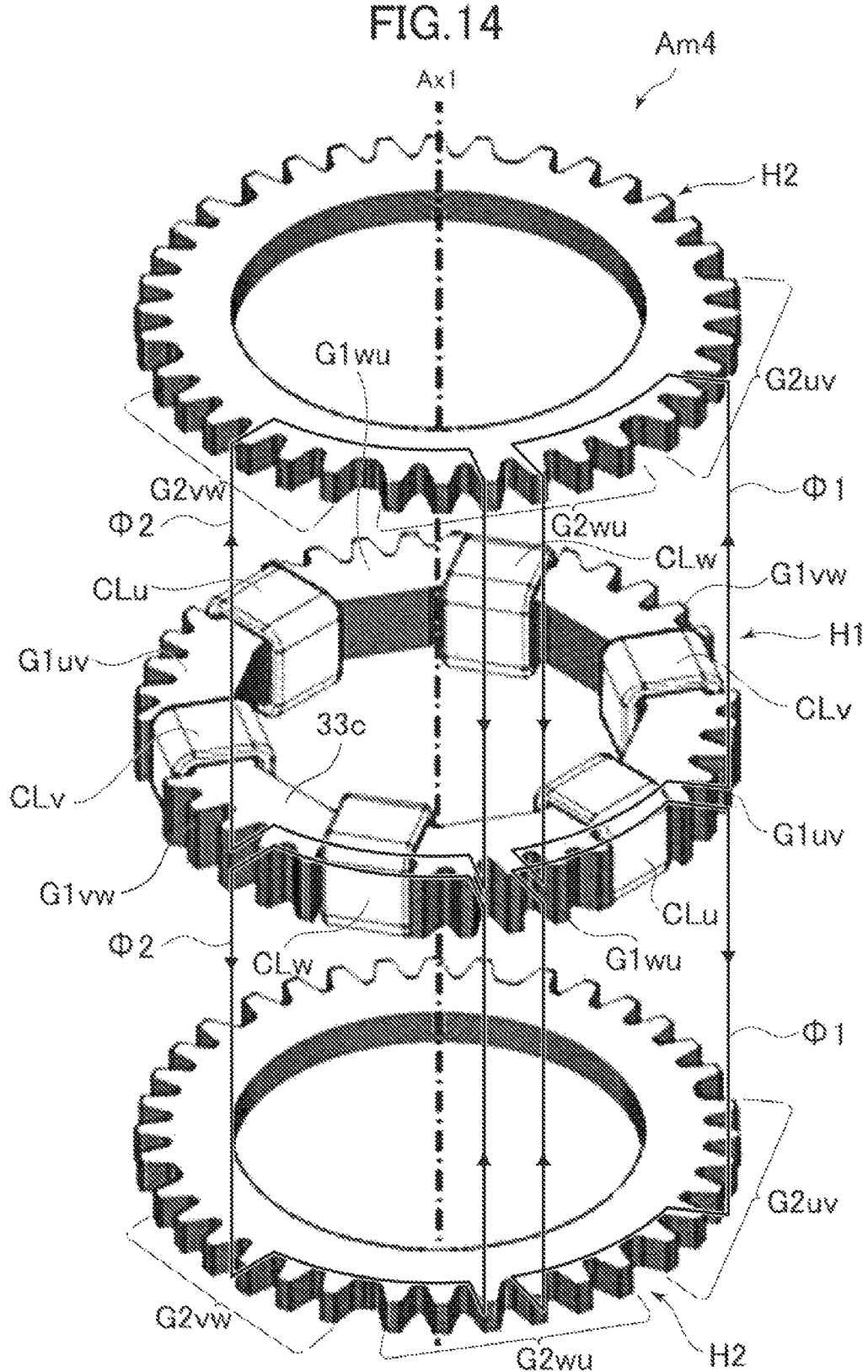
FIG. 14 is a diagram illustrating a magnetic flux flowing through the armature portion of the rotary electric machine shown in FIG. 13, where the armature cores are spaced apart in the axis direction and the magnetic field portion is omitted.

The coils may be located between two adjacent magnetic pole groups and wound around the yoke portion of the armature core. FIGS. 13 to 15B illustrate a rotary electric machine M4 having such a structure as another example of the rotary electric machine proposed in the present disclosure. FIG. 13 is a perspective view of the rotary electric machine M4, in which a part of the magnetic field portion Fs in the rotation direction is not shown. FIG. 14 is an exploded perspective view of an armature portion Am4 of the rotary electric machine M4. FIG. 14 also shows the flow of magnetic fluxes Φ1 and Φ2 occurring in the rotary electric machine M4 when the magnetic field portion Fs is fixed at a certain position. In FIG. 14, the magnetic flux of the magnets Mg formed on the rotary electric machine M4 is divided into two in the rotation direction, and only half of the magnetic flux is shown. The flow of the magnetic flux omitted in FIG. 14 is the same as the flow of the magnetic flux as illustrated. In other words, when rotating the illustrated magnetic flux 180 degrees at the mechanical angle, the magnetic flux matched with the magnetic flux omitted in FIG. 14.

As shown in FIG. 14, the coil CL is attached to the first armature core H1. The coil CL is disposed between two magnetic pole groups G1 adjacent in the rotation direction and wound around the yoke portion 33c. As such, the magnetic flux formed by the magnets Mg passes through the inside of the coil CL, thereby flowing between the two magnetic pole groups G1. This enables the magnetic flux to efficiently intersect the coil CL.

The armature portion Am4 includes a U phase coil CLu, a V phase coil CLv, and a W phase coil CLw. The first armature core H1 includes a magnetic pole group G1uv located between the U phase coil CLu and the V phase coil CLv, a magnetic pole group G1vw located between the V phase coil CLv and the W phase coil CLw, and a magnetic pole group G1wu located between the W phase coil CLw and the U phase coil CLu as the magnetic pole group G1. In the armature portion Am4, the first armature core H1 have a distance between two adjacent magnetic pole groups G1 to allow the coils CL to be disposed. In other respects, for example, the structure of magnetic field portion Fs and the structure of the second armature core H2 may be the same as in the example of the rotary electric machine M1.

FIG. 15A is a diagram for explaining the relationship between the angle position of magnetic field portion Fs and the magnetic flux (magnetic flux formed by the magnets Mg) passing through the U phase coil CLu. The horizontal axis is an angle position expressed by an electrical angle, and the vertical axis is a magnetic flux. The vertical axis shows the magnetic flux passing through the coil CLu in the counterclockwise direction when viewed from the upper side of rotary electric machine as a positive value. FIG. 15B is a diagram showing a flow of magnetic flux. In FIG. 15B, (a) represents the flow of the magnetic flux when the magnetic field portion Fs is at the position indicated by the line (a) in FIG. 15A, which is the same as that shown in FIG. 14. In FIG. 15B, (b) and (c) represent the flow of the magnetic flux when the magnetic field portion Fs is at the positions indicated by the lines (b) and (c) in FIG. 15A, respectively. Although not shown in FIG. 15A, the magnetic flux passing through the V phase coil CLv is out of phase by −120 degrees from the magnetic flux passing through the U phase coil CLu, and the magnetic flux passing through the W phase coil CLw is out of phase by 120 degrees from the magnetic flux passing through the U phase coil CLu. In FIG. 15B, similarly to FIG. 14, the magnetic flux of the magnets Mg formed on the rotary electric machine M4 is divided into two in the rotation direction and only half of the magnetic flux is shown. The flow of the magnetic flux omitted in these drawings is the same as the flow of the magnetic flux as illustrated. In other words, when rotating the illustrated magnetic flux 180 degrees at the mechanical angle, the magnetic flux matched with the magnetic flux omitted in the drawings.

In FIG. 15A, the line U shows the magnetic flux passing through the U-phase coil CLu of the rotary electric machine M4, and, as shown in FIG. 1A, the dotted line μl represents the magnetic flux passing through the U phase coil CLu in the structure in which the U phase coil CLu is wound on the magnetic pole group G1$u$. As shown in FIG. 15A, the phase of the magnetic flux passing through the U phase coil CLu in the rotary electric machine M4 is shifted by 30 degrees in electrical angle from the phase of the magnetic flux passing through the U phase coil CLu in the rotary electric machine M1.

As shown in FIG. 14, the magnetic circuit in the rotary electric machine M4 is the same as that in the example of the rotary electric machine M1 (see FIG. 4). That is, the magnetic flux Φ1 flows in the rotation direction between the magnetic pole group G1$wu$ and the magnetic pole group G1$uv$ in the first armature core H1, and also passes through the inside of the U phase coil CLu. The magnetic flux Φ1 flows between the magnetic pole group G1$uv$ of the first armature core H1 and the magnetic pole group G2 of the second armature core H2 in the axis direction through the magnetic field cores 22N and 22S and the magnets Mg of the magnetic field portion Fs. Further, the magnetic flux Φ1 flows between the two magnetic pole groups G2 provided in the second armature core H2 in the rotation direction, and flows in the axis direction between the magnetic pole group G1$wu$ of the first armature core H1 and the magnetic pole group G2 of the second armature core H2 through the magnetic field cores 22N and 22S and the magnets Mg. Similarly to the magnetic flux Φ1, the magnetic flux Φ2 also passes through the closed magnetic circuit formed by the magnetic pole group G1$wu$ and the magnetic pole group G1$vw$ provided in the first armature core H1, two magnetic pole groups G2 provided in the second armature core H2, the magnetic field cores 22N and 22S and the magnets Mg of the magnetic field portion Fs.

When the magnetic field portion Fs rotates by 30 degrees in electrical angle from the position of the line (a) and reaches the position of the line (b), as shown in (b) of FIG. 15B, the magnetic flux Φ3 passing through the magnetic circuit, which includes the magnetic pole groups G1$wu$ and G1$vw$ of the first armature core H1, the magnetic field cores 22S and 22N and the magnets Mg of the magnetic field portion Fs, and the two magnetic pole group G2 provided in the second armature core H2, is formed. Further, as shown in (b) of FIG. 15B, a part of the magnetic flux (magnetic flux Φ4$a$) passing through the magnetic pole group G1$wu$ is not directed in the adjacent magnetic pole group G1$vw$, but is directed to the magnetic pole group G1$vw$ on the opposite side. That is, the magnetic pole group pair Pwu and the magnetic pole group pair Pvw, which is 120 degrees in mechanical angle away from the magnetic pole group pair Pwu constitute the magnetic circuit (magnetic flux Φ4$a$). Similarly, a part of the magnetic flux (magnetic flux Φ4$b$) passing through the magnetic pole group G1$vw$ is not directed to the adjacent magnetic pole group G1$wu$ but is directed to the magnetic pole group G1$wu$ on the opposite side. That is, the magnetic pole group pair Pvw and the magnetic pole group pair Pwu, which is 120 degrees in mechanical angle away from the magnetic pole group pair Pvw, constitute the magnetic circuit (magnetic flux Φ4$b$). The magnetic pole group pair Pwu is a pair including the magnetic pole group G1$wu$ of the first armature core H1 and the magnetic pole group G2$wu$ of the second armature core H2 arranged in the axis direction. The same applies to the other magnetic pole group pairs Puv and Pvw.

When the magnetic field portion Fs is further rotated by 30 degrees in electrical angle from the position of the line (b) and reaches the position of the line (c), as shown by (c) of FIG. 15B, the magnetic flux Φ5 passing through the magnetic circuit, which includes the magnetic pole groups G1$vw$ and G1$wu$ of the first armature core H1, the magnetic field cores 22S and 22N and the magnets Mg of the magnetic field portion Fs, and two magnetic pole groups G2 provided in the second armature core H2, is formed. Further, the magnetic flux Φ6 passing through the magnetic circuit, which includes the magnetic pole groups G1$uv$ and G1$vw$ of the first armature core H1, the magnetic field cores 22S and 22N and the magnets Mg of the magnetic field portion Fs, and two magnetic pole groups G2 provided in the second armature core H2, is formed.

[Another Example of Coil Wound Around Yoke Portion]

Figure 16A:
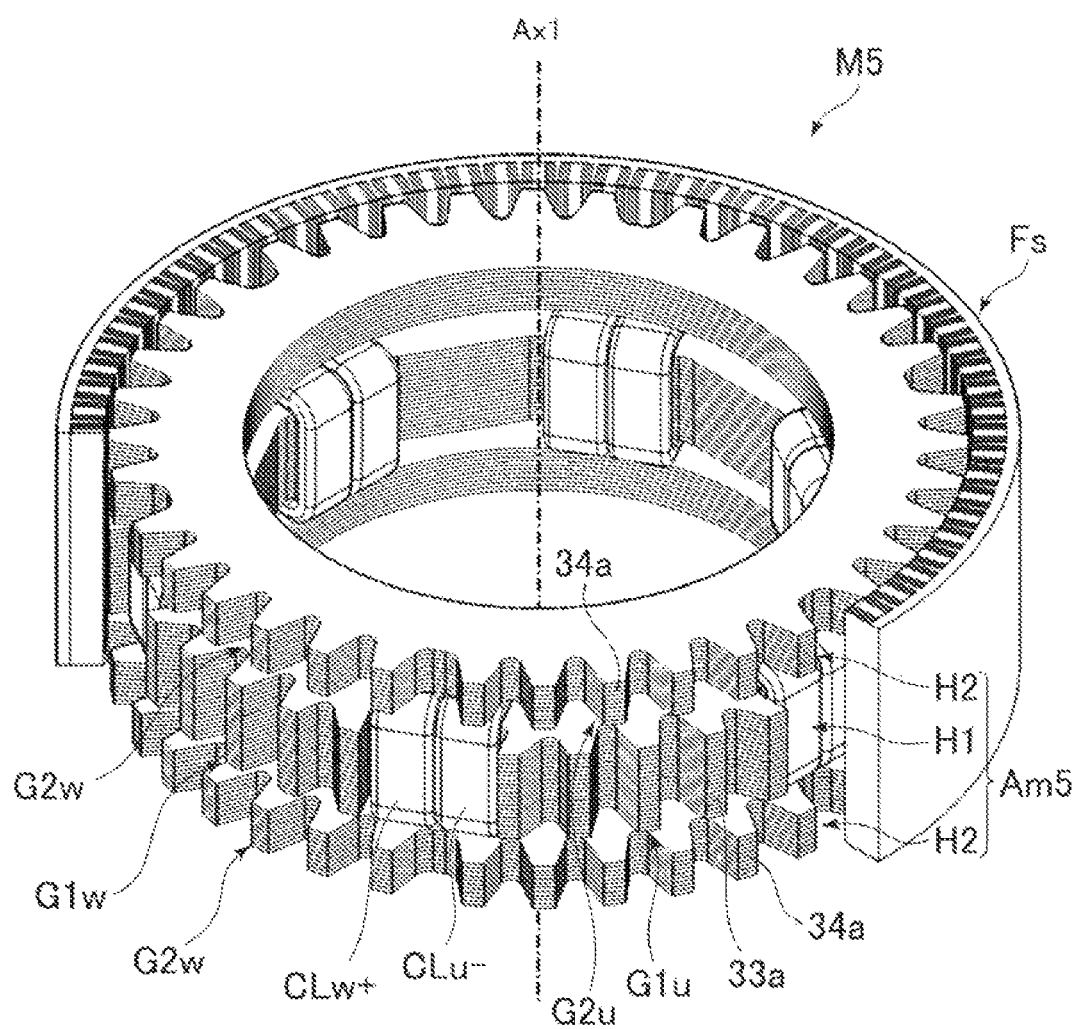
FIG. 16A is a perspective view of another example of the rotary electric machine having a coil wound around a yoke portion.
Figure 16B:
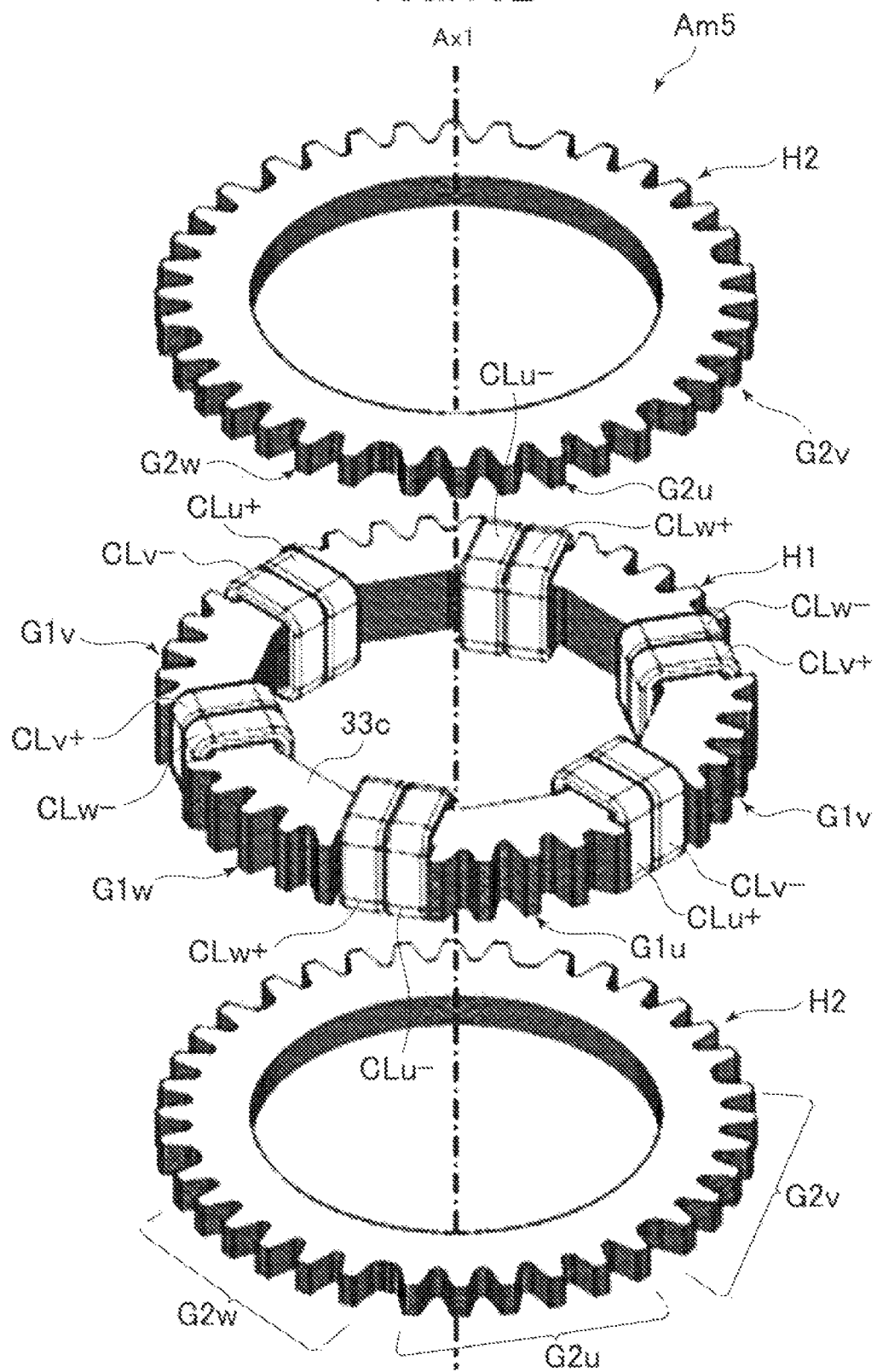
FIG. 16B is an exploded perspective view of the armature portion of the rotary electric machine shown in FIG. 16A.

Two coils may be located between two adjacent magnetic pole groups and wound around the yoke portion of the armature core. FIGS. 16A to 17B illustrate a rotary electric machine M5 having such a structure as another example of the rotary electric machine proposed in the present disclosure. FIG. 16A is a perspective view of the rotary electric machine M5, and a part of the rotation direction of the magnetic field portion Fs is not shown. FIG. 16B is an exploded perspective view of the armature portion Am5 forming the rotary electric machine M5.

As shown in FIG. 16B, in the first armature cores H1 of the armature portion Am5, two coils CL are disposed between two magnetic pole groups G1 adjacent in the rotation direction and wound around the yoke portion 33$c$. The magnetic flux formed by the magnets Mg passes through the inside of the coil CL, and flows through the magnetic pole groups G1 disposed in the rotation direction. This enables the magnetic flux to efficiently intersect the coil CL. In the armature portion Am5, pairs of coils CL as follows are disposed between two adjacent magnetic pole groups G1.

"U+ phase coil CLu+ and V-phase coil CLv−"
"V+ phase coil CLv+ and W-phase coil CLw−"
"W+ phase coil CLw+ and U-phase coil CLu−"

The U-phase coil CLu− and the U+ phase coil CLu+ are coils that are supplied with current of the same phase and have opposite winding directions to each other (i.e., coils that generates opposite polarities to each other). As such, the U-phase coil CLu− and the U+ phase coil CLu+ generates magnetic fields of opposite poles. The same applies to the V-phase coil CLv− and the W-phase coil CLw−.

As shown in FIG. 16B, the first armature core H1 includes the magnetic pole group G1$u$ between the U+ phase coil CLu+ and the U-phase coil CLu−, the magnetic pole group G1$v$ between the V+ phase coil CLv+ and the V-phase coil CLv−, and the magnetic pole group G1$w$ between the W+ phase coil CLw+ and the W− phase coil CLw− as the magnetic pole group G1. In other respects, for example, the structure of magnetic field portion Fs and the structure of the second armature core H2 may be the same as in the example of the armature portion Am4 of the rotary electric machine M4.

Figure 17B:
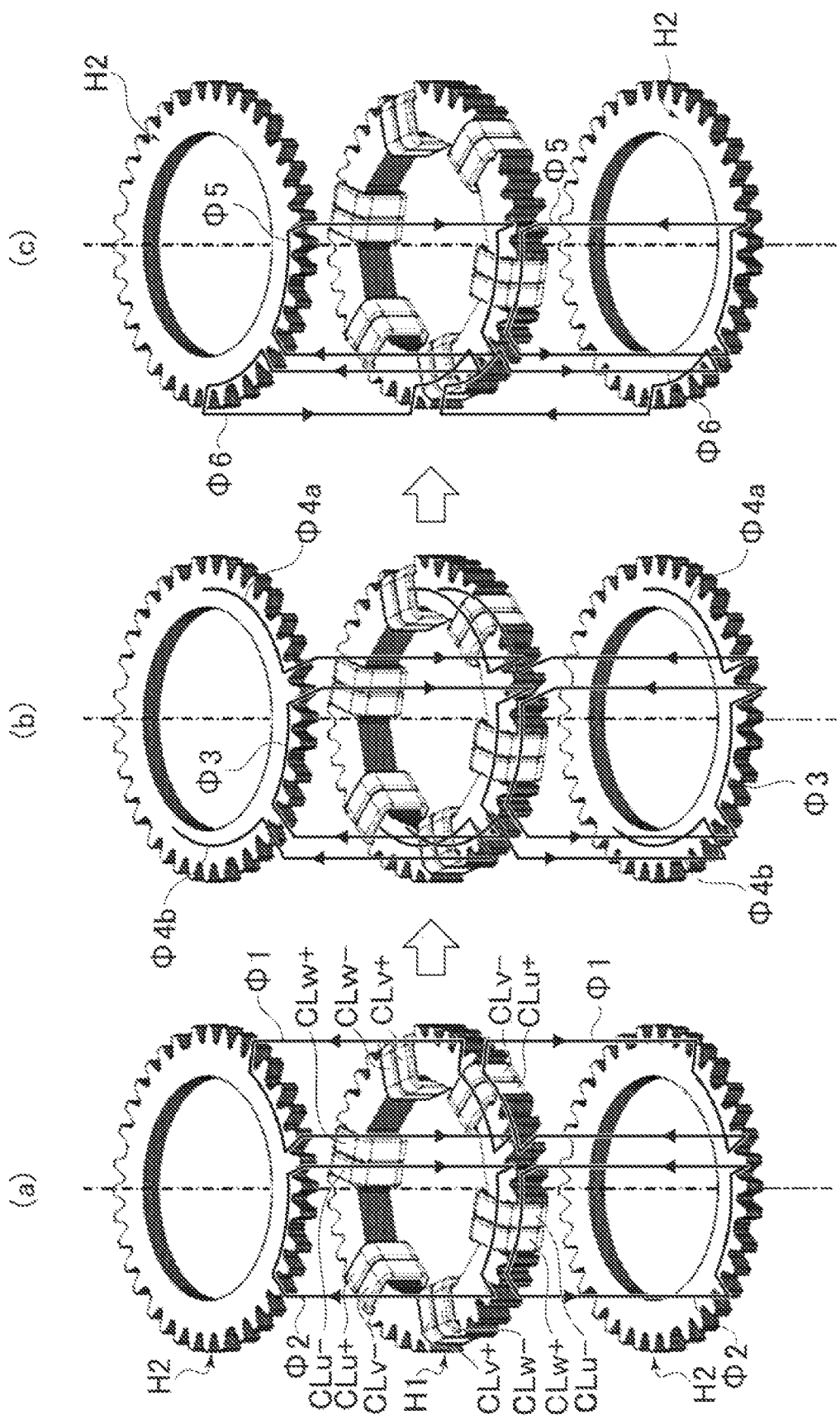
FIG. 17B is a diagram showing changes in the magnetic flux formed in the rotary electric machine shown in FIG. 16A.

FIG. 17A is a diagram for explaining the relationship between the angle position of the magnetic field portion Fs and the magnetic flux passing through the U+ phase coil CLu+ and the U− phase coil CLu− (magnetic flux formed by magnets Mg). The horizontal axis is an angle position expressed by an electrical angle, and the vertical axis is a magnetic flux. The vertical axis shows the magnetic flux passing through the coils CLu+ and CLu− in the counter-clockwise direction when viewed from the upper side of the rotary electric machine as a positive value. FIG. 17B is a diagram showing a flow of magnetic flux. In FIG. 17B, (a) represents the flow of magnetic flux when the magnetic field portion Fs is located at the position indicated by the line (a) in FIG. 17A. In FIG. 17B, (b) and (c) respectively represent the flows of magnetic flux when the magnetic field portion Fs is located at the positions indicated by the lines (b) and (c) in FIG. 17A. The flow of the magnetic flux omitted in these drawings is the same as the flow of the magnetic flux as illustrated. The flow of the magnetic flux omitted in these drawings is the same as the flow of the magnetic flux as illustrated. In other words, when rotating the illustrated magnetic flux 180 degrees at the mechanical angle, the magnetic flux matched with the magnetic flux omitted in the drawings.

In FIG. 17A, the line U+ shows the magnetic flux passing through the U+ phase coil CLu+, and the line U− shows the magnetic flux passing through the U− phase coil CLu−. The dotted line E1 is a line representing the magnetic flux passing through the U phase coil CLu in a structure in which, as shown in FIG. 1A, the U phase coil CLu is wound on the magnetic pole group G1$u$. As shown in FIG. 17A, the phase of the magnetic flux passing through the U+ phase coil CLu+ in the rotary electric machine M5 and the phase of the magnetic flux passing through the U-phase coil CLu− are respectively shifted by 30 degrees and 150 degrees in electrical angle from the phase of the magnetic flux passing through the U phase coil CLu in the rotary electric machine M1.

The winding direction of the U-phase coil CLu− is opposite to the winding direction of the U+ phase coil CLu+, and thus, when the magnetic flux passing through the U-phase coil CLu− is inverted and combined with the magnetic flux passing through the U+ phase coil CLu+, it matches the magnetic flux (line E1) passing through the U phase coil CLu wound on the magnetic pole group G1$u$ (In FIG. 17A, the dotted line is a value obtained by inverting the magnetic flux passing through the U-phase coil CLu−).

When the magnetic field portion Fs is at the position of the line (a), as shown in (a) of FIG. 17B, the magnetic flux $\Phi$1 passing through the magnetic circuit, which includes the magnetic pole groups G1$u$ and G1$v$ of the first armature core H1, the magnetic field cores 22S and 22N and the magnets Mg of the magnetic field portion Fs, and the two magnetic pole group G2 provided in the second armature core H2, is formed. Further, the magnetic flux $\Phi$2 passing through the magnetic circuit, which includes the magnetic pole groups G1$u$ and G1$w$ of the first armature core H1, the magnetic field cores 22S and 22N and the magnets Mg of the magnetic field portion Fs, and two magnetic pole groups G2 provided in the second armature core H2, is formed.

When the magnetic field portion Fs rotates by 30 degrees in electrical angle from the position of the line (a) and reaches the position of the line (b), as shown in (b) of FIG. 17B, the magnetic flux $\Phi$3 passing through the magnetic circuit, which includes the magnetic pole groups G1$u$ and G1$w$ of the first armature core H1, the magnetic field cores 22S and 22N and the magnets Mg of the magnetic field portion Fs, and the two magnetic pole group G2 provided in the second armature core H2, is formed. Further, as shown in (b) of FIG. 17B, a part of the magnetic flux (magnetic flux $\Phi$4$a$) passing through the magnetic pole group G1$u$ is not directed in the adjacent magnetic pole group G1$w$, but is directed to the magnetic pole group G1$w$ on the opposite side. That is, the magnetic pole group pair Pu and the magnetic pole group pair Pw, which is 120 degrees in mechanical angle away from the magnetic pole group pair Pu, constitute the magnetic circuit (magnetic flux $\Phi$4$a$). Similarly, a part of the magnetic flux (magnetic flux $\Phi$4$b$) passing through the magnetic pole group G1$w$ is not directed to the adjacent magnetic pole group G1$u$ but is directed to the magnetic pole group G1$u$ on the opposite side. That is, the magnetic pole group pair Pw and the magnetic pole group pair Pu, which is 120 degrees away from the magnetic pole group pair Pw, constitute the magnetic circuit (magnetic flux $\Phi$4$b$). The magnetic pole group pair Pu is a pair composed of the magnetic pole group G1$u$ of the first armature core H1 and the magnetic pole group G2$u$ of the second armature core H2 arranged in the axis direction. The same applies to the other magnetic pole group pairs Pv and Pw.

When the magnetic field portion Fs is further rotated by 30 degrees in electrical angle from the position of the line (b) and reaches the position of the line (c), as shown by (c) of FIG. 17B, the magnetic flux $\Phi$5 passing through the magnetic circuit, which includes the magnetic pole groups G1$u$ and G1$w$ of the first armature core H1, the magnetic field cores 22S and 22N and the magnets Mg of the magnetic field portion Fs, and two magnetic pole groups G2 provided in the second armature core H2, is formed. Further, the magnetic flux $\Phi$6 passing through the magnetic circuit, which includes the magnetic pole groups G1$w$ and G1$v$ of the first armature core H1, the magnetic field cores 22S and 22N and the magnets Mg of the magnetic field portion Fs, and two magnetic pole groups G2 provided in the second armature core H2, is formed.

[Example of Armature Core Formed of Powder Material]

Figure 18:
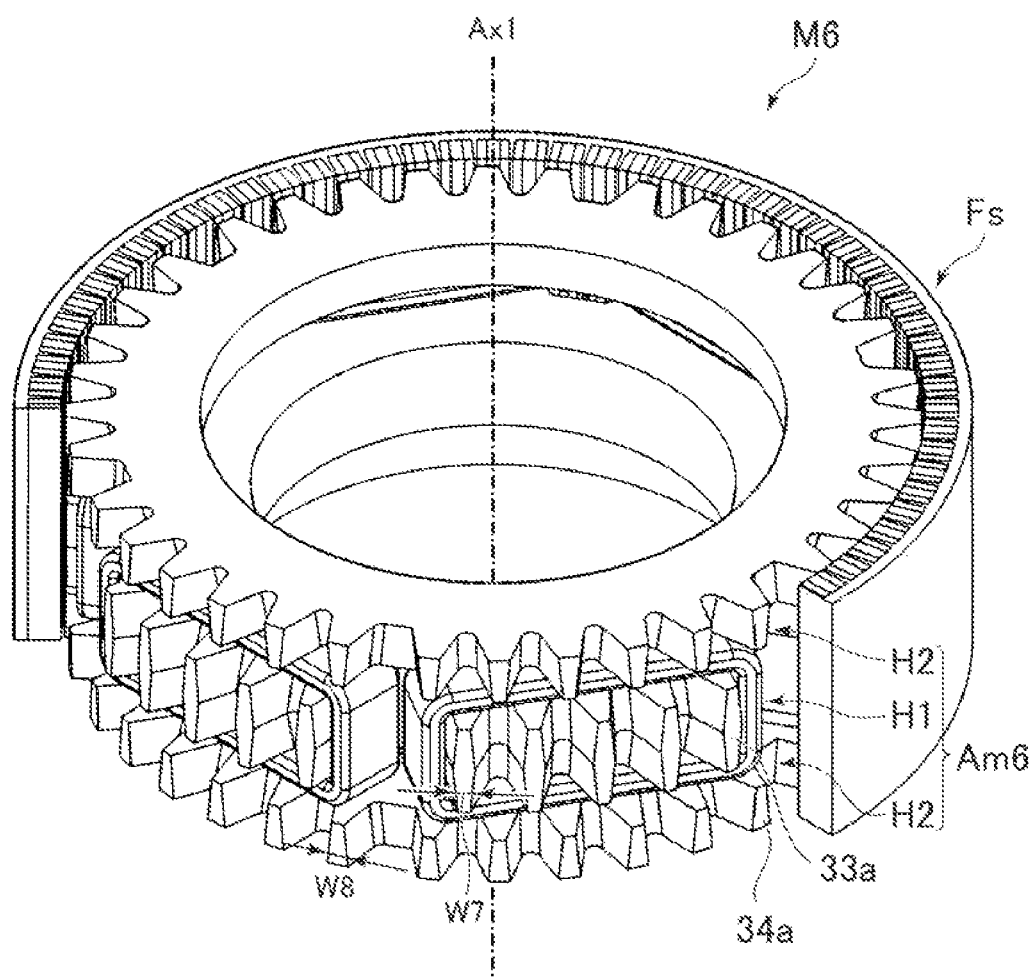
FIG. 18 is a perspective view of an example of the rotary electric machine having the armature core formed of a powder material.

The armature core may be formed of a soft magnetic powder material (i.e., soft magnetic composite (SMC) material). FIG. 18 shows a rotary electric machine M6 having such a structure as another example of the rotary electric machine proposed in the present disclosure. FIG. 18 is a perspective view of the rotary electric machine M6. A part of the magnetic field portion Fs in the rotation direction is not shown.

The armature portion Am6 of the rotary electric machine M6 includes armature cores H1 and H2 formed of a soft magnetic powder material (i.e., soft magnetic composite (SMC) material). That is, the armature cores H1 and H2 are formed of a composite material including a soft magnetic powder and an insulating film (e.g., resin film) covering the surface of the powder. The composite material is compression molded and heat treated to form the armature cores H1 and H2. Such armature cores H1 and H2 have a high electrical resistivity, and thus, it is possible to prevent eddy current regardless of the direction of the magnetic flux passing through the armature cores H1 and H2.

Unlike lamination steel, the powder material is produced by using a mold. As such, for example, a high degree of freedom can be secured for the shape of the magnetic poles 33a and 34a. In the armature portion Am6, the widths W7 and W8 of the magnetic poles 33a and 34a in the rotation direction are changed in the axis direction. The width W7 of the magnetic pole 33a gradually decreases from the center of the magnetic pole 33a in the axis direction toward the second armature core H2. The width W8 of the magnetic pole 34a gradually reduces toward the first armature core H1. This serves to reduce the cogging torque.

[Example of Magnetic Field Portion Disposed Inside of Armature Core]

Figure 19A:
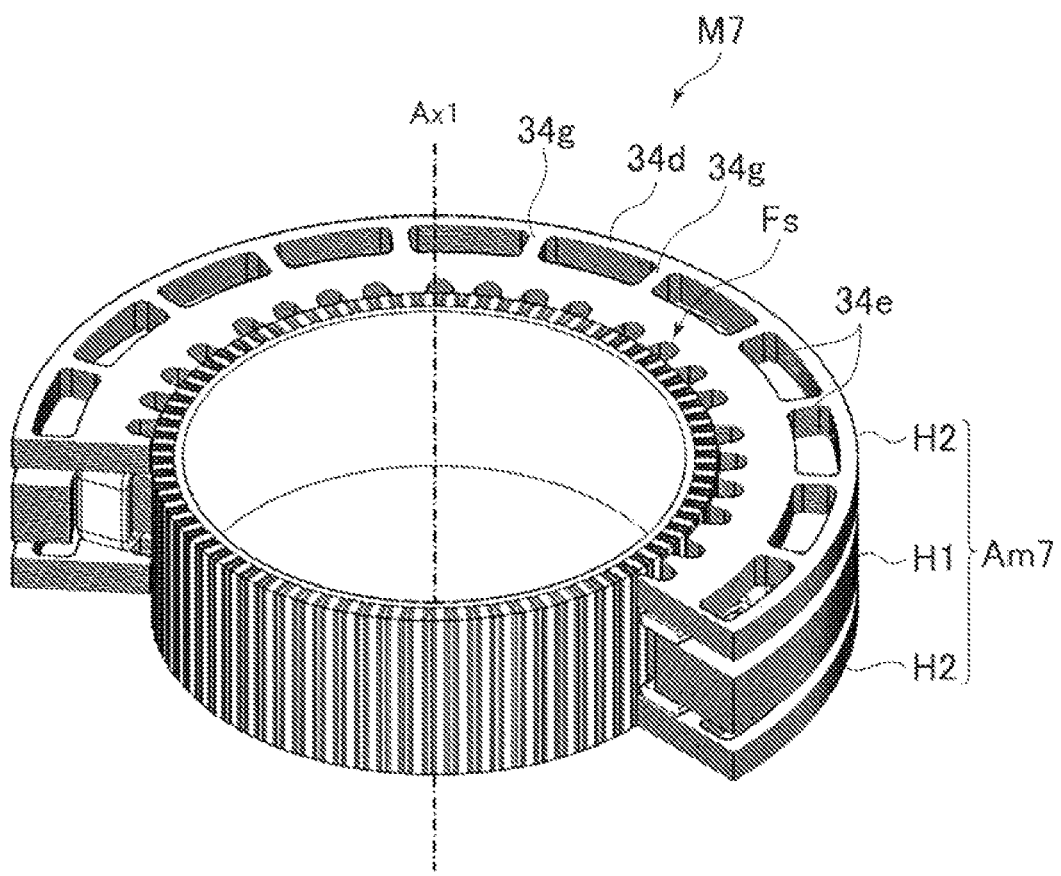
FIG. 19A is a perspective view of an example of the rotary electric machine where the magnetic field portion is disposed inside the armature core.
Figure 19C:
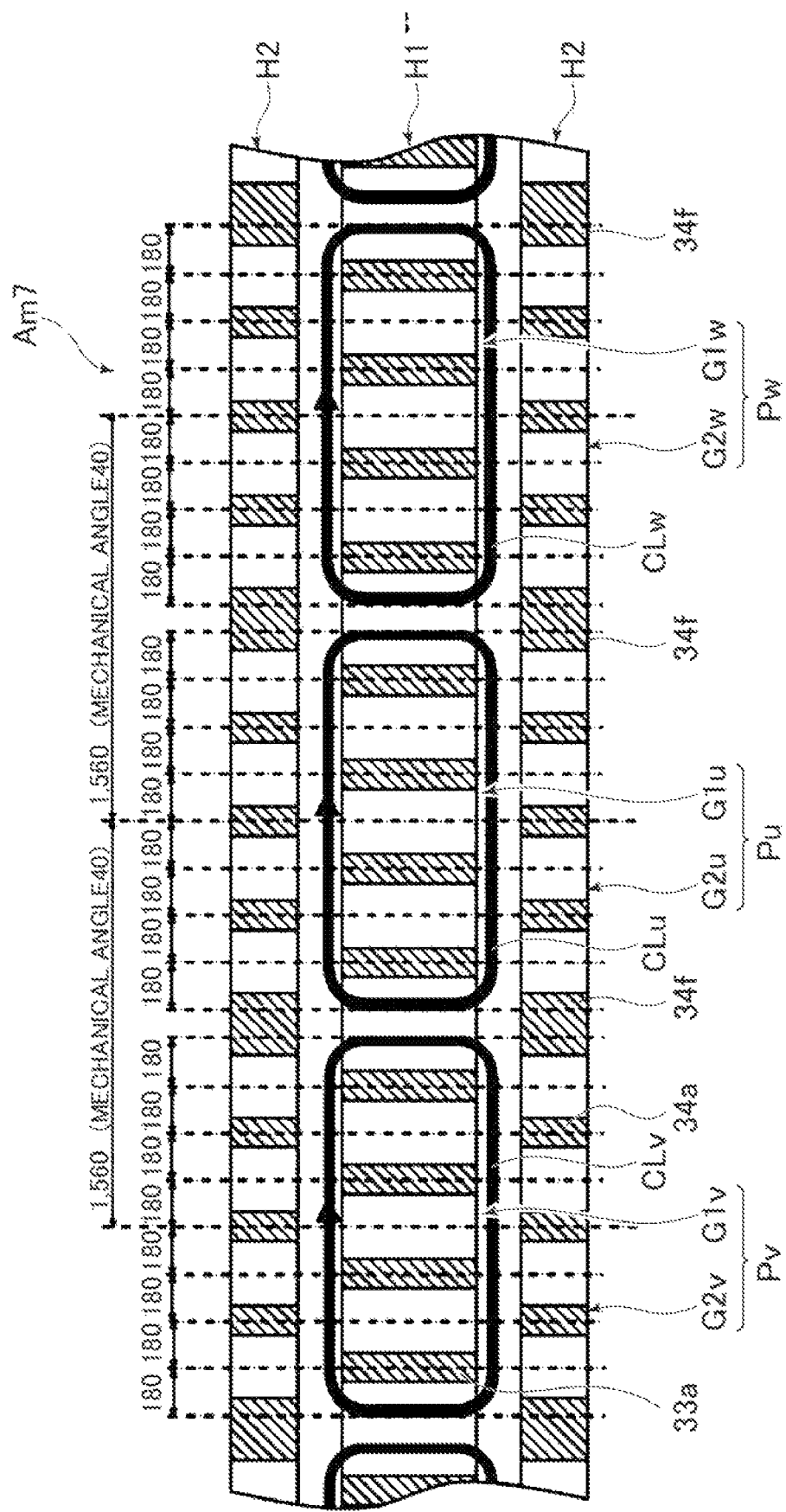
FIG. 19C is a part of a development view of the armature portion of the rotary electric machine shown in FIG. 19A in which positions of magnetic poles of the armature portion are indicated.

A rotatable magnetic field portion may be disposed inside the annular armature core. FIGS. 19A and 19B illustrate a rotary electric machine M7 having such a structure as another example of the rotary electric machine proposed in the present disclosure. FIG. 19A is a perspective view of the rotary electric machine M7, and a part of the armature portion Am7 in the rotation direction is not shown. FIG. 19B is an exploded perspective view of the rotary electric machine M7. FIG. 19C is a development view of the armature portion Am7 of the rotary electric machine M7 in which the positions of magnetic poles are shown, and the numerical values therein represent the angles (distances) in electrical angle in the rotation direction.

In the rotary electric machine M7, the magnetic field portion Fs is disposed inside the annular armature portion Am7. The armature portion Am7 includes a first armature core H1 and two second armature cores H2. The first armature core H1 is disposed between the two second armature cores H2. A plurality of coils CL include a U phase coil CLu, a V phase coil CLv, and a W phase coil CLw, which are provided in the first armature core H1. The coil CL is not provided in the second armature core H2. The number of armature cores, the number of phases of AC to be supplied, and the number of coils CL may be appropriately changed in the same manner as described for the rotary electric machine M1. The armature cores H1 and H2 are formed of lamination steel, for example, but may be formed of the above-described powder material.

As shown in FIG. 19B, the first armature core H1 includes an annular yoke portion 33c, and a plurality of magnetic pole groups G1 formed inside the yoke portion 33c and disposed in the rotation direction. Each of the magnetic pole groups G1 has a plurality of magnetic poles 33a projecting toward the magnetic field portion Fs and arranged in the rotation direction. In the rotary electric machine M7, coils CL are wound around the magnetic poles 33a constituting the magnetic pole groups G1. The positions of the coils CL are not limited to this example, and the coils CL may be provided in the yoke portion 33c similarly to the example shown in FIG. 13.

As shown in FIG. 19B, the second armature core H2 has an annular yoke portion 34c and an annular portion 34d formed outside of the yoke portion 34c. The annular portion 34d is connected to the yoke portion 34c by a plurality of coupling portions 34g, and forms a plurality of holes 34e arranged in the rotation direction. The outer diameter of the annular portion 34d and the outer diameter of the yoke portion 33c of the first armature core H1 may coincide with each other. In this manner, when fixing the armature portion Am7 to the structure of the device on which the rotary electric machine M7 is mounted, the fixing structure can be simplified with high accuracy. Further, the plurality of holes 34e are formed in the second armature core H2, which serves to reduce an increase in the weight of the second armature core H2. Further, the holes 34e may be used to pull electric wires connected to the coils CL to the outside of the armature portion Am7.

As shown in FIG. 19B, the second armature core H2 includes a plurality of magnetic pole groups G2 formed inside the yoke portion 34c and disposed in the rotation direction. Each magnetic pole group G2 has a plurality of magnetic poles 34a projecting toward the magnetic field portion Fs and arranged in the rotation direction. As shown in FIG. 19C, the magnetic poles of the end of two adjacent magnetic pole groups G2 are integrated to form a magnetic pole 34f having a larger width than the widths of the other magnetic poles 34a. As described, if magnetic poles of adjacent magnetic pole groups G2 are close, they may be integrated.

The positional relationship among the magnetic poles 33a, the magnetic poles 34a, and the magnetic field cores 22N and 22S in the rotation directions may be the same as the example of the rotary electric machine M1. As shown in FIG. 19C, each magnetic pole group G1 has four magnetic poles 33a, and each magnetic pole group G2 has five magnetic poles 34a, although these numbers may be changed as appropriate.

As shown in FIG. 19C, the magnetic pole groups G1u, G1v, and G1w and the magnetic pole groups G2u, G2v, and G2w arranged in the axis direction respectively constitute the magnetic pole group pairs Pu, Pv, and Pw. Similarly to the armature portion Am1 described with reference to FIG. 2, it is desirable that the magnetic pole group pairs Pu, Pv, and Pw have the same structure. That is, it is desirable that the number of magnetic poles 33a and 34a is the same in the magnetic pole group pairs Pu, Pv, and Pw. Desirably, the spacing of the magnetic poles 33a and 34a is also substantially the same in the plurality of magnetic pole group pairs Pu, Pv, and Pw. More desirably, the widths and/or heights of magnetic poles 33a and 34a are also substantially the same in the plurality of magnetic pole group pair Pu, Pv, and Pw. In other words, it is desirable that one magnetic pole group pair (e.g., Pu) is rotated about the axis Ax1 and becomes another magnetic pole group pair P (e.g., Pv, Pw).

In the rotary electric machine M7, similarly to the structure of the rotary electric machine M1, the angle between two adjacent magnetic pole group pairs P is substantially "360×(n+m/s)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the example shown in FIG. 19C, s=3, n=4, and m=1. As such, the angle between two adjacent magnetic pole group pairs P is 1,560 degrees in electrical angle. Accordingly, for example, when the magnetic poles of a certain magnetic pole group pair (e.g., Pu) directly face the magnetic field core 22N, the positions of the adjacent magnetic pole group pairs (e.g., Pv, Pw) are shifted by 120 degrees in electrical angle relative to the magnetic field core 22N. In this description, as described above, the angle (distance) between the two magnetic pole group pairs P is the angle (distance) between the centers of magnetic pole groups G1 in the rotation direction and the angle (distance) between the centers of magnetic pole groups G2 in the rotation direction. Here, "the angle (distance) between the centers of magnetic pole groups G1 in the rotation direction" is, for example, a distance between the center of magnetic pole group G1u in the rotation direction and the center of magnetic pole group G1v in the rotation direction. Further, "the angle (distance) between the centers of magnetic pole groups G2 in the rotation direction" is, for example, a distance between the center of magnetic pole group G2u in the rotation direction and the center of magnetic pole group G2v in the rotation direction. The relative position of the magnetic pole group pair P and the magnetic field portion Fs may be applied to a linear electric machine or an axial gap type rotary electric machine.

In the rotary electric machine M7, similarly to the structure of the rotary electric machine M1, a degree of "(360/p)×(n+m/s)" is ensured in mechanical angle between two adjacent magnetic pole group pairs P. The angle between two adjacent magnetic pole group pairs P can also be expressed as "360/s/c" degrees in mechanical angle. Here, "p" is (number of poles of magnetic field portion)/2, and "c" is the number of coils for each phase.

Accordingly, "(360/p)×(n+m/s)" is substantially equal to "360/s/c". In the rotary electric machine M7, "the number of poles of magnetic field portion" is, for example, 78 (p=39). In the rotary electric machine M7, three coils C L are provided for one phase (see FIG. 19B). Accordingly, s=3 and c=3. As such, the angle between two adjacent magnetic pole group pairs P is about 40 degrees in mechanical angle. In other words, the number of poles (p×2) of magnetic field portion Fs, the number of coils (s×c) of armature portion, and the number of magnetic poles 33a and 34a are set such that "(360/p)×(n+m/s)" is substantially equal to "360/s/c".

In the armature portion Am7, two magnetic pole groups G1 adjacent in the rotation direction are also magnetically coupled to each other through the yoke portion 33c. Further, two magnetic pole groups G2 adjacent in the rotation direction are also magnetically coupled to each other through the yoke portion 34c. A space is provided between the first armature core H1 and the second armature core H2, which are magnetically separated. As such, similarly to the rotary electric machine M1, a magnetic circuit, which includes two magnetic pole groups G1 provided in the first armature core H1, the magnetic field cores 22S and 22N and the magnets Mg of the magnetic field portion Fs, and two magnetic pole groups G2 provided in the second armature core H2, is formed.

[Example of a Plurality of Armature Cores Having the Same Structure]

Figure 20A:
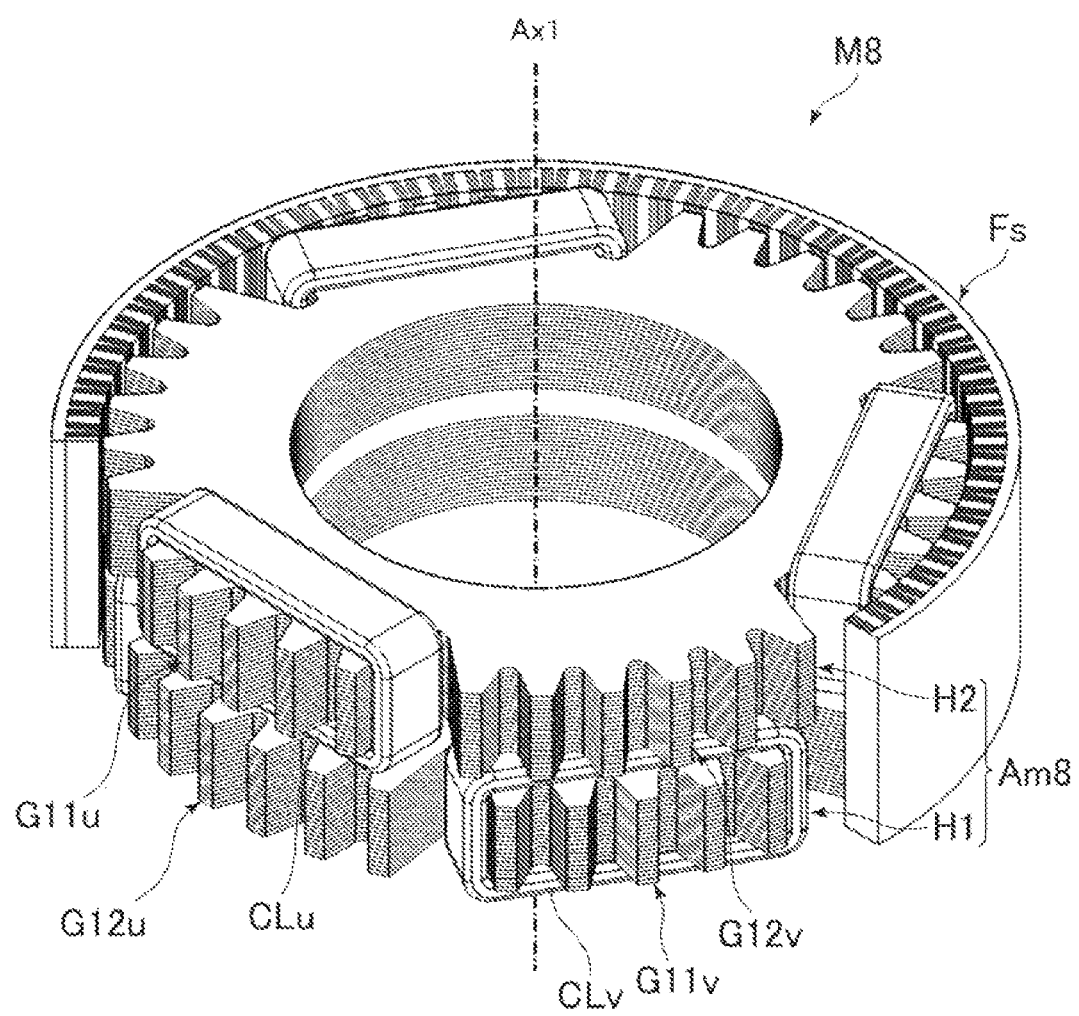
FIG. 20A is a perspective view of an example of a rotary electric machine in which a plurality of armature cores have the same structure.
Figure 20B:
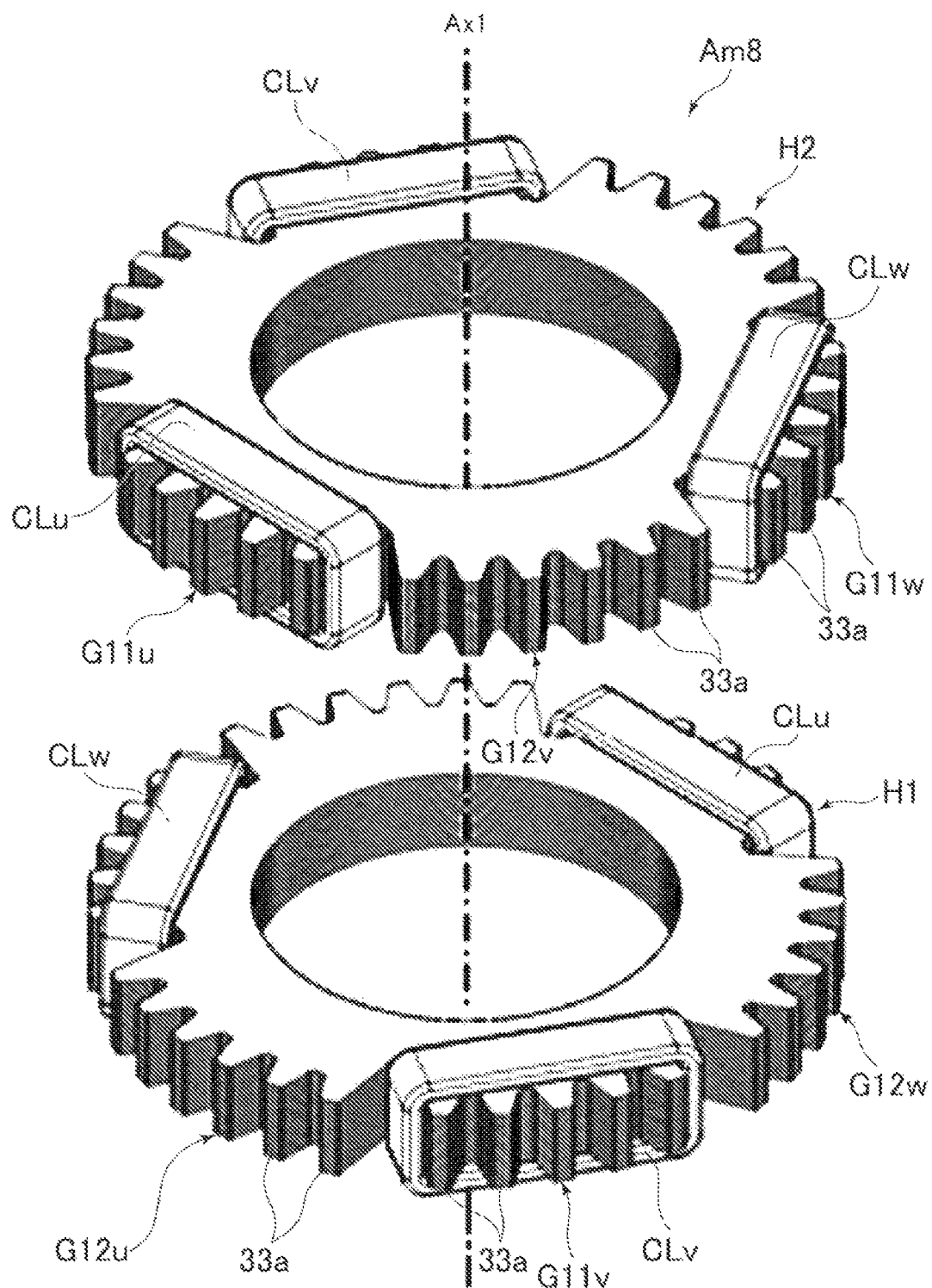
FIG. 20B is an exploded perspective view of the armature portion of the rotary electric machine shown in FIG. 20A.

In the armature portion, a plurality of armature cores having the same structure may be arranged in the axis direction. This provides advantages such as reduced number of parts and reduction of cost for molding. FIGS. 20A to 20C illustrate a rotary electric machine M8 having such a structure as another example of the rotary electric machine proposed in the present disclosure. FIG. 20A is a perspective view of the rotary electric machine M8, and a part of the rotation direction of the magnetic field portion Fs is not shown. FIG. 20B is an exploded perspective view of the armature portion Am8 of the rotary electric machine M8. FIG. 20C is a part of a development view of the armature portion Am8 showing the positions of magnetic poles, and the numerical values therein represent the angles (distances) in electrical angle in the rotation direction.

As shown in FIG. 20B, the armature portion Am8 includes the first armature core H1 and the second armature core H2 arranged in the axis direction. Each of armature cores H1 and H2 is composed of lamination steel. Each of armature cores H1 and H2 has a plurality of magnetic pole groups G11 and G12 arranged in the rotation direction. In FIGS. 20A and 20B, G11u, G11v, G11w, G12u, G12v, and G12w are shown as magnetic pole groups G11 and G12. Each of magnetic pole groups G11 and G12 includes a plurality of magnetic poles 33a arranged in the rotation direction. In each of the armature cores H1 and H2, the coil CL is wound around the magnetic pole group G11, and is not wound around the magnetic pole group G12. In the armature portion Am8, the magnetic pole group G11 around which the coil CL is wound includes five magnetic poles 33a, and the magnetic pole group G12 around which the coil CL is not wound includes six magnetic poles 33a. In each of the armature cores H1 and H2, the magnetic pole group G11 around which the coil CL is wound and the magnetic pole group G12 around which the coil CL is not wound are alternately arranged in the rotation direction.

The two armature cores H1 and H2 have the same structure. The positions of the second armature core H2 and the first armature core H1 in the rotation direction are relatively changed. With this configuration, the magnetic pole group G11 around which the coil CL is wound and the magnetic pole group G12 around which the coil CL is not wound are arranged in the axis direction. As shown in FIG. 20C, the magnetic pole groups G11 around which the coils CL are wound and the magnetic pole groups G12 around which the coils CL are not wound constitute the magnetic pole group pairs Pu, Pv, and Pw. The adjacent magnetic pole group pairs P are separated from each other by 60 degrees in mechanical angle. As such, the second armature core H2 coincides with that obtained by rotating the first armature core H1 by 60 degrees in the rotation direction.

[Example of Projecting Portion Projecting in the Axis Direction]

Figure 21A:
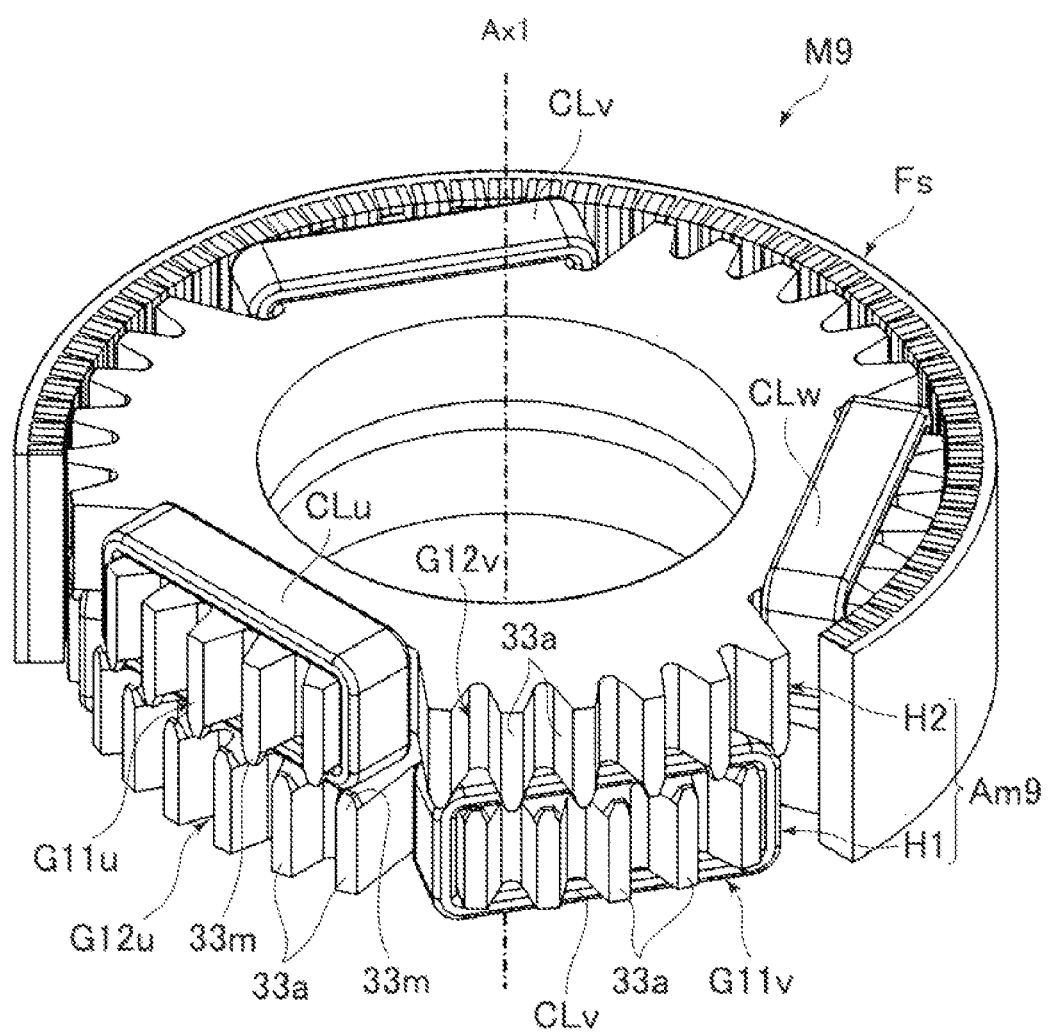
FIG. 21A is a perspective view of an example of the rotary electric machine having projecting portions projecting in the axis direction.
Figure 21B:
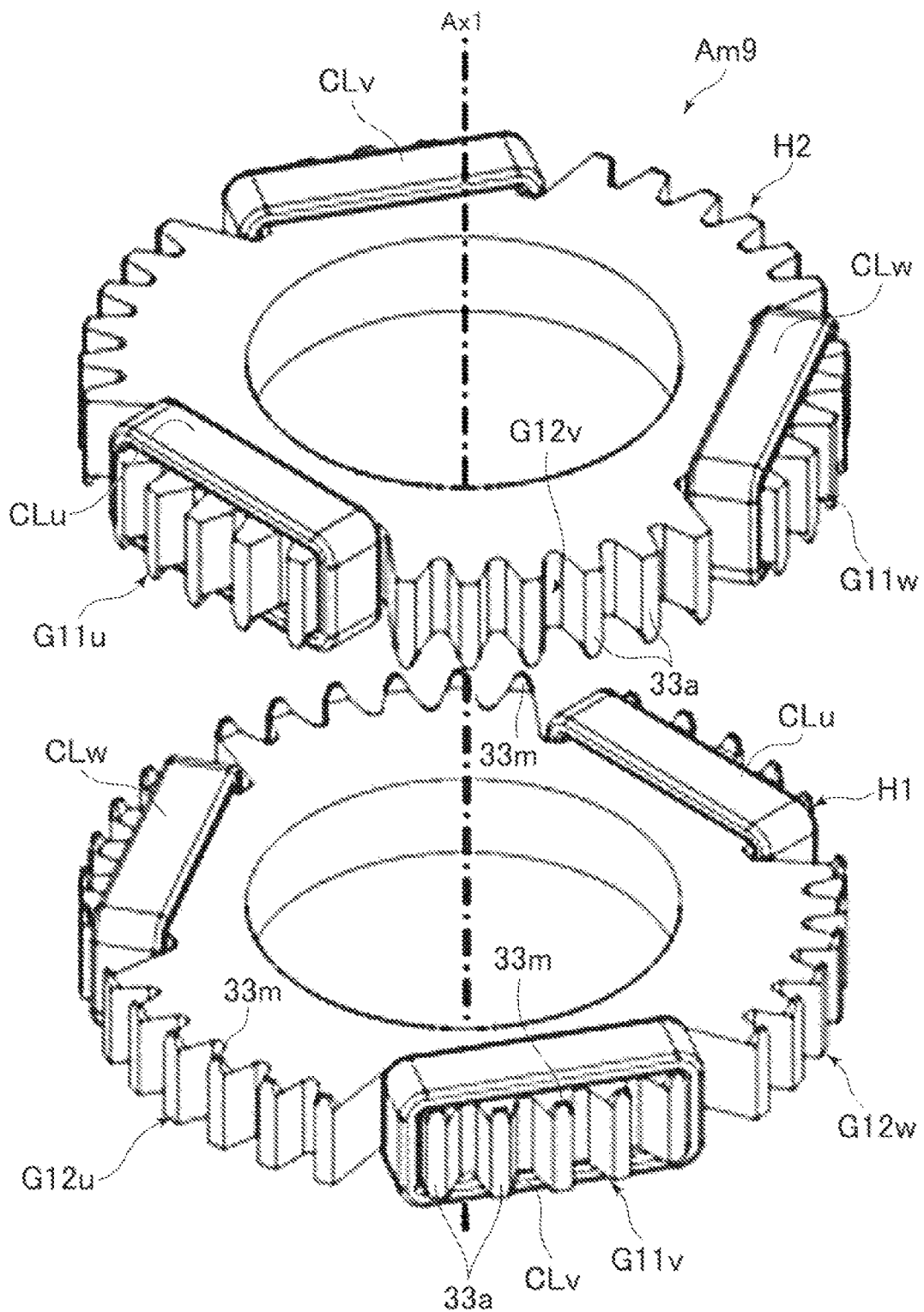
FIG. 21B is an exploded perspective view of the armature portion of the rotary electric machine shown in FIG. 21A.
Figure 21C:
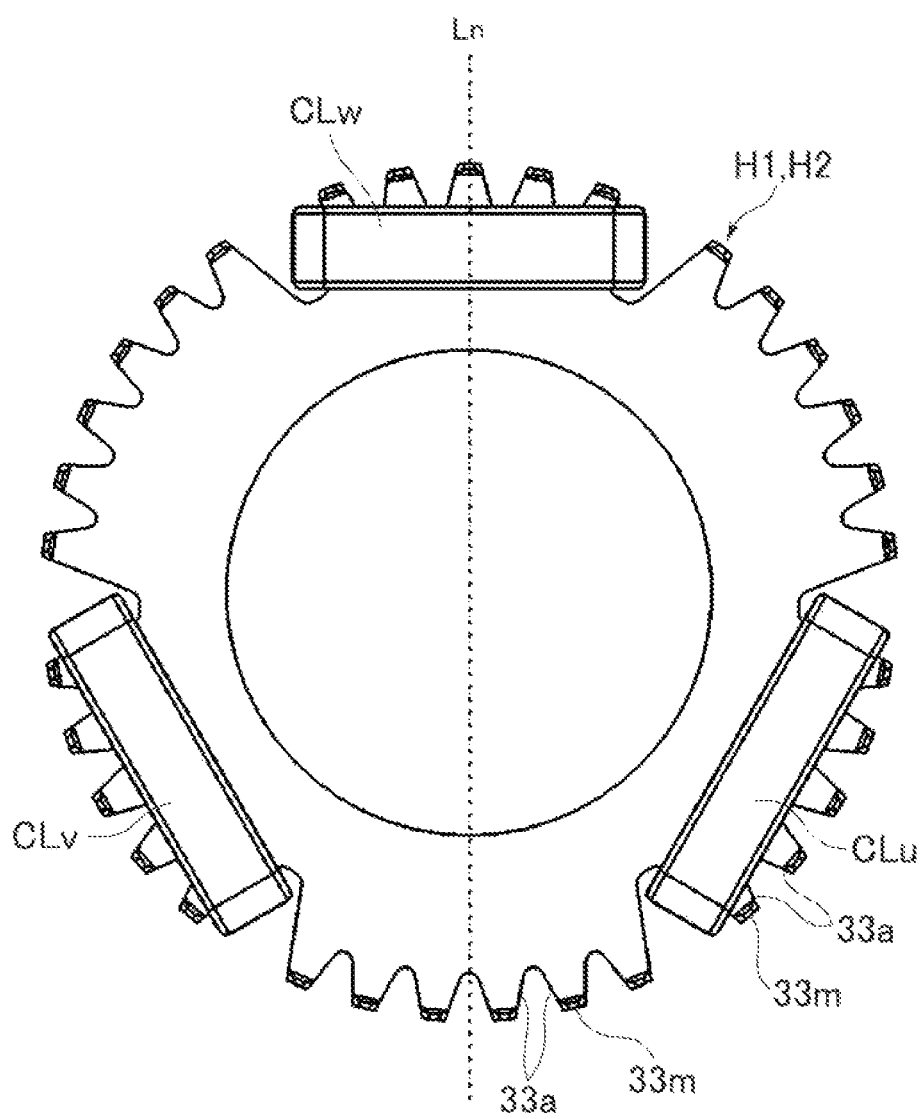
FIG. 21C is a plan view of the armature core of the armature portion of the rotary electric machine shown in FIG. 21A.

A plurality of armature cores having the same structure may have axially projecting portions at the end of magnetic poles. FIGS. 21A to 21C illustrate a rotary electric machine M9 having such a structure as another example of the rotary electric machine proposed in the present disclosure. FIG. 21A is a perspective view of the rotary electric machine M9, and a part of the rotation direction of the magnetic field portion Fs is not shown. FIG. 21B is an exploded perspective view of the armature portion Am9 of the rotary electric machine M9. FIG. 21C shows a plan view of armature cores H1 and H2 of the armature portion Am9.

As shown in FIG. 21A, the armature portion Am9 includes the first armature core H1 and the second armature core H2 arranged in the axis direction. The two armature cores H1 and H2 have the same structure. As shown in FIG. 21B, in the armature portion Am9, each of the magnetic pole groups G11 and G12 has a plurality of magnetic poles 33a. In FIGS. 21A and 21B, G11u, G11v, G11w, G12u, G12v, and G12w are shown as magnetic pole groups G11 G12. The coil CL is wound around the magnetic pole group G11, and is not wound around the magnetic pole group G12.

Each magnetic pole 33a has a main body projecting in the axis direction toward the magnetic field portion Fs and a projecting portion 33m formed at the end of the body and projecting in the axis direction. The projecting portion 33m projects toward the armature cores H1 and H2 on the opposite side. That is, the magnetic pole 33a formed in the first armature core H1 has the projecting portion 33m projecting toward the second armature core H2, and the magnetic pole 33a formed in the second armature core H2 has the projecting portion 33m projecting toward the first armature core H1. The shape of the projecting portion 33m will be described later in detail. The armature cores H1 and H2 having such projecting portions 33m are formed of, for example, a soft magnetic powder material.

As shown in FIG. 21C, each of the armature cores H1 and H2 has a symmetrical configuration. Specifically, each of the armature cores H1 and H2 has a symmetrical structure with respect to a line Ln through the center of the armature cores H1 and H2. With this structure, one of the armature cores H1 and H2 is inverted in the axis direction and the positions of the armature cores H1 and H2 in the rotation direction are relatively changed, and the armature cores H1 and H2 are thereby arranged so that the sides on which the projecting portions 33m are formed are opposed to each other as shown in FIG. 21A. As described, the armature portion Am9 is formed of the armature cores H1 and H2 that include the projecting portions 33m having the same shape.

[Example of a Plurality of Armature Cores Having the Same Structure]

Figure 22A:
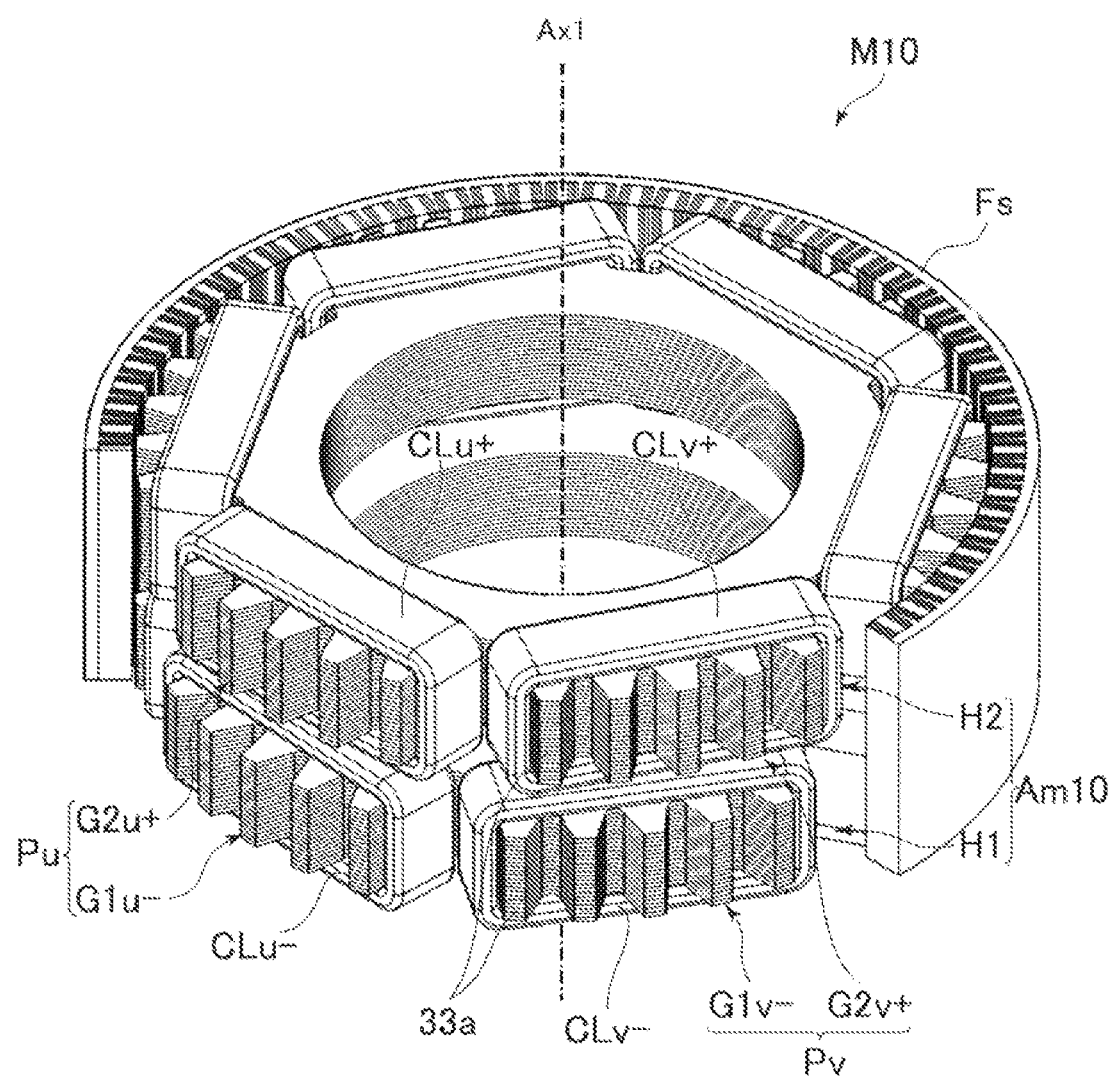
FIG. 22A is a perspective view of an example of a rotary electric machine in which a plurality of armature cores have the same structure.
Figure 22B:
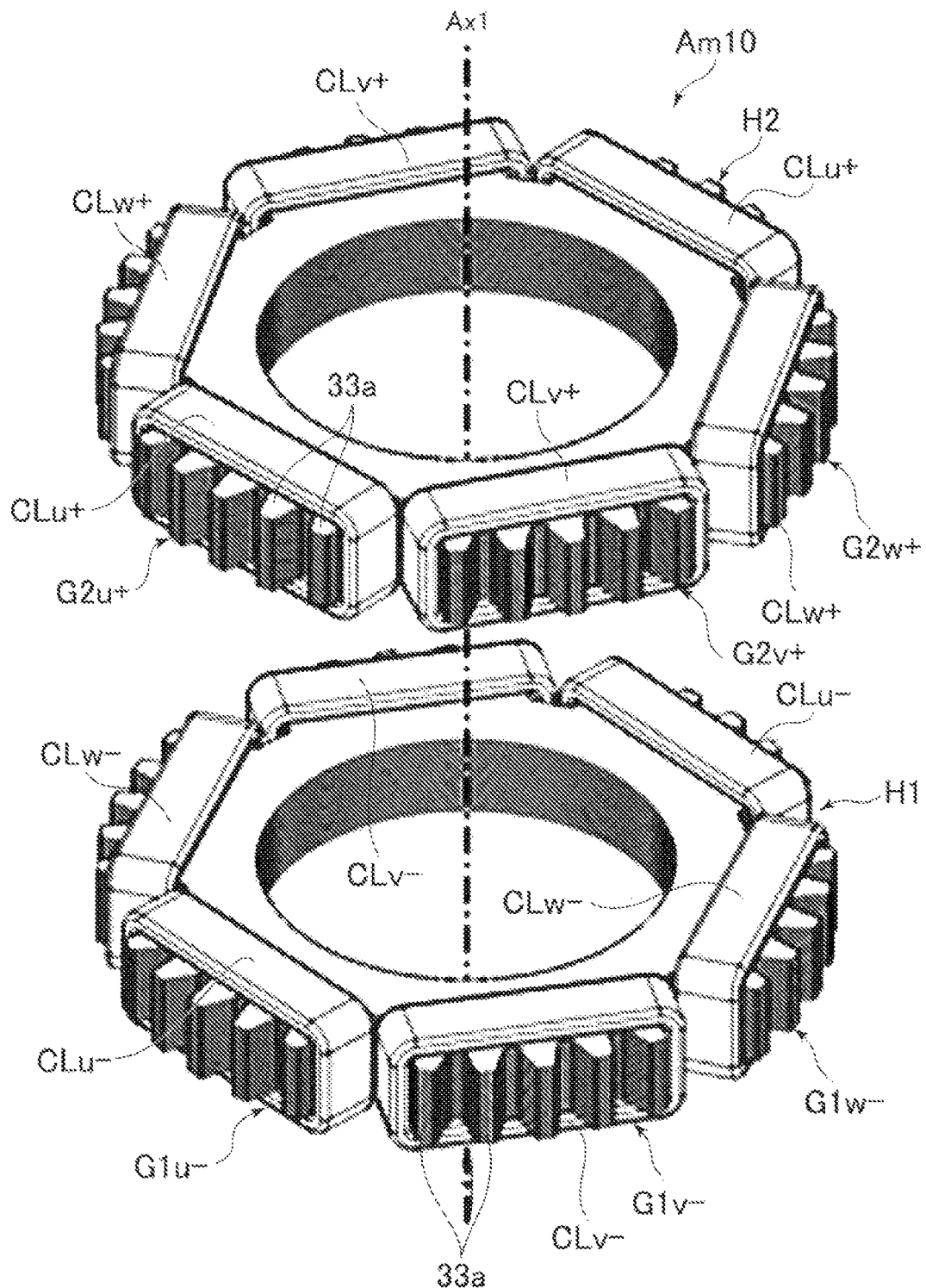
FIG. 22B is an exploded perspective view of the armature portion of the rotary electric machine shown in FIG. 22A.

A plurality of armature cores having the same structure may be arranged in the axis direction with their positions in the rotation direction shifted by 180 degrees in electrical angle. Further, two coils may be respectively provided in the two magnetic pole groups constituting one magnetic pole group pair. FIGS. 22A to 22C illustrate a rotary electric machine M10 having such a structure as another example of the rotary electric machine proposed in the present disclosure. FIG. 22A is a perspective view of the rotary electric machine M10, and a part of the rotation direction of the magnetic field portion Fs is not shown. FIG. 22B is an exploded perspective view of the armature portion Am10 of the rotary electric machine M10. FIG. 22C is a part of a development view of the armature portion Am10 showing the positions of magnetic poles, and the numerical values therein represent the angles (distances) in electrical angle in the rotation direction.

The armature portion Am10 has two armature cores H1 and H2 arranged in the axis direction. As shown in FIG. 22A, the first armature core H1 has a plurality of magnetic pole group G1 arranged in the rotation direction, the second armature core H2 has a plurality of magnetic pole group G2 arranged in the rotation direction. In FIGS. 22A and 22B, G1u–, G1v–, G1w–, G2u+, G2v+, and G2w+ are shown as magnetic pole groups G1 and G2. Each of magnetic pole groups G1 and G2 includes a plurality of magnetic poles 33a arranged in the rotation direction. The magnetic pole groups G1 and G2 have the same structure. The coils CL are provided in the respective magnetic pole groups G1 and G2. In the rotary electric machine M10, the first armature core H1 has six magnetic pole groups G1 and the second armature core H2 has six magnetic pole groups G2. The coils CL are provided in all six magnetic pole groups G1 and G2 of the armature cores H1 and H2.

As shown in FIG. 22C, the magnetic pole group G1 of the first armature core H1 and the magnetic pole group G2 of the second armature core H2 are arranged in the axis direction and constitute one magnetic pole group pair P. The armature cores H1 and H2 have the same structure. The positions of the two armature cores H1 and H2 are shifted in the rotation direction by 180 degrees in electrical angle. That is, the second armature core H2 coincides with that obtained by rotating the first armature core H1 by 180 degrees at an electrical angle. As such, the position of magnetic pole 33a of the second armature core H2 in the rotation direction is between two adjacent magnetic poles 33a in the first armature core H1, and the position of magnetic pole 33a of the first armature core H1 in the rotation direction is between the two adjacent magnetic poles 33a in the second armature core H2.

As shown in FIG. 22C, the coils CL are provided in both of the two magnetic pole groups G1 and G2 constituting the respective magnetic pole group pairs P (Pu, Pv, Pw). The winding directions of the two coils CL constituting each magnetic pole group pair P are opposite to each other. Specifically, the U-phase coil CLu– and the U+ phase coil CLu+ are respectively provided in the magnetic pole groups G1u– and G2u+. Further, the V-phase coil CLv– and the V+ phase coil CLv+ are respectively provided to the magnetic pole groups G1v– and G2v+, and the W-phase coil CLw– and the W+ phase coil CLw+ are respectively provided to the magnetic pole groups G1w– and G2w+. According to this arrangement of the coils CL, the armature portion Am10 can be formed of the armature cores H1 and H2 having the same configuration.

[Example of Two In-Phase Coils of Different Winding Directions]

Figure 23A:
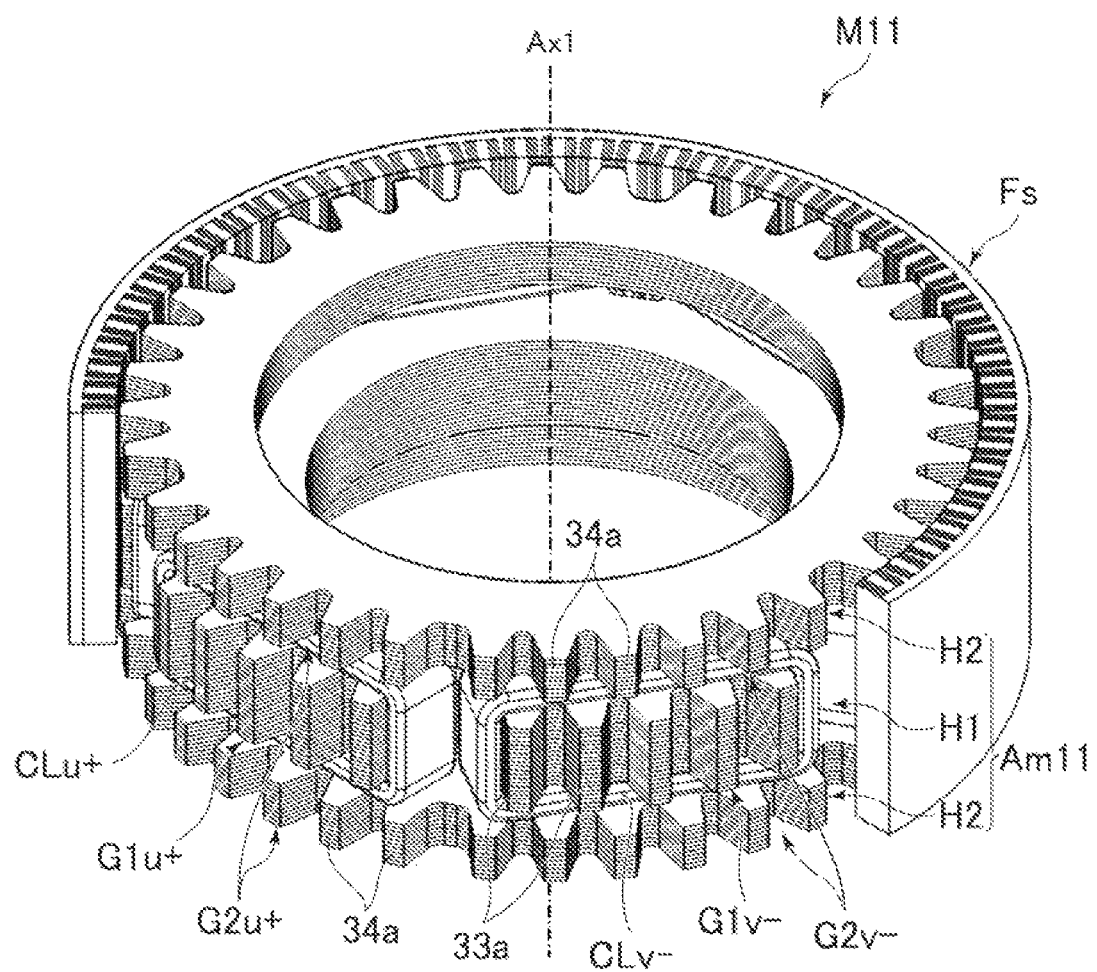
FIG. 23A is a perspective view of an example of a rotary electric machine including two coils of the same phase having different winding directions.
Figure 23B:
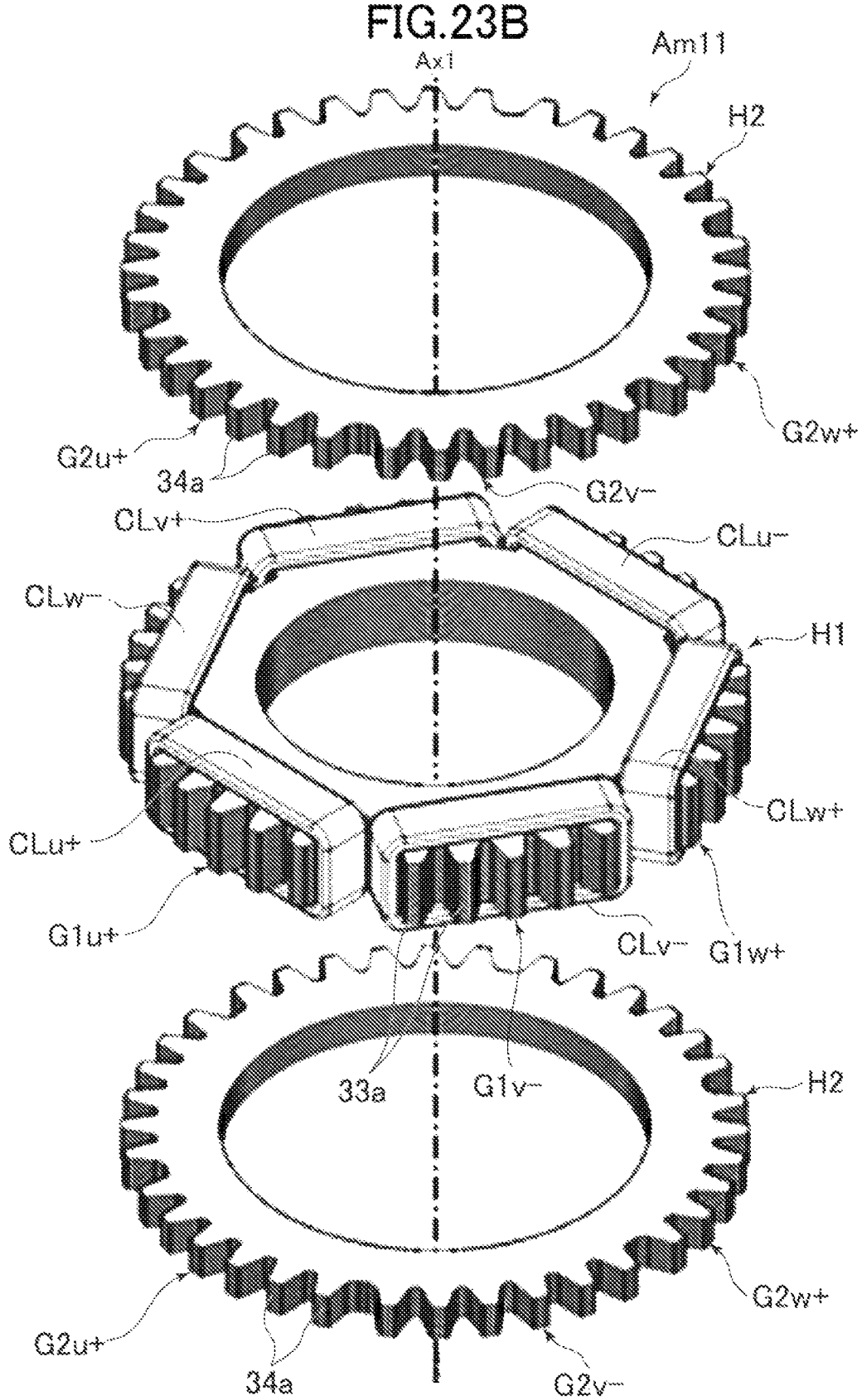
FIG. 23B is an exploded perspective view of the armature portion of the rotary electric machine shown in FIG. 23A.

The rotary electric machine may have, for each phase (e.g. U phase, V phase, W phase), two coils that are disposed at the different positions in the rotation direction and opposite in the winding directions. FIGS. 23A to 23C illustrate a rotary electric machine M11 having such a structure as another example of the rotary electric machine proposed in the present disclosure. FIG. 23A is a perspective view of the rotary electric machine M11, and a part of the magnetic field portion Fs in the rotation direction is not shown. FIG. 23B is an exploded perspective view of the armature portion Am11 of the rotary electric machine M11. FIG. 23C is a development view of the armature portion Am11 in which positions of magnetic poles are shown, and the numerical values therein represent the angles (distance) in electrical angles in the rotation direction.

As shown in FIG. 23B, a plurality of coils CL are provided in the first armature core H1. The plurality of coils CL include two coils CL having opposite winding directions for each phase. The rotary electric machine M11 is supplied with a three-phase alternating current. As such, the plurality of coils CL include, as shown in FIG. 23C, a U+ phase coil CLu+, a U– phase coil CLu–, a V+ phase coil CLv+, a V– phase coil CLv–, a W+ phase coil CLw+, and a W– phase coil CLw–. These six coils CL are respectively provided on the magnetic pole groups G1 of the first armature core H1, and are arranged in the rotation direction. In FIGS. 23A to 23C, G1u+, G1v+, G1w+, G1u–, G1v–, and G1w– are shown as the magnetic pole groups G1.

As shown in FIG. 23C, six magnetic pole group pairs P to which the six coils CL are provided are referred to as a magnetic pole group pair Pu+, a magnetic pole group pair Pv+, a magnetic pole group pair Pw+, a magnetic pole group pair Pu–, a magnetic pole group pair Pv–, and a magnetic pole group pair Pw–. It is desirable that these six magnetic pole group pairs P have the same structure. That is, it is desirable that the number of magnetic poles 33a and 34a is the same in the magnetic pole group pairs Pu+, Pv+, Pw+, Pu–, Pv–, and Pw–. The spacing of magnetic poles 33a and 34a is also preferably substantially the same in the magnetic pole group pairs Pu+, Pv+, Pw+, Pu–, Pv–, and Pw–. More preferably, the widths and/or heights of magnetic pole 33a and 34a are also substantially the same in the magnetic pole group pairs Pu+, Pv+, Pw+, Pu–, Pv–, and Pw–. In other words, it is desirable that one magnetic pole group pair (e.g., Pu+) is rotated about the axis Ax1 and becomes another magnetic pole group pair P (e.g., Pv+, Pw+, Pu−, Pv−, Pw−).

Attention is now directed to two magnetic pole group pairs P in which the coils CL having the same phase and opposite winding directions are provided. For example, the magnetic pole group pair Pu+ and the magnetic pole group pair Pu− are substantially "360×(q+½)" degrees apart in electrical angle (q is an integer greater than or equal to 1). That is, there is a 180 degree difference in electrical angle between the angle (distance) between the magnetic pole 33a (or 34a) of the magnetic pole group pair Pu+ and the magnetic field core 22N (or 22S) and the angle (distance) between the magnetic pole 33a (or 34a) of the magnetic pole group pair Pu− and the magnetic field core 22N (or 22S). As such, for example, when the magnetic pole 33a (or 34a) of the magnetic pole group pair Pu+ directly faces the magnetic field core 22N (or 22S), the magnetic pole 33a (or 34a) of the magnetic pole group pair Pu− is located at a position that is shifted by 180 degrees in electrical angle with respect to the magnetic field core 22N (or 22S). In the rotary electric machine M11, q=18. As such, the angle between the magnetic pole group pair Pu+ and the magnetic pole group pair Pu− is 6,660 degrees in electrical angle. In this description, the angle between the magnetic pole group pair Pu+ and the magnetic pole group pair Pu− is specifically the angle (distance) between the center of magnetic pole group G1u+ and the center of magnetic pole group G1u− in the rotation direction, or the angle (distance) between the center of magnetic pole group G2u+ and the center of magnetic pole group G2u− in the rotation direction. The same applies to other magnetic pole group pairs Pv+, Pv−, Pw+, and Pw−, Further, attention is directed to the two magnetic pole group pairs P provided with the coils CL having the same winding directions. For example, attention is paid to the magnetic pole group pair Pu+ and the magnetic pole group pair Pw+. There is a difference of 120 degrees in electrical angle between the angle (distance) between the magnetic pole 33a (or 34a) of the magnetic pole group pair Pu+ and the magnetic field core 22N (or 22S) and the angle (distance) between the magnetic pole 33a (or 34a) of the magnetic pole group pair Pw+ and the magnetic field core 22N (or 22S). That is, as shown in FIG. 23C, the magnetic pole group pair Pu+ and the magnetic pole group pair Pw+ are located away from each other substantially by 360×(n+m/s) degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the rotary electric machine M11, s=3 and n=12. When m=1, the magnetic pole group pair Pu+ and the magnetic pole group pair Pw+ are located away from each other by 4,440 degrees in electrical angle. The same applies to the angle between the other two magnetic pole group pairs P provided with the coils CL having the same winding directions (e.g., the angle between the magnetic pole group pair Pv+ and the magnetic pole group pair Pw+ or the angle between the magnetic pole group pair Pv+ and the magnetic pole group pair Pu+). The relative position of the magnetic pole group pair P and the magnetic field portion Fs may be applied to a linear electric machine or an axial gap type rotary electric machine.

Further, "(360/p)×(n+m/s)" degrees in mechanical angle are ensured between two magnetic pole group pairs P provided with the coils CL having the same winding direction. The angle between the two magnetic pole group pairs P can also be represented as "360/s/c" degrees in mechanical angle. Here, p is (the number of poles of magnetic field portion)/2, and c is the number of coil pairs for each phase. Accordingly, "(360/p)×(n+m/s)" is substantially equal to "360/s/c". In the rotary electric machine M11, the number of poles of magnetic field portion Fs is, for example, 74 (p=37). Further, s=3 and c=1. As such, the angle between two adjacent magnetic pole group pairs P provided with the coils CL having the same winding direction is 120 degrees in mechanical angle. In other words, the number of poles (p×2) of magnetic field portion Fs, the number of coil pairs (s×c), the number of magnetic poles 33a and 34a are determined so that "(360/p)×(n+m/s)" is substantially equal to "360/s/c."

In the example shown in FIG. 23C, a coil is obtained by a concentrated winding in which one coil (e.g., CLu−) is wound around one magnetic pole group (e.g., magnetic pole group G1u−). However, coils may be obtained by lap winding or wave winding, for example.

Figure 23D:
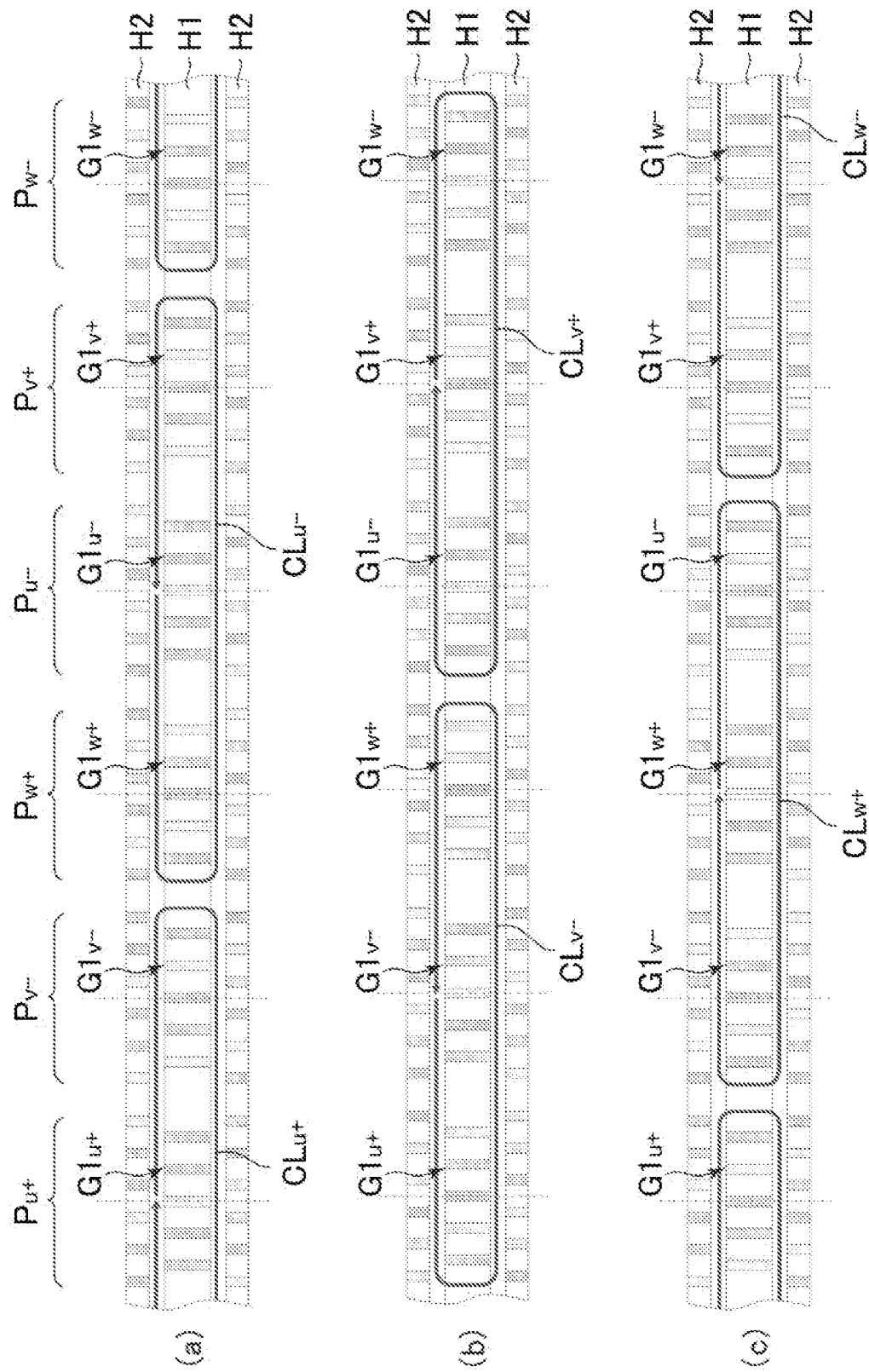
FIG. 23D is a diagram showing a modification of the method for winding coils, indicating an example of lap winding.

FIG. 23D is a diagram showing an example of lap winding. In FIG. 23D, (a), (b), and (c) show the armature cores H1 and H2 shown in FIG. 23C. In FIG. 23D, (a) shows a U+ phase coil CLu+ and a U-phase coil CLu−, and a V phase coil and a W phase coil are omitted. In FIG. 23D, (b) shows a V+ phase coil CLv+ and a V-phase coil CLv−, and a U phase coil and a W phase coil are omitted. In FIG. 23D, (c) shows a W+ phase coil CLw+ and a W-phase coil CLw−, and a U phase coil and a V phase coil are omitted. That is, CLu+, CLu−, CLv+, CLv−, CLw+, and CLw− are wound around the same armature core H1. In (a) of FIG. 23D, the U+ phase coil CLu+ is wound around three adjacent magnetic pole groups G1w−, G1u+, and G1v−, and the U-phase coil CLu− is wound around three adjacent magnetic pole groups G1w+, G1u−, and G1v+. In (b) and (c) of FIG. 23D, the coils CLv+, CLv−, CLw+, and CLw− of other phases are also wound around three adjacent magnetic pole groups.

FIG. 23E shows an example of wave winding. In FIG. 23E, similarly to FIG. 23D, (a), (b), and (c) show the armature cores H1 and H2 shown in FIG. 23C. In FIG. 23E, (a) shows a U+ phase coil CLu+ and a U-phase coil CLu−, and a V phase coil and a W phase coil are omitted. In FIG. 23E, (b) shows a V+ phase coil CLv+ and a V-phase coil CLv−, and a U phase coil and a W phase coil are omitted. In FIG. 23E, (c) shows a W+ phase coil CLw+ and a W-phase coil CLw−, and a U phase coil and a V phase coil are omitted. In (a) of FIG. 23E, the three adjacent magnetic pole groups G1w+, G1u−, and G1v+ are disposed between the U+ phase coil CLu+(wire of U+ phase) and the U-phase coil CLu− (wire of U− phase). In (b) of FIG. 23E, the three adjacent magnetic pole groups G1u−, G1v+, and G1w− are disposed between the V+ phase coil CLv+(wire of V+ phase) and the V-phase coil CLv− (wire of V-phase). In (c) of FIG. 23E, the three adjacent magnetic pole groups G1v+, G1w−, and G1u+ are disposed between the W+ phase coil CLw+ (wire of W+ phase) and the W-phase coil CLw− (wire of W-phase).

The winding methods of the coils CL shown in FIGS. 23D and 23E may be applied to other armature cores. The lap winding shown in FIG. 23D and the wave winding shown in FIG. 23E may be applied to an armature core in which the magnetic pole group G1u+ and the magnetic pole group G1v+ are provided on the left and right sides of the magnetic pole group G1w− (in other words, an armature core in which the magnetic pole group G1u− and the magnetic pole group G1v− are disposed on the left and right sides of magnetic pole group G1w+).

[Example of Two Coils of Same Phase Having Different Winding Directions]

Figure 24A:
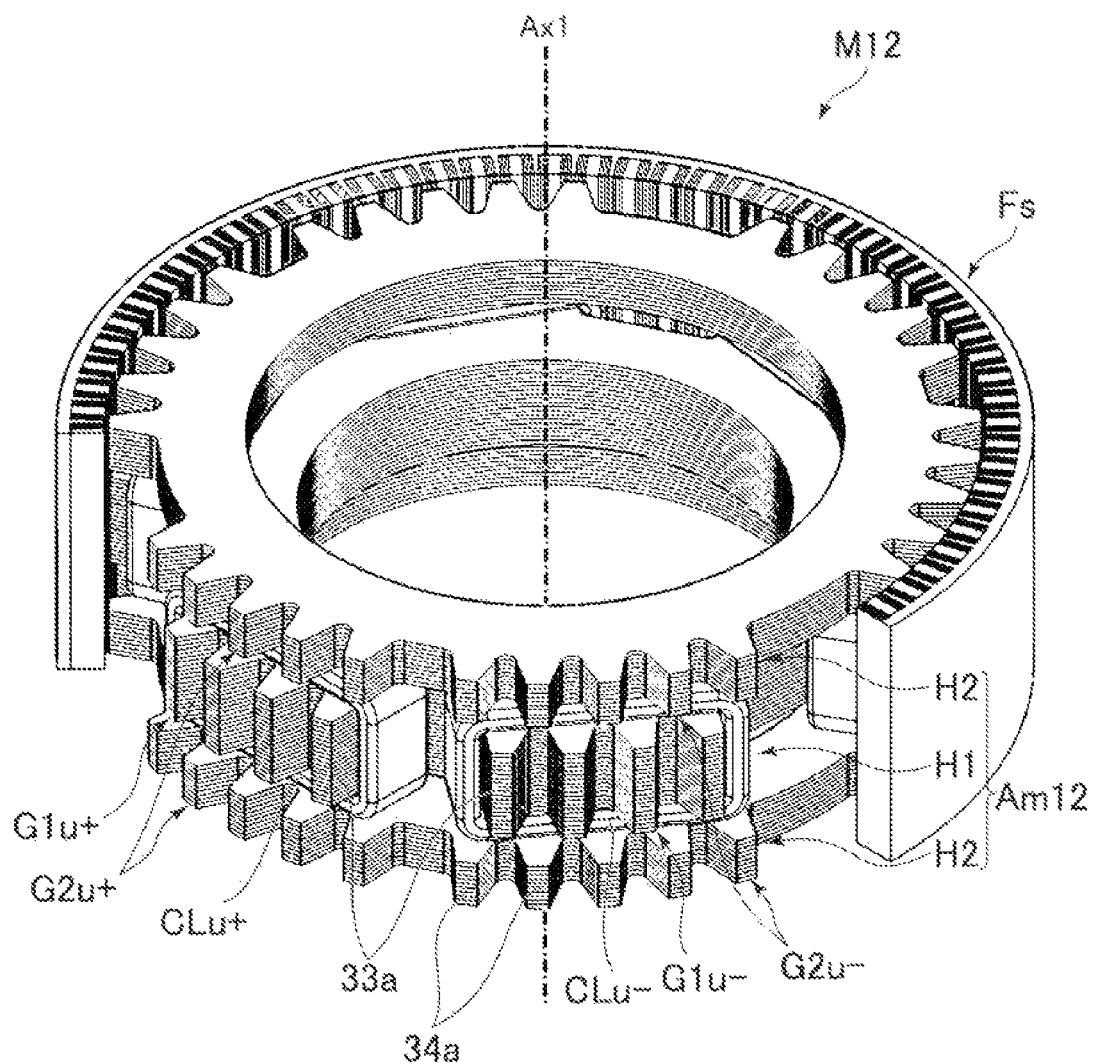
FIG. 24A is a diagram showing another example of a rotary electric machine including two coils of the same phase having different winding directions.
Figure 24B:
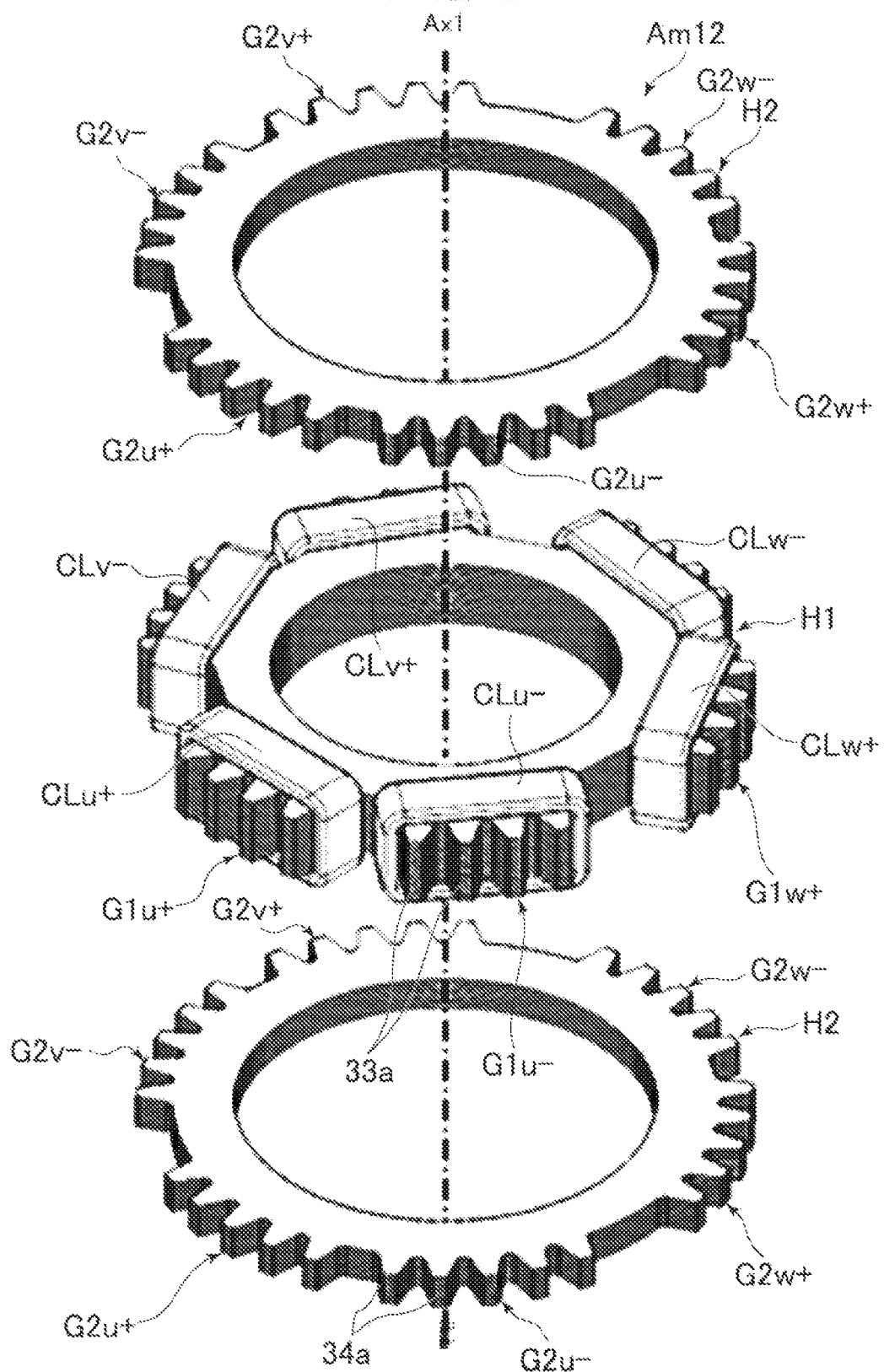
FIG. 24B is an exploded perspective view of the armature portion of the rotary electric machine shown in FIG. 24A.
Figure 24C:
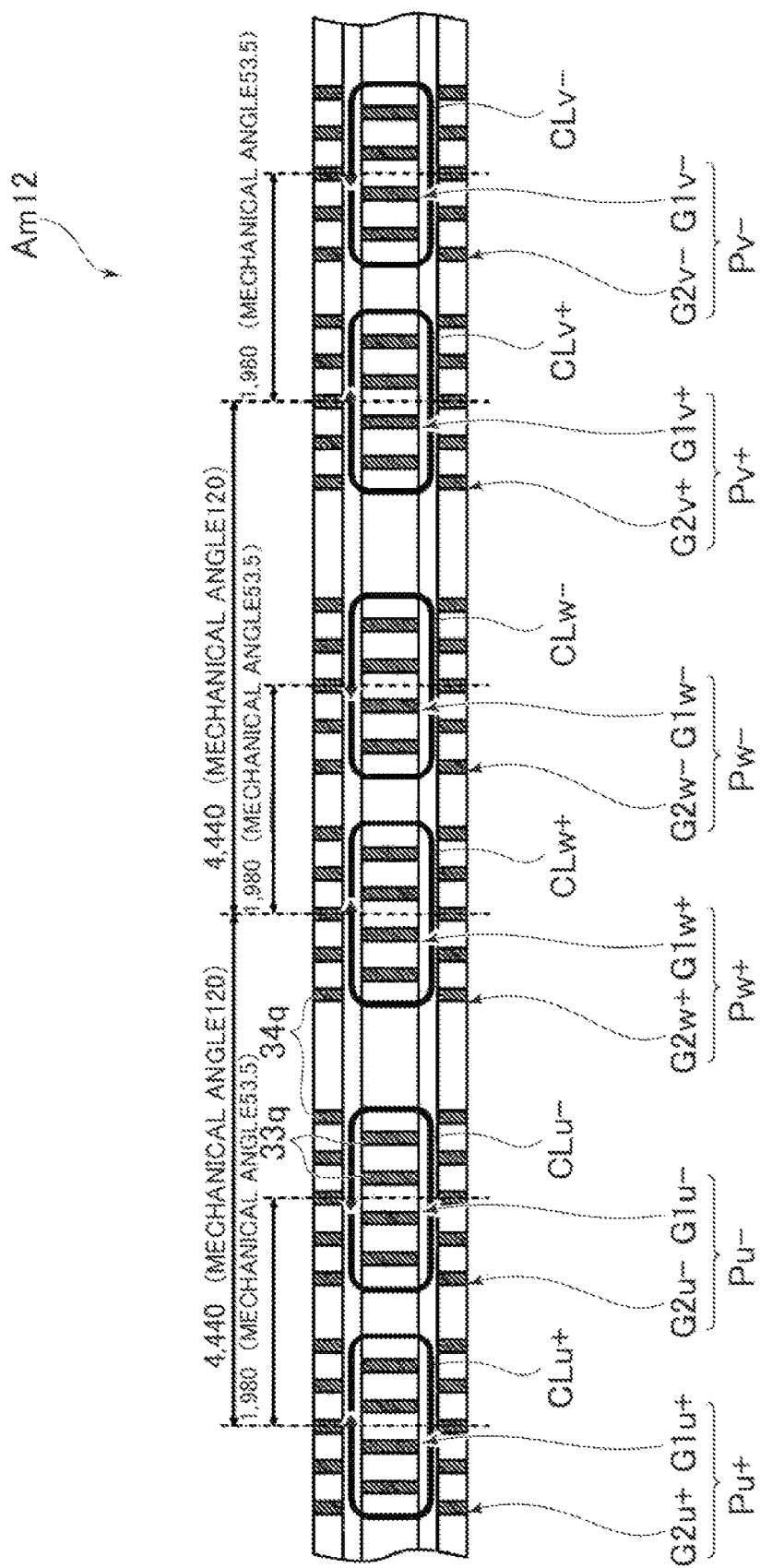
FIG. 24C is a part of a development view of the armature portion of the rotary electric machine shown in FIG. 24A for showing positions of magnetic poles of the armature portion.

Two magnetic pole group pairs P, which are respectively provided with two coils CL (e.g., U+ phase coil and U-phase coil) generating magnetic fields of opposite poles because of the different winding directions and having the same phase, may be adjacent in the rotation direction. FIGS. 24A to 24C show a rotary electric machine M12 having such a structure as another example of the rotary electric machine proposed in the present disclosure. FIG. 24A is a perspective view of the rotary electric machine M12, and a part of the magnetic field portion Fs in the rotation direction is not shown. FIG. 24B is an exploded perspective view of the armature portion Am12 of the rotary electric machine M12. FIG. 24C is a development view of the armature portion Am12 in which positions of magnetic poles are shown, and the numerical values therein represent the angles (distance) in electrical angles in the rotation direction.

A plurality of coils CL are provided in the first armature core H1. The plurality of coils CL include, as shown in FIG. 24C, a U+ phase coil CLu+, a V+ phase coil CLv+, a W+ phase coil CLw+, a U- phase coil CLu-, a V-phase coil CLv-, and a W- phase coil CLw-. These six coils CL are respectively provided on the magnetic pole groups G1 of the first armature core H1, and are arranged in the rotation direction The six magnetic pole group pairs P to which the six coils CL are provided are referred to as a magnetic pole group pair Pu+, a magnetic pole group pair Pv+, magnetic pole group pair Pw+, a magnetic pole group pair Pu-, a magnetic pole group pair Pv-, and a magnetic pole group pair Pw-, As shown in FIG. 24C, the magnetic pole group pair Pu+ and the magnetic pole group pair Pu- are adjacent to each other in the rotation direction. Similarly, the magnetic pole group pair Pv+ and the magnetic pole group pair Pv- are adjacent to each other in the rotation direction. The magnetic pole group pair Pw+ and the magnetic pole group pair Pw- are adjacent to each other in the rotation direction. It is desirable that these six magnetic pole group pairs P have the same structure. There is a 180 degree difference in electrical angle between the angle (distance) between the magnetic pole $33a$ (or $34a$) of the magnetic pole group pair Pu+ and the magnetic field core 22N (or 22S) and the angle (distance) between the magnetic pole $33a$ (or $34a$) of the magnetic pole group pair Pu- and the magnetic field core 22N (or 22S). That is, as shown in FIG. 24C, the magnetic pole group pair Pu+ and the magnetic pole group pair Pu- are located away from each other substantially by $360\times(q+\frac{1}{2})$ degrees in electrical angle (q is an integer equal to or greater than 1).

In the rotary electric machine M12, q=5. As such, the magnetic pole group pair Pu+ and the magnetic pole group pair Pu- are located away from each other by 1,980 degrees in electrical angle. As such, when the magnetic pole $33a$ (or $34a$) of the magnetic pole group pair Pu+ directly faces the magnetic field core 22N (or 22S), the magnetic pole $33a$ (or $34a$) of the magnetic pole group pair Pu- is located at a position that is shifted by 180 degrees in electrical angle with respect to the magnetic field core 22N (or 22S). The same applies to other magnetic pole group pairs Pv+, Pv-, Pw+, and Pw-, With this arrangement of magnetic pole group pairs P, for example, when the first armature core H1 is formed of a plurality of partial cores (partial armature core in the claims) arranged in the rotation direction, two magnetic pole group pairs P each having two coils CL that are different in winding directions can be formed in the same partial core. This can reduce the influence on the performance of rotary electric machine even if a difference in magnetoresistance occurs between the partial cores. For example, it is possible to form magnetic pole groups G1u+ and G1u- in one partial core, form magnetic pole groups G1w+ and G1w- in another partial core, and magnetic pole groups G1v+ and G1v- in yet another partial core. With this configuration, even if there is a difference in magnetoresistance between the partial core having the magnetic pole groups G1u+ and G1u- and the partial core having the magnetic pole groups G1w+ and G1w-, the influence on the performance of the rotary electric machine is small. In the rotary electric machine M12, the number of poles of magnetic field portion Fs is 74 (p=37). As such, the angle between the magnetic pole group pair Pu+ and the magnetic pole group pair Pu- is 53.5 degrees (=1,980/37) in mechanical angle.

Further, attention is directed to the two magnetic pole group pairs P in which the coils CL having the same winding directions are provided. For example, attention is paid to the magnetic pole group pair Pu+ and the magnetic pole group pair Pw+. At this time, there is a difference of 120 degrees in electrical angle between the angle (distance) between the magnetic pole $33q$ (or $34q$) of the magnetic pole group pair Pu+ and the magnetic field core 22N (or 22S) and the angle (distance) between the magnetic pole $33q$ (or $34q$) of the magnetic pole group pair Pw+ and the magnetic field core 22N (or 22S). That is, as shown in FIG. 24C, the magnetic pole group pair Pu+ and the magnetic pole group pair Pw+ are located away from each other substantially by $360\times(n+m/s)$ degrees in electrical angle, where "s" is the number of phases, "m" is an integer equal to or greater than 1 and equal to or less than s-1, where the integer is other than a divisor of s (except 1) and other than multiples of the divisor (except 1), and "n" is an integer equal to or greater than 1.

In the example of the rotary electric machine M12, s=3 and n=12. When m=1, the magnetic pole group pair Pu+ and the magnetic pole group pair Pw+ are located away from each other by 4,440 degrees in electrical angle. The same applies to the angle between the other two magnetic pole group pairs P provided with the coils CL having the same winding directions (e.g., the angle between the magnetic pole group pair Pv+ and the magnetic pole group pair Pw+ or the angle between the magnetic pole group pair Pv+ and the magnetic pole group pair Pu+). The relative position of the magnetic pole group pair P and the magnetic field portion Fs may be applied to a linear electric machine or an axial gap type rotary electric machine.

Further, "$(360/p)\times(n+m/s)$" degrees in mechanical angle are ensured between two magnetic pole group pairs P provided with the coils CL having the same winding direction. The angle between the two magnetic pole group pairs P can also be represented as "$360/s/c$" degrees in mechanical angle. Here, "p" is (the number of poles of magnetic field portion)/2, and "c" is the number of coil pairs for each phase.

Accordingly, "$(360/p)\times(n+m/s)$" is substantially equal to "$360/s/c$". In the rotary electric machine M12, the number of poles of magnetic field portion Fs is, for example, 74 (p=37). Further, s=3 and c=1. As such, the angle between two adjacent magnetic pole group pairs P provided with the coils CL having the same winding direction is 120 degrees in mechanical angle. In other words, the number of poles ($p\times2$) of magnetic field portion Fs, the number of coil pairs ($s\times c$), the number of magnetic poles $33a$ and $34a$ are determined so that "$(360/p)\times(n+m/s)$" is substantially equal to "$360/s/c$."

[Example when Number of Phases is Even Number]

Figure 25A:
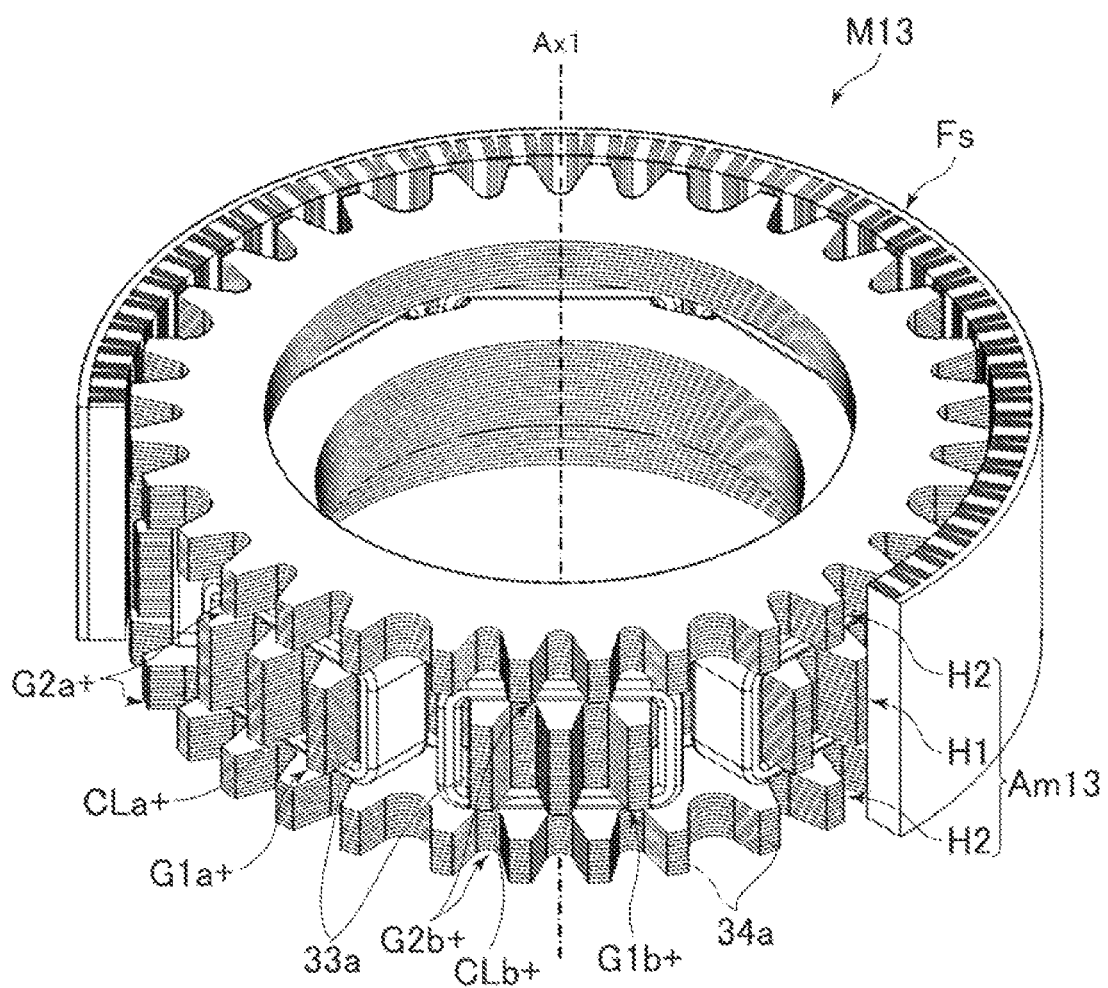
FIG. 25A is a perspective view of an example of a rotary electric machine where the number of phases is even number.
Figure 25B:
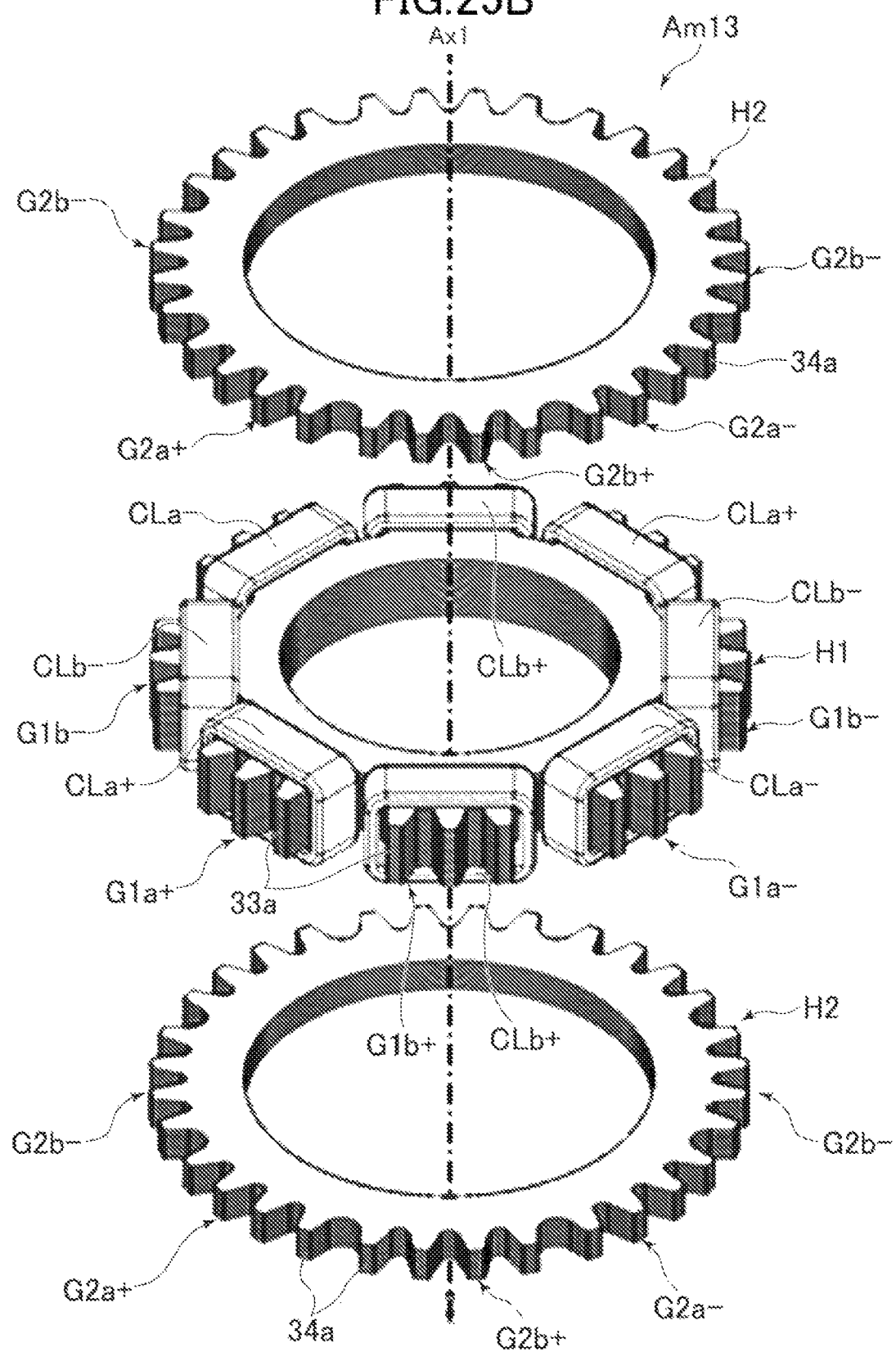
FIG. 25B is an exploded perspective view of the armature portion of the rotary electric machine shown in FIG. 25A.

The number of phases of the alternating current supplied to the rotary electric machine may be an even number. For example, the number of phases of the alternating current may be two. FIGS. 25A to 25C show a rotary electric machine M13 having such a structure as another example of the rotary electric machine proposed in the present disclosure. FIG. 25A is a perspective view of the rotary electric machine M13, and a part of the magnetic field portion Fs in the rotation direction is not shown. FIG. 25B is an exploded perspective view of the armature portion Am13 of the rotary electric machine M13. FIG. 25C is a development view of the armature portion Am13 in which positions of magnetic poles are shown, and the numerical values therein represent the angles (distance) in electrical angles in the rotation direction.

A plurality of coils CL are provided in the first armature core H1. As shown in FIG. 25B, the plurality of coils CL include an A+ phase coil CLa+, a B+ phase coil CLb+, an A− phase coil CLa−, and a B− phase coil CLb−. The A− phase coil CLa− and the B− phase coil CLb− have the winding direction opposite to that of the A+ phase coil CLa+ and the B+ phase coil CLb+. The first armature core H1 has four coils CL for each phase. The first armature core H1 has a plurality of magnetic pole groups G1 arranged in the rotation direction. The coils CL are wound around the magnetic pole groups G1 (in FIG. 25A to 25C, G1a+, Gla−, G1b+, and G1b− are shown as the magnetic pole groups G1). The magnetic pole groups G1 constitutes magnetic pole group pairs P with magnetic pole groups G2 of the second armature core H2 arranged in the axis direction. The four magnetic pole group pairs P respectively provided with coils CLa+, CLb+, CLa−, and CLb− are referred to as the magnetic pole group pair Pa+, the magnetic pole group pair Pb+, the magnetic pole group pair Pa−, and the magnetic pole group pair Pb−. Preferably, these four magnetic pole group pairs P have the same structure. That is, it is desirable that the number of magnetic poles 33a and 34a is the same in the magnetic pole group pairs Pa+, Pb+, Pa−, and Pb−. Preferably, the spacing of magnetic poles 33a and 34a is also substantially the same in the magnetic pole group pairs Pa+, Pb+, Pa−, and Pb−. More desirably, the widths and/or heights of magnetic poles 33a and 34a may also be substantially the same in the magnetic pole group pairs Pa+, Pb+, Pa−, and Pb−. In other words, it is desirable that one magnetic pole group pair (e.g., Pa+) is rotated about the axis Ax1 and becomes another magnetic pole group pair P (e.g., Pb+, Pa−, Pb−).

Attention is now directed to two magnetic pole group pairs P in which the coils CL having the same phase and opposite winding directions are provided. For example, when looking at the magnetic pole group pair Pa+ and the magnetic pole group pair Pa−, there is a 180 degree difference in electrical angle between the angle (distance) between the magnetic pole 33a (or 34a) and the magnetic field core 22N (or 22S) of the magnetic pole group pair Pa+ and the angle (distance) between the magnetic pole 33a (or 34a) and the magnetic field core 22N (or 22S) of the magnetic pole group pair Pa−. That is, as shown in FIG. 25C, the magnetic pole group pair Pa+ and the magnetic pole group pair Pa− are located away from each other substantially by $360\times(q+\frac{1}{2})$ degrees in electrical angle (q is an integer equal to or greater than 1). As such, for example, when the magnetic pole 33a (or 34a) of the magnetic pole group pair Pa+ directly faces the magnetic field core 22N (or 22S), the magnetic pole 33a (or 34a) of the magnetic pole group pair Pa− is located at a position that is shifted by 180 degrees in electrical angle with respect to the magnetic field core 22N (or 22S). In the rotary electric machine M13, q=8, and the magnetic pole group pair Pa+ and the magnetic pole group pair Pa− are located away from each other by 3,060 degrees in electrical angle. In this description, the angle between the magnetic pole group pair Pa+ and the magnetic pole group pair Pa− is specifically the angle (distance) between the center of magnetic pole group G1a+ and the center of magnetic pole group Gla− in the rotation direction, or the angle (distance) between the center of magnetic pole group G2a+ and the center of magnetic pole group G2a− in the rotation direction. The same applies to other magnetic pole group pairs Pb+ and Pb−. In the rotary electric machine M13, the number of poles of magnetic field portion Fs is 68 (p=34). As such, the magnetic pole group pair Pa+ and magnetic pole group pair Pa− are 90 degrees (=3,060/34) in mechanical angle.

Attention is directed to the two magnetic pole group pairs P provided with the coils CL having the same winding direction. For example, attention is directed to the magnetic pole group pair Pa+ and the magnetic pole group pair Pb+. There is a 90 degree difference in electrical angle between the angle (distance) between the magnetic pole 33r (or 34r) of the magnetic pole group pair Pa+ and the magnetic field core 22N (or 22S) and the angle (distance) between the magnetic pole 33r (or 34r) of the magnetic pole group pair Pb+ and the magnetic field core 22N (or 22S). That is, as shown in FIG. 25C, the magnetic pole group pair Pa+ and the magnetic pole group pair Pb+ are located away from each other substantially by "$360\times(n+m/s/2)$" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the rotary electric machine M13, s=2 and n=4. When m=1, the magnetic pole group pair Pa+ and magnetic pole group pair Pb+ are located away from each other by 1,530 degrees in electrical angle. The same applies to the angle between the other two magnetic pole group pairs P provided with the coils CL having the same winding direction (e.g., the angle between the magnetic pole group pair Pa− and the magnetic pole group pair Pb−). The relative position of the magnetic pole group pair P and the magnetic field portion Fs may be applied to a linear electric machine or an axial gap type rotary electric machine.

Further, "$(360/p)\times(n+m/s/2)$" degrees in mechanical angle are ensured between two magnetic pole group pairs P provided with the coils CL having the same winding direction. The angle between the two magnetic pole group pairs P can also be represented as "180/s/c" degrees in mechanical angle. Here, "p" is (the number of poles of magnetic field portion)/2, and "c" is the number of coil pairs for each phase.

Accordingly, "$(360/p)\times(n+m/s/2)$" is substantially equal to "180/s/c". In the rotary electric machine M13, the number of poles of magnetic field portion Fs is, for example, 68 (p=34). Further, s=2 and c=2. As such, the angle between two adjacent magnetic pole group pairs P is 45 degrees in mechanical angle. In other words, the number of poles (p×2) of magnetic field portion Fs, the number of coil pairs (s×c), the number of magnetic poles 33a and 34a are determined so that "$(360/p)\times(n+m/s/2)$" is substantially equal to "180/s/c."

[Example of Armature Core Composed of a Plurality of Partial Cores]

The armature core may be composed of a plurality of portions that are separately formed and coupled together (partial armature core in the claims). FIGS. 26A to 28B illustrate a rotary electric machine having such a structure as another example of the rotary electric machine proposed in the present disclosure. FIGS. 29A to 29C are examples of coupling mechanisms Li, which will be described later. The structures of the armature cores shown in FIGS. 29A to 29C may be applied not only to the radial gap type rotary electric machine shown therein but also to a linear electric machine and an axial gap type rotary electric machine.

Figure 26B:
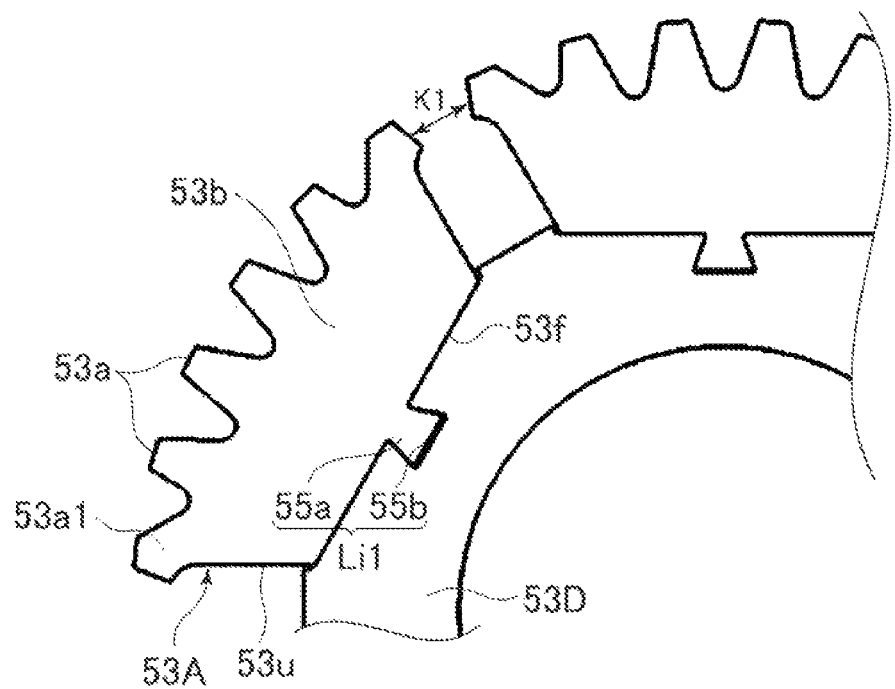
FIG. 26B is an enlarged plan view of the armature core shown in FIG. 26A.

FIG. 26A is an exploded perspective view of the armature portion Am14 of the rotary electric machine. FIG. 26B is a plan view of the first armature cores H1 constituting the armature portion Am14.

As shown in FIG. 26A, the first armature core H1 has a plurality of magnetic pole group partial cores 53A disposed in the rotation direction. The magnetic pole group partial core 53A includes a plurality of magnetic poles 53a disposed in the rotation direction and a common base 53b at the base of the magnetic poles 53a. The plurality of magnetic poles 53a forms a magnetic pole group G1. The first armature core H1 has an annular yoke partial core 53D (In the example of the armature portion Am14, each of the magnetic pole group partial core 53A and the yoke partial core 53D described later corresponds to the partial armature core in the claims).

As shown in FIG. 26A, the plurality of magnetic pole group partial cores 53A are located on the outer side of the yoke partial core 53D. Each magnetic pole group partial core 53A is a portion formed separately from the yoke partial core 53D, and is connected to the yoke partial core 53D by the coupling mechanism Li1. Each of the magnetic pole group partial core 53A and the yoke partial core 53D is formed of lamination steel. According to this first armature core H1, as compared with the case where the entire armature core is composed of one lamination steel, the yield of the core material at the time of manufacturing the first armature core H1 can be improved.

Further, in the armature portion Am14, similarly to the example of the rotary electric machine M1, the coil CL is provided to the magnetic pole group G1. That is, in the armature portion Am14, a part where the coil CL is provided is formed separately from the yoke partial core 53D. As such, in the manufacturing process of armature portion Am14, it is possible to, for example, attach a bobbin-wound or air-core-wound coil CL to the magnetic pole group partial core 53A, and then connect the magnetic pole group partial core 53A to the yoke partial core 53D. Accordingly, a distance K1 (see FIG. 26B) between adjacent magnetic pole group partial cores 53A can be reduced. As a result, the number of magnetic poles 53a constituting one magnetic pole group G1 can be increased, and thus the magnets Mg can be more efficiently used and the output torque of rotary electric machine can be increased.

As shown in FIG. 26B, the coupling mechanism Lit is formed of an engaging portion 55a and an engaged portion 55b. In the example of FIG. 26B, the engaging portion 55a is formed on the magnetic pole group partial core 53A, and the engaged portion 55b is formed on the yoke partial core 53D. The engaging portion 55a is a convex portion projecting from the surface 53f of the yoke partial core 53D of the magnetic pole group partial core 53A. On the other hand, the engaged portion 55b is a recess in which the engaging portion 55a is fitted. Contrary to the example of the armature portion Am14, the engaging portion 55a being a convex portion may be formed in the yoke partial core 53D, and the engaged portion 55b being a recessed portion may be formed in the magnetic pole group partial core 53A.

As shown in FIG. 26B, when the engaging portion 55a is fitted to the engaged portion 55b, i.e., when the magnetic pole group partial core 53A is connected to the yoke partial core 53D, the magnetic pole group partial core 53A is magnetically coupled to the yoke partial core 53D. The surface 53f of magnetic pole group partial core 53A is preferably in contact with the yoke partial core 53D. The joint surfaces of the magnetic pole group partial core 53A and the yoke partial core 53D may be bonded or fixed by brazing, for example. Alternatively, the armature portion Am14 may be molded with resin while the joint surfaces of the magnetic pole group partial core 53A and the yoke partial core 53D are pressed against each other. The coupling structure of the magnetic pole group partial core 53A and the yoke partial core 53D is not limited to the example shown in FIGS. 26A and 26B. For example, the magnetic pole group partial core 53A and the yoke partial core 53D may be connected to each other by bonding or brazing their joint surfaces or being molded with resin without using the coupling mechanism Li1.

As shown in FIG. 29A, a width W9 of the engaging portion 55a is gradually increased toward the tip. That is, the engaging portion 55a has a dovetail shape. On the other hand, the inner width of the engaged portion 55b is gradually reduced toward the opening end of the engaged portion 55b (toward the magnetic pole group partial core 53A). The engaging portion 55a is press-fitted to the engaged portion 55b. Such shapes of the engaging portion 55a and the engaged portion 55b allow the side surfaces of the engaging portion 55a to be pressed against the inner surface of the engaged portion 55b, thereby preventing the magnetic pole group partial core 53A from coming off from the yoke partial core 53D.

As shown in FIG. 26B, a plurality of magnetic poles 53a constituting each magnetic pole group G1 includes a magnetic pole 53a1 located outermost in the rotation direction. The magnetic pole 53a1 protrudes more than the side surface 53u of the common base 53b in the rotation direction. With this structure of the magnetic pole group partial core 53A, it is possible to increase the number of magnetic poles 53a constituting one magnetic pole group G1.

As shown in FIG. 26A, the armature portion Am14 includes the second armature core H2. The second armature core H2 have a plurality of magnetic pole groups G2 disposed in the rotation direction. The magnetic pole group G2 includes a plurality of magnetic poles 54a disposed in the rotation direction. The magnetic pole groups G2 are located axially with respect to the magnetic pole groups G1 of the first armature cores H1. The magnetic pole groups G2 and the magnetic pole groups G1 constitute magnetic pole group pairs P. Two magnetic pole groups G2 adjacent in the rotation direction share a magnetic pole located at the end part. That is, the two magnetic pole groups G2 adjacent in the rotation direction have a magnetic pole 54a1, which is larger than the other magnetic poles 54a, at the end part in the rotation direction.

The second armature core H2 has an annular yoke portion 54c. The second armature core H2 has an annular portion 54g on the inner side of the yoke portion 54c. The annular portion 54g is connected to the yoke portion 54c by a plurality of coupling portions 54h. A plurality of holes 54e arranged in the rotation direction are formed between the annular portion 54g and the yoke portion 54c. The holes 54e are partitioned by the coupling portions 54*h*. The holes 54*e* enables reduced weight of the armature portion Am14.

The inner diameter of the second armature core H2 (the inner diameter of the annular portion 54*g*) may match the inner diameter of the first armature core H1. This enables a cylindrical support member to be placed inside the second armature core H2 and the first armature core H1, thereby firmly fixing these members.

[Another Example of Armature Core Composed of a Plurality of Partial Cores]

Figure 27:
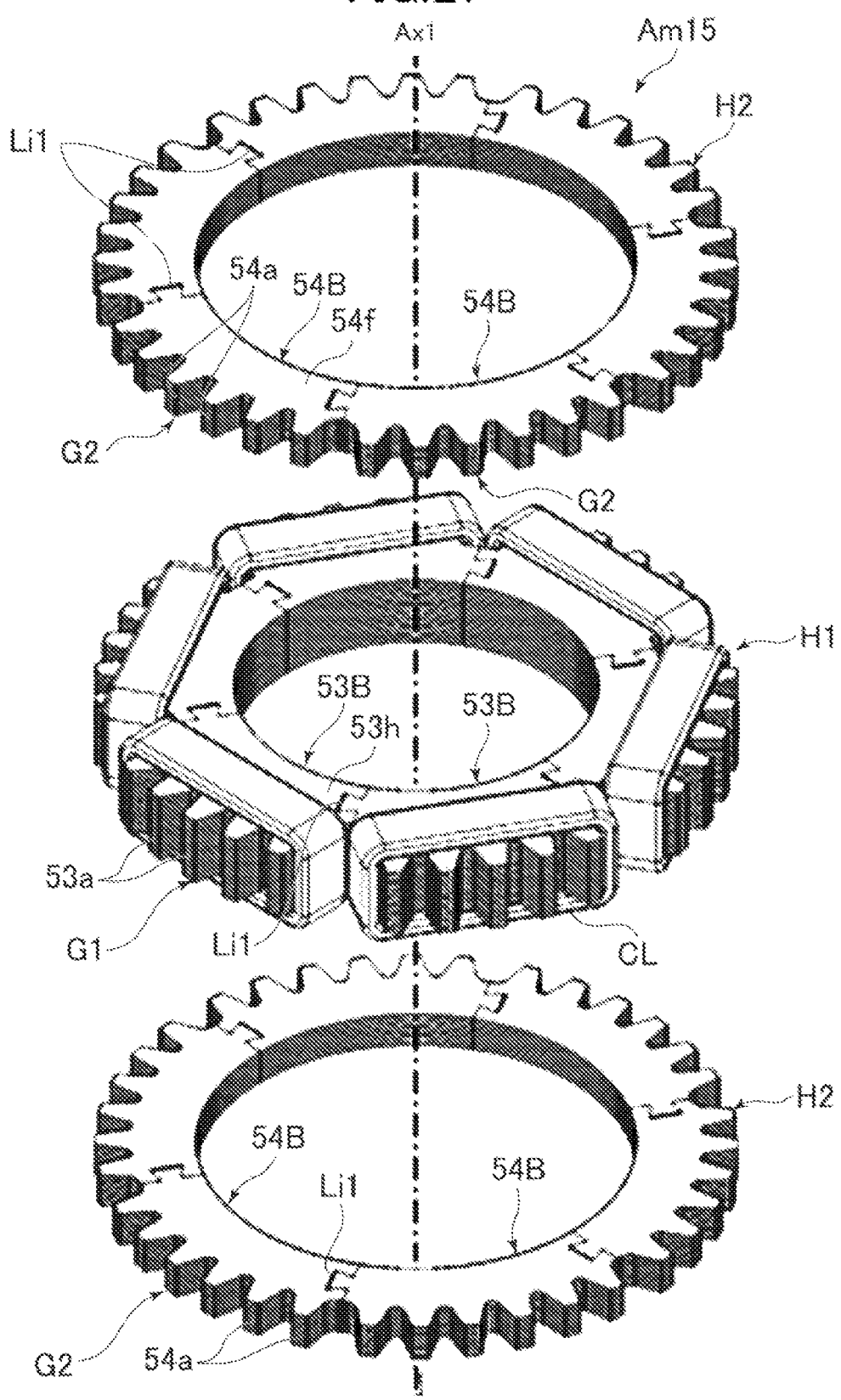
FIG. 27 is an exploded perspective view of an armature portion of another example of a rotary electric machine in which an armature core is formed of a plurality of partial cores.

FIG. 27 is an exploded perspective view of an armature portion Am15, which is another example of the armature portion. In the armature portion Am15, the first armature core H1 has a plurality of partial cores 53B arranged in the rotation direction. The partial cores 53B are members formed separately from each other, and two adjacent partial cores 53B are coupled to each other by the coupling mechanism Li1. The partial cores 53B constitute the first armature core H1 that is annularly formed as a whole. According to this first armature core H1, as compared with the case where the entire armature core is composed of one lamination steel, the yield of the core material at the time of manufacturing the first armature core H1 can be improved. In the example of the armature portion Am15, each of the partial core 53B and the partial core 54B described later corresponds to the partial armature core in the claims.

Each of the partial cores 53B has a plurality of magnetic poles 53*a* constituting a magnetic pole group G1 and a partial yoke 53*h*. Each partial yoke 53*h* includes an engaging portion 55*a* and an engaged portion 55*b* constituting a coupling mechanism Li1 (see FIG. 26B). The engaging portion 55*a* and the engaged portion 55*b* are formed on opposite sides to each other in the partial yoke 53*h* in the rotation direction. The engaging portion 55*a* fits into the engaged portion 55*b* of the adjacent partial yoke 53*h* to connect two partial yokes 53*h*. The specific shapes of the engaging portion 55*a* and the engaged portion 55*b* may be the same as the examples of the armature portion Am14.

While the engaging portion 55*a* is fitted into the engaged portion 55*b*, that is, while the two partial cores 53B are coupled to each other, the two partial cores 53B are magnetically coupled. As such, similarly to the rotary electric machine M1, two magnetic pole groups G1 adjacent in the rotation direction are magnetically coupled via the coupled partial yokes 53*h*. The end surface of one partial core 53B (the surface having the engaging portion 55*a*) and the end surface of the other partial core 53B (the surface having the engaged portion 55*b*) are in contact with each other. The joint surfaces of the partial cores 53B may be bonded or fixed by brazing, for example. Further, the armature portion Am15 may be molded with resin while the joint surfaces of the partial cores 53B are pressed against each other.

As shown in FIG. 27, in the armature portion Am15, the second armature core H2 has a plurality of partial core 54B arranged in the rotation direction. The partial cores 54B are members formed separately from each other, and two adjacent partial cores 54B are coupled to each other by the coupling mechanism Li1. The partial cores 54B constitute the second armature core H2 that is annularly formed as a whole. According to this second armature core H2, the yield of the core material at the time of manufacturing the armature core can be improved.

Each of the partial cores 54B has a plurality of magnetic poles 54*a* constituting a magnetic pole group G2 and a partial yoke 54*f*. Each partial yoke 54*f* includes an engaging portion 55*a* and an engaged portion 55*b* formed thereon. The engaging portion 55*a* and the engaged portion 55*b* are formed on opposite sides to each other in the partial yoke 54*f* in the rotation direction. The specific shapes of the engaging portion 55*a* and the engaged portion 55*b* may be the same as the examples of the armature portion Am14.

While the engaging portion 55*a* is fitted into the engaged portion 55*b*, that is, while the two partial cores 54B are coupled to each other, the two partial cores 54B are magnetically coupled. As such, similarly to the rotary electric machine M1, two magnetic pole group G2 adjacent in the rotation direction are magnetically coupled to each other via the coupled partial yokes 54*f*. The end surface of one of the partial cores 54B (the surface having the engaging portion 55*a*) and the end surface of the other partial core 54B (surface having the engaged portion 55*b*) are preferably in contact with each other.

In the armature portion Am15, the armature cores H1 and H2 are composed of six partial cores 53B and 54B. However, the number of partial cores 53B and 54B may be less than six or more than six. A dividing position of the armature cores H1 and H2 (a position of the engaging portion 55*a* and the engaged portion 55*b*) is a position between the magnetic pole groups G1 and G2 adjacent in the rotation direction. However, the dividing positions of the armature cores H1 and H2 may be provided in each of the magnetic pole groups G1 and G2. That is, the magnetic pole groups G1 and G2 and the annular yoke portions may be divided at the intermediate position of the magnetic pole groups G1 and G2 in the rotation direction. In this case, the dividing surfaces are not provided at the position between two magnetic pole groups G1 and G2 adjacent in the rotation directions. This prevents increase in the magnetoresistance to the magnetic flux flowing through the two magnetic pole groups G1 and G2 adjacent in the rotation direction.

[Yet Another Example of Armature Core Composed of a Plurality of Partial Cores]

Figure 28A:
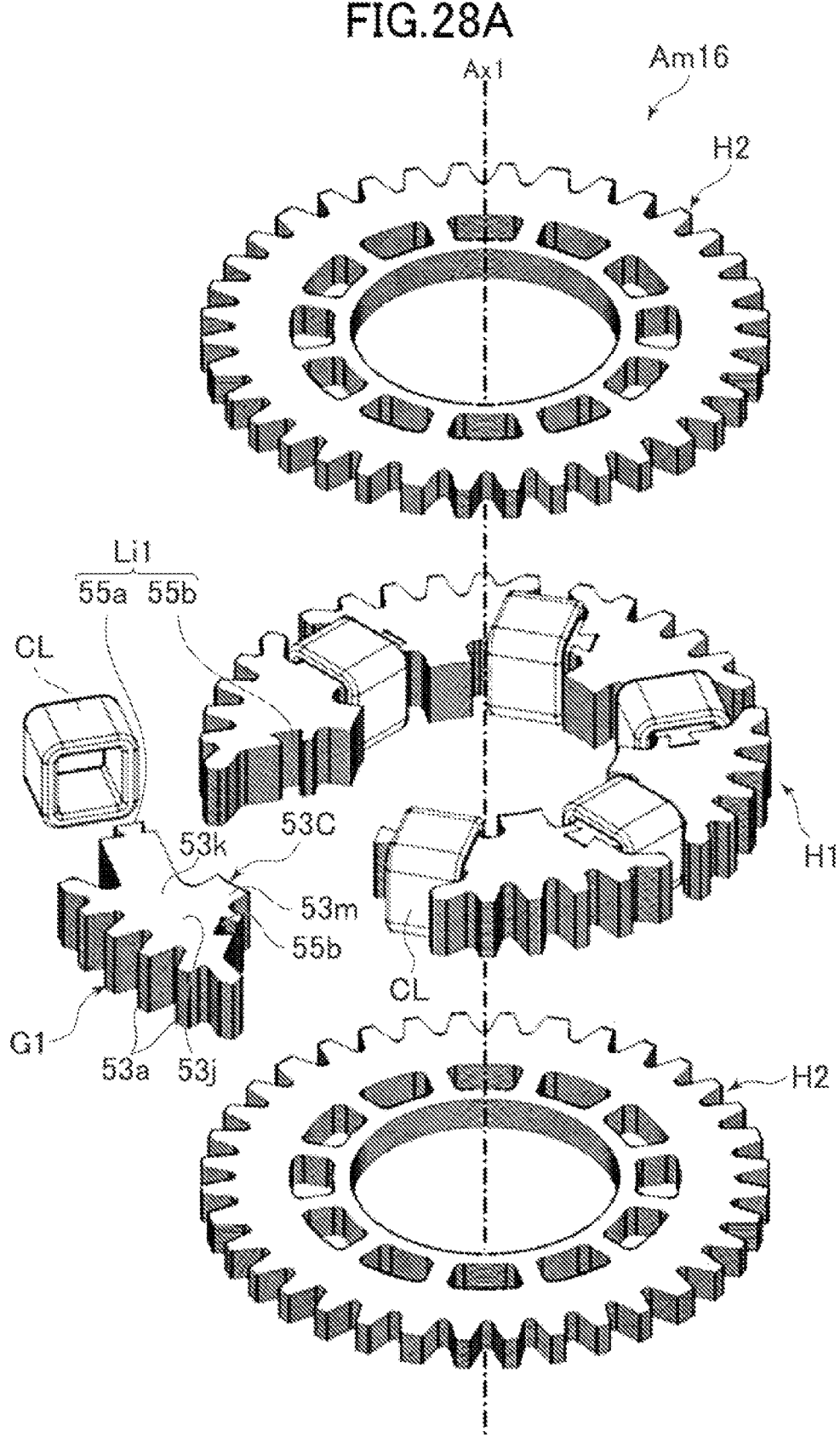
FIG. 28A is an exploded perspective view of an armature portion of still another example of a rotary electric machine in which an armature core is formed of a plurality of partial cores.
Figure 28B:
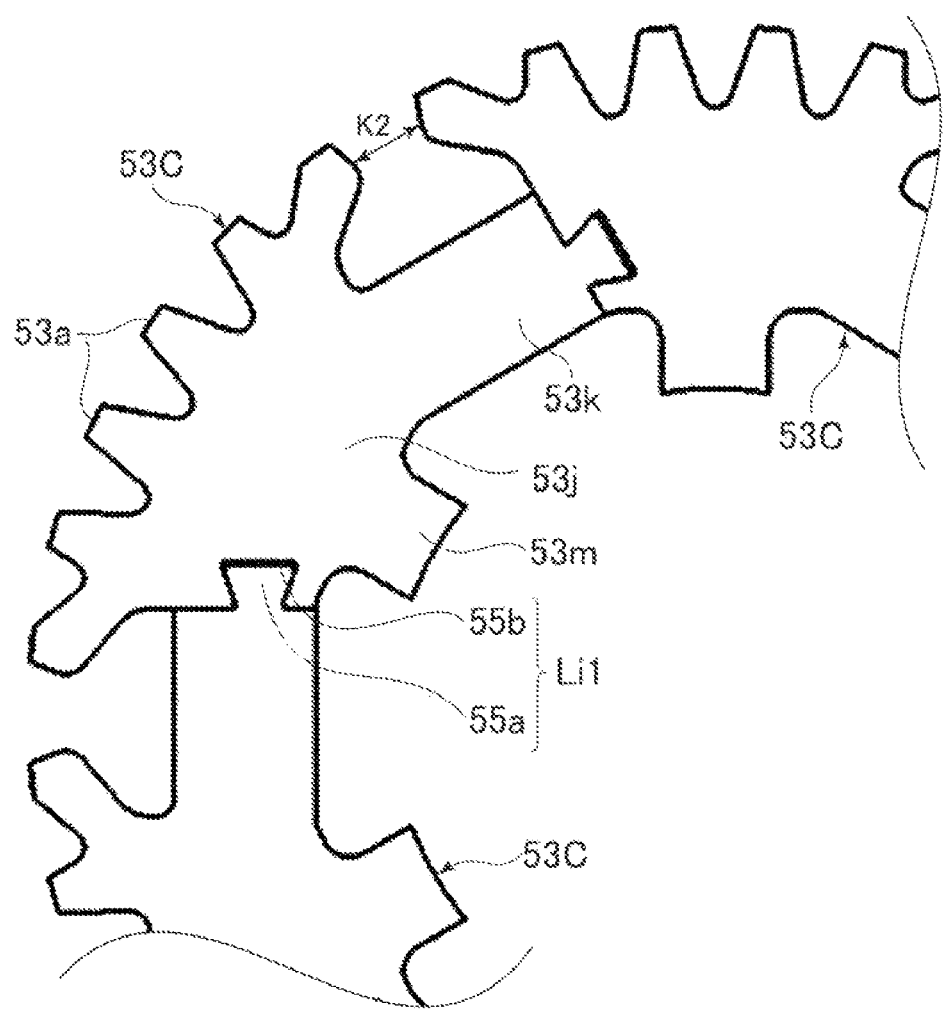
FIG. 28B is an enlarged plan view of the armature core shown in FIG. 28A.
Figure 29A:
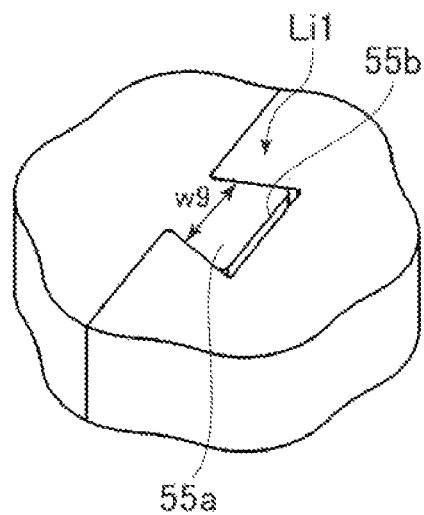
FIG. 29A is a diagram illustrating an example of a coupling mechanism between partial cores (partial armature cores)
Figure 29B:
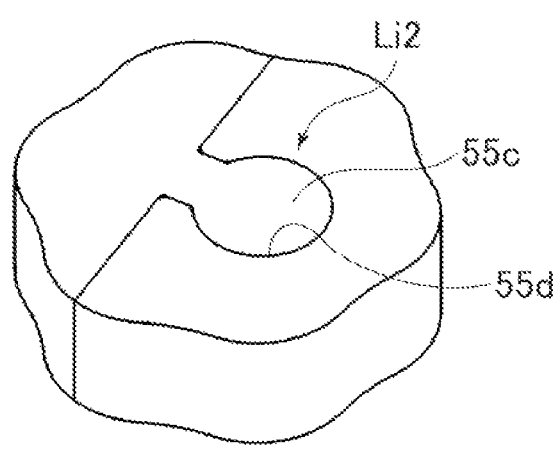
FIG. 29B is a diagram illustrating another example of a coupling mechanism between partial cores.
Figure 29C:
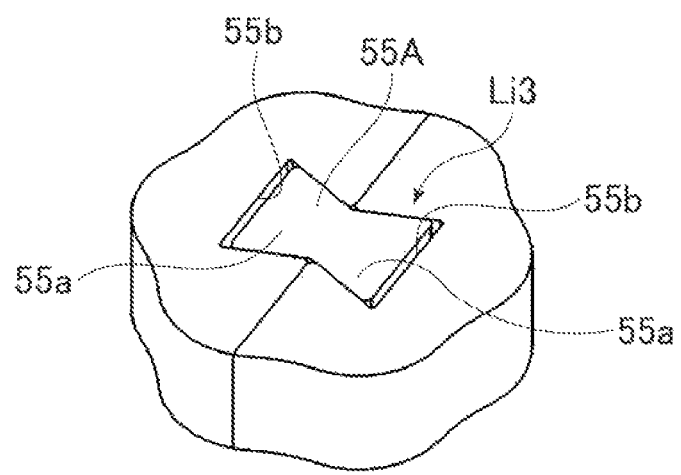
FIG. 29C is a diagram illustrating still another example of a coupling mechanism between partial cores.

FIG. 28A is an exploded perspective view of an armature portion Am16, which is another example of the armature portion. FIG. 28B is a plan view of the first armature cores H1 of the armature portion Am16. In the armature portion Am16, the coil CL is provided in the yoke portion.

As shown in FIG. 28A, the first armature core H1 has a plurality of partial cores 53C arranged in the rotation direction. The partial cores 53C are members formed separately from each other, and two adjacent partial cores 53C are coupled to each other by the coupling mechanism Li1. The partial cores 53C constitute the first armature core H1 that is annularly formed as a whole (In the example of the armature portion Am16, the partial core 53C corresponds to the partial armature core in the claims).

As shown in FIG. 28A, each of the partial cores 53C has a plurality of magnetic poles 53*i* constituting a magnetic pole group G1 and a partial yoke 53*j*. The partial yoke 53*j* has a coil mounting portion 53*k* between two adjacent magnetic pole groups G1. The coil CL is wound around the coil mounting portion 53*k*. As such, in the manufacturing process of armature portion Am16, it is possible to, for example, attach a bobbin-wound or air-core-wound coil CL to the coil mounting portion 53*k*, and then connect two adjacent partial cores 53C. Accordingly, a distance K2 (see FIG. 28B) between adjacent magnetic pole groups G1 can be reduced, and the number of magnetic poles 53*i* constituting one magnetic pole group G1 can be increased. As a result, the magnets Mg can be more efficiently used and the output torque of rotary electric machine can be increased.

As shown in FIG. 28B, each partial yoke 53*j* includes an engaging portion 55*a* and an engaged portion 55*b* formed thereon. The engaging portion 55*a* and the engaged portion 55b are formed on opposite sides to each other in the partial yoke 53j in the rotation direction. The specific shapes of the engaging portion 55a and the engaged portion 55b may be the same as the examples of the armature portion Am14.

While the engaging portion 55a is fitted into the engaged portion 55b, that is, while the two partial cores 53C are coupled to each other, the two partial cores 53C are magnetically coupled. As such, similarly to the rotary electric machine M1, two magnetic pole group G1 adjacent in the rotation direction are magnetically coupled to each other via the coupled partial yokes 53j. The end surface of one of the partial cores 53C (the surface having the engaging portion 55a) and the end surface of the other partial core 53C (surface having the engaged portion 55b) are preferably in contact with each other.

A dividing position of the armature cores H1 (a position of the engaging portion 55a and the engaged portion 55b) is a position between the two magnetic pole groups G1 adjacent in the rotation direction. However, the dividing position of the armature cores H1 may be provided in each magnetic pole group G1. That is, the magnetic pole group G1 and the annular yoke portions may be divided at the intermediate position of the magnetic pole group G1 in the rotation direction. This prevents increase in the magnetoresistance to the magnetic flux flowing through the two adjacent magnetic pole groups G1. Further, the work process of winding the divided partial core and then coupling the partial core is possible. This facilitates the winding operation.

In the first armature core H1, each partial core 53C includes a convex portion 53m protruding inward. Such a convex portion 53m allows the inner diameter of the second armature core H2 to match the inner diameter of the first armature core H1. This enables a cylindrical support member to be placed inside the second armature core H2 and the first armature core H1, thereby firmly fixing these members.

[Coupling Mechanism]

FIG. 29A is an enlarged view of the engaging portion 55a and the engaged portion 55b included in the armature portions Am14, Am15, and Am16 shown in FIGS. 26A to 28B. The engaging portion 55a and the engaged portion 55b may be formed of a part of the lamination steel or the soft magnetic dust material core. The shapes of the engaging portion 55a and the engaged portion 55b are not limited to the example shown in FIG. 29A.

In the coupling mechanism Li2 shown in FIG. 29B, for example, the engaging portion 55c is a circular convex portion in a plan view. On the other hand, the engaged portion 55d is a recess portion having an inner surface in contact with the outer peripheral surface of the engaging portion 55c. In this structure as well, the outer surface of the engaging portion 55c is in contact with the inner surface of the engaged portion 55d, and it is thereby possible to prevent the engaging portion 55c from coming off from the engaged portion 55d and to reduce the magnetoresistance between the two partial cores.

As still another example, in the coupling mechanism Li3 shown in FIG. 29C, recessed portions serving as engaged portions 55b are formed on both of the two partial cores. The coupling mechanism Li3 includes a coupling member 55A formed separately from the partial core, and two engaging portions 55a are formed on the coupling member 55A. Two engaging portions 55a are fitted respectively to the engaged portions 55b of the two partial cores, thereby connecting two partial cores.

The coupling mechanism between the partial cores constituting the armature core may include a pin to be press-fitted into a hole formed in the engaging portion. The engaging portion may be pressed against the inner surface of the engaged portion by the press-fitted pin. FIGS. 30 to 33 show an example of the coupling mechanism having such a structure as another example of the coupling mechanism.

In the coupling mechanism Li4 shown in FIG. 30, a slit 56c is formed in the engaging portion 56a. A part of the slit 56c is formed wide. In the example shown in FIG. 30, a part of the slit 56c is a circular fitting hole 56d having a diameter larger than the width of the other portion. The coupling mechanism Li4 includes a pin 56e that is fitted into the fitting hole 56d. When the pin 56e is fitted into the fitting hole 56d, the engaging portion 56a is pushed in the direction perpendicular to the protruding direction (direction D1 in FIG. 30), and the engaging portion 56a is pressed against the inner surface of the engaged portion 56b. The width of the engaging portion 56a increases toward the distal end of the engaging portion 56a, and the side surface 56f of the engaging portion 56a and the inner surface of the engaged portion 56b are inclined to the opposing surface P3 of the two partial cores. As such, when the pin 56e is inserted into the fitting hole 56d, a force is generated between the two partial cores to attract each other, and the opposing surfaces P3 of the partial cores come into close contact with each other. This prevents a gap between the opposing surfaces P3 due to the dimensional variation of the engaging portion 56a and the engaged portion 56b, thereby increasing the stability of the magnetic coupling of the two partial cores. In addition, the strength of the armature core using the coupling mechanism can be increased.

Figure 31:
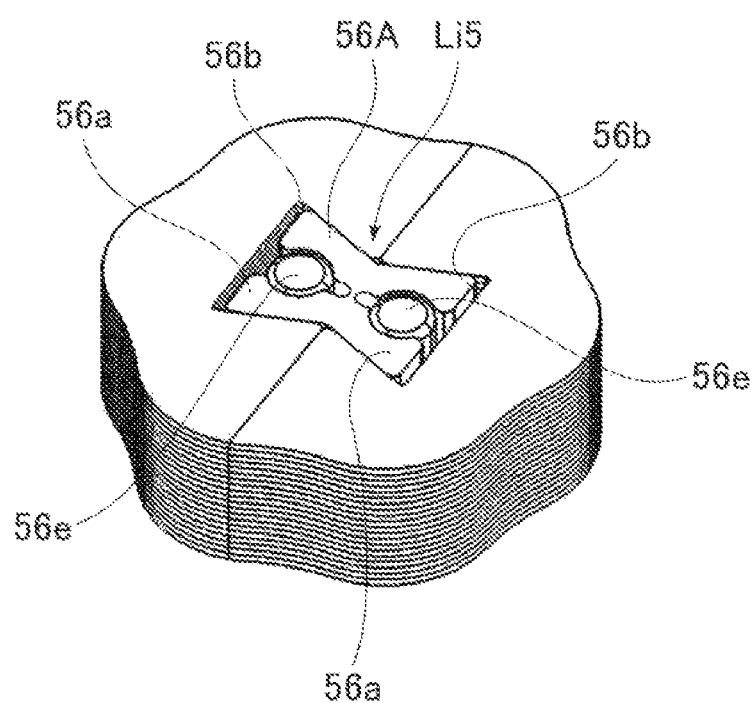
FIG. 31 is a diagram illustrating still another example of a coupling mechanism between partial cores.

In the example shown in FIG. 31, the engaged portions 56b are formed on both of the two partial cores. The coupling mechanism Li5 includes a coupling member 56A formed separately from the partial cores. The coupling member 56A includes two engaging portions 56a respectively to be engaged with the two engaged portions 56b. A slit 56c described above is formed in each engaging portion 56a. A pin 56e is inserted into a fitting hole 56d formed in the slit.

Figure 33:
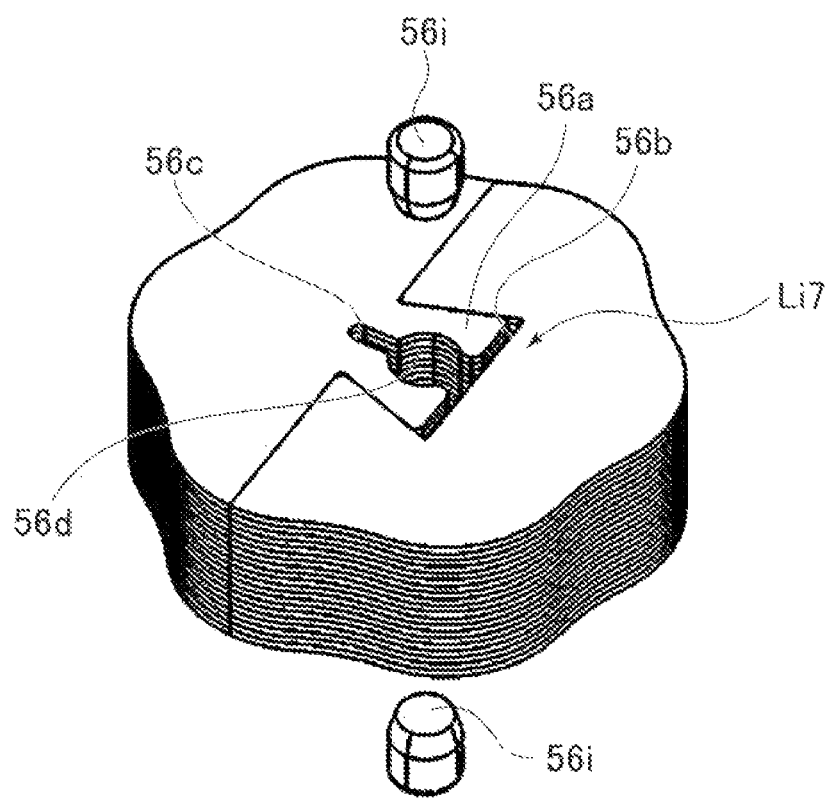
FIG. 33 is a diagram illustrating still another example of a coupling mechanism between partial cores.

In the example shown in FIG. 32, the shape of a pin may be rectangular rather than circular. The tip of the pin 56g shown in FIG. 32 (the tip of the pin 56g in the press-fit direction into the fitting hole 56h) is narrow. The pin 56g is press-fitted into only a portion of the fitting hole 56h formed in the engaging portion 56a. That is, the length of the pin 56g is shorter than the depth of the fitting hole 56h (thickness of the partial core). The coupling mechanism Li6 may include two pins 56g that are pressed and fitted from a direction opposite to the axis direction. As shown in FIG. 33, the two pins 56i press-fitted from the opposite side in the axis direction may be circular.

In a case where pins 56e, 56g, and 56i are formed of a conductive material, the pins 56e, 56g, and 56i are the path of the current induced by the magnetic flux. As shown in FIGS. 32 and 33, the induced current can be reduced by reducing the length of the pins 56g and 56i than the depth of the fitting holes 56d and 56h (thickness of the partial core). The pins 56e, 56g, and 56i may be formed of a high-resistance material or an insulating material. The pins 56e, 56g, and 56i may be press-fitted into the fitting holes 56d and 56h to plastically deform the engaging portion 56a and then removed from the fitting holes 56d and 56h. The coupling mechanism for coupling the partial cores is not limited to the coupling mechanisms Li1 to Li7 described referring to FIGS. 29A to 33, and various modifications may be made.

[Examples of Magnetic Pole Having Projecting Portion]

The magnetic pole formed in the armature core may have projecting portions that project in the axis direction. FIGS.

34A to 38B are diagrams illustrating an armature portion having such a structure as another example of the armature portion. The magnetic pole having such a projecting portion may be applied not only to a radial gap type rotary electric machine but also to an axial gap type rotary electric machine or a linear electric machine.

Figure 34A:
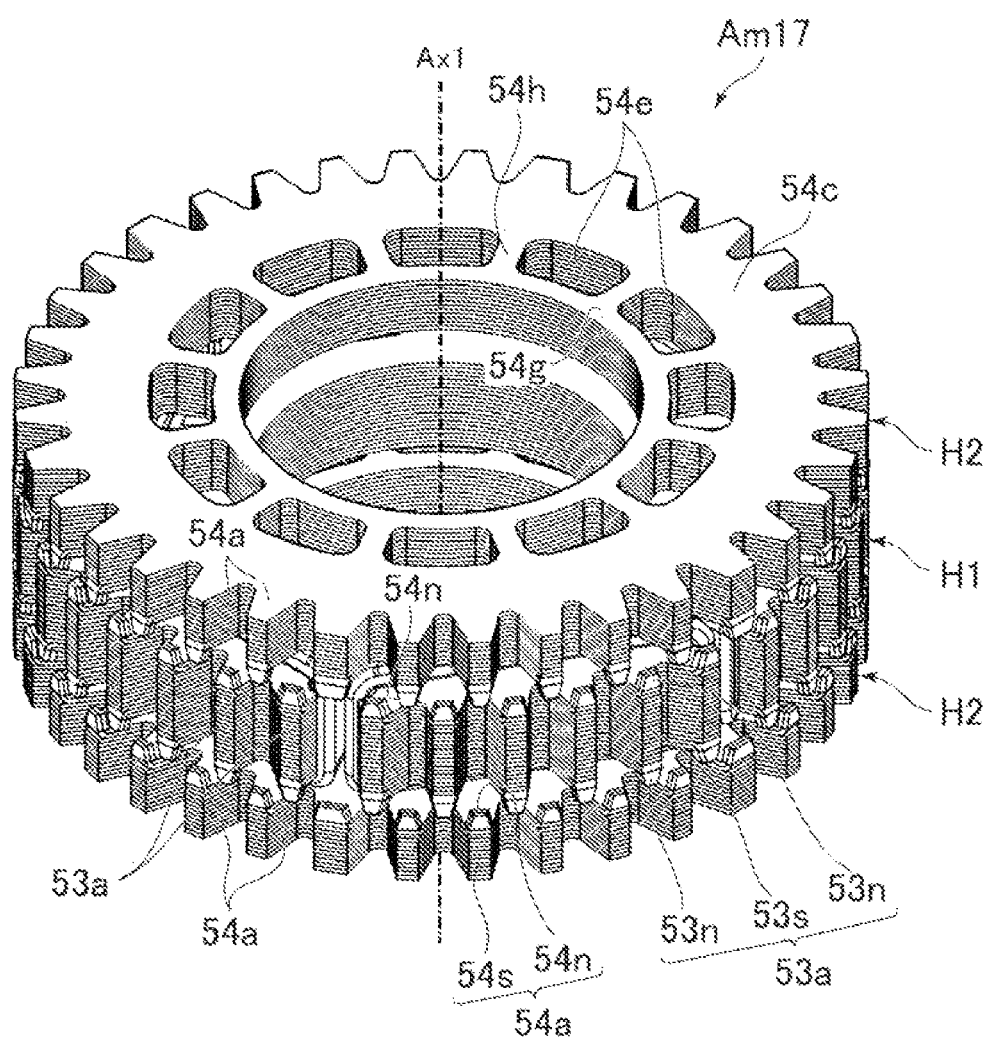
FIG. 34A is a perspective view of an armature portion of a rotary electric machine in which a magnetic pole includes a projecting portion.
Figure 34B:
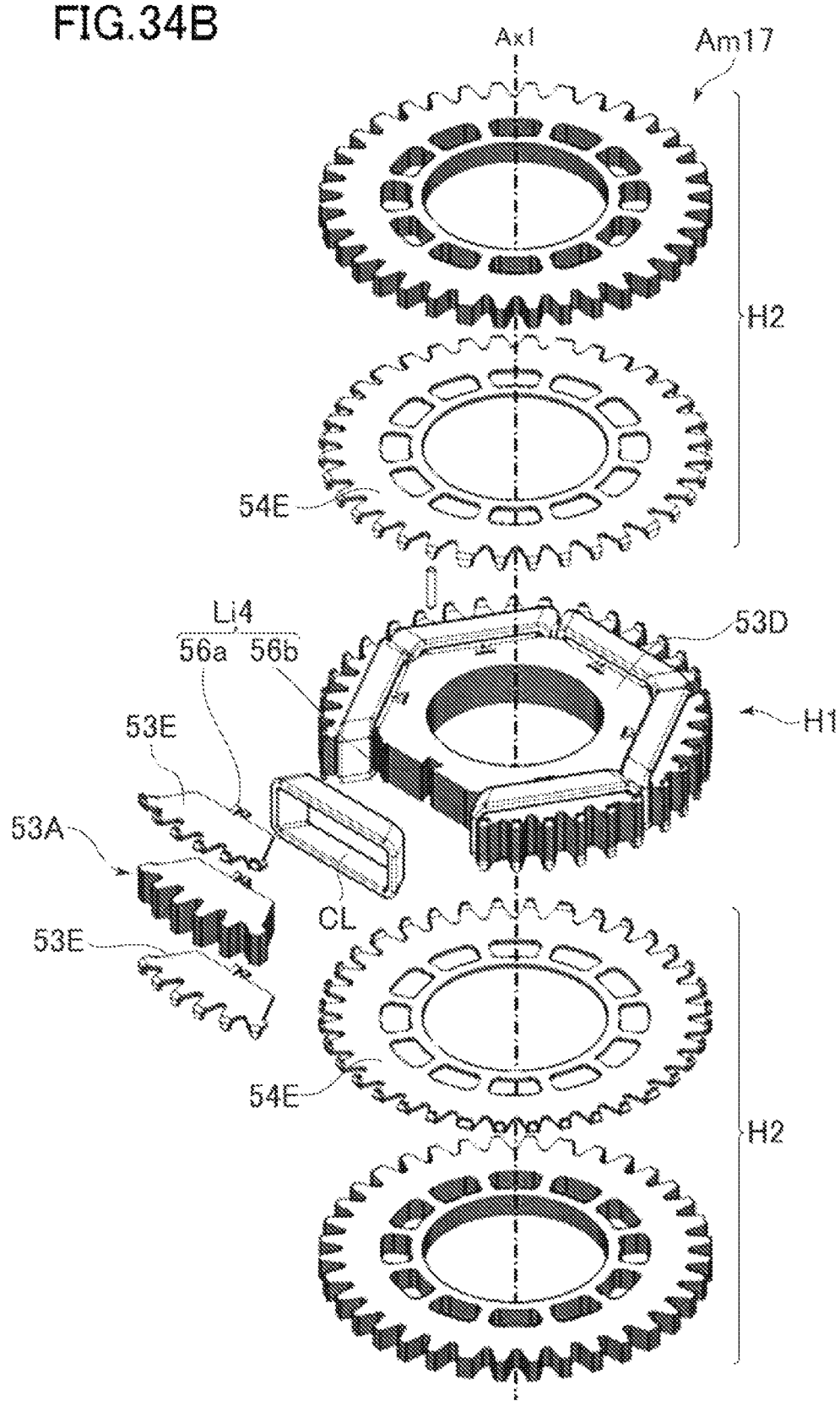
FIG. 34B is an exploded perspective view of the armature portion of the rotary electric machine shown in FIG. 34A.
Figure 35A:
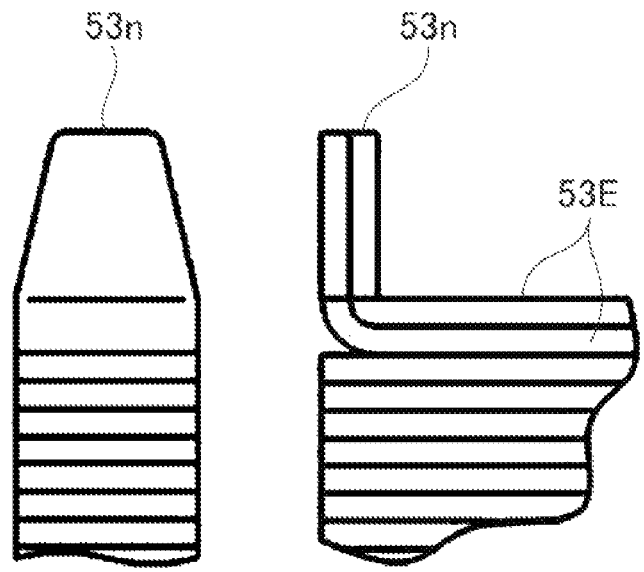
FIG. 35A is a diagram showing an example of a projection formed on a magnetic pole.

FIG. 34A is a perspective view of an armature portion Am17. FIG. 34B is an exploded perspective view of the armature portion Am17. FIG. 35A is an enlarged view of a projecting portion 53n formed in the armature portion Am17.

As shown in FIG. 34B, similarly to the first armature core H1 shown in FIG. 26A, the first armature core H1 has a plurality of magnetic pole group partial cores 53A and an annular yoke partial core 53D. Each of the magnetic pole group partial core 53A and the yoke partial core 53D is formed of lamination steel. In the armature portion Am17, the magnetic pole group partial core 53A and the yoke partial core 53D are coupled to each other by a coupling mechanism Li4 (see FIG. 30) (In the example of the armature portion Am17, each of the magnetic pole group partial core 53A and the yoke partial core 53D corresponds to the partial armature core in the claims).

As shown in FIG. 34A, a magnetic pole 53a of the magnetic pole group partial core 53A has a main body 53s projecting toward the magnetic field portion Fs and a projecting portion 53n extending from the main body 53s in the axis direction. This increases the area of the distal end surface of the magnetic pole 53a (the area of the surface facing the magnetic field portion Fs), and the magnetoresistance caused by the gap between the magnetic field portion Fs and the magnetic pole 53a can be thereby reduced. In addition to the magnetic field cores 22N and 22S, the projecting portion 53n can also function as a part of the flow path of the magnetic flux flowing in the axis direction. This serves to alleviate the magnetic saturation of the magnetic field cores 22N and 22S.

As shown in FIG. 34B, the magnetic pole group partial core 53A includes a steel sheet 53E facing the second armature core H2 at its end portion in the axial direction. The tip of the steel sheet 53E is longer than the other steel sheets and bent toward the second armature core H2 to form a projecting portion 53n projecting in the axis direction.

In the armature portion Am17, the distal end of a plurality of steel sheets 53E disposed at the end in the axis direction (see FIG. 35A) is bent toward the second armature core H2 to form the projecting portion 53n. In the example shown in FIG. 35A, the ends of the two steel sheets 53E at the end are bent (In FIG. 35A, the tips of the two steel sheets 53E at the upper end and the tips of the two steel sheets 53E at the lower end are bent). This enables to more effectively reduce the magnetoresistance caused by the gap between the magnetic field portion Fs and the magnetic pole 53a. The number of steel sheets 53E constituting the projecting portion 53n may be one, or three or more. Such a shape of the magnetic pole 53a (projecting portion 53n) may be applied to the integrally formed first armature core (i.e., the armature core having no partial core).

As shown in FIG. 34A, the magnetic pole 54a of the second armature core H2 also includes a main body 54s projecting toward the magnetic field portion Fs and a projecting portion 54n extending from the main body 54s in the axis direction. The second armature core H2 is formed of lamination steel, and as shown in FIG. 34B, includes a steel sheet 54E at the end portion (the end portion on the first armature core H1 side) in the axis direction. The tip of the steel sheet 54E is longer than the other steel sheets and bent toward the first armature core H1 to form a projecting portion 54n. This increases the area of the distal end surface of the magnetic pole 54a (the area of the surface facing the magnetic field portion Fs), and the magnetoresistance caused by the gap between the magnetic field portion Fs and the magnetic pole 54a can be thereby reduced. In addition to the magnetic field cores 22N and 22S, the projecting portion 54n can also function as a part of the flow path of the magnetic flux flowing in the axis direction. This serves to alleviate the magnetic saturation of the magnetic field cores 22N and 22S.

In the second armature core H2, similarly to the first armature core H1, distal ends of a plurality of steel sheets 54E (two in the example shown in FIG. 34B) positioned at the end in the axis direction are bent toward the first armature core H1 to form projecting portions 54n. The number of steel sheets 54E constituting the projecting portion 54n may be one, or three or more.

In the example shown in FIG. 34A, the second armature core H2 also has an annular portion 54g on the inner side of the yoke portion 54c. The annular portion 54g is connected to the yoke portion 54c by a plurality of coupling portions 54h. A plurality of holes 54e arranged in the rotation direction are formed between the annular portion 54g and the yoke portion 54c. The inner diameter of the second armature core H2, i.e., the inner diameter of the annular portion 54g, may coincide with the inner diameter of the first armature core H1. This enables a cylindrical support member to be placed inside the second armature core H2 and the first armature core H1, thereby firmly fixing these members.

[Modification of Projecting Portion]

Figure 35B:
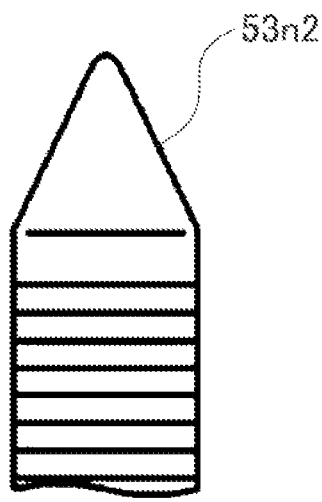
FIG. 35B is a diagram showing another example of a projection formed on a magnetic pole.
Figure 35C:
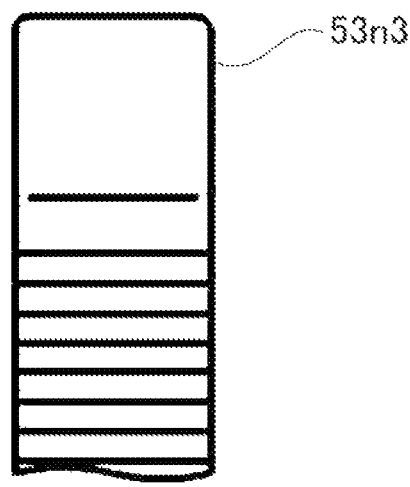
FIG. 35C is a diagram showing still another example of a projection formed on a magnetic pole.
Figure 35D:
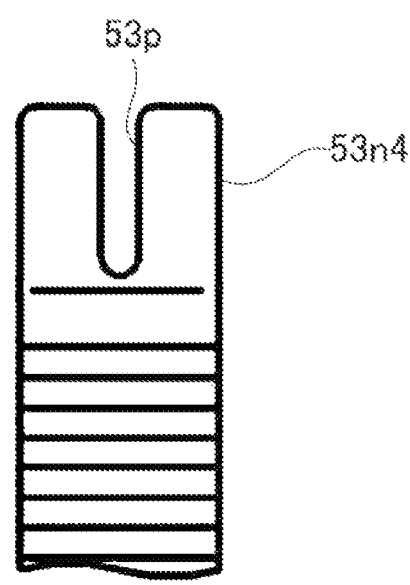
FIG. 35D is a diagram showing still another example of a projection formed on a magnetic pole.

As shown in FIG. 35A, in the armature portion Am17, the projecting portion 53n is a trapezoid when viewed in the projecting direction of the magnetic pole 53a (the radial direction of the rotary electric machine). The shape of the projecting portion 53n is not limited to this example. For example, as shown in FIG. 35B, the projecting portion 53n2 may be triangular when viewed in the projection direction of the magnetic pole 53a (radial direction of the rotary electric machine), or as shown in FIG. 35C, the projecting portion 53n3 may be square when viewed in the projection direction of the magnetic pole 53a. Further, as shown in FIG. 35D, a slit 53p may be formed in the projecting portion 53n4. The slit 53p serves to reduce the eddy current at the projecting portion 53n. The shapes of the projecting portion 53n disclosed in FIGS. 35A to 35D may be applied to the projecting portion 54n of the second armature core H2.

[Example of Powder Core Having Magnetic Pole with Projecting Portion]

Figure 36A:
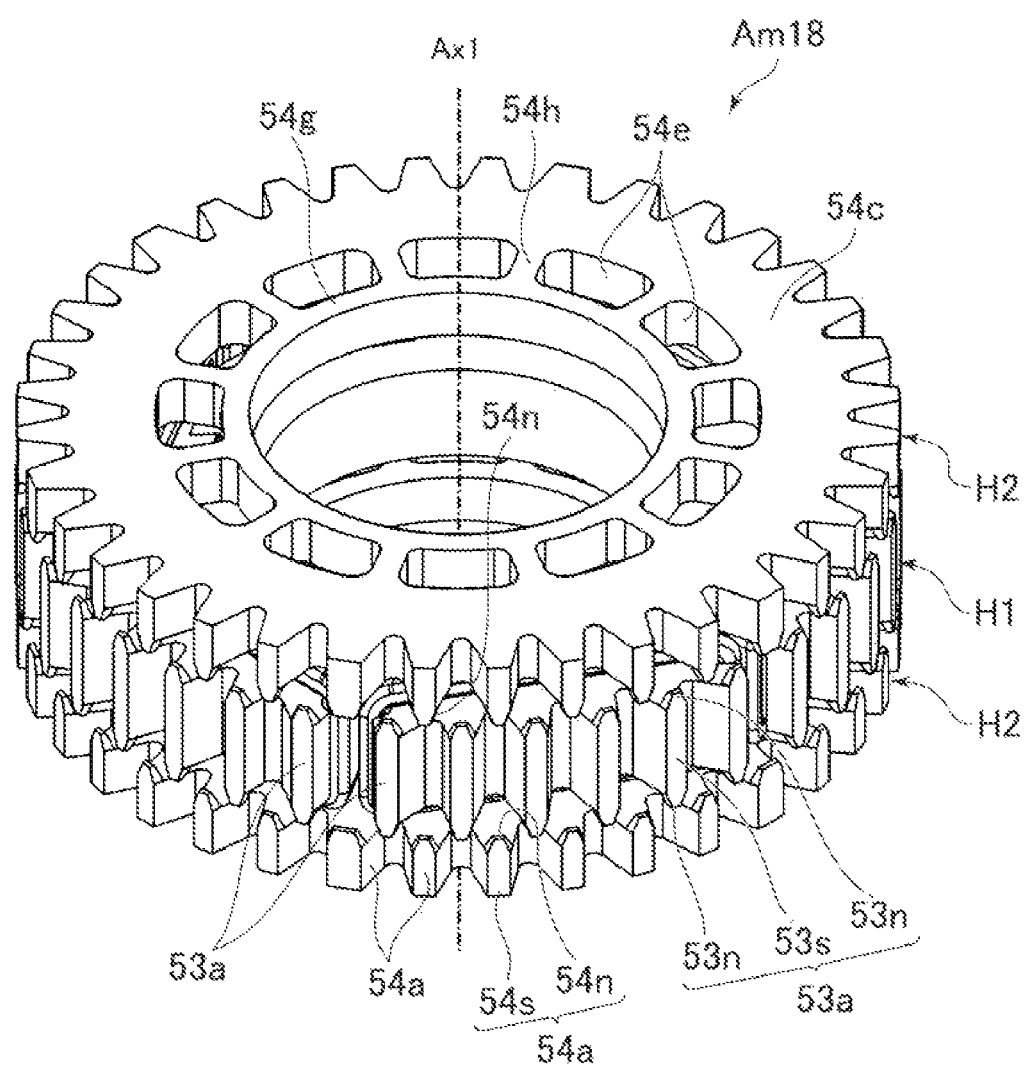
FIG. 36A is a perspective view of an armature portion of a rotary electric machine that has a powder core with a magnetic pole on which a projecting portion is formed.
Figure 36B:
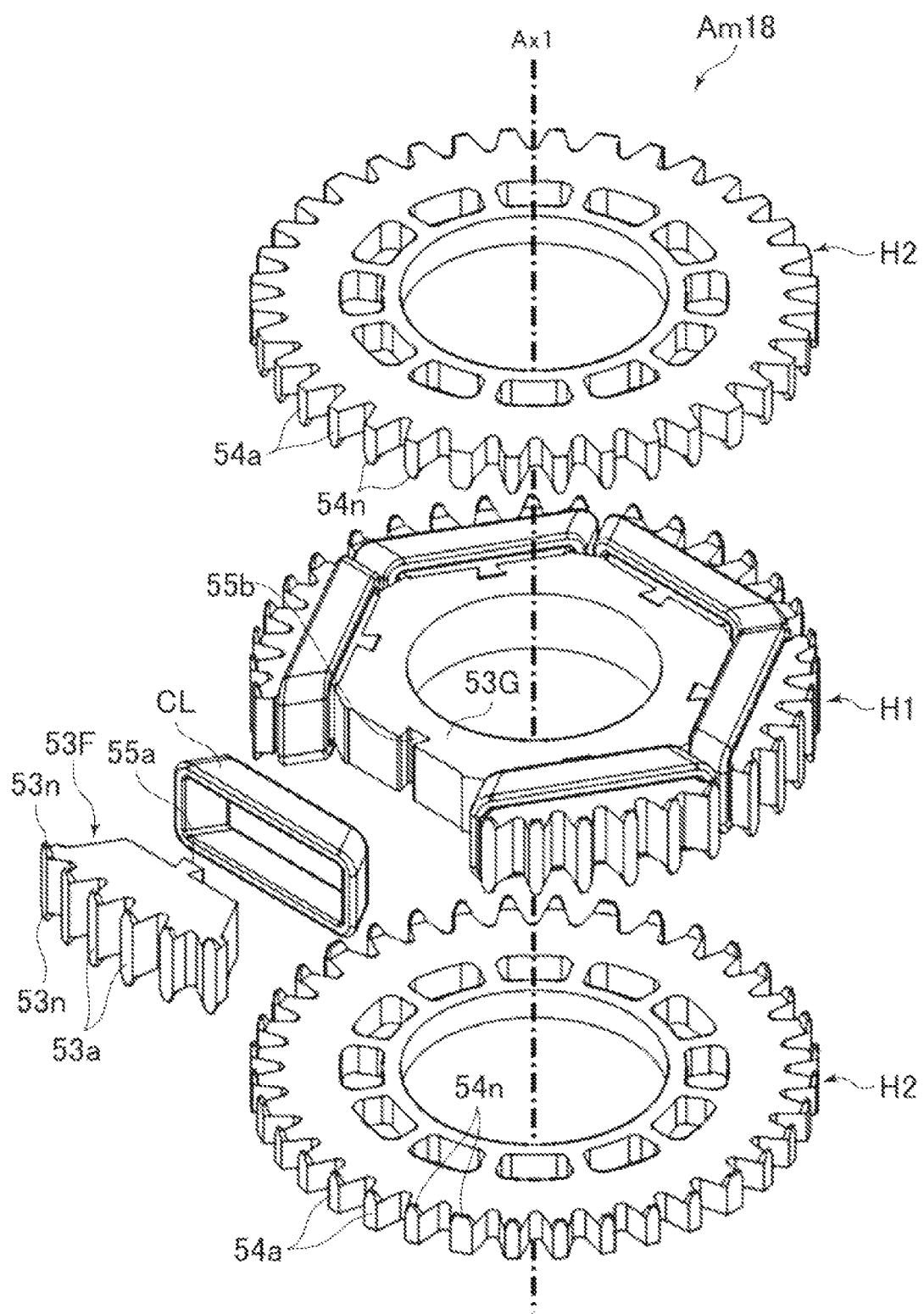
FIG. 36B is an exploded perspective view of the armature portion of the rotary electric machine shown in FIG. 36A.
Figure 37A:
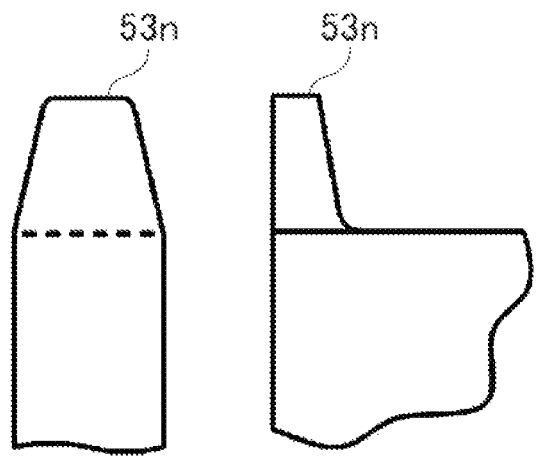
FIG. 37A is a diagram showing an example of a projection formed on a magnetic pole.

The projecting portion projecting in the axis direction may be formed in the armature core formed of a soft magnetic powder material. FIGS. 36A and 36B illustrate an armature portion Am18 having such a structure as another example of the armature portion. FIG. 36A is perspective view of the armature portion Am18. FIG. 36B is an exploded perspective view of the armature portion Am18. FIG. 37A is an enlarged view of a projecting portion 53n formed in the armature portion Am18.

As shown in FIG. 36B, in the armature portion Am18, the first armature core H1 has a plurality of magnetic pole group partial cores 53F disposed in the rotation direction. The first armature core H1 has an annular yoke partial core 53G. The magnetic pole group partial core 53F is formed separately from the yoke partial core 53G, and coupled to the yoke partial core 53G by the coupling mechanism (e.g., the engaging portion 55a and the engaged portion 55b shown in FIG. 29A) (In the example of the armature portion Am18, each of the magnetic pole group partial core 53F and the yoke partial core 53G corresponds to the partial armature core in the claims).

In the armature portion Am18, the magnetic pole group partial core 53F and the yoke partial core 53G are formed of a soft magnetic powder material. As shown in FIGS. 36A and 37A, the magnetic pole 53*a* of the magnetic pole group of the partial cores 53F includes a main body 53*s* projecting toward the magnetic field portion Fs and a projecting portion 53*q* extending from the main body 53*s* in the axis direction. This increases the area of the distal end surface of the magnetic pole 53*a* (the area of the surface facing the magnetic field portion Fs), and the magnetoresistance caused by the gap between the magnetic field portion Fs and the magnetic pole 53*a* can be thereby reduced. In addition to the magnetic field cores 22N and 22S, the projecting portion 53*n* can also function as a part of the flow path of the magnetic flux flowing in the axis direction. This serves to alleviate the magnetic saturation of the magnetic field cores 22N and 22S.

The second armature core H2 is also formed of a soft magnetic powder material. As shown in FIG. 36A, the magnetic pole 54*a* of the second armature core H2 also includes a main body 54*s* projecting toward the magnetic field portion Fs and a projecting portion 54*n* extending from the main body 54*s* in the axis direction. This increases the area of the distal end surface of the magnetic pole 54*a* (the area of the surface facing the magnetic field portion Fs), and the magnetoresistance caused by the gap between the magnetic field portion Fs and the magnetic pole 54*a* can be thereby reduced. In addition to the magnetic field cores 22N and 22S, the projecting portion 54*n* can also function as a part of the flow path of the magnetic flux flowing in the axis direction. This serves to alleviate the magnetic saturation of the magnetic field cores 22N and 22S.

As described above, in the armature portion Am18, the armature cores H1 and H2 are formed of soft magnetic powder material, and which serves to prevent the eddy currents in the armature cores H1 and H2. Further, a high degree of freedom in the shape of the armature cores H1 and H2 can be ensured, and thus optimum shapes of the magnetic poles 53*a* and 54*a* and the projecting portions 53*n* and 54*n* can be easily obtained.

[Other Examples of Projecting Portion]

Figure 37B:
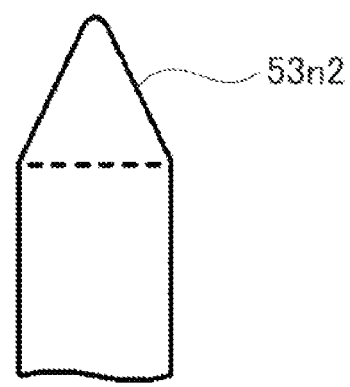
FIG. 37B is a diagram showing another example of a projection formed on a magnetic pole.
Figure 37C:
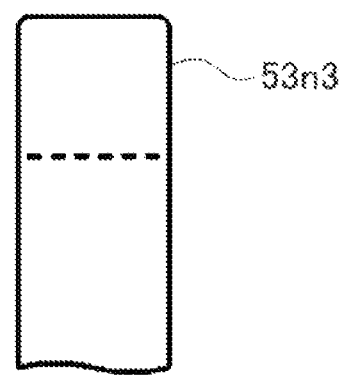
FIG. 37C is a diagram showing still another example of a projection formed on a magnetic pole.

As shown in FIG. 37A, in the armature portion Am18, the projecting portion 53*n* is a trapezoid when viewed in the projecting direction of the magnetic pole 53*a* (the radial direction of the rotary electric machine). The shape of the projecting portion 53*q* is not limited to this example. For example, as shown in FIG. 37B, the projecting portion 53*n*2 may be triangular when viewed in the projection direction of the magnetic pole 53*a*, or as shown in FIG. 37C, the projecting portion 53*n*3 may be square when viewed in the projection direction of the magnetic pole 53*a*.

[Example of Armature Core Formed of Lamination Steel and Powder Material]

Figure 38A:
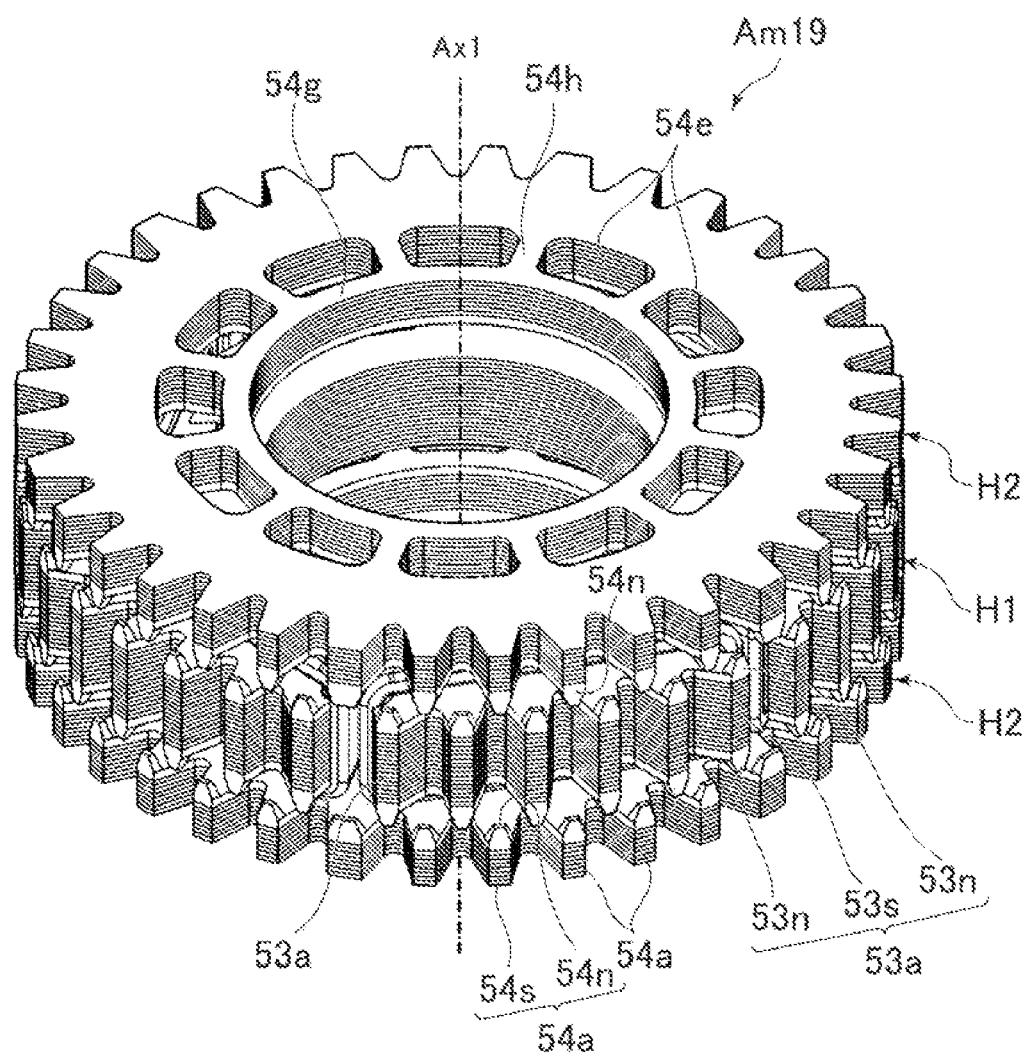
FIG. 38A is a perspective view of an armature portion of a rotary electric machine having an armature core formed of lamination steel and a powder material.
Figure 38B:
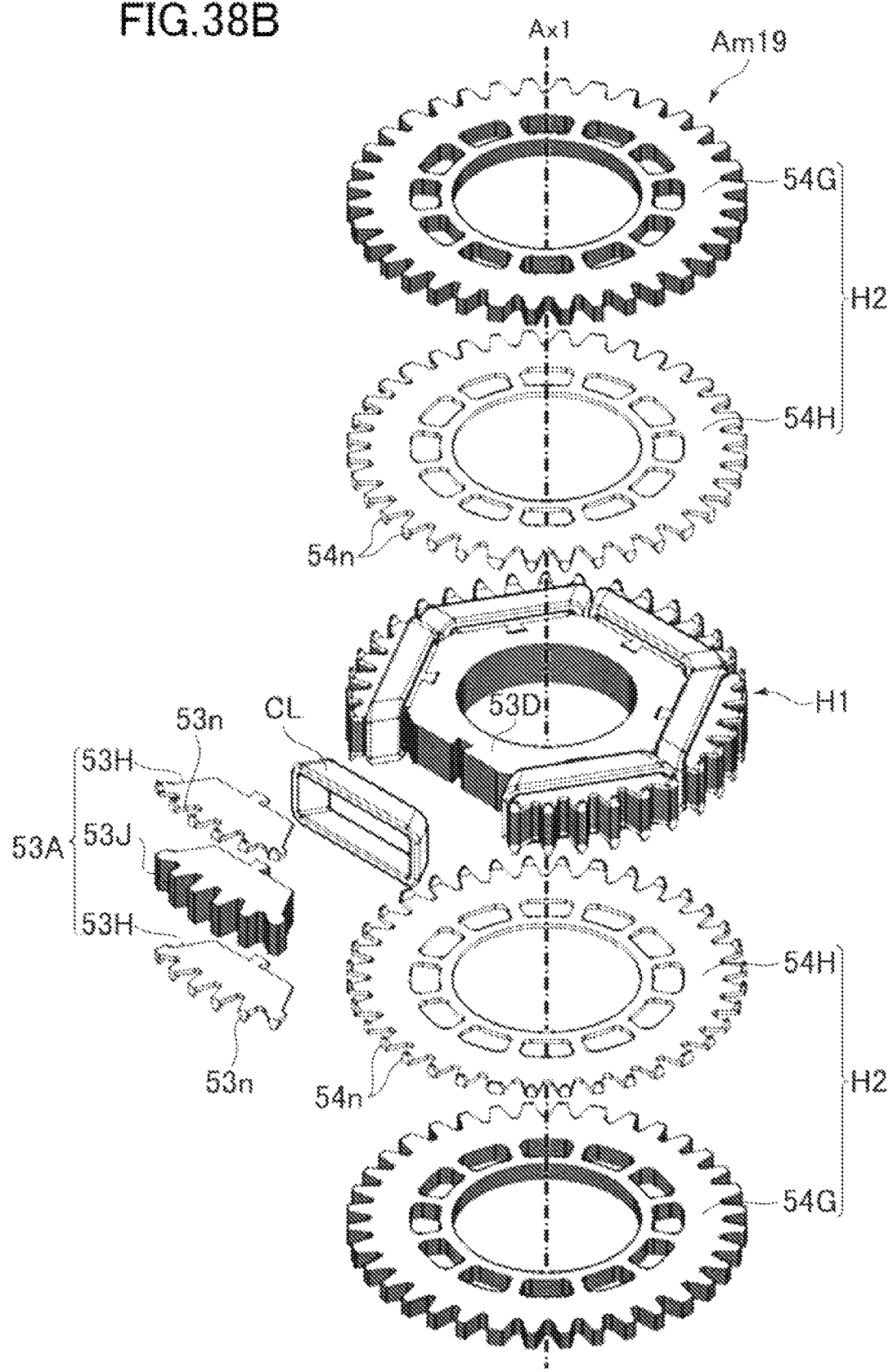
FIG. 38B is an exploded perspective view of the armature portion of the rotary electric machine shown in FIG. 38A.

The armature core may have a portion formed of lamination steel and a portion formed of a soft magnetic powder material. In this case, for example, the projecting portions described above formed on the respective magnetic pole portions may be formed of a soft magnetic powder material. FIGS. 38A and 38B illustrate an armature portion Am19 having such a structure as another example of the armature portion. FIG. 38A is a perspective view of the armature portion Am19. FIG. 38B is an exploded perspective view of the armature portion Am19. The armature cores formed of the two types of materials shown in FIGS. 38A and 38B may be applied not only to a radial gap type rotary electric machine but also to an axial gap type rotary electric machine or a linear electric machine.

As shown in FIG. 38B, the first armature core H1 has a plurality of magnetic pole group partial cores 53A arranged in the rotation direction and an annular yoke partial core 53D. The magnetic pole group partial core 53A is formed separately from the yoke partial core 53D, and coupled to the yoke partial core 53D by the coupling mechanism (e.g., the engaging portion 55*a* and the engaged portion 55*b* shown in FIG. 29A). In the example of the armature portion Am19, each of the magnetic pole group partial core 53A and the yoke partial core 53D corresponds to the partial armature core in the claims.

As shown in FIG. 38B, the magnetic pole group partial core 53A is formed of lamination steel and a soft magnetic dust material. Specifically, the magnetic pole group partial core 53A includes a laminated core 53J formed of lamination steel, and a powder core 53H formed of a soft magnetic powder material. When viewed in the axis direction, the shape of the powder core 53H and the shape of the laminated core 53J may be the same. The powder core 53H is positioned in the axis direction with respect to the laminated core 53J, are overlaps the laminated core 53J. That is, the powder core 53H is located on the second armature core H2 side with respect to the laminated core 53J. In the armature portion Am19, the powder cores 53H are disposed on both sides of the laminated core 53J in the axis direction. The laminated cores 53J and the powder core 53H may be fixed to each other.

As shown in FIG. 38A, the magnetic pole 53*a* includes a main body 53*s* having a shape projecting toward the magnetic field portion Fs, and a projecting portion 53*n* extending from the main body 53*s* in the axis direction (i.e., extending toward the second armature core H2). Each of the laminated core 53J and the powder core 53H has a portion constituting the main body 53*s*. Projecting portion 53*n* is formed in the powder core 53H. powder core 53H has a high degree of freedom for its shape. Therefore, according to the first armature core H1 including a portion formed of lamination steel and a part formed of soft magnetic dust material, it is possible to achieve both high performance and productivity of rotary electric machine. Incidentally, the yoke partial core 53D of the first armature core H1 may be composed only of lamination steel.

The second armature core H2 is also formed of a lamination steel and a soft magnetic dust material. Specifically, the second armature core H2 has a laminated core 54G formed of lamination steel, and a powder core 54H formed of a soft magnetic dust material. When viewed in the axis direction, the shape of the powder core 54H may be the same as the shape of the laminated core 54G. powder core 54H is positioned axially with respect to the laminated core 54G is superimposed on the laminated core 54G. powder core 54H is located on the first armature core H1 side with respect to the laminated core 54G. The powder core 54H and the laminated core 54G may be fixed to each other.

As shown in FIG. 38A, magnetic pole 54*a* has a body 54*s* shaped to project towards magnetic field portion Fs and a projecting portion 54*n* extending axially from the body 54*s*, i.e. towards the first armature core H1. Each of the laminated core 54G and the powder core 54H has a portion constituting the main body 54*s*. The projecting portion 54*n* is formed in the powder core 54H. The powder core 54H has a high degree of freedom in the shape, and thus the second armature core H2 including the powder core 54H and the laminated core 54G enables high performance and productivity of the rotary electric machine.

[Resin-Molded Armature Portion]

Figure 39:
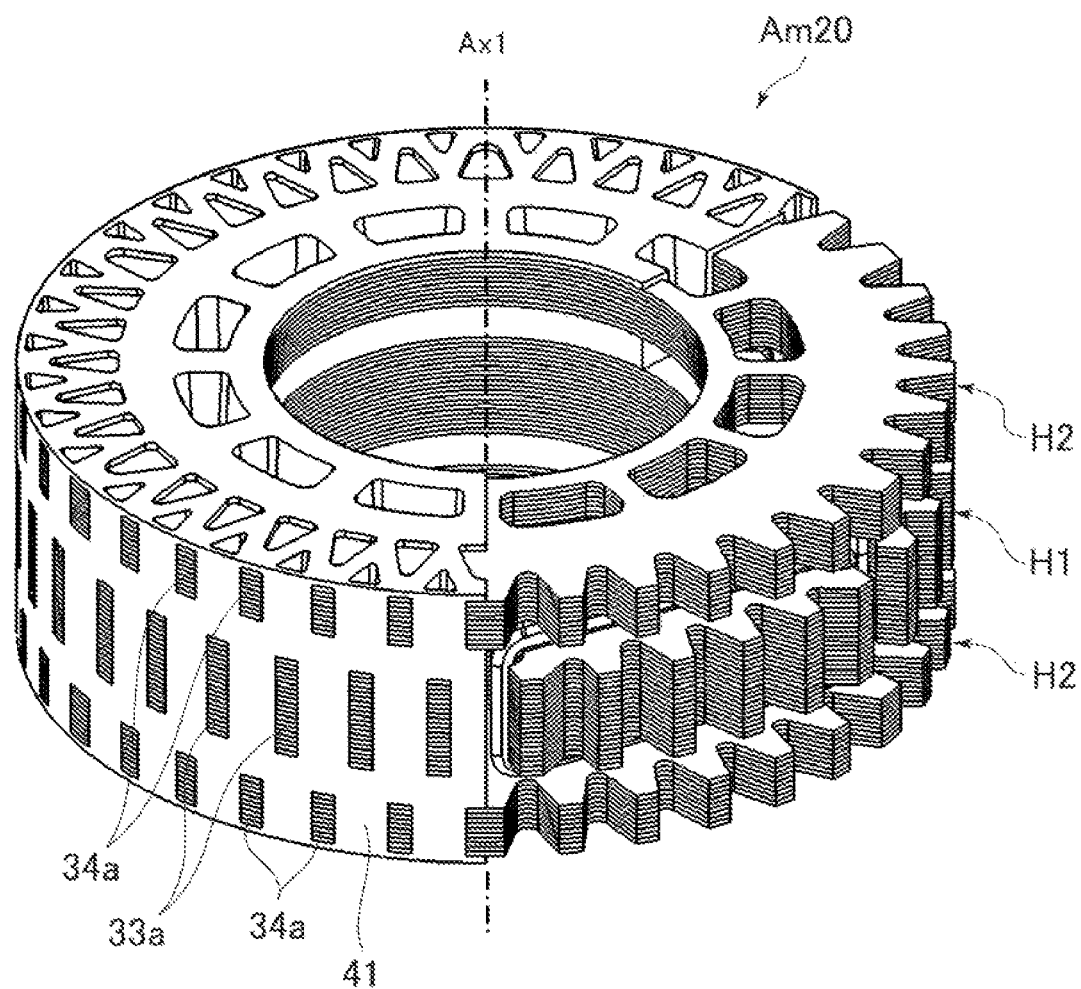
FIG. 39 is a diagram showing an example of an armature portion molded with resin.

The armature portion described above may be solidified by a non-magnetic and insulating material. FIG. 39 is a diagram illustrating an armature portion Am20 having such a structure as another example of the armature portion.

The armature portion Am20 shown in FIG. 39 is solidified by a non-magnetic and insulating material. Specifically, the armature portion Am20 is molded with a resin 41 (in FIG. 39, a portion of the resin 41 is removed). That is, the first armature core H1 constituting the armature portion Am20, the second armature core H2, and the coil CL are immersed in molten resin and solidified. The armature portion Am20 is thus molded with resin, and thereby preventing disconnection of the coil CL due to vibration and impact. Further, the heat capacity of the armature portion Am20 can be increased, and the temperature rise at the time of driving the rotary electric machine can be alleviated. Further, the workability of assembling the rotary electric machine can be improved. The wire of the coil CL is pulled out of the resin 41 and is connected to a drive unit (not shown) such as an inverter.

As shown in FIG. 39, the distal end surfaces of the magnetic poles 33a and 34a are exposed from the resin 41. This ensures a gap between the distal end surfaces of the magnetic pole 33a and 34a and the inner surface of the magnetic field portion Fs.

Preferably, the inner peripheral surface of the first armature core H1 and the inner peripheral surface of the second armature core H2 are exposed from the resin 41. With this structure, when the rotary electric machine is mounted on the device in which the rotary electric machine is used as a driving source, the metal member for supporting the armature portion Am20 can make a contact with the inner peripheral surface of the inner peripheral surface and the second armature core H2 of the first armature core H1. As a result, higher positional accuracy of the armature portion Am20 can be achieved. Further, the metal members come into contact with each other, and thus the armature cores H1 and H2 can be firmly fixed.

[Details of Magnetic Field Portion]

Referring to FIGS. 40A to 47, examples of the magnetic field portion will be described. The features of the magnetic field portion described below may be applied to any rotary electric machine or a linear electric machine described later. FIGS. 40A, 40D, 41, and 42A are perspective views of a part of the magnetic field portion in the rotation direction. FIGS. 40B, 40C, 40E, 42B, and 43 to 47 are cross-sectional views of parts of the magnetic field portions Fs1 to Fs9 and Fs11 to Fs13 in the rotational direction, and the cut surfaces are perpendicular to a plane in the axial direction. In these drawings, the magnetization directions of the magnets Mg are indicated by arrows.

The magnetic field portions described referring to these drawings have the following structures. That is, the magnetic field portion Fs includes a plurality of permanent magnets Mg disposed in the rotation direction, and a plurality of magnetic field cores 22N and 22S also disposed in the rotation direction. The magnet Mg is disposed so that its magnetization direction is directed to the rotation direction of the rotary electric machine. The magnetization directions of two adjacent magnets Mg are opposite to each other. That is, the two adjacent magnets Mg are disposed so that the same poles (N-pole or S-pole) face each other. The magnetic field core 22N or the magnetic field core 22S is disposed between the two adjacent magnets Mg. The magnetic field core 22N is disposed between the two magnets Mg with N poles facing each other, and the magnetic field core 22S is disposed between the two magnets Mg with S poles facing each other.

Figure 40A:
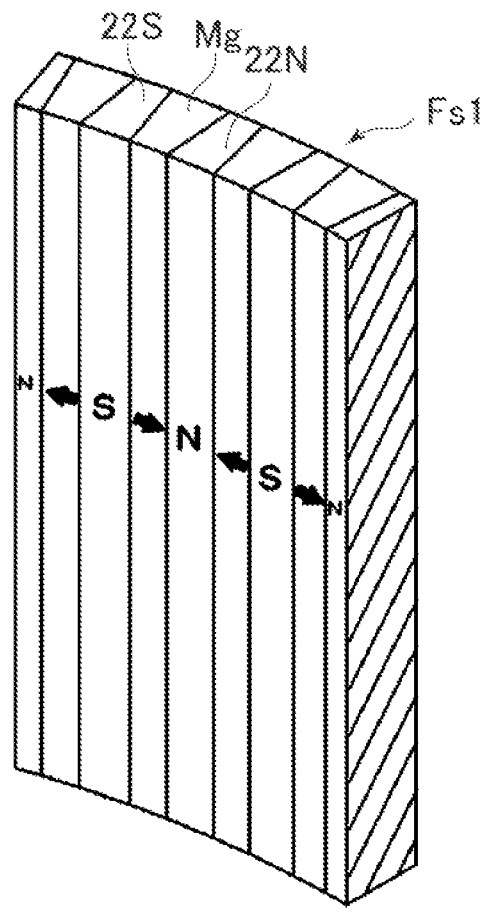
FIG. 40A is a diagram showing an example of a magnetic field portion.
Figure 40B:
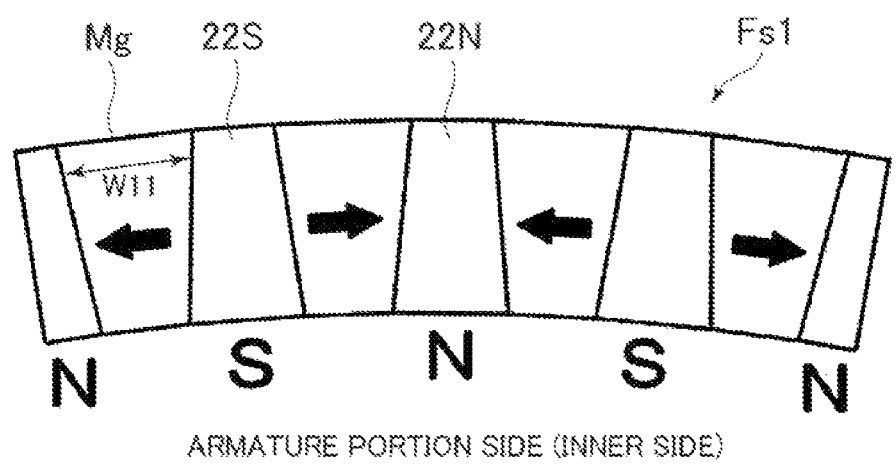
FIG. 40B is a cross sectional view of the magnetic field portion shown in FIG. 40A.

Each magnet Mg is a surface facing the opposite side to the armature portion, and has a larger width (width in the rotation direction). The magnetic field portion Fs1 shown in FIGS. 40A and 40B is disposed outside of the armature portion of the rotary electric machine in the radial direction of the rotary electric machine. Each of the magnets Mg has a larger width W11 (see FIG. 40B) on the surface of the magnetic field portion Fs1 facing outward than on the surface of the magnetic field portion Fs1 facing inward. This serves to reduce the magnetic flux leaking to the outside of the magnetic field portion Fs1 (magnetic flux leaking to the opposite side of the armature portion), thereby improving the output torque of the rotary electric machine. Contrary to the magnets Mg, the magnetic field cores 22N and 22S have larger widths on the surface of the magnetic field portion Fs1 facing inward (surface on the armature portion side) than on the surface of the magnetic field portion Fs1 facing outward. Due to such shapes of the magnetic field cores 22N and 22S and the magnets Mg, the magnetic field portion Fs1 has a cylindrical shape as a whole. The magnetic field cores 22N and 22S having such shapes are formed of, for example, a soft magnetic powder material. The magnetic field cores 22N and 22S may be fixed to the surfaces of the magnets Mg by an adhesive, for example. The widths of magnetic field cores 22N and 22S may be constant in the radial direction of the rotary electric machine.

Figure 40C:
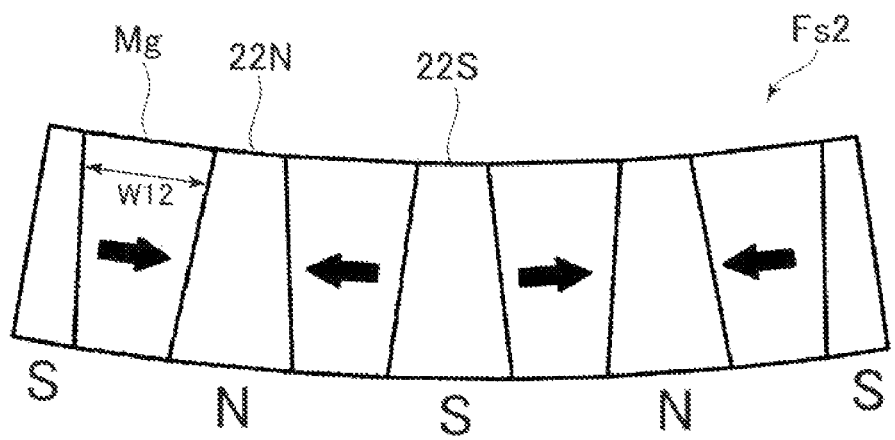
FIG. 40C is a cross sectional view of another example of a magnetic field portion.

The magnetic field portion Fs2 shown in FIG. 40C is disposed inward of the armature portion of the rotary electric machine in the radial direction. As such, each of the magnets Mg has a larger width W12 on the surface of the magnetic field portion Fs2 facing inward than on the surface of the magnetic field portion Fs2 facing outward. This serves to reduce the magnetic flux leaking to the inside of the magnetic field portion Fs2 (magnetic flux leaking to the opposite side of the armature portion), thereby improving the output torque of the rotary electric machine. Contrary to the magnets Mg, the magnetic field cores 22N and 22S have larger widths on the surface of the magnetic field portion Fs2 facing outward (surface on the armature portion side) than on the surface of the magnetic field portion Fs2 facing inside. Due to such shapes of the magnetic field cores 22N and 22S and the magnets Mg, the magnetic field portion Fs2 has a cylindrical shape as a whole. In magnetic field core 22N of such a structure, 22S is formed of, for example, a soft magnetic compacted powder material. The magnetic field cores 22N and 22S having such shapes are formed of, for example, a soft magnetic powder material.

[Magnetic Field Portion Having Coupling Portion]

Figure 40D:
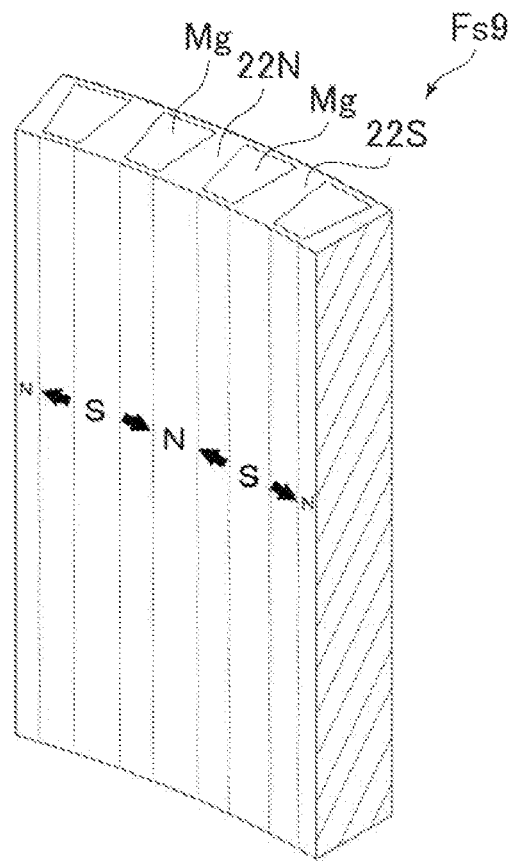
FIG. 40D is a perspective view of a magnetic field portion including a coupling portion.
Figure 40E:
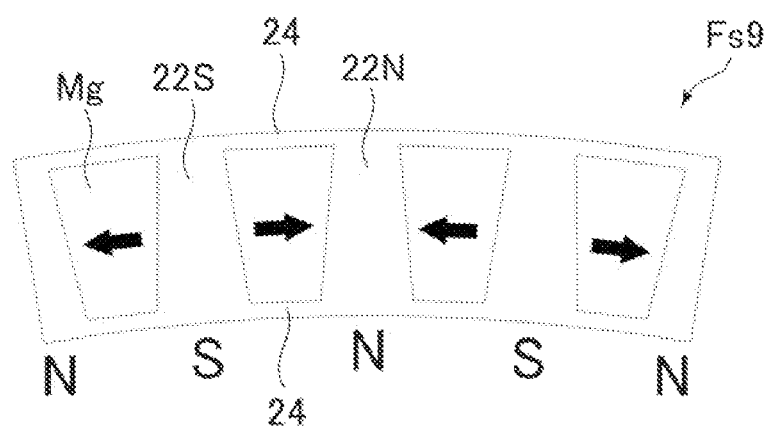
FIG. 40E is a cross sectional view of the magnetic field portion shown in FIG. 40D.

As shown in FIGS. 40D and 40E, the magnetic field portion Fs9 is disposed outside of the armature portion of the radial gap type rotary electric machine. The magnetic field portion Fs9 includes a coupling portion 24 for connecting adjacent magnetic field cores 22S and 22N on the inner periphery and the outer periphery of the plurality of magnets Mg. The coupling portion 24 is formed thin, and the magnetic flux of the magnets Mg is saturated at the coupling portion 24. As such, the adjacent magnetic field cores 22N and 22S are magnetically separated substantially. As such, poles (N and S) of the magnetic field portion Fs9 are formed between adjacent magnets Mg. Such a magnetic field portion Fs9 is relatively easily obtained by forming a cylindrical member with a soft magnetic powder material in which an insertion hole extending in the axis direction is formed, and inserting the magnet Mg into the insertion hole.

Figure 40F:
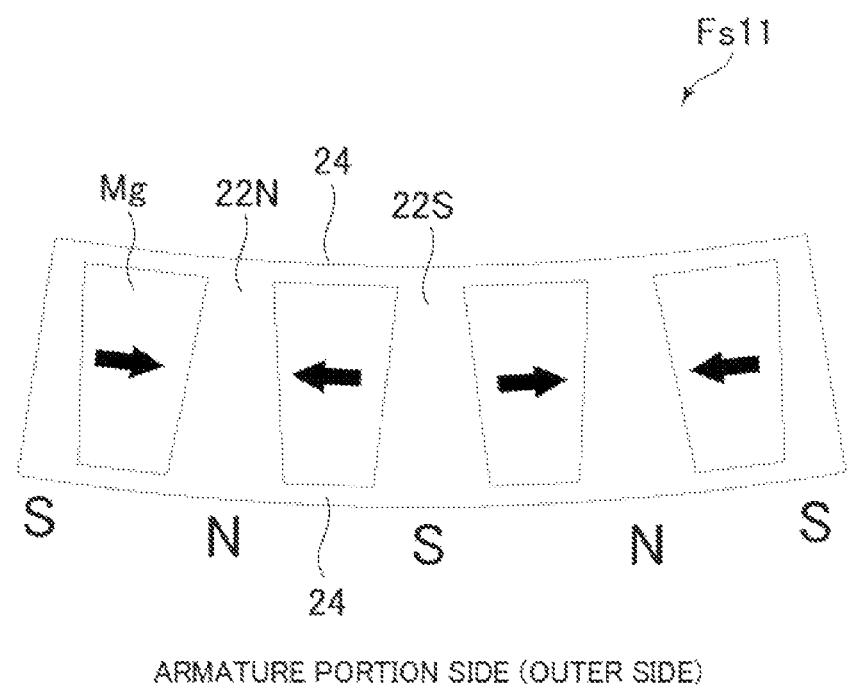
FIG. 40F is a cross sectional view of another example of a magnetic field portion including a coupling portion.
Figure 40G:
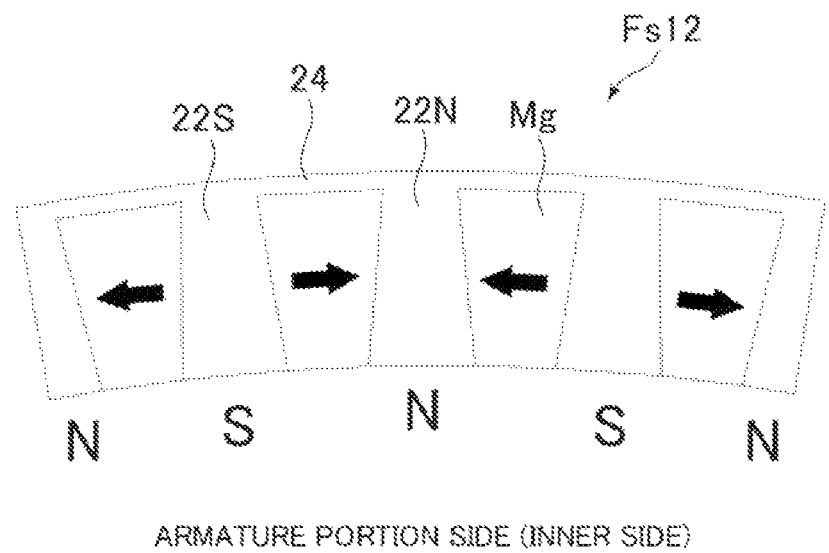
FIG. 40G is a cross sectional view of still another example of a magnetic field portion including a coupling portion.
Figure 40H:
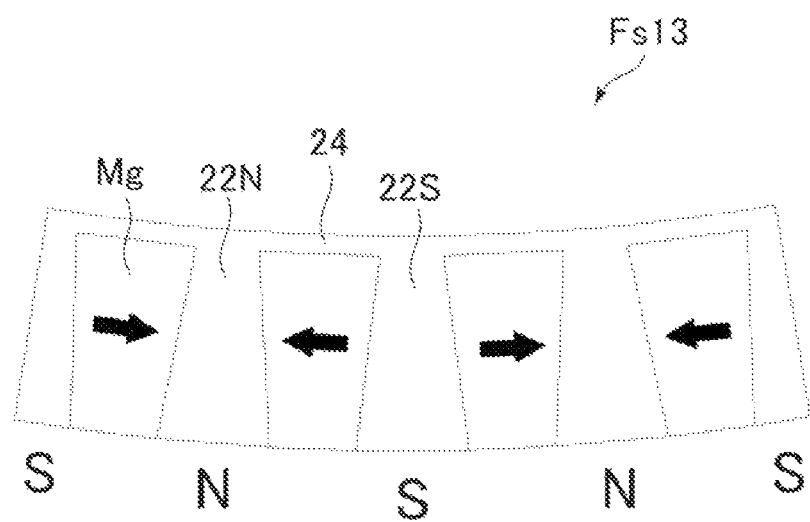
FIG. 40H is a cross sectional view of still another example of a magnetic field portion including a coupling portion.

In the example of FIG. 40E, the width of the magnet Mg (width in the rotation direction) is smaller in the surface facing inward of the magnetic field portion Fs9 than the surface facing outward. With this structure, it is possible to reduce the magnetic flux leaking to the opposite side of the armature portion. FIG. 40F is a magnetic field portion Fs11 disposed inside the armature, and the width of the magnet Mg (width in the rotation direction) may be larger in the surface facing inward of the magnetic field portion Fs11 than the surface facing outward. This can reduce the magnetic flux leaking to the opposite side of the armature portion.

In FIG. 40E, the magnetic field portion Fs9 has the coupling portion 24 on the inner and outer peripheries of the plurality of magnets Mg. Unlike this example, as the magnetic field portion Fs12 shown in FIG. 40G, the coupling portion 24 may be formed only on the outer periphery of the magnets Mg, and the inner peripheral surface of the magnets Mg (the surface facing the inside of the magnetic field portion Fs12) may be exposed. In this case, the armature core may be arranged inside the magnetic field portion Fs12. In contrast, as the magnetic field portion Fs13 shown in FIG. 40H, the coupling portion 24 may be formed only on the inner periphery of the magnets Mg, and the outer peripheral surface of the magnets Mg (the surface facing the outside of the magnetic field portion Fs13) may be exposed. In this case, the armature core may be arranged outside the magnetic field portion Fs13. This serves to reduce the magnetic flux for saturating the coupling portion 24, thereby improving the output torque of the rotary electric machine.

Figure 41:
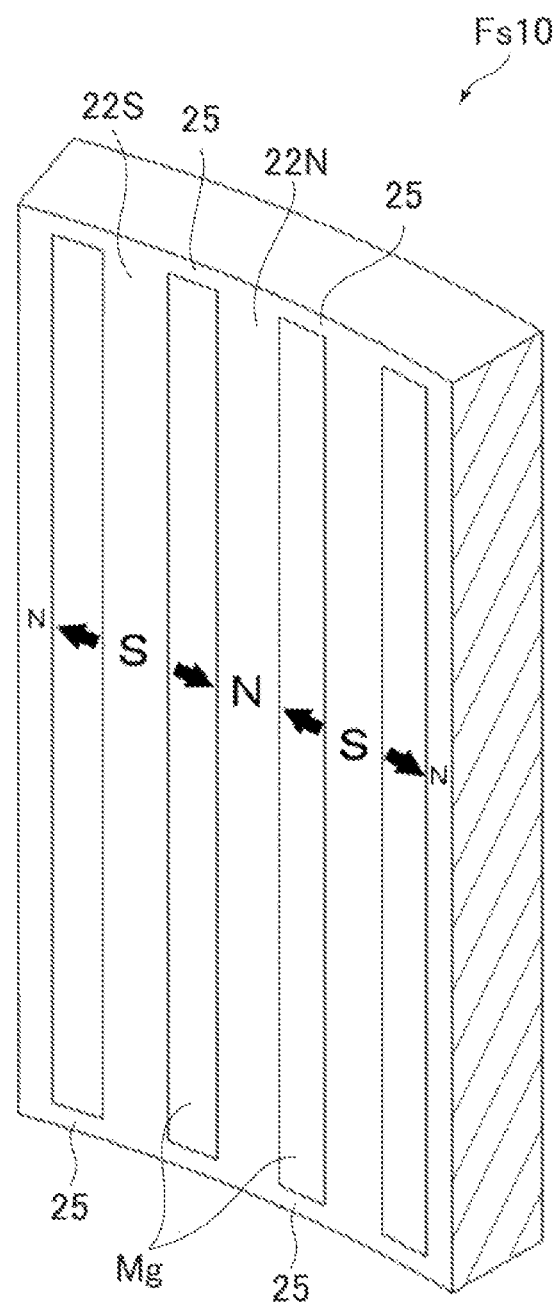
FIG. 41 is a perspective view of still another example of a magnetic field portion including a coupling portion.

As yet another example, as shown in FIG. 41, the magnetic field portion Fs10 has a coupling portion 25 for connecting adjacent magnetic field cores 22S and 22N in the upper surface and the lower surface of the plurality of magnets Mg (end surfaces of the rotary electric machine in the axis direction). The coupling portion 25 is formed thin, and the magnetic flux of the magnets Mg is saturated at the coupling portion 25. As such, the adjacent magnetic field cores 22N and 22S are magnetically separated substantially. As such, poles (N and S) of the magnetic field portion Fs10 are formed between adjacent magnets Mg. Such a magnetic field portion Fs10 is relatively easily obtained by forming a cylindrical member with a soft magnetic powder material in which an insertion hole is formed, and inserting the magnet Mg into the insertion hole. The coupling portion 25 may be formed only on one of the upper surface and the lower surface of the magnets Mg.

[Example of Magnetic Field Portion Formed of Electrical Steel Sheet]

The magnetic field cores 22N and 22S may be configured of electrical steel sheets substantially parallel to the axial direction and the radial direction. With this structure, for example, when the magnetic flux flows from one of two armature cores adjacent in the axis direction to the other armature core through the magnetic field portion, it is possible to prevent the generation of eddy currents caused by the magnetic flux.

Figure 42A:
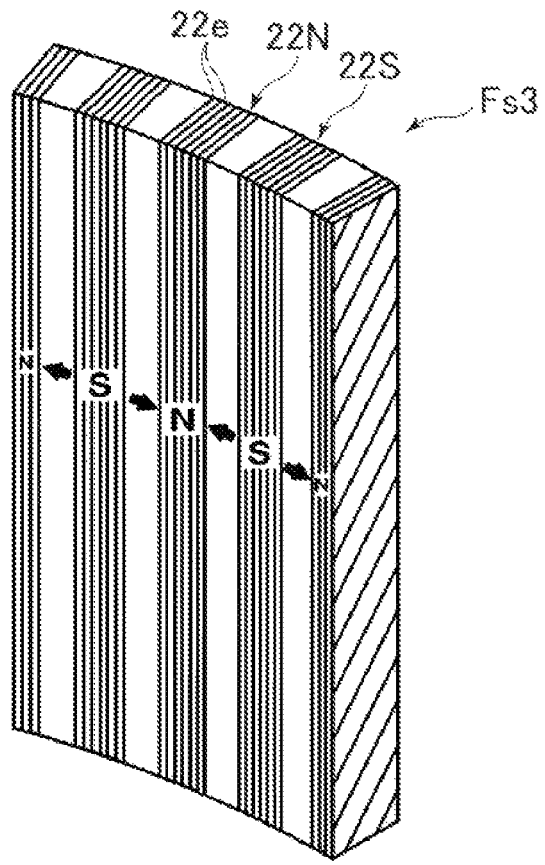
FIG. 42A is a perspective view of still another example of a magnetic field portion.
Figure 42B:
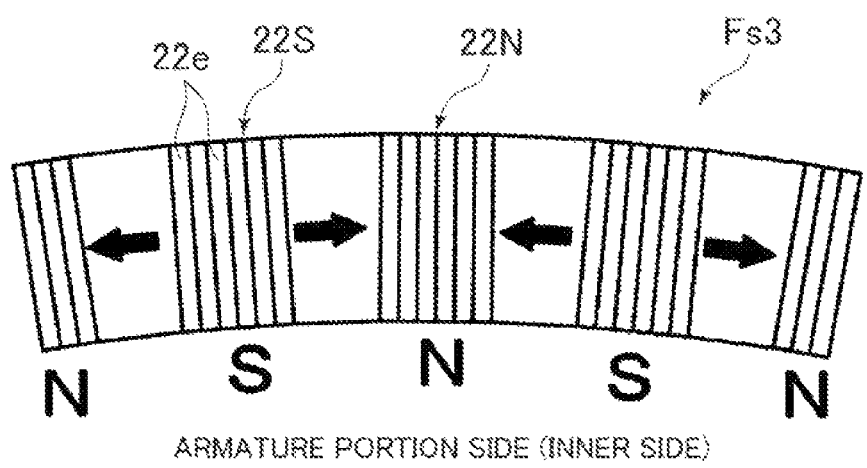
FIG. 42B is a cross sectional view of the magnetic field portion shown in FIG. 42A.

FIGS. 42A and 42B illustrate the magnetic field portion Fs3 having such a structure. As shown in FIGS. 42A and 42B, in the magnetic field portion Fs3, the magnetic field cores 22N and 22S are formed of lamination steel. That is, the magnetic field cores 22N and 22S are formed of a plurality of steel sheets 22e laminated in the rotation direction. Each steel sheet 22e is disposed substantially parallel to the axis direction and the radial direction of the rotary electric machine. The width of the steel sheet 22e (thickness of the steel sheet) in the rotation direction is the same in a plurality of steel sheets constituting the magnetic field cores 22N and 22S. On the other hand, each magnet Mg has a larger width in the surface of the magnetic field portion Fs3 facing outward than the surface of the magnetic field portion Fs3 facing inward (the surface facing the armature portion) (the magnetic field portion Fs3 is disposed on the outer side of the armature portion in the radial direction of the rotary electric machine). With such a shape of the magnet Mg, a cylindrical magnetic field portion Fs3 is formed using the steel sheets. The magnetic field cores 22N and 22S may be fixed to the surfaces of the magnets Mg by an adhesive, for example.

Figure 43:
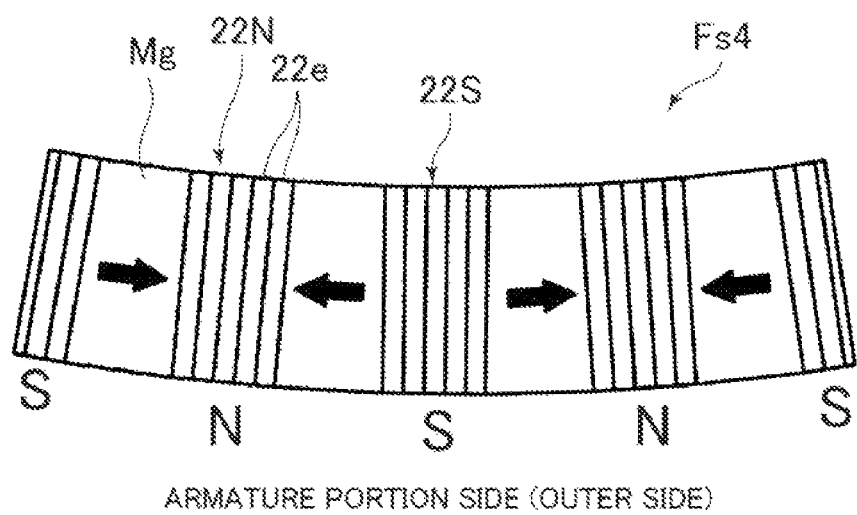
FIG. 43 is a cross sectional view of still another example of a magnetic field portion.

As shown in FIG. 43, the structures of the magnetic field portion Fs3 described above may be applied to the magnetic field portion Fs4 disposed inside the armature portion in the radial directions of the rotary electric machine. In the magnetic field portion Fs4, the magnetic field cores 22N and 22S are formed of lamination steel. Each of the magnets Mg has a larger width on the surface of the magnetic field portion Fs4 facing outward (surface facing the armature portion) than on the surface of the magnetic field portion Fs4 facing inward.

[Example of Partial Magnetic Field Core]

Figure 44:
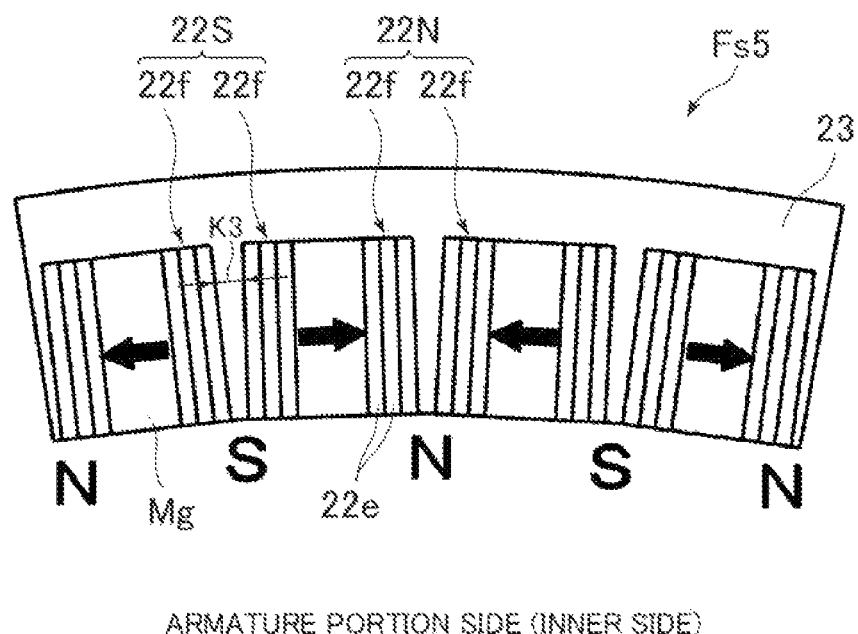
FIG. 44 is a cross sectional view of still another example of a magnetic field portion.

Each of the magnetic field cores 22N and 22S may be composed of a plurality of partial cores disposed between two adjacent magnets and spaced apart in the rotation direction. This reduces accumulation of errors in dimension for the magnetic field cores 22N and 22S and the magnets Mg, and improves the positional accuracy of the magnetic field cores 22N and 22S and the magnets Mg. FIG. 44 is a diagram illustrating a magnetic field portion Fs5 having such a structure. As shown in this drawing, each of the magnetic field cores 22N and 22S is composed of a plurality of partial magnetic field core 22f which are rotationally separated from each other. Specifically, each of magnetic field cores 22N and 22S is composed of two partial magnetic field cores 22f that are separated from each other in the rotation direction, and a gap K3 between the two partial magnetic field cores 22f is ensured. The magnetic field portion Fs5 is disposed on the outer side of the armature portion in the rotation direction. The widths of the magnet Mg and the partial magnetic field core 22f are constant in the radial direction, and the gap K3 is gradually increased toward the outer radial direction. This makes a cylindrical shape of the magnetic field portion Fs5 as a whole.

The gap K3 is filled with a non-magnetic and insulating material, for example. For example, the magnetic field cores 22N and 22S and the magnets Mg are fixed to each other by a fixing portion 23. The fixing portion 23 is formed of resin, for example. The gap K3 between the adjacent partial magnetic field cores 22f is filled with the fixing portion 23.

This structure serves to improve the positional accuracy of magnetic field cores 22N and 22S and the workability of the assembling the rotary electric machine. That is, when the number of poles of magnetic field portions is increased and the distance (mechanical angle) between the magnetic field cores 22N and 22S is reduced, the impact of the positional accuracy of the magnetic field cores 22N and 22S on the performance of rotary electric machine is increased. Further, when the number of parts is increased by the increased number of poles and the parts are fixed in close contact, the accumulated errors in dimension of the parts may occur and reduce the positional accuracy of the magnetic field cores. In contrast, in the structure of the magnetic field portion Fs5, each of the magnetic field cores 22N and 22S is composed of two partial magnetic field cores 22f and the gap K3 is provided between the two partial magnetic field cores 22f. This reduces the accumulation of errors in dimension, thereby improving the positional accuracy of magnetic field cores 22N and 22S and the magnets Mg. Further, the magnetic field portion Fs5 can be integrally handled during the assembly operation of the rotary electric machine, and thus workability of the assembly operation can be improved.

In the manufacturing process of magnetic field portion Fs5, for example, a plurality of magnets Mg and a plurality of partial magnetic field cores 22f are positioned by jigs or fixtures. Thereafter, the magnets Mg and the partial magnetic field cores 22f are molded with a non-magnetic and insulating material (specifically, resin may be used as the fixing portion 23) and fixed. At this time, all of the magnets Mg and partial magnetic field cores 22f may be positioned and molded with the fixing portion 23, or the magnetic field portion Fs5 may be divided into a plurality of parts and each part may be molded with the fixing portion 23. In this case, the parts, each of which is molded, are disposed in the rotation direction and fixed to one another to form an annular magnetic field portion Fs5. Each of the parts may be fixed to the fixing member to form the annular magnetic field portion Fs5.

The partial magnetic field cores 22f are disposed close to the surface of the magnet Mg (surfaces of N pole and S pole). For example, the partial magnetic field core 22f is in close contact with the surface of the magnet Mg (surfaces of N pole and S pole). The partial magnetic field core 22f may be fixed to the surfaces of the magnet Mg with an adhesive. There is no gap between the magnet Mg and the magnetic field cores 22N and 22S, and thus it is possible to prevent a decrease in magnetic force.

Each partial magnetic field core 22f is formed of lamination steel. That is, each partial magnetic field core 22f is formed of a plurality of steel sheets 22e laminated in the rotation direction. In the present specification, "a plurality of steel sheets 22e laminated in the rotation direction" means that the laminated direction includes a direction of the tangent line of the circle (the circle centered on the axis Ax1 of the rotary electric machine) at the position of the partial magnetic field core 22f. The width of the steel sheet 22e in the rotation direction (thickness of the steel sheet) is the same in the steel sheets 22e constituting the partial magnetic field core 22f. Each partial magnetic field core 22f may be formed of only one steel sheet.

Figure 45:
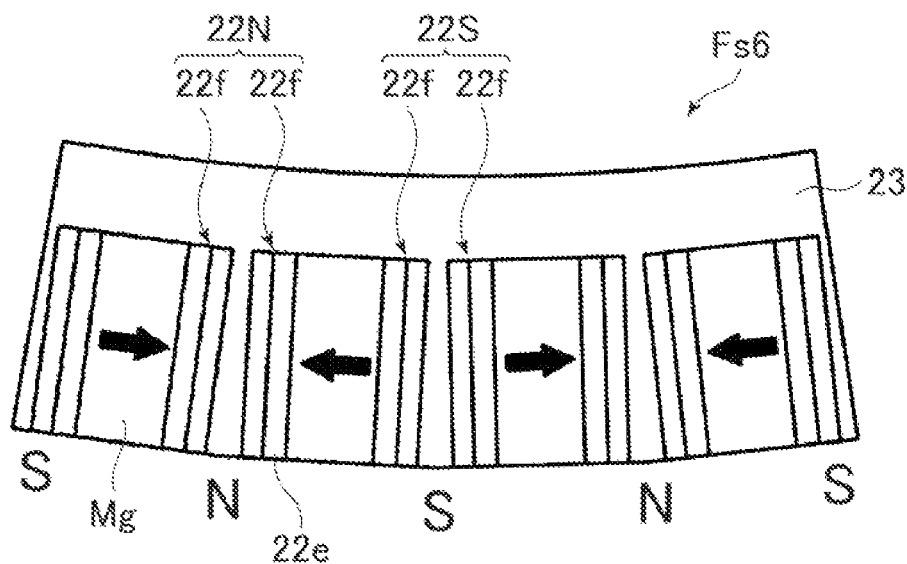
FIG. 45 is a cross sectional view of still another example of a magnetic field portion.

As shown in FIG. 45, the structures of the magnetic field portion Fs5 described above may be applied to the magnetic field portion Fs6 disposed inside the armature portion in the radial directions of the rotary electric machine. In the magnetic field portion Fs6, the magnetic field cores 22N and 22S are formed of lamination steel. Each of the magnetic field cores 22N and 22S is composed of two partial magnetic field cores 22f that are separated from each other in the rotation direction.

[Partial Magnetic Field Core Formed of Powder Material]

Figure 46:
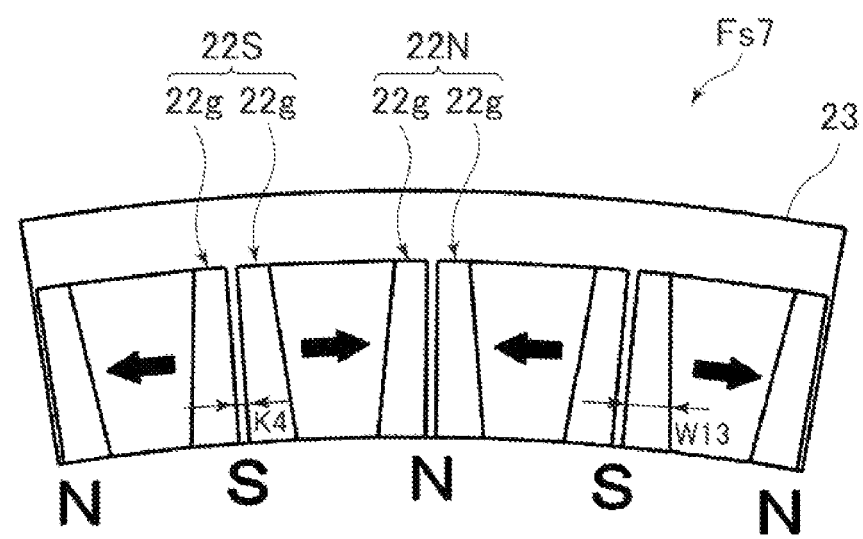
FIG. 46 is a cross sectional view of still another example of a magnetic field portion.

As shown in FIG. 46, the structure of the magnetic field portion Fs5 described above may be applied to a magnetic field portion Fs7 having the magnetic field cores 22N and 22S formed of a soft magnetic powder material. In the magnetic field portion Fs7, each of the magnetic field cores 22N and 22S has a plurality of partial magnetic field cores 22g formed of a soft magnetic powder material. Specifically, each of the magnetic field cores 22N and 22S is composed of two partial magnetic field cores 22g that are separated from each other in the rotation direction. A gap K4 is ensured between two partial magnetic field cores 22g. The magnetic field portion Fs7 is disposed on the outer side of the armature portion in the rotation direction. The gap K4 is filled with a non-magnetic and insulating material, for example. For example, the magnetic field cores 22N and 22S and the magnets Mg are molded with the resin, for the fixing portion 23, and the resin is filled in the gap K4. The partial magnetic field cores 22g are disposed close to the surface of the magnet Mg (surfaces of N pole and S pole). Each partial magnetic field core 22f may be fixed with an adhesive.

The partial magnetic field core 22g is made of a soft magnetic powder material, and is highly flexible in shape. In the magnetic field portion Fs7, each partial magnetic field core 22g has a larger width W13 on the surface of the magnetic field portion Fs7 facing inward than on the surface of the magnetic field portion Fs7 facing outward. On the other hand, each magnet Mg has a larger width on the surface of the magnetic field portion Fs7 facing outward than on the surface of the magnetic field portion Fs7 facing inward. Due to such shapes of the magnetic field cores 22N and 22S and the magnets Mg, the magnetic field portion Fs7 has a cylindrical shape as a whole. In the magnetic field portion Fs7, the gap K4 between the two partial magnetic field cores 22g is constant in the radial direction. This reduces the impact of the gap K4 formed between the partial magnetic field cores 22g.

Figure 47:
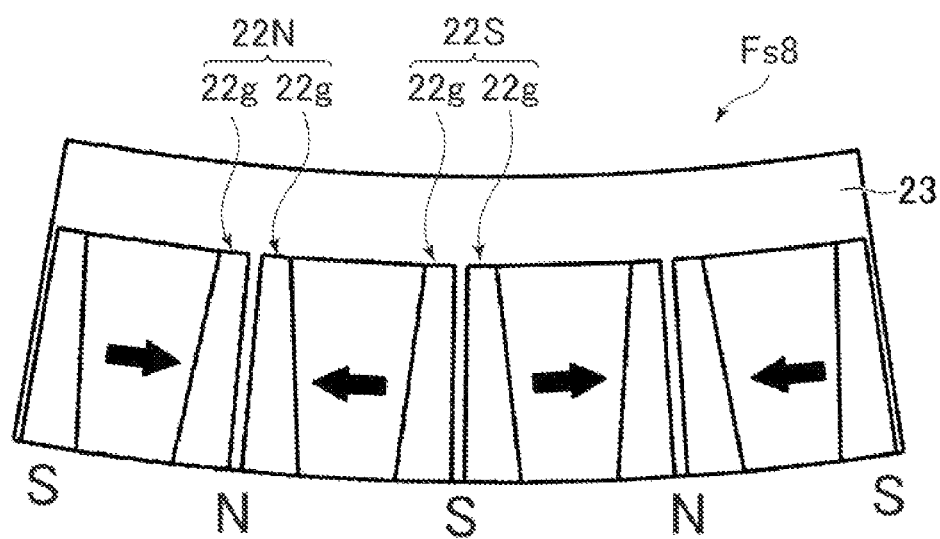
FIG. 47 is a cross sectional view of still another example of a magnetic field portion.

As shown in FIG. 47, the structures of the magnetic field portion Fs7 described above may be applied to the magnetic field portion Fs8 disposed inside the armature portion in the radial directions of the rotary electric machine. In the magnetic field portion Fs8, the partial magnetic field core 22g of the magnetic field cores 22N and 22S is formed of a soft magnetic powder material. In the magnetic field portion Fs8, each partial magnetic field core 22g has a larger width on the surface of the magnetic field portion Fs8 facing outward than on the surface of the magnetic field portion Fs8 facing inward.

[Linear Electric Machine]

Figure 48A:
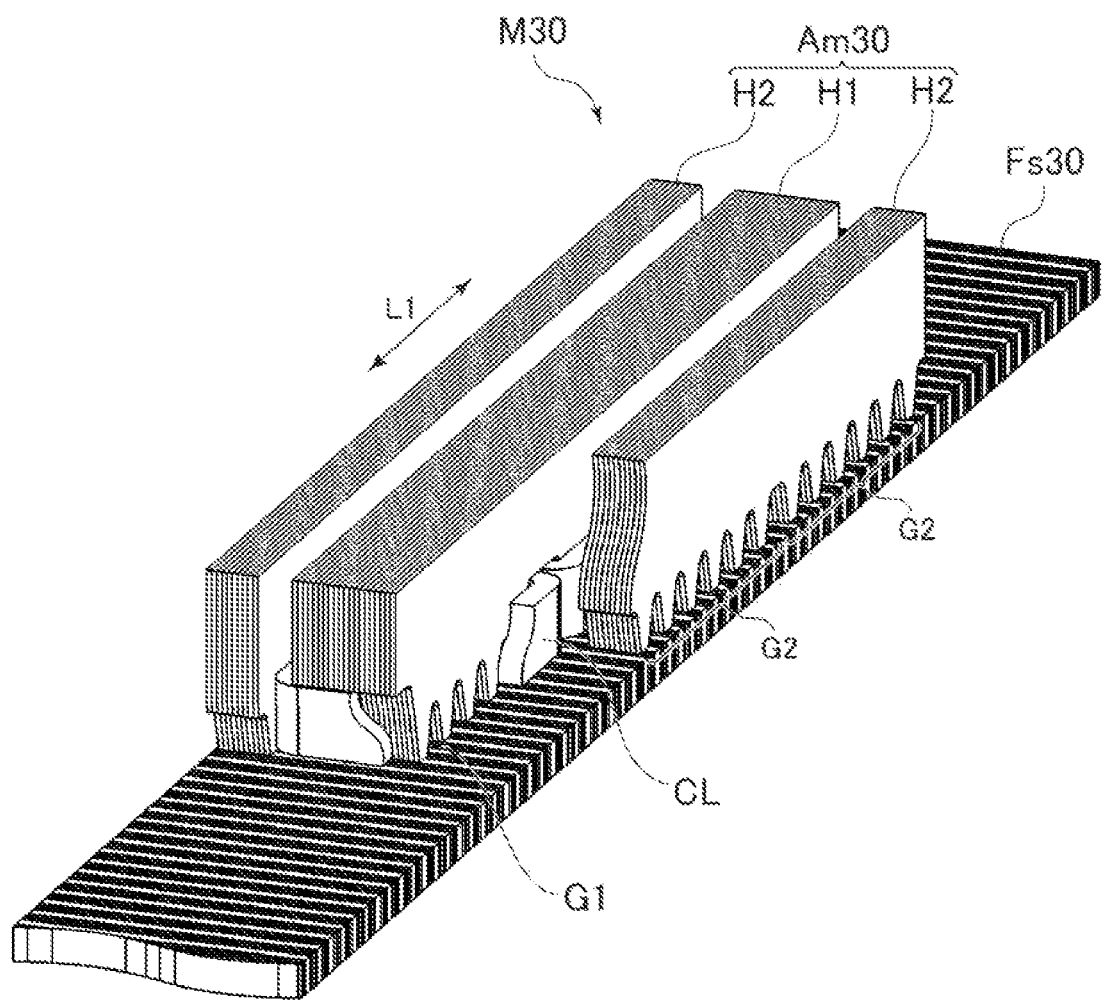
FIG. 48A is a perspective view of an example of a linear electric machine, which is one of electric machines proposed in this disclosure.
Figure 48B:
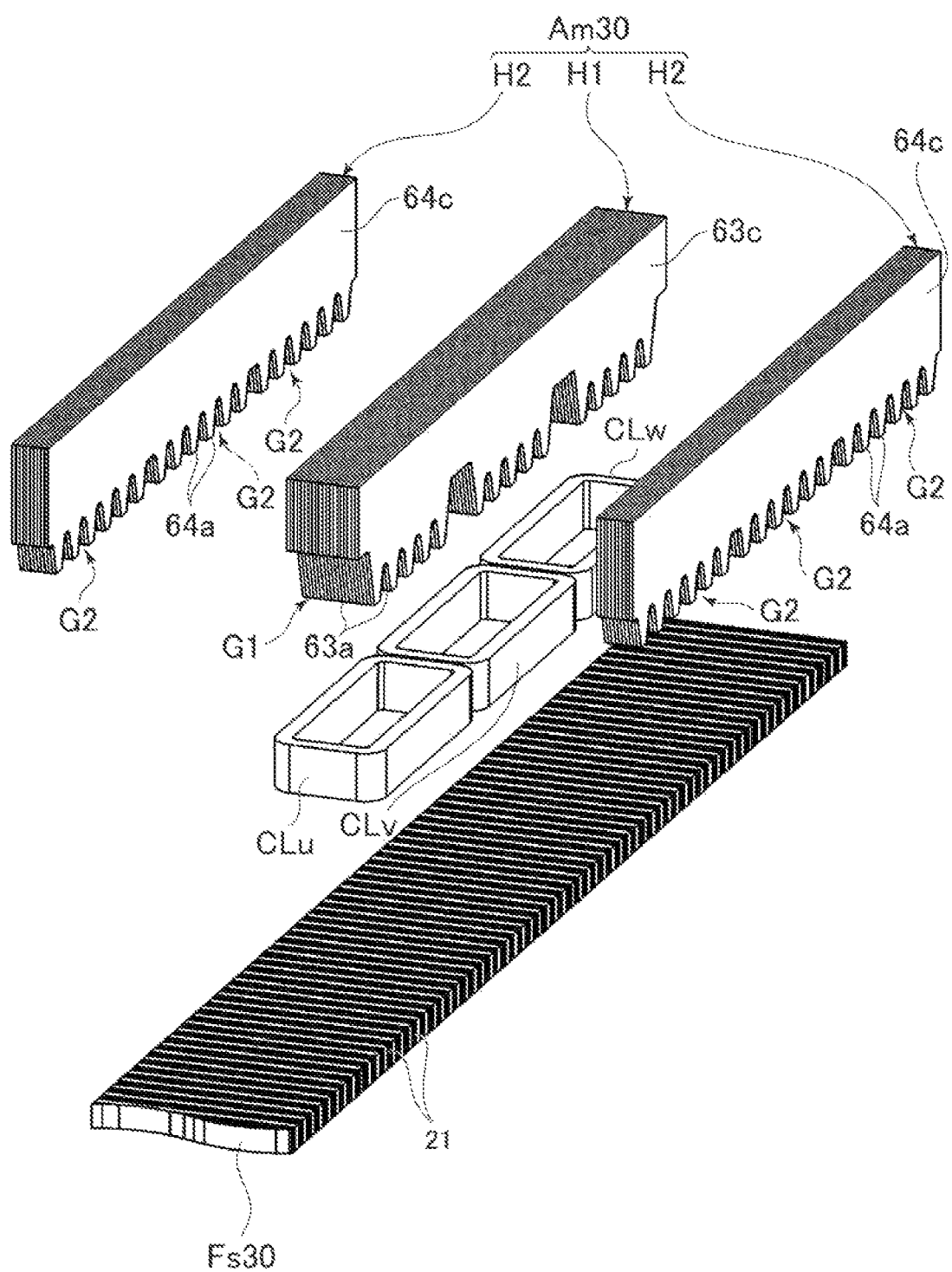
FIG. 48B is an exploded perspective view of the linear electric machine shown in FIG. 48A.

The structure of the electric machine proposed in the present disclosure may be applied to a linear electric machine in which an armature portion and a magnetic field portion are relatively movable in a direction along a straight line. FIGS. 48A and 48B are diagrams illustrating an example of the linear electric machine to which the structure proposed in the present disclosure is applied. FIG. 48A is a perspective view of a linear electric machine M30 and FIG. 48B is an exploded perspective view of the linear electric machine M30.

The linear electric machine M30 may also be applied with the armature core having a partial core, the armature core using a soft magnetic powder material, the armature core having two coils CL having different winding directions for each phase, the armature core having a projecting portion at the end of magnetic pole described above.

As shown in FIG. 48A, the linear electric machine M30 has a magnetic field portion Fs30 and an armature portion Am30. The magnetic field portion Fs30 and the armature portion Am30 are relatively movable in the direction along the straight line L1 (in the following, the direction along the straight line L1 is referred to as "machine moving direction"). For example, the magnetic field portion Fs30 is fixed to a structure of a device on which the linear electric machine M30 is mounted, and the armature portion Am30 is guided so as to move along the machine moving direction. In this case, the magnetic field portion Fs30 has a length corresponding to the movable range of the armature portion Am30. In contrast, the armature portion Am30 may be fixed to the structure of the device on which the linear electric machine M30 is mounted, and the magnetic field portion Fs30 may be guided to move in the direction along the straight line.

The armature portion Am30 has a plurality of armature cores H1 and H2 arranged in a direction perpendicular to the machine moving direction (in the following, the direction perpendicular to the machine moving direction is referred to as a "cross direction"). As shown in FIG. 48A, the armature portion Am30 includes, for example, a first armature core H1 and two second armature cores H2. The first armature core H1 is disposed between the two second armature cores H2. The number of armature cores constituting the armature portion Am30 is not limited as shown in FIG. 48A. Similarly to the rotary electric machine M3 shown in FIG. 12A, the armature portion Am30 may be composed of, for example, one first armature core H1 and one second armature core H2. The armature cores H1 and H2 are composed of lamination steel in which a plurality of electrical steel sheets are overlapped in the cross direction, for example.

As shown in FIG. 48B, the first armature cores H1 have a plurality of magnetic pole groups G1 arranged in the machine moving direction, and each of the magnetic pole groups G1 includes a plurality of magnetic poles 63a arranged in the machine moving direction. The second armature cores H2 also have a plurality of magnetic pole groups G2 arranged in the machine moving direction. Each of the magnetic pole groups G2 includes a plurality of magnetic poles 64a arranged in the machine moving direction.

As shown in FIG. 48B, the first armature core H1 has a yoke portion 63c extending in the machine moving direction. The second armature core H2 has a yoke portion 64c extending in the machine moving direction. The plurality of magnetic poles 63a and 64a project from the yoke portions 63c and 64c toward the magnetic field portion Fs30.

A coil CL is provided in the first armature core H1. The coil CL is disposed so that the magnetic flux flowing through two magnetic pole groups G1 passes through the inside of the coil CL. In the example of FIG. 48B, the coils CL are wound around the magnetic poles 63a constituting the magnetic pole groups G1.

The linear electric machine is, for example, a linear motor driven by a three-phase AC, and a U phase coil CLu, a V phase coil CLv, and a W phase coil CLw are provided in the first armature core H1. These three coils CL are respectively provided in the three magnetic pole groups G1. The number of phases of the alternating current supplied to the linear electric machine is not limited to three.

The magnetic pole group G2 of the second armature core H2 is positioned in the cross direction to the magnetic pole group G1 of the first armature core H1, and constitutes a magnetic pole group pair P together with the magnetic pole group G1. The positional relationship between the magnetic poles 63a constituting the magnetic pole group G1 and the magnetic poles 64a constituting the magnetic pole group G2 may be the same as the relationship with the magnetic poles 33a and 34a of the rotary electric machine M1, for example. That is, the positions of the magnetic poles 63a of the magnetic pole group G1 are separated from the positions of the magnetic poles 64a of the magnetic pole group G2 by 180 degrees in electrical angle, for example. When a distance between two adjacent magnetic field cores 22N (or 22S) having the same polarity is 360 degrees, "electrical angle" is a distance expressed based on the angle between the two magnetic field cores 22N (or 22S).

As another example, as shown in FIG. 8B from FIG. 6A, the distance between the magnetic poles 63a of the magnetic pole group G1 and the magnetic poles 64a of the magnetic pole group G2 in the rotation direction may be deviated from 180 degrees in electrical angle or may be changed in accordance with the position within the magnetic pole groups G1 and G2, for example. The widths of each of the magnetic poles 63a and 64a in the machine moving direction may be constant in the magnetic pole groups G1 and G2 or may vary depending on the position within the magnetic pole groups G1 and G2.

Figure 48C:
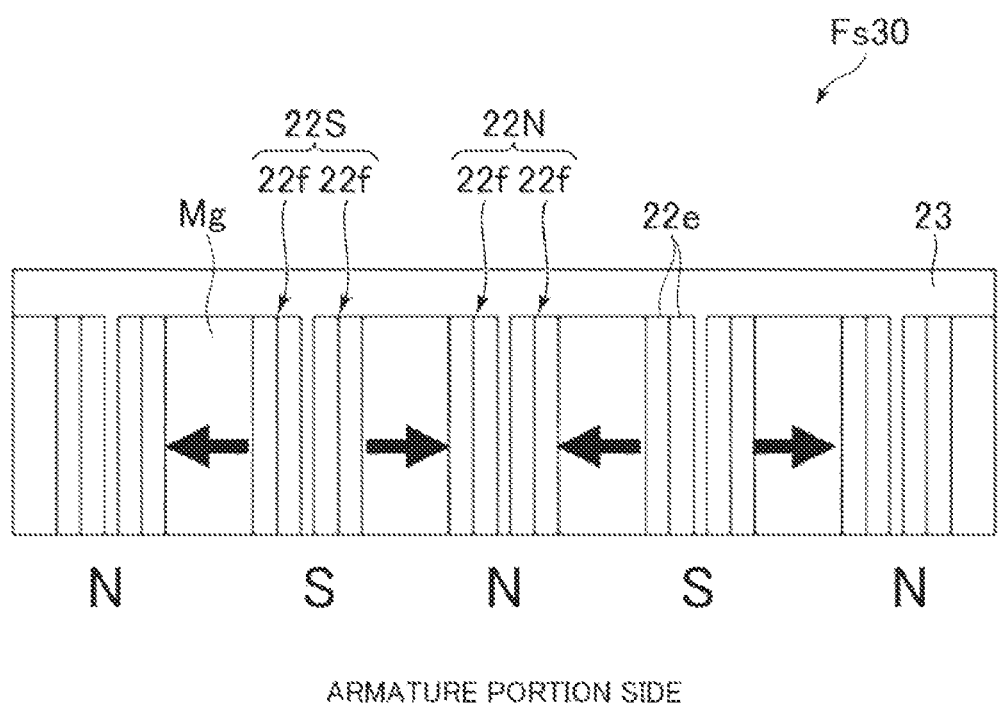
FIG. 48C is an example of a cross sectional view of a magnetic field portion of the linear electric machine.

As shown in FIG. 48C, the magnetic field portion Fs30 has a plurality of magnets Mg arranged in the machine moving direction. The magnets Mg are magnetized in the machine moving direction. In the magnetic field portion Fs30, the magnets Mg are arranged so that the surfaces of the same polarity (magnetic pole surfaces) face each other similarly to the magnetic field portion Fs of the rotary electric machine M1, for example. The magnetic field cores 22N and 22S are disposed between the two adjacent magnets Mg. Each of the magnetic field cores 22N and 22S may be constituted by partial magnetic field cores 22f separated in the machine moving direction. The partial magnetic field core 22f may be formed of lamination steel or a soft magnetic powder material.

As shown in FIG. 48C, the magnetic field portion Fs30 may have a fixing portion 23 for fixing the magnetic field cores 22N and 22S and the magnets Mg. As described above, the fixing portion 23 may be filled in the gap between the adjacent partial magnetic field cores 22f. The fixing portion 23 is formed of resin, for example.

The two magnetic pole group G1 adjacent in the machine moving direction are magnetically connected to each other via the yoke portion 64c. Further, the two magnetic pole groups G2 adjacent in the machine moving direction are magnetically connected to each other via the yoke portion 63c. On the other hand, the first armature core H1 and the second armature core H2 are magnetically separated from each other. The armature portion Am30 may also be molded with resin. In this case, the resin for molding the armature cores H1 and H2 may be filled in the gap between the first armature core H1 and the second armature core H2.

Accordingly, in the linear electric machine M30 as well, similarly to the rotary electric machine M1 described above, the magnetic flux formed by the magnets Mg flows between the two magnetic pole groups G1 and between the two magnetic pole groups G2, and flows between the magnetic pole groups G1 and the magnetic pole groups G2 through the magnetic field cores 22N and 22S. When flowing through the two magnetic pole groups G1, the magnetic flux passes inside the coils CL.

According to such a linear electric machine M30, the armature cores H1 and H2 are not needed to be magnetically divided in the machine moving direction. This increases the strength of the armature cores H1 and H2. Further, the structures of the armature cores H1 and H2 can be simplified, and thus the accuracy of assembling the linear electric machine can be improved. The simplification of the structure serves to increase the freedom in selecting materials, for example, using only electrical steel sheets or a powder material. In the linear electric machine M30, the entire armature cores H1 and H2 are formed of lamination steel.

[Axial Gap Type]

Figure 49A:
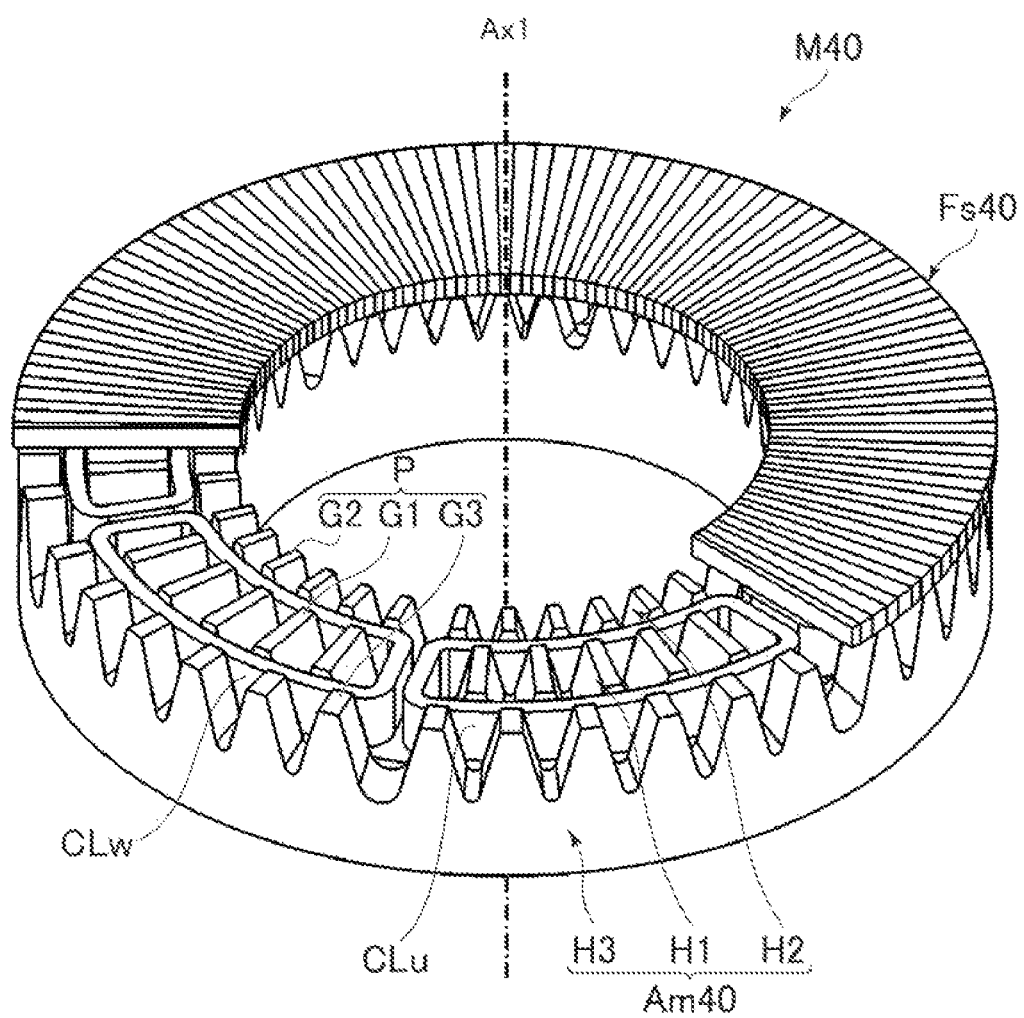
FIG. 49A is a perspective view of an example of an axial gap type rotary electric machine, which is one of electric machines proposed in this disclosure.
Figure 49B:
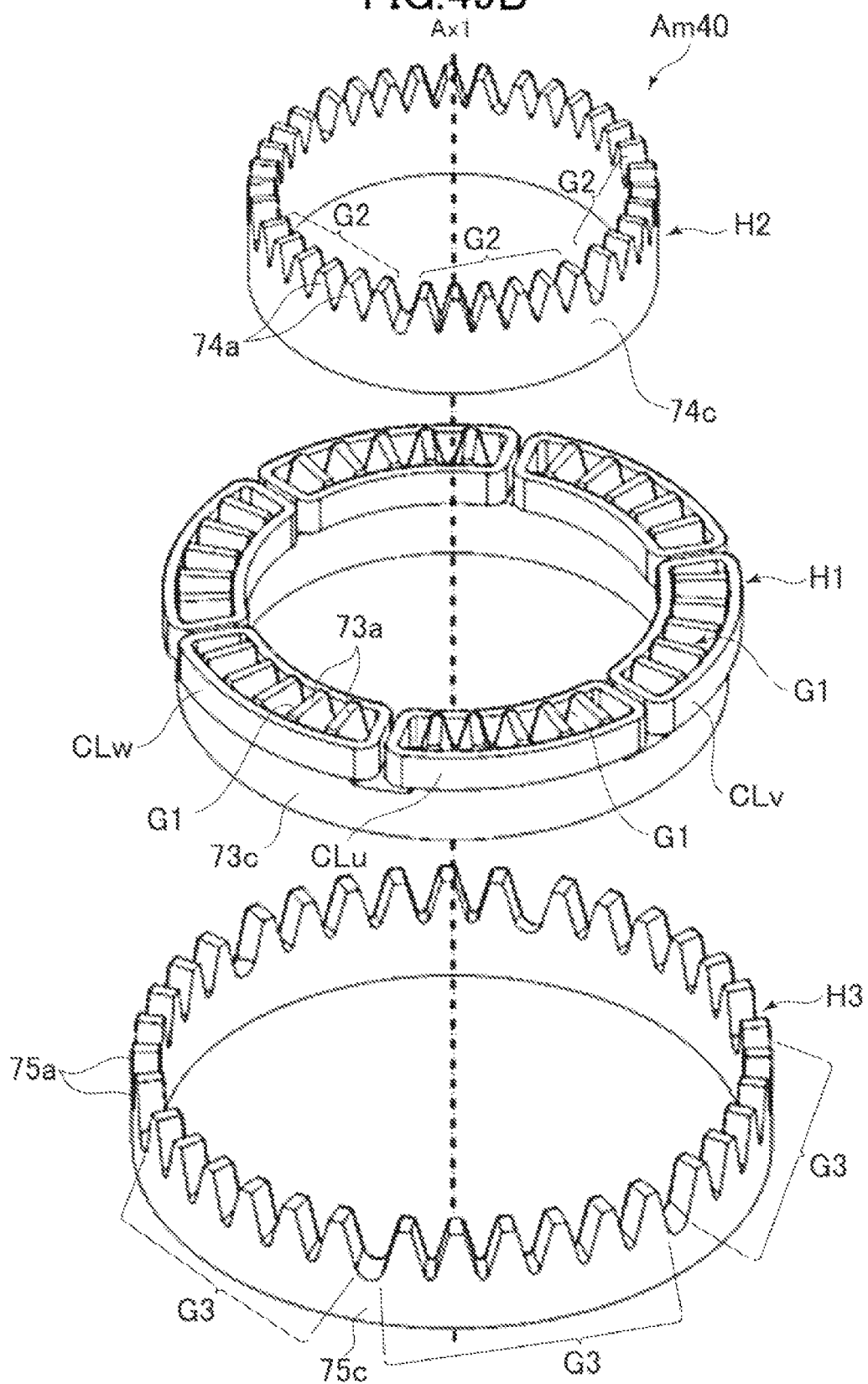
FIG. 49B is an exploded perspective view of the armature portion of the rotary electric machine shown in FIG. 49A.
Figure 49C:
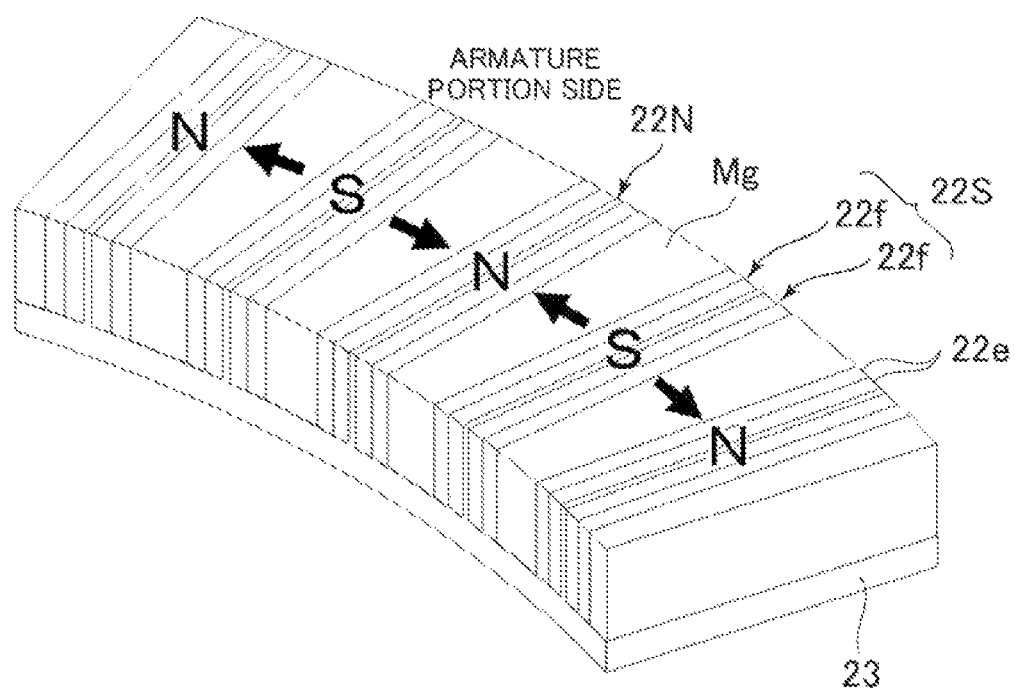
FIG. 49C is a perspective view of a magnetic field portion of the rotary electric machine shown in FIG. 49A.

The structures of the electric machine proposed in the present disclosure may be applied to a so-called axial gap type rotary electric machine in which a magnetic field portion and an armature portion face each other in the axis direction. FIGS. 49A and 49B are diagrams showing an axial gap type rotary electric machine M40 to which the structures proposed in the present disclosure are applied. FIG. 49A is a perspective view of the rotary electric machine M40, and a part of the magnetic field portion Fs40 in the rotation direction is not shown. FIG. 49B is an exploded perspective view of an armature portion Am40 of the rotary electric machine M40. FIG. 49C is an enlarged perspective view of the magnetic field portion Fs40 of the rotary electric machine M40.

The rotary electric machine M40 may also be applied with the armature core having a partial core, the armature core formed of lamination steel, the armature core having two coils CL having different winding directions for each phase, the armature core having a projecting portion at the end of magnetic pole described above.

As shown in FIG. 49A, the rotary electric machine M40 has a magnetic field portion Fs40 and an armature portion Am40. The magnetic field portion Fs40 and the armature portion Am40 are relatively movable in the rotation directions about the axis Ax1. For example, the armature portion Am40 is fixed to the structure of the device on which the rotary electric machine M40 is mounted, and the magnetic field portion Fs40 is guided to move in the rotation direction. In contrast, the magnetic field portion Fs40 may be fixed to the structure of the device on which the rotary electric machine M40 is mounted, and the armature portion Am40 may be guided to move in the rotation direction.

As shown in FIG. 49A, the armature portion Am40 has a plurality of armature cores H1, H2, and H3 disposed in the axis direction. The armature cores H1, H2, and H3 are annular and arranged in concentric circles. As shown in FIG. 49A, the armature portion Am40 includes, for example, a first armature core H1, a second armature core H2, and a third armature core H3. The first armature core H1 is disposed between the second armature core H2 and the third armature core H3.

As shown in FIG. 49B, the first armature core H1 has a plurality of magnetic pole groups G1 arranged in the rotation direction. Each of the magnetic pole groups G1 has a plurality of magnetic poles 73a arranged in the rotation direction. The second armature core H2 and the third armature core H3 also respectively have a plurality of magnetic pole groups G2 and G3 arranged in the rotation direction. The magnetic pole group G2 of the second armature core H2 has a plurality of magnetic poles 74a arranged in the rotation direction, and the magnetic pole group G3 of the third armature core H3 has a plurality of magnetic poles 75a arranged in the rotation direction. The magnetic poles 73a, 74a, and 75a are convex portions projecting toward the magnetic field portion Fs40. As shown in FIG. 49B, the three armature cores H1, H2, and H3 respectively have annular yoke portions 73c, 74c, and 75c extending in the rotation direction. The magnetic poles 73a, 74a, and 75a project from the yoke portions 73c, 74c, and 75c toward the magnetic field portion Fs40. The armature cores H1, H2 and H3 may be formed of, for example, a soft magnetic powder material.

A coil CL is provided in the first armature core H1. In the example shown in FIG. 49B, the coils CL are wound around the magnetic poles 73a forming the magnetic pole group G1. The coil CL may be positioned between two magnetic pole groups G1 adjacent in the rotation direction and wound on the yoke portion 73c. The rotary electric machine M40 is, for example, a linear motor driven by a three-phase AC, and a U phase coil CLu, a V phase coil CLv, and a W phase coil CLw are provided in the first armature core H1.

As shown in FIG. 49A, the magnetic pole group G2 of the second armature core H2 is radially located with respect to the magnetic pole group G1 of the first armature core H1, and forms a magnetic pole group pair P together with the magnetic pole group G1. The magnetic pole group G3 of the third armature core H3 is also radially located with respect to the magnetic pole group G1 of the first armature core H1, and forms a magnetic pole group pair P together with the magnetic pole group G1. In the example of the armature portion Am40, the magnetic pole group G1 is located between the magnetic pole group G2 and the magnetic pole group G3. The positional relationship between the magnetic poles 73a constituting the magnetic pole group G1 and the magnetic poles 74a and 75a constituting the magnetic pole groups G2 and G3 may be the same as the relationship with the magnetic poles 33a and 34a of the rotary electric machine M1, for example. That is, the positions of the magnetic poles 74a of the magnetic pole group G2 and the positions of magnetic poles 75a of the magnetic pole group G3 are separated from the positions of the magnetic poles 73a of the magnetic pole group G1 by 180 degrees in electrical angle, for example.

The magnetic field portion Fs40 has a plurality of magnets Mg arranged in the rotation direction. The magnets Mg are magnetized in the rotation direction. In the magnetic field portion Fs40, the magnets Mg are arranged so that the surfaces of the same polarity (magnetic pole surfaces) face each other similarly to the magnetic field portion Fs40 of the rotary electric machine M1, for example. The magnetic field portion Fs40 has magnetic field cores 22N and 22S between two adjacent magnets Mg.

In each of the armature cores H1, H2, and H3, two magnetic pole groups G1, two magnetic pole groups G2, and two magnetic pole groups G3 each adjacent in the rotation directions are magnetically connected through the yoke portions 73c, 74c, and 75c. On the other hand, the first armature core H1, the second armature core H2, and the third armature core H3 are magnetically separated. As such, the magnetic flux formed by the magnets Mg flows between the two magnetic pole groups G1 in the first armature core H1 and between the two magnetic pole groups G2 in the second armature core H2, and flows between the magnetic pole groups G1 and the magnetic pole groups G2 via the magnetic field cores 22N and 22S. Further, the magnetic flux formed by the magnets Mg flows between the two magnetic pole groups G1 in the first armature core H1 and between the two magnetic pole groups G3 in the third armature core H3, and flows between the magnetic pole groups G1 and the magnetic pole groups G3 via the magnetic field cores 22N and 22S. When flowing through the two magnetic pole groups G1 provided in the first armature core H1, the magnetic flux passes inside the coils CL.

The rotary electric machine M40 using such a magnetic circuit does not need to magnetically divide the armature cores H1, H2, and H3 in the rotation direction. This serves to increase the strength of the armature cores H1, H2, and H3. Further, the structures of the armature cores H1, H2, and H3 can be simplified, which serves to increase accuracy of assembling the rotary electric machine.

As shown in FIG. 49C, the magnetic field portion Fs40 has a plurality of magnets Mg arranged in the rotation direction. The magnetic field cores 22N and 22S are disposed between two adjacent magnets Mg. Each of the magnetic field cores 22N and 22S may be constituted by partial magnetic field cores 22f separated in the rotation direction. The partial magnetic field core 22f may be formed of lamination steel or a soft magnetic powder material. The magnetic field portion Fs40 may have a fixing portion 23 for mutually connecting the magnets Mg and the magnetic field cores 22N and 22S. The fixing portion 23 may be formed on the side opposite to the armature cores H1, H2, and H3, for example. In the magnetic field portion Fs40, the width of the magnet Mg in the rotation direction may be gradually increased toward the radial direction. With this structure, the shape of magnetic pole of the armature cores H1, H2, H3 can be matched with the shape of the magnet Mg.

[Magnetic Field Portion Disposed Between Two Armature Portions]

Figure 50A:
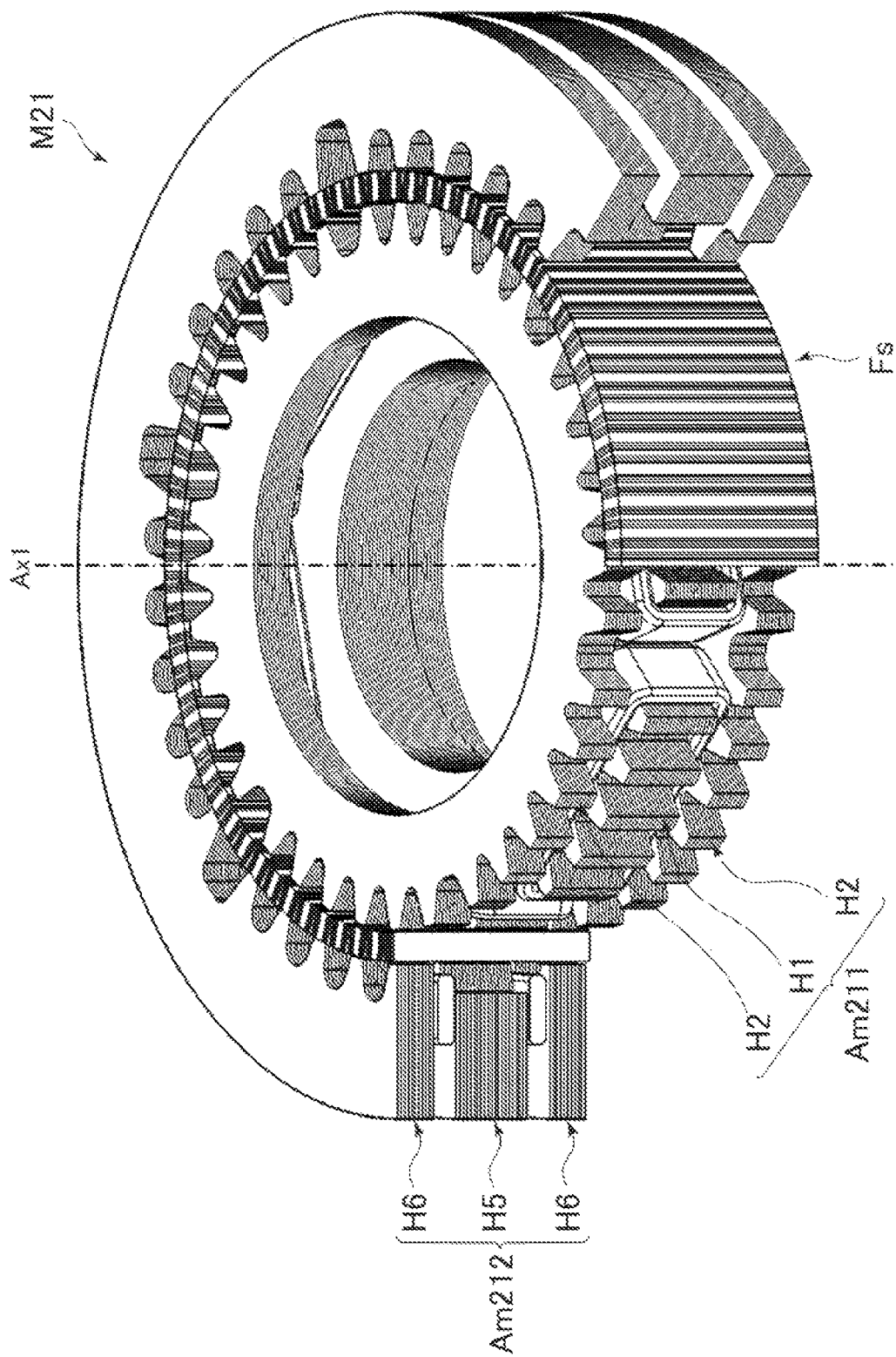
FIG. 50A is a perspective view of still another example of a rotary electric machine.
Figure 50B:
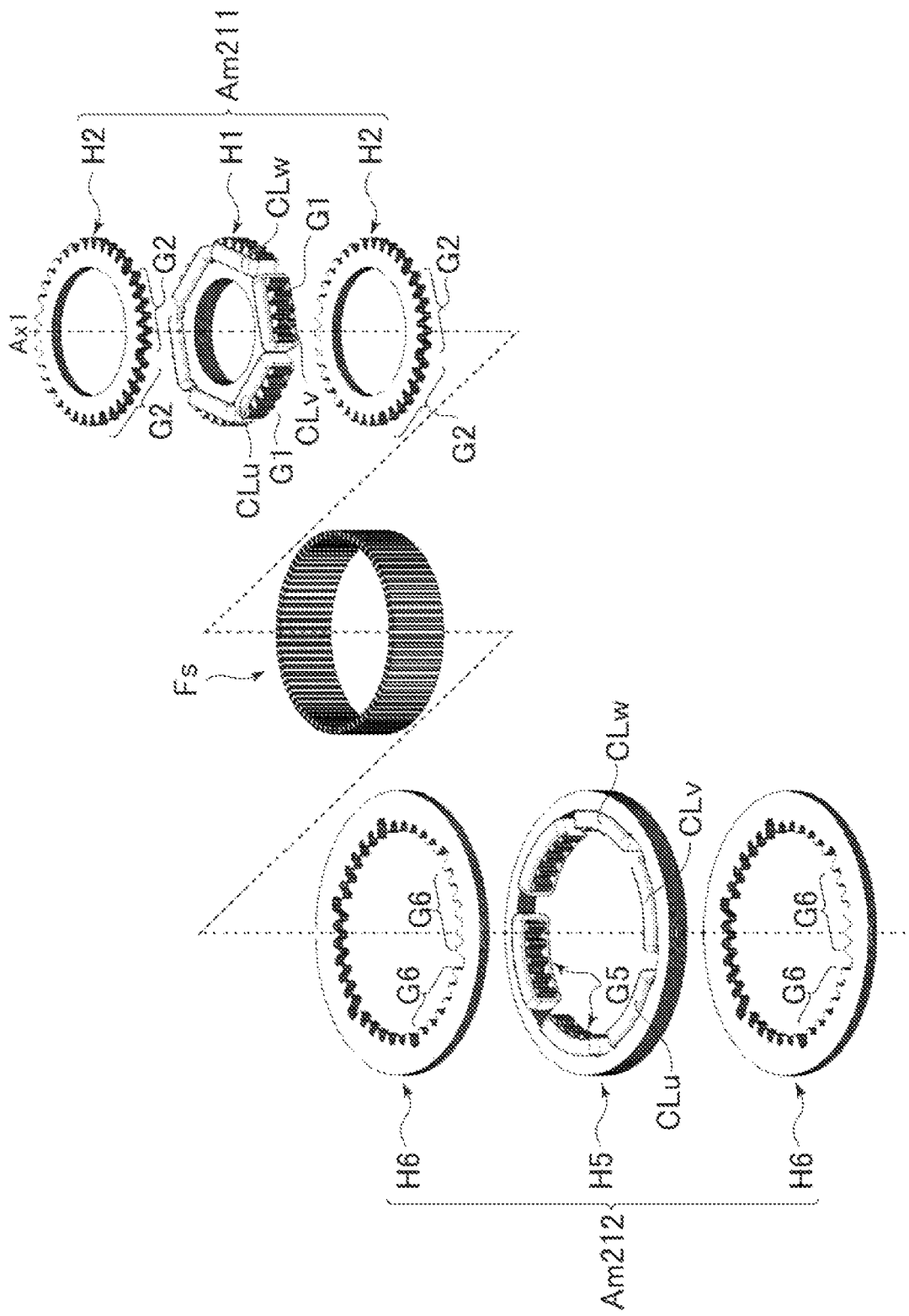
FIG. 50B is an exploded perspective view of the rotary electric machine shown in FIG. 50A.

The electric machine may include two opposing armature portions and a magnetic field portion disposed between the two armature portions. FIGS. 50A and 50B are diagrams illustrating a rotary electric machine M21, which is an example of the electric machine having such a structure. FIG. 50A is a perspective view of the rotary electric machine M21, and a part of the armature portion Am212 in the rotation direction and a part of the magnetic field portion Fs in the rotation direction are not shown. FIG. 50B is an exploded perspective view of the rotary electric machine M21.

As shown in FIG. 50A, the rotary electric machine M21 has an outer armature portion Am212 and an inner armature portion Am211. The inner armature portion Am211 is disposed inside the outer armature portion Am212, and the two armature portions Am211 and Am212 face each other in the radial direction of the rotary electric machine M21. The magnetic field portion Fs is disposed between the two armature portions Am211 and Am212 and is rotatable relative to the armature portions Am211 and Am212 in the rotation direction. With such a structure, it is possible to reduce the leakage magnetic flux of the magnets Mg provided in the magnetic field portion Fs and increase the efficiency in using the magnets Mg. The two armature portions Am211 and Am212 are fixed to each other via a structure (not shown). For example, the armature portions Am211 and Am212 are fixed to a common structure disposed above or below the armature portions Am211 and Am212 in their axis direction (e.g., a frame of the device on which the rotary electric machine M21 is mounted).

Similarly to the magnetic field portion Fs1 described with reference to FIG. 40A, the magnetic field portion Fs includes magnets Mg and magnetic field cores 22N and 22S. Preferably, the magnetic field cores 22N and 22S are exposed on the inner peripheral surface and the outer peripheral surface of the magnetic field portion Fs. That is, the inner and outer peripheral surfaces of the magnetic field cores 22N and 22S are preferably not covered with, for example, resin that holds the magnetic field cores 22N and 22S and the magnets Mg. The magnets Mg may also be exposed in the inner peripheral surface and the outer peripheral surface of the magnetic field portion Fs. In a case where the magnetic field portion Fs functions as a rotor, a structure to be driven may be fixed to the end of magnetic field portion Fs in the axis direction.

The inner armature portion Am211 is the same as the armature portion Am1 described referring to FIG. 1A, for example. That is, as shown in FIG. 50B, the inner armature portion Am211 has one first armature core H1 and two second armature cores H2. The armature cores H1 and H2 have a plurality of magnetic pole groups G1 and G2 in the rotation direction. Coils are respectively provided on the magnetic pole groups G1 of the first armature core H1.

As shown in FIG. 50B, similarly to the inner armature portion Am211, the outer armature portion Am212 has one first armature core H5 and two second armature cores H6. The first armature core H5 is disposed between the two second armature cores H6. The armature cores H5 and H6 have a plurality of magnetic pole groups G5 and G6 arranged in the rotation direction. Coils CL are provided on the magnetic pole groups G5 of the first armature core H5.

The magnetic pole groups G5 are radially opposed to the magnetic pole groups G1 of the inner armature portion Am211 and the magnetic pole group G6 are radially opposed to the magnetic pole groups G2 of the inner armature portion Am211. In the example of the rotary electric machine M21, the angle positions and the number of magnetic pole groups G5 provided on the outer armature portion Am212 and the angle positions and the number of magnetic poles provided on the magnetic pole groups G5 are the same as those of the magnetic pole groups G1 provided on the inner armature portion Am211 and the magnetic poles provided on the magnetic pole groups G1. Further, the angle positions and the number of magnetic pole groups G6 provided on the outer armature portion Am212 and the angle positions and the number of magnetic poles provided on the magnetic pole groups G6 are the same as those of the magnetic pole groups G2 provided on the inner armature portion Am211 and the magnetic poles provided on the magnetic pole groups G2.

The magnetic pole group pair P of the inner armature portion Am211 on which the U phase coil CLu is provided (i.e. the pair of magnetic pole groups G1 and G2 constituting the common magnetic circuit) radially faces the magnetic pole group pair P of the outer armature portion Am212 on which the U phase coil CLu is provided. The same applies to coils CL of the other phases (V phase, W phase). That is, the inner armature portion Am211 and the outer armature portion Am212 are arranged such that magnetic pole group pairs P in which the coils CL of the same phase (U phase, V phase, W phase) are provided radially face each other. As such, when the two armature portions Am211 and Am212 are viewed from the magnetic field portion Fs, the winding direction (e.g., clockwise) of the coil CL provided on the inner armature portion Am211 is the same as the winding direction (e.g., clockwise) of the coil CL provided on the outer armature portion Am212.

The magnetic pole group pair P of the inner armature portion Am211 provided with the U phase coil CLu may be shifted in the rotation direction from the magnetic pole group pair P of the outer armature portion Am212 provided with the U phase coil CLu. In this case, when attention is paid to the magnetic pole groups G1 and G5 of the same phase respectively provided to the inner armature portion Am211 and the outer armature portion Am212, the polarity (S-pole/N-pole) of the magnetic field core of the magnetic field portion Fs facing the magnetic pole group G1 of the inner armature portion Am211 may be the same as the polarity of the magnetic field core of the magnetic field portion Fs facing the magnetic pole group G5 of the outer armature portion Am212. In this manner, even if the positions of the magnetic pole group pairs P in which the same phase of the coils CL are provided are shifted in the rotation direction, the rotation of the magnetic field portion Fs is allowed.

The structures of the armature portions Am211 and Am212 are not limited to the example of the rotary electric machine M21. For example, the structure of the inner armature portion Am211 may not be the same as that of the armature portion Am1 of the rotary electric machine M1. Further, the positions and number of magnetic pole groups G5 and G6 and the positions and number of magnetic poles included in the outer armature portion Am212 may be different from those of the inner armature portion Am211. Further, the structure in which the magnetic field portion is disposed between two opposing armature portions may be applied not only to the radial gap type rotary electric machine shown in FIGS. 50A and 50B but also to an axial gap type rotary electric machine or a linear electric machine. The rotary electric machine and linear electric machine of the axial gap type have an effect of cancelling the magnetic attraction force generated between the magnetic field portion and the armature portion. This can simplify the structure of, for example, a bearing and a linear guide.

[Armature Portion Disposed Between Two Magnetic Field Portions]

Figure 51B:
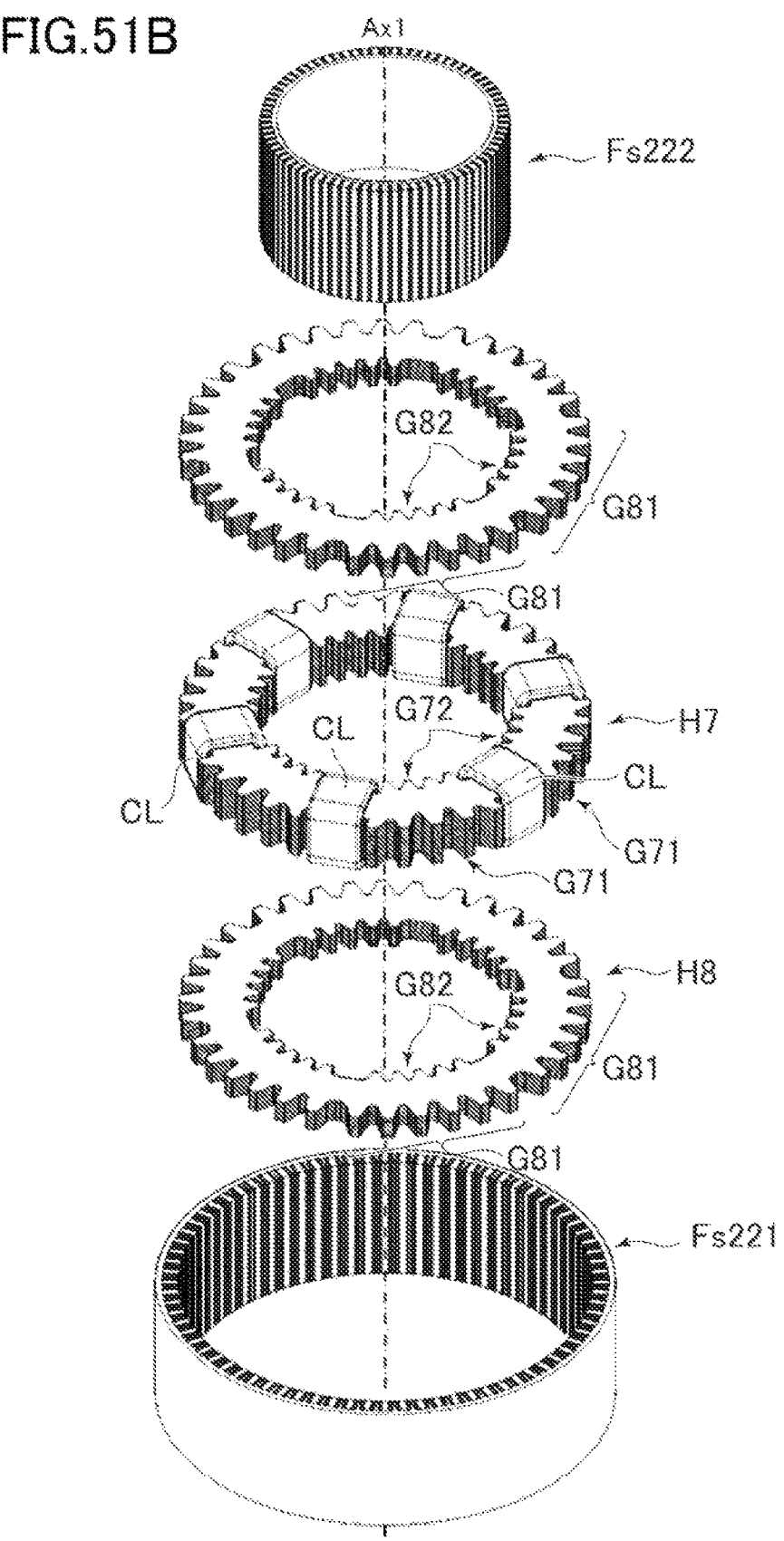
FIG. 51B is an exploded perspective view of the rotary electric machine shown in FIG. 51A.

The electric machine may have two opposing magnetic field portions and an armature portion disposed between the two magnetic field portions. FIGS. 51A and 51B are diagrams illustrating a rotary electric machine M22, which is an example of the electric machine having such a structure. FIG. 51A is a perspective view of the rotary electric machine M22, in which a part of the magnetic field portion Fs221 in the rotation direction and a part of the armature portion Am22 in the rotation direction are not shown. FIG. 51B is an exploded perspective view of the rotary electric machine M22.

The rotary electric machine M22 has an inner magnetic field portion Fs222 and an outer magnetic field portion Fs221. The inner magnetic field portion Fs222 is disposed inside the outer magnetic field portion Fs221 and the two magnetic field portions Fs221 and Fs222 are radially opposite to the rotary electric machine M22. Similarly to the magnetic field portion Fs1 described above, each of the magnetic field portions Fs221 and Fs222 has magnets Mg and magnetic field cores 22S and 22N. The armature portion Am22 is disposed between two magnetic field portions Fs221 and Fs222, and includes a plurality of magnetic pole groups G71 and G72 arranged in the rotation direction on both the outer circumference and the inner circumference of the first armature core H7 and a plurality of magnetic pole groups G81 and G82 arranged in the rotation direction on both the outer circumference and the inner circumference of the second armature core H8. The two magnetic field portion Fs221 and Fs222 are rotatable relative to the armature portion Am22 in the rotation direction. According to such a structure of the rotary electric machine M22, the magnetic field portion is provided not only on the outer side but also on the inner side of the armature portion Am22, and thus the output torque of rotary electric machine can be increased without enlarging the outer shape of the rotary electric machine.

The two magnetic field portions Fs221 and Fs222 are connected to each other via structures not shown, and rotate together when the magnetic field portions Fs221 and Fs222 are rotors.

The armature portion Am22 has, for example, one first armature core H7 and two second armature cores H8. In the first armature core H7, the outer magnetic pole group G71 is composed of five magnetic poles, similarly to the armature portion Am4 described with reference to FIG. 13. In the first armature core H7, the inner magnetic pole group G72 is composed of four magnetic poles. The position of the magnetic pole of the outer magnetic pole group G71 in the rotation direction is shifted by, for example, 180 degrees in electrical angle from the position of the magnetic pole of the inner magnetic pole group G72 in the rotation direction. In the second armature cores H8, the outer magnetic pole group G81 is composed of six magnetic poles and the inner magnetic pole group G82 is composed of five magnetic poles. The position of the outer magnetic pole group G81 in the direction of rotation of magnetic pole and the position of the inner magnetic pole group G82 in the direction of rotation of magnetic pole are also shifted by, for example, 180 degrees in electrical angle. At this time, in accordance with the differences in the positions of the magnetic poles of the outer magnetic pole groups G71 and G81 and the positions of the magnetic poles of the inner magnetic pole groups G72 and G82, the position of the outer magnetic field portion Fs221 and the position of the inner magnetic field portion Fs222 are also shifted in the rotation direction. In this manner, the positions of the magnetic poles constituting the outer magnetic pole groups G71 and G81 and the positions of the magnetic poles constituting the inner magnetic pole groups G72 and G82 are shifted in the rotation direction. This serves to increase the number of magnetic poles while effectively using the limited space inside the armature portion Am22.

The coil CL is provided in the first armature core H7. The arrangement of the coils CL may be, for example, the same as in the armature portion Am4 described referring to FIG. 13. That is, the coil CL is positioned between two magnetic pole groups G71 adjacent in the rotation direction (i.e., between two magnetic pole groups G72) and is wound around the yoke portion. As such, the magnetic flux formed by the magnets Mg passes inside the coils CL, and flows through the two magnetic pole groups G71 and the two magnetic pole groups G72. The magnetic flux flowing inside the coils CL passes through the outer magnetic pole group G71 to the outer magnetic field portion Fs221, and passes through the inner magnetic pole group G72 to the inner magnetic field portion Fs222. The magnetic pole group pair provided inside armature portion Am22 (i.e., magnetic pole groups G71 and G81) and the magnetic pole group pair provided outside armature portion Am22 (i.e., magnetic pole groups G72 and G82) share one coil CL. As such, these two magnetic pole group pairs have the same phase (U phase, V phase, or W phase).

The arrangement of the coils CL is not limited to the examples shown in FIGS. 51A and 51B. For example, the coils CL may be respectively provided on the magnetic pole group pair provided inside the armature portion Am22 and the magnetic pole group pair provided outside the armature portion Am22. In this case, the position of the magnetic pole group pair provided inside and the position of the inner magnetic field portion Fs222 in the rotation direction may be determined independently of the position of the magnetic pole group pair provided outside and the outer magnetic field portion Fs221 in the rotation direction. In addition, the structure in which the armature portion is disposed between two opposing magnetic field portions may be applied not only to the radial gap type rotary electric machine shown in FIGS. 51A and 51B but also to an axial gap type rotary electric machine or a linear electric machine. The rotary electric machine and linear electric machine of the axial gap type have an effect of cancelling the magnetic attraction force generated between the magnetic field portion and the armature portion. This can simplify the structure of, for example, a bearing and a linear guide.

[Examples of Providing a Plurality of Coils in One Magnetic Pole Group]

In the armature core in which the coil is wound around the magnetic pole group (e.g., armature core H1 shown in FIG. 1A) described so far, one coil is wound around each magnetic pole group. Alternatively, each magnetic pole group may have an outer coil wound around a plurality of magnetic poles constituting each magnetic pole group and an inner coil disposed inside the outer coil and surrounding only a part of the magnetic poles.

Figure 52:
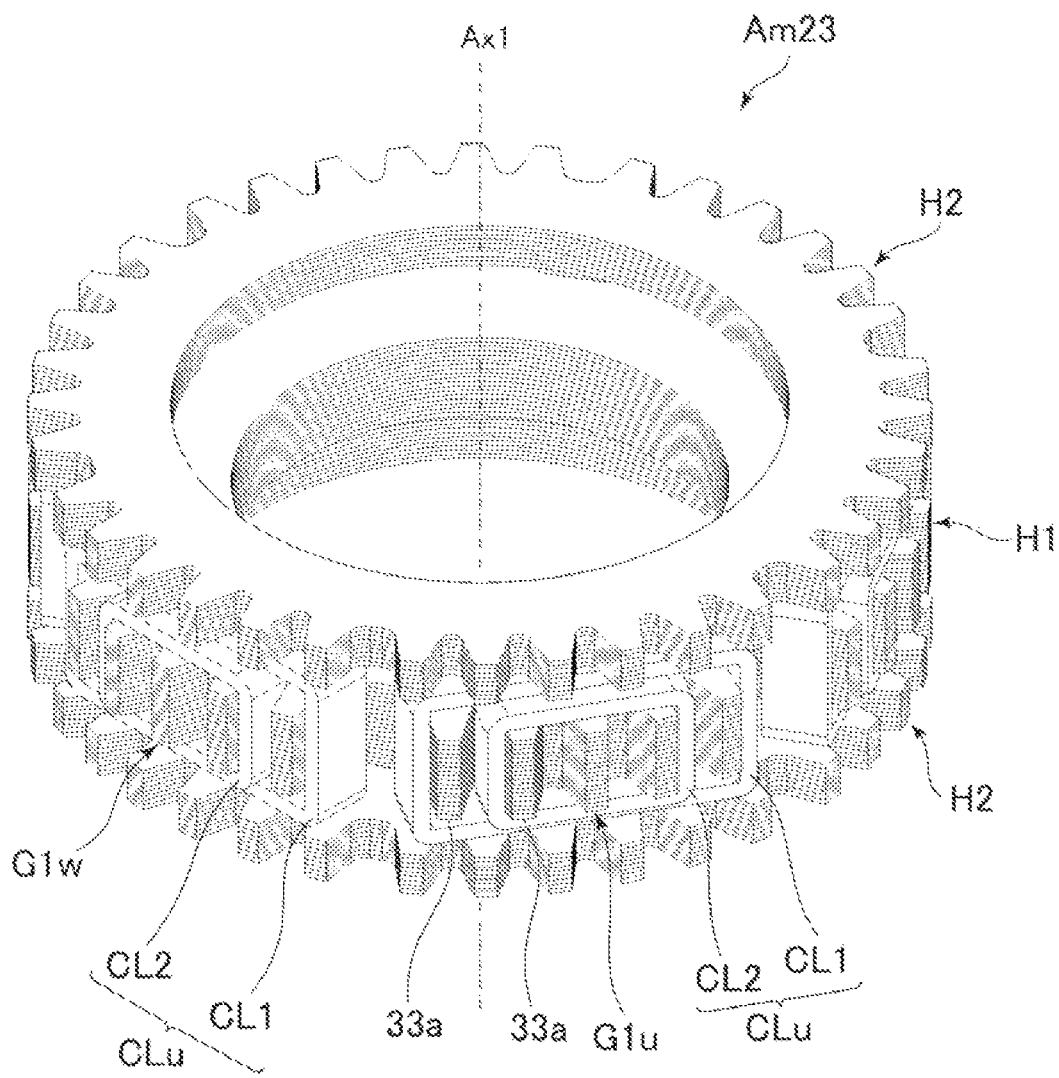
FIG. 52 is a diagram showing an example of an armature portion where a plurality of coils are provided in one magnetic pole group.

In the armature portion Am23 shown in FIG. 52, the outer coil CL1 and the inner coil CL2 are provided in a plurality of magnetic pole groups G1 of the armature core H1. For example, the U phase magnetic pole group G1u has an outer coil CL1 surrounding all magnetic poles 33a (five magnetic poles 33a) constituting the magnetic pole group G1u and an inner coil CL2 surrounding only some of the magnetic poles 33a. In the example shown in FIG. 52, the inner coil CL2 is located in the center of the outer coil CL1 and surrounds only the magnetic poles 33a in the middle (three magnetic poles 33a) of all magnetic poles 33a constituting the magnetic pole group G1u. With this structure, the space between two adjacent magnetic poles 33a can be effectively used, and the number of magnetic poles 33a constituting each magnetic pole group G1 can be increased.

The width of the outer coil CL1 (width in the radial direction) and the width of the inner coil CL2 (width in the radial direction) may be different. For example, the width of the outer coil CL1 (width in the radial direction) may be larger than the width of the inner coil CL2 (width in the radial direction). The number of turns of the outer coil CL1 and the number of turns of the inner coil CL2 may be different. For example, the number of turns of the outer coil CL1 may be greater than the number of turns of the inner coil CL2.

As described above, in the structure of providing a plurality of coils CL1 and CL2 in each magnetic pole group G1, the space in which the inner coil CL2 is disposed (the space between two adjacent magnetic poles 33a) may be larger than the space between the other two magnetic poles 33a.

Unlike the example shown in FIG. 52, the position of the inner coil CL2 may not be the center of the outer coil CL1. Further, when the number of magnetic poles 33a to be surrounded by the outer coil CL1 is large, a plurality of inner coils CL2 may be provided inside the outer coil CL1. In the example shown in FIG. 52, the outer coil and the inner coil are arranged in double, although if the number of magnetic poles 33a is large, three or more coils may be arranged in triple or more.

[Other Examples of Armature Core Arrangement]

In the electric machine in which the coils are wound around the magnetic pole group described above (e.g., the rotary electric machine M1 shown in FIG. 1A), two armature cores are arranged in the same direction with respect to the magnetic field portion and in a direction perpendicular to the direction of relative movement of the armature portion and the magnetic field portion (i.e., machine moving direction). The arrangement of the armature cores is not limited to this. The two armature cores may not necessarily be arranged side-by-side if they are spaced apart from each other in a direction intersecting the direction of relative movement of the armature portion and the magnetic field portion.

[Examples of Armature Cores Arranged Oppositely with Magnetic Field Portion]

FIG. 53 is a schematic diagram illustrating such an electric machine M23 and shows the electric machine M23 is viewed from the machine moving direction. Here, the difference from the rotary electric machine M1 described with reference to FIG. 1A will be mainly described. The examples of FIG. 1A may be applied to the matters that are not described in the electric machine M23 shown in FIG. 53. In FIG. 53, the first armature core H1 and the second armature core H2 are positioned on opposite sides across the magnetic field portion Fs. That is, the first armature core H1 and the second armature core H2 are spaced from each other in a direction perpendicular to the direction of relative movement of the magnetic field portion Fs and the armature portion Am23 (i.e., the machine moving direction, the direction perpendicular to the sheet surface in FIG. 53), and the magnetic field portion Fs is disposed between the first armature core H1 and the second armature core H2. The first armature core H1 and the second armature core H2 are magnetically separated in the same manner as the rotary electric machine M1 shown in FIG. 1A, for example. That is, the magnetic flux flows between the armature cores H1 and H2 without passing through the magnetic field portion Fs is not substantially generated.

Similarly to the rotary electric machine described above, the magnetic poles 33a of the magnetic pole group of the first armature core H1 are opposed to the magnetic field core of the magnetic field portion Fs, and the magnetic poles 34a of the magnetic pole group of the second armature core H2 are opposed to the magnetic field core of the magnetic field portion Fs. The magnetic flux formed by the magnets of the magnetic field portion Fs flows through the yoke portion 33c from one of the two magnetic pole groups G1 toward the other in the first armature core H1, and flows through the yoke portion 34c from one of the two magnetic pole groups G2 toward the other in the second armature core H2. Such arrangement of the armature cores H1 and H2 may be applied to any of a radial gap type rotary electric machine, an axial type rotary electric machine, and a linear electric machine.

[Rotary Electric Machine in which Armature Cores are Arranged on Opposite Sides Across Magnetic Field Portion]

[Radial Gap Type]

Figure 54A:
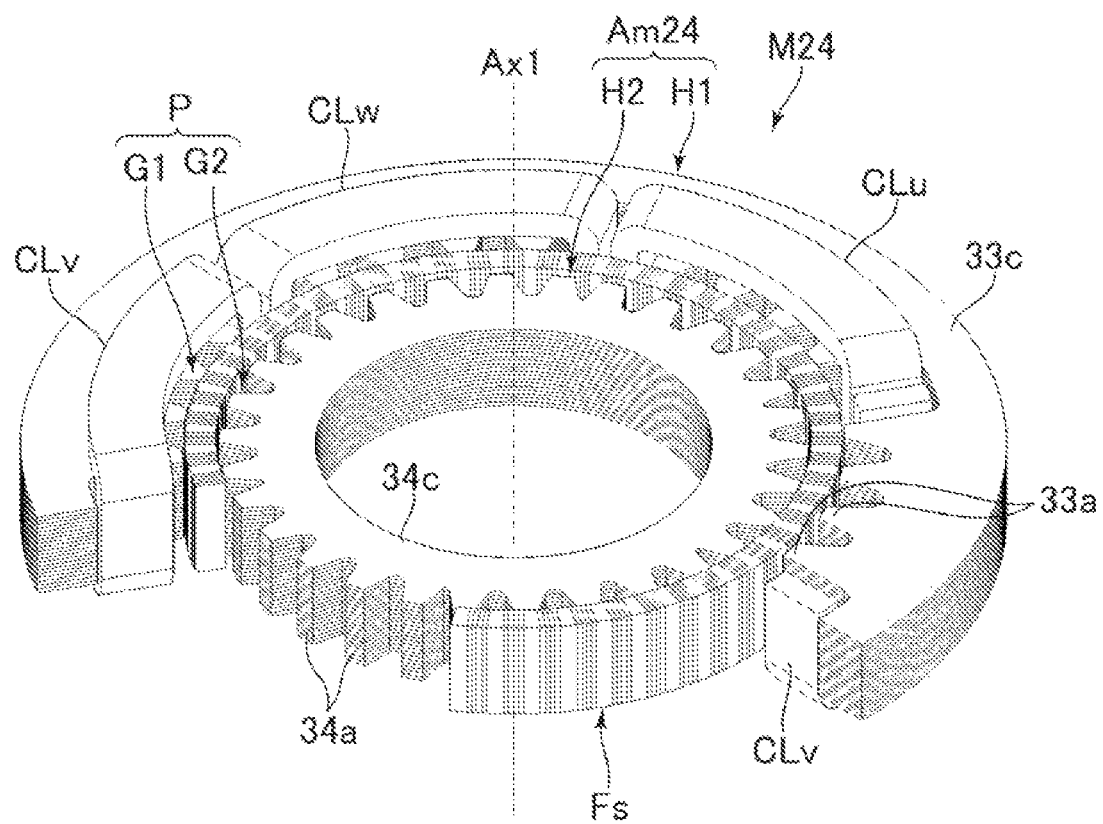
FIG. 54A is a perspective view of an example of a radial gap type rotary electric machine having armature cores disposed as shown in FIG. 53.
Figure 54B:
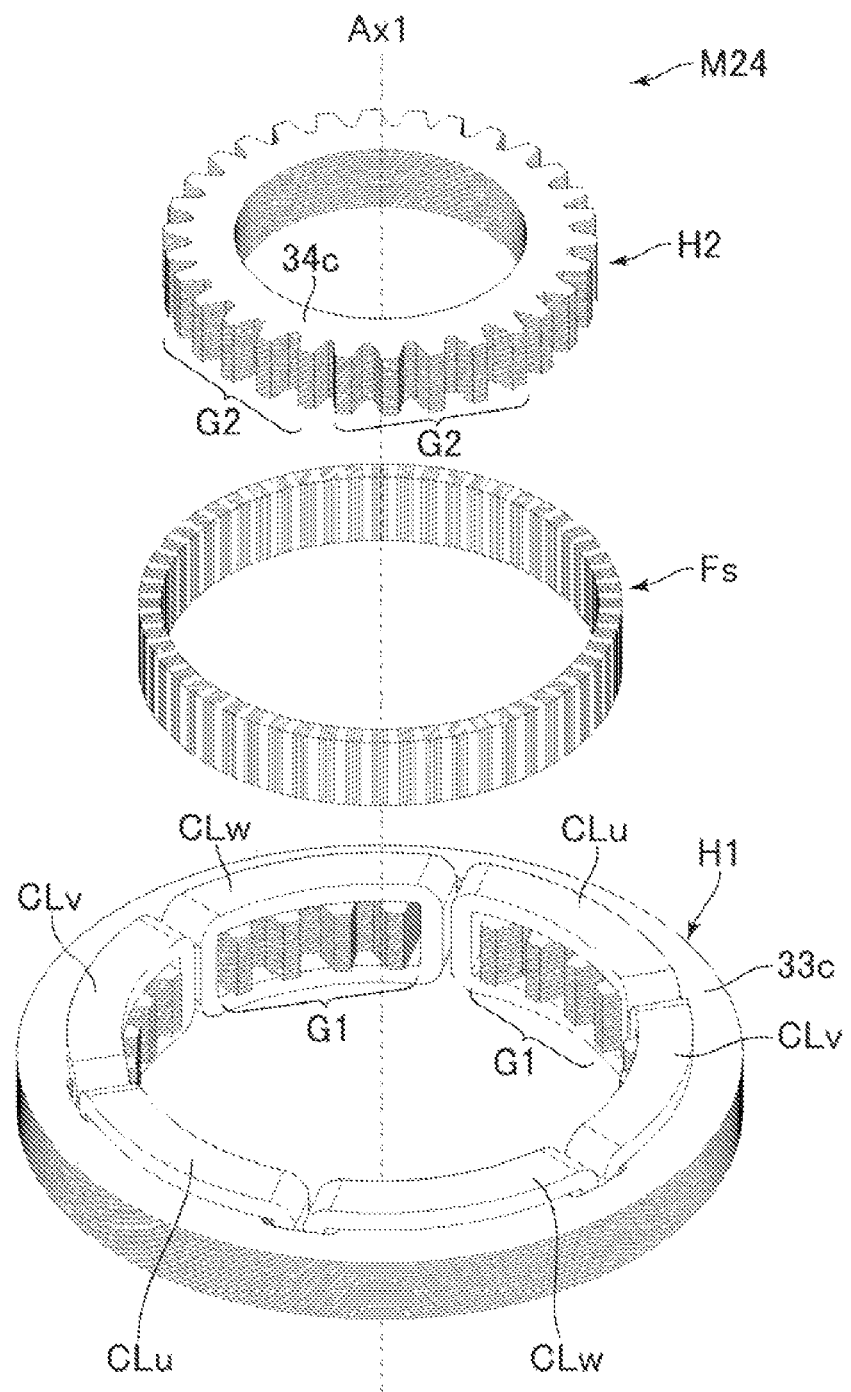
FIG. 54B is an exploded perspective view of the rotary electric machine shown in FIG. 54A.

FIGS. 54A and 54B are diagrams showing a rotary electric machine M24 as an example of a rotary electric machine having the arrangement of the armature cores H1 and H2 shown in FIG. 53. In the armature portion Am24 of the rotary electric machine M24, the first armature core H1 is annular, and the second armature core H2, which is also annular, is arranged inside the first armature core H1. A cylindrical magnetic field portion Fs is arranged between the two armature cores H1 and H2. Preferably, the magnetic field core of the magnetic field portion Fs is exposed at both its inner and outer sides. This can reduce a magnetic gap between the magnetic field portion Fs and the armature cores H1 and H2.

The first armature cores H1 have a plurality of magnetic pole groups G1, which are magnetically coupled via the yoke portion 33c, in the rotation direction. The magnetic pole group G1 has a plurality of magnetic poles 33a that radially oppose the magnetic field core of the magnetic field portion Fs. The coils CL are provided on the respective magnetic pole groups G1. The second armature core H2 also has a plurality of magnetic pole groups G2, which are magnetically coupled via the yoke portion 34c, in the rotation direction. The magnetic pole group G2 has a plurality of magnetic poles 34a that radially oppose the magnetic field core of the magnetic field portion Fs. The two magnetic pole groups G1 and G2 that are opposed to each other across the magnetic field portion Fs constitute a magnetic pole group pair P. The two magnetic pole group pairs P and the yoke portions 33c and 34c form a closed magnetic circuit. In the example illustrated in FIGS. 54A and 54B, each magnetic pole group G1 is composed of four magnetic poles 33a and each magnetic pole group G2 is composed of five magnetic poles 34a. The number of magnetic poles 33a and 34a constituting the magnetic pole groups G1 and G2 is not limited to this example.

In the rotary electric machine M24, the number of poles of magnetic field portion Fs is, for example, 56 (P=28). An electrical angle between adjacent magnetic pole group pairs P is expressed as 360×(n+m/s) as described referring to FIG. 2, and is, for example, 1,680 degrees. Further, a mechanical angle between adjacent magnetic pole group pairs P is expressed as (360/p)×(n+m/s) and substantially matches "360/s/c". This mechanical angle is, for example, 60 degrees in the rotary electric machine M24 (s=3, m=2, n=4, and c=2 in the rotary electric machine M24).

In the rotary electric machine M24, unlike t the example illustrated in FIGS. 54A and 54B, an annular first armature core H1 may be disposed inside the second armature core H2, and a cylindrical magnetic field portion Fs may be disposed between the armature cores H1 and H2. Further, each of the magnetic pole 33a and 34a may include projecting portions extending in the axis direction in the same manner as in the magnetic pole 54a shown in FIG. 34A.

Figure 55:
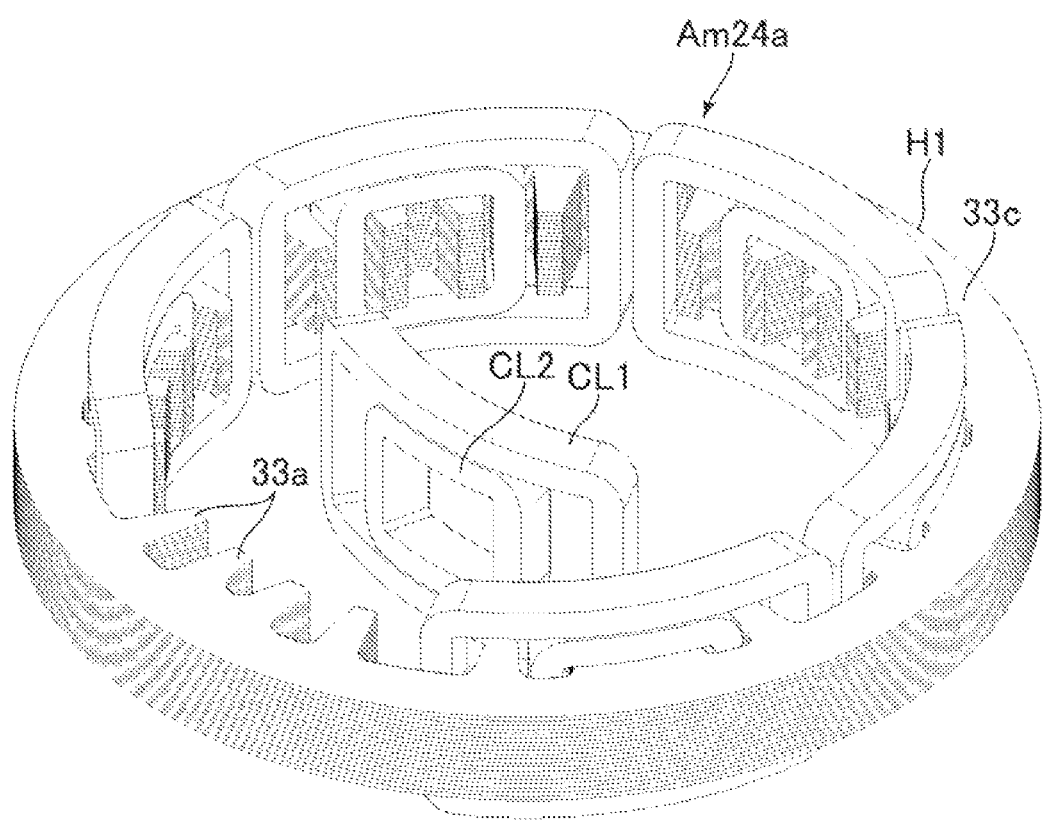
FIG. 55 is a diagram for explaining a modification of the rotary electric machine shown in FIGS. 54A and 54B.

FIG. 55 is a diagram showing a modification of the rotary electric machine M24 shown in FIGS. 54A and 54B. In the armature portion Am24a shown in FIG. 55, an outer coil CL1 and an inner coil CL2 are provided in a plurality of magnetic pole groups G1 included in the armature core H1. Specifically, the outer coil CL1 surrounding all magnetic poles 33a constituting one magnetic pole group G1 (four magnetic poles 33a) and the inner coil CL2 surrounding only some of the magnetic poles 33a are provided. In the example of FIG. 55, the inner coil CL2 is located in the center of the outer coil CL1 and surrounds only the magnetic poles 33a in the middle (two magnetic poles 33a) of all magnetic poles 33a constituting the magnetic pole group G1. With this structure, the space between two adjacent magnetic poles 33a can be effectively used, and the number of magnetic poles 33a constituting each magnetic pole group G1 can be increased. In this armature portion Am24a as well, similarly to the armature portion Am23 shown in FIG. 52, the width of the outer coil CL1 (width in the radial direction of the rotary electric machine) may be different from the width of the inner coil CL2 (width in the radial direction of the rotary electric machine). The number of turns of the outer coil CL1 and the number of turns of the inner coil CL2 may be different. The number of coils provided in one magnetic pole group is not limited to two, and when the number of magnetic poles constituting the magnetic pole group is large, three or more coils may be provided.

[Rotary Electric Machine in which Armature Cores are Arranged on Opposite Sides Across Magnetic Field Portion] [Axial Gap Type]

Figure 56A:
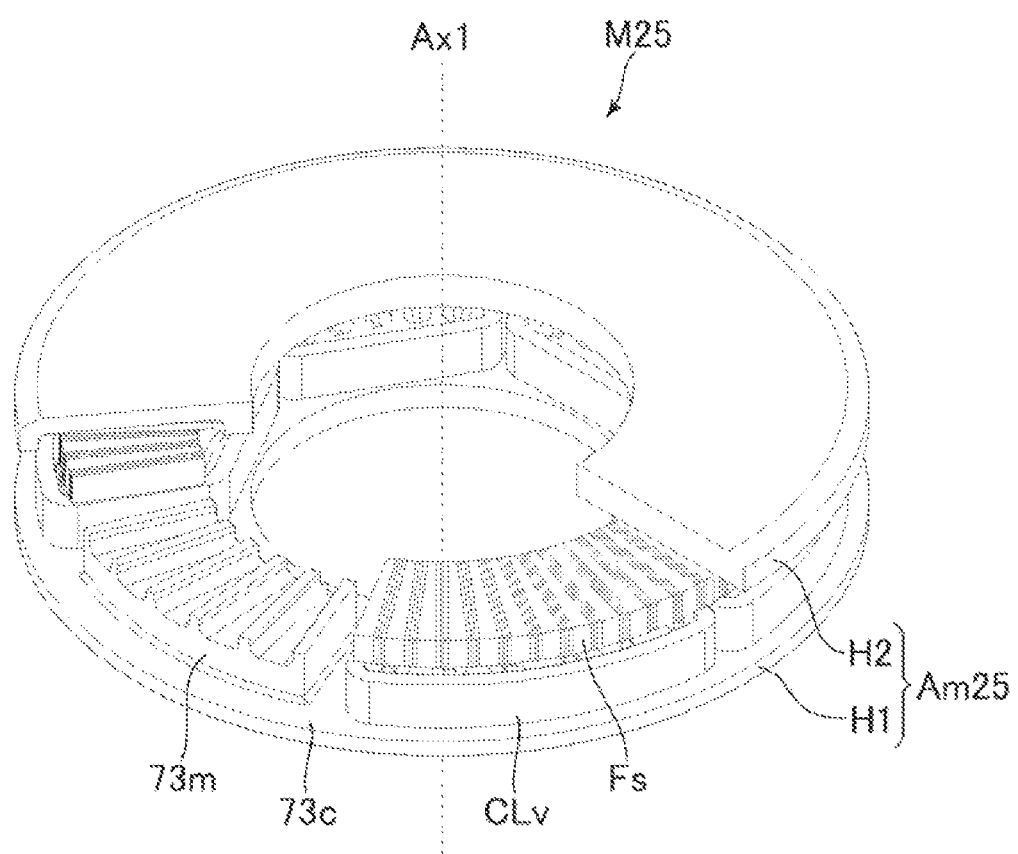
FIG. 56A is a perspective view of an example of a radial gap type rotary electric machine having armature cores disposed as shown in FIG. 53.
Figure 56B:
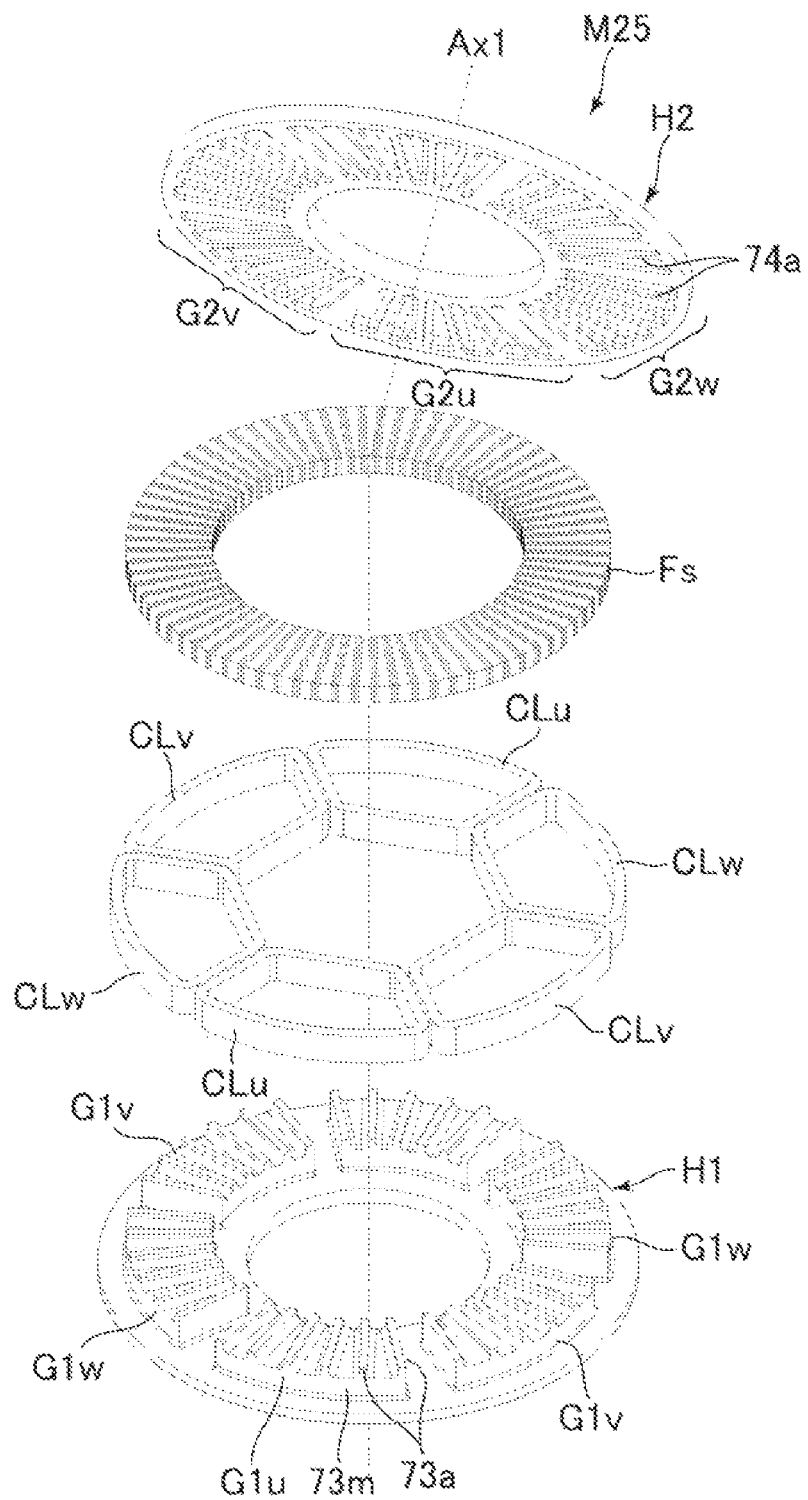
FIG. 56B is an exploded perspective view of the rotary electric machine shown in FIG. 56A.
Figure 56C:
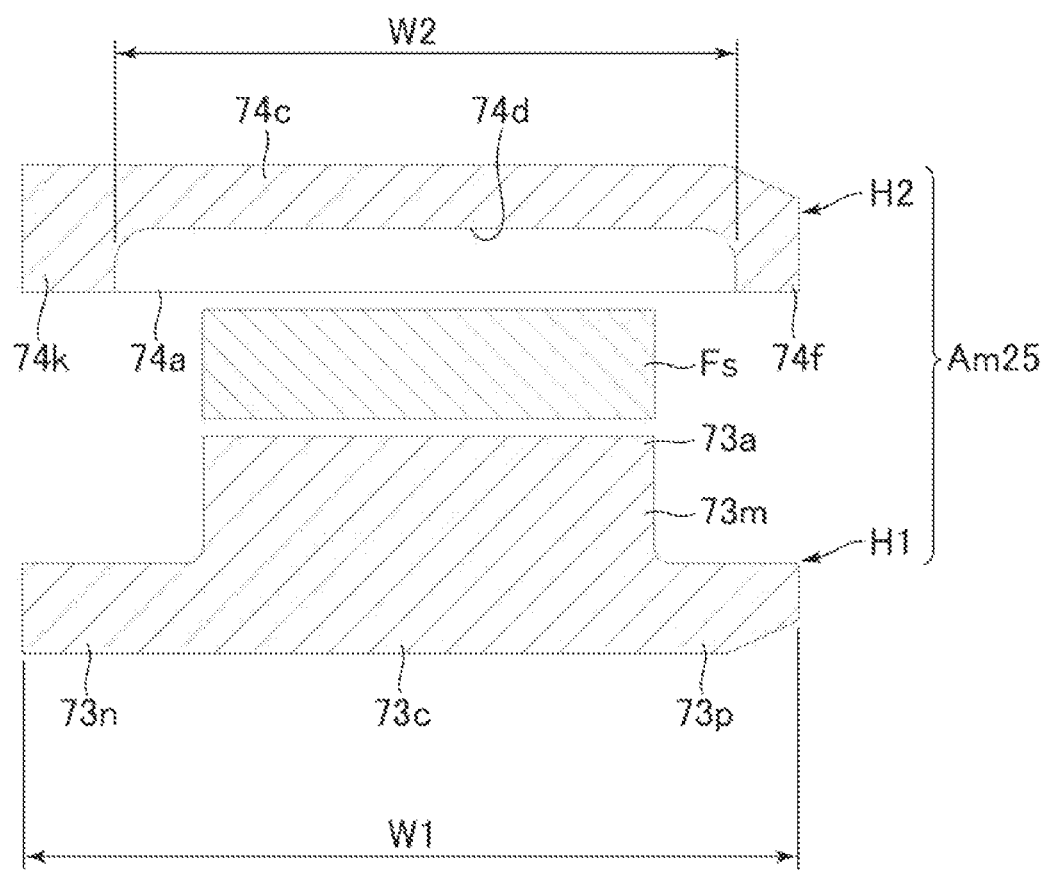
FIG. 56C is a cross sectional view of the armature core and the magnetic field portion shown in FIG. 56A.

FIGS. 56A to 56C are diagrams showing a rotary electric machine M25 having another arrangement of the armature cores H1 and H2 shown in FIG. 53. Here, the difference from the rotary electric machine M24 described with reference to FIG. 54A will be mainly described. The examples of FIG. 54A or FIG. 1A may be applied to items (e.g., the flow of magnetic flux) for which the rotary electric machine M25 shown in FIGS. 56A to 56C is not described.

In the armature portion Am25 of the rotary electric machine M25, the first armature core H1 and the second armature core H2 are disc-shaped and axially face each other. A disc-shaped magnetic field portion Fs is disposed between the two armature cores H1 and H2. That is, the rotary electric machine M25 is a so-called axial gap type rotary electric machine. Preferably, the magnetic field core of the magnetic field portion Fs is exposed on both its upper and lower sides. This can reduce a magnetic gap between the magnetic field portion Fs and the armature cores H1 and H2.

The first armature core H1 has a plurality of magnetic pole groups G1 arranged in the rotation direction. The magnetic pole group G1 has magnetic poles 73a projecting towards the second armature core H2 in the axis direction. The first armature core H1 may have a disc-shaped yoke portion 73c. A base 73m may be formed on the upper surface of the yoke portion 73c (the surface facing the second armature core H2). The plurality of magnetic poles 73a (six magnetic poles in the illustrated example) arranged in the rotation direction may be formed on the upper side of the base 73m. A Coil CL is wound around the magnetic poles 73a. The first armature core H1 is, for example, a powder core formed of a soft magnetic powder material. The material is not limited to the powder material, and may be formed of an electrical steel sheet as will be described later.

In the first armature cores H1, the magnetic pole groups G1 are magnetically coupled by the yoke portion 73c. As shown in FIG. 56C, the width W1 of the yoke portion 73c in the radial direction is larger than the width in the magnetic pole 73a. For this reason, the yoke portion 73c includes a portion 73n positioned more inward than the magnetic pole groups G1 and a portion 73p positioned more outward than the magnetic pole groups G1. The portions 73n and 73p also function as a part of the magnetic path. This contributes to making the first armature core H1 thinner.

As shown in FIG. 56C, a plurality of recessed portions 74d arranged in the rotation direction are formed on the surface (lower surface in FIG. 56C) of the second armature core H2 facing the magnetic field portion Fs. The portion (convex portion) between two adjacent recessed portions 74d functions as a magnetic pole 74a. The width W2 (width in the radial direction) of the magnetic pole 74a is larger than the width of the magnetic field portion Fs. The yoke portion 74c of the armature core H2 may have a portion 74k positioned more inward than the magnetic pole 74a and a portion 74f positioned more outward than the magnetic pole 74a. The portions 74k and 74f also function as a part of the magnetic path. This contributes to making the second armature core H2 thinner. Further, the magnetic pole 74a is formed by using the concave portion 74d in this manner, which serves to increase the strength of magnetic pole 74a. The second armature core H2 is, for example, a powder core formed of a soft magnetic powder material.

In the second armature cores H2, each magnetic pole group G2 is composed of a plurality of magnetic poles 74a (e.g., seven magnetic poles 74a). The magnetic pole 74a located at the end of each magnetic pole group G2 (first magnetic pole 74a) and the magnetic pole 74a located at the end of each adjacent magnetic pole group G2 (seventh magnetic pole 74a) may be integrally formed. This can expand the width of the magnetic path in the end magnetic pole 74a.

The first armature core H1 and the second armature core H2 are magnetically separated. For example, as shown in FIG. 56C, a gap is formed between the outer peripheral portion 73p of the first armature core H1 and the outer peripheral portion 74f of the second electric core H2. Similarly, a gap is formed between the inner peripheral portion 73n of the first armature core H1 and the inner peripheral portion 74k of the second electric core H2. Accordingly, there is practically no magnetic flux flowing between the first armature core H1 and the second armature core H2 without passing through the magnetic field portion Fs. The two magnetic pole groups G1 and G2 that are opposed to each other across the magnetic field portion Fs constitute a magnetic pole group pair P. Similarly to the rotary electric machine M1 described with reference to FIG. 1, two magnetic pole group pairs P and the yoke portions 73c and 74c form a closed magnetic circuit.

In the rotary electric machine M25, the number of poles of magnetic field portion Fs is, for example, 76 (P=38). An electrical angle between adjacent magnetic pole group pairs P is expressed as 360×(n+m/s) as described above with respect to FIG. 2, and is 2,280 degrees in the rotary electric machine M25, for example (s=3, m=1, n=6 in this rotary electric machine M25).

Further, a mechanical angle between adjacent magnetic pole group pairs P is expressed as (360/p)×(n+m/s) and substantially matches "360/s/c". In the rotary electric machine M25, such a mechanical angle is, for example, 60 degrees (c=2 in the rotary electric machine M25).

In the rotary electric machine M25 described with reference to FIGS. 56A to 56C, the coil CL is wound around the magnetic pole group G1 of the first armature core H1, and is not wound around the magnetic pole group G2 of the second armature core H2. Alternatively, the coils may be provided in both of the first armature core H1 and the second armature core H2. Further, one coil CL is provided in each magnetic pole group G1 in the rotary electric machine M25, although as in the example of FIG. 55, each of magnetic pole groups G1 and G2 may be provided with an outer coil CL1 wound around a plurality of magnetic poles constituting the magnetic pole groups G1 and G2, and an inner coil CL2 disposed inside the outer coil CL1 and surrounding only some of magnetic poles.

Figure 57A:
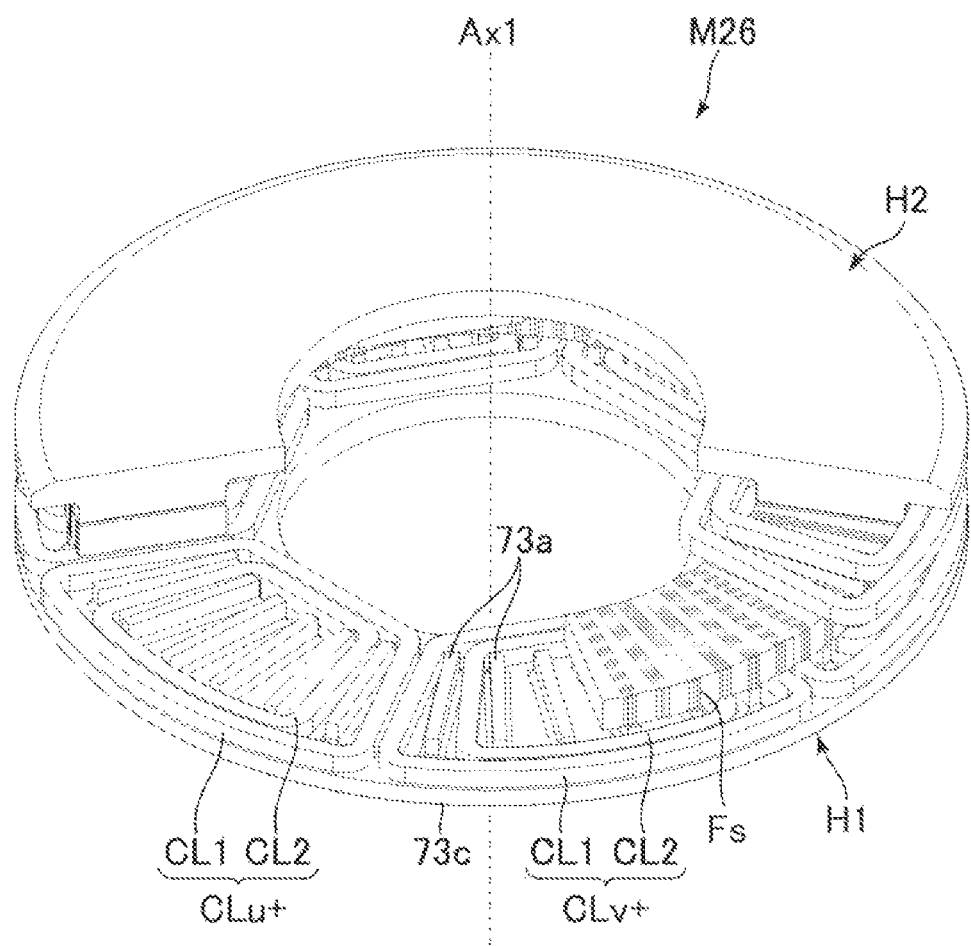
FIG. 57A is a diagram showing still another example of the rotary electric machine that has armature cores disposed as shown in FIG. 53 and is different from the rotary electric machine shown in FIG. 56A in the arrangement of the coils.
Figure 57B:
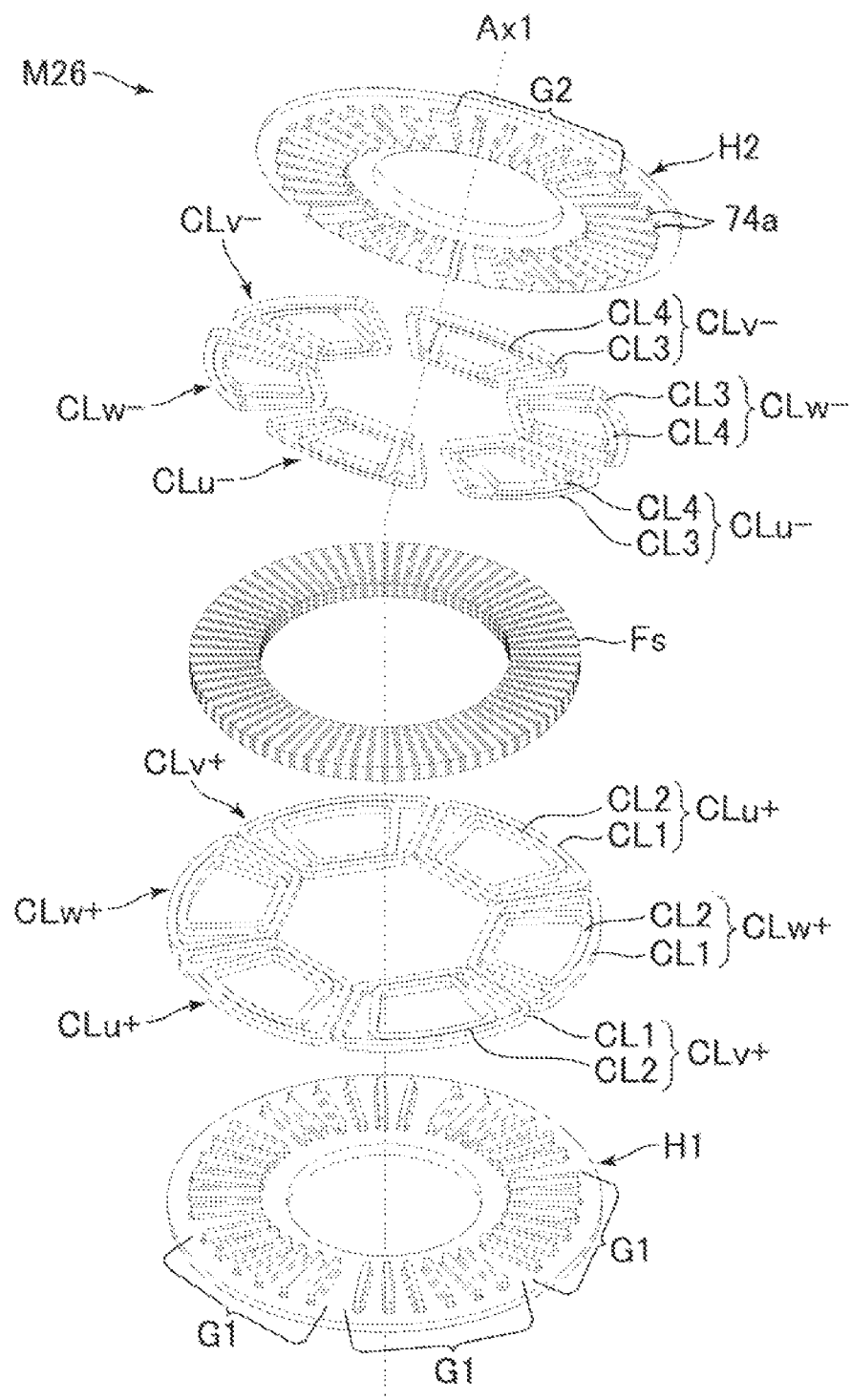
FIG. 57B is an exploded perspective view of the rotary electric machine shown in FIG. 57A.

The rotary electric machine M26 shown in FIGS. 57A and 57B are examples of a rotary electric machine having such a structure. Here, the difference from the rotary electric machine M25 described with reference to FIGS. 56A to 56C will be mainly described. The examples of in FIGS. 56A to 56C may be applied to the matters for which the rotary electric machine M26 shown in FIGS. 57A and 57B is not described.

As shown in FIGS. 57A and 57B, each magnetic pole group G1 of the first armature core H1 may include an outer coil CL1 and an inner coil CL2. For example, a U phase magnetic pole group G1 is provided with an outer coil CL1 surrounding all magnetic poles 73a constituting the U phase magnetic pole group G1 and an inner coil CL2 surrounding only some of the magnetic poles 73a. This also applies to a magnetic pole group G1 of V phase and a magnetic pole group G1 of W phase. In the example shown in FIG. 57A, the inner coil CL2 is disposed concentrically with the outer coil CL1 and surrounds only the magnetic poles 73a in the middle (four magnetic poles 73a) of all magnetic poles 73a constituting the magnetic pole group G1u. With this structure, a space between two adjacent magnetic poles 73a can be effectively used. Further, the height of the coil CL in the axis direction can be reduced and the armature core H1 can be thinned.

As shown in FIG. 57B, a plurality of magnetic pole groups G2, which is formed of a plurality of magnetic poles 74a projecting toward the first armature core H1 in the axis direction, is formed on the second armature core H2. Each magnetic pole group G2 may have an outer coil CL3 and an inner coil CL4. Specifically, each magnetic pole group G2 may have an outer coil CL3 surrounding a plurality of magnetic poles 74a (e.g., five magnetic poles 74a) constituting the magnetic pole group G2 and an inner coil CL4 surrounding only some of magnetic poles 74a (three magnetic poles 74a) inside the outer coil CL3. In this manner, spaces between the magnetic poles 74a can be effectively used. In the example shown in FIG. 57B, the inner coil CL4 is disposed concentrically with the outer coil CL3. The direction of the magnetic flux formed by the coils CL3 and CL4 in the magnetic pole group G2 when viewed toward the magnetic field portion Fs is opposite to the direction of the magnetic flux formed by the coils CL1 and CL2 in the magnetic pole group G1 when viewed toward the magnetic field portion Fs. The coils CL1 and CL2 of the first armature core H1 may be connected in series with the coils CL3 and CL4 of the second armature core H2. In the second armature cores H2 of the rotary electric machine M26, similarly to the rotary electric machine M25, a magnetic pole 74a located at the end of a magnetic pole group G2 may be integrally formed with a magnetic pole 74a located at the end of the adjacent magnetic pole group G2. In this case, the magnetic pole 74a located at the end may be located on outside the outer coil CL3.

According to the structure of the rotary electric machine M26 having coils CL1 to CL4, the height of coils CL1 to CL4 in the axis direction can be reduced, and the rotary electric machine M26 can be thinned. In the rotary electric machine M26, the number of coils provided in each of magnetic pole groups G1 and G2 is not limited to two, but may be three or more. Further, the two coils CL1 and CL2 may be provided to each magnetic pole group G1 only in the first armature core H1, and coils may not be provided or only one coil may be provided to each magnetic pole group G2 of the second armature core H2.

[Axial Gap Type Having Armature Core Formed of Steel Sheet]

The armature cores H1 and H2 shown in FIGS. 56A to 56C and the armature cores H1 and H2 shown in FIGS. 57A and 57B are formed of a powder material. However, one or both of these armature cores H1 and H2 may be formed of electrical steel sheets.

Figure 58A:
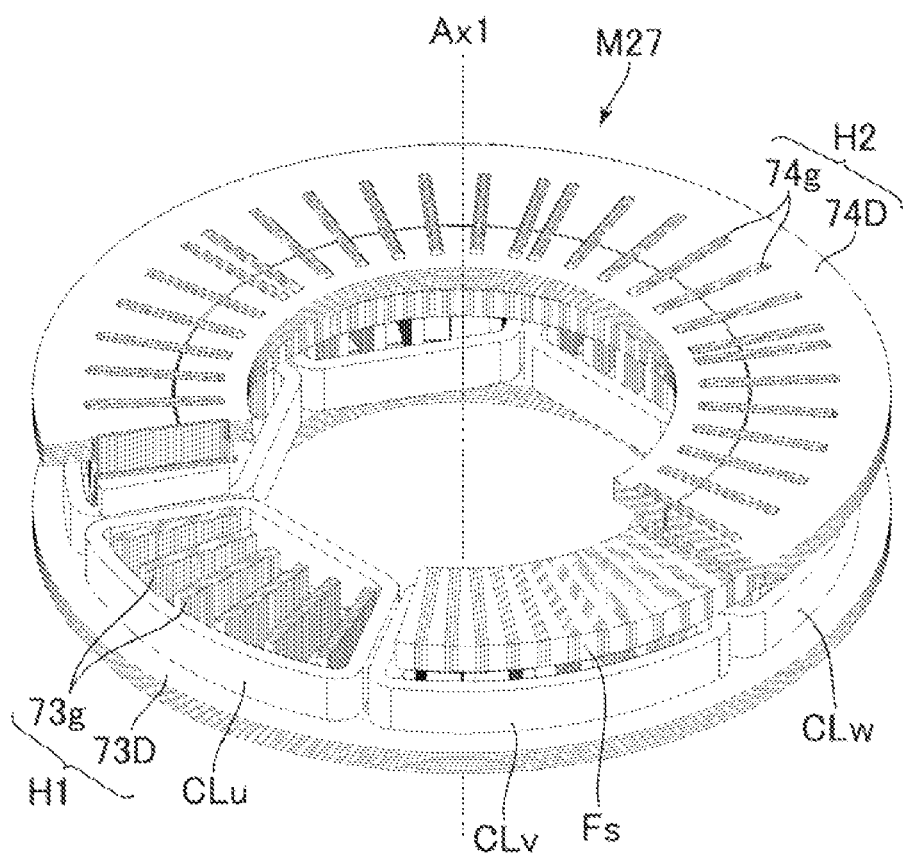
FIG. 58A is a diagram showing still another example of the rotary electric machine having armature cores that are disposed as shown in FIG. 53 and formed of lamination steel.
Figure 58B:
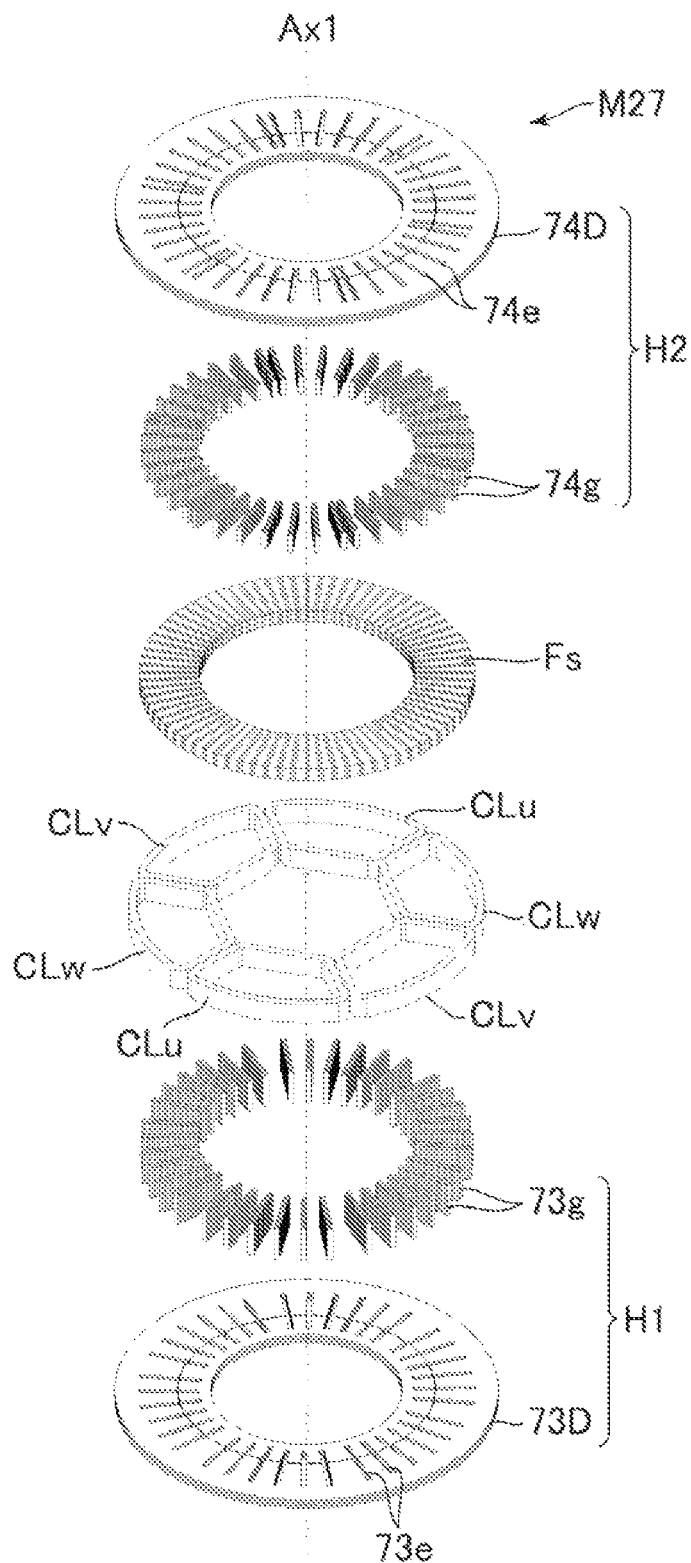
FIG. 58B is an exploded perspective view of the rotary electric machine shown in FIG. 58A.

A rotary electric machine M27 shown in FIGS. 58A and 58B are examples of a rotary electric machine having such a structure. In the case where the armature core is formed of electrical steel sheets, generation of induced current is an issue. FIGS. 59A to 59J are diagrams illustrating structures for preventing the generation of such an induced current. Here, the difference from the rotary electric machine M25 described with reference to FIGS. 56A to 56C will be mainly described. The examples of in FIGS. 56A to 56C may be applied to the matters for which the rotary electric machine M27 shown in FIGS. 58A and 58B is not described.

As shown in FIG. 58A, in the rotary electric machine M27, the first armature core H1 and the second armature core H2 are disposed so as to face each other in the axis direction, and a magnetic field portion Fs is disposed therebetween. The first armature core H1 has a yoke partial core 73D and a plurality of magnetic poles 73g arranged in the rotation direction. The yoke partial core 73D is composed of a plurality of electrical steel sheets laminated in the axis direction. Each magnetic pole 73g is formed of a plurality of electrical steel sheets laminated in the radial direction. That is, the steel sheets of the yoke partial core 73D is perpendicular to the steel sheets of the magnetic pole 73g. A plurality of fitting holes 73e arranged in the rotation direction are formed in the yoke partial core 73D (electrical steel sheets). The magnetic poles 73g are respectively fitted into the fitting holes 73e and magnetically coupled to the yoke partial core 73D.

As shown in FIG. 58B, similarly to the first armature core H1, the second armature core H2 has a yoke partial core 74D and a plurality of magnetic poles 74g arranged in the rotation direction. The yoke partial core 74D is composed of a plurality of electrical steel sheets laminated in the axis direction. Each magnetic pole 74g is formed of a plurality of electrical steel sheets laminated in the radial direction. That is, the steel sheets of the yoke partial core 74D is perpendicular to the steel sheets of the magnetic pole 74g. A plurality of fitting holes 74e arranged in the rotation direction are formed in the yoke partial core 74D. The magnetic poles 74g are respectively fitted into the fitting holes 74e and magnetically coupled to the yoke partial core 74D.

Figure 59A:
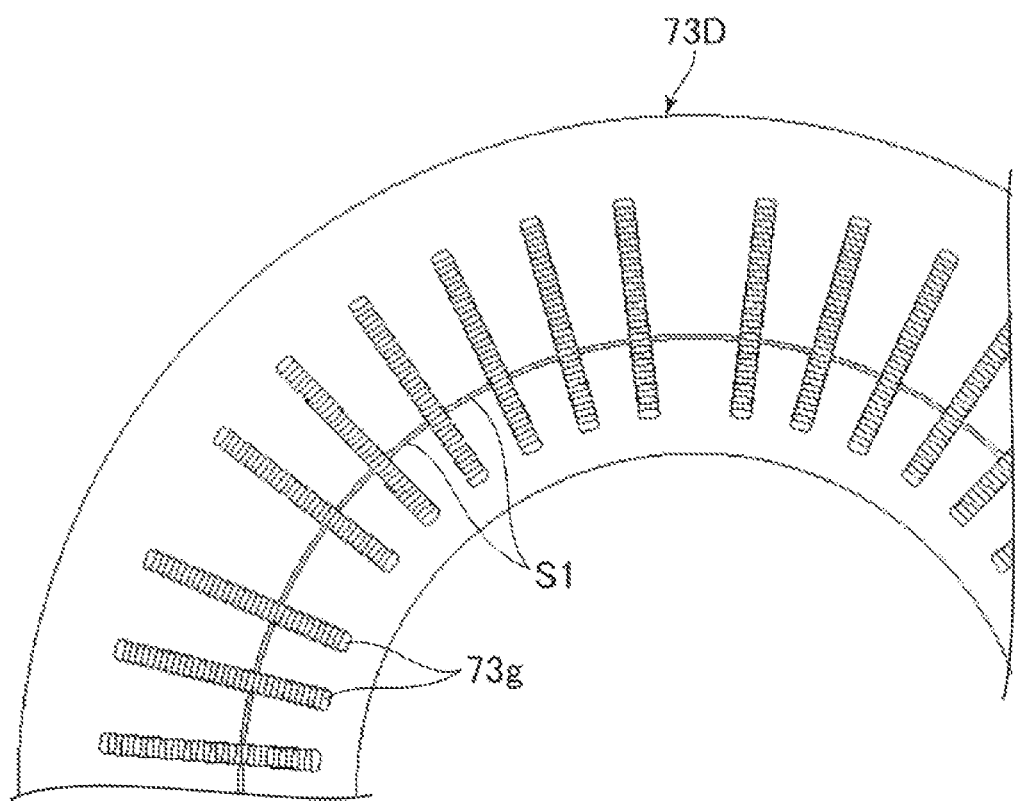
FIG. 59A is a diagram for explaining a structure for preventing generation of induced current in the armature core.

As shown in (b) of FIG. 59B, magnetic fluxes $\varphi_1$ to $\varphi 4$ flowing from the electrical steel sheets of the magnetic pole 73g to the electrical steel sheets of the yoke partial core 73D are formed. As shown in (a) of FIG. 59B, an induced current C1 surrounding the magnetic poles 73g is generated by the magnetic fluxes $\varphi 1$ to $\varphi 4$ in the yoke partial core 73D. In the armature cores H1 and H2, as shown in FIG. 59A, a plurality of slits S1 connecting two adjacent fitting holes 73e may be formed in the yoke partial core 73D so as to prevent the generation of the induced current C1. The slits S1 block the induced current C1. The slits S1 may have an annular shape as a whole.

Figure 59C:
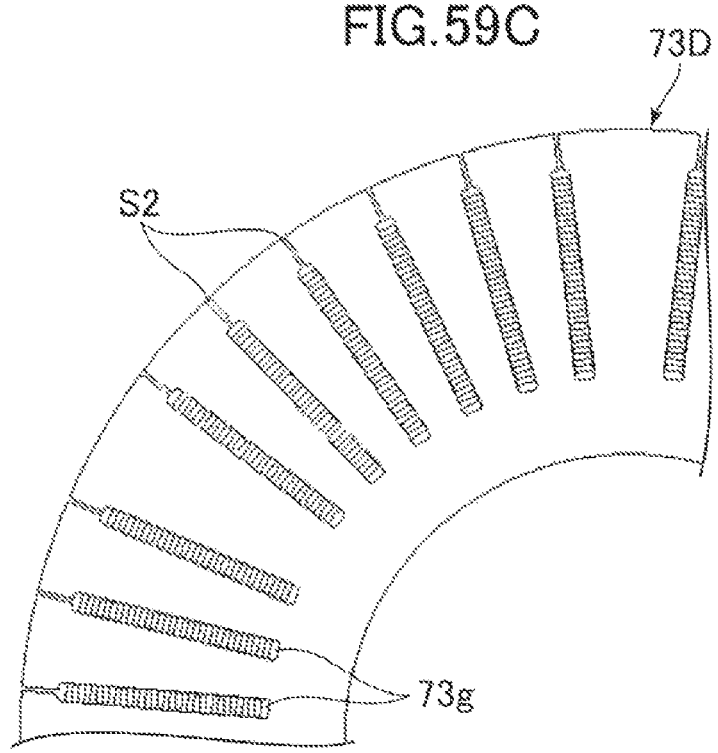
FIG. 59B is a diagram for explaining a structure for preventing generation of induced current in the armature core.
Figure 59D:
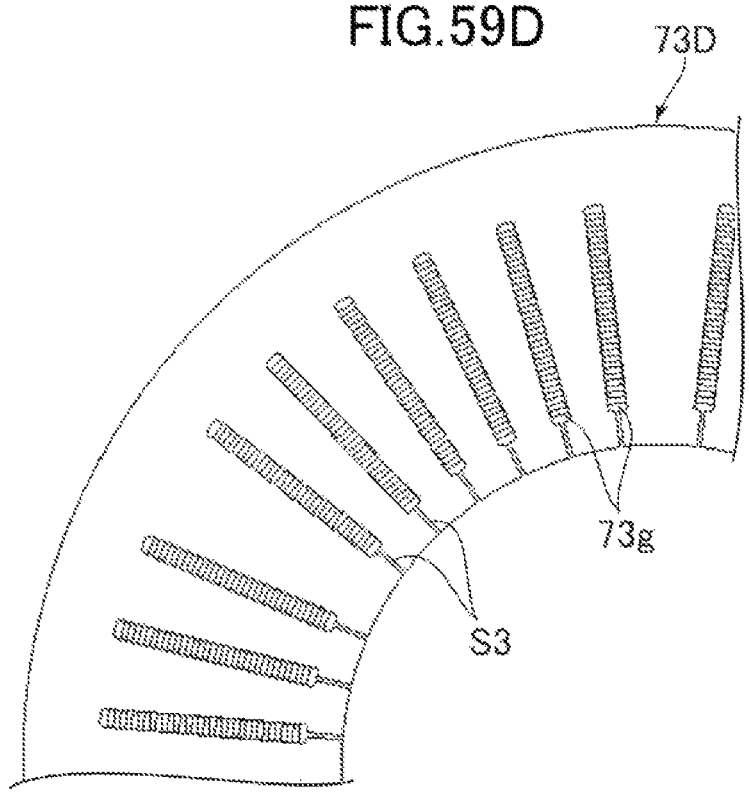

The slits S1 are not limited to the example shown in FIG. 59A if the slits S1 block the induced current C1. For example, as shown in FIG. 59C, slits S2 may radially extend from the fitting holes 73e in which the magnetic poles 73g are fitted to the outer edge of the yoke partial core 73D. In yet another example, as shown in FIG. 59D, slits S3 may radially extend from the fitting holes 73e in which the magnetic poles 73g are fitted to the inner edge of the yoke partial core 73D.

Figure 59E:
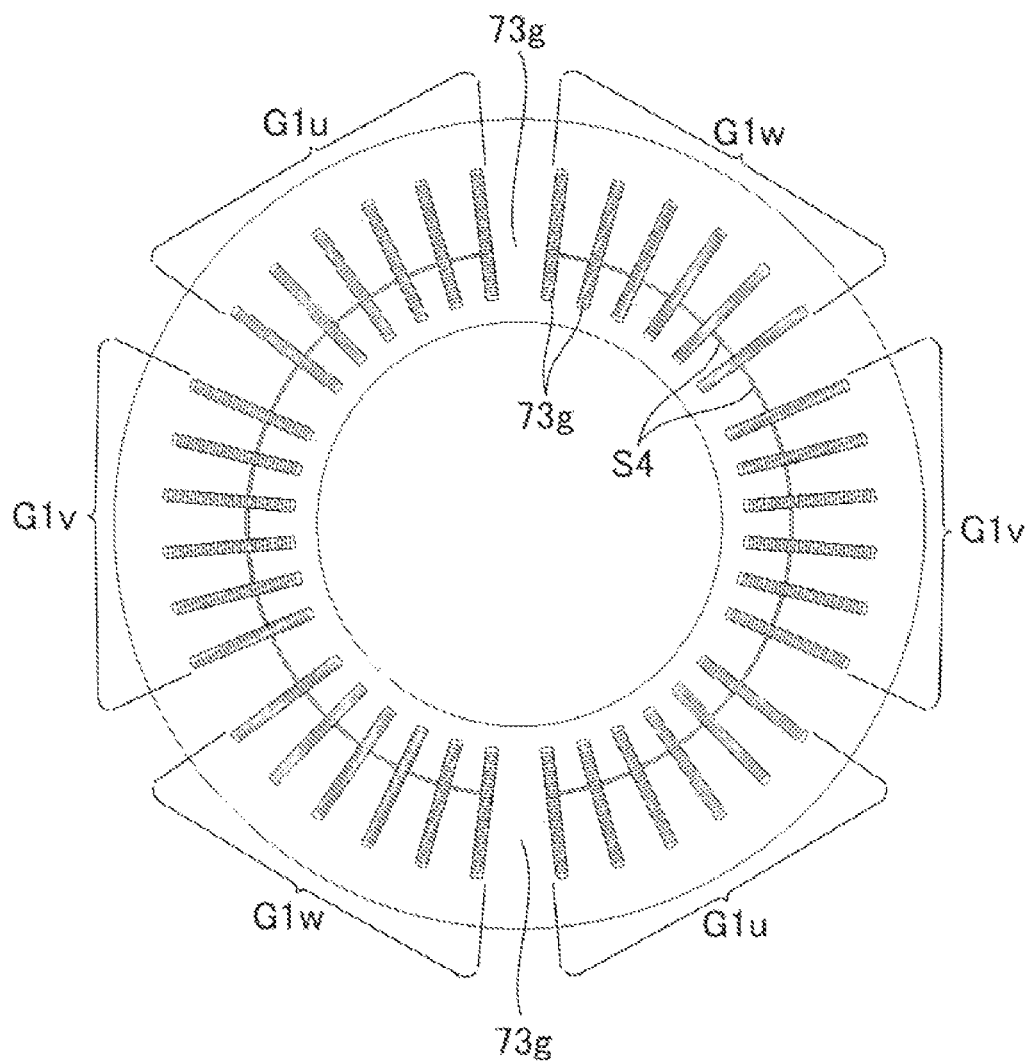

FIG. 59E shows magnetic poles 73g constituting the magnetic pole group G1u of U phase, magnetic poles 73g constituting the magnetic pole group G1v of V phase, and magnetic poles 73g constituting the magnetic pole group G1w of W phase. The sum of the magnetic fluxes formed in these three magnetic pole groups G1u, G1v, and G1w is substantially 0. For this reason, even if a closed circuit surrounding these three magnetic pole groups G1u, G1v, and G1w is formed in the yoke partial core 73D, the induced current is not substantially generated in such a closed circuit. As such, as shown in FIG. 59E, a plurality of slits S4 may not necessarily be formed over the entire circumference of the yoke partial core 73D. The slits S4 may connect the fitting holes 73e of the magnetic poles 73g of the three magnetic pole groups G1u, G1v, and G1w. The slits S4 may not be formed between three magnetic pole groups G1u, G1v, and G1w and the other three magnetic pole groups G1u, G1v, and G1w (in FIG. 59E, between the magnetic pole group G1u and the magnetic pole group G1w). According to this structure, the inner peripheral portion of the yoke portion core 73D (the portion located inward of the slits S4) and the outer peripheral portion of the yoke portion core 73D (the portion located outward of the slits S4) are connected via coupling portions 73q between the slits S4. This facilitates the assembly of the yoke portion core 73D.

Figure 59F:
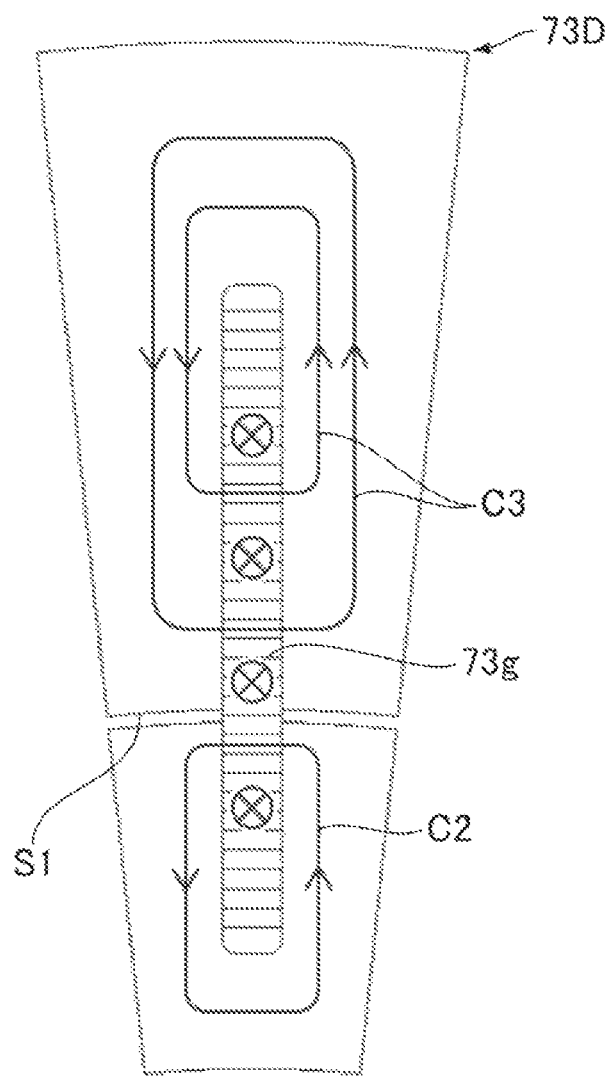

Further, even if the slits S1 shown in FIG. 59A are formed in the yoke partial core 73D, as shown in FIG. 59F, a closed circuit in which an induced current C2 occurs can be formed in the inner peripheral portion of the yoke partial core 73D, and a closed circuit in which an induced current C3 occurs can be formed in the outer peripheral portion of the yoke partial core 73D. As such, as shown in FIG. 59G, a gap F may be formed between the side surface of the magnetic pole 73g and the inner surface of the fitting hole 73e of the yoke partial core 73D. For example, as shown in (a) of FIG. 59G, the gap F may be formed from the electrical steel sheet positioned at the uppermost portion of the yoke partial core 73D to the electrical steel sheet positioned at the lowermost portion. As shown in (b) of FIG. 59B, the uppermost electrical steel sheet interlinks with many fluxes (e.g., fluxes $\varphi 1$ to $\varphi 4$), while the lowermost electrical steel sheet interlinks only with relatively less flux (e.g., flux $\varphi 4$). As such, as shown in (b) of FIG. 59G, the gap F is formed between the inner surface of electrical steel sheets near the uppermost electrical steel sheet and the magnetic pole 73g, but may not necessarily be formed between the inner surface of the lowermost electrical steel sheet (or the inner surface of electrical steel sheets near the lowermost electrical steel sheet) and the magnetic pole 73g. In yet another example, as shown in FIG. 59G (c), the gap F may be gradually reduced from the uppermost electrical steel sheet to the lowermost electrical steel sheet. That is, the inner surface of the fitting hole 73e of the electrical steel sheets may be formed in a tapered shape. The gap F between the side surface of the magnetic pole 73g and the inner surface of the fitting hole 73e of the yoke partial core 73D may be electrically insulated, and desirably, may be formed as narrow as possible so as not to hinder the flow of the magnetic flux.

Figure 59H:
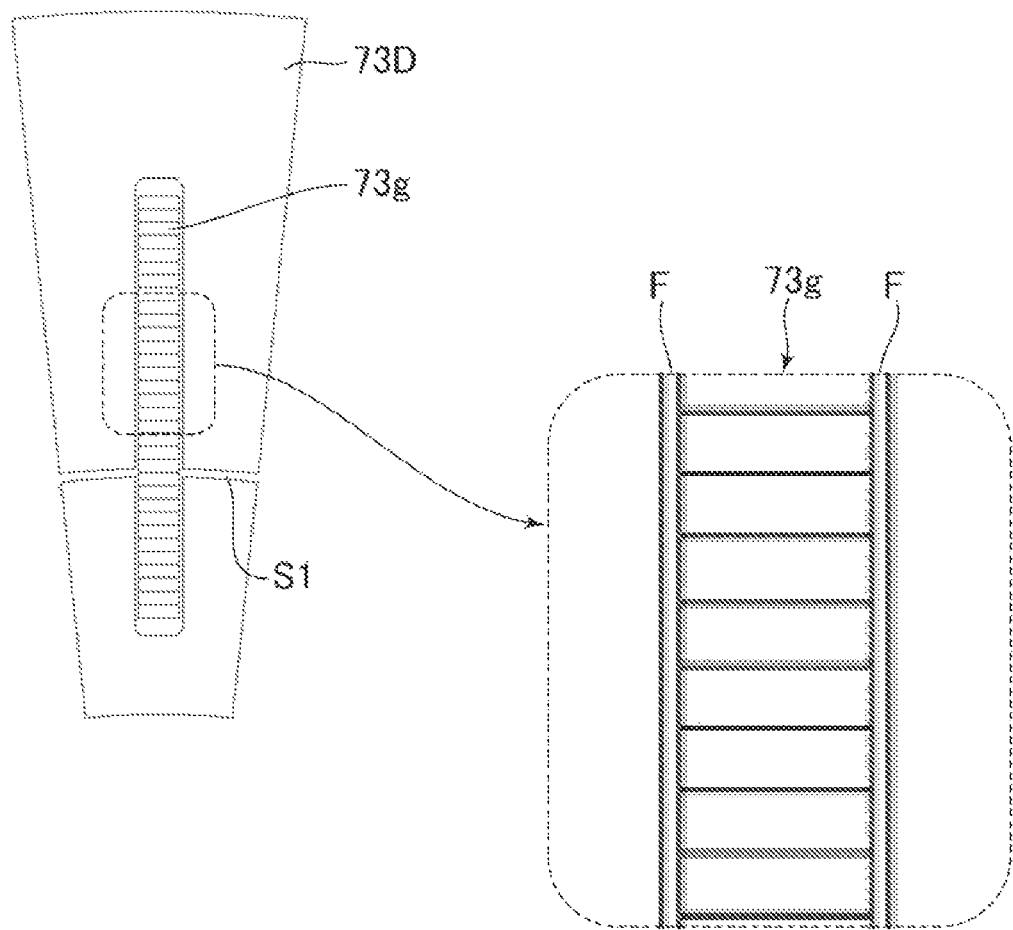
Figure 59I:
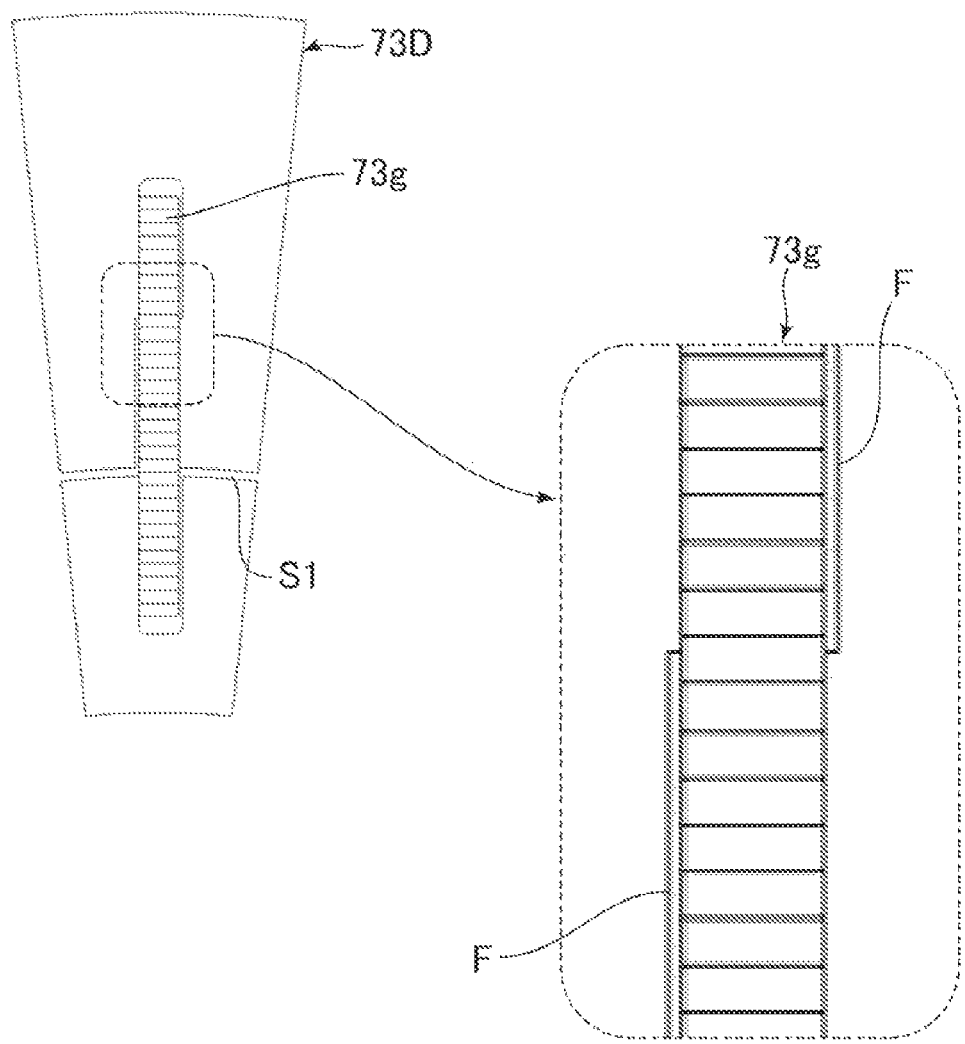

As shown in FIG. 59H, such a gap F may be formed on the right side and the left side of magnetic pole 73g (i.e., on two sides positioned on the opposite sides in the rotation direction), or may be formed on only one of the right side and the left side of magnetic pole 73g. In yet another example, as shown in FIG. 59I, a gap F may be formed on the right side of magnetic pole 73g in a portion in the radial direction, and a gap F may be formed on the left side of magnetic pole 73g in a remaining portion in the radial direction.

In the magnetic pole 73g, the electrical steel sheets are laminated in the radial direction of the rotary electric machine M27. This can reduce the induced current generated in the electrical steel sheets. In FIG. 59J, unlike the example of the rotary electric machine M27, the electrical steel sheets of the magnetic pole are laminated in the rotation direction. In this structure, as shown in (b) of FIG. 59J, the induced current C4 is more likely to be generated in the electrical steel sheet positioned on the right side or the left side (electrical steel sheet positioned at the end in the rotation direction). In contrast, in the rotary electric machine M27, the electrical steel sheets of the magnetic pole 73g are laminated in the radial direction, and it is thus possible to prevent the generation of the induced current C4 shown in (b) of FIG. 59J.

Figure 60:
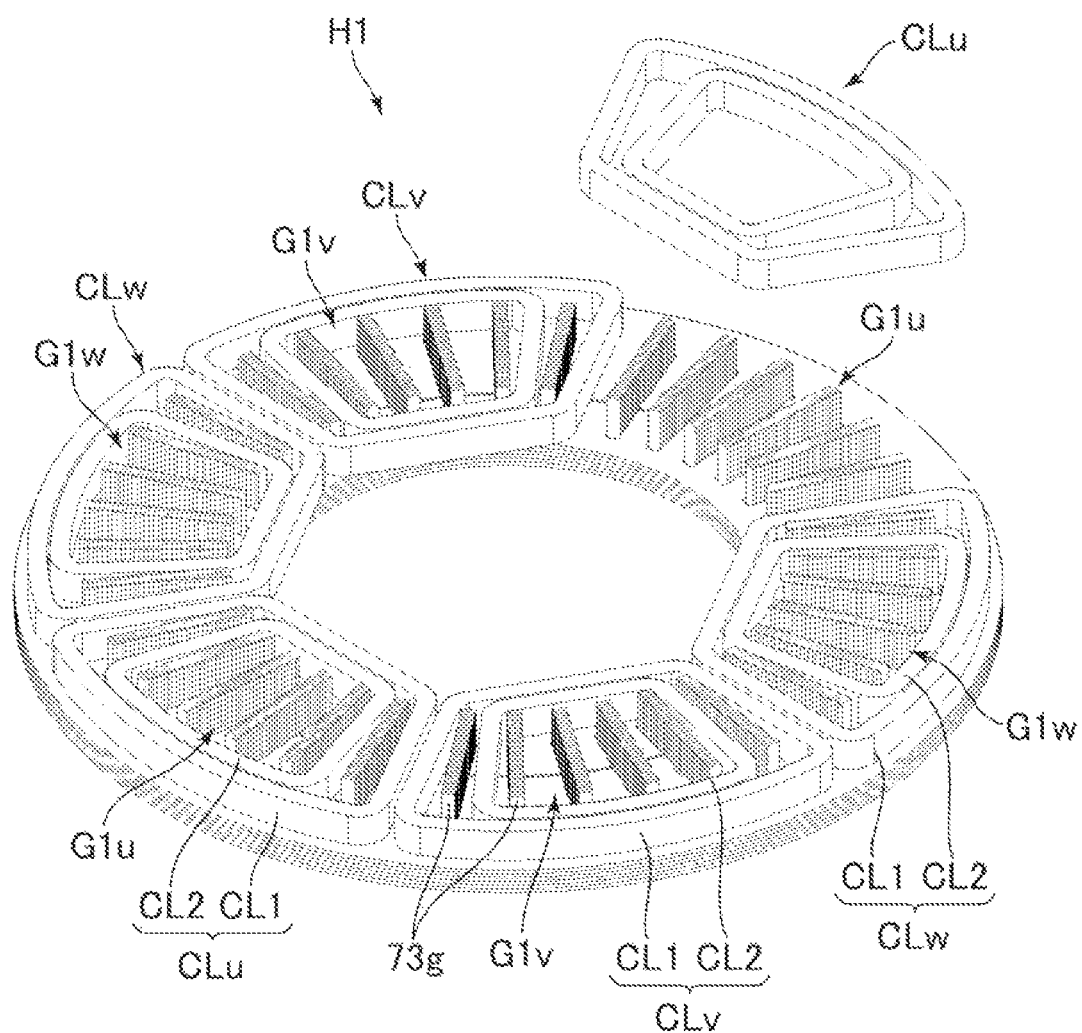

In FIGS. 58A and 58B, only one coil CL is provided on each magnetic pole group G1 of the first armature core H1. Alternatively, similarly to the rotary electric machine shown in FIGS. 57A and 57B, a plurality of coils CL may be provided in each magnetic pole group G1. The first armature core H1 shown in FIG. 60 is an example of the armature core having such a structure. Here, the difference from the rotary electric machine M27 described with reference to FIGS. 58A and 58B will be mainly described. The structures of the armature core H1 of the rotary electric machine M27 described in FIGS. 58A and 58B may be applied to the matters that are not described about the first armature core H1 shown in FIG. 60.

In FIG. 60, an outer coil CL1 and an inner coil CL2 are provided on each of a plurality of magnetic pole groups G1 of the first armature core H1. For example, the U phase magnetic pole group G1u is provided with an outer coil CL1 surrounding all magnetic poles 73g constituting the magnetic pole group G1u and an inner coil CL2 surrounding only some of the magnetic poles 73g. This also applies to a magnetic pole group G1v of V phase and a magnetic pole group G1w of W phase. In the example shown in FIG. 60, the inner coil CL2 is disposed concentrically with the outer coil CL1 and surrounds only the magnetic poles 73*g* in the middle (four magnetic poles 73*g*) of all magnetic poles 73*g* constituting the magnetic pole group G1*u*. This structure serves to effectively utilize a space between two adjacent magnetic poles 73*g*, and reduce the height of the coils CL in the axis direction, thereby reducing the thickness of the first armature core H1. The structure of the first armature core H1 shown in FIG. 60 may be applied to the second armature core H2.

Figure 61A:
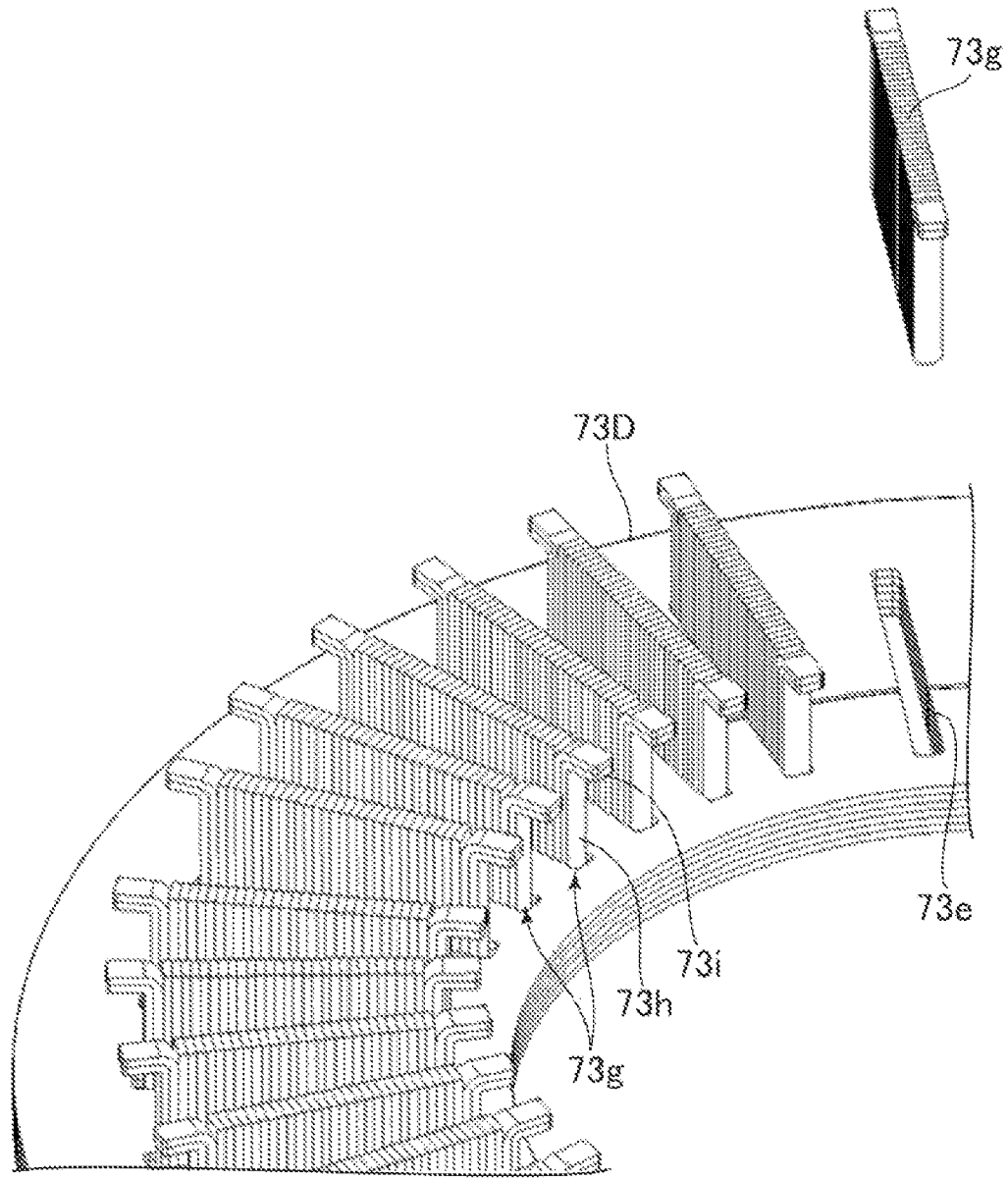

In the magnetic poles 73*g* of the rotary electric machine M27 shown in FIGS. 58A and 58B, the electrical steel sheets are arranged in the radial direction. In these electrical steels, the electrical steel sheet positioned at the end of the radial direction may be bent radially. FIG. 61A shows an example of such a magnetic pole 73*g*. Here, the differences from the magnetic pole 73*g* shown in FIGS. 58A and 58B will be described. The structure described with reference to FIGS. 59J to 58A may be applied to the matters that are not described in the armature core shown in FIG. 61A (e.g., the structure for preventing the induced current).

As shown in FIG. 61A, an electrical steel sheet 73*h* positioned at the end of the magnetic pole 73*g* may have a projecting portion 73*i* extending in the radial direction. The projecting portion 73*i* is formed at the end portion of electrical steel sheet 73*h* closer to the magnetic field portion Fs. The projecting portion 73*i* may be formed by bending the electrical steel sheet 73*h*. Such a projecting portion 73*i* may be formed on both the electrical steel sheet 73*h* positioned radially outward and the electrical steel sheet 73*h* positioned radially inward, or may be formed on only one of them. Further, the projecting portion 73*i* may be formed of a plurality of electrical steel sheets 73*h* (e.g., two or three) positioned at the end in the radial direction. The projecting portion 73*i* may not necessarily be formed by bending the electrical steel sheet 73*h*. For example, the end portion of the magnetic pole 73*g* in the radial direction may be formed of a powder material having a projecting portion 73*i* instead of an electrical steel sheet. The structure shown in FIG. 61A may be applied to the second armature core H2.

Figure 61B:
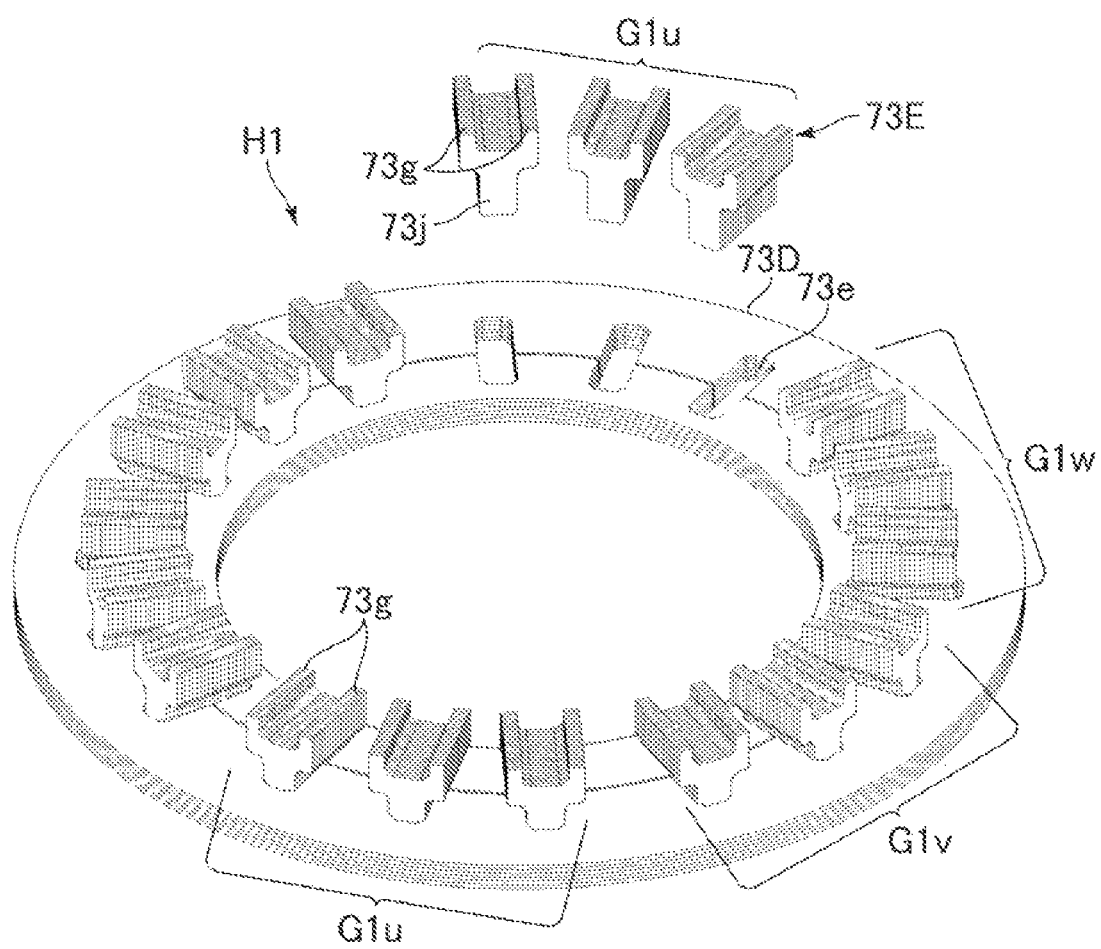

The plurality of magnetic poles 73*g* of the first armature core H1 shown in FIGS. 58A and 58B are respectively fitted into the plurality of fitting holes 73*e* formed in the yoke portion core 73D. Alternatively, the first armature core H1 may have a yoke partial core 73D and magnetic pole partial cores having a plurality of magnetic poles 73*g* separated from one another in the rotation direction. One magnetic pole partial core may be fitted into a fitting hole 73*e* formed in the yoke partial core 73D. FIG. 61B shows an example of such structures. Here, the differences from the first armature cores H1 shown in FIGS. 58A and 58B will be described. The structure described with reference to FIGS. 59J to 58A may be applied to the matters that are not described in the armature core H1 shown in FIG. 61B (e.g., the structure for preventing the induced current).

The armature core H1 shown in FIG. 61B has a yoke partial core 73D and a plurality of magnetic pole partial cores 73E arranged in the rotation direction. Each magnetic pole group G1 may be composed of a plurality of magnetic pole partial cores 73E. In the example shown in FIG. 61B, each magnetic pole group G1 is composed of three magnetic pole partial cores 73E. Each magnetic pole partial core 73E may have a plurality of magnetic poles 73*g* located away from each other in the rotation direction. In FIG. 61B, the magnetic pole partial core 73E has two magnetic poles 73*g* located away from each other in the rotation direction.

Each of the plurality of magnetic pole partial cores 73E may have a common base (fitting portion) 73*j*. The magnetic poles 73*g* extend from the base 73*j* in the axis direction. A plurality of fitting holes 73*e* arranged in the rotation direction are formed in the yoke partial core 73D. the bases 73*j* are fitted into the fitting holes 73*e* formed in the yoke partial core 73D. This structure serves to reduce the operation for fixing the magnetic poles 73*g* to the fitting holes 73*e* of the yoke partial core 73D. The structure of the first armature core H1 shown in FIG. 61B may be applied to the second armature core H2.

[Axial Gap Type Molded with Resin]

Figure 62:
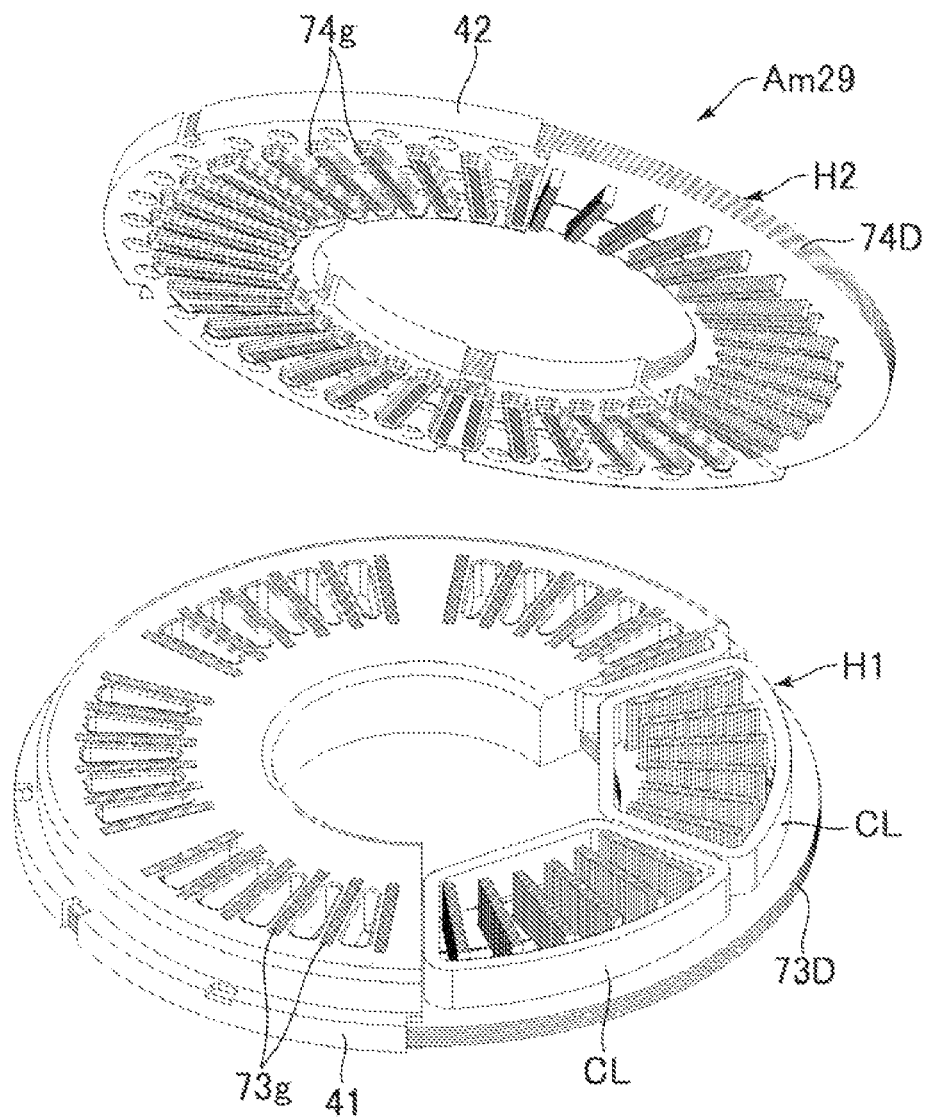

The armature portion of the radial gap type rotary electric machine described with reference to FIGS. 54A to 55 and the armature portion of the axial gap type rotary electric machine described with reference to FIGS. 56A to 61B may be solidified by a non-magnetic and insulating material. FIG. 62 is a diagram illustrating an armature portion Am29 of an axial gap type rotary electric machine as an example of such an armature portion. The structure of the armature portion shown in FIGS. 56A to 61B may be applied to the matters that are not described about the armature portion Am29.

The armature portion Am29 shown in FIG. 62 is solidified by a non-magnetic and insulating material. Specifically, the first armature core H1 is molded with a resin 41 in the armature portion Am29. That is, the first armature core H1 and the coil CL is immersed in molten resin and solidified. The second armature core H2 is molded with a resin 42. That is, the second armature core H2 is immersed in molten resin and solidified. In FIG. 62, a part of the resins 41 and 42 has been removed. The armature portion Am29 is thus molded with resin, and thereby preventing disconnection of the coil CL due to vibration and impact. Further, it is possible to prevent the magnetic poles 73*g* and 74*g* from falling off by fixing the magnetic poles 73*g* and 74*g*. In addition, the heat capacity of the armature portion Am29 can be increased, which alleviates the temperature rise at the time of driving the rotary electric machine. Further, the workability of assembling the rotary electric machine can be improved. The wire of the coil CL is pulled out of the resins 41 and 42 and is connected to a drive unit (not shown) such as an inverter. As shown in FIG. 62, a distal end surface of each of magnetic pole 73*g* and 74*g* may be exposed from the resins 41 and 42. This ensures a gap between the distal end surfaces of the magnetic poles 73*g* and 74*g* and the inner surface of the magnetic field portion Fs.

[Linear Electric Machine in which Armature Cores Arranged Oppositely Across Magnetic Field Portion]

The arrangement of the armature cores disclosed in FIG. 53 may be applied to a linear electric machine in which an armature portion and a magnetic field portion are relatively movable in a direction along a straight line. FIG. 63A is a perspective view of such a linear electric machine. In FIG. 63A, a part of the magnetic field portion Fs and a part of the second armature cores H2 are omitted. Here, the difference from the radial gap type rotary electric machine M24 described with reference to FIGS. 54A and 54B will be mainly described.

A linear electric machine M31 has a magnetic field portion Fs and an armature portion Am31. The magnetic field portion Fs and the armature portion Am31 are relatively movable in a direction along a straight line (i.e., "machine moving direction"). For example, the position of the magnetic field portion Fs is fixed and the armature portion Am31 reciprocates in the direction along the straight line. In this case, the magnetic field portion Fs may have a length corresponding to the range of motion of the armature portion Am31.

The armature portion Am31 has armature cores H1 and H2 spaced orthogonally from the machine moving direction. In armature portion Am31, the first armature core H1 and the second armature core H2 are disposed on opposite sides of magnetic field portion Fs. The first armature core H1 and the second armature core H2 are magnetically separated. That is, there is substantially no magnetic flux that flows between the first armature core H1 and the second armature core H2 without passing through the magnetic field portion Fs.

The first armature core H1 has a plurality of magnetic pole groups G1 (G1u, G1v, G1w) arranged in the machine moving direction. Each of the plurality of magnetic pole groups G1 has a plurality of magnetic poles 33a that are arranged in the machine moving direction and projecting toward the magnetic field portion Fs. The linear electric machine is a linear motor operated in three-phase AC, for example, and the first armature core H1 is provided with a U phase coil CLu, a V phase coil CLv, and a W phase coil CLw. These three coils CL are respectively provided in the three magnetic pole groups G1. The coils CLu, CLv and CLw are respectively wound around the magnetic pole groups G1u, G1v, and G1w. The first armature core H1 has a yoke portion 33c extending in the machine moving direction.

The second armature core H2 also has a plurality of magnetic pole groups G2 arranged in the machine moving direction. Each of the plurality of magnetic pole groups G2 has a plurality of magnetic poles 34a that are arranged in the machine moving direction and projecting toward the magnetic field portion Fs. The second armature core H2 has a yoke portion 34c extending in the machine moving direction. In the example shown in FIG. 63A, the coil CL is provided only in the first armature core H1, although the coil CL may be provided in both the first armature core H1 and the second armature core H2.

The two magnetic pole groups G1 and G2 opposed to each other across the magnetic field portion Fs constitute a magnetic pole group pair P. Similarly to the rotary electric machine M1 described referring to FIG. 1, a plurality of magnetic pole group pairs P arranged in the machine moving direction and the yoke portions 33c and 34c form a closed magnetic circuit. In the linear electric machine M31, an electrical angle between adjacent magnetic pole group pairs P is represented as 360×(n+m/s) as described with reference to FIG. 2, and is, for example, 2,280 degrees (s=3, m=1, n=6 in this linear electric machine).

The position of the magnetic pole 33a of the magnetic pole group G1 is apart from the position of the magnetic pole 34a of the magnetic pole group G2 by 180 degrees in electrical angle, for example. However, as shown in FIGS. 6A to 9B, for example, the distance (electrical angle) between the magnetic pole 33a of the magnetic pole group G1 and the magnetic pole 34a of the magnetic pole group G2 may not be 180 degrees or may vary depending on the position.

The armature cores H1 and H2 may be formed of a plurality of electrical steel sheets laminated in a direction perpendicular to the direction in which the armature cores H1 and H2 face each other and the machine moving direction. The direction in which the armature cores H1 and H2 face each other across the magnetic field portion is hereinafter referred to as a "core facing direction." Alternatively, one or both of the armature cores H1 and H2 may be a powder core formed of a powder material.

The electrical steel sheet positioned at the end of the lamination direction of the plurality of electrical steel sheets laminated in the direction perpendicular to both the core facing direction and the machine moving direction may have a projecting portion extending in the lamination direction. FIG. 63B shows an example of such a magnetic pole 33a. Here, the differences from the magnetic pole 33a shown in FIG. 63A will be described. The structure described with reference to FIG. 63A may be applied to the matters that are not described in the armature core shown in FIG. 63B.

As shown in the drawing 63B, the electrical steel sheet positioned at the end of the magnetic pole 33a may have a projecting portion 33m extending in the lamination direction. The projecting portion 33m is formed at the end portion of the electrical steel sheets closer to the magnetic field portion Fs. The projecting portion 33m may be formed by bending the electrical steel sheet. Such a projecting portion 33m may be formed in both or only one of one or more electrical steel sheets positioned at one end in the lamination direction and one or more electrical steel sheets positioned at the other end in the lamination direction. The projecting portion 33m may not necessarily be formed by bending the electrical steel sheet. For example, the end portion of the magnetic pole 33a in the lamination direction may be formed of a powder material having the projecting portion 33m instead of the electrical steel sheet. The structure shown in FIG. 63B may be applied to the second armature core H2.

[Examples of Armature Portion Units Arranged in Machine Moving Direction]

The armature portion may have a plurality of armature portion units arranged in the machine moving direction. Each armature portion unit may include, for example, the first armature core H1 and the second armature core H2 shown in FIG. 63A or FIG. 63B. FIG. 64 shows an example of a linear electric machine having such a structure. Here, the difference from the linear electric machine M31 described with reference to FIG. 63A will be mainly described. The structure of the linear electric machine M32 described in FIG. 63A may be applied to the matters that are not described about the linear electric machine M32 shown in FIG. 64.

The armature portion of the linear electric machine M32 shown in FIG. 64 may include a plurality of armature portion units Ua1 arranged in the machine moving direction. Each armature portion unit Ua1 may include a first armature core H1 and a second armature core H2. In a case where the linear electric machine M32 is a three-phase electric machine, for example, each armature portion unit Ua1 are composed of three magnetic pole group pairs P (magnetic pole group pair Pu of U phase, magnetic pole group pair Pv of V phase, magnetic pole group pair Pw of W phase). The structures of the armature cores H1 and H2 (the number of magnetic poles 33a and the number of magnetic pole groups G1) may be the same as the structures of the armature cores H1 and H2 shown in FIG. 63A. The length of the armature portion unit Ua1 in the machine moving direction is preferably an integral multiple of 360 degrees in electrical angle. The number of poles of magnetic field portion Fs may be determined so that the length of armature portion units Ua1 and the length of magnetic field portion Fs are substantially equal in the machine moving direction. The number of poles of magnetic field portion Fs is 38 (P=19), for example, and the length of armature portion unit Ua1 and the length of magnetic field portion Fs may be 6,840 degrees (360×P) in electrical angle in the machine moving direction.

[Linear Electric Machine Having Yoked Partial Core Formed of Electrical Steel Sheet]

In the linear electric machine, the armature cores H1 and H2 may have the yoke partial core formed of electrical steel sheets and the magnetic pole formed of electrical steel sheets and fitted into the fitting hole formed in the yoke partial core. FIGS. 65A and 65B are diagrams showing a linear electric machine M33 having such armature cores H1 and H2. Here, the differences from the linear electric machine M31 shown in FIG. 63A will be described. The structure described with reference to FIG. 63A may be applied to the matters that are not described about the armature cores H1 and H2 shown in FIGS. 65A and 65B.

The first armature core H1 has a yoke partial core 73D composed of electrical steel sheets laminated in the core facing direction. A plurality of fitting holes 73*e* arranged in the machine moving direction are formed in the yoke portion core 73D. A plurality of magnetic poles 73*g* are respectively fitted into the fitting holes 73*e*, and arranged in the machine moving direction. The magnetic pole 73*g* is formed of electrical steel sheets laminated in a direction perpendicular to both the core facing direction and the machine moving direction. The electrical steel sheets constituting the magnetic pole 73*g* and the electrical steel sheets constituting the yoke partial core 73D are perpendicular to each other. Coils CL are provided for a plurality of magnetic poles 73*g*, and a magnetic pole group G1 is composed of the plurality of magnetic poles 73*g* (five magnetic poles 73*g* in the example of FIG. 65A). The second armature core H2 has a yoke partial core 74D composed of electrical steel sheets laminated in the core facing direction. A plurality of fitting holes 74*e* arranged in the machine moving direction are formed in the yoke portion core 74D. The magnetic pole 74*g* is formed of electrical steel sheets laminated in a direction perpendicular to both the core facing direction and the machine moving direction. The electrical steel sheets constituting the magnetic pole 74*g* and the electrical steel sheets constituting the yoke partial core 74D are perpendicular to each other. The plurality of magnetic poles 74*g* are respectively fitted into the fitting holes 74*e*. In the example of FIG. 65A, six magnetic poles 74*g* constitute a magnetic pole group G2.

The yoke partial core 73D and the magnetic pole 73*g* may employ a structure for preventing the induced current described with reference to FIGS. 59A to 59J. For example, a slit S1 may be formed between adjacent fitting holes 73*e* (or adjacent fitting holes 74*e*).

The armature cores H1 and H2 constituting the armature portion of the linear electric machine may be solidified by a non-magnetic and insulating material. FIG. 66 shows an example of such an armature portion. The structure of the armature portion shown in FIGS. 63A to 65 may be applied to the matters that are not described about an armature portion Am34 shown in FIG. 66.

[Armature Portion Molded with Resin]

The armature portion Am34 shown in FIG. 66 is solidified by a non-magnetic and insulating material. Specifically, the first armature core H1 is molded with a resin 41 in the armature portion Am34. That is, the first armature core H1 and the coil CL is immersed in molten resin and solidified. The second armature core H2 is molded with a resin 42. That is, the second armature core H2 is immersed in molten resin and solidified. In FIG. 62, a part of the resins 41 and 42 has been removed. The armature portion Am34 is thus molded with resin, and thereby preventing disconnection of the coil CL due to vibration and impact. Further, it is possible to prevent the magnetic poles 73*g* and 74*g* from falling off by fixing the magnetic poles 73*g* and 74*g*. In addition, the heat capacity of the armature portion Am34 can be increased, which alleviates the temperature rise at the time of driving the linear electric machine. Further, the workability of assembling the linear electric machine can be improved. The wire of the coil CL is pulled out of the resins 41 and 42 and is connected to a drive unit (not shown) such as an inverter. As shown in FIG. 66, a distal end surface of each of magnetic pole 73*g* and 74*g* may be exposed from the resins 41 and 42. This ensures a gap between the distal end surfaces of the magnetic poles 73*g* and 74*g* and the inner surface of the magnetic field portion Fs.

[Linear Electric Machine Having Even Number Phases]

The number of phases of the alternating current supplied to the linear electric machine may be an even number. For example, the number of phases of the alternating current may be two. FIG. 67 shows a linear electric machine M35 having such a structure as another example of the linear electric machine proposed in the present disclosure. In FIG. 67, a part of the magnetic field portion Fs in the machine moving direction is not shown. In FIG. 67, a part of the second armature core H2 is omitted. Here, the difference from the linear electric machine M31 described with reference to FIG. 63A will be mainly described. The structure of the linear electric machine M31 described in FIG. 63A may be applied to the matters that are not described about the linear electric machine M35 shown in FIG. 67.

A plurality of coils CL provided in the first armature core H1 includes an A+ phase coil CLa+, a B+ phase coil CLb+, an A− phase coil CLa−, and a B− phase coil CLb−. The A− phase coil CLa− and the B− phase coil CLb− have the winding direction opposite to that of the A+ phase coil CLa+ and the B+ phase coil CLb+. The first armature cores H1 have a plurality of magnetic pole groups G1 arranged in the machine moving direction. The number of magnetic poles 33*a* included in each magnetic pole group G1 is three, for example, although the number may be larger than or smaller than three (in FIG. 67, G1a+, G1a−, G1b+, G1b− are shown as magnetic pole groups G1). The second armature cores H2 have a plurality of magnetic pole groups G2 arranged in the machine moving direction. The magnetic pole group G1 constitutes a magnetic pole group pair P together with the magnetic pole group G2.

Attention is now directed to two magnetic pole group pairs P in which the coils CL having the same phase and opposite winding directions are provided. For example, attention will be paid to a magnetic pole group pair P in which the A+ phase coil CLa+ is provided and a magnetic pole group pair P in which the A− phase coil CLa− is provided. The two magnetic pole group pairs P are apart from each other by substantially "360×(q+½)" degrees in electrical angle. In the example of FIG. 67, q is 8 and the two magnetic pole group pairs P are located away from each other by 3,060 degrees in electrical angle. In this description, the angle between the two magnetic pole group pairs P is specifically the angle (distance) between the center of magnetic pole group G1a+ and the center of magnetic pole group G1a− in the machine moving direction, or the angle (distance) between the center of magnetic pole group G2a+ and the center of magnetic pole group G2a− in the machine moving direction.

Attention is now paid to two magnetic pole group pairs P provided with coils CL having the same winding direction. For example, attention will be paid to a magnetic pole group pair P in which the A+ phase coil CLa+ is provided and a magnetic pole group pair P in which the B+ phase coil CLb+ is provided. As shown in FIG. 67, an electrical angle between the two magnetic pole group pairs P is represented as 360×(n+m/s/2) as described above with reference to FIG. 25C and is, for example, 1,530 degrees (in this linear electric machine M35, s=2, m=1, n=4).

[Linear Electric Machine Having Magnetic Pole Group of the Same Phase with Different Magnetic Flux Directions]

The linear electric machine may have magnetic pole groups of the same phase with different magnetic flux directions. The magnetic pole groups of the same phase may be adjacent to each other in the machine moving direction. FIG. 68 is a perspective view of such a linear electric machine. In FIG. 68, a part of the magnetic field portion Fs and a part of the second armature cores H2 are omitted. Hereinafter, the differences from the linear electric machine described above will be mainly described. In a linear electric machine M36 shown in FIG. 68, the structures of the other electric machines described above may be applied to the matters that are not related to the differences.

The linear electric machine M36 shown in FIG. 68 is a three-phase alternating current linear electric machine, and a first armature core H1 of the linear electric machine M36 includes a U+ phase magnetic pole group G1$u$+, a U phase magnetic pole group G1$u$−, a V+ phase magnetic pole group G1$v$+, a W+ phase magnetic pole group G1$w$+, a V− phase magnetic pole group G1$v$−, and a W− phase magnetic pole group G1$w$−. The magnetic pole groups G1 of the same phase are adjacent in machine moving direction. For example, the U+ phase magnetic pole group G1$u$+ and the U phase magnetic pole group G1$u$− are adjacent to each other. The same applies to magnetic pole groups of the other phases (i.e., V phase, W phase). In the example shown in FIG. 68, each magnetic pole group G1 has three magnetic poles 33*a*. The number of magnetic poles 33*a* in each magnetic pole group G1 may be less than or more than three.

In the linear electric machine M36, a coil CL is wound around a yoke portion 33*c* formed between two magnetic pole groups G1 of the same phase. For example, a U phase coil CLu is wound around the yoke portion 33*c* between the U+ phase magnetic pole group G1$u$+ and the U phase magnetic pole group G1$u$−. Further, a V phase coil CLv is wound around the yoke portion 33*c* between the V+ phase magnetic pole group G1$v$+ and the V− phase magnetic pole group G1$v$−, and a W phase coil CLw is wound around the yoke portion 33*c* between the W+ phase magnetic pole group G1$w$+ and the W− phase magnetic pole group G1$w$−.

The second armature core H2 has a plurality of magnetic pole groups G2 respectively facing the plurality of magnetic pole groups G1 of the first armature core H1. As such, the armature portion Am36 has six magnetic pole group pairs P (U+ phase, U phase, V+ phase, V− phase, W+ phase, W− phase magnetic pole group pairs).

The two magnetic pole group pairs P of the same phase and having opposite magnetic flux directions, such as the U+ phase magnetic pole group pair P and the U phase magnetic pole group pair P, are substantially 360×(q+½) degrees apart in electrical angle (q is an integer greater than or equal to 1). In the linear electric machine M36, q=4, and the U+ phase magnetic pole group pair P and the U phase magnetic pole group pair P are located away from each other by 1,620 degrees in electrical angle. The same applies to magnetic pole group pairs of the other phases (i.e. V phase, W phase).

Attention is directed to two magnetic pole group pairs P having the same direction of magnetic fluxes. For example, attention will be paid to the U+ phase magnetic pole group pair P and the V+ phase magnetic pole group pair P. At this time, the electrical angle between the two magnetic pole group pairs P is expressed as "360×(n+m/s)" and is, for example, 3,000 degrees (in this linear electric machine M36, s=3, m=1, n=8).

As described, in the linear electric machine M36 in which two magnetic pole group pairs P of the same phase and having different magnetic flux directions are adjacent to each other in the machine moving direction (e.g., U+ phase magnetic pole group pair P and U phase magnetic pole group pair P), the magnetic flux does not flow between two magnetic pole group pairs having the same magnetic flux direction (e.g., U+ phase magnetic pole group pair P and V+ phase magnetic pole group pair P). As such, the first armature core H1 may have a plurality of partial cores 33B. Further, each partial core 33B may include magnetic pole groups G1 of the same phase and having different magnetic flux directions and yoke portions 33*c* therebetween (e.g., U+ phase magnetic pole group G1$u$+ and U phase magnetic pole group G1$u$−).

[Linear Electric Machine Having Armature Core Formed of Powder Material]

The armature cores H1 and H2 of the linear electric machine described above are made of electrical steel sheets. However, in the linear electric machine as well, the armature cores H1 and H2 may be a powder core formed of a soft magnetic powder material. FIGS. 69A and 69B are perspective views of such a linear electric machine. In FIGS. 69A and 69B, a part of the magnetic field portion Fs and a part of the second armature cores H2 are omitted. Hereinafter, the differences from the linear electric machine described above will be mainly described. In a linear electric machine M37 shown in FIGS. 69A and 69B, the structures of the other electric machines described above may be applied to the matters that are not related to such differences (e.g., the distance (electrical angle) between the magnetic pole group pairs P and the structures of magnetic field portion Fs).

The armature portion Am37 of the linear electric machine M37 has a first armature core H1 and a second armature core H2 facing each other in the direction intersecting with the machine moving direction. The first armature cores H1 have a plurality of magnetic pole groups G1 arranged in the machine moving direction. The magnetic pole group G1 has magnetic poles 33*a* projecting towards the second armature core H2 in the core facing direction. The first armature core H1 may include a yoke portion 33*c* having a thick plate shape. A base 33*v* is formed on the inner surface of the yoke portion 33*c* (the surface facing the second armature core H2). A plurality of magnetic poles 33*a* (five magnetic poles in FIGS. 69A and 69B) arranged in the machine moving direction may be formed inside the base 33*v*. A Coil CL is wound around the magnetic poles 33*a*.

In the first armature core H1, the magnetic pole groups G1 are magnetically coupled by the yoke portions 33*c*. Similarly to the first armature core H1 of the rotary electric machine M25 shown in FIG. 56C, the width of the yoke portion 33*c* is larger than the width in the magnetic pole 33*a*. In this description, the width of yoke portion 33*c* and the width of magnetic pole 33*a* are the widths in the direction perpendicular to both the core facing direction and the machine moving direction. This increases the cross-sectional area of the magnetic path formed by the yoke portion 33, and thereby reducing the thickness of the first armature core H1.

A plurality of recessed portions 34*b* arranged in the machine moving direction are formed on the surface of the second armature core H2 facing the magnetic field portion Fs. The portion (convex portion) between two adjacent recessed portions 34*b* functions as a magnetic pole 34*a*. A width of each magnetic pole 34*a* is larger than the width of magnetic field portion Fs. The yoke portion 34*c* of the second armature core H2 is larger than the width of the recessed portion 34*b*. In this description, the width of magnetic pole 34*a*, the width of the recessed portion 34*b*, and the width of the yoke portion 34c of the second armature core H2 are the widths in the direction perpendicular to both the core facing direction and the machine moving direction. This increases the cross-sectional area of the magnetic path formed in the second armature core H2, which serves to the reduce the thickness of the second armature core H2. Further, the magnetic pole 34a is formed with the use of the recessed portion 34b in this manner, and the strength of magnetic pole 34a can be thereby increased.

In the first armature core H1 of the linear electric machine M37 shown in FIG. 69A, similarly to the armature core H1 described with reference to FIGS. 57A and 57B, a plurality of coils may also be provided in each magnetic pole group G1. That is, an outer coil CL1 wound around a plurality of magnetic poles 33a constituting a magnetic pole group G1 and an inner coil CL2 disposed inside the outer coil CL1 and surrounding only some of magnetic poles 33a may be provided. The first armature core H1 shown in FIG. 70 is an example of the armature core having such a structure. Here, the differences from the first armature core H1 shown in FIG. 69A will be described. The example of FIG. 69A may be applied to the matters that are not described about the first armature cores H1 shown in FIG. 70.

In the first armature core H1 shown in FIG. 70, an outer coil CL1 and an inner coil CL2 may be provided on each magnetic pole group G1. For example, a U phase magnetic pole group G1u is provided with an outer coil CL1 surrounding all magnetic poles 33a (five magnetic poles 33a) constituting the magnetic pole group G1u and an inner coil CL2 surrounding only some of the magnetic poles 33a. In the example shown in FIG. 70, the inner coil CL2 is disposed concentrically with the outer coil CL1 and surrounds only the magnetic pole 33a in the middle (three magnetic poles 33a) of all magnetic poles 33a constituting the magnetic pole group G1u. With this structure, a space between two adjacent magnetic poles 33a can be effectively used. Further, the thickness of the coil CL in the core facing direction can be reduced, and the thickness of the first armature core H1 can be thereby reduced. In the first armature core H1 shown in FIG. 70, a gap in which the outer coil CL1 is disposed (a gap between two magnetic poles 33a) may be deeper than a gap between the magnetic poles 33a inside the inner coil CL2. Further, a gap in which the inner coil CL2 is disposed (a gap between two magnetic poles 33a) may be deeper than a gap between the magnetic poles 33a inside the inner coil CL2. This can increase the number of turns of the coils CL1 and CL2.

The structure of the first armature core H1 shown in FIG. 70 may be applied to the second armature core H2 shown in FIG. 69A, for example. The structure shown in FIG. 70 (two coils CL1 and CL2) may be applied to the first armature cores H1 of the linear electric machine shown in other drawings. The number of coils provided in one magnetic pole group is not limited to two, and three or more coils may be provided.

[Electric Machine in which Moving Portion Moves Along Curves]

The structures of the linear electric machine described with reference to FIGS. 63A to 70 may be applied to an electric machine for enabling movement of a movable portion along curves. FIG. 71A shows an example of an electric machine for enabling such movement. The differences from the linear electric machine M31 described in FIG. 63A will be described. The examples of FIG. 63A may be applied to the matters that are not described about the electric machine M38 shown in FIG. 71A. The structures of the other linear electric machines disclosed in this specification may be applied to the electric machine described with reference to FIG. 71A.

An electric machine M38 shown in FIG. 71A has a curved magnetic field portion Fs. The magnetic field portion Fs may be formed in an annular shape, for example. That is, both ends of the magnetic field portion Fs may be connected to each other. An armature portion Am38 is provided on a part of the curved magnetic field portion Fs. In other words, the length of magnetic field portion Fs in the machine moving direction is longer than the armature portion Am38 in the same direction. In the electric machine M38, for example, the position of the magnetic field portion Fs may be fixed and the armature portion Am38 may move circumferentially along the magnetic field portion Fs. In contrast, the position of the armature portion Am38 may be fixed and the magnetic field portion Fs may move.

The armature portion Am38 has a first armature core H1 and a second armature core H2, which face each other across a portion of the magnetic field portion Fs. In the examples shown in FIG. 71A, the first armature core H1, on which the coils CL are provided, is located inside the magnetic field portion Fs, and the second armature core H2 is located outside the magnetic field portion Fs. The portion of the first armature core H1 facing the magnetic field portion Fs (i.e., the arrangement of the magnetic pole group G1 and the arrangement of the magnetic pole 33a) may be curved in accordance with the magnetic field portion Fs. Similarly, the portions of the second armature core H2 facing magnetic field portion Fs, i.e., magnetic pole group G2 and magnetic pole 34a arrangements, may be curved to conform to magnetic field portion Fs of the second armature core H2. The magnetic field core of the magnetic field portion Fs is preferably exposed to the inside and outside of the curved magnetic field portion Fs.

Unlike the illustrated 71A, the magnetic field portion Fs may have an arc shape having both ends. In this case, the movable portion (e.g., armature portion Am38) may reciprocate along the magnetic field portion Fs.

As yet another example, in the electric machine for enabling the movement of the movable portion along the curved line, the armature cores H1 and H2 are not limited to the example shown in FIG. 71A. For example, the structure of the linear electric machine M32 shown in FIG. 64 may be applied to the electric machine for enabling the movement of the movable portion. That is, the electric machine may have an armature portion having a plurality of armature portion units Ua1 arranged along the curve, for example. The magnetic field portion Fs may be provided only on a part of the armature portion.

Further, in the electric machine for enabling the movement of the movable portion along the curved line, the arrangement of the armature cores H1 and H2 is not limited to the example shown in FIG. 71A. For example, the first armature core H1 and the second armature core H2 may be disposed on opposite sides across the magnetic field portion Fs in a direction perpendicular to a plane including the curved magnetic field portion Fs. FIG. 71B shows an example of the electric machine having such an arrangement of armature cores H1 and H2. Here, the difference from the electric machine M38 described in FIG. 71A will be mainly described. The examples of FIG. 71A may be applied to the matters that are not described about the electric machine M39 shown in FIG. 71B. The structures of the other linear electric machines disclosed in this specification may be applied to the electric machine described with reference to FIG. 71B.

An electric machine M39 shown in FIG. 71B has a curved magnetic field portion Fs. An armature portion Am39 is provided on a part of the curved magnetic field portion Fs. Armature portion Am39 has a first armature core H1 and a second armature core H2, which face each other across a portion of the magnetic field portion Fs in a direction V1 perpendicular to a plane containing the curved magnetic field portion Fs. In the example shown in FIG. 71B, the first armature core H1, on which the coils CL are provided, is located below the magnetic field portion Fs, and the second armature core H2 is located above the magnetic field portion Fs. In the electric machine M39, for example, the position of the magnetic field portion Fs may be fixed and the armature portion Am39 may move circumferentially along the magnetic field portion Fs. In contrast, the position of the armature portion Am39 may be fixed and the magnetic field portion Fs may move.

In the example of FIG. 71B, similarly to the armature cores H1 and H2 described in FIG. 69A. the armature cores H1 and H2 may be a powder core formed of a soft magnetic powder material. The material of the armature cores H1 and H2 of the armature portion Am39 are not limited this example, and may be formed of laminated electrical steel sheets, for example, similarly to the armature cores H1 and H2 of the linear electric machine M33 shown in FIG. 65A.

The plurality of magnetic pole groups G1 constituting the first armature core H1 may be arranged along an arc corresponding to the magnetic field portion Fs. The magnetic pole 33a constituting the magnetic pole group G1 may also be arranged along the arc corresponding to the magnetic field portion Fs. Similarly, a plurality of magnetic pole groups G2 constituting the second armature cores H2 may be arranged along an arc corresponding to the magnetic field portion Fs. Magnetic pole 34a constituting each magnetic pole group G2 may also be arranged along a circular arc corresponding to each magnetic field portion Fs.

Unlike the example of FIG. 71B, the magnetic field portion Fs may have an arc shape having both ends. In this case, the movable portion (e.g., armature portion Am39) may reciprocate along the magnetic field portion Fs. As yet another example, the structure of the linear electric machine M32 shown in FIG. 64 may be applied to the electric machine for enabling the movement of the movable portion along the curves. That is, the electric machine may have an armature portion having a plurality of armature portion units Ua1 arranged along the curve, for example. The magnetic field portion Fs may be provided only on a part of the armature portion.

[Modification Example of Arrangement of Armature Core]

FIG. 53 shows the electric machine M23 in which the first armature core H1 and the second armature core H2 are disposed on opposite sides across the magnetic field portion Fs. The first armature core H1 and the second armature core H2 are not limited to this example. For example, the first armature core H1 may be disposed in a first direction with respect to the magnetic field portion Fs, and the second armature core H2 may be disposed in a second direction with respect to the magnetic field portion Fs. The angle formed by the second direction and the first direction may be smaller than 180 degrees. That is, the position of the second armature core H2 may not be on the opposite side of the first armature core H1. For example, the angle formed by the second direction and the first direction may be 90 degrees or 120 degrees. The magnetic field portion Fs of the electric machine M23 has a rectangular cross-section, but is not limited thereto. The cross-section may be a polygon such as a triangle and a pentagon or more, or a circle. The armature cores H1 and H2 of the electric machine M23 are opposed to one surface of the magnetic field portion Fs, but not limited thereto, and may be opposed to a plurality of surfaces, or opposed in an arc shape. FIGS. 72 to 76B are schematic diagrams illustrating such an electric machine. Here, the difference from the electric machine M23 shown in FIG. 53 will be mainly described. The matters that are not described about the electric machines M41 to M45 shown in FIGS. 72 to 76B (e.g., the positional relationship between the magnetic pole group and the magnetic field core of the magnetic field portion in the machine moving direction) may be the same as those in the example of FIG. 53.

In an electric machine M41 shown in FIG. 72, the first armature core H1 is positioned from the magnetic field portion Fs in a first direction D1 perpendicular to the direction of relative movement of the magnetic field portion Fs and the armature portion Am41 (i.e., the machine moving direction, that is, the direction perpendicular to the document paper in FIG. 72). The magnetic field portion Fs has a rectangular cross-section. In other words, the magnetic field portion Fs has an upper surface, a lower surface, a right side surface, and a left side surface. The first armature core H1 is opposed to the surface of the magnetic field portion Fs facing the first direction D1 (in FIG. 72, the right side surface). On the other hand, the second armature core H2 is positioned with respect to the magnetic field portion Fs in a second direction D2 perpendicular to both the machine moving direction and the first direction D1. The second armature core H2 is opposed to the surface of the magnetic field portion Fs facing the second direction D2 (in FIG. 72, the upper surface). The first armature core H1 and the second armature core H2 are magnetically separated in the same manner as the rotary electric machine M1 shown in FIG. 1A, for example. That is, there is substantially no magnetic flux that flows between the first armature core H1 and the second armature core H2 without passing through the magnetic field portion Fs. The magnetic flux formed by the magnets of the magnetic field portion Fs flows through the yoke portion 33c from one of the two magnetic pole groups G1 toward the other in the first armature core H1, and flows through the yoke portion 34c from one of the two magnetic pole groups G2 toward the other in the second armature core H2. Such an arrangement of the armature cores H1 and H2 may be applied to either the rotary electric machine or the linear electric machine.

In an electric machine M42 shown in FIG. 73, the first armature core H1 is positioned with respect to the magnetic field portion Fs in a first direction D1 perpendicular to the direction of relative movement of the magnetic field portion Fs and the armature portion Am42 (i.e., the machine moving direction, the direction perpendicular to the sheet surface in FIG. 73). The magnetic field portion Fs has a rectangular cross-section. In other words, the magnetic field portion Fs has four corners. The first armature core H1 faces a first corner Ag1 of the magnetic field portion Fs. The surface of the first armature core H1 facing the magnetic field portion Fs, i.e., the end surface of the magnetic pole 33a, has two inclined surfaces respectively facing the two surfaces forming the first corner Ag1 of the magnetic field portion Fs. The second armature core H2 is positioned with respect to magnetic field portion Fs in the second direction D2 perpendicular to the machine moving direction and the first direction D1. The second armature core H2 faces a second corner Ag2 (a corner formed by two surfaces) of the magnetic field portion Fs. The surface of the second armature core H2 facing the magnetic field portion Fs, i.e., the end surface of the magnetic pole 34a, has two inclined surfaces respectively facing the two surfaces forming the second corner Ag2 of the magnetic field portion Fs. The first armature core H1 and the second armature core H2 are magnetically separated in the same manner as the rotary electric machine M1 shown in FIG. 1A, for example. The magnetic flux formed by the magnets of the magnetic field portion Fs flows through the yoke portion 33c from one of the two magnetic pole groups G1 toward the other in the first armature core H1, and flows through the yoke portion 34c from one of the two magnetic pole groups G2 toward the other in the second armature core H2. Such an arrangement of the armature cores H1 and H2 may be applied to either the rotary electric machine or the linear electric machine.

In an electric machine M43 shown in FIG. 74, the first armature core H1 is positioned with respect to the magnetic field portion Fs in a first direction D1 perpendicular to the direction of relative movement of the magnetic field portion Fs and the armature portion Am43 (i.e., the machine moving direction, the direction perpendicular to the sheet surface in FIG. 72). The magnetic field portion Fs has a triangular cross-section. In other words, the magnetic field portion Fs has a first surface Su1, a second surface Su2, and a third surface. The first armature cores H1 is opposed to the surface of the magnetic field portion Fs facing the first direction D1 (the first surface Su1 in FIG. 74). The second armature core H2 is positioned with respect to the magnetic field portion Fs in the second direction D2 perpendicular to the machine moving direction and oblique to the first direction D1. The angle θ formed by the second direction D2 and the first direction D1 is, for example, 120 degrees. The second armature cores H2 is opposed to the surface of the magnetic field portion Fs facing the second direction D2 (the second surface Su2 in FIG. 74). The first armature core H1 and the second armature core H2 are magnetically separated in the same manner as the rotary electric machine M1 shown in FIG. 1A, for example. The magnetic flux formed by the magnets of the magnetic field portion Fs flows through the yoke portion 33c from one of the two magnetic pole groups G1 toward the other in the first armature core H1, and flows through the yoke portion 34c from one of the two magnetic pole groups G2 toward the other in the second armature core H2. Such an arrangement of the armature cores H1 and H2 may be applied to either the rotary electric machine or the linear electric machine.

In an electric machine M44 shown in FIG. 75, the first armature core H1 is positioned with respect to the magnetic field portion Fs in a first direction D1 perpendicular to the direction of relative movement of the magnetic field portion Fs and the armature portion Am44 (i.e., the machine moving direction, the direction perpendicular to the sheet surface in FIG. 75). The magnetic field portion Fs has a circular cross-section. The surface of the first armature core H1 facing the magnetic field portion Fs, i.e., the end surface of the magnetic pole 33a, may be curved in accordance with the outer surface of the magnetic field portion Fs. The second armature core H2 is positioned with respect to the magnetic field portion Fs in the second direction D2 perpendicular to the machine moving direction. In the example shown in FIG. 75, the angle formed by the second direction D2 and the first direction D1 is 90 degrees, but may be larger than or smaller than 90 degrees. The surface of the second armature core H2 facing the magnetic field portion Fs, i.e., the end surface of the magnetic pole 34a, may be curved in accordance with the outer surface of the magnetic field portion Fs. The first armature core H1 and the second armature core H2 are magnetically separated in the same manner as the rotary electric machine M1 shown in FIG. 1A, for example. The magnetic flux formed by the magnets of the magnetic field portion Fs flows through the yoke portion 33c from one of the two magnetic pole groups G1 toward the other in the first armature core H1, and flows through the yoke portion 34c from one of the two magnetic pole groups G2 toward the other in the second armature core H2. Such an arrangement of the armature cores H1 and H2 may be applied to either the rotary electric machine or the linear electric machine.

FIGS. 76A and 76B are diagrams illustrating a linear electric machine M45 as a specific example of the electric machine M44 shown in FIG. 75.

The armature portion of the linear electric machine M45 has two first armature cores H1 and two second armature cores H2. The two second armature cores H1 are positioned opposite to each other across the magnetic field portion Fs in a direction perpendicular to an extending direction (machine moving direction) of the magnetic field portion Fs. Similarly, the two second armature cores H2 are also positioned opposite to each other across the magnetic field portion Fs in a direction perpendicular to the machine moving direction. The two first armature cores H1 are positioned with respect to the magnetic field portion Fs in a first direction D1 perpendicular to the machine moving direction. The two second armature cores H2 are positioned with respect to the magnetic field portion Fs in a second direction D2 perpendicular to the machine moving direction. In the example shown in FIG. 76B, the first direction D1 and the second direction D2 are orthogonal to each other. The arrangement of the armature cores H1 and H2 is not limited to the examples shown in FIGS. 76A and 76B. For example, the angle formed by the first direction D1 for one first armature core H1 and the second direction D2 for one second armature core H2 may be less than 90 degrees.

In the linear electric machine M45, the magnetic field portion Fs is a rod-like shape having a circular cross-section. A support shaft for supporting the magnetic field portion Fs may be fitted inside the magnetic field portion Fs. The support shaft may be formed of a non-magnetic material, such as stainless steel. The inner surfaces of the armature cores H1 and H2, which faces the magnetic field portion Fs, may be curved in accordance with the outer surface of the magnetic field portion Fs. This serves to equalize the distances between the magnetic poles 33a and 34a of the armature cores H1 and H2 and the magnetic field portion Fs.

The armature cores H1 and H2 may be formed of a plurality of electrical steel sheets laminated in a direction perpendicular to the machine moving direction. For example, the first armature core H1 positioned in the first direction D1 with respect to the magnetic field portion Fs is formed of electrical steel sheets laminated in a direction perpendicular to both the machine moving direction and the first direction D1. Similarly, the second armature cores H2 positioned in the second direction D2 with respect to the magnetic field portion Fs is formed of electrical steel sheets laminated in a direction perpendicular to both the machine moving direction and the second direction D2.

A plurality of electrical steel sheets 33s constituting the first armature cores H1 may have the same shape. As shown in FIG. 76B, the electrical steel sheets 33s having the same shape may be laminated such that the inner surface of the first armature core H1 (the surface facing the magnetic field portion Fs) is a curved surface in accordance with the outer surface of the magnetic field portion Fs. That is, the relative position of the two adjacent electrical steel sheets 33s may be shifted in accordance with the outer surface of the magnetic field portion Fs. Similarly, a plurality of electrical steel sheets 34*s* constituting the second armature cores H2 may have the same shape. As shown in FIG. 76B, the electrical steel sheets 34*s* having the same shape may be laminated such that the inner surface of the second armature core H2 (the surface facing the magnetic field portion Fs) is a curved surface in accordance with the outer surface of the magnetic field portion Fs. That is, the relative position of the two adjacent electrical steel sheets 34*s* may be shifted in accordance with the outer surface of the magnetic field portion Fs.

In the first armature core H1, each magnetic pole group G1 is composed of four magnetic poles 33*a*, for example. In the second armature cores H2, each magnetic pole group G2 is composed of five magnetic poles 34*a*, for example. The number of magnetic poles 33*a* and 34*a* constituting the magnetic pole groups G1 and G2 is not limited to this example.

Two magnetic pole groups G1 and G2 to make a pair across the magnetic field portion Fs constitute a magnetic pole group pair P. Similarly to the rotary electric machine M1 described referring to FIG. 1, a plurality of magnetic pole group pairs P arranged in the machine moving direction and the yoke portions 33*c* and 34*c* form a closed magnetic circuit. In linear electric machine M45, an electrical angle between adjacent magnetic pole group pairs P is represented as 360×(n+m/s) as described above with respect to FIG. 2, and is, for example, 1,920 degrees (s=3, m=1, n=5 in this linear electric machine M45).

[Electric Machine Having a Plurality of Armature Cores Disposed on One Side of Magnetic Field Portion]

FIGS. 77A and 77B are schematic diagrams illustrating still another example of the electric machine. In the following, electric machines M50 and M51 respectively shown in FIGS. 77A and 77B will be described focusing on differences from the electric machines described above. The structures of electric machines M50 and M51 may be applied to any of a linear electric machine, a radial gap type rotary electric machine, and an axial gap type rotary electric machine.

The electric machine M50 shown in FIG. 77A has a plurality of armature portions Am50. Each armature portion Am50 is composed of armature cores H1 and H2. The armature cores H1 and H2 are positioned in a direction perpendicular to the machine moving direction and in the same direction with respect to the magnetic field portion Fs (in FIG. 77A, the machine moving direction is perpendicular to the sheet surface). In this description, the direction in which the armature portion Am50 is positioned with respect to magnetic field portion Fs is referred to as an "armature portion direction." In FIG. 77A, the armature portion direction is the right direction. In a radial gap type rotary electric machine, the armature portion is, for example, outside the magnetic field portion Fs in the radial direction or inside the magnetic field portion Fs in the radial direction. In the electric machine M50, the armature portions Am50 are arranged in a direction perpendicular to both the machine moving direction and the armature portion direction. In each armature portion Am50, the armature cores H1 and H2 are also arranged in a direction perpendicular to both the machine moving direction and the armature portion direction. The first armature core H1 and the second armature core H2 are arranged alternately in a direction perpendicular to both the machine moving direction and the armature portion direction.

The positions of magnetic pole group pairs P of the same phase provided in two armature portions Am50 arranged in the direction perpendicular to both the machine moving direction and the armature portion direction, i.e., the vertical direction in FIG. 77A, may not match in the machine moving direction. For example, the U phase magnetic pole group pair P of the armature portion Am50 disposed on the lower side of FIG. 77A and the U phase magnetic pole group pair P of the armature portion Am50 disposed on the upper side of FIG. 77A may be shifted or match in the machine moving direction. The electric machine M50 shown in FIG. 77A has two armature portions Am50, although the numbers of armature portions Am50 is not limited thereto, and may be three or more, or one. The rotary electric machine M3 shown in FIG. 12A is a specific example of a case where the number of armature portions Am50 is one.

The electric machine M51 shown in FIG. 77B will be described focusing on differences from the electric machine M50 shown in FIG. 77A. In the electric machine M51, the armature portion Am51 is positioned with respect to the magnetic field portion Fs in a direction perpendicular to the machine moving direction. In the armature portion Am51, the first armature core H1 is arranged between two second armature cores H2. The first armature core H1 of this armature portion Am51 is formed by integrating the first armature cores H1 shown in FIG. 77A. That is, the magnetic pole groups G1 of the two first armature cores H1 shown in FIG. 77A are integrated, and a common coil CL is wound around the integrated magnetic pole groups G1. This serves to reduce the number of components of electric machine M50. In this case, the width of the first armature core H1 (the width in a direction V1 perpendicular to both the machine moving direction and the armature portion direction) may be larger than the width of one second armature core H2. For example, the width of the first armature core H1 may be substantially the same as twice the width of one second armature core H2. In the electric machine M51, the first armature cores H1 disposed between the two second armature cores H2 may not necessarily be integrated. That is, the two first armature cores H1 shown in FIG. 77A may be disposed between two second armature cores H2. The radial gap type rotary electric machine M1 shown in FIG. 1A, the linear electric machine M30 shown in FIG. 48A, and the axial gap type rotary electric machine M40 shown in 49A are examples of the electric machine M51 shown in FIG. 77B.

FIGS. 78A, 78B, and 79 are diagrams illustrating linear electric machines M52, M53, and M54 as a specific example of the electric machine M51 shown in FIG. 77B. In the following, the linear electric machines M52, M53, and M54 will be described focusing on differences from the linear electric machines described above. In the linear electric machines M52, M53, and M54 shown in FIGS. 78A, 78B, and 79, the structures of the other electric machines described herein may be applied to the matters that are not related to the differences.

The linear electric machine M52 shown in FIG. 78A has a plurality of armature portion Am52 arranged in the machine moving direction. The plurality of armature portion Am52 may be interconnected so as to move integrally in the machine moving direction. This serves to increase the power obtained from the linear electric machine M52. In the example of the linear electric machine M52, two armature portions Am52 are disposed side-by-side. The two armature portions Am52 may be interconnected so as to move integrally in the machine moving direction.

The structure of each armature portion Am52 may be the same as, for example, the armature portion Am30 shown in FIG. 48A. That is, each armature portion Am52 may include two second armature cores H2 and a first armature core H1 disposed between the second armature cores H2. The width of the first armature core H1 (the width in a direction V1 perpendicular to both the machine moving direction and the armature portion direction) is larger than the width of one second armature core H2. For example, the width of the first armature core H1 may be substantially the same as twice the width or greater than twice the width of one second armature core H2.

Each armature portion Am52 has a plurality of magnetic pole group pairs P arranged in the machine moving direction. The linear electric machine M52 operates in three-phase alternating current, for example, and includes a magnetic pole group pair P to which a coil CLu is applied, a magnetic pole group pair P to which a coil CLv is applied, and a magnetic pole group pair P to which a coil CLw is applied (see FIG. 48B for the coils CLw, CLu, CLv). In the linear electric machine M52, an electrical angle between adjacent magnetic pole group pairs P is represented as 360×(n+m/s) as described with reference to FIG. 2, and is, for example, 2,280 degrees (s=3, m=1, n=6 in the linear electric machine M52).

The linear electric machine M53 shown in FIG. 78B has a plurality of armature portions Am53 arranged in the machine moving direction. Unlike the example in FIG. 78A, the plurality of armature portions Am53 are separated from each other and can move separately in the machine moving direction. The armature portions Am53 may be respectively connected to a plurality of inverters and controlled separately by a plurality of controllers. In the example of the linear electric machine M53, two armature portions Am53 are disposed side-by-side. The two armature portions Am52 are separated from each other in the machine moving direction and can move separately. The structures of the respective armature portions Am53, such as the positions of magnetic poles 33a and 34a and the arrangement of the coils CL, may be the same as the armature portion Am30 shown in FIG. 48A, in other words, the armature portion Am52 shown in FIG. 78A.

The linear electric machine M54 shown in FIG. 79 has a plurality of armature portions Am54 arranged in the machine moving direction. The plurality of armature portions Am54 are interconnected in the machine moving direction. In the linear electric machine M54, the magnetic field portion Fs is a movable portion. The total length of the armature portions Am54 in the machine moving direction is determined in accordance with the movable range of the magnetic field portion Fs. A length of each armature portion Am54 in electrical angle in the machine moving direction corresponds to, for example, the product of an electric angle of 360 degrees and the number of poles of the magnetic field portion Fs/2. In the linear electric machine M54, the number of poles of magnetic field portion Fs is 38, for example, and a length of each armature portion Am54 may be 6,840 degrees in electrical angle. In the linear electric machine M54, an electrical angle between adjacent magnetic pole group pairs P is represented as 360×(n+m/s) as described with reference to FIG. 2, and is, for example, 2,280 degrees (s=3, m=1, n=6 in this linear electric machine M54).

[Electric Machine in which Magnetic Field Portion is Disposed Between Two Armature Portions]

FIGS. 80A and 80B are schematic diagrams showing still another example of an electric machine. In the following, electric machines M55 and M56 respectively shown in FIGS. 80A and 80B will be described focusing on differences from the electric machines described above. The structures of electric machines M55 and M56 may be applied to any of a linear electric machine, a radial gap type rotary electric machine, and an axial gap type rotary electric machine.

The electric machine M55 shown in FIG. 80A has two armature portions Am551 and Am552 and a magnetic field portion Fs arranged between two armature portions Am551 and Am552. The each of the armature portions Am551 and Am552 includes a first armature core H1 and a second armature core H2. The first armature core H1 and the second armature core H2 are arranged in a direction V1 perpendicular to both the machine moving direction (a direction perpendicular to the sheet surface) and the direction in which the armature portion Am551 (or armature portion Am552) is positioned with respect to the magnetic field portion Fs, i.e., an armature portion direction D1. The magnetic poles 33a and 34a of the armature cores H1 and H2 of the armature portion Am551 are opposed to one surface of the magnetic field portion Fs (the right surface in FIG. 80A). The magnetic poles 33a and 34a of the armature cores H1 and H2 of the armature portion Am552 are opposed to the other surface of the magnetic field portion Fs (the left surface in FIG. 80A). In each of the armature portions Am551 and Am552, two magnetic pole groups G1 and G2 having the magnetic poles 33a and 34a facing the magnetic field portion Fs constitute a magnetic pole group pair P. Similarly to the rotary electric machine M1 described referring to FIG. 1, a plurality of magnetic pole group pairs P arranged in the machine moving direction and the yoke portions 33c and 34c form a closed magnetic circuit. The rotary electric machine M21 shown in FIG. 50A is a specific example of the electric machine M55 shown in FIG. 80A.

In the electric machine M50 shown in FIG. 77A as well, similarly to the electric machine M55 of FIG. 80A, two armature portions Am50 may be disposed on one side of the magnetic field portion Fs and two armature portions Am50 may be disposed on the other side of the magnetic field portion Fs. Similarly, in the electric machine M51 shown in FIG. 77B as well, similarly to the electric machine M55 of FIG. 80A, an armature portions Am51 may be disposed on one side of the magnetic field portion Fs and an armature portions Am51 may also be disposed on the other side of the magnetic field portion Fs.

The electric machine M56 shown in FIG. 80B has two magnetic field portions Fs1 and Fs2 and an armature portion Am56 disposed therebetween. The armature portion Am56 has a first armature core H1 and a second armature core H2. The first armature core H1 of the armature portion Am56 includes a magnetic pole group G1 having magnetic poles 33a facing the magnetic field portion Fs1, a magnetic pole group G1 having magnetic poles 33a facing the magnetic field portion Fs2, and a yoke portion 33c formed between the two magnetic pole groups G1 and connecting the two magnetic pole groups G1. Similarly, the second armature core H2 of the armature portion Am56 includes a magnetic pole group G2 having magnetic poles 34a facing the magnetic field portion Fs1, a magnetic pole group G2 having magnetic poles 34a facing the magnetic field portion Fs2, and a yoke portion 34c formed between the two magnetic pole groups G2 and connecting the two magnetic pole groups G2.

In the armature portion Am56, the two magnetic pole groups G1 and G2 having the magnetic poles 33a and 34a facing the magnetic field portion Fs1 constitute a magnetic pole group pair P. A magnetic circuit is formed by a plurality of magnetic pole group pairs P arranged in the machine moving direction (direction perpendicular to the sheet surface) and the yoke portions 33c and 34c. The two magnetic pole groups G1 and G2 having the magnetic poles 33a and 34a facing the magnetic field portion Fs2 constitute a magnetic pole group pair P. A magnetic circuit is formed by a plurality of magnetic pole group pairs P arranged in the machine moving direction and the yoke portions 33c and 34c. The rotary electric machine M22 shown in FIG. 51A is a specific example of the electric machine M55 shown in FIG. 80B.

[Electric Machine Having Extended Combination of Armature Cores and Magnetic Field Portion]

FIGS. 81A and 81B are schematic diagrams illustrating still another example of the electric machine as viewed in the machine moving direction. In the following, electric machines M57 and M58 respectively shown in FIGS. 81A and 81B will be described focusing on differences from the electric machines described above. The structures of electric machines M57 and M58 may be applied to any of a linear electric machine, a radial gap type rotary electric machine, and an axial gap type rotary electric machine.

In the armature portion Am23 of the electric machine M23 shown in FIG. 53, the first armature core H1 and the second armature core H2 are positioned on opposite sides across the magnetic field portion Fs. In the electric machine M57 shown in FIG. 81A, for example, the armature cores are disposed in a direction perpendicular to both the machine moving direction and the core facing direction (the direction in which the armature cores face each other across the magnetic field portion) (vertical direction in the drawing). That is, the armature portion of the electric machine M57 has a third armature core H3 and a fourth armature core H4 positioned on opposite sides across the magnetic field portion Fs in addition to a first armature core H1 and a second armature core H2 positioned on opposite sides across the magnetic field portion Fs. The third armature core H3 may have the same structure as the first armature core H1, for example. The fourth armature core H4 may have the same structure as the second armature core H2, for example.

Similarly to the armature cores H1 and H2 shown in FIG. 53, the third armature core H3 and the fourth armature core H4 are magnetically separated As such, in the third armature core H3, the magnetic flux formed by the magnets of the magnetic field portion Fs flows from one of the two magnetic pole groups G1 apart in the machine moving direction toward the other one of the magnetic pole groups G1 in the machine moving direction through the yoke portion 33c, and in the fourth armature core H2, the magnetic flux flows from one of the two magnetic pole groups G2 toward the other one of the magnetic pole groups G2 in the machine moving direction through the yoke portion 34c. As such, in the third armature core H3 and the fourth armature core H4, the magnetic circuit is constituted by the two magnetic pole group pairs P separated in the machine moving direction and the yoke portions 33c and 34c.

The phases of the third armature core H3 and the first armature core H1 may not necessarily be the same. Similarly, the phases of the fourth armature core H4 and the second armature core H2 may not necessarily be the same. Further, the structure of the third armature core H3 may not necessarily be the same as the structure of the first armature core H1. The structure of the fourth armature core H4 may not necessarily be the same as the structure of the second armature core H2.

The electric machine M58 shown in FIG. 81B is different from the electric machine M57 shown in FIG. 81A in the positional relationship of the armature cores H1, H2, H3, and H4. Specifically, in the electric machine M58 shown in FIG. 81B, the first armature core H1 in which a coil CL is provided and the fourth armature core H4 in which a coil CL is not provided are disposed in a direction perpendicular to both the machine moving direction and the core facing direction (in FIG. 81B, vertical direction). The second armature core H2 in which a coil CL is not provided and the third armature core H3 in which a coil CL is provided are disposed in a direction perpendicular to both the machine moving direction and the core facing direction. In other respects, the structures of the electric machine M57 shown in FIG. 81A may be applied to the electric machine M58 shown in FIG. 81B.

[Examples of Combination of Armature Core and Magnetic Field Portion Extended in Core Facing Direction]

In the armature portion Am23 of the electric machine M23 shown in FIG. 53, the first armature core H1 and the second armature core H2 are positioned on opposite sides across the magnetic field portion Fs. The structures of the electric machine M23 may be extended in a direction intersecting with the machine moving direction. For example, the electric machine may have two magnetic field portions that are separated in a direction intersecting with the machine moving direction. The armature core may be disposed inside the two magnetic field portions, and the armature core may also be disposed outside the two magnetic field portions. In this structure, yoke portions of the armature core disposed between the two magnetic field portions may be integrated. FIGS. 82A to 82C are diagrams showing examples of such an electric machine. In the following, electric machines M60, M61, and M62 respectively shown in FIGS. 82A and 82C will be described focusing on differences from the electric machines described above. The structures of electric machines M60, M61, and M62 may be applied to any of a linear electric machine, a radial gap type rotary electric machine, and an axial gap type rotary electric machine.

The electric machine M60 shown in FIG. 82A has a plurality of magnetic field portions Fs1 and Fs2 that are separated from each other in the core facing direction. In the example shown in FIG. 82A, two magnetic field portions Fs1 and Fs2 are separated in the core facing direction. The armature portion of the electric machine M60 has a second armature core H2 disposed between the two magnetic field portions Fs1 and Fs2 separated in the core facing direction. The armature portion of the electric machine M60 has a first armature core H1 disposed on the opposite side of the second armature core H2 across the first magnetic field portion Fs1 and a first armature core H1 disposed on the opposite side of the second armature core H2 across the second magnetic field portion Fs2.

The second armature core H2 has a magnetic pole group G21 having magnetic poles 34a facing the first magnetic field portion Fs1, a magnetic pole group G22 having magnetic poles 34a facing the second magnetic field portion Fs2, and a yoke portion 34c formed between the magnetic pole groups G21 and G22. One of the two first armature cores H1 has a magnetic pole group G11 disposed on the opposite side of the magnetic pole group G21 of the second armature core H2 across the first magnetic field portion Fs1. The other one of the two first armature cores H1 has a magnetic pole group G12 disposed on the opposite side of the magnetic pole group G22 of the second armature core H2 across the second magnetic field portion Fs2.

The width of the yoke portion 34c of the second armature core H2 in the core facing direction is larger than the yoke portion 33c of one first armature core H1. The width of the yoke portion 34c of the second armature core H2 may be larger than 1.5 times the width of the yoke portion 33c of one first armature core H1. The width of the yoke portion 34c of the second armature core H2 may be substantially twice or more than twice the width of the yoke portion 33c of one first armature core H1.

The second armature core H2 and the two first armature cores H1 are magnetically separated. The magnetic field portions Fs1 and Fs2 and the magnetic pole groups G11, G21, G22, and G12 of the armature cores H1 and H2 are arranged such that the direction of the magnetic flux flowing through the magnetic pole group G21 of the second armature core H2 and the direction of the magnetic flux flowing through the magnetic pole group G22 of the second armature core H2 are opposite to each other. The specific arrangement of the magnetic field portions Fs1 and Fs2 and the magnetic pole groups G11, G21, G22, and G12 of the armature cores H1 and H2 will be described later in detail by referring to FIGS. 83A and 83B. In the second armature core H2, the magnetic flux formed by the magnets of the first magnetic field portion Fs flows through the yoke portion 34c between the two magnetic pole groups G21 that are separated in the machine moving direction. In the first armature core H1, such a magnetic flux flows through the yoke portion 33c between the two magnetic pole groups G11 that are separated in the machine moving direction. As such, the four magnetic pole groups G11 and G21 and the yoke portions 33c and 34c constitute a magnetic circuit. Similarly, in the second armature core H2, the magnetic flux formed by the magnets of the second magnetic field portion Fs flows through the yoke portion 34c between the two magnetic pole groups G22 arranged in the machine moving direction (see FIG. 83B). In the first armature cores H1, such a magnetic flux flows through the yoke portion 33c between the two magnetic pole groups G12 that are separated in the machine moving direction. As such, the four magnetic pole groups G12 and G22 and the yoke portions 33c and 34c constitute a magnetic circuit.

In the electric machine M60 shown in FIG. 82A, the phase of the coil CL provided in the magnetic pole group G11 of one first armature core H1 may be the same as the phase of the coil CL provided in the magnetic pole group G12 of the other first armature core H1. Further, the coil CL provided in the magnetic pole group G11 and the coil CL provided in the magnetic pole group G12 may have the same winding direction when viewed from the center of the electric machine M60 in the core facing direction.

The electric machine M61 shown in FIG. 82B has a first armature core H1 disposed between two magnetic field portions Fs1 and Fs2. The armature portion of the electric machine M61 has a second armature core H2 disposed on the opposite side of the first armature core H1 across the first magnetic field portion Fs1 and a second armature core H2 disposed on the opposite side of the first armature core H1 across the second magnetic field portion Fs2.

In the electric machine M61 shown FIG. 82B, the first armature core H1 has a magnetic pole group G11 having magnetic poles 33a facing the first magnetic field portion Fs1, a magnetic pole group G12 having magnetic poles 33a facing the second magnetic field portion Fs2, and a yoke portion 33c formed between the magnetic pole groups G11 and G12. One of the two second armature cores H2 has a magnetic pole group G21 disposed on the opposite side of the magnetic pole group G11 of the first armature core H1 across the first magnetic field portion Fs1. The other one of the two second armature cores H2 has a magnetic pole group G22 disposed on the opposite side of the magnetic pole group G12 of the first armature core H1 across the second magnetic field portion Fs2.

The width of the yoke portion 33c of the first armature core H1 in the core facing direction is larger than the yoke portion 34c of one second armature core H2. The width of the yoke portion 33c of the first armature core H1 may be larger than 1.5 times the width of the yoke portion 34c of one second armature core H2. The width of the yoke portion 33c of the first armature core H1 may be substantially twice or more than twice the width of the yoke portion 34c of one second armature core H2.

The first armature core H1 and the two second armature cores H2 are magnetically separated. The magnetic field portions Fs1 and Fs2 and the magnetic pole groups G11, G21, G22, and G12 of the armature cores H1 and H2 are arranged such that the direction of the magnetic flux flowing through the magnetic pole group G11 of the first armature core H1 and the direction of the magnetic flux flowing through the magnetic pole group G12 are opposite to each other. As such, in the first armature core H1, the magnetic flux formed by the magnets of the first magnetic field portion Fs flows through the yoke portion 33c between the two magnetic pole groups G11 that are separated in the machine moving direction. In the second armature core H2, such a magnetic flux flows through the yoke portion 34c between the two magnetic pole groups G21 that are separated in the machine moving direction. As such, the four magnetic pole groups G11 and G21 and the yoke portions 33c and 34c constitute a magnetic circuit. Similarly, in the first armature core H1, the magnetic flux formed by the magnets of the second magnetic field portion Fs flows through the yoke portion 33c between the two magnetic pole groups G12 that are separated in the machine moving direction. In the second armature core H2, the magnetic flux flows through the yoke portion 34c between the two magnetic pole groups G22 that are separated in the machine moving direction. As such, the four magnetic pole groups G12 and G22 and the yoke portions 33c and 34c constitute a magnetic circuit.

In the first armature cores H1, the phase of the coil CL provided in one magnetic pole group G11 may be the same as the phase of the coil CL provided in the magnetic pole group G12. The coil CL provided in the magnetic pole group G11 and the coil CL provided in the magnetic pole group G12 have the same winding direction when viewed from the center of the electric machine M60 in the core facing direction.

The electric machine M62 shown in FIG. 82C is different from the electric machines M60 and M61 shown in FIGS. 81A and 81B in the positional relationship of the armature cores H1 and H2. The electric machine M62 has a third armature core H3 disposed between the two magnetic field portions Fs1 and Fs2 separated in the core facing direction. The third armature core H3 has a portion H31, which corresponds to the first armature core H1 of the electric machine M23 shown in FIG. 53 and directing to the first magnetic field portion Fs1, and a portion H32, which corresponds to the second armature core H2 of the electric machine M23 shown in FIG. 53 and directing to the second magnetic field portion Fs2. Hereinafter, the portion H31 is referred to as a first core portion, and the portion H32 is referred to as a second core portion. Similarly to the first armature core H1 of the electric machine M23 shown in FIG. 53, the first core portion H31 has a plurality of magnetic pole groups G1 arranged in the machine moving direction and coils CL. Similarly to the second armature core H2 of the electric machine M23 shown in FIG. 53, the second core portion H32 has a plurality of magnetic pole groups G2 arranged in the machine moving direction. The first core portion H31 and the second core portion H32 are coupled to each other via a yoke portion H33 therebetween.

The armature portion of the electric machine M62 has a second armature core H2 disposed on the opposite side of the first core portion H31 across the first magnetic field portion Fs1 and a first armature core H1 disposed on the opposite side of the second core portion H32 across the second magnetic field portion Fs2. The magnetic pole groups G1 of the first core portion H31 and the magnetic pole groups G2 of the second armature core H2 face each other through the first magnetic field portion Fs1. The magnetic pole groups G2 of the second core portion H32 and the magnetic pole groups G1 of the first armature core H1 face each other through the second magnetic field portion Fs2.

The third armature core H3 and the first armature core H1 are magnetically separated, and the third armature core H3 and the second armature core H2 are also magnetically separated. As such, in the third armature core H3, the magnetic flux formed by the magnets of the first magnetic field portion Fs flows through the yoke portion H33 between the two magnetic pole groups G1 of the first core portion H31 that are separated in the machine moving direction. In the second armature core H2, the magnetic flux flows through the yoke portion 34c between the two magnetic pole groups G2 that are separated in the machine moving direction. As such, the four magnetic pole groups G1 and G2 and the yoke portions H33 and 34c constitute a magnetic circuit. Further, in the third armature core H3, the magnetic flux formed by the magnets of the second magnetic field portion Fs flows through the yoke portion H33 between the two magnetic pole groups G2 of the second core portion H32 that are separated in the machine moving direction. In the first armature core H1, the magnetic flux flows through the yoke portion 33c between the two magnetic pole groups G1 that are separated in the machine moving direction. As such, the four magnetic pole groups G2 and G1 and the yoke portions H33 and 33c constitute a magnetic circuit.

The phase of the coils CL provided in the magnetic pole groups G1 of the first armature core H1 may be the same as the phase of the coils CL provided in the magnetic pole groups G1 of the third armature core H3. The coil CL provided in the magnetic pole group G1 of the first armature core H1 has the same winding direction as the coil CL provided in the magnetic pole group G1 of the third armature core H3 when viewed from the center of the electric machine M62 in the core facing direction.

FIGS. 83A and 83B are diagrams illustrating a linear electric machine M63 as a specific example of the electric machine M60 shown in FIG. 82A. In FIG. 83A, a part of one first armature core H1, a part of the coils CL, and a part of the second magnetic field portion Fs2 are omitted. FIG. 83B is a diagram showing the flow of the magnetic flux in the linear electric machine M63. In FIG. 83B, lines including arrows passing through the armature cores indicate the magnetic flux.

The linear electric machine M63 has a second armature core H2 disposed between the two magnetic field portions Fs1 and Fs2 separated in the core facing direction. The armature portion of the linear electric machine M63 has two first armature cores H1. Similarly to the electric machine M60 shown in FIG. 82A, one first armature core H1 is disposed on the opposite side to the second armature core H2 across the first magnetic field portion Fs1, and the other armature core H1 is disposed on the opposite side to the second armature core H2 across the second magnetic field portion Fs2. The armature cores H1 and H2 are constituted by electrical steel sheets laminated in a direction perpendicular to both the machine moving direction and the core facing direction, for example. A part or all of the armature cores H1 and H2 may be formed of a powder core. The linear electric machine M63 shown in FIG. 83A may have a structure in which, for example, the linear electric machine M31 described referring to FIG. 63A is separated and disposed apart from each other in the core facing direction and combined together.

The linear electric machine M63 is driven by, for example, a three-phase AC, and as shown in FIG. 83B, each of the first armature cores H1 includes three-phase coils CLu, CLv, and CLw. Each of the first armature cores H1 has three magnetic pole groups G1u, G1v, and G1w in which the coils CLu, CLv and CLw are respectively provided. The second armature core H2 has three magnetic pole groups G21 respectively facing the magnetic pole groups G1u, G1v, and G1w on the side facing the first magnetic field portion Fs1, and also has three magnetic pole groups G22 respectively facing the magnetic pole groups G1u, G1v, and G1w on the side facing the second magnetic field portion Fs2. In FIG. 83B, the reference numerals G21u, 21v, and 21w are assigned to the three magnetic pole groups G21, and the reference numerals G22u, 22v, and 22w are assigned to the three magnetic pole groups G22. The second armature core H2 has the yoke portion 34c between the magnetic pole groups G21 and G22 positioned on both sides. As shown in FIG. 83B, in the core facing direction, the width of the yoke portion 34c of the second armature core H2 may be substantially twice or more than twice the width of the yoke portion 33c of the first armature core H1, for example.

The magnetic pole groups G1u, G1v, and G1w of the first armature core H1 and the magnetic pole groups G21 and G22 facing thereto together form the magnetic pole group pairs P. An electrical angle between magnetic pole group pairs P adjacent in the machine moving direction is represented as 360×(n+m/s) as described with reference to FIG. 2, and is, for example, 2,280 degrees (s=3, m=1, n=6 in this linear electric machine M63).

As shown in FIG. 83B, the magnetic pole groups G1, G21, and G22, the coils CL, and the magnetic field portions Fs1 and Fs2 are configured such that the direction of the magnetic flux flowing through the magnetic pole groups G21 of the second armature core H2 is opposite to the direction of the magnetic flux flowing through the magnetic pole groups G22 of the second armature core H2. Specifically, the polarity of the magnetic field core of the first magnetic field portion Fs1 facing the magnetic pole 33a of one first armature core H1 is the same as the polarity of the magnetic field core of the first magnetic field portion Fs1 facing the magnetic pole 33a of the other first armature core H1. Further, the positions of the coils CL provided in one first armature core H1 (the positions of U phase, V phase and W phase in the machine moving direction) match the positions of the coils CL provided in the other armature core H1 (the positions of U phase, V phase and W phase in the machine moving direction). The coil CL provided in the magnetic pole group G1 of one first armature core H1 has the same winding direction as the coil CL provided in the magnetic pole group G1 of the other armature core H1 when viewed from the center of the electric machine M63 in the core facing direction. In other words, the winding directions of the two coils CL are opposite when viewed from one armature core H1. The positions of the magnetic field cores of the two magnetic field portions Fs1 and Fs2 match. For example, the N pole magnetic field core of the first magnetic field portion Fs1 is directly opposite the N pole magnetic field core of the second magnetic field portion Fs2.

With such an arrangement, as shown in FIG. 83B, in the second armature core H2, the magnetic flux formed by the magnets of the first magnetic field portion Fs flows through the yoke portion 34c between the two magnetic pole groups G21 that are separated in the machine moving direction. In the first armature core H1, the magnetic flux flows through the yoke portion 33c between the two magnetic pole groups G1 that are separated in the machine moving direction. As such, the four magnetic pole groups G1 and G21 and the yoke portions 33c and 34c constitute a magnetic circuit. Similarly, as shown in FIG. 83B, in the second armature core H2, the magnetic flux formed by the magnets of the second magnetic field portion Fs flows through the yoke portion 34c between the two magnetic pole groups G22 that are separated in the machine moving direction. In the first armature core H1, the magnetic flux flows through the yoke portion 33c between the two magnetic pole groups G1 that are separated in the machine moving direction. As such, the four magnetic pole groups G1 and G22 and the yoke portions 33c and 34c constitute a magnetic circuit.

The arrangement of the armature cores H1 and H2 in the linear electric machine M63 is not limited to the examples shown in FIGS. 83A and 83B. For example, similarly to the example shown in FIG. 82B, the first armature core H1 may be disposed between the two magnetic field portions Fs1 and Fs2 in the core facing directions, and the two second armature cores H2 may be disposed on outside of the two magnetic field portion Fs1 and Fs2. Similarly to the example shown in FIG. 82C, a third armature core H3 including a portion corresponding to the first armature core H1 and a portion corresponding to the second armature core H2 may be disposed between the two magnetic field portions Fs1 and Fs2, and the first armature core H1 and the second armature core H2 may be disposed outside of the two magnetic field portions Fs1 and Fs2.

FIGS. 84A and 84B are diagrams illustrating an axial gap type rotary electric machine M64 as a specific example of the electric machine M61 shown in FIG. 82A. In FIG. 84A, a part of one first armature core H1, a part of the coils CL, and a part of the second magnetic field portion Fs2 are omitted.

The rotary electric machine M64 has a second armature core H2 disposed between two magnetic field portions Fs1 and Fs2 that are separated in the axis direction (core facing direction). The armature portion of the rotary electric machine M64 has two first armature cores H1. Similarly to the electric machine M61 shown in FIG. 82A, one first armature core H1 is disposed on the opposite side to the second armature core H2 across the first magnetic field portion Fs1, and the other armature core H1 is disposed on the opposite side to the second armature core H2 across the second magnetic field portion Fs2. The armature cores H1 and H2 are formed of, for example, a soft magnetic powder material. In the rotary electric machine M64, the armature cores H1 and H2 may be formed of lamination steel. The rotary electric machine M64 may have a structure of the rotary electric machine M25 described with respect to FIG. 56A arranged and combined in the axis direction.

The rotary electric machine M64 driven by, for example, a three-phase AC, and each of the first armature cores H1 includes three-phase coils CLu, CLv, and CLw. Each of the first armature cores H1 has three magnetic pole groups G1u, G1v, and G1w in which the coils CLu, CLv and CLw are respectively provided. The second armature core H2 has three magnetic pole groups G21 respectively facing the magnetic pole groups G1u, G1v, and G1w on the side facing the first magnetic field portion Fs1, and also has three magnetic pole groups G22 respectively facing the magnetic pole groups G1u, G1v, and G1w on the side facing the second magnetic field portion Fs2. The second armature core H2 has the yoke portion 34c between the magnetic pole groups G21 and G22 positioned on both sides.

A plurality of recessed portions 33g are formed in the first armature core H1. In the rotary electric machine M64, a plurality of recessed portions 33g are formed on the end surface of the first armature core H1 in the axis direction (the end surface opposite to the side facing the second armature core H2). This serves to reduce the weight and the cost for materials of the armature core H1.

The magnetic pole groups G21 and G22 of the second armature H2 have a plurality of magnetic poles 34a. The magnetic pole 34a positioned at the ends the magnetic pole groups G21 and G22 in the rotation direction is integrated with a magnetic pole 34a located at the ends of the adjacent magnetic pole groups G21 and G22.

The magnetic pole groups G1u, G1v, and G1w of the first armature core H1 and the magnetic pole groups G21 and G22 facing thereto together form the magnetic pole group pairs P. An electrical angle between magnetic pole group pairs P adjacent in the rotation direction is represented as 360×(n+m/s) as described with reference to FIG. 2, and is, for example, 2,280 degrees (s=3, m=1, n=6 in the rotary electric machine M64). The number of poles of magnetic field portions Fs1 and Fs2 is 76 (p=38). A degree of "(360/p)×(n+m/s)" in mechanical angle is ensured between two adjacent magnetic pole group pairs P, and the angle of two adjacent magnetic pole group pairs P can also be expressed as a degree of "360/s/c" in mechanical angle. In the rotary electric machine M64, an angle between two adjacent magnetic pole group pairs P is 60 degrees (c=2 in the rotary electric machine M64).

Similar to the linear electric machine M63 shown in FIG. 83B, the magnetic pole groups G1, G21, and G22, the coils CL, and the magnetic field portions Fs1 and Fs2 are configured such that the direction of the magnetic flux flowing through the magnetic pole groups G21 of the second armature core H2 is opposite to the direction of the magnetic flux flowing through the magnetic pole groups G22 of the second armature core H2. Specifically, the polarity of the magnetic field core of the first magnetic field portion Fs1 facing the magnetic pole 33a of one first armature core H1 is the same as the polarity of the magnetic field core of the first magnetic field portion Fs1 facing the magnetic pole 33a of the other first armature core H1. Further, the positions of the coils CL provided in one first armature core H1 (the positions of U phase, V phase and W phase in the rotation direction) match the positions of the coils CL provided in the other armature core H1 (the positions of U phase, V phase and W phase in the rotation direction). The coil CL provided in the magnetic pole group G1 of one first armature core H1 has the same winding direction as the coil CL provided in the magnetic pole group G1 of the other first armature core H1 when viewed from the center of the rotary electric machine M64 in the core facing direction.

The arrangement of the armature cores H1 and H2 in the rotary electric machine M64 is not limited to the examples shown in FIGS. 84A and 84B. For example, similarly to the example shown in FIG. 82B, the first armature core H1 may be disposed between two magnetic field portions Fs1 and Fs2 in the axis direction and the two second armature cores H2 may be disposed outside of the two magnetic field portions Fs1 and Fs2. As still another example, similarly to the example shown in FIG. 82C, a third armature core H3 including a portion corresponding to the first armature core H1 and a portion corresponding to the second armature core H2 may be disposed between the two magnetic field portions Fs1 and Fs2, and the first armature core H1 and the second armature core H2 may be disposed outside of the two magnetic field portions Fs1 and Fs2.

FIGS. 85A and 85B are diagrams illustrating an axial gap type rotary electric machine M65 as a specific example of the electric machine M60 shown in FIG. 82A. In FIGS. 85A and 85B, a part of one first armature core H1, a part of the coils CL, and a part of the second magnetic field portion Fs2 are omitted. In the following, the rotary electric machine M65 will be described focusing on the differences from the rotary electric machine M64 shown in FIGS. 84A and 84B. The matters that are not described (e.g., the flow of magnetic flux and the positions of the magnetic pole group, the magnetic field portion, and the coils to achieve the flow of the magnetic flux) may be the same as the examples of the rotary electric machine M64.

Similarly to the examples of FIGS. 84A and 84B, rotary electric machine M65 has a second armature core H2 disposed between two magnetic field portions Fs1 and Fs2 that are separated in the axis direction. One of the two first armature cores H1 is disposed on the opposite side to the second armature core H2 across the first magnetic field portion Fs1, and the other armature core H1 is disposed on the opposite side to the second armature core H2 across the second magnetic field portion Fs2.

The second armature core H2 is formed of electrical steel sheets. Specifically, the second armature core H2 has a yoke partial core 34D and a magnetic poles 34a. Similarly to the examples shown in FIGS. 58A and 58B, the yoke partial core 34D is formed of a plurality of electrical steel sheets laminated in the axis direction (core facing direction). The magnetic pole 34a is formed of a plurality of electrical steel sheets laminated in the radial direction. The magnetic poles 34a are fitted into a plurality of fitting holes 34t formed in the yoke partial core 34D and arranged in the rotation direction. The magnetic poles 34a project from the two surfaces of the yoke partial core 34D (the two surfaces facing each other in the axis direction). The projecting part of magnetic poles 34a towards the first magnetic field portion Fs1 constitutes the magnetic pole group G21. The projecting part of magnetic poles 34a towards the second magnetic field portion Fs2 constitutes the magnetic pole group G22.

The armature cores H1 are also formed of electrical steel sheets. Specifically, the first armature core H1 has a yoke partial core 33D and magnetic poles 33a. Similarly to the examples shown in FIGS. 58A and 58B, the yoke partial core 33D is formed of a plurality of electrical steel sheets laminated in the axis direction (core facing direction). The magnetic pole 33a is formed of a plurality of electrical steel sheets laminated in the radial direction. The magnetic poles 33a are fitted into a plurality of fitting holes 33t formed in the yoke partial core 33D and arranged in the rotation direction.

The arrangement of the armature cores H1 and H2 in the rotary electric machine M65 is not limited to the examples shown in FIGS. 85A and 85B. For example, similarly to the example shown in FIG. 82B, the first armature core H1 may be disposed between two magnetic field portions Fs1 and Fs2 in the axis direction and the two second armature cores H2 may be disposed outside of the two magnetic field portions Fs1 and Fs2. In yet another example, similarly to the example shown in FIG. 82C, a third armature core H3 including a portion corresponding to the first armature core H1 and a portion corresponding to the second armature core H2 may be disposed between the two magnetic field portions Fs1 and Fs2, and the first armature core H1 and the second armature core H2 may be disposed outside of the two magnetic field portions Fs1 and Fs2. The yoke partial cores 33D and 34D and the magnetic poles 33a and 34a may employ a structure for preventing the induced current described with reference to FIGS. 59A to 59J.

[Examples of Armature Cores Surrounding Magnetic Field Portion]

FIGS. 86A and 86B are schematic diagrams showing still another example of an electric machine. In the following, electric machines M70 and M71 respectively shown in FIGS. 86A and 86B will be described focusing on differences from the electric machines described above. The structures of the electric machines M70 and M71 may be applied to any of a linear electric machine and a rotary electric machine.

The electric machine M70 shown in FIG. 86A has two first armature cores H1 and two second armature cores H2. The two first armature cores H1 are disposed on the opposite sides across the magnetic field portion Fs. The two second armature cores H2 are disposed on the opposite sides across the magnetic field portion Fs.

The two first armature cores H1 are positioned with respect to the magnetic field portion Fs in a first direction D1 perpendicular to the machine moving direction (a direction perpendicular to the sheet surface in FIG. 86A). The magnetic field portion Fs has a rectangular cross-section. In other words, the magnetic field portion Fs has an upper surface, a lower surface, a right side surface, and a left side surface. The two first armature cores H1 are oriented in two surfaces (in FIG. 86A, the right side surface and the left side surface) facing the first direction D1 of the magnetic field portion Fs. The positions of magnetic pole groups G1 of respective phases (e.g., U phase, V phase, W phase) provided in one first armature core H1 match the positions of magnetic pole groups G1 of respective phases (e.g., U phase, V phase, W phase) provided in the other first armature core H1.

The two second armature cores H2 are positioned with respect to the magnetic field portion Fs in a second direction D2 perpendicular to the machine moving direction (a direction perpendicular to the sheet surface in FIG. 86A). The two second armature cores H2 are respectively opposed to the two surfaces (upper and lower surfaces in FIG. 86A) facing the second direction D2 of the magnetic field portion Fs. The first direction D1 and the second direction D2 are orthogonal to each other. The angle between the first direction D1 and the second direction D2 may not necessarily be 90 degrees.

The first armature core H1 and the second armature core H2 are magnetically separated. As such, there is substantially no magnetic flux that flows between the first armature core H1 and the second armature core H2 without passing through the magnetic field portion Fs. in the first armature core H1, the magnetic flux formed by the magnets of the magnetic field portion Fs flows from one of the two magnetic pole groups G1 apart in the machine moving direction toward the other one of the magnetic pole groups G1 through the yoke portion 33c, and in the second armature core H2, the magnetic flux flows from one of the two magnetic pole groups G2 apart in the machine moving direction toward the other one of the magnetic pole groups G2 through the yoke portion 34c.

The electric machine M71 shown in FIG. 86B has one first armature core H1 and two second armature cores H2. The two second armature cores H2 are disposed on the opposite sides across the magnetic field portion Fs in the second direction D2. The first armature core H1 is positioned in a first direction with respect to the magnetic field portion Fs. The width of the first armature core H1 (the width of the magnetic pole group G1 and the yoke portion 33c in the second direction D2) is larger than the width of the second armature core H2 (the width of the magnetic pole group G2 and the yoke portion 34c in the first direction D1). For example, the width of the first armature core H1 may be greater than 1.5 times the width of the second armature core H2. The width of the first armature core H1 may be substantially twice or more than twice the width of the second armature core H2. That is, the first armature core H1 of the electric machine M71 shown in FIG. 86B may be substantially the same as the combined two first armature cores H1 of the electric machine M70 shown in FIG. 86A. In the electric machine M71 shown in FIG. 86B, the two first armature cores H1 may not be combined. That is, in the electric machine M71 shown in FIG. 86B, the two first armature cores H1 shown in FIG. 86A may be arranged in the second direction D2.

FIGS. 87A and 87B are diagrams illustrating a linear electric machine M72 as a specific example of the electric machine M70 shown in FIG. 86A. In FIGS. 87A and diagram 87B, coils CL are partially omitted.

The linear electric machine M72 has two first armature cores H1 positioned on the opposite sides across the magnetic field portion Fs and two second armature cores H2 positioned on the opposite sides across the magnetic field portion Fs. The two first armature cores H1 are opposed to each other in a first direction D1, and the two second armature cores H2 are opposed to each other in a second direction D2 perpendicular to the first direction D1. A hole 23a is formed in the magnetic field portion Fs so as to extend therethrough. A support shaft (not shown) is inserted into the through hole 23a to support the magnetic field portion Fs. The support shaft may be formed of a non-magnetic material, such as stainless steel.

The linear electric machine M72 is an electric machine driven by a three-phase AC, in which the first armature core H1 is provided with a U phase coil CLu, a V phase coil CLv, and a W phase coil CLw, for example. Each of the second armature cores H2 is provided with magnetic pole groups G2 respectively corresponding to the U phase coil CLu, the V phase coil CLv, and the W phase coil CLw of the first armature core H1. In the linear electric machine M72, an electrical angle between adjacent magnetic pole group pairs P is represented as 360×(n+m/s) as described with reference to FIG. 2, and is, for example, 1,920 degrees (s=3, m=1, n=6 in this linear electric machine M72). The structures of the other linear electric machines disclosed in this specification may be applied to the armature core of the linear electric machine M72

FIGS. 88A and 88B are diagrams illustrating a linear electric machine M73 as a specific example of the electric machine M71 shown in FIG. 86B. n FIGS. 88A and diagram 88B, coils CL are partially omitted.

The linear electric machine M73 has two second armature cores H2 positioned on the opposite sides across the magnetic field portion Fs in a second direction and two first armature cores H1 positioned in a first direction D1 with respect to the magnetic field portion Fs. The positions of the coils CL and the magnetic pole groups G1 provided in the first armature core H1 and the positions of the magnetic pole groups G2 provided in the second armature core H2 may be the same as those of the linear electric machine M72. Here, the positions of the coils CL, the magnetic pole groups G1, and the magnetic pole groups G2 are the positions in the machine moving direction.

In the linear electric machine M73, the magnetic field portion Fs may be supported by a rail extending in its extension direction. The magnetic field portion Fs may have, for example, a recessed portion 23b extending in its extension direction on the opposite side of the first armature core H1. A rail (not shown) may be disposed in the recessed portion 23b.

FIGS. 89A and 89B are diagrams illustrating a rotary electric machine M74 as a specific example of the electric machine M71 shown in FIG. 86B. In FIG. 89A and diagram 89B, coils CL are partially omitted.

The rotary electric machine M74 has two second armature cores H2 positioned opposite sides across the magnetic field portion Fs in the axis direction (second direction D2 in FIG. 86B), and a first armature core H1 positioned outward in the radial direction with respect to the magnetic field portion Fs (first direction D1 in FIG. 86B). The first direction and the second direction are both perpendicular to the rotation direction (machine moving direction).

The first armature core H1 includes a plurality of magnetic pole groups G1 in the inner peripheral portion in the rotation direction. The rotary electric machine M74 is an electric machine driven by a three-phase AC, in which the first armature core H1 is provided with a U phase coil CLu, a V phase coil CLv, and a W phase coil CLw, for example. These coils CL are respectively provided in the magnetic pole groups G1. The first armature core H1 is composed of a plurality of electrical steel sheets laminated in the axis direction, for example. The first armature core H1 may be a powder core formed of a soft magnetic powder material. Unlike the rotary electric machine M74, the first armature core H1 may be disposed inside the magnetic field portion Fs.

Each of the second armature cores H2 has a plurality of magnetic pole groups G2 arranged in a rotation direction on a side toward the magnetic field portion Fs. In the example shown in FIGS. 89A and 89B, the second armature cores H2 is a powder core formed of a soft magnetic powder material. Alternatively, the second armature cores H2 may be lamination steel.

In the rotary electric machine M74, the number of poles of magnetic field portion Fs is, for example, 56 (p=28). An electrical angle between adjacent magnetic pole group pairs P is expressed as 360×(n+m/s) as described referring to FIG. 2, and may be, for example, 1,680 degrees (in the rotary electric machine M74, s=3 and m=2, n=4). A mechanical angle between adjacent magnetic pole group pairs P is expressed as (360/p)×(n+m/s) and substantially matches "360/s/c." This mechanical angle is, for example, 60 degrees in the rotary electric machine M74 (c=2 in the rotary electric machine M74).

[Electric Machine for Forming Magnetic Circuit with Two Magnetic Field Portions and Three Armatures]

In the electric machine described above, the closed magnetic circuit is configured by the first armature core H1, the second armature core H2, and the magnetic field portion Fs disposed therebetween, and the magnetic paths (yoke portion 33c, 34c) are formed in both the first armature core H1 and the second armature core H2 for allowing the magnetic flux to flow in the machine moving direction. Alternatively, the closed magnetic circuit may be formed of the first armature core H1, the second armature core H2, and the first magnetic field portion disposed therebetween, and, the second armature core H2, the third armature core H3, and the second magnetic field portion Fs disposed therebetween. In this magnetic circuit, the flow of the magnetic flux in the machine moving direction may not be formed in the second armature core H2, and the magnetic path may be formed in the first armature core H1 and the third armature core H3 for allowing the flow of the magnetic flux in the machine moving direction. This structure eliminates the need to separate the first armature core H1 and the third armature core H3 in the machine moving direction. As such, the strength of the first armature core H1 and the third armature core H3 can be increased, and the assembly accuracy and the position accuracy of magnetic poles can be improved. FIGS. 90A to 98 are diagrams illustrating an example of an electric machine in which such a magnetic circuit is formed.

[Electric Machine in which Armature Core Having Coils Disposed Outside of Two Magnetic Field Portions]

FIG. 90A is a schematic diagram illustrating an electric machine M80 seen in the machine moving direction. FIG. 90B is a diagram showing the flow of the magnetic flux in the electric machine M80. In FIG. 90B, lines including arrows passing through the armature cores indicate the magnetic flux. The electric machine M80 has a first armature core H1, a second armature core H2, and a third armature core H3. A first magnetic field portion Fs1 is disposed between the first armature core H1 and the second armature core H2, and a second magnetic field portion Fs2 is disposed between the second armature core H2 and the third armature core H3. The two magnetic field portions Fs1 and Fs2 are separated in a direction intersecting with the machine moving direction. The three armature cores H1 to H3 are magnetically separated similarly to the other electric machines described above.

As shown in FIG. 90B, the first armature core H1 has a plurality of magnetic pole groups G1 facing the first magnetic field portion Fs1 and arranged in the machine moving direction. The second armature core H2 has a plurality of magnetic pole groups G21 facing the first magnetic field portion Fs1 and arranged in the machine moving direction. The second armature core H2 has a plurality of magnetic pole groups G22 facing the second magnetic field portion Fs2 and separated in the machine moving direction. In the second armature core H2, the magnetic pole groups G21 and G22 are arranged in a direction intersecting with the machine moving direction. The magnetic pole group G21 and the magnetic pole group G22 are magnetically coupled to allow the magnetic flux flow between the magnetic pole group G21 and the magnetic pole group G22 in a direction intersecting with the machine moving direction. The magnetic pole groups G21 and the magnetic pole groups G22 are integrally formed by lamination steel or a powder material, for example. The third armature cores H3 have a plurality of magnetic pole groups G3 facing the second magnetic field portion Fs2 and arranged in the machine moving direction. Each of the magnetic pole groups G1, G21, G22, and G3 has a plurality of magnetic poles 33a, 34a, and 35a arranged in the machine moving direction. The magnetic poles 33a, 34a, and 35a have a shape projecting toward the magnetic field portions Fs1 and Fs2.

In the two magnetic field portions Fs1 and Fs2 of the electric machine M80, the position of the magnetic field core of the first magnetic field portion Fs1 and the position of the magnetic field core of the second magnetic field portion Fs2 are shifted by 180 degrees in electrical angle. As such, in the magnetic field portions Fs1 and Fs2, the magnetic field cores having different polarities are opposed to each other in a direction intersecting with the machine moving direction. In the magnetic field portions Fs1 and Fs2 shown in FIG. 90B, the parts with the arrows indicate magnets, the part sandwiched between the ends of two arrows is the magnetic field core of the N pole, and the part sandwiched between the proximal ends of two arrows is the magnetic field core of the S pole. In this description, the position of the magnetic field core is a position in the machine moving direction.

Attention is directed to four magnetic pole groups G1, G21, G22, and G3 arranged in a direction intersecting with the machine moving direction (the core facing direction in which the cores H1, H2, and H3 are arranged in FIG. 90B). At this time, the polarity (N or S) of the magnetic field core of the first magnetic field portion Fs1 facing the magnetic pole 33a of the magnetic pole group G1 of the first armature core H1 is different from the polarity (N or S) of the magnetic field core of the first magnetic field portion Fs1 facing the magnetic pole 34a of the magnetic pole group G21 of the second armature core H2.

The relative positions of the magnetic pole groups G1, G21, G22, and G3 with respect to the magnetic field core are defined as follows.

The polarity of the magnetic field core of the first magnetic field portion Fs1 facing the magnetic pole 34a of the magnetic pole group G21 of the second armature core H2 is different from the polarity of the magnetic field core of the second magnetic field portion Fs2 facing the magnetic pole 34a of the magnetic pole group G22 of the second armature core H2.

The polarity of the magnetic field core of the second magnetic field portion Fs2 facing the magnetic pole 34a of the magnetic pole group G22 of the second armature core H2 is different from the polarity of the magnetic field core of the second magnetic field portion Fs2 facing the magnetic pole 35a of the magnetic pole group G3 of the third armature core H3.

For this arrangement, a magnetic path is formed from the magnetic pole group G1 of the first armature core H1 through the first magnetic field portion Fs1, the magnetic pole groups G21 and G22 of the second armature core H2, and the second magnetic field portion Fs2 to the magnetic pole group G3 of the third armature core H3.

In the electric machine M80, for example, the first armature core H1 includes a U phase coil CLu, a V phase coil CLv, and a W phase coil CLw, and the third armature core H3 includes a U phase coil CLu, a V phase coil CLv, and a W phase coil CLw. The coil CL provided on the magnetic pole group G1 (e.g. U phase coil CLu) and the coil CL provided on the magnetic pole group G3 (e.g. U phase coil CLu) have the same winding direction when viewed in the direction of the flow of the magnetic flux, in other words, when viewed from the outside of the first armature core H1.

In the electric machine M80 shown in FIG. 90B, attention is now directed to two phases that are separated in the machine moving direction (e.g., U phase and V phase). The magnetic pole group pairs Pu1 and Pu2 of U phase form a magnetic path from the magnetic pole group G1 of the first armature core H1 to the magnetic pole group G3 of the third armature core H3 together with the magnetic field core and magnets of the magnetic field portions Fs1 and Fs2. Further, the magnetic pole group pairs Pv1 and Pv2 of V phase also form a magnetic path from the magnetic pole group G1 of the first armature core H1 to the magnetic pole group G3 of the third armature core H3 together with the magnetic field core and magnets of the magnetic field portions Fs1 and Fs2. The first armature core H1 and the third armature core H3 respectively have a yoke portion 33c and a yoke portion 35c extending in the machine moving direction. As such, one closed magnetic circuit is formed by the four magnetic pole group pairs Pu1, Pu2, Pv1, and Pv2. This is also applied to the other two phases, e.g. V phase and W phase, or W phase and U phase. In this description, the magnetic pole group pair Pu1 of U phase is a pair formed by the magnetic pole group G1u of the first armature core H1 and the magnetic pole group G21u of the second armature core H2 facing the first armature core H1. The magnetic pole group pair Pu2 of U phase is a pair formed by the magnetic pole group G22u of the second armature core H2 and the magnetic pole group G3u of the third armature core H3 facing the second armature core H2. The same applies to the magnetic pole group pairs Pv1, Pv2, and Pv3 of V phase.

In the electric machine M80, the magnetic flux flowing in the machine moving direction is not formed in the second armature core H2. As such, the width of the second armature core H2 in the direction intersecting with the machine moving direction, i.e., the distance between the magnetic pole group G21 and the magnetic pole group G22, may be smaller than the width of the yoke portion 33c of the first armature core H1 in the direction intersecting with the machine moving direction and the width of the yoke portion 35c of the third armature core H3 in such a direction. That is, the second armature core H2 may not have a yoke portion for allowing the flow of magnetic flux in the machine moving direction.

The electric machine M80 may be applied to any of a linear electric machine, an axial gap type rotary electric machine, and a radial gap type rotary electric machine.

Various structures proposed herein may be applied to the electric machine M80 For example, the armature cores H1, H2, and H3 of the electric machine M80 may be formed of a plurality of electrical steel sheets laminated in the machine moving direction similarly to the electric machine shown in FIG. 1A. Alternatively, the armature cores H1, H2, and H3 may be formed of a soft magnetic powder material similarly to the electric machine shown in FIG. 18. In yet another example, similarly to the electric machine illustrated in FIG. 38A, a portion of each armature core H1, H2, and H3 is formed of a plurality of electrical steel sheets, and the other portions may be formed of a soft magnetic powder material. In yet another example, similarly to the electric machine shown in FIG. 58A, the armature cores H1 and H3 may include a yoke portion formed of electrical steel sheets laminated in a direction opposed to the magnetic field portion Fs. The armature cores H1, H2, and H3 may include magnetic poles including electrical steel sheets laminated in a direction perpendicular to the yoke portion. Further, similarly to electric machine shown in FIG. 34A, the magnetic poles 33a, 34a, and 35a may have a body projecting toward the magnetic field portion Fs and a projecting portion extending from the body in a direction intersecting with the machine moving direction (e.g., axis direction). Similarly to the electric machine shown in FIG. 26A or FIG. 27, the armature cores H1, H2, and H3 may be composed of a plurality of partial cores that are formed separately and coupled to each other. The electric machine M80 armature cores H1 and H3 may have a plurality of coils CL1 and CL2 in each of the magnetic pole groups similarly to the electric machine shown in FIG. 57A. In the electric machine M80, the armature cores H1, H2, and H3 may be solidified by materials that are non-magnetic and have insulating properties, similarly to the electric machine shown in FIG. 39.

Further, the number of phases of the electric machine M80 may be more than three. Each of the armature cores H1 and H3 of the electric machine M80 may include coils having the same phase and opposite winding directions (e.g., U+ phase coil CLu+, U phase coil CLu). In yet another example, similarly to the electric machine shown in FIG. 25A or FIG. 67, the number of phases of the electric machine M80 may be an even number of two or more.

FIG. 91A is a diagram illustrating a linear electric machine M81 as a specific example of the electric machine M80 shown in FIGS. 90A and 90B.

The linear electric machine M81 has a first armature core H1, a second armature core H2, and a third armature core H3. A first magnetic field portion Fs1 is disposed between the first armature core H1 and the second armature core H2, and a second magnetic field portion Fs2 is disposed between the second armature core H2 and the third armature core H3. The two magnetic field portions Fs1 and Fs2 are separated in a direction intersecting with the machine moving direction. The positions and structures of the magnetic pole group G1 of the first armature core H1, the magnetic pole groups G21 and G22 of the second armature core H2, and the magnetic pole group G3 of the third armature core H3 provided in the linear electric machine M81 may be the same as those shown in FIG. 90B. Further, the magnetic field portions Fs1 and Fs2 provided in the linear electric machine M81 may be the same as those shown in FIG. 90B.

In the linear electric machine M81, an electrical angle between adjacent magnetic pole group pairs P1 and an electrical angle between adjacent magnetic pole group pairs P2 are expressed as 360×(n+m/s) as described referring to FIG. 2, and is, for example, 2,280 degrees in the linear electric machine M81 (s=3, m=1, n=6 in the linear electric machine M81). In FIG. 90B, the magnetic pole group pairs P1 are shown as magnetic pole group pairs Pw1, Put, and Pv1, and the magnetic pole group pairs P2 are shown as magnetic pole group pairs Pw2, Pu2, and Pv2.

As described above, similarly to the electric machine M80 of FIG. 90B, the magnetic flux flowing in the machine moving direction is substantially not present in the second armature core H2 in the linear electric machine M81, and thus, the second armature core H2 may not have a magnetic path (yoke portion) for flowing a magnetic flux in the machine moving direction. As such, the second armature cores H2 may be divided in the machine moving direction. FIG. 91B is a diagram illustrating a linear electric machine M82 as an example of a linear electric machine having such a structure. In the example shown in FIG. 91B, the second armature core H2 has a plurality of partial cores 34E that are not magnetically coupled in the machine moving direction. A gap may be formed between two adjacent partial cores 34E, and two adjacent partial cores 34E may be coupled by a nonmagnetic material. The linear electric machine M82 may be the same as the linear electric machine M81 except that the second armature core H2 is composed of a plurality of partial cores 34E. In yet another example, the second armature core H2 may be divided into a plurality of magnetic poles 34a that are not magnetically coupled in the machine moving direction. In this case, the plurality of magnetic poles 34a may be assembled with each other by a non-magnetic material.

In the specific examples shown in FIGS. 91A and 91B, the first armature core H1, the second armature core H2, and the third armature core H3 are arranged in one direction intersecting with the machine moving direction. However, the arrangement of the first armature core H1, the second armature core H2, and the third armature core H3 is not limited to the example shown in FIGS. 91A and 91B. For example, in a case where a first direction, a second direction, and a third direction are perpendicular to the machine moving direction but are different directions from each other, the first armature core H1 may be positioned in the first direction with respect to the first magnetic field portion Fs1, the second armature core H2 may be positioned between and aligned with the first magnetic field portion Fs1 and the second magnetic field portion Fs2 in the second direction, and the third armature core H3 may be positioned in the third direction with respect to the second magnetic field portion Fs2. FIG. 92 shows an electric machine M83 as an example having such an arrangement of the armature cores H1 to H3.

In the electric machine M83, the first direction and the third direction are the same direction. That is, in the electric machine M83, the second armature cores H2 are arranged between the first magnetic field portion Fs1 and the second magnetic field portion Fs2 in the second direction D2 (left-right direction in FIG. 92) with respect to the first magnetic field portion Fs1 and the second magnetic field portion Fs2. The first armature core H1 and the third armature core H3 are positioned in the first direction D1 with respect to the first magnetic field portion Fs1 and the second magnetic field portion Fs2. The first direction and the second direction are perpendicular to each other.

[Electric Machine in which Armature Core Having Coils Disposed Between Two Magnetic Field Portions]

In the electric machine illustrated in FIGS. 90A to 92, the armature cores in which coils CL are provided on the outside of the two magnetic field portions Fs1 and Fs2 are disposed. Alternatively, an armature core having a coil CL provided inside the two magnetic field portions Fs1 and Fs2 may be disposed, and a closed magnetic circuit may be formed by the two magnetic field portions and the three armature cores. FIGS. 93A and 93B are diagrams showing an electric machine M84 as an example of such an electric machine. FIG. 93A is a schematic view of the electric machine M84 in the machine moving direction, and FIG. 93B is a diagram showing the flow of magnetic flux formed in the electric machine M84. In FIG. 93B, lines including arrows passing through the armature cores indicate the magnetic flux. In the following, the electric machine M84 will be described focusing on differences from the electric machine M80 shown in FIGS. 91A and 91B. The structures of the electric machine M80 may be applied to the matters that are not described about the electric machine M84.

The electric machine M84 has a first armature core H1, a second armature core H2, and a third armature core H3. A first magnetic field portion Fs1 is disposed between the first armature core H1 and the second armature core H2, and a second magnetic field portion Fs2 is disposed between the second armature core H2 and the third armature core H3. The three armature cores H1 to H3 are magnetically separated similarly to the other electric machines described above.

Similarly to the electric machine M80, the relative positions (positions in the machine moving direction) of the magnetic poles of the magnetic pole groups G1, G21, G22, and G3 to the magnetic field cores of the magnetic field portions Fs1 and Fs2 are defined so that a magnetic path is formed from the magnetic pole group G1 of the first armature core H1 through the first magnetic field portion Fs1, the magnetic pole groups G21 and G22 of the second armature core H2, and the second magnetic field portion Fs2 to the magnetic pole group G3 of the third armature core H3. The positions of the two magnetic field portions Fs1 and Fs2 of the electric machine M84 may be shifted by 180 degrees in electrical angle similarly to the magnetic field portions Fs1 and Fs2 of the electric machine M80 shown in FIGS. 90A and 90B, for example. Alternatively, the positions of the magnetic field portions Fs1 and Fs2 may be matched in the machine moving direction.

As shown in FIG. 93B, the second armature core H2 has a plurality of magnetic pole groups G21 facing the first magnetic field portion Fs1 and arranged in the machine moving direction. Further, the second armature core H2 has a plurality of magnetic pole groups G22 facing the second magnetic field portion Fs2 and arranged in the machine moving direction. The magnetic pole groups G21 and the magnetic pole groups G22 are arrange in a direction intersecting with the machine moving direction and magnetically coupled. The magnetic flux is allowed to flow between the magnetic pole groups G21 and the magnetic pole groups G22 in a direction intersecting with the machine moving direction.

A U phase coil CLu, a V phase coil CLv, and a W phase coil CLw are provided in the second armature core H2, and a coil CL is not provided in the first armature core H1 and the third armature core H3. The three coils CLu, CLv, and CLw are respectively wound around three magnetic pole groups G21 arranged in the machine moving direction, for example. Other three coils CLu, CLv, and CLw are respectively wound around three magnetic pole groups G22 arranged in the machine moving direction. The coil CL (e.g., U phase coil CLu) provided on the magnetic pole group G21 and the coil CL (e.g., U phase coil CLu) provided on the magnetic pole group G22 have the same winding direction when viewed in the direction of the flow of the magnetic flux, in other words, when viewed from first armature core H1 in the direction intersecting with the machine moving direction (core facing direction).

Attention is directed to the two phases that are separated in the machine moving direction in the electric machine M84 (e.g., U phase and V phase). Similarly to the example shown in FIG. 90B, the magnetic pole group pairs Pu1 and Pu2 form a magnetic path from the magnetic pole group G1 of the first armature core H1 to the magnetic pole group G3 of the third armature core H3 together with the magnetic field cores and the magnets of the magnetic field portions Fs1 and Fs2, and the magnetic pole group pairs Pv1 and Pv2 also form a magnetic path from the magnetic pole group G1 of the first armature core H1 to the magnetic pole group G3 of the third armature core H3 together with magnetic field cores and the magnets of the magnetic field portions Fs1 and Fs2. The first armature core H1 and the third armature core H3 respectively have a yoke portion 33c and a yoke portion 35c extending in the machine moving direction. As such, one closed magnetic circuit is formed by the four magnetic pole group pairs Pu1, Pu2, Pv1, and Pv2. This is also applied to the other two phases, e.g. V phase and W phase, or W phase and U phase.

In the electric machine M84, the magnetic flux flowing in the machine moving direction may not be formed in the second armature core H2. As such, the width of the second armature core H2 in the direction intersecting with the machine moving direction, i.e., the distance between the magnetic pole group G21 and the magnetic pole group G22, may be smaller than the width of the yoke portion 33c of the first armature core H1 in the direction intersecting with the machine moving direction and the width of the yoke portion 35c of the third armature core H3 in such a direction.

The electric machine M84 may be applied to any of a linear electric machine, an axial gap type rotary electric machine, and a radial gap type rotary electric machine. Further, various structures proposed herein may be applied to the electric machine M84.

FIG. 94 is a diagram illustrating a linear electric machine M85 as a specific example of the electric machine M84 shown in FIGS. 93A and 93B.

The linear electric machine M85 has a first armature core H1, a second armature core H2, and a third armature core H3. The second armature core H2 is arranged between the two magnetic field portions Fs1 and Fs2, and the first armature core H1 and the third armature core H3 are arranged outside of the two magnetic field portions Fs1 and Fs2. The structures of the magnetic pole group G1 of the first armature core H1, the magnetic pole groups G21 and G22 of the second armature core H2, and the magnetic pole group G3 of the third armature core H3 provided in the linear electric machine M85 may be the same as those shown in FIG. 93B. Further, the arrangement of the magnetic field portions Fs1 and Fs2 provided in the linear electric machine M85 may be the same as those shown in FIG. 93B.

In the linear electric machine M85, an electrical angle between adjacent magnetic pole group pairs P1 and an electrical angle between adjacent magnetic pole group pairs P2 are expressed as 360×(n+m/s) as described referring to FIG. 2, and is, for example, 2,280 degrees in the linear electric machine M85 (s=3, m=1, n=6 in the linear electric machine M85). In FIG. 93B, the magnetic pole group pairs P1 are shown as magnetic pole group pairs Pw1, Pu1, and Pv1, and the magnetic pole group pairs P2 are shown as magnetic pole group pairs Pw2, Pu2, and Pv2.

Similarly to the linear electric machine M82 illustrated in FIG. 91B, in the linear electric machine M85, the magnetic flux flowing in machine moving direction is not substantially present in the second armature core H2, and thus a magnetic path (yoke portion) for flowing the magnetic flux in the machine moving direction is not required. As such, the second armature cores H2 may be divided in the machine moving direction. For example, the second armature core H2 may have a plurality of partial cores 34E magnetically coupled in the machine moving direction, and each partial core 34E may have magnetic pole groups G21 and 22. In this case, the coil CL wound around the magnetic pole group G21 of the second armature core H2 may be integrated with the coil CL wound around the magnetic pole group G22.

[Electric Machine in which Coils are Distributed Between Inner Armature Core and Outer Armature Core]

The arrangement of the coils CL in the electric machine in which a closed magnetic circuit is formed by the two magnetic field portions Fs1 and Fs2 and the three armature cores H1, H2, and H3 is not limited to the example shown in FIGS. 90A to 94. For example, the coils C L may be distributed between the armature core arranged inside of the two magnetic field portions Fs1 and Fs2 and an armature core arranged outside of the two magnetic field portions Fs1 and Fs2. FIGS. 95A and 95B are diagrams illustrating an electric machine M86 as an example of such an electric machine. FIG. 95A is a schematic view of the electric machine M86 in the machine moving direction, and FIG. 95B is a diagram showing the flow of magnetic flux in the electric machine M86. In FIG. 95B, lines including arrows passing through the armature cores indicate the magnetic flux. In the following, the electric machine M86 will be described focusing on differences from the electric machine M80 shown in FIGS. 90A and 90B. The structures of the electric machine M80 may be applied to the matters that are not described about the electric machine M86.

As shown in FIG. 95A, similarly to electric machine M80, the electric machine M86 has a first armature core H1, a second armature core H2, and a third armature core H3. A first magnetic field portion Fs1 is disposed between the first armature core H1 and the second armature core H2, and a second magnetic field portion Fs2 is disposed between the second armature core H2 and the third armature core H3. The three armature cores H1 to H3 are magnetically separated similarly to the other electric machines described above.

Similarly to the electric machine M80, the relative positions (positions in the machine moving direction) of the magnetic poles of the magnetic pole groups G1, G21, G22, and G3 to the magnetic field cores of the magnetic field portions Fs1 and Fs2 are defined so that a magnetic path is formed from the magnetic pole group G1 of the first armature core H1 through the first magnetic field portion Fs1, the magnetic pole groups G21 and G22 of the second armature core H2, and the second magnetic field portion Fs2 to the magnetic pole group G3 of the third armature core H3. In the two magnetic field portions Fs1 and Fs2 of the electric machine M86, unlike the magnetic field portions Fs1 and Fs2 shown in FIGS. 90B and 93B, the position of the magnetic field core of the magnetic field portion Fs1 matches the position of the magnetic field core of the magnetic field portion Fs2.

As shown in FIG. 95B, the coil CL is not provided in the first armature cores H1. The magnetic pole group G21 of the second armature cores H2 faces the first magnetic field portion Fs1. A U phase coil CLu, a V phase coil CLv, and a W phase coil CLw are respectively wound around three magnetic pole groups G21 arranged in the machine moving direction, for example. The magnetic pole groups G22 of the second armature core H2 faces the second magnetic field portion Fs2 and are arranged in the machine moving direction. The coil C L is not provided in the magnetic pole groups G22. The magnetic pole groups G21 and the magnetic pole groups G22 are arranged in a direction intersecting with the machine moving direction and magnetically coupled to allow the magnetic flux flow between the magnetic pole groups G21 and the magnetic pole groups G22. The third armature core H3 have a plurality of magnetic pole groups G3 facing the second magnetic field portion Fs2 and arranged in the machine moving direction. Other three coils CLu, CLv, and CLw are respectively wound around three magnetic pole groups G3 arranged in the machine moving direction.

The coil CL (e.g., U phase coil CLu) provided on the magnetic pole group G21 of the second armature core H2 and the coil CL (e.g., U phase coil CLu) provided on the magnetic pole group G3 of the third armature core H3 have the same winding direction when viewed in the direction of the flow of the magnetic flux, in other words, when viewed from first armature core H1 in the direction intersecting with the machine moving direction (core facing direction).

As shown in FIG. 95B, attention is directed to two phases (e.g., U phase and V phase) that are separated in the machine moving direction in the electric machine M86. Similarly to the example shown in FIGS. 90B and 93B, the magnetic pole group pairs Pu1 and Pu2 form a magnetic path from the magnetic pole group G1 of the first armature core H1 to the magnetic pole group G3 of the third armature core H3 together with the magnetic field cores and the magnets of the magnetic field portions Fs1 and Fs2, and the magnetic pole group pairs Pv1 and Pv2 also form a magnetic path from the magnetic pole group G1 of the first armature core H1 to the magnetic pole group G3 of the third armature core H3 together with magnetic field cores and the magnets of the magnetic field portions Fs1 and Fs2. The first armature core H1 and the third armature core H3 respectively have a yoke portion 33c and a yoke portion 35c extending in the machine moving direction. As such, one closed magnetic circuit is formed by the four magnetic pole group pairs Pu1, Pu2, Pv1, and Pv2. This is also applied to the other two phases, e.g. V phase and W phase, or W phase and U phase.

In the electric machine M86, the width of the second armature core H2 in the direction intersecting with the machine moving direction, i.e., the distance between the magnetic pole group G21 and the magnetic pole group G22, may be smaller than the width of the yoke portion 33c of the first armature core H1 in the direction intersecting with the machine moving direction and the width of the yoke portion 35c of the third armature core H3 in such a direction.

The electric machine M84 may be applied to any of a linear electric machine, an axial gap type rotary electric machine, and a radial gap type rotary electric machine. Further, various structures proposed herein may be applied to the electric machine M84.

FIG. 96 is a diagram illustrating a linear electric machine M87 as a specific example of the electric machine M86 shown in FIGS. 95A and 95B.

In the linear electric machine M87, the second armature core H2 is arranged between the two magnetic field portions Fs1 and Fs2, and the first armature core H1 and the third armature core H3 are arranged outside of the two magnetic field portions Fs1 and Fs2. The structures of the magnetic pole groups G1 provided in the first armature core H1, the magnetic pole groups G21 and G22 provided in the second armature core H2, and the magnetic pole groups G3 provided in the third armature core H3 may be the same as those shown in FIG. 95B. The magnetic field portions Fs1 and Fs2 provided in the linear electric machine M87 may be the same as those shown in FIG. 95B.

In the linear electric machine M87, an electrical angle between adjacent magnetic pole group pairs P1 and an electrical angle between adjacent magnetic pole group pairs P2 are expressed as 360×(n+m/s), and is, for example, 2,280 degrees in the linear electric machine M87 (s=3, m=1, n=6 in the linear electric machine M87).

Similarly to the linear electric machine M82 shown in FIG. 91B, in the linear electric machine M87, the magnetic flux flowing in the machine moving direction is substantially not present in the second armature core H2 in the linear electric machine M81. As such, the second armature core H2 may be divided in the machine moving direction. For example, the second armature core H2 may have a plurality of partial cores 34E magnetically coupled in the machine moving direction, and each partial core 34E may have magnetic pole groups G21 and G22.

[Rotary Electric Machine for Forming Magnetic Circuit with Two Magnetic Field Portions and Three Armature Cores]

The structures of the electric machines M80, M84, and M86 illustrated in FIGS. 90A, 93A, and 95A may be applied to a rotary electric machine.

FIGS. 97 and 98 are diagrams respectively illustrating axial gap type rotary electric machines M88 and M89 as specific examples of the electric machine M80. In FIGS. 97 and 98, a part of the first armature cores H1, a part of the coils CL, and a part of the second magnetic field portion Fs2 are omitted.

The armature portion of the rotary electric machine M88 has a second armature core H2 disposed between two magnetic field portions Fs1 and Fs2 that are separated in the axis direction (core facing direction). The armature portion of the rotary electric machine M88 has a first armature core H1 disposed on the opposite side of the second armature core H2 across the first magnetic field portion Fs1 in the axis direction, and a third armature core H3 disposed on the opposite side of the second armature core H2 across the second magnetic field portion Fs2 in the axis direction. The armature cores H1, H2, and H3 are formed of, for example, a soft magnetic powder material. The armature cores H1, H2, and H3 may be formed of laminated electrical steel sheets.

The first armature core H1 has six magnetic pole groups G1 in which three-phase coils CLu, CLv, and CLw are respectively provided, and the third armature core H3 has six magnetic pole groups G3 in which three-phase coils CLu, CLv, and CLw are respectively provided. The second armature core H2 has six magnetic pole groups G21 respectively facing the magnetic pole groups G1 on the side facing the first magnetic field portion Fs1, and also has six magnetic pole groups G22 respectively facing the magnetic pole groups G3 on the side facing the second magnetic field portion Fs2.

The coil CL provided on the magnetic pole groups G1 of the first armature core H1 (e.g., U phase coil CLu) and the coil CL provided on the magnetic pole groups G3 of the third armature core H3 (e.g., U phase coil CLu) have the same winding direction when viewed from the outside of the rotary electric machine M88 in the axis direction, in other words, when viewed in the direction of the flow of the magnetic flux.

Similarly to the electric machine M80 shown in FIG. 90B, the relative positions (positions in the rotation direction) of the magnetic poles of the magnetic pole groups G1, G21, G22, and G3 to the magnetic field cores of the magnetic field portions Fs1 and Fs2 are defined so that a magnetic path is formed from the magnetic pole group G1 of the first armature core H1 through the first magnetic field portion Fs1, the magnetic pole groups G21 and G22 of the second armature core H2, and the second magnetic field portion Fs2 to the magnetic pole group G3 of the third armature core H3.

More specifically, attention is directed to four magnetic pole groups G1, G21, G22, and G3 arranged in a direction intersecting with the machine moving direction (the axis direction in which the cores H1, H2, and H3 are arranged in FIG. 97). At this time, the relative positions of the magnetic poles of the magnetic pole groups G1, G21, G22, and G3 to the magnetic field core are as follows.

The polarity (N or S) of the magnetic field core of the first magnetic field portion Fs1 facing the magnetic pole 33a of the magnetic pole group G1 of the first armature core H1 is different from the polarity (N or S) of the magnetic field core of the first magnetic field portion Fs1 facing the magnetic pole 34a of the magnetic pole group G21 of the second armature core H2.

The polarity of the magnetic field core of the first magnetic field portion Fs1 facing the magnetic pole 34a of the magnetic pole group G21 of the second armature core H2 is different from the polarity of the magnetic field core of the second magnetic field portion Fs2 facing the magnetic pole 34a of the magnetic pole group G22 of the second armature core H2.

The polarity of the magnetic field core of the second magnetic field portion Fs2 facing the magnetic pole 34a of the magnetic pole group G22 of the second armature core H2 is different from the polarity of the magnetic field core of the second magnetic field portion Fs2 facing the magnetic pole 35a of the magnetic pole group G3 of the third armature core H3.

For this arrangement, a magnetic path is formed from the magnetic pole group G1 of the first armature core H1 through the first magnetic field portion Fs1, the magnetic pole groups G21 and G22 of the second armature core H2, and the second magnetic field portion Fs2 to the magnetic pole group G3 of the third armature core H3.

Attention is directed to two phases (e.g., U phase and V phase) that are arranged in the rotation direction in the rotary electric machine M88. At this time, one closed magnetic circuit is formed by the four magnetic pole group pairs described below and the yoke portions 33c and 35c of the first armature core H1 and the third armature core H3. This is also applied to the other two phases, e.g. V phase and W phase, or W phase and U phase.

Magnetic pole group pair consisting of magnetic pole groups G1 and G21 of U phase
Magnetic pole group pair consisting of magnetic pole groups G22 and G3 of U phase
Magnetic pole group pair consisting of magnetic pole groups G1 and G21 of V phase
Magnetic pole group pair consisting of magnetic pole groups G22 and G3 of V phase In the rotary electric machine M88, the magnetic flux flowing in the rotation direction may not be formed in the second armature core H2. As such, the width of the second armature core H2 in the axis direction, i.e., the distance between the magnetic pole group G21 and the magnetic pole group G22, may be smaller than the width of the yoke portion 33c of the first armature core H1 in the axis direction and the width of the yoke portion 35c of the third armature core H3 in the axis direction. The magnetic flux is not required in the second armature core H2 in the rotation direction, and thus the second armature core H2 may be divided in the rotation direction.

An electrical angle between magnetic pole group pairs P adjacent in the rotation direction is represented as 360×(n+m/s), and is, for example, 2,280 degrees (s=3, m=1, n=6 in the rotary electric machine M88). A degree of "(360/p)×(n+m/s)" in mechanical angle is ensured between two adjacent magnetic pole group pairs P, and the angle of two adjacent magnetic pole group pairs P can also be expressed as a degree of "360/s/c" in mechanical angle. In the rotary electric machine M88, an angle between two adjacent magnetic pole group pairs P is 60 degrees. In the rotary electric machine M88, c=2 and the number of poles of the magnetic field portion is 76 (p=38).

FIG. 98 is a diagram illustrating an axial gap type rotary electric machine M89. In FIG. 98, a part of the first armature cores H1, a part of the coils CL, and a part of the second magnetic field portion Fs2 are omitted. In the following, the rotary electric machine M89 will be described focusing on the difference from the rotary electric machine M88 shown in FIG. 97. The matters that are not described (e.g., the flow of magnetic flux and the positions of the magnetic pole group, the magnetic field portion, and the coils to achieve the flow of the magnetic flux) may be the same as the examples of the rotary electric machine M88.

As described above, in the rotary electric machine M88 illustrated in FIG. 97, the yoke portion for allowing the flow of the magnetic flux in the machine moving direction is not required in the second armature core H2. As such, the second armature core H2 of the rotary electric machine M89 has a plurality of magnetic poles 34a arranged in the machine moving direction (rotation direction) and a holding plate 34F for holding the magnetic poles 34a. The fitting holes are formed in the holding plate 34F. The magnetic poles 34a are fitted into the fitting holes and project from both surfaces of the holding plate 34F in the axis direction (upper and lower surfaces in FIG. 98). The portions of magnetic poles 34a of the second armature cores H2 projecting from the holding plates 34F toward the first magnetic field portion Fs1 constitute a magnetic pole group G21. The portions of magnetic pole 34a projecting from the holding plates 34F toward the second magnetic field portion Fs2 constitute a magnetic pole group G22.

The material of the holding plate 34F may be a magnetic material or a non-magnetic material. The material of the holding plate 34F may have conductivity or may be an electrically insulating material. If the material of the holding plate 34F is electrically conductive, as shown in FIG. 98, slits 34v may be formed on the holding plate 34F from the inner edge of the fitting holes into which the magnetic poles 34a are fitted to the edge of the holding plate 34F. In the example shown in FIG. 98, the slits 34v extend from the fitting holes toward the inner peripheral edge of the holding plate 34F.

The first armature core H1 of the rotary electric machine M89 may be the same as the first armature core H1 shown in FIG. 85A. That is, the first armature core H1 of the rotary electric machine M89 may include a yoke partial core 33D formed of electrical steel sheets and magnetic poles 33a formed of electrical steel sheets. The structure of the third armature core H3 may be the same as that of the first armature core H1. That is, the third armature core H3 may include a yoke partial core 35D formed of electrical steel sheets and magnetic poles 35a formed of electrical steel sheets.

The arrangement of the armature cores H1, H2, and H3 in the rotary electric machine is not limited to the examples shown in FIGS. 97 and 98. For example, similarly to the examples shown in FIGS. 93A and 93B, the coil CL may be provided in the second armature cores H2 disposed between the two magnetic field portions Fs1 and Fs2. In yet another example, similarly to the examples shown in FIGS. 95A and 95B, the coils CL may be provided in the second armature core H2 disposed between the two magnetic field portions Fs1 and Fs2 and the third armature core H3 (or the first armature core H1) disposed on the outside of the two magnetic field portions Fs1 and Fs2.

[Electric Machine Having Three Magnetic Field Portions and Four Armature Cores]

The structures of the electric machine described with reference to FIGS. 90A to 98 may be further extended with respect to the number of magnetic field portions and the number of armature cores. For example, the electric machine may have more than two magnetic field portions that are separated in a direction intersecting with the machine moving direction. The armature portion may have armature cores disposed in two adjacent magnetic field portions and armature cores (corresponding to the first armature core H1 and the third armature core H3 in the examples of FIGS. 90A to 98) disposed outside of all magnetic field portions in a direction intersecting with the machine moving direction. Further, the yoke portion for allowing the flow of the magnetic flux in the machine moving direction may be formed in the armature cores disposed outside of all the magnetic field portions. FIG. 99 is a diagram illustrating an example of an electric machine in which such a magnetic circuit is formed. In FIG. 99, lines including arrows passing through the armature cores indicate the magnetic flux.

FIG. 99 is a diagram showing the flow of the magnetic flux in the electric machine M90. The electric machine M90 has a first armature core H1, a second armature core H2, a third armature core H3, and a fourth armature core H4. A first magnetic field portion Fs1 is disposed between the first armature core H1 and the second armature core H2, a second magnetic field portion Fs2 is disposed between the second armature core H2 and the third armature core H3, and a third magnetic field portion Fs3 is disposed between the third armature core H3 and the fourth armature core H4. The three magnetic field portions Fs1, Fs2, and Fs3 are separated in a direction intersecting with the machine moving direction. The four armature cores H1 to H4 are magnetically separated similarly to the other electric machines described above.

The electric machine M90 shown in FIG. 99 has the same structures of the first armature core H1, the second armature core H2, the first magnetic field portion Fs1, and the second magnetic field portion Fs2 as those shown in FIG. 90B. In the electric machine M90, the third armature core H3 has a plurality of magnetic pole groups G31 facing the second magnetic field portion Fs2 and arranged in the machine moving direction and a plurality of magnetic pole groups G32 facing the third magnetic field portion Fs3 and arranged in the machine moving direction. In the third armature core H3, the magnetic pole groups G31 and the magnetic pole groups G32 are arranged in a direction intersecting with the machine moving direction and are magnetically coupled to each other, and the flow of the magnetic flux in the direction intersecting with the machine moving direction is allowed between the magnetic pole groups G31 and the magnetic pole groups G32. The fourth armature core H4 has a plurality of magnetic pole groups G4 facing the third magnetic field portion Fs3 and arranged in the machine moving direction. Each of the magnetic pole groups G1, G21, G22, G31, G32, and G4 has a plurality of magnetic poles arranged in the machine moving direction.

Attention is directed to the six magnetic pole groups G1, G21, G22, G31, G32, and G4 arranged in the direction intersecting with the machine moving direction, i.e., the core facing direction in which the cores H1, H2, H3, and H4 are arranged in FIG. 99. The relative positions of the magnetic pole groups G1, G21, G22, G31, G32, and G4 to the magnetic field cores of the respective magnetic field portions Fs1, Fs2, and Fs3 are defined as follows so that a magnetic path is formed from the magnetic pole group G1 of the first armature core H1 to the magnetic pole group G4 of the fourth armature core H4.

The polarity (N or S) of the magnetic field core of the first magnetic field portion Fs1 facing the magnetic pole of the magnetic pole group G1 of the first armature core H1 is different from the polarity (N or S) of the magnetic field core of the first magnetic field portion Fs1 facing the magnetic pole of the magnetic pole group G21 of the second armature core H2.

The polarity of the magnetic field core of the first magnetic field portion Fs1 facing the magnetic pole of the magnetic pole group G21 of the second armature core H2 is different from the polarity of the magnetic field core of the second magnetic field portion Fs2 facing the magnetic pole of the magnetic pole group G22 of the second armature core H2.

The polarity of the magnetic field core of the second magnetic field portion Fs2 facing the magnetic pole of the magnetic pole group G22 of the second armature core H2 is different from the polarity of the magnetic field core of the second magnetic field portion Fs2 facing the magnetic pole of the magnetic pole group G3 of the third armature core H3.

The polarity of the magnetic field core of the second magnetic field portion Fs2 facing the magnetic pole of the magnetic pole group G31 of the third armature core H3 is different from the polarity of the magnetic field core of the third magnetic field portion Fs3 facing the magnetic pole of the magnetic pole group G32 of the third armature core H3.

The polarity of the magnetic field core of the third magnetic field portion Fs3 facing the magnetic pole of the magnetic pole group G32 of the third armature core H3 is different from the polarity of the magnetic field core of the third magnetic field portion Fs3 facing the magnetic pole of the magnetic pole group G4 of the fourth armature core H4.

For this arrangement, as shown in FIG. 99, a magnetic path is formed from the magnetic pole group G1 of the first armature core H1, through the first magnetic field portion Fs1, the magnetic pole groups G21 and G22 of the second armature core H2, the second magnetic field portion Fs2, the magnetic pole groups G31 and G32 of the third armature core H3, and the third magnetic field portion Fs3, to the magnetic pole group G4 of the fourth armature core H4.

The electric machine M90 is driven by a three-phase alternating current, for example. A U phase coil CLu, a V phase coil CLv, and a W phase coil CLw are provided on the three magnetic pole groups G1 of the first armature core H1 arranged in the machine moving direction, a U phase coil CLu, a V phase coil CLv, and a W phase coil CLw are also provided on the three magnetic pole groups G31 of the third armature core H3 arranged in the machine moving direction, and a U phase coil CLu, a V phase coil CLv, and a W phase coil CLw are also provided on the four magnetic pole groups G4 of the fourth armature core H4 arranged in the machine moving direction. The coil CL provided on the magnetic pole group G1 (e.g., U phase coil CLu), the coil CL provided on the magnetic pole group G31 (e.g., U phase coil CLu), and the coil CL provided on the magnetic pole group G4 (e.g., U phase coil CLu) have the same winding direction when viewed from the first armature core H1 in a direction intersecting with the machine moving direction (core facing direction), in other words, when viewed in the direction of the flow of the magnetic flux. The coil CL may be provided on the second armature core H2 or on the magnetic pole group G32 of the third armature core H3 if the winding directions of the coils CL are the same.

In the electric machine M90, the position of the magnetic field core of the first magnetic field portion Fs1 and the position of the magnetic field core of the second magnetic field portion Fs2 are shifted by 180 degrees in electrical angle. On the other hand, the position of the magnetic field core of the second magnetic field portion Fs2 matches the position of the magnetic field core of the third magnetic field portion Fs3. In the magnetic field portions Fs1 and Fs2 shown in FIG. 99, the parts with the arrows indicate magnets, the part sandwiched between the ends of two arrows is the magnetic field core of the N pole, and the part sandwiched between the proximal ends of two arrows is the magnetic field core of the S pole. In this description, the position of the magnetic field core is a position in the machine moving direction. The positions of the magnetic field portions Fs1, Fs2, and Fs3 are not limited to the example of the electric machine M90 if the above described relative positions of the magnetic field cores of the magnetic field portions Fs1, Fs2, and Fs3 and the magnetic pole groups G1, G21, G22, G31, G32, and G4, which form the magnetic path extending from the magnetic pole group G1 of the first armature core H1 to the magnetic pole group G4 of the fourth armature core H4, are established. For example, the position of the magnetic field core of the second magnetic field portion Fs2 and the position of the magnetic field core of the third magnetic field portion Fs3 may be shifted by 180 degrees in electrical angle similarly to the relationship between the first magnetic field portion Fs1 and the second magnetic field portion Fs2. In this case, the magnetic pole of the magnetic pole group G31 of the third armature core H3 may match the position of the magnetic pole of the magnetic pole group G32.

Attention is directed to the two phases that are separated in the machine moving direction in the electric machine M90 (e.g., U phase and V phase). At this time, one closed magnetic circuit is formed by the six magnetic pole group pairs described below and the yoke portions 33c and 36c of the first armature core H1 and the fourth armature core H3. This is also applied to the other two phases, e.g. V phase and W phase, or W phase and U phase.

Magnetic pole group pair consisting of magnetic pole groups G1 and G21 of U phase
Magnetic pole group pair consisting of magnetic pole groups G22 and G31 of U phase
Magnetic pole group pair consisting of magnetic pole groups G32 and G3 of U phase
Magnetic pole group pair consisting of magnetic pole groups G1 and G21 of V phase
Magnetic pole group pair consisting of magnetic pole groups G22 and G31 of V phase
Magnetic pole group pair consisting of magnetic pole groups G32 and G3 of V phase In the electric machine M90, the magnetic flux flowing beyond the phases in the machine moving direction is not formed in the second armature core H2 and the third armature core H3. As such, the width of the second armature core H2 in the direction intersecting with the machine moving direction, i.e., the distance between the magnetic pole group G21 and the magnetic pole group G22, may be smaller than the width of the yoke portion 33c of the first armature core H1 in the direction intersecting with the machine moving direction and the width of the yoke portion 36c of the fourth armature core H4 in such a direction. Similarly, the width of the third armature core H3 in the direction intersecting with the machine moving direction, i.e., the distance between the magnetic pole group G31 and the magnetic pole group G32, may be smaller than the width of the yoke portion 33c of the first armature core H1 in the direction intersecting with the machine moving direction and the width of the yoke portion 36c of the fourth armature core H4 in such a direction.

[Electric Machine in which Magnetic Path is Formed Only in Direction Intersecting with Machine Moving Direction]

In the electric machines described above, the armature portion forms a closed magnetic circuit by using the magnetic path (yoke portion of armature core) to allow the flow of magnetic flux in the machine moving direction (e.g., rotation direction in rotary electric machine). However, the electric machine may have two magnetic field portions and two armature cores that are magnetically separated, and, with the use of the two armature cores and two magnetic field portions, may form a magnetic circuit consisting only of a magnetic path in a direction intersecting with the machine moving direction. FIGS. 100A to 105 are diagrams illustrating examples of an electric machine having such a magnetic circuit.

FIG. 100A is a schematic diagram of an electric machine M100 seen in the machine moving direction as an example of such an electric machine. FIG. 100B is a diagram showing the flow of the magnetic flux in the electric machine M100. In FIG. 100B, lines including arrows passing through the armature cores indicate the magnetic flux.

The electric machine M100 has a first magnetic field portion Fs1 and a second magnetic field portion Fs2 that are spaced apart in a direction intersecting with the machine moving direction (left-right direction in FIG. 100A). Further, the electric machine M100 has a first armature core H1 and a second armature core H2 that are spaced apart in a direction intersecting with the machine moving direction (vertical direction in FIG. 100A). The first armature core H1 and the second armature core H2 are disposed between the two magnetic field portions Fs1 and Fs2. The two armature cores H1 and H2 are magnetically separated.

As shown in FIG. 100B, the first armature core H1 has a plurality of magnetic pole groups G11 facing the first magnetic field portion Fs1 and arranged in the machine moving direction. Further, the first armature core H1 has a plurality of magnetic pole groups G12 facing the second magnetic field portion Fs2 and arranged in the machine moving direction. In the first armature core H1, as shown in FIG. 100B, the magnetic pole groups G11 and the magnetic pole groups G12 are arranged in the machine moving direction and are magnetically coupled to each other, and the flow of the magnetic flux in the direction intersecting with the machine moving direction is allowed between the magnetic pole groups G11 and the magnetic pole groups G12. The second armature core H2 has a plurality of magnetic pole groups G21 facing the first magnetic field portion Fs1 and arranged in the machine moving direction. Further, the second armature core H2 has a plurality of magnetic pole groups G22 facing the second magnetic field portion Fs2 and arranged in the machine moving direction. In the second armature core H2, the magnetic pole groups G21 and the magnetic pole groups G22 are arranged in a direction intersecting with the machine moving direction and are magnetically coupled to each other, and the flow of the magnetic flux in the direction intersecting with the machine moving direction is allowed between the magnetic pole groups G21 and the magnetic pole groups G22. In FIG. 100B, the armature core at the top is a portion of the second armature core H2 (magnetic pole group G21), and the armature core at the bottom is another portion of the second armature core H2 (magnetic pole group G22).

Attention is directed to four magnetic pole groups G21, G11, G12, and G22 arranged in a direction intersecting with the machine moving direction (the core facing direction in which the cores H1 and H2 are arranged in FIG. 100B). At this time, the relative positions of the magnetic poles of the magnetic pole groups and the magnetic field cores are as follows.

The polarity (N or S) of the magnetic field core of the first magnetic field portion Fs1 facing the magnetic pole of the magnetic pole group G21 of the second armature core H2 is different from the polarity of the magnetic field core of the first magnetic field portion Fs1 facing the magnetic pole of the magnetic pole group G11 of the first armature core H1.

The polarity of the magnetic field core of the first magnetic field portion Fs1 facing the magnetic pole of the magnetic pole group G11 of the first armature core H1 is different from the polarity of the magnetic field core of the second magnetic field portion Fs2 facing the magnetic pole of the magnetic pole group G12 of the first armature core H1.

The polarity of magnetic field core of second magnetic field portion Fs2 facing magnetic pole of magnetic pole group G12 of the first armature core H1 is different from the polarity of magnetic field core of second magnetic field portion Fs2 facing magnetic pole of magnetic pole group G22 of the second armature core H2.

The polarity (N or S) of the magnetic field core of the second magnetic field portion Fs2 facing the magnetic pole of the magnetic pole group G22 of the second armature core H2 is different from the polarity of the magnetic field core of the first magnetic field portion Fs1 facing the magnetic pole of the magnetic pole group G21 of the second armature core H2.

Because of these relative positions, a magnetic path is formed from the magnetic pole group G21 of the second armature core H2 through the first magnetic field portion Fs1, the magnetic pole groups G11 and G12 of the first armature core H1, the second magnetic field portion Fs2, and the magnetic pole group G22 of the second armature core H2, to the magnetic pole group G21 of the second armature core H2.

As shown in FIG. 100B, in the two magnetic field portions Fs1 and Fs2 of the electric machine M100, the position of the magnetic field core of the first magnetic field portion Fs1 and the position of the magnetic field core of the second magnetic field portion Fs2 are shifted by 180 degrees in electrical angle. In the magnetic field portions Fs1 and Fs2 shown in FIG. 100B, the parts with the arrows indicate magnets, the part sandwiched between the ends of two arrows is the magnetic field core of the N pole, and the part sandwiched between the proximal ends of two arrows is the magnetic field core of the S pole. In this description, the position of the magnetic field core is a position in the machine moving direction. As such, as shown in FIG. 100B, the magnetic flux flowing through the first armature cores H1 does not flow into the magnetic pole group of the adjacent phase, but flows only through the magnetic pole groups of the same phase. For example, the magnetic flux flowing through the magnetic pole group G11 of U phase does not flow into the magnetic pole group G12 of V phase or W phase, but flows toward the magnetic pole group G12 of U phase. Further, in the electric machine M100, the coil CL is not provided on the yoke portion but on the magnetic pole groups G11 and G12, and the magnetic flux passing through the magnetic pole is always interlinked with the coil CL. As such, the first armature core H1 is not required to be magnetically separated between two different phases. This is the same for the second armature core H2, and the second armature core H2 is not required to be magnetically separated between the two different phases. As a result, the strength of the armature cores H1 and H2 can be increased, and the assembly accuracy and the position accuracy of magnetic poles can be improved.

In the electric machine M100, a U phase coil CLu, a V phase coil CLv, and a W phase coil CLw are provided in three magnetic pole groups G11 of the first armature cores H1 arranged in the machine moving direction. Further, in the electric machine M100, a U phase coil CLu, a V phase coil CLv, and a W phase coil CLw are provided in three magnetic pole groups G12 of the first armature cores H1 arranged in the machine moving direction. The coil CL provided on the magnetic pole groups G11 (e.g., U phase coil CLu) and the coil CL provided on the magnetic pole groups G12 (e.g., U phase coil CLu) have the same winding direction when viewed from one of the magnetic field portions Fs1 or Fs2, in other words, when viewed in a direction along the magnetic flux formed by the magnets of the magnetic field portions Fs1 and Fs2.

Attention is now directed to the magnetic pole group pairs of the same phase. For example, attention will be paid to the magnetic pole group pairs Pu1 and Pu2 of U phase. The magnetic pole group pairs Pu1 and Pu2 forms a magnetic path from the magnetic pole group G21 of the second armature core H2 through the magnetic field core and magnets of the first magnetic field portion Fs1, the magnetic pole groups G11 and G12 of the first armature core H1, the magnetic field core and magnets of the second magnetic field portion Fs2, and the magnetic pole group G22 of the second armature core H2 to the magnetic pole group G21 of the second armature core H2. As such, one closed magnetic circuit is formed by the two magnetic pole group pairs Pu1 and Pu2. Such a magnetic circuit does not have a magnetic path formed over two phases that are spaced apart in the machine moving direction. This is also applied to each of the other two phases. In this description, the magnetic pole group pair Pu1 of U phase is a pair formed by the magnetic pole group G11$u$ of the first armature core H1 and the magnetic pole group G21$u$ of the second armature core H2. The magnetic pole group pair Pu2 of U phase is a pair formed by the magnetic pole group G12$u$ of the first armature core H1 and the magnetic pole group G22$u$ of the second armature core H2.

In the electric machine M100, the magnetic flux flowing in the machine moving direction is not formed in the first armature core H1 and the second armature core H2. As such, the yoke portion of the first armature core H1 to allow the magnetic flux in the machine moving direction and the yoke portion of the second armature core H2 to allow the magnetic flux in the machine moving direction may not be formed.

The electric machine M100 may be any of a linear electric machine, an axial gap type rotary electric machine, and a radial gap type rotary electric machine.

Various structures proposed herein may be applied to the electric machine M100. For example, the armature cores H1 and H2 of the electric machine M100 may be formed of a plurality of electrical steel sheets laminated in the machine moving direction similarly to the electric machine shown in FIG. 1A. Alternatively, the armature cores H1 and H2 may be formed of a soft magnetic powder material similarly to the electric machine shown in FIG. 18. In yet another example, similarly to the electric machine illustrated in FIG. 38A, a portion of each armature core H1 and H2 is formed of a plurality of electrical steel sheets, and the other portions may be formed of a soft magnetic powder material. Further, similarly to electric machine shown in FIG. 34A, the magnetic pole 33$a$ of the first armature core H1 and the magnetic pole 34$a$ of the second armature core H2 may have a body projecting toward the magnetic field portion Fs and a projecting portion extending from the body in a direction intersecting with the machine moving direction. Similarly to the electric machine shown in FIG. 26A or FIG. 27, the armature cores H1 and H2 may be composed of a plurality of partial cores that are formed separately and coupled to each other. In the electric machine M100, the armature cores H1 and H2 may be solidified by materials that are non-magnetic and have insulating properties, similarly to the electric machine shown in FIG. 39.

The number of phases of the electric machine M100 may be more than three. Further, the plurality of magnetic pole groups G11 of the armature core H1 of the electric machine M100 may be provided with the coils of the same phase and opposite winding directions (e.g., U+ phase coil CLu+, U− phase coil CLu−), and the plurality of magnetic pole groups G12 may be provided with the coils of the same phase and opposite winding directions (e.g., U+ phase coil CLu+, U− phase coil CLu−). In yet another example, similarly to the electric machine shown in FIG. 25A or FIG. 67, the number of phases of the electric machine M100 may be an even number of two or more.

FIG. 101 is a diagram illustrating a linear electric machine M101 as a specific example of the electric machine M100 shown in FIGS. 100A and 100B.

The linear electric machine M101 has two magnetic field portions Fs1 and Fs2 that are separated in a direction (second direction D2) intersecting with the machine moving direction. The linear electric machine M101 has a first armature core H1 and two second armature cores H2. These armature cores H1 and H2 are disposed between the two magnetic field portions Fs1 and Fs2. The first armature core H1 is disposed between the two second armature cores H2. The positions and structures of the magnetic pole groups G11 and G12 of the first armature core H1 and the magnetic pole groups G21 and G22 of the second armature cores H2 may be the same as those shown in FIG. 100B. The positions of the magnetic field portions Fs1 and Fs2 provided in the linear electric machine M101 may be the same as those shown in FIG. 100B.

In the linear electric machine M101, the armature cores H1 and H2 are formed of laminated electrical steel sheets. The electrical steel sheets are laminated in a direction perpendicular to both the direction in which the armature cores H1 and H2 face the magnetic field portions Fs1 and Fs2 and the machine moving direction. The material of the armature cores H1 and H2 are not limited to electrical steel sheets, and may be a soft magnetic powder material.

In the linear electric machine M101, an electrical angle between adjacent magnetic pole group pairs P is represented as 360×(n+m/s), and is, for example, 2,280 degrees in the linear electric machine M101 (s=3, m=1, n=6 in this linear electric machine M101).

In the linear electric machine M101, as described with reference to the electric machine M100, there is substantially no magnetic flux flowing in the armature cores H1 and H2 in the machine moving direction. As such, a magnetic path (yoke portion) for flowing the magnetic flux in the machine moving direction is not required. For this reason, the first armature core H1 may be divided into a plurality of partial cores in the machine moving direction, and magnetic pole groups G11 and G12 may be formed in each partial core. Similarly, the second armature core H2 may be divided into a plurality of partial cores in the machine moving direction, and magnetic pole groups G21 and G22 may be formed in each partial core. A gap may be formed between two partial cores adjacent in the machine moving direction, and the two adjacent partial cores may be coupled by a nonmagnetic material.

[Modification Example of Arrangement of Coil]

In the electric machine M100 shown in FIGS. 100A and 100B, the coils CL are provided in the magnetic pole groups G11 and G12 of the first armature core H1. The arrangement of the coils CL is not limited thereto. For example, as shown in FIGS. 102A and 102B, the coils CL may be provided in the magnetic pole group of the first armature core H1 and the magnetic pole group of the second armature core H2. In this case, as shown in FIG. 102A, the magnetic field portion Fs1 opposed to the magnetic pole group G11 of the first armature core H1 in which one coil CL is provided may be different from the magnetic field portion Fs2 opposed to the magnetic pole group G22 of the second armature core H2 in which the other coil CL is provided. Alternatively, as shown in FIG. 101B, the magnetic field portion Fs1 opposed to the magnetic pole group G11 of the first armature core H1 in which one coil CL is provided may be the same as the magnetic field portion Fs1 opposed to the magnetic pole group G21 of the second armature core H2 in which the other coil CL is provided. In any of the electric machines M102 and M103 shown in FIGS. 102A and 102B, the two coils CL may have the same winding direction when viewed in the direction in which the magnetic flux flows. In other words, the two coils CL may have the same winding direction when viewed from one magnetic field portion (e.g., magnetic field portion Fs1).

[Electric Machine in which Two Magnetic Field Portions are Disposed Between Two Armature Cores]

In the examples of FIGS. 100A to 102B, the armature cores are disposed between two magnetic field portions that are spaced apart in a direction intersecting with the machine moving direction. The arrangements of the magnetic field portions and the armature cores are not limited to the examples disclosed in FIGS. 100A to 102B. In contrast with the examples shown in FIGS. 100A to 102B, the two armature cores may be spaced apart in intersecting directions with respect to machine moving direction and magnetic field portion may be disposed between the two armature cores. FIGS. 103A to 103C show examples of such arrangements of the armature cores and the magnetic field portions.

In the electric machine M104 shown in FIG. 103A, the first armature core H1 and the second armature core H2 are spaced apart in a direction intersecting with the machine moving direction. The first magnetic field portion Fs1 and the second magnetic field portion Fs2 are disposed between the two armature cores H1 and H2. The two magnetic field portions Fs1 and Fs2 are spaced apart in a direction intersecting with both the machine moving direction and the core facing direction.

The first armature core H1 has magnetic pole groups G11 facing the first magnetic field portion Fs1 and magnetic pole groups G12 facing the second magnetic field portion Fs2. A plurality of magnetic pole groups G11 are disposed in the machine moving direction. A plurality of magnetic pole groups G12 are also disposed in the machine moving direction. The magnetic pole groups G11 and the magnetic pole groups G12 are magnetically coupled. That is, the magnetic flux can flow between the magnetic pole groups G11 and the magnetic pole groups G12 without passing through the magnetic field portion. In the example shown in FIG. 103A, the first armature core H1 has yoke portions 33*u* connecting the magnetic pole groups G11 and the magnetic pole groups G12 of the first armature core H1. The magnetic pole groups G11 are magnetically coupled to the magnetic pole groups G12 of the same phase respectively. For example, the magnetic pole group G11 of U phase is magnetically coupled to the magnetic pole group G12 of U phase. In the electric machine M104, there is substantially no magnetic flux flowing in the machine moving direction across the two phases. As such, the magnetic pole groups G11 and G12 of one phase and the yoke portion 33*u* connecting them may be magnetically separated from the magnetic pole groups G11 and G12 of the other phase and the yoke portion 33*u* connecting them.

The second armature core H2 has magnetic pole groups G21 positioned on the side opposite to the magnetic pole groups G11 across the first magnetic field portion Fs1 and magnetic pole groups G22 positioned on the side opposite to the magnetic pole groups G12 across the second magnetic field portion Fs2. Similarly to the magnetic pole groups G11 and G12 of the first armature H1, the magnetic pole groups G21 are magnetically coupled to the magnetic pole group G22 of the same phase respectively. The second armature core H2 has yoke portions 34*u* connecting the magnetic pole groups G21 and the magnetic pole groups G22. There is substantially no magnetic flux flowing in the machine moving direction across the two phases in electric machine M104, and thus, the magnetic pole groups G21 and G22 of one phase and the yoke portion 34*u* connecting them may be magnetically separated from the magnetic pole groups G21 and G22 of the other phase and the yoke portion 34*u* connecting them.

In the electric machine M104, the coils CL are provided in the magnetic pole groups G11 of the first armature core H1 and the magnetic pole groups G22 of the second armature core H2. These two coils CL have the same winding direction when viewed in a direction along the magnetic flux. In other words, when the two coils CL are viewed from one armature core (e.g., first armature core H1), their winding directions are opposite.

The arrangement of the coils CL is not limited to the example shown in FIG. 103A. For example, in the electric machine M105 shown in FIG. 103B, the coils CL are respectively provided in the magnetic pole groups G11 and 12 of the first armature core H1, and not provided in the second armature core H2. These two coils CL have the same winding direction when viewed in a direction along the magnetic flux. In other words, when the two coils CL are viewed from one armature core (e.g., first armature core H1), their winding directions are opposite. Alternatively, in the electric machine M106 shown in FIG. 103C, the coils CL are provided in the magnetic pole group G11 of the first armature core H1 and the magnetic pole group G21 of the second armature core H2, where the magnetic pole group G11 and the magnetic pole group G21 face each other across the first magnetic field portion Fs1. These two coils CL have the same winding direction when viewed in a direction along the magnetic flux. In other words, when the two coils CL are viewed from one armature core (e.g., first armature core H1), their winding directions are the same.

FIGS. 104A and 104B are diagrams illustrating a linear electric machine M107 as a specific example of the electric machine M105 shown in FIG. 103B.

The linear electric machine M107 has a first armature core H1 and a second armature core H2 facing each other in the direction intersecting with the machine moving direction. The magnetic field portions Fs1 and Fs2 are disposed between the two armature cores H1 and H2. The two magnetic field portions Fs1 and Fs2 are spaced apart in a direction intersecting with both a direction in which the armature cores H1 and H2 face each other and the machine moving direction.

The first armature core H1 have a plurality of magnetic pole groups G11, specifically, three magnetic pole groups G11 facing the first magnetic field portion Fs1 and arranged in the machine moving direction. The first armature core H1 have a plurality of magnetic pole groups G12, specifically, three magnetic pole groups G12 facing the second magnetic field portion Fs2 and arranged in the machine moving direction. The first armature core H1 has a plate-like yoke portion 33*u*. The first armature core H1 have bases 33*v* projecting from the yoke portion 33*u* toward the magnetic field portions Fs1 and Fs2. A plurality of magnetic pole 33*a* are formed on each base 33*v* to constitute one magnetic pole group G11 or G12. In the example shown in FIG. 104B, five magnetic poles 33*a* constitute one magnetic pole group G11 or G12. The coils CL are provided in the magnetic pole groups G11 and G12. The first armature core H1 is formed of a soft magnetic powder material, for example. The first armature core H1 may be formed of laminated electrical steel sheets.

The second armature core H2 has a plurality of magnetic pole groups G21 positioned on the side opposite to the magnetic pole groups G11 across the first magnetic field portion Fs1 and a plurality of magnetic pole groups G22 positioned on the side opposite to the magnetic pole groups G12 across the second magnetic field portion Fs2. The second armature core H2 has a plate-like yoke portion 34*u*. The yoke portion 34*u* has a plurality of recessed portions 34*b* on the surface facing the magnetic field portions Fs1 and Fs2. A portion between two adjacent recessed portions 34*b* is a relatively projecting magnetic pole 34*a*. This structure can increase the strength of the magnetic pole 34*a*. The armature core H2 can be formed of a soft magnetic powder material, for example. Similarly to the armature cores H1 and H2 shown in FIG. 65A, the armature core H2 may be formed of lamination steel.

As described referring to FIG. 100B, in the linear electric machine M107 as well, the relative positions of the magnetic poles of the magnetic pole groups G21, G11, G12, and G22 to the magnetic field core of the magnetic field portions Fs1 and Fs2 are defined so that a magnetic path is formed from the magnetic pole group G21 of the second armature core H2 through the first magnetic field portion Fs1, the magnetic pole groups G11 and G12 of the first armature core H1, the second magnetic field portion Fs2, and to the magnetic pole group G22 of the second armature core H2. When viewing two coils provided in the magnetic pole groups G11 and G12 of the same phase (e.g., magnetic pole groups G11 and G12 of U phase) in the direction of the flow of the magnetic flux, the winding direction of the two coils CL is the same.

In the electric machine where a plurality of magnetic pole groups constituting the magnetic circuit are arranged only in the direction intersecting with the machine moving direction, the arrangement of the armature cores H1 and H2 and the magnetic field portions Fs1 and Fs2 is not limited to the example shown in FIGS. 100A to 104B. For example, the first surface of the magnetic field portion facing the magnetic pole group of the first armature core and the second face of the magnetic field portion facing the magnetic pole group of the second armature core may not necessarily be facing in the opposite directions. The first surface and the second surface may be adjacent to each other with a corner therebetween. FIG. 105 is a diagram illustrating an electric machine M108 having such an arrangement.

The electric machine M108 has a first armature core H1 and a second armature core H2. Similarly to the electric machines described above, the first armature core H1 has magnetic pole groups G11 and G12 spaced apart in a direction intersecting with the machine moving direction, and the second armature core H2 has magnetic pole groups G21 and G22 spaced apart in a direction intersecting with the machine moving direction. The magnetic pole groups G11 and G12 are magnetically coupled through a yoke portion 33*u*. The magnetic pole groups G21 and G22 are also magnetically coupled.

In the example shown in FIG. 105, the cross section of the first magnetic field portion Fs1 is square, and the outer surface of the first magnetic field portion Fs1 has a first surface 22*a* (the upper surface in FIG. 105) and a second surface 22*b* (the side surface in FIG. 105) adjacent to each other across a corner. The magnetic pole group G11 of the first armature core H1 faces the first surface 22*a* of the first magnetic field portion Fs1. The magnetic pole group G21 of the second armature core H2 faces the second surface 22*b* of the first magnetic field portion Fs1. Similarly, the cross section of the second magnetic field portion Fs2 is square, and the outer surface of the second magnetic field portion Fs2 has a first surface 22*a* (the upper surface in FIG. 105) and a second surface 22*b* (the side surface in FIG. 105)

adjacent to each other across a corner. The magnetic pole group G12 of the first armature core H1 faces the first surface 22a of the second magnetic field portion Fs2. The magnetic pole group G22 of the second armature core H2 faces the second surface 22b of the second magnetic field portion Fs2.

In the example shown in FIG. 105, similarly to the electric machine M105 shown in FIG. 103B, the coils CL are provided in the magnetic pole groups G11 and G12 of the first armature core H1. The arrangement of the coil CL is not limited to this example. For example, in the electric machine M108 shown in FIG. 105, the coils CL may be provided in the magnetic pole group G11 of the first armature core H1 and the magnetic pole group G22 of the second armature core H2. In another example, the coils CL may be provided in the magnetic pole group G11 of the first armature core H1 and the magnetic pole group G21 of the second armature core H2. These two coils CL have the same winding direction when viewed in a direction along the magnetic flux.

The structures of the electric machines shown in FIGS. 100A to 105, which include only the magnetic pole groups intersecting with the machine moving direction as the magnetic pole groups constituting the magnetic circuit, may be further extended for the number of magnetic field portions and the number of armature cores. For example, the electric machine may have three magnetic field portions and three armature cores. FIG. 106 is a diagram showing the flow of the magnetic flux of an electric machine M109 as an example of such an electric machine.

The electric machine M109 has a first magnetic field portion Fs1, a second magnetic field portion Fs2, and a third magnetic field portion Fs3, which are spaced apart in a direction intersecting with the machine moving direction. The electric machine M109 also has a first armature core H1, a second armature core H2, and a third armature core H3, which are spaced apart in a direction intersecting with the machine moving direction. In FIG. 106, the armature core at the top is a portion of the third armature core H3 (magnetic pole group G32), and the armature core at the bottom is another portion of the third armature core H3 (magnetic pole group G31).

The first armature cores H1 has a plurality of magnetic pole groups G11 facing the first magnetic field portion Fs1 and a plurality of magnetic pole groups G12 facing the second magnetic field portion Fs2. The second armature core H2 has a plurality of magnetic pole groups G21 facing the first magnetic field portion Fs1 and a plurality of magnetic pole groups G22 facing the third magnetic field portion Fs3. The third armature core H3 has magnetic pole groups G31 facing the third magnetic field portion Fs3 and magnetic pole groups G32 facing the second magnetic field portion Fs2. The three armature cores H1, H2, and H3 are magnetically separated. That is, the magnetic materials that allow the magnetic flux to flow between the armature cores H1, H2, and H3 without passing through the magnetic field portions Fs1, Fs2, and F3 are not formed in the armature cores H1, H2, and H3.

In the first armature core H1, the magnetic pole groups G11 and the magnetic pole groups G12 are magnetically coupled, and the magnetic flux is allowed to flow between the magnetic pole groups G11 and the magnetic pole groups G12 in a direction intersecting with the machine moving direction. In the second armature core H2, the magnetic pole groups G21 and the magnetic pole groups G22 are magnetically coupled, and the magnetic flux is allowed to flow between the magnetic pole groups G21 and the magnetic pole groups G22 in a direction intersecting with the machine moving direction. In the third armature core H3, the magnetic pole groups G31 and the magnetic pole groups G32 are magnetically coupled, and the magnetic flux is allowed to flow between the magnetic pole groups G31 and the magnetic pole groups G32 in a direction intersecting with the machine moving direction.

Attention is directed to six magnetic pole groups G32, G12, G11, G21, G22, and G31 arranged in a direction intersecting with the machine moving direction (the core facing direction in which the armature cores H1, H2, and H3 are arranged in FIG. 106). The relative positions of the magnetic pole groups G32, G12, G11, G21, G22, and G31 to the magnetic field portions Fs1, Fs2, and Fs3 are defined so that a magnetic circuit is formed from the magnetic pole group G32 to the magnetic pole group G31. Specifically, the following is defined.

The polarity (N or S) of the magnetic field core of the second magnetic field portion Fs2 facing the magnetic pole of the magnetic pole group G12 of the first armature core H1 is different from the polarity of the magnetic field core of the first magnetic field portion Fs1 facing the magnetic pole of the magnetic pole group G11 of the first armature core H1.

The polarity of the magnetic field core of the first magnetic field portion Fs1 facing the magnetic pole of the magnetic pole group G11 of the first armature core H1 is different from the polarity of the magnetic field core of the first magnetic field portion Fs1 facing the magnetic pole of the magnetic pole group G21 of the second armature core H2.

The polarity of the magnetic field core of the first magnetic field portion Fs1 facing the magnetic pole of the magnetic pole group G21 of the second armature core H2 is different from the polarity of the magnetic field core of the third magnetic field portion Fs3 facing the magnetic pole of the magnetic pole group G22 of the second armature core H2.

The polarity of the magnetic field core of the third magnetic field portion Fs3 facing the magnetic pole of the magnetic pole group G22 of the second armature core H2 is different from the polarity of the magnetic field core of the third magnetic field portion Fs3 facing the magnetic pole of the magnetic pole group G31 of the third armature core H3.

The polarity of the magnetic field core of the third magnetic field portion Fs3 facing the magnetic pole of the magnetic pole group G31 of the third armature core H3 is different from the polarity of the magnetic field core of the second magnetic field portion Fs2 facing the magnetic pole of the magnetic pole group G32 of the third armature core H3.

The polarity of the magnetic field core of the second magnetic field portion Fs2 facing the magnetic pole of the magnetic pole group G32 of the third armature core H3 is different from the polarity of the magnetic field core of the second magnetic field portion Fs2 facing the magnetic pole of the magnetic pole group G12 of the first armature core H1.

Because of such relative positions, a magnetic path is formed from the magnetic pole group G32 of the third armature core H3 through the third magnetic field portion Fs3, the magnetic pole groups G11 and G12 of the first armature core H1, the first magnetic field portion Fs1, the magnetic pole groups G21 and G22 of the second armature core H2, the second magnetic field portion Fs2, and the magnetic pole group G31 of the third armature core H3 to magnetic pole group G32 of the third armature core H3.

As shown in FIG. 106, in the electric machine M109, the position of the magnetic field core of the first magnetic field portion Fs1 and the position of the magnetic field core of the third magnetic field portion Fs3 are shifted by 180 degrees in electrical angle. That is, the position of the magnetic field core of N pole of the first magnetic field portion Fs1 matches the position of the magnetic field core of S pole of the third magnetic field portion Fs3. In this description, the position of the magnetic field core is a position in the machine moving direction. The position of the magnetic field core of the first magnetic field portion Fs1 and the position of the magnetic field core of the second magnetic field portion Fs2 are also shifted by 180 degrees in electrical angle. That is, the position of the magnetic field core of N pole of the first magnetic field portion Fs1 matches the position of the magnetic field core of S pole of the second magnetic field portion Fs2. In this description, the position of the magnetic field core is a position in the machine moving direction. In the magnetic field portions Fs1, Fs2, and Fs3 shown in FIG. 106, the parts with the arrows indicate magnets, the part sandwiched between the ends of two arrows is the magnetic field core of the N pole, and the part sandwiched between the proximal ends of two arrows is the magnetic field core of the S pole. In this description, the position of the magnetic field core is a position in the machine moving direction.

The electric machine M106 is driven by a three-phase alternating current, for example. In the example shown in FIG. 106, a U phase coil CLu, a V phase coil CLv, and a W phase coil CLw are provided in three magnetic pole groups G11 of the first armature core H1, and are also provided in the magnetic pole group G12 of the first armature core H1. Further, a U phase coil CLu, a V phase coil CLv, and a W phase coil CLw are provided in three magnetic pole groups G31 of the third armature cores H3. These three coils CL (e.g., three U phase coils CLu) have the same winding direction when viewed in a direction along the magnetic flux.

Attention is directed to the magnetic pole group of one phase (e.g., U phase) arranged in the machine moving direction in the electric machine M109. At this time, one closed magnetic circuit is formed by the following three magnetic pole group pairs. The same is applies to the other two phases.

Magnetic pole group pair consisting of magnetic pole groups G32 and G12 of U phase
Magnetic pole group pair consisting of magnetic pole groups G11 and G21 of U phase
Magnetic pole group pair consisting of magnetic pole groups G22 and G31 of U phase Such a magnetic circuit does not have a magnetic path formed over two phases that are spaced apart in the machine moving direction. This is also applied to each of the other two phases.

In the electric machine M106, the magnetic flux flowing in the machine moving direction (magnetic flux flowing over two phases) is not formed in the armature cores H1, H2, and H3. As such, a yoke portion of the armature cores H1, H2, and H3 to allow the magnetic flux in the machine moving direction may not be formed.

[Magnetic Field Portion Having Exposed Surfaces]

In the present disclosure, the electric machine in which the magnetic pole groups of the plurality of armature cores respectively face the plurality of surfaces of one magnetic field portion is disclosed. For example, in the rotary electric machine M24 shown in FIG. 54A, the first armature core H1 and the second armature core H2 respectively face the outer peripheral surface and the inner peripheral surface of the magnetic field portion Fs. In the electric machine of such a structure, it is desirable that the magnetic field core of the magnetic field portion is exposed in such surfaces. Examples of such a magnetic field portion are described in FIGS. 107A to 107C.

A magnetic field portion Fs15 shown in FIG. 107A has magnetic field cores 22N and 22S formed of electrical steel sheets laminated in the machine moving direction (the rotation direction in FIG. 107A). The magnetic field cores 22N 22S are exposed on the inner peripheral surface and the outer peripheral surface of the magnetic field portion Fs. This magnetic field portion Fs is suitable for a rotary electric machine in which the armature cores are disposed both on the inner side and the outer side of the magnetic field portion Fs (e.g. the rotary electric machine M24 shown in FIG. 54A).

In the magnetic field portion Fs15 shown in FIG. 107A, each of the magnetic field cores 22N and 22S has two partial magnetic field cores 22f each formed of a plurality of electrical steel sheets. A fixing portion 23 is filled between the two partial magnetic field cores 22f. The fixing portion 23 is formed of, for example, a non-magnetic and insulating material, such as a resin.

In the magnetic field portion Fs15 shown in FIG. 107A, the width of the magnet Mg is gradually increased toward the outer peripheral surface. Alternatively, the width of the fixing portion 23 may gradually increase toward the outer peripheral surface, or the width of the partial magnetic field core 22f may gradually increase toward the outer peripheral surface.

The two surfaces on which the magnetic field cores 22N and 22S are exposed are not limited to the outer peripheral surface and the inner peripheral surface of the magnetic field portion Fs, and may be, for example, an upper surface and a lower surface of an axial gap type rotary electric machine in the axis direction (e.g., the rotary electric machine M25 shown in FIG. 56A).

The magnetic field portion Fs16 shown in FIG. 107B has magnetic field cores 22N and 22S formed of electrical steel sheets laminated in the machine moving direction (the rotation direction in FIG. 107B). The magnetic field cores 22N and 22S are exposed on three outer surfaces of the magnetic field portion Fs16. Specifically, the magnetic field cores 22N and 22S are exposed on the upper surface, the lower surface, and the outer peripheral surface of the magnetic field portion Fs16. Such a magnetic field portion Fs16 is suitable for a rotary electric machine in which armature cores are disposed on the upper side, the lower side, and the outer side of the magnetic field portion Fs16 (e.g. the rotary electric machine M74 shown in FIG. 89A). Similarly to the example in FIG. 107A, each of the magnetic field cores 22N and 22S may be composed of two portion magnetic field cores 22f.

A magnetic field portion Fs17 shown in FIG. 107C has magnetic field cores 22N and 22S formed of electrical steel sheets laminated in the machine moving direction. The magnetic field portion Fs17 is a linearly extending magnetic field portion and suitable in a linear electric machine. In the magnetic field portion Fs17 shown in FIG. 107C, the magnetic field cores 22N and 22S are exposed on four of the outer surfaces of the magnetic field portion Fs17. Specifically, the magnetic field cores 22N and 22S are exposed on the upper surface, the lower surface, the front surface, and the rear surface of the magnetic field portion Fs17. Such a magnetic field portion Fs17 is suitable for a linear electric machine in which armature cores are disposed on the upper side, the lower side, the front side, and the rear side of the magnetic field portion Fs17 (e.g. the linear electric machine M72 shown in FIG. 87A). Similarly to the example in FIG. 107A, each of the magnetic field cores 22N and 22S may be composed of two portion magnetic field cores 22f.

[Magnetic Field Portion Formed of Electrical Steel Sheets]

In an electric machine in which two armature cores face each other on two opposite sides of a magnetic field portion, the magnetic field portion may include electrical steel sheets laminated in a direction perpendicular to both the direction in which the two armature cores face each other and the direction of magnetization. FIGS. 108A to 108C are diagrams showing such a magnetic field portion.

A magnetic field portion Fs18 shown in FIGS. 108A and 108B has a plurality of electrical steel sheets 22e. The electrical steel sheets 22e are laminated in a Z direction shown in FIG. 108A. The Z direction is perpendicular to both the direction of magnetization of magnets Mg and the direction in which the two armature cores are facing (radial direction D in FIG. 108A). In the electric machine in which two armature cores face each other on two opposite sides of the magnetic field portion Fs18, for example, the electric machine M23 shown in FIG. 53, the electric machine M80 shown in FIG. 90A, and the electric machine M104 shown in FIG. 103A, the magnetic flux does not flow in a direction (Z direction) perpendicular to both the direction in which the two armature cores face each other and the direction of magnetization. As such, the electrical steel sheets 22e laminated in this direction can effectively prevent the generation of induced current. The magnetic field portion Fs18 shown in FIG. 108A is suitable for the radial gap type rotary electric machine M24 shown in FIG. 54A, for example.

In the example shown in FIG. 108A, holes are formed in the plurality of electrical steel sheets 22e to penetrating therethrough in the lamination direction (Z direction), and the magnets Mg are inserted into the holes. Each electrical steel sheet 22e has a coupling portion 22h. The coupling portion 22h is formed along the inner peripheral surface and the outer peripheral surface of the magnet Mg, and connects the portions constituting the magnetic field cores 22S and 22N. It is desirable that the coupling portion 22h be sufficiently thin so as not to function as a magnetic path. In the example shown in FIG. 108A, the coupling portion 22h is formed along the inner peripheral surface and the outer peripheral surface of the magnet Mg, although the coupling portion 22h may be formed along only one of the inner peripheral surface and the outer peripheral surface of the magnet Mg. Further, the electrical steel sheet 22e may not have the coupling portion 22h on both the inner peripheral surface and the outer peripheral surface of the magnet Mg.

Unlike the example shown in FIG. 108A, some of the plurality of electrical steel sheets constituting the magnetic field portion may have a coupling portion, and the others may not have a coupling portion. FIG. 108C shows a magnetic field portion Fs19 having such a structure. The magnetic field portion Fs19 shown in FIG. 108C has electrical steel sheets 22e and 22i. The electrical steel sheet 22e has a coupling portion 22h described above. On the other hand, the electrical steel sheet 22i does not have a coupling portion, and exposes the inner peripheral surface and the outer peripheral surface of the magnet Mg. The plurality of electrical steel sheets 22i arranged in the Z direction are laminated between the two electrical steel sheets 22e arranged in the Z direction. The magnetic field portion Fs having such two types of electrical steel sheets 22e and 22i prevents the reduction of the magnetic flux of the magnets Mg and ensures the easy assembly of the magnetic field portion Fs and the strength of the magnetic field portion Fs19. The magnetic field portion Fs having the two types of electrical steel sheets 22e and 22i as shown in FIG. 108C may be used not only in a radial gap type rotary electric machine but also in a linear electric machine or an axial gap type rotary electric machine.

CONCLUSION (1) In electric machines M1, M23, M80, and M100 exemplified in the present disclosure, an armature portion includes a plurality of armature cores H1 and H2 and a plurality of coils CL attached to the armature core H1. A magnetic field portion Fs is relatively movable to the armature portion and includes a plurality of magnets and a plurality of magnetic field cores. In the magnetic field portion Fs, the magnet is disposed between adjacent two magnetic field cores in the machine moving direction, which is a direction of the relative movement between the armature portion and the magnetic field portion Fs. The plurality of armature cores H1 and H2 are spaced apart in a direction intersecting with the machine moving direction. Each of the armature cores H1 and H2 includes a plurality of magnetic pole groups, and each of the magnetic pole groups includes a magnetic pole. The magnetic pole group included in one armature core and the magnetic pole group included in the other armature core constitute a magnetic pole group pair P that forms a magnetic path, where the magnetic path includes the magnetic field portion Fs between the two magnetic pole groups of the two armature cores H1 and H2. The armature cores H1 and H2 are magnetically separated. A closed magnetic circuit includes at least two magnetic pole group pairs P. A magnetic flux formed by the magnets included in the magnetic path passes through at least one coil CL to flow in the magnetic pole group pairs P. In such an electric machine, the two armature cores H1 and H2 that are magnetically separated constitute the magnetic pole group pairs P constituting the closed magnetic circuit, and thus, restrictions on the positions of the armature cores H1 and H2 are reduced, and the freedom in the structure of the electric machine is increased. Further, while satisfying the requirements for the external shape of the electric machine, it is possible to increase output power of the electric machine. When the freedom of the structure is increased, the flow of the magnetic flux can be easily controlled in the armature core. This can increase the freedom of the material. For example, lamination steel can be easily used instead of the powder core.

(2) In the rotary electrical machine M1 described with reference to FIGS. 2, 3B, and 4, the plurality of magnetic pole groups of the first armature core H1 includes a magnetic pole group G1u and a magnetic pole group G1v that are spaced apart in the machine moving direction (rotation direction) and magnetically coupled. the plurality of magnetic pole groups of the second armature core H2 includes a magnetic pole group G2u and a magnetic pole group G2v that are spaced apart in the machine moving direction and magnetically coupled. The magnetic pole group G1u and the magnetic pole group G2u form a magnetic pole group pair Pu, and the magnetic pole group G1v and the magnetic pole group G2v form a magnetic pole group pair Pv. The magnetic pole group pairs Pu and Pv form a closed magnetic circuit. This electric machine eliminates the need of magnetically separating the magnetic pole groups disposed in the machine moving direction. As such, the strength of the armature cores can be increased, and the accuracy of assembly and positioning of the magnetic poles can be increased. In addition to the rotary electric machine M1, the similar magnetic circuit can be formed in the rotary electric machines described with reference to FIGS. 11 to 39, the linear electric machines described with reference to FIGS. 48A and 63A, the rotary electric machines described with reference to FIGS. 49A, 56A to 62, and the electric machines described with reference to FIGS. 53, 72 to 75, for example.

(3) As described with reference to FIGS. 90A and 90B, the first armature core H1 includes, as the plurality of magnetic pole groups thereof, the magnetic pole group G1$u$ and the magnetic pole group G1$v$ that are spaced apart in the machine moving direction and magnetically coupled. The second armature core H2 includes, as the plurality of magnetic pole groups thereof, the magnetic pole group G21$u$, the magnetic pole group G21$v$, the magnetic pole group G22$u$, and the magnetic pole group G22$v$. The magnetic pole group G21$u$ and the magnetic pole group G21$v$ are spaced apart in the machine moving direction. The magnetic pole group G22$u$ and the magnetic pole group G22$v$ are spaced apart in the machine moving direction. The magnetic pole group G21$u$ and the magnetic pole group G22$u$ are arranged in a direction intersecting with the machine moving direction and magnetically coupled. The magnetic pole group G21$v$ and the magnetic pole group G22$v$ are also arranged in a direction intersecting with the machine moving direction and magnetically coupled. The third armature core H3 includes, as the plurality of magnetic pole groups thereof, a magnetic pole group G3$u$ and a magnetic pole group G3$v$ that are spaced apart in the machine moving direction. The first magnetic field portion Fs1 and the second magnetic field portion Fs2 are spaced apart in the direction intersecting with the machine moving direction. The magnetic pole group G1$u$ and the magnetic pole group G21$u$ constitute a magnetic pole group pair Pu1 together with the magnetic field core and the magnet of the first magnetic field portion Fs1. The magnetic pole group G1$v$ and the magnetic pole group G21$v$ constitute a magnetic pole group pair Pv1 together with the magnetic field core and the magnet of the first magnetic field portion Fs1. The magnetic pole group G22$u$ and the magnetic pole group G3$u$ constitute a magnetic pole group pair Pu2 together with the magnetic field core and the magnet of the second magnetic field portion Fs2. The magnetic pole group G3$v$ and the magnetic pole group G22$v$ constitute a magnetic pole group pair Pv2 together with the magnetic field core and the magnet of the second magnetic field portion Fs2. The magnetic pole group pairs Pu1, Pu2, Pv1, and Pv2 form a closed magnetic circuit. This electric machine eliminates the need of magnetically dividing at least the first armature core H1 in the machine moving direction, and thus the strength of the armature cores can be increased and the accuracy of assembly and positioning of the magnetic poles can be increased. In addition to the rotary electric machine M80 shown in FIGS. 90A and 90B, the similar magnetic circuit is formed in the electric machines or the linear electric machines described with reference to FIGS. 91A to 96 and 99, and the rotary electric machines described with reference to FIGS. 97 to 98.

(4) As described by reference to FIGS. 100A and 100B, the first armature core H1 includes, as the plurality of magnetic pole groups thereof, a magnetic pole group G11 and a magnetic pole group G12 that are arranged in a direction intersecting with the machine moving direction and magnetically coupled, and the second armature core H2 includes, as the plurality of magnetic pole groups thereof, a magnetic pole group G21 and a magnetic pole group G22 that are arranged in a direction intersecting with the machine moving direction and magnetically coupled. The first magnetic field portion Fs1 and the second magnetic field portion Fs2 are spaced apart in a direction intersecting with the machine moving direction. The magnetic pole group G11 and the magnetic pole group G21 constitute a magnetic pole group pair Put that forms a magnetic path together with the magnetic field core and the magnet of the first magnetic field portion Fs1. The magnetic pole group G12 and the magnetic pole group G22 constitute a magnetic pole group pair Pu2 that forms a magnetic path together with the magnetic field core and the magnet of the second magnetic field portion Fs2. The magnetic pole group pairs Pu1 and Pu2 form a closed magnetic circuit. In addition to the electric machine M100 described by reference to FIGS. 100A and 100B, the similar magnetic circuit is formed in the electric machines or the linear electric machines described with reference to FIGS. 101 to 105.

In the electric machine M109 described by reference to FIG. 106, the first armature core H1 includes, as the plurality of magnetic pole groups thereof, a magnetic pole group G11 and a magnetic pole group G12 that are disposed in a direction intersecting with the machine moving direction and magnetically coupled, and the second armature core H2 includes, as the plurality of magnetic pole groups thereof, a magnetic pole group G21 and a magnetic pole group G22 that are disposed in a direction intersecting with the machine moving direction and magnetically coupled. The third armature core H3 includes, as the plurality of magnetic pole groups thereof, a magnetic pole group G31 and a magnetic pole group G32 that are disposed in a direction intersecting with the machine moving direction and magnetically coupled. The first magnetic field portion Fs1 and the second magnetic field portion Fs2 are spaced apart in a direction intersecting with the machine moving direction. The magnetic pole group G11 and the magnetic pole group G21 constitute a magnetic pole group pair that forms a magnetic path together with the magnetic field core and the magnet of the first magnetic field portion Fs1. The magnetic pole group G12 and the magnetic pole group G32 constitute a magnetic pole group pair that forms a magnetic path together with the magnetic field core and the magnet of the second magnetic field portion Fs2. These two magnetic pole group pairs form a closed magnetic circuit.

(5) In the first armature core H1 of the rotary electric machine M1, each magnetic pole group G1 includes a plurality of magnetic poles 33$a$. In the second armature core H2, each magnetic pole group G2 also includes a plurality of magnetic poles 34$a$. In all the other electrical machines described above, a magnetic pole group of each armature core includes a plurality of magnetic poles. This structure serves to increase the driving force output by the electric machine.

For example, in the rotary electric machines M1 to M13 and M20 to M22 and the rotary electric machine including the armature portions Am14 to Am19, the magnetic field portion Fs and the armature portions Am1 to Am22 are relatively rotatable, and the first armature cores H1, H5, and H7 and the second armature cores H2, H6, and H8 are arranged in the axis direction. This serves to simplify the structure of the armature core, increase the strength of the armature core, and increase accuracy of assembly in the radial gap type rotary electric machine. Further, the freedom in selecting materials can be increased, for example, the armature core can be composed only of electrical steel sheets or a powder material in the radial gap type rotary electric machine.

(6) For example, in the rotary electric machines M1 to M5, M7, M8, M10 to M13, M20 to M22, and M27, and the armature portions Am14 to Am17, and Am19, the armature cores H1, H2, H5, H6, H7, and H8 are formed of lamination steel including a plurality of steel sheets Sp laminated in a direction (axis direction) intersecting with the machine moving direction. Further, for example, in the linear electric machines M30 and M31, the armature cores H1 and H2 are formed of lamination steel including a plurality of steel sheets laminated in a direction intersecting with the machine moving direction. This serves to prevent generation of induced current in the armature core, and increase the driving force output by the electric machine (torque output by the rotary electric machine and force output by the linear electric machine).

(7) For example, in the rotary electric machine M1, the magnetic poles 33a and 34a have a shape projecting toward the magnetic field portion Fs. This allows the magnetic flux flowing between the magnetic field portion Fs and the armature cores H1 and H2 to intensively pass through the magnetic poles 33a and 34a. In all the other electrical machines described above, each magnetic pole has a shape projecting toward the magnetic field portion.

(8) For example, in the armature portions Am9, and Am17 to Am19, each magnetic pole has projecting portions 33m, 53n, and 54n extending in the axis direction. This structure serves to reduce the magnetoresistance between the armature portion and the magnetic field portion. Further, this structure serves to alleviate the magnetic saturation of the magnetic field core because the projecting portion can function as a part of the flow path of the magnetic flux flowing in the magnetic field core in the axis direction.

(9) For example, in the armature portions Am14 to Am19, at least the armature core H1 includes a plurality of partial armature cores 53A, 53D, 53B, 53C, 53F, and 53G that are formed separately and coupled together. According to this structure, as compared with the case where the entire armature core H1 is formed integrally, the yield of the core material at the time of manufacturing the armature core can be improved.

(10) For example, in the rotary electric machine M27, the armature cores H1 and H2 include yoke partial cores 73D and 74D that include steel sheets laminated in a direction toward the magnetic field portion Fs, and the magnetic poles 33a and 34a include steel sheets laminated in a direction perpendicular to a lamination direction of the steel sheets included in the yoke partial cores 73D and 74D. This serves to prevent generation of induced current, and increase the power output by the electric machine.

(11) For example, in the rotary electric machine M1 and the linear electric machine M30, the number of phases is an odd number of three or more. The first magnetic pole group pair P (e.g., Pu) and the second magnetic pole group pair P (e.g., Pv) are located away from each other substantially by 360×(n+m/s) degrees in electrical angle, where "s" is the number of phases, "m" is an integer equal to or greater than 1 and equal to or less than s−1, where the integer is other than a divisor of s (except 1) and other than multiples of the divisor (except 1), "n" is an integer equal to or greater than 1, "p" is (the number of poles of magnetic field portion)/2, and "c" is the number of coils of each phase.

(12) For example, in the rotary electric machine M1, when (the number of phases of magnetic field portion)/2 is defined as "p", and the number of coils of each phase is defined as "c", "(360/p)×(n+m/s)" is substantially equal to "360/s/c". This allows the magnetic flux of the magnets Mg to be efficiently directed to the armature cores H1 and H2, thereby increasing the magnetic flux passing through the coils and obtaining high torque. The magnetic pole pairs can be arranged evenly in the rotation direction and the unbalance of magnetic force can be reduced, thus reducing cogging torque, torque ripple, vibration, and noise.

(13) For example, in the rotary electric machines M11 and M12, the number of phases is an odd number of three or more, and the armature portion includes a coil pair for each phase (specifically, pairs of CLu+ and CLu−, CLv and CLv−, CLw and CLw−), which is constituted by two coils having different winding directions. As shown in FIGS. 23C and 24C, (i) the first magnetic pole group pair (e.g., Pu+) and the second magnetic pole group pair (e.g., Pw+) are located away from each other substantially by 360×(n+m/s) degrees in electrical angle. Further, (ii) the first magnetic pole group pair (e.g., Pu+) and the third magnetic pole group pair (e.g., Pu−) are located away from each other substantially by 360×(n+m/s) degrees in electrical angle. Here, "s" is the number of phases, "m" is an integer equal to or greater than 1 and equal to or less than s−1, where the integer is other than a divisor of s (except 1) and other than multiples of the divisor (except 1), "n" is an integer equal to or greater than 1, and "q" is an integer equal to or greater than 1.

(14) In the rotary electric machines M11 and M12, when (the number of phases of magnetic field portion)/2 is defined as "p", and the number of coil pairs of each phase is defined as "c", "(360/p)×(n+m/s)" is substantially equal to "360/s/c". This allows the magnetic flux of the magnets to be efficiently directed to the armature core, thereby increasing the magnetic flux passing through the coils and obtaining high torque. The magnetic pole pairs can be arranged evenly in the rotation direction and the unbalance of magnetic force can be reduced, thus reducing cogging torque, torque ripple, vibration, and noise.

(15) For example, in the rotary electric machine M13 and the linear electric machine M35, the number of phases is an even number of two or more, and the armature portion includes a coil pair for each phase (specifically, pairs of C1a+ and C1a−, CLb+ and CLb−) constituted by two coils having different winding directions. (i) the first magnetic pole group pair (e.g., Pa+) and the second magnetic pole group pair (e.g., Pb+) are located away from each other substantially by 360×(n+m/s/2)

degrees in electrical angle. Further, (ii) the first magnetic pole group pair (e.g., Pa+) and the third magnetic pole group pair (e.g., Pa−) are located away from each other substantially by 360×(q+½) degrees in electrical angle. Here, "s" is the number of phases,
"m" is an integer equal to or greater than 1 and equal to or less than s−1, where the integer is other than a divisor of s (except 1) and other than multiples of the divisor (except 1),
"n" is an integer equal to or greater than 1, and
"q" is an integer equal to or greater than 1.

(16) In the rotary electric machine M13, when (the number of poles of magnetic field portion)/2 is defined as "p", the number of coil pairs for each phase is defined as "c", "(360/p)×(n+m/s/2)" is substantially equal to "180/s/c". This allows the magnetic flux of the magnets to be efficiently directed to the armature core, thereby increasing the magnetic flux passing through the coils and obtaining high torque. The magnetic pole pairs can be arranged evenly in the rotation direction and the unbalance of magnetic force can be reduced, thus reducing cogging torque, torque ripple, vibration, and noise.

(17) In the rotary electric machine M1, the coil CL is wound around a plurality of magnetic poles 33a constituting the magnetic pole group G1. This structure enables the magnetic flux flowing through the magnetic pole group G1 to efficiently pass though the coil CL. In the other rotary electric machines M2, M3, M6 to M13, and M20 to M22, the rotary electric machine including the armature portions Am14 to Am19, the linear electric machine M30, and the axial gap type rotary electric machine M40, each coil CL is also wound around a plurality of magnetic poles constituting the magnetic pole group.

(18) For example, in the rotary electric machine M26 and the armature core H1 shown in FIG. 70, the coil CL includes an outer coil CL1 surrounding a plurality of magnetic poles and an inner coil CL2 disposed inside of the outer coil CL1 and surrounding one or some of the plurality of magnetic poles surrounded by the outer coil CL1. This allows for effective use of spaces between adjacent two magnetic poles.

(19) For example, in the rotary electric machines M4 and M5 and the linear electric machine M36, the coil CL is disposed between adjacent two magnetic pole groups G1 and wound around the yoke portion 33c. This structure enables the magnetic flux flowing through the magnetic pole groups to efficiently pass though the coils.

In the armature portion Am20 of the rotary electric machine and the armature portion Am34 of the linear electric machine, the first armature core H1, the second armature core H2, and the plurality of coils CL are solidified by a material having non-magnetic and insulating property. This structure serves to prevent disconnection of the coils. Further, this can increase the heat capacity of the armature portion, and alleviate the temperature rise at the time of driving the rotary electric machine. Further, the workability of assembling the electric machine can be improved.

(20) In the magnetic field portions Fs5 to Fs8 and Fs30, magnetic field cores 22N and 22S include two partial magnetic field cores 22f and 22g disposed between two adjacent magnets, and the two partial magnetic field cores 22f and 22g are spaced apart in the rotation direction (machine moving direction in the linear electric machine M30). This reduces accumulation of errors in positions of the magnetic field cores 22N and 22S and the magnets Mg, thereby improving the positional accuracy of the magnetic field cores 22N and 22S and the magnets Mg.

(21) In the magnetic field portions Fs3 to Fs6, the magnetic field cores 22N and 22S include lamination steel constituted by a plurality of steel sheets 22e laminated in the machine moving direction. In the magnetic field portion Fs30, the magnetic field cores 22N and 22S include lamination steel constituted by a plurality of steel sheets 22e laminated in the machine moving direction. The electrical steel sheets are used as the magnetic field cores, and thus the power output by the electric machine (torque output by the rotary electric machine and force output by the linear electric machine) can be increased.

In the magnetic field portions Fs5 to Fs8 and Fs30, the magnets Mg and the magnetic field cores 22N and 22S are solidified by a material having non-magnetic and insulating property. This improves the workability of assembling the rotary electric machine.

(22) The magnetic field portions Fs5 to Fs8 and Fs30 are relatively movable to the armature portion. The magnets Mg of the magnetic field portions Fs5 to Fs8 and Fs30 are magnetized in the relative movement direction (machine moving direction) and arranged in the machine moving direction. The magnetic field portions Fs5 to Fs8 and Fs30 include a plurality of magnetic field cores 22N and 22S arranged in the machine moving direction. Each of the magnetic field cores 22N and 22S includes two partial magnetic field cores 22f and 22g disposed between two adjacent magnets Mg. The two partial magnetic field cores 22f and 22g are spaced apart in the machine moving direction. This reduces accumulation of errors in positions of the magnetic field cores 22N and 22S and the magnets Mg, thereby improving the positional accuracy of the magnetic field cores 22N and 22S and the magnets Mg.

(23) As described by reference to FIGS. 2, 3B, and 4, in the rotary electric machine M1, for example, the magnetic pole included in the magnetic pole group G1u, the magnetic pole included in the magnetic pole group G1v, the magnetic pole included in the magnetic pole group G2u, the magnetic pole included in the magnetic pole group G2v, the magnetic field cores 22N and 22S, and the magnets Mg form a closed magnetic circuit.

The magnetic flux formed by the magnets Mg
flows between the magnetic pole included in the magnetic pole group G1u and the magnetic pole included in the magnetic pole group G1v in the machine moving direction (rotation direction), flows between the magnetic pole included in the magnetic pole group G2u and the magnetic pole included in the magnetic pole group G2v in the machine moving direction,
flows between the magnetic pole included in the magnetic pole group G1u and the magnetic pole included in the magnetic pole group G2u through the magnetic field cores 22N and 22S in a direction intersecting with the machine moving direction (axis direction), and
flows between the magnetic pole included in the magnetic pole group G1v and the magnetic pole included in the magnetic pole group G2v through other magnetic field cores 22N and 22S in the direction intersecting with the machine moving direction (axis direction).

This structure eliminates the need of magnetically separating two magnetic pole groups adjacent in the machine moving direction. This can simplify the structure of the armature core, increase the strength of the armature core, and improve the accuracy of assembling the armature core. The structure of the armature core can be simplified, and thus the freedom in selecting materials can be increased, for example, the armature core can be composed only of electrical steel sheets or a soft magnetic powder material. In addition to the rotary electric machine M1, the similar magnetic circuit can be formed in the rotary electric machines described with reference to FIGS. 11 to 39, the linear electric machines described with reference to FIGS. 48A and 63A, the rotary electric machines described with reference to FIGS. 49A, 56A to 62, and the electric machines described with reference to FIGS. 53, 72 to 75, for example.

(24) In the rotary electric machines M21, M23, and M25, the plurality of armature cores are spaced apart in a direction intersecting with the machine moving direction. Each of the armature cores includes a plurality of magnetic pole groups, and each of the magnetic pole groups includes at least one magnetic pole. One of two armature cores is positioned from the magnetic field portion in a first direction intersecting with the machine moving direction, and the other armature core is positioned from the magnetic field portion in a second direction that is different from the first direction and intersecting with the machine moving direction. This structure serves to increase the freedom in the arrangement of the two armature cores in the electric machine, thereby increasing the freedom in the shape of the electric machine, such as a flat shape. The structure of the electric machine proposed in this disclosure may be applied to a rotary electric machine or a linear electric machine. The rotary electric machine may be a radial gap type, in which the armature portion and the magnetic field portion face each other in the radial direction, or an axial gap type, in which the armature portion and the magnetic field portion face each other in the axis direction. Further, the armature portion may be fixed and the magnetic field portion may be movable, or the magnetic field portion may be fixed and the armature portion may be movable.

(25) In the rotary electric machines M21, M23, and M25, one of the two armature cores and the other armature core are positioned opposite to each other across the magnetic field portion.

STILL ANOTHER MODIFICATION

The electric machine proposed in this disclosure is not limited to the rotary electric machines and the linear electric machines described above. For example, in the rotary electric machines and the linear electric machines described above, a plurality of magnetic poles are provided in one magnetic pole group. However, each magnetic pole group may be formed of only one magnetic pole. For example, in the rotary electric machine M1, each of the magnetic pole groups G1 may be formed of only one magnetic pole 33a, and each of the magnetic pole groups G2 may be formed of only one magnetic pole 34a. In this case as well, in the first armature core, two magnetic poles 33a adjacent in the rotation direction are magnetically coupled, and in the second armature core, two magnetic poles 34a adjacent in the rotation direction are magnetically coupled, and the first and second armature cores are magnetically separated. The magnetic flux formed by the magnetic field portion Fs flows between two magnetic poles 33a of the first armature core, flows between two magnetic poles 34a of the second armature core, and flows between the two magnetic poles 33a of the first armature core and the two magnetic poles 34a of the second armature core through the magnetic field cores 22N and 22S. The magnetic flux passes inside the coil CL when flowing between the two magnetic poles 33a of the first armature core.

The invention claimed is:

1. An electric machine, comprising:
    an armature portion including a plurality of armature cores and a plurality of coils attached to at least one armature core; and
    at least one magnetic field portion that is relatively movable with respect to the armature portion and includes a plurality of magnets and a plurality of magnetic field cores, each magnet being disposed between two adjacent magnetic field cores in a machine moving direction, the machine moving direction being a direction of a relative movement between the armature portion and the at least one magnetic field portion,
    wherein
    the plurality of armature cores are spaced apart from one another in a direction intersecting with the machine moving direction,
    each of the plurality of armature cores includes a plurality of magnetic pole groups, and each of the plurality of magnetic pole groups includes at least one magnetic pole,
    the plurality of armature cores include two armature cores, the magnetic pole group included in a first armature core of the two armature cores and the magnetic pole group included in a second armature core of the two armature cores forming a magnetic pole group pair that forms a magnetic path, the magnetic path including the at least one magnetic field portion between the two magnetic pole groups of the two armature cores,
    the two armature cores are magnetically separated,
    a closed magnetic circuit includes at least two magnetic pole group pairs, and
    a magnetic flux formed by the magnets included in the magnetic path passes through at least one coil to flow in the at least two magnetic pole group pairs;
    wherein in each of the plurality of magnetic pole groups, the at least one magnetic pole includes a plurality of magnetic poles arranged in the machine moving direction.

2. The electric machine according to claim 1, wherein the plurality of magnetic pole groups of the first armature core include a first magnetic pole group and a second magnetic pole group, the first magnetic pole group and the second magnetic pole group being spaced apart in the machine moving direction and magnetically coupled together,
    the plurality of magnetic pole groups of the second armature core include a third magnetic pole group and a fourth magnetic pole group, the third magnetic pole group and the fourth magnetic pole group being spaced apart in the machine moving direction and magnetically coupled together,
    the first magnetic pole group and the third magnetic pole group form the magnetic pole group pair as a first magnetic pole group pair,
    the second magnetic pole group and the fourth magnetic pole group form the magnetic pole group pair as a second magnetic pole group pair, and
    the closed magnetic circuit includes the first magnetic pole group pair and the second magnetic pole group pair.

3. The electric machine according to claim 1, wherein
the plurality of armature cores include a first armature core, a second armature core, and a third armature core,
the plurality of magnetic pole groups of the first armature core include a first magnetic pole group and a second magnetic pole group, the first magnetic pole group and the second magnetic pole group being spaced apart in the machine moving direction and magnetically coupled together,
the plurality of magnetic pole groups of the second armature core include a third magnetic pole group, a fourth magnetic pole group, a fifth magnetic pole group, and a sixth magnetic pole group, the third magnetic pole group and the fourth magnetic pole group being spaced apart in the machine moving direction, the fifth magnetic pole group and the sixth magnetic pole group being spaced apart in the machine moving direction, the third magnetic pole group and the fifth magnetic pole group being arranged in a direction intersecting with the machine moving direction and magnetically coupled, the fourth magnetic pole group and the sixth magnetic pole group being arranged in a direction intersecting with the machine moving direction and magnetically coupled together,
the plurality of magnetic pole groups of the third armature core include a seventh magnetic pole group and an eighth magnetic pole group that are spaced apart in the machine moving direction,
the at least one magnetic field portion includes a first magnetic field portion and a second magnetic field portion that are spaced apart in a direction intersecting with the machine moving direction,
the first magnetic pole group and the third magnetic pole group constitute, as a first magnetic pole group pair, the magnetic pole group pair that forms the magnetic path together with the magnetic field core and the magnet of the first magnetic field portion,
the second magnetic pole group and the fourth magnetic pole group constitute, as a second magnetic pole group pair, the magnetic pole group pair that forms the magnetic path together with the magnetic field core and the magnet of the first magnetic field portion,
the fifth magnetic pole group and the seventh magnetic pole group constitute, as a third magnetic pole group pair, the magnetic pole group pair that forms the magnetic path together with the magnetic field core and the magnet of the second magnetic field portion,
the sixth magnetic pole group and the eighth magnetic pole group constitute, as a fourth magnetic pole group pair, the magnetic pole group pair that forms the magnetic path together with the magnetic field core and the magnet of the second magnetic field portion, and
the closed magnetic circuit includes at least the first to fourth magnetic pole group pairs.

4. The electric machine according to claim 1, wherein
the plurality of armature cores include a first armature core and a second armature core that are spaced apart in a direction intersecting with the machine moving direction,
the plurality of magnetic pole groups of the first armature core includes a first magnetic pole group and a second magnetic pole group, the first magnetic pole group and the second magnetic pole group being arranged in a direction intersecting with the machine moving direction and magnetically coupled together,
the plurality of magnetic pole groups of the second armature core includes a third magnetic pole group and a fourth magnetic pole group, the third magnetic pole group and the fourth magnetic pole group being arranged in a direction intersecting with the machine moving direction and magnetically coupled together,
the at least one magnetic field portion includes a first magnetic field portion and a second magnetic field portion that are spaced apart in a direction intersecting with the machine moving direction,
the first magnetic pole group and the third magnetic pole group constitute, as a first magnetic pole group pair, the magnetic pole group pair that forms the magnetic path together with the magnetic field core and the magnet of the first magnetic field portion,
the second magnetic pole group constitutes a second magnetic pole group pair with the fourth magnetic pole group or another magnetic pole group that is different from the fourth magnetic pole group, the second magnetic pole group pair being the magnetic pole group pair that forms the magnetic path together with the magnetic field core and the magnet of the second magnetic field portion, and
the closed magnetic circuit includes the first magnetic pole group pair and the second magnetic pole group pair.

5. The electric machine according to claim 1, wherein
at least one of the plurality of armature cores includes lamination steel that includes a plurality of steel sheets laminated in a direction intersecting with the machine moving direction.

6. The electric machine according to claim 1, wherein
the at least one magnetic pole of each of the plurality of magnetic pole groups has a shape projecting toward the magnetic field portion.

7. The electric machine according to claim 1, wherein
at least one of the plurality of armature cores includes, in the at least one magnetic pole, a body having a shape projecting toward the magnetic field portion and a projecting portion extending from the body in a direction intersecting with the machine moving direction.

8. The electric machine according to claim 1, wherein
at least one of the plurality of armature cores includes a plurality of partial armature cores that are formed separately and coupled together.

9. The electric machine according to claim 1, wherein
at least one of the plurality of armature cores includes a yoke partial core that includes steel sheets laminated in a direction toward the magnetic field portion, and
the magnetic pole includes steel sheets laminated in a direction perpendicular to a lamination direction of the steel sheets included in the yoke partial core.

10. The electric machine according to claim 1, wherein
a number of phases of the electric machine is an odd number of three or more,
the armature portion includes, for each phase, one coil or two or more coils having a same winding direction,
the plurality of armature cores include a first armature core and a second armature core,
the first armature core includes, as the plurality of magnetic pole groups, a first magnetic pole group and a second magnetic pole group that are spaced apart in the machine moving direction,
the second armature core includes, as the plurality of magnetic pole groups, a third magnetic pole group and a fourth magnetic pole group that are spaced apart in the machine moving direction,
the first magnetic pole group and the third magnetic pole group constitute a first magnetic pole group pair, the second magnetic pole group and the fourth magnetic pole group constitute a second magnetic pole group pair, the coil is provided to each of the first magnetic pole group pair and the second magnetic pole group pair, when an angle between two magnetic field cores that are adjacent and have a same polarity is defined as 360 degrees in an electrical angle, the first magnetic pole group pair and the second magnetic pole group pair are located away from each other substantially by 360×(n+m/s) degrees in the electrical angle, where "s" is a number of phases, "m" is an integer equal to or greater than 1 and equal to or less than s−1, where the integer is other than a divisor of s (except 1) and other than multiples of the divisor (except 1), and "n" is an integer equal to or greater than 1.

11. The electric machine according to claim 10, wherein the magnetic field portion and the armature portion are relatively rotatable, and when (a number of phases of magnetic field portion)/2 is defined as "p", and a number of coils of each phase is defined as "c", "(360/p)×(n+m/s)" is substantially equal to "360/s/c".

12. The electric machine according to claim 1, wherein a number of phases of the electric machine is an odd number of three or more, the armature portion includes a coil pair for each phase, the coil pair including two coils having different winding directions, the plurality of armature cores include a first armature core and a second armature core, the plurality of magnetic pole groups of the first armature core includes a first magnetic pole group, a second magnetic pole group, and a fifth magnetic pole group that are spaced apart from one another in the machine moving direction, the plurality of magnetic pole groups of the second armature core further includes a third magnetic pole group, a fourth magnetic pole group, and a sixth magnetic pole group that are spaced apart from one another in the machine moving direction, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in an electrical angle, (i) the first magnetic pole group pair and the second magnetic pole group pair are located away from each other substantially by 360×(n+m/s) degrees in the electrical angle, and (ii) the first magnetic pole group pair and the third magnetic pole group pair are located away from each other substantially by 360×(q+½) degrees in electrical angle, where "s" is a number of phases, "m" is an integer equal to or greater than 1 and equal to or less than s-1, where the integer is not a divisor of s (except 1) or multiples of the divisor (except 1), "n" is an integer equal to or greater than 1, and "q" is an integer equal to or greater than 1.

13. The electric machine according to claim 12, wherein the magnetic field portion and the armature portion are relatively rotatable, and when (a number of phases of magnetic field portion)/2 is defined as "p", and a number of coil pairs of each phase is defined as "c", "(360/p)×(n+m/s)" is substantially equal to "360/s/c".

14. The electric machine according to claim 1, wherein a number of phases of the electric machine is an even number of two or more, the armature portion includes a coil pair for each phase, the coil pair being constituted by two coils having different winding directions, the plurality of armature cores include a first armature core and a second armature core, the plurality of magnetic pole groups of the first armature core includes a first magnetic pole group, a second magnetic pole group, and a fifth magnetic pole group that are spaced apart from one another in the machine moving direction, the plurality of magnetic pole groups of the second armature core includes a third magnetic pole group, a fourth magnetic pole group, and a sixth magnetic pole group that are spaced apart from one another in the machine moving direction, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in electrical angle, (i) the first magnetic pole group pair and the second magnetic pole group pair are located away from each other substantially by 360×(n+m/2) degrees in electrical angle, and (ii) the first magnetic pole group pair and the third magnetic pole group pair are relatively and located away from each other substantially by 360×(q+½) degrees in electrical angle, where "s" is a number of phases, "n" is an integer equal to or greater than 1, "m" is an integer equal to or greater than 1 and equal to or less than s−1, where the integer is other than a divisor of s (except 1) and other than multiples of the divisor (except 1), and "q" is an integer equal to or greater than 1.

15. The electric machine according to claim 14, wherein the magnetic field portion and the armature portion are relatively rotatable, when (a number of poles of magnetic field portion)/2 is defined as "p", a number of coil pairs for each phase is defined as "c", "(360/p)×(n+m/s/2)" is substantially equal to "180/s/c".

16. The electric machine according to claim 1, wherein the at least one coil is wound around at least one of two magnetic pole groups constituting each of the at least two magnetic pole group pairs forming the closed magnetic circuit.

17. The electric machine according to claim 1, wherein the magnetic pole group includes a plurality of magnetic poles as the at least one magnetic pole, and
the at least one coil includes
a first coil surrounding the plurality of magnetic poles and
a second coil disposed inside of the first coil and surrounding one or some of the plurality of magnetic poles that is surrounded by the first coil.

18. The electric machine according to claim 1, wherein at least one of the plurality of armature cores includes two magnetic pole groups arranged in the machine moving direction and a yoke portion between the two magnetic pole groups, and
the at least one coil is wound around the yoke portion.

19. The electric machine according to claim 1, wherein each of the plurality of magnets is magnetized in the machine moving direction,
each of the plurality of magnetic field cores includes two partial magnetic field cores disposed between two adjacent magnets, and
the two partial magnetic field cores are spaced apart in the machine moving direction.

20. The electric machine according to claim 19, wherein each of the two partial magnetic field cores includes lamination steel constituted by a plurality of steel sheets laminated in the machine moving direction.

21. A magnetic field portion of an electric machine relatively movable to an armature portion in a machine moving direction, the magnetic field portion comprising:
a plurality of magnets each magnetized in the machine moving direction and arranged in the machine moving direction; and
a plurality of magnetic field cores arranged in the machine moving direction, wherein each of the plurality of magnetic field cores includes two partial magnetic field cores disposed between two adjacent magnets, and
the two partial magnetic field cores are spaced apart in the machine moving direction.

22. An electric machine comprising:
an armature portion including a plurality of armature cores and a plurality of coils attached to at least one of the plurality of armature cores; and
at least one magnetic field portion that is relatively movable to the armature portion in a machine moving direction and includes a plurality of magnets and a plurality of magnetic field cores, the magnet being disposed between two magnetic field cores adjacent in the machine moving direction, wherein
the plurality of armature cores of the armature portion are spaced apart from one another in a second direction intersecting with the machine moving direction, each of the plurality of armature cores including a plurality of magnetic poles,
a first armature core of the plurality of armature cores includes a first magnetic pole and a second magnetic pole,
a second armature core of the plurality of armature cores includes a third magnetic pole and a fourth magnetic pole,
the first magnetic pole, the second magnetic pole, the third magnetic pole, the fourth magnetic pole, the plurality of magnetic field cores, and the plurality of magnets form a closed magnetic circuit,
a magnetic flux formed by the plurality of magnets:
flows between the first magnetic pole and the second magnetic pole,
flows between the third magnetic pole and the fourth magnetic pole,
flows between the first magnetic pole and the third magnetic pole through a part of the plurality of magnetic field cores in a direction intersecting with the machine moving direction,
flows between the second magnetic pole and the fourth magnetic pole through another part of the plurality of magnetic field cores in a direction intersecting with the machine moving direction.

23. An electric machine, comprising:
an armature portion including a plurality of armature cores and a plurality of coils attached to at least one of the plurality of armature cores; and
at least one magnetic field portion that is relatively movable to the armature portion, the least one magnetic field portion including a plurality of magnets and a plurality of magnetic field cores, the magnet being disposed between two magnetic field cores adjacent in a machine moving direction, the machine moving direction being a direction of a relative movement between the armature portion and the at least one magnetic field portion, wherein
the plurality of armature cores are spaced apart from one another in a direction intersecting with the machine moving direction,
each of the plurality of armature cores includes a plurality of magnetic pole groups, and each of the plurality of magnetic pole groups includes at least one magnetic pole,
the plurality of armature cores include two armature cores, a first armature core being positioned from the magnetic field portion in a first direction intersecting with the machine moving direction, and a second armature core of the two armature cores being is positioned from the magnetic field portion in a second direction, the second direction being different from the first direction and intersecting with the machine moving direction;
wherein in each of the plurality of magnetic pole groups, the at least one magnetic pole includes a plurality of magnetic poles arranged in the machine moving direction.

24. The electric machine according to claim 23, wherein the first armature core and the second armature core are positioned opposite to each other across the magnetic field portion.

* * * * *